United States Patent [19]

Kuszmaul et al.

[11] Patent Number: 5,680,550
[45] Date of Patent: Oct. 21, 1997

[54] DIGITAL COMPUTER FOR DETERMINING A COMBINED TAG VALUE FROM TAG VALUES SELECTIVELY INCREMENTED AND DECREMENTED REFLECTING THE NUMBER OF MESSAGES TRANSMITTED AND NOT RECEIVED

[75] Inventors: Bradley C. Kuszmaul, Waltham; Charles E. Leiserson, Winchester; Shaw-Wen Yang, Concord; Carl R. Feynman, Acton; W. Daniel Hillis, Cambridge; David C. Douglas, Concord, all of Mass.

[73] Assignee: TM Patents, LP, Boston, Mass.

[21] Appl. No.: 388,031

[22] Filed: Feb. 13, 1995

Related U.S. Application Data

[62] Division of Ser. No. 183,217, Jan. 14, 1994, Pat. No. 5,390,298, which is a division of Ser. No. 946,242, Sep. 16, 1992, Pat. No. 5,333,268, which is a continuation of Ser. No. 592,029, Oct. 3, 1990, abandoned.

[51] Int. Cl.⁶ .................. G06F 13/00; G06F 3/00
[52] U.S. Cl. .................. 395/200.15; 395/200.01; 395/200.03; 364/232.22; 364/731.9; 364/229; 364/260.3
[58] Field of Search .................. 395/200.15, 250, 395/375, 800; 364/229, 230, 231.9, 242.9, 284.3

[56] References Cited

U.S. PATENT DOCUMENTS

| | | | |
|---|---|---|---|
| 4,303,851 | 12/1981 | Mottier | 377/6 |
| 4,412,285 | 10/1983 | Neches et al. | 395/650 |
| 4,663,706 | 5/1987 | Allen et al. | 395/200.13 |
| 4,985,832 | 1/1991 | Grondalski | 395/800 |
| 5,060,147 | 10/1991 | Mattheyses | 395/650 |
| 5,247,613 | 9/1993 | Bromely | 395/200.18 |

*Primary Examiner*—Thomas C. Lee
*Assistant Examiner*—Anderson I. Chen
*Attorney, Agent, or Firm*—Cesari and McKenna, LLP

[57] ABSTRACT

A digital computer includes a plurality of processing elements, a command processor, a diagnostic processor and a communications network. The processing elements each performs data processing and data communications operations in connection with commands. The processing elements also performing diagnostic operations in response to diagnostic operation requests and providing diagnostic results in response thereto. The command processor generates commands for the processing elements, and also performs diagnostic operations in response to diagnostic operation requests and providing diagnostic results in response thereto. The diagnostic processor generates diagnostic requests. The communication network includes three elements, including a data router, a control network and a diagnostic network. The data router is connected to the processing elements for facilitating the transfer of data among them during a data communications operation. The control network is connected to the processing elements and the command processor for transferring commands from the command processor to the processing elements. The diagnostic network connected to the processing elements, the command processor and the diagnostic processor for transferring diagnostic requests from the diagnostic processor to the processing elements and the command processor and for transferring diagnostic results from the processing elements and the command processor to the diagnostic processor.

16 Claims, 79 Drawing Sheets

| | |
|---|---|
| LDR STATUS — 293 | ⎫ |
| LDR PRIVATE — 294 | ⎪ DRI LEFT |
| LDR REC — 295 | ⎬ INTERFACE REGISTERS |
| LDR SEND FIRST — 296 | ⎪ 290 |
| LDR SEND — 297 | ⎭ |
| RDR STATUS — 300 | ⎫ |
| RDR PRIVATE — 301 | ⎪ DRI RIGHT |
| RDR REC — 302 | ⎬ INTERFACE REGISTERS |
| RDR SEND FIRST — 303 | ⎪ 291 |
| RDR SEND — 304 | ⎭ |
| PARTITION BASE — 305 | ⎫ |
| PARTITION SIZE — 306 | ⎪ |
| CHUNK TABLE ADRS — 307 | ⎪ DATA ROUTER |
| CHUNK TABLE DATA — 310 | ⎬ ADRS GEN REGISTERS |
| CHUNK SIZE — 311 | ⎪ 292 |
| PE PHYS SELF ADRS — 312 | ⎭ |
| MSG COUNT — 313 | |

FIG. 12B

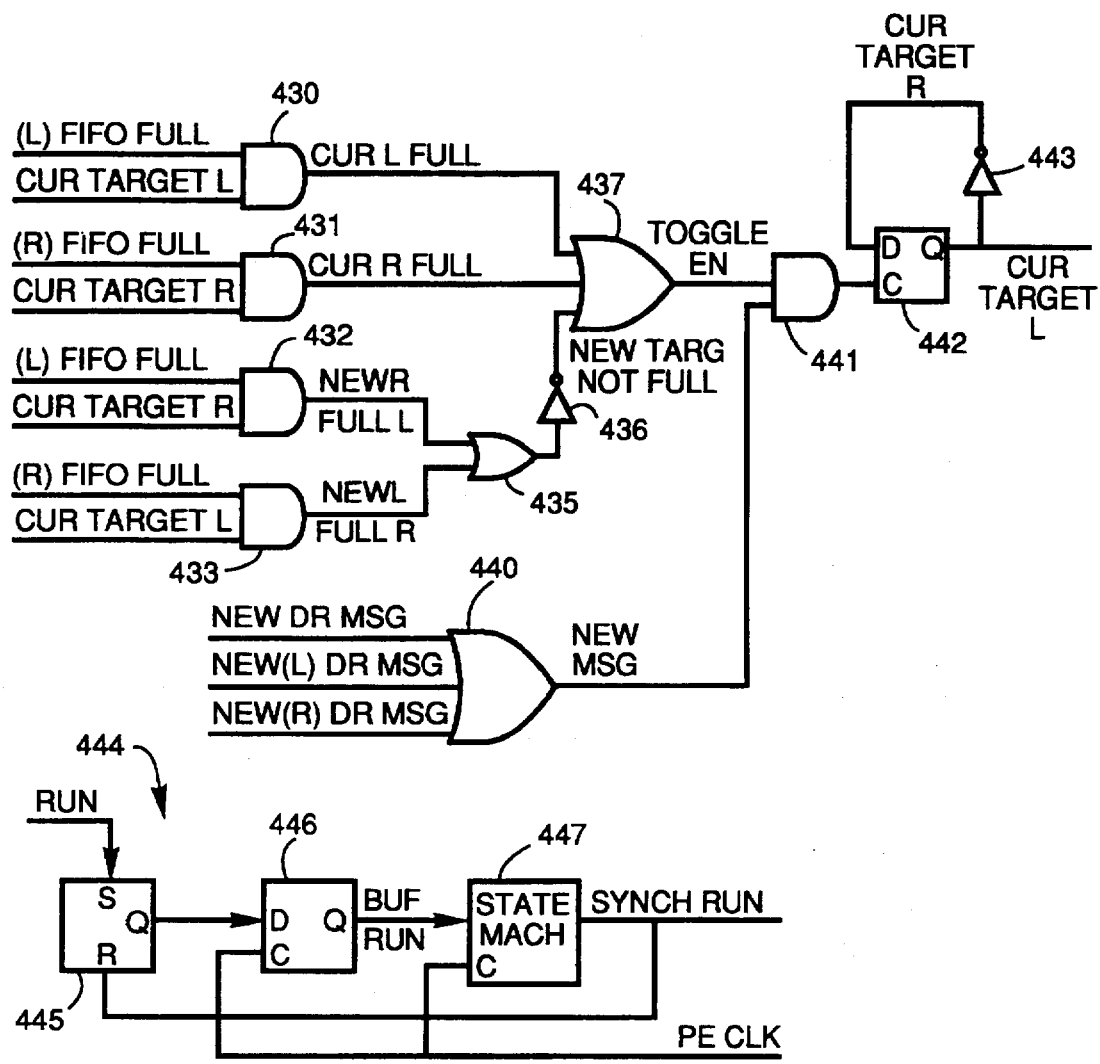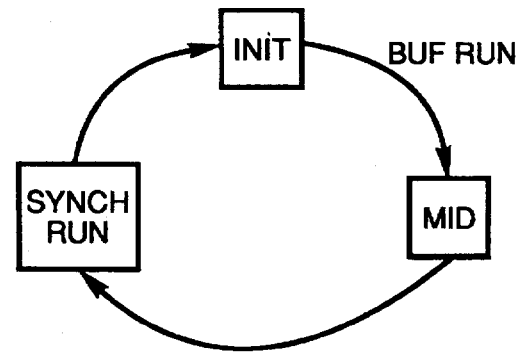
FIG. 21

CONTROL NETWORK
INTERFACE RCV SECTION
DESTINATION CONTROL

CONTROL NETWORK INTERFACE
FLICK BUFFER 816

DIGITAL COMPUTER FOR DETERMINING A COMBINED TAG VALUE FROM TAG VALUES SELECTIVELY INCREMENTED AND DECREMENTED REFLECTING THE NUMBER OF MESSAGES TRANSMITTED AND NOT RECEIVED

This is a divisional of application Ser. No. 08/183,217, filed on Jan. 14, 1994, now U.S. Pat. No. 5,398,298 which is a divisional of Ser. No. 07/946,242, filed Sep. 16, 1992, now U.S. Pat. No. 5,333,268, issued Jul. 26, 1994, which is a continuation of U.S. patent application Ser. No. 07/592,029, filed Oct. 3, 1990, now abandoned.

INCORPORATION BY REFERENCE

Guy E. Blelloch, *Scan Primitives and Parallel Vector Models*, (Ph.D. Dissertation, Massachusetts Institute of Technology: 1988), incorporated herein by reference.

U.S. patent application Ser. No. 07/489,079 now U.S. Pat. No. 5,118,975, filed Mar. 5, 1990, in the name of W. Daniel Hillis, et al., entitled Digital Clock Buffer Circuit Providing Controllable Delay, and assigned to the assignee of the present application, incorporated herein by reference.

FIELD OF THE INVENTION

The invention relates generally to the field of digital computer systems, and more particularly to massively parallel computing systems. The invention particularly provides arrangements for controlling processors in a computing system having a large number of processors, for facilitating transfer of data among the processors and for facilitating diagnosis of faulty components in the computing system.

BACKGROUND OF THE INVENTION

A digital computer system generally comprises three basic elements, namely, a memory element, an input/output element and a processor element. The memory element stores information in addressable storage locations. This information includes data and instructions for processing the data. The processor element fetches information from the memory element, interprets the information as either an instruction or data, processes the data in accordance with the instructions, and returns the processed data to the memory element. The input/output element, under control of the processor element, also communicates with the memory element to transfer information, including instructions and the data to be processed, to the memory, and to obtain processed data from the memory.

Most modern computing systems are considered "von Neumann" machines, since they are generally constructed according to a paradigm attributed to John von Neumann. Von Neumann machines are characterized by having a processing element, a global memory which stores all information in the system, and a program counter that identifies the location in the global memory of the instruction being executed. The processing element executes one instruction at a time, that is, the instruction identified by the program counter. When the instruction is executed, the program counter is advanced to identify the location of the next instruction to be processed. (In many modern systems, the program counter is actually advanced before the processor has finished processing the current instruction).

Von Neumann systems are conceptually uncomplicated to design and program, since they do only one operation at a time. A number of advancements have been made to the original von Neumann paradigm to permit the various parts of the system, most notably the various components of the processor, to operate relatively independently and achieve a significant increase in processing speed. One such advancement is pipelining of the various steps in executing an instruction, including instruction fetch, operation code decode (a typical instruction includes an operation code which identifies the operation to be performed, and in most cases one or more operand specifiers, which identify the location in memory of the operands, or data, to be used in executing the instruction), operand fetch, execution (that is, performing the operation set forth in the operation code on the fetched operands), and storing of processed data, which steps are performed relatively independently by separate hardware in the processor. In a pipelined processor, the processor's instruction fetch hardware may be fetching one instruction while other hardware is decoding the operation code of another instruction, fetching the operands of still another instruction, executing yet another instruction, and storing the processed data of a fifth instruction. Since the five steps are performed sequentially, pipelining does not speed up processing of an individual instruction. However, since the processor begins processing of additional instructions before it has finished processing a current instruction, it can speed up processing of a series of instructions.

A pipelined processor is obviously much more complicated than a simple processor in a von Neumann system, as it requires not only the various circuits to perform each of the operations (in a simple von Neumann processor, many circuits could be used to perform several operations), but also control circuits to coordinate the activities of the various operational circuits. However, the speed-up of the system can be dramatic.

More recently, some processors have been provided with execution hardware which includes multiple functional units each being optimized to perform a certain type of mathematical operation. For example, some processors have separate functional units for performing integer arithmetic and floating point arithmetic, since they are processed very differently. Some processors have separate hardware functional units each of which performs one or only several types of mathematical operations, including addition, multiplication, and division operations, and other operations such as branch control and logical operations, all of which can be operating concurrently. This can be helpful in speeding up certain computations, most particularly those in which several functional units may be used concurrently for performing parts of a single computation.

In a von Neumann processor, including those which incorporate pipelining or multiple functional units (or both, since both may be incorporated into a single processor), a single instruction stream operates on a single data stream. That is, each instruction operates on data to enable one calculation at a time. Such processors have been termed "SISD," for single-instruction/single-data." If a program requires a segment of a program to be used to operate on a number of diverse elements of data to produce a number of calculations, the program causes the processor to loop through that segment for each calculation. In some cases, in which the program segment is short or there are only a few data elements, the time required to perform such a calculation may not be unduly long.

However, for many types of such programs, SISD processors would require a very long time to perform all of the calculations required. Accordingly, processors have been developed which incorporate a large number of processing elements all of which may operate concurrently on the same instruction stream, but with each processing element processing a separate data stream. These processors have been termed "SIMD" processors, for "single-instruction/multiple-data."

SIMD processors are useful in a number of applications, such as image processing, signal processing, artificial intelligence, database operations, and computer simulation of a number of things, such as electronic circuits and fluid dynamics. In image processing, each processing element may be used to perform processing on a pixel ("picture element") of the image to enhance the overall image. In signal processing, the processors concurrently perform a number of the calculations required to perform such computations as the "Fast Fourier transform" of the data defining the signal. In artificial intelligence, the processors perform searches on extensive rule bases representing the stored knowledge of the particular application. Similarly, in database operations, the processors perform searches on the data in the database, and may also perform sorting and other operations. In computer simulation of, for example, electronic circuits, each processor may represent one part of the circuit, and the processor's iterative computations indicate the response of the part to signals from other parts of the circuit. Similarly, in simulating fluid dynamics, which can be useful in a number of applications such as weather predication and airplane design, each processor is associated with one point in space, and the calculations provide information about various factors such as fluid flow, temperature, pressure and so forth.

Typical SIMD systems include a SIMD array, which includes the array of processing elements and a router network, a control processor and an input/output component. The input/output component, under control of the control processor, enables data to be transferred into the array for processing and receives processed data from the array for storage, display, and so forth. The control processor also controls the SIMD array, iteratively broadcasting instructions to the processing elements for execution in parallel. The router network enables the processing elements to communicate the results of a calculation to other processing elements for use in future calculations.

Several routing networks have been used in SIMD arrays and others have been proposed. In one routing network, the processing elements are interconnected in a matrix, or mesh, arrangement. In such an arrangement, each processing element is connected to, and communicates with, four "nearest neighbors" to form rows and columns defining the mesh. This arrangement can be somewhat slow if processing elements need to communicate among themselves at random. However, the arrangement is inexpensive and conceptually simple, and may suffice for some types of processing, most notably image processing. The "Massively Parallel Processor" manufactured by Goodyear Aerospace Corporation is an example of a SIMD array having such a routing network.

In another routing network, processing elements are interconnected in a cube or hypercube arrangement, having a selected number of dimensions, for transferring data, in the form of messages, among the processing elements. The arrangement is a "cube" if it only has three dimensions, and a "hypercube" if it has more than three dimensions. U.S. Pat. No. 4,598,400, entitled Method and Apparatus For Routing Message Packets, issued Jul. 1, 1986 to W. Daniel Hillis, and assigned to the assignee of the present application, describes a system having a hypercube routing network. In the system described in the '400 patent, multiple processing elements are connected to a single routing node, and the routing nodes are interconnected in the hypercube.

Another routing arrangement which has been proposed is a crossbar switch, through which each processing element can communicate directly with any of the other processing elements. The crossbar switch provides the most efficient communications of any of the routing networks proposed. However, a crossbar switch also has the most connections and switching elements, and thus is the most expensive and also the most susceptible to failure due to broken connections and faulty switching elements. Thus, crossbar switch arrangements are rarely used, except when the number of processing elements is fairly small, since the complexity, of a crossbar switch increases with the square of the number of processing elements.

Yet another routing arrangement is an omega network, in which switching is performed through a number of serially-connected stages. Each stage has two inputs, each connected to the outputs of a prior stage or processing elements, has two outputs which may be connected to the inputs of a subsequent stage or processing elements. The "Butterfly" computer system manufactured by Bolt Beranek & Newman uses such a network.

SUMMARY OF THE INVENTION

The invention provides a new and improved parallel computer system.

In brief summary, the new computer includes a plurality of processing elements, a command processor, a diagnostic processor and a communications network. The processing elements each performs data processing and data communications operations in connection with commands. The processing elements also performing diagnostic operations in response to diagnostic operation requests and providing diagnostic results in response thereto. The command processor generates commands for the processing elements, and also performs diagnostic operations in response to diagnostic operation requests and providing diagnostic results in response thereto. The diagnostic processor generates diagnostic requests. The communication network includes three elements, including a data router, a control network and a diagnostic network. The data router is connected to the processing elements for facilitating the transfer of data among them during a data communications operation. The control network is connected to the processing elements and the command processor for transferring commands from the command processor to the processing elements. The diagnostic network connected to the processing elements, the command processor and the diagnostic processor for transferring diagnostic requests from the diagnostic processor to the processing elements and the command processor and for transferring diagnostic results from the processing elements and the command processor to the diagnostic processor.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 7 is a diagram depicting the structure of message packets transferred over the control network;

DETAILED DESCRIPTION OF AN ILLUSTRATIVE EMBODIMENT

I. General Description

A. General Description of Computer System

Figure 1:
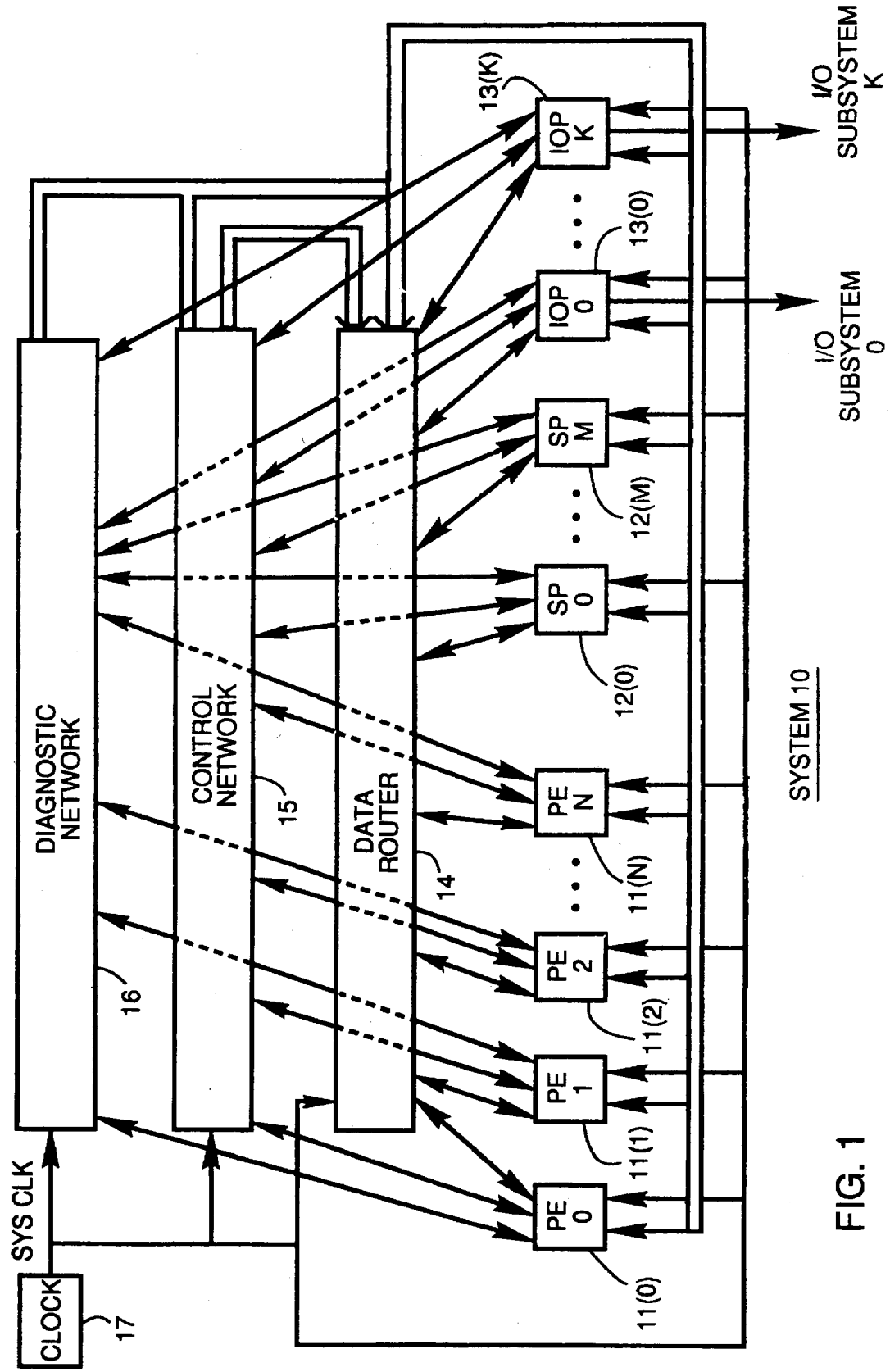
FIG. 1 is a general block diagram of a massively parallel computer system constructed in accordance with the invention.

FIG. 1 is a general block diagram of a massively parallel computer system 10 constructed in accordance with the invention. With reference to FIG. 1, system 10 includes a plurality of processing elements 11(0) through 11(N) (generally identified by reference numeral 11), scalar processors 12(0) through 12(M) (generally identified by reference numeral 12) and input/output processors 13(0) through 13(K) (generally identified by reference numeral 13). Input/output units (not shown), such as, for example, disk and tape storage units, video display devices, printers and so forth may be connected to the input/output processors to supply information, including data and program commands, for processing by the processing elements 11 and scalar processors 12 in the system, and may also receive processed data for storage, display and printing. The scalar processors 12 may also be connected to input/output units including, for example, video display terminals which permit one or more operators to generally control system 10.

The system 10 further includes a control network 14, a data router 15 and a diagnostic network 16. The control network 14 permits one or more scalar processors 12 to broadcast program commands to the processing elements 11. The processing elements 11 execute the commands generally concurrently. The control network 14 also permit the processing elements 11 to transfer status information to the scalar processors 12. The control network 14 is also used by the processing elements 11 to perform selected types of arithmetic operations, termed "scan" and "reduce" operations, as described below. The control network 14 may also be used to provide synchronization among the processing elements 11.

The data router 15 transfers data among the processing elements 11, scalar processors 12 and input/output processors 13. In particular, under control of the scalar processors 12, the input/output processors 13 retrieve data to be processed from the input/output units and distributes it to the respective scalar processors 12 and processing elements 11. During processing, the scalar processors 12 and processing elements 11 can transfer data among themselves over the data router 15. In addition, the processing elements 11 and scalar processors 12 can transfer processed data to the input/output processors 13. Under control of the scalar processors 12, the input/output processors 13 can direct the processed data that they receive from the data router 15 to particular ones of the input/output units for storage, display, printing, or the like.

The diagnostic network 16, under control of a diagnostic processor (not shown), facilitates testing of other portions of the system 10 to identify, locate and diagnose defects. The diagnostic processor may comprise one or more of the scaler processors 12. In addition, the diagnostic network 16 may be used to establish selected operating conditions in the other portions of the system 10 as described below.

The system 10 is synchronous, that is, all of its elements operate in accordance with a global SYS CLK system clock signal provided by a clock circuit 17.

One particular embodiment of system 10 may include hundreds or many thousands of processing elements 11 operating on a single problem in parallel under control of commands broadcast to them by the scalar processors 12. In that embodiment, the processing elements 11 operate in parallel on the same command on their individual sets of data, thereby forming a parallel computer system. In addition, the system 10 may be dynamically logically partitioned, as described below, into multiple subsystems which may concurrently operate on separate problems or separate parts of a single problem. In that case, each partition includes at least one scalar processor 12 and a plurality of processing elements 11.

B. General Description of Communications Networks

1. Data Router 15

Figure 2:
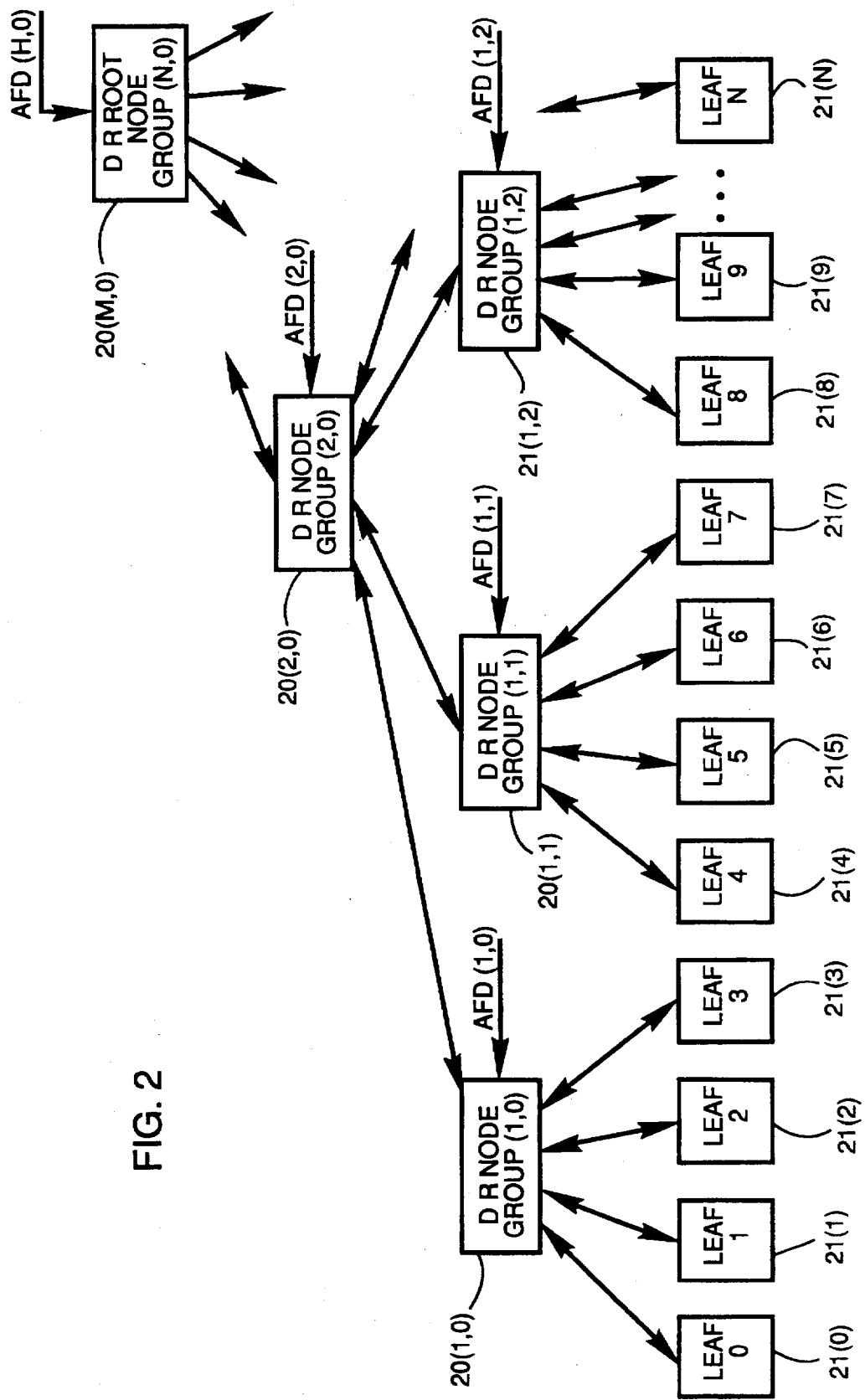
FIGS. 2 and 3 are block diagrams useful in understanding the structure and operation of the data router of the computer system of FIG. 1.
Figure 3:
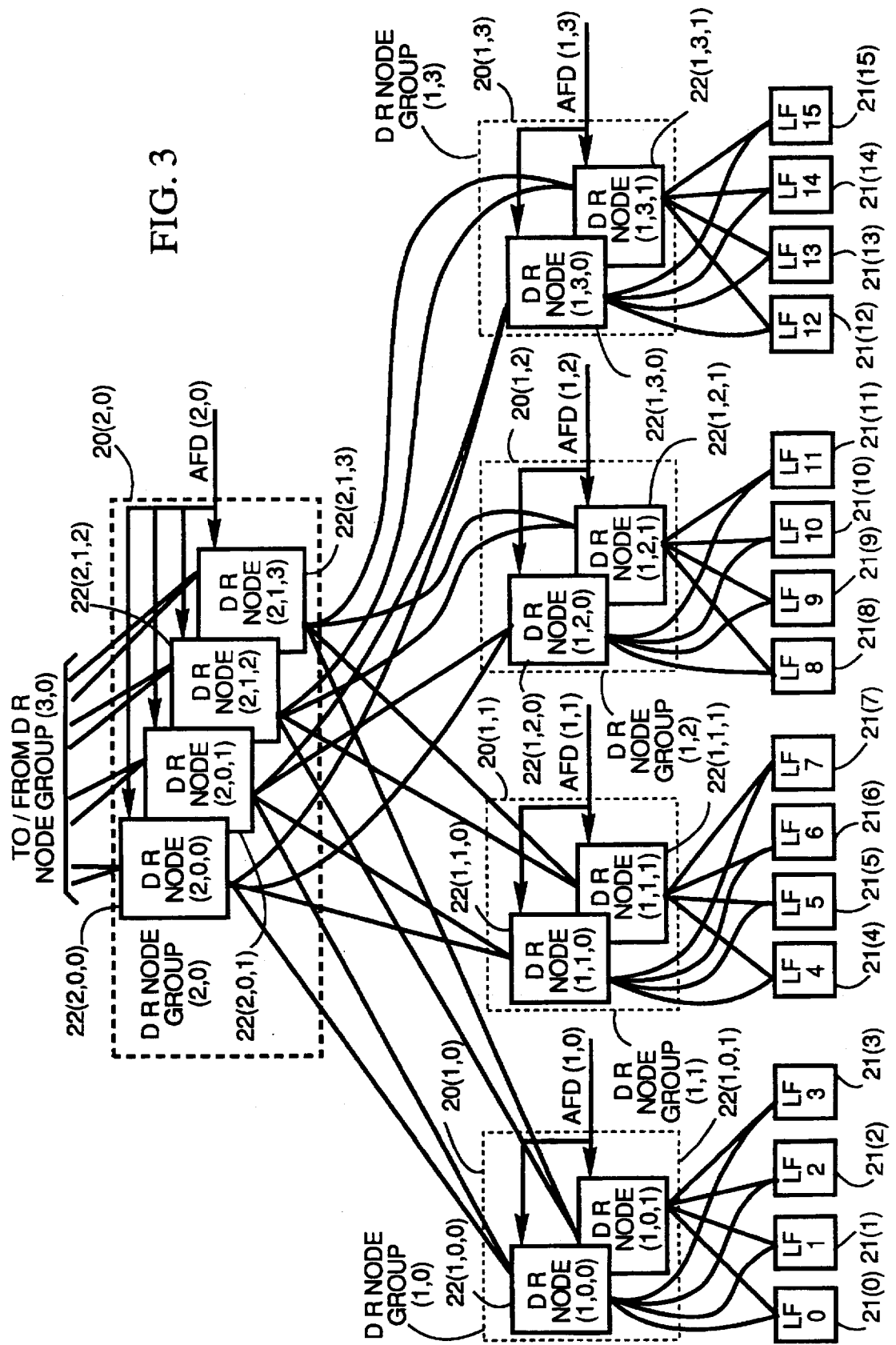
Figure 4:
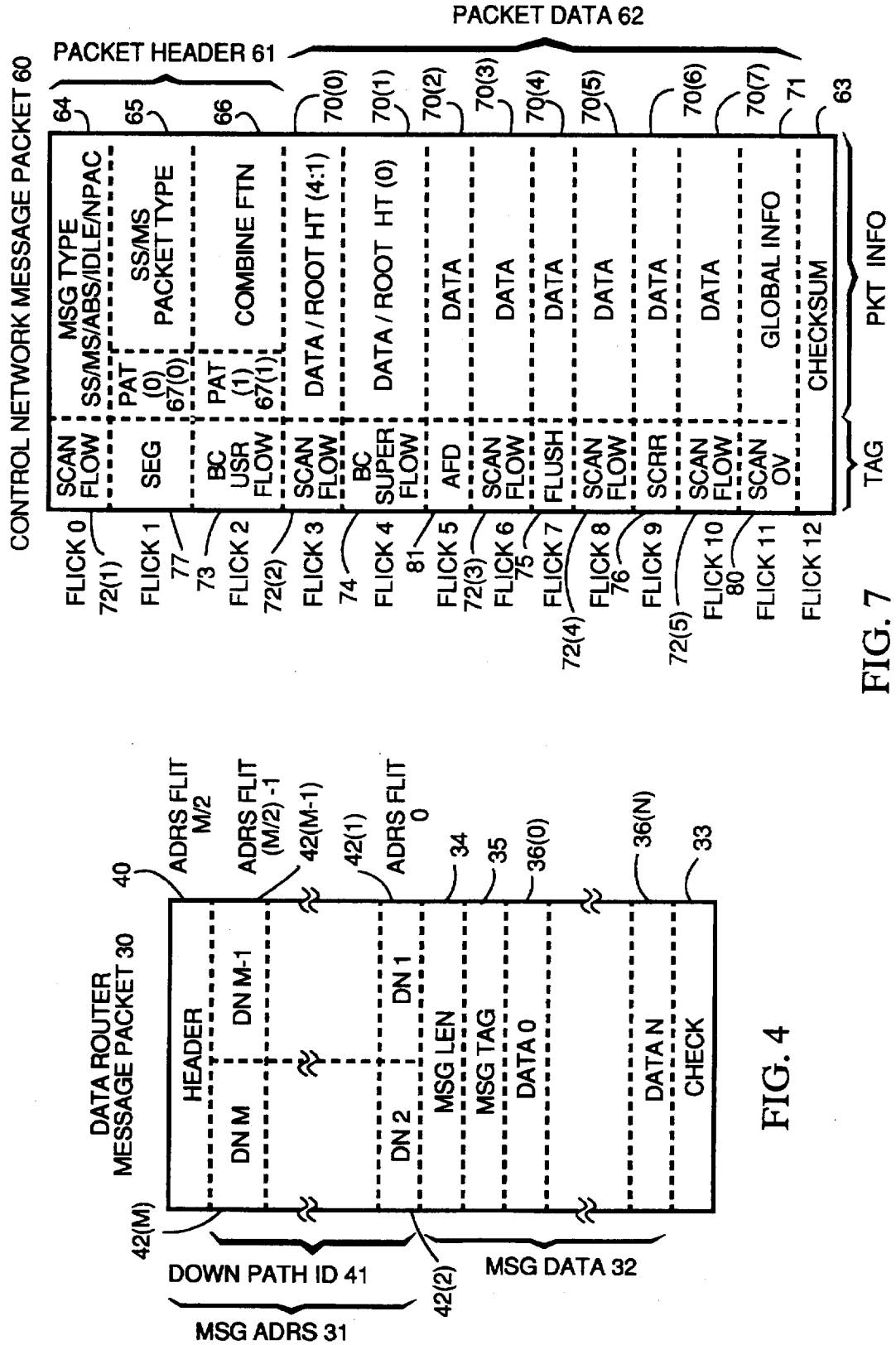
FIG. 4 is a diagram depicting the structure of message packets transferred over the data router.
Figure 5:
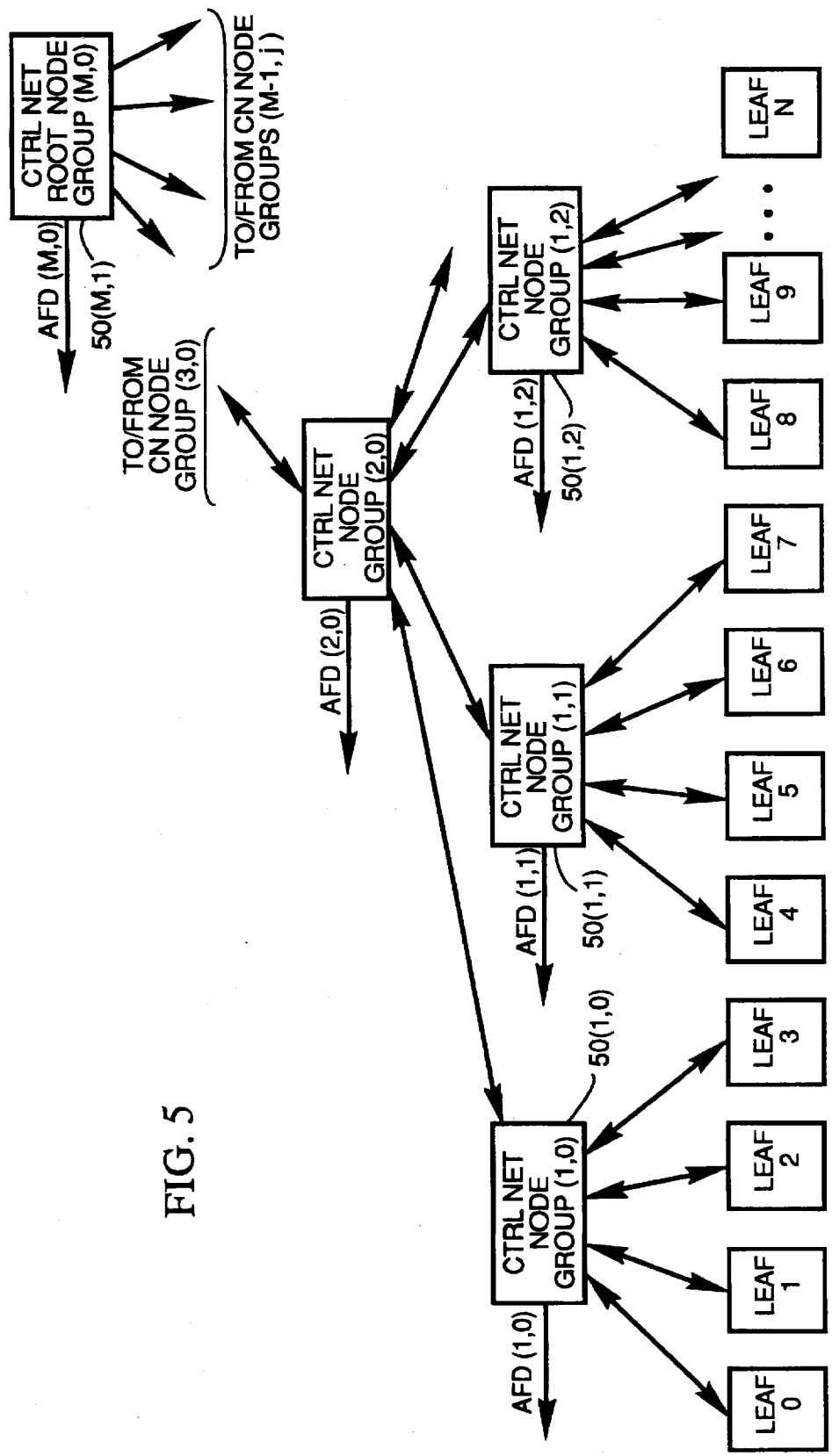
FIGS. 5 and 6 are block diagrams useful in understanding the structure and operation of the control network of the computer system of FIG. 1.
Figure 6:
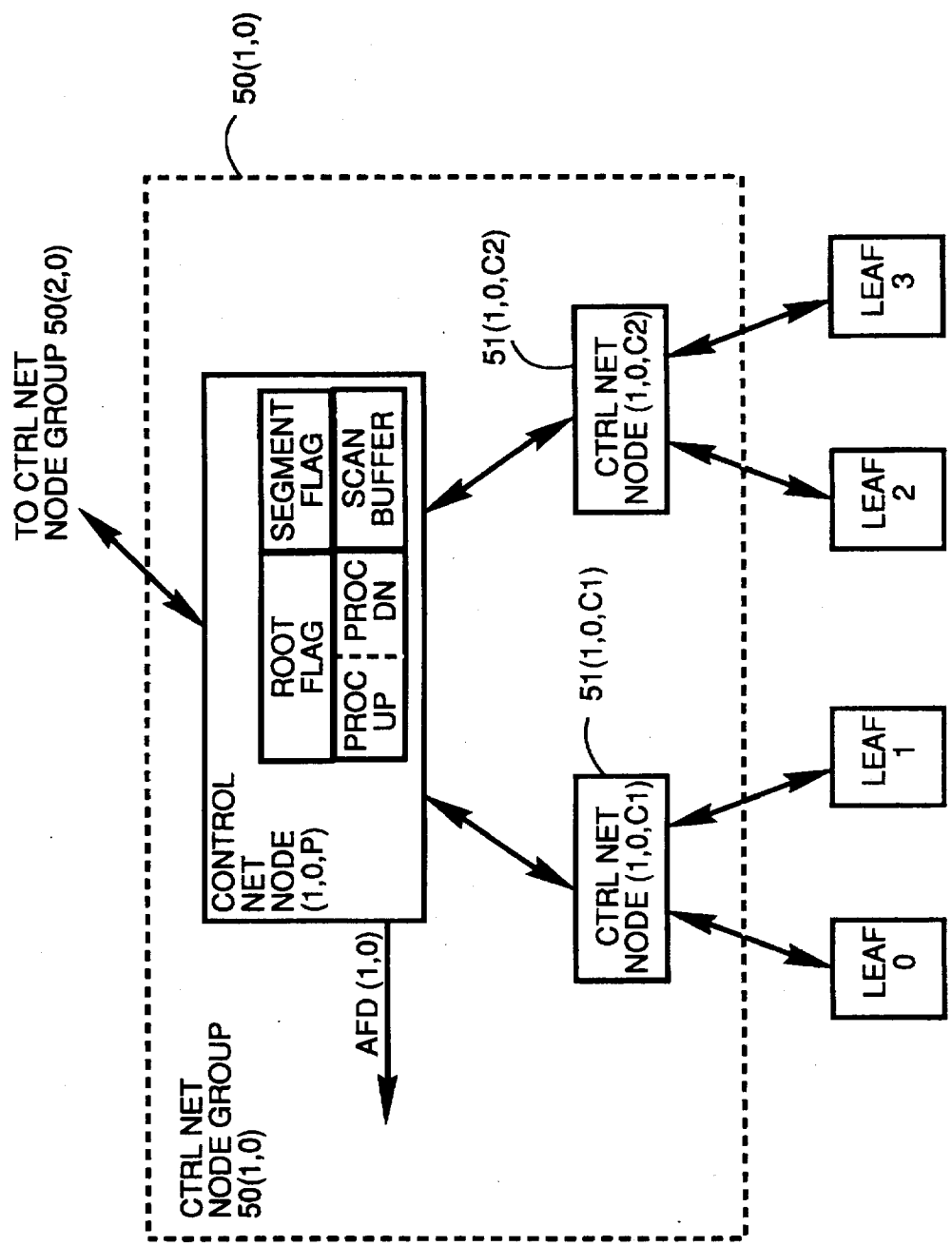

Before proceeding to a detailed description of the system 10 and its various components, it would be helpful to generally describe the structures of the control network 14 and data router 15. The data router 15 and control network 14 both transfer information in the form of message packets, which will be described in detail below in connection with FIGS. 4 and 7, respectively. FIGS. 2 and 3 depict the general structure of the data router 15 and FIGS. 5 and 6 depict the general structure of the control network 14.

With reference to FIG. 2, the data router 15 is generally tree-structured, having a plurality of data router node groups 20(i,j) ("i" and "j" are integers) organized in a plurality of levels each identified by the index "i" in reference numeral 20(i,j). A data router node group 20(i,j) at each level "i" is connected to a selected number of data router node groups 20(i−1,j) in the next lower level "i−1" to form a tree. As will be described in detail below, the data router node groups 20(i,j) perform message switching operations to transfer data, in the form of data router message packets, among the processing elements 11, scalar processors 12 and input/output processors 13, which are collectively identified as leaves 21(0) through 21(N) (generally identified by reference numeral 21). Each data router node group 20(1,j) in the lowest level is connected to one or more leaves 21. In the reference numeral 20(i,j), the index (j) uniquely identifies each of the data router node groups 20(i,j) at each level "i."

In the data router 15 represented in FIG. 2, the data router node group 20(M,0) at the highest level "M" is termed the "physical root" of the tree. At each level "i", each data router node group 20(i,j) is termed the "parent" of data router node groups 20(i−1,j) connected thereto, and each data router node group 20(i−1,j) is termed a "child" of the data router node group 20(i,j) to which it is connected. It will be appreciated that the data router node group 20(i,j) will also be a child of the data router node group 20(i+1,j) connected thereto. In one particular embodiment, each data router node group 20(i,j) in a particular level "i" is connected to four child data router node groups 20(i−1,j); in that embodiment, the "fan-out" of the tree, that is, the number of children connected to each parent, is four. It will be appreciated from the following that the fan-out need not be constant, but may vary from level to level and also among data router node groups 20(i,j) within the same level.

The structure of the data router 15 is further termed a "fat-tree", and will be particularly described in connection with FIG. 3. With reference to FIG. 3, at least some of the data router node groups 20(i,j) includes at least one, and typically two or more data router nodes 22(i,j,k), wherein "k" is an integer that uniquely identifies each data router node within a data router node group 20(i,j). Each data router node 22(i,j,k) in a data router node group 20(i,j) is connected to a plurality of data router nodes 22(i+1,j,k) in level "i+1," with the connections being established so that the data router nodes 22(i,j,k) in each data router node group 20(i,j) are connected to different ones of the data router nodes 22(i+1,j,k) in the data router node group 20(i,j) in level "i+1." For example, in data router node group 20(1,0), data router node 22(1,0,0) is connected to data router nodes 22(2,0,0) and 22(2,0,1) of data router node group 20(2,0), and data router node 22(1,0,1) is connected to data router nodes 22(2,0,2) and 22(2,0,3) of data router node group 20(2,0).

In addition, each data router node 22(i,j,k) in a parent data router node group 20(i,j) is connected to one data router node 22(i−1,j,k) in that parent's child data router node groups 20(i−1,j). Accordingly, as shown in FIG. 3, data router node (2,0,0) in data router node group 20(2,1) is connected to one data router node 2(1,j,0), where "j" equals 0, 1, 2 and 3, in each of the data router node groups 20(1,0) through 21(1,3).

It will be appreciated that the collection of data router nodes 22(i,j,k) from each leaf 21 to and including the data router nodes 22(m,0,k) in the root data router node group 20(M,0) essentially forms an inverted tree. Each leaf 21 effectively comprises the root of one inverted tree and the data router nodes 22(M,0,k) of the root data router node group 20(M,0) form all of the leaves of all of the inverted trees defined by the collection of leaves 21. The number of data router nodes 22(i,j,k) in each data router node group 20(i,j) at a particular level "i" in the tree defining data router 15 will be determined by the fan-out at each level from level "1" to level "i" in the inverted tree. The fan-out at a particular level "i" is the number of data router nodes 22(i+1,j,k) at level "i+1" to which each data router node 22(i,j,k) at level "i" is connected. Thus, for example, since data router node 22(1,0,0) of data router node group 20(1,0) in level "1" is connected to two data router nodes 22(2,0,0) and 22(2,0,1) of data router node groups 20(2,0) in level "2," the fan-out from data router node 22(1,0,0) is two. In one particular embodiment, the fan-out from data router nodes 22(i,j,k) at a particular level "i" is the same for the entire level, but it may differ from level to level as described below.

As noted above, the data router 15 transfers message packets among the processing elements 11, scalar processors 12 and input/output processors 13, all of which are represented by leaves 21. Each connection shown in FIG. 3 between a leaf 21 and a data router node 22(1,j,k) of level 1, which is represented by a line therebetween, actually represents two unidirectional data paths, one for transferring a message packet in each direction. Thus, for example, the connection between leaf 21(0) and data router node 22(1,0,0) of data router node group 20(1,0) represents two data paths. One data path is used by the leaf 21(0) to transmit a message packet to the data router node 22(1,0,0) for delivery to another leaf 21(x). The other data path is used by the data router node 22(1,0,0) to deliver message packets originating at other leaves 21 destined for the leaf 21(0).

Similarly, each connection between a data router node 22(i,j,k) of a level "i" and a data router node 22(i+1,j,k) of a level "i+1," which is also represented in FIG. 3 by a line, represents two unidirectional data paths, one for transferring a message packet in each direction. Thus, for example, the connection between data router node 22(1,0,0) of data router node group 20(1,0) and data router node 22(2,0,0) represents two data paths, one used to transfer message packets from data router node 22(1,0,0) to data router node 22(2,0,0) and the other to transfer message packets in the opposite direction, that is, from data router node 22(2,0,0) to data router node 22(1,0,0).

Transfer of a message packet from one leaf 21(x) to another leaf 21(y) through the data router 15 message transfer proceeds in two general operations. First, the data router nodes 22(i,j,k) transfer the message packet first "up the tree," that is, to data router nodes in successively higher levels, until it reaches a selected maximum level determined in part by the separation between the source and destination leaves. After a message packet has reached the selected maximum level, the transfer continues "down the tree", during which the data router nodes 22(i,j,k) transfer the message packet to data router nodes at successively lower levels until it is delivered to the destination leaf 21(y). As will be clear from the detailed description of the structure and operation of a data router node 22(i,j,k) in FIG. 45 through FIG. 62 below, the data router 15 can transfer a plurality of messages concurrently, any of the data router nodes 22(i,j,k) can direct messages up the tree and other messages down the tree at the same time.

Before proceeding further, it may be helpful to describe the structure of a message packet transferred over the data router 15. With reference to FIG. 4, a data router message packet 30 includes three general portions, including a message address portion 31, a message data portion 32, and a checksum portion 33, each comprising one or more "flits." In one embodiment, each flit comprises four bits, which are transferred in parallel over a data router connection, that is, between a leaf 21 and a data router node 22(i,j,k) or between two data router nodes 22(i,j,k).

The message data portion 32 includes several elements, including a length flit 34, a tag flit 35 and one or more data lets 36(0) through 36(N) (generally identified by reference numeral 36). The data flits 36 generally contain the actual message data being transferred over the data router 15, which may vary from packet to packet. The tag flit 35 contains control information which may be used by the destination leaf, identified herein by reference numeral 22(y), in processing the data. The contents of the length flit 34 are identify the number of flits in the message data portion 32, and may vary depending on the amount of data being transferred in a particular packet. In one particular embodiment, the contents of length flit 34 identify the number of thirty-two bit words in the data flits 36 of the message packet. In that embodiment, the number of data flits 36 in the message packet is eight times the value in the length flit 34.

The checksum portion 33 contains a value which is used in detecting errors in packet transmission over the data router 15.

The data router 15 uses the contents of the message address portion 31 to determine the path to be traversed by the message packet 30 from the source leaf to the destination leaf. The message address portion 31 includes a header 40, which identifies the selected maximum level to which the message packet is to be transferred when going up the tree, and a down path identification portion 41 which identifies the path down the tree to the destination leaf 21(y) when going down the tree. When directing a message packet up the tree, a data router node 22(i,j,k) at level "i," randomly selects one of the data router nodes 22(i+1,j,k) connected thereto in level "i+1" in data router node group 20(i+1,j) to receive the message packet. Other than specifying the selected maximum height for the message packet, the packet does not otherwise specify the particular path it is to take up the tree.

The down path identification portion 41 of message packet 30 defines the path the packet is to take down the tree from the data router node group 20(i,j) at the selected maximum level to the destination leaf 21(y). The down path identification portion includes one or more down path identifier fields 42(1) through 42(M) (generally identified by reference numeral 42). The successive down path identifier fields 42, beginning with field 42(M), are used by the data router nodes 22(i,j,k) at successively lower levels as they direct the packet downwardly in the tree.

The down path identifier field 42(i) for level "i" identifies the child data router node group 20(i−1,j) to which the parent data router node group 20(i,j) that receives the packet at level "i" is to direct the message packet 30. It will be appreciated that the down path identifer fields 42 need not specifically identify one of the data router nodes 22(i−1,j,k) in the data router node group 20(i,j) at each level to which the message packet is to be directed, since the path down the tree is effectively a traversal of the inverted tree of which the destination leaf 21(y) is the root.

In one embodiment, in which each parent data router node group 20(i,j) is connected to four child data router node groups 20(i−1,j) or four leaves 21, each down path identifier field 42 comprises two bits that are binary encoded to identify one of the four children to which the message is to be directed. As indicated by FIG. 4, two fields 42 are packed into a single four-bit flit in the message packet 30. Since one down path identifier field 42 is used to at each level (i) in the downward traversal, the number of down path identifier fields 42 required to define the downward path corresponds to the selected maximum level in the path up the tree, which, in turn, corresponds to the contents of header 40. During the downward traversal mode, the data router nodes 22(i,j,k) through which a message packet 30 passes decrement the contents of the header 40 and, after both down path identifier fields 42 contained in a flit have been used, discard the flit. Thus, the length and content of a message packet 30 may change as it is being passed down the tree.

It will be appreciated that the addressing arrangement provided by the header 40 and down path identification portion 41 can be viewed as follows. The selected maximum height in header 40 effectively identifies the data router node group 20(i,j) which is the root of a sub-tree, preferably the smallest sub-tree, of the data router 15 that contains both the source leaf 21(x) and the destination leaf 21(y). On the other hand, the down path identification portion 41 details the exact path from that root to the destination leaf 21(y).

The provision of increasing numbers of data router nodes 22(i,j,k) in data router node groups 20(i,j) at higher levels in the data router 15, thereby resulting in a "fat-tree" design, provides several advantages. In a massively parallel computer SIMD system, processing elements 11 typically transfer messages during a message transfer operation, initiated by commands from the scalar processors 12. During a message transfer operation, a large number of processing elements 11 may transfer messages concurrently. If the data router 15 did not have increasing numbers of data router nodes 22(i,j,k) at higher levels to which the message packets 30 can be directed when going up the tree, the bandwidth of the data router 15, that is, the rate at which it can transfer message packets 30, would decrease at higher levels.

Since increasing numbers of data router nodes 22(i,j,k) are provided at higher levels in the "fat-tree" design, the reduction in bandwidth at higher levels can be minimized or controlled. As noted above, the fan-out of data router node groups 20(i,j), that is, the number of data router nodes 22(i+1,j,k) at level "i+1" connected to each data router node 22(i,j,k) at level "i" can vary from level to level, and can be selected to maintain a desired minimum bandwidth between the respective levels "i" and "i+1." Alternatively, the fan-outs from each level to the next higher level can be selected so that the entire data router 15 has a selected minimum bandwidth.

Further, as noted above, each data router node 22(i,j,k) randomly selects the data router node 22(i+1,j,k) in the next higher level to which it directs a message packet 30 in the path up the tree. Accordingly, the message packets are randomly distributed through the higher levels of the tree, which minimizes the likelihood of bottlenecks and maximizes the bandwidth in the higher levels.

As shown in FIGS. 2 and 3, each data router node group 20(i,j), and in particular each data router node 22(i,j,k), in the data router 15 receives an AFD(i,j) all-fall-down (i,j) signal. The AFD(i,j) all-fall-down (i,j) signal is provided by the control network 14, as will be described below in connection with FIGS. 5 and 6, under control of the scalar processors 12 to initiate a context switch operation. The AFD(i,j) all-fall-down (i,j) signal, when asserted, enables the data router 15 to enter an all-fall-down mode, in which it quickly empties itself of message packets. In response to the AFD(i,j) all-fall-down (i,j) signal, the data router 15 directs all message packets 30 directly down the tree to the leaves 21, where they are stored until the context in which the message packets were generated is restored. At that point, the leaves 21 which receive such messages can transmit them over the data router 15, which will deliver them to the intended destinations.

In contrast to normal operation described above, in which the contents of the header 40 are decremented and flits containing down path identifier fields 42 discarded as the message packet 30 is directed down the tree, when the AFD(i,j) all-fall-down (i,j) signal is asserted the contents of the header 40 are not decremented and no changes are made to the flits containing the down path identifier fields 42. When the context is restored and the leaves 21 return the message packets to the data router 15, they will be delivered to the proper destination leaves. This can be seen from the following explanation.

In the following explanation, reference numerals 21(x) and 21(y) will refer to the original source and destination leaves, respectively, for a message packet 30 and reference numeral 21(x') will refer to the intermediate storage leaf which receives and stores the message packet 30 while the context in which the data router message packet 30 was generated is being switched out. First, for those message packets that are being transferred up the tree or that have reached the selected maximum height when the AFD(i,j) all-fall-down (i,j) signal is asserted, the contents of the header 40 and down path identification portion 41 are the same as when they were originally transmitted by the source leaf 21(x). Since the intermediate storage leaf 21(x') receives the message packet 30 it must be part of a sub-tree of the data router 15 that includes both the source leaf 21(x) and the destination leaf 21(y). Further, the sub-tree has the same root data router node group 20(i,j) that the message packet 30 would have reached had the AFD(i,j) all-fall-down (i,j) signal not been asserted. Accordingly, when the intermediate storage leaf 21(x') transmits the message packet over the data router 15, the packet will go up the tree and reach the same data router node group 20(i,j) that it would have reached if the AFD(i,j) all-fall-down (i,j) signal had not been asserted, and from there will follow the same downward path, defined by the down path identification portion 41, that it would have taken.

On the other hand, if a message packet is being transferred down the tree when the AFD(i,j) all-fall-down (i,j) signal is asserted, prior to the signal's assertion the contents of the header field 40 are decremented as the message packet is passed from level to level. Accordingly, it will be appreciated that, when the message packet 30 is transmitted by the intermediate storage leaf 21(x'), in its path up the tree it will go only to a data router node group 20(i,j) at the level indicated in the header field 40, which, in turn, corresponds to the data router node group 20(i,j) which controlled the direction of transfer of the message packet 30 when the AFD(i,j) all-fall-down (i,j) signal signal was asserted. It will be appreciated that the data router node group 20(i,j) that the message packet 30 reaches may not be the root of a sub-tree that includes the source leaf 21(x). However, it will be the root of a sub-tree that includes both the intermediate storage leaf 21(x'), since the message packet 30 was transferred from that data router node group 20(i,j) to the intermediate storage leaf 21(x'), and the destination leaf 21(y), since the message packet 30 could have been transferred from that data router node group 20(i,j) to the destination leaf had the AFD all-fall-down (i,j) signal not been asserted.

As will be described in further detail below, each leaf 21 maintains a message counter that it increments when it tranmsits a message packet over the data router 15, and that it decrements when it receives a message packet from the data router 15. As noted above, the control network 14 performs selected arithmetic operations, whose results can be provided to the processing elements 11 and scalar processors 12. By enabling the control network 14 to perform selected arithmetic operations using the values of the message counters, the results can identify when all of the message packets that were transmitted over the data router 15 have been received by the leaves 21, thereby indicating that the data router 15 is empty. This can be used to indicate that a message transfer operation has been completed, or that the router 15 is empty as a result of the assertion AFD(i,j) all-fall-down (i,j) signal so that a context switch can occur.

2. Control Network 14

As noted above, the control network 14 transfers program commands from the scalar processors 12 to the processing elements 11 and returns status information to the scalar processors 12, and in addition performs selected types of arithmetic operations. The control network 14 will be generally described in connection with block diagrams depicted in FIGS. 5 and 6, and with FIG. 7, which depicts the structure of a control network message packet.

With reference first to FIGS. 5 and 6, the control network 14, like the data router 15, is generally tree-structured, having a plurality of control network node groups 50(i,j) ("i" and "j" are integers) organized in a plurality of levels each identified by the index "i" in reference numeral 50(i,j). In the reference numeral 50(i,j), the index (j) distinguishes the diverse control network node group 50(i,j) at each level "i." The tree structure of the control network 14 is generally similar to that of the data router 15. In particular, each control network node group 50(i,j) corresponds to a data router node group 20(i,j) having the same values for indices "i" and "j", and connections among control network node groups 50(i,j) follow the same pattern as connections among data router node groups 20(i,j). Each control network node group 50(1,j) in the lowest level is connected to one or more leaves 21, in the same pattern as the connections in the data router 15.

Similar terminology will be used in describing the control network 14 as was used in describing the data router 15 above. In particular, in the control network 15 represented in FIG. 2, the control network node group 50(M,0) at the highest level "M" is termed the "physical root" of the tree. At each level "i", each control network node group 50(i,j) is termed the "parent" of control network node group 50(i−1,j) connected thereto, and each control network node group 50(i−1,j) is termed a "child" of the control network node group 50(i,j) to which it is connected. The control network node group 50(i,j) will also be a child of the control network node group 50(i+1,j) connected thereto. In one particular embodiment, each control network node group 50(i,j) in a particular level "i" is connected to four child control network node groups 50(i−1,j), in which case the "fan-out" of the tree, that is, the number of children connected to each parent, is four. As indicated above in connection with the data router 15, the fan-out need not be constant, but may vary from level to level and also among control network node groups 50(i,j) within the same level.

The structure of a control network node group 50(i,j), which is shown on FIG. 6, differs from the structure of a data router node group 20(i,j). With reference to FIG. 6, a control network node group 50(i,j) includes three control network nodes 51(i,j,l), where "l" can have the values "P," "$C_1$" or "$C_2$." Within a control network node group 50(i,j), the control network nodes are connected so that control network node 51(i,j,P) is parent of child control network nodes 51(i,j,$C_1$) and 51(i,j,$C_2$). It will be appreciated that parent control network node 51(i,j,P) of control network node group 50(i,j) is itself a child of a control network node 51(i+1,j,$C_1$) or control network node 51(i+1,j,$C_2$) of a control network node group 50(i,j) of the next higher level "i+1." Similarly, each child control network node 51(i,j,C) is a parent of either a leaf 21 or a control network node 51(i−1,j,P) of the next lower level "i−1."

It should be noted that, in FIGS. 5 and 6, the indices "j" for control network nodes 51(i,j,l) in each level increase from right to left. In the following, for each parent control network node 51(i+1,j,l), the child control network node 51(i,j,l) connected thereto with the lower index "j" will be termed the "left" child, and the control network node 51(i,j,l) with the higher index "j" will be termed the "right" child.

The control network node group 50(i,j) thus contains two sub-levels of control network nodes 51(i,j,l), one defined by parent control network node 51(i,j,P), and the other defined by child control network nodes 51(i,j,$C_1$) and 51(i,j,$C_2$). This enables the control network node groups 50(i,j) to have the same connection pattern within the control network 14 as the corresponding data router node groups 20(i,j) within the data router 15, while at the same time providing a two-child/ one-parent connection for the control network nodes 51(i,j,l) which simplifies performance of the arithmetic operations as described below.

As in the data router 15, each connection between control network nodes 51(i,j,l) depicted in FIGS. 5 and 6 represents two unidirectional data paths, which transfer message packets in opposite directions between the respective nodes.

As noted above, the scalar processors 12 use the control network 14 to broadcast commands to the processing elements 11. In this operation, a scalar processor 12 transmits a message packet, which will be described below in detail in connection with FIG. 7, to the control network node 51(1, j,C) to which it is connected. The control network nodes transfer the message packet up the tree to the root, which then transmits the message packet down the tree to its children. As each control network node receives such a downwardly-going message packet, it transmits it to all of its children until the packet is delivered to the leaves 21. The control network 14 effectively broadcasts the message packet, and thus the command, to all of the processing elements 11. It will be appreciated that the message packet will also be received at leaves 21 comprising scalar processors 12 and input/output processors 13, but these processors can be configured to ignore the packet.

As also noted above, the system 10 can be partitioned so as to effectively constitute multiple independently-operable systems, each including at least one scalar processor 12 and one or more processing elements 11. In partitioning the system 10, the scalar processor 12 establishes a logical root in a control network node 51(i,j,l) in the control network 14 which differs from the control network node 51(M,0,P) which constitutes the physical root. The logical root effectively comprises the root of a sub-tree whose leaves include the scalar processor 12 and one or more other leaves 21. If a control network node 51(i,j,l) becomes a logical root, while it is a logical root its parent node 51(i+1,j,l) in the control network 14 does not not transmit downwardly-going message packets thereto.

Each control network node 51(i,j,l) includes a root flag 1407, which is described in detail in connection with FIG. 63 below. When the root flag 1407 is set, the control network node 51(i,j,l) is a root of the control network 15. If the control network node 51(i,j,l) is to be a physical root, the root flag 1407 may be set by appropriate conditioning of an input signal that controls the control network node. To establish a control network node 51(i,j,l) as a logical root, the scalar processor 12 transmits a control network message packet therefor up the tree comprising control network 14. The message packet includes a height value identifying the level and sub-level at which the logical root is to be established. Each control network node 51(i,j,l) which receives the message packet determines whether the height value corresponds to its level and sub-level, and if not passes the message packet to the next control network node 51(i,j,l) up the tree. When a control network node 51(i,j,l) determines that the height value in the message packet corresponds to its level and sub-level, it sets its root flag 1407 and begins operating as a logical root as described above. In connection with that, the control network node 51(i,j,l) notifies its parent control network node 51(i,j,l) that it is a logical root.

It will be appreciated that a control network node 51(i,j,l) operating as a logical root of a partition may receive a message packet that indicates that a control network node 51(i+x,j,m) at a higher level or sub-level is to operate as a logical root. A scalar processor 11 may issue such a message to, for example, increase the number of processing elements 11 or scalar processors 12 in the partition. In that event, the control network node 51(i,j,l) stops operating as a logical root.

To simplify the following description, the term "root node," which may appear with or without the reference numeral 51(i,j,l), will be used to collectively refer to the physical root control network node 51(M,0,P), in situations in which the control network 14 is not partitioned, and to a control network node 51(i,j,l) comprising a logical root in situations in which the control network 14 is partitioned. If the control network 14 is partitioned, the logical root node functions for the other control network nodes 51(i,j,l) in the partition substantially in the same manner as the physical control network node 51(M,0,P) functions for the control network nodes 51(i,j,l) in an unpartitioned control network 14. Otherwise stated, the physical root node can be considered as the logical root node of a partition comprising the entire system 10.

As noted above, the control network 14 also performs several types of arithmetic operations in response to control network message packets therefor, including scan and reduce operations. Scan operations are generally described in Guy E. Blelloch, *Scan Primitive and Parallel Vector Models*, (Ph.D. Dissertation, Massachusetts Institute of Technology: 1988). In a scan operation initiated by processing elements 11 that are logically arranged in a particular ordering, such as with increasing indices "i" in reference numeral 11(i) (with indices increasing, for example, from right to left as shown in FIG. 6), the scan operation for a particular arithmetic operator "*" on items of data "D(i)" maintained by the processing element 11(i) produces at each of the successive processing elements 11 in the ordering the result "R(i)":

$$R(i)=D(0)*D(1)*D(2)*\ldots*D(i-1), \text{ with } R(0)=0 \quad \text{[Eqn. 1]}$$

In the scan operation, the arithmetic operator may constitute a number of types of operators, including, for example, signed or unsigned addition, OR, XOR (exclusive-OR) and MAX, the latter referencing determination of a maximum of a set of values.

To accommodate scan operations, each processing element 11 includes an up data processor 1421, a down data processor 1652, and a scan buffer 1410, all of which will be described below in connection with FIGS. 63 through 77. To initiate a scan operation, the processing elements 11 transfer control network message packets therefor over the control network 14. The control network message packet provided by each processing element 11(i) includes that processing element's data item D(i).

With reference to FIG. 6, each control network node 51(1,j,$C_1$) and 51(1,j,$C_2$), on receiving a message packet from the processing elements connected thereto, loads the data from the left processing element, that is, the processing element 11(i) with the index "i" being zero or an even number, into its scan buffer 1410. In addition, the up data processor 1421 of each control network node 51(1,j,C) performs the arithmetic operation on the data to generate a result that corresponds to the combination of the data received from the two processing elements 11 connected thereto, combined according to the arithmetic operator being used in the scan operation. The control network node 51(i,j,C) uses the value generated by the up data processor 1421 as data in a message packet, which it transmits to its parent.

Each control network node 51(i,j,l), except for the root node, on receiving message packets from both its left and right children, performs the same series of operations. In particular, each control network node 5 l(i,j,l) at each sub-level up to the root node:

(a) stores in its scan buffer 1410 the data in the control network message packet that it receives from its left child control network node 51(i−1,j,l); it will be appreciated that this value corresponds to the combination of the data from the processing elements in the sub-tree of the control network 14 whose root is the left child control network node 51(i−1,j,l), combined according to the arithmetic operator being used in the scan operation, and (b) performs, using its up data processor 1421 the operation, defined by the arithmetic operator being used in the scan operation, in connection with data from both of its children to generate a value which it transmits in a message to its parent. It will be appreciated that this value corresponds to the combination of the data from the processing elements in both sub-trees of the control network 14 whose roots are both child control network network nodes 51(i−1,j,l) connected thereto.

Thus, at the point at which all control network message packets have propagated up the control network tree, the scan buffer 1410 at each control network node 51(i,j,l), other than the root node, contains a value corresponding to the data provided by the processing elements 11 in the sub-tree whose root is the node's left child, processed according to the scan operaiton's arithmetic operator.

The root node also receives message packets from both of its children containing intermediate results for a scan operation, it transmits message packets down the tree. The root node receives, from each child, a value corresponding to the data provided by the processing elements 11 in the sub-tree whose root is the respective child, processed according to the scan operation's arithmetic operator. It will be appreciated that the value received from the left child control network node corresponds to the combination of the data from the processing elements in the sub-tree of the control network 14 whose root is that left child control network node, and the value received from the right control network node corresponds to the combination of the data from the processing elements in the sub-tree whose root is the right control network node, in both cases the data being combined according to the scan operation's arithmetic operator.

To its left child, the root node transmits a message packet whose data has the value zero. To its right child, the root node transmits a packet whose data has the value received from the left child. As noted above, that value corresponds to the combination of the data from the processing elements in the sub-tree of the control network 14 whose root is that left child control network node, combined according to the scan operation's arithmetic operator.

When each control network node 51(i,j,l) below the root node receives a control network message packet from its parent, it (a) uses the down data processor 1652 to generate a value corresponding to the value of the data received from the parent combined with the intermediate result stored in the nodes' scan buffer 1410 according to the arithmetic operator used in the particular scan operation, which it transmits in a control network message packet to its right child; it will be appreciated that this value corresponds to the combination of the data from the processing elements 11 in all sub-trees of the control network 14 up to the one whose root is the left child of the control network node, combined according to the arithmetic operator being used in the scan operation, and (b) transmits a control network message packet to its left child whose data has the same value as that received from the parent; it will be appreciated that this value corresponds to the combination of the data from the processing elements in all sub-trees of the control network 14 up to the one whose root is the left child of the parent of the control network node, combined according to the arithmetic operator being used in the scan operation.

Thus, the control network message packets transmitted by the control network nodes 51(i,j,l) down the tree will propagate the zero value down the left side to the left-most processing element 11(0). The next processing element 11(1) will receive the combination, as defined by the arithmetic operator, of the zero value propagated from the root node and the value stored in the scan buffer 1410 of the control network node 51(1,0,$C_1$), which corresponds to the value of the data transmitted by the processing element 11(0).

The next processing element 11(2) will receive, as the left child connected to the control network node 51(1,0,$C_2$) the value stored in the scan buffer 1410 of the control network node 51(1,0,P), which, as noted above, corresponds to the combination, as defined by the scan operation's arithmetic operator, of the data from the processing elements 11(0) and 11(1). The processing elment 11(3) will receive, as the right child, the combination of that value and the value in the scan buffer 1410 of control network node 51(1,0,$C_2$), which, as noted above, corresponds to the data provided by the processing element 11(2). Accordingly, the processing element 11(3) will receive the combination, as defined by the scan operation's arithmetic operator, of the data from processing elements 11(0), 11(1) and 11(2).

It will be appreciated that the control network nodes 51 will combine the data provided to the successive processing elements 11 in the sub-tree of the root node's left child similarly. Accordingly, each processing element 11(i) in that sub-tree will receives a value corresponding to data from processing elements 11(i−1) through 11(0) combined according to the arithmetic operator of the particular scan operation.

The control network nodes 51 in the sub-tree of the root node's right child also combine the data in the control network message packet provided by their respective parents with the data in their respective scan buffer 1410 in a similar manner. As noted above, the root node transmits to its right child a control network message packet including a value corresponding to the combination of the data provided by the processing elements 11 in the sub-tree defined by the root node's left child, combined according to the scan operation's arithmetic operator. It will be appreciated that the control network message packets transmitted by the control network nodes 51(i,j,l) in that sub-tree will propagate that value down the left side of the sub-tree to the left-most processing element 11(i), so that that processing element 11(i) also receives a value corresponding to data from processing elements 11(i−1) through 11(0) combined according to the arithmetic operator of the particular scan operation. Since the control network nodes 51(i,j,l) in that sub-tree operate in a manner similar to those in the sub-tree defined by the root node's left child, each processing element 11(i) will receive a value corresponding to data from processing elements 11(i−1) through 11(0) combined according to the arithmetic operator of the particular scan operation.

The control network 14 can also perform a backward scan operation, in which the scan direction is from right to left, that is, toward processing elements 11(i) of lower indices. In that case, each processing element 11(i) will receive a value corresponding to data from processing elements 11(i+1) through 11(N) (where "N" is the highest index) combined according to the arithmetic operator of the particular scan operation. In that operation, each control network node 51(i,j,l) interchanges control network message packets that it receives at its input terminals from its children, and also the control network message packet that it transmits through the outputs to its children, and otherwise operates similar to that above. This effectively interchanges the left and right children at each level, so that if the control network nodes 51 otherwise operate as described above, the scan direction will be reversed.

Figure 72:
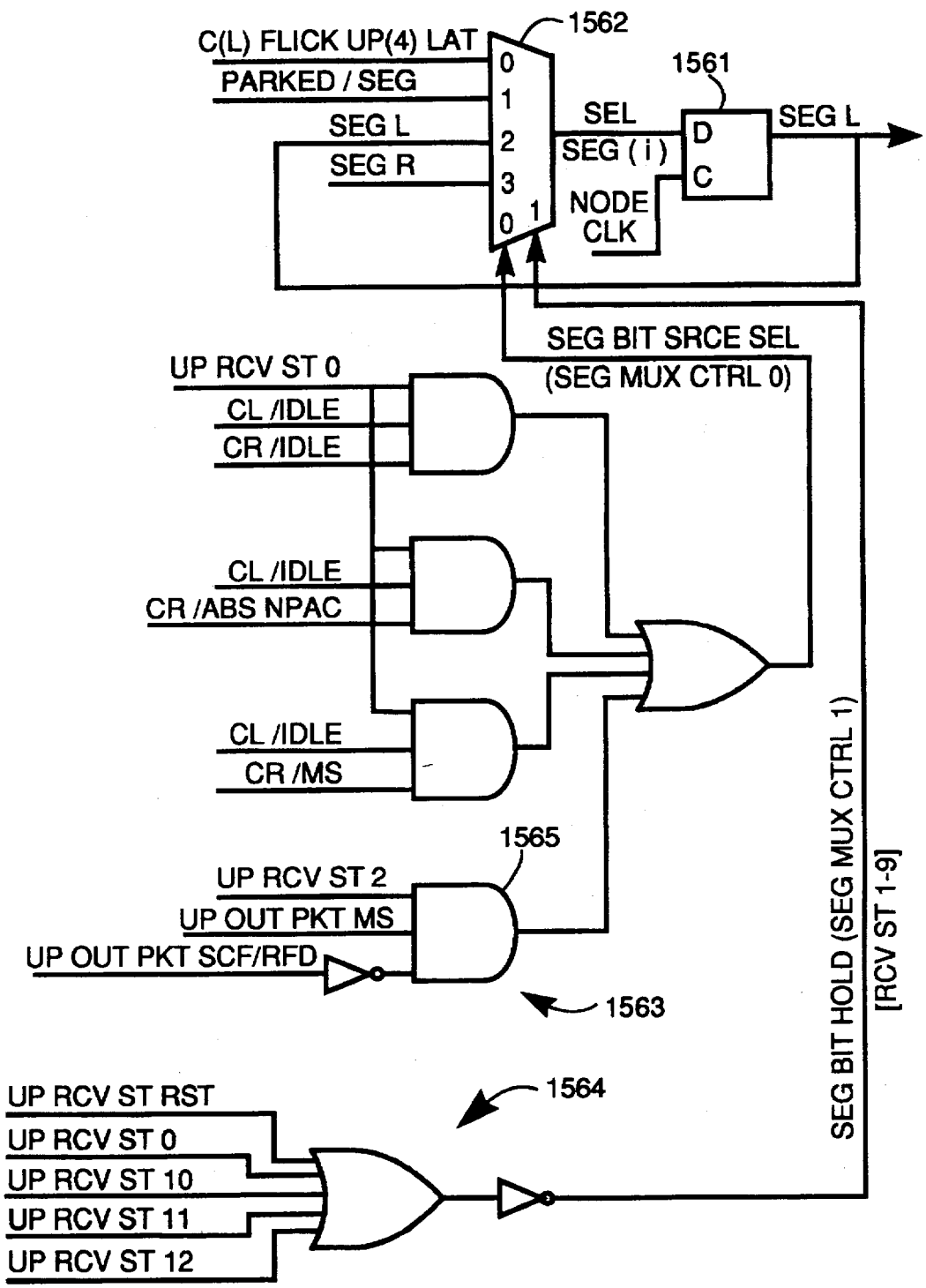

In addition, the control network 14 can perform a segmented scan operation, in which the processing elements 11 of a partition may be divided into two or more segments. In each case, the first processing element 11(i) in the first segment is the first processing element 11(i) in the partition. The first processing element 11(i) in each succeeding segment transmits a control network message packet in which a segment bit is set. Each control network node 51(i,j,l) also includes a segment flag 1561 (FIG. 72). Each control network node 51(i,j,l) operates as described above, except that in transmitting control network message packets up the control network tree:

(a) if it receives a control network message packet from its right child in which the segment bit is set, it transmits in a control network message packet to its parent data corresponding only to the data in the control network message packet received from the right child; and (b) if it receives a control network message packet from either child in which the segment bit is set, it sets its segment flag 1561, and sets the segment bit in the control network message packet it that transmits to its parent.

In either case, the control network node 51 buffers the data received from the left child control network node in its scan buffer 1410, in the same manner as in an unsegmented scan operation as described above.

In connection with control network message packets that are transmitted down the control network tree, each control network node 51, if its segment flag 1561 is set, transmits to its right child a control network message packet whose data corresponds to the value stored in the scan buffer 1410. The control network node 51 transmits to it left child a control network message packet whose data corresponds to the data from its parent, in the same manner as in an unsegmented scan operation as described above.

It will be appreciated that the first processing element 11(i) which is the first in each segment, other than the processing element 11(i) comprising the first in the partition, will not receive the value zero, as required in Eqn. 1 above. However, since those processing elements 11, in initiating the scan operation, transmitted control network message packets whose segment bits were set, they are aware that they are the first processing elements 11(i) in their respective segments, and can interpret the value received as zero.

In a reduce operation for a particular arithmetic operator "*" on items of data "D(i)" maintained by the processing elements 11(i) produces at all of the processing elements 11 the same result "R":

$$R=D(0)*D(1)*D(2)* \ldots *D(i) \qquad \text{[Eqn. 2]}$$

In a reduce operation, the arithmetic operator may constitute a number of types of operators, including, for example, signed or unsigned addition, OR, XOR and determination of a maximum.

In performing a reduce operation, the processing elements 11 transfer message packets therefor over the control network 14. The message packet provided by each processing element 11(i) includes that processing element's data item D(i). With reference to FIG. 6, each control network node 51(1,j,C), on receiving a message packet from the processing elements connected thereto, performs the operation specified by the mathematical operator to generate an intermediate result, which it transmits in a message packet to its parent node 51(1,j,P).

This operation is repeated at successive parent nodes at higher levels in the tree comprising control network 14 until the message packets reach the root node. When the root node receives message packets from both of its children, it performs the operation specified by the mathematical operator on the data from its two children to generate a result value. The root node generates message packets whose data is the result value and transmits them to both of its children. Each of the control network nodes 51(i,j,l) that receives such a message packet repeats it to both of its children, until they reach the processing elements 11, thereby broadcasting the result to all of the processing elements 11.

As noted above, the leaves 21(i) may comprise a processing element 11(i), a scalar processor 12(i) or an input/output processor 13(i). In the above description, only the processing elements 11(i) have been indicated as engaging in scan operations and reduce operations. It will be appreciated, however, that scalar processors 12(i) and input/output processors 13(i) may, along with processing elements 11(i), engage in such operations. Alternatively, the scalar processors 12(i) and input/output processors 13(i) may abstain from the scan and reduce operations. They may accomplish this either by transmitting control network message packets which contain data having a value of zero, or by transmitting a special type of control network message packet, described below as an abstain type, which the control network nodes 51(i,j,l) may treat as containing data having the value zero.

As noted above, each processing element 11 maintains a message counter which counts data router message packets it transmits and receives over the data router 15. The processing element 11 increments the message counter when it transmits a data router message packet over the data router 15 and decrements the counter when it receives a data router message packet over the data router 15 during a message transfer operation. It will be appreciated that during a message transfer operation some processing elements 11 may transmit more data router message packets than they receive, and thus at the end of the message transfer operation the message counter will have a positive value. On the other hand, some processing elements 11 may receive more data router message packets than they transmit during the message transfer operation, in which case the message counter will have a negative value at the end of the messae transfer operation.

The processing elements 11 use the control network 14, in particular enabling a reduce operation, to determine when the data router 15 is empty, that is, when the data router 15 has delivered all data router message packets to processing elements 11. More specifically, each processing element 11, after it transmits all of its data router message packets for the message transfer operation, begins transmitting control network message packets specifying a reduce operation, with signed addition as the arithmetic operator. The data in each control network message packet is the current value of the processing element's message counter. The processing elements 11 iteratively transmit such control network message packets until they receive a control network message packet whose data has the result value of zero. It will be appreciated that, at that point the processing elements 11 have collectively received as many data router message packets as they transmitted during the message transfer operation, and so the data router 15 will be empty of data router message packets.

FIG. 7 depicts the structure of a control network message packet 60 that is transferred over the control network 14. With reference to FIG. 7, the control network message packet 60 has a fixed length of thirteen "flicks." In one embodiment, each flick has five bits, with the first twelve flicks, identified as FLICK 0 through FLICK 11, including four packet information bits (labelled "PKT INFO" in FIG. 7) and one tag bit. The packet information portion of the first twelve flicks comprise a packet header portion 61 and a packet data portion 62. The thirteenth flick, namely FLICK 12 identified by reference numeral 63, contains a checksum used in error detection. The checksum is generated across all five bits of the successive flicks in the packet 60. The tag bits contain control information as described below.

The packet header portion 61 includes four fields, including a message type field 64, a packet type field 65, a combine function type field 66 and a pattern field 67(0) and 67(1) (collectively identified by reference numeral 67). The packet data portion 62 includes eight four-bit data nibbles 70(0) through 70(7) (generally identified by reference numeral 70) and a four-bit nibble 71 containing global information.

The message type field 64 identifies the type of message contained in the message packet 60. In one embodiment, a packet 60 can contain one of five different types of messages, including an SS (single source) message, an MS (multiple source) message, an ABS abstain message, an IDLE message and an NPAC nil packet message. When a scalar processor 12 broadcasts a command to the processing elements 11 for processing thereby, it uses a single source message packet to carry the command. In addition, a scalar processor 12 may also use single source message packets to broadcast other types of control information to one or more of the processing elements 11 or input/output processors 13, or to another scalar processor 12.

A single source message packet is passed by each control network node 51(i,j,l) which receives it up the control network tree from node to node until it reaches the root node. The root node transmits the single source message packet down the tree to its children. Each control network node 51(i,j,l), which receives a single source message packet from its parent transmits it down the tree to both its children, effectively broadcasting the packet to all of the processing elements 11 in the partition.

Multiple source messages are used by the processing elements 11 to initiate scan and reduce operations as described above. Idle message packets are transmitted when a leaf 21 or control network node 51(i,j,l) has no other types of message packets to transmit. A leaf 21 transmits abstain message packets to indicate that it is not participating in a scan or reduce operation. If a control network node 51(i,j,l) receives idle or abstain message packets from both of its children, it may transmit a message packet of the same type to its parent. If a control network node 51(i,j,l) receives a multiple source message packet from one of its children and an abstain message packet from its other child, it does not thereafter wait for a multiple source message packet therefrom to use in the arithmetic operation specified in the multiple source message packet that it receives from the one child. Instead, the control network node 51(i,j,l) forwards the multiple source message packet that it receives to its parent, and, if the abstain message packet came from its right child, stores the data from the message packet in its scan buffer 1410.

A message packet of the nil packet type, unlike message packets of other message types, is only one flick in length. In particular, a nil packet message comprises only the message type flick 64, the contents indicating that the message packet is of the nil packet type. A control network node 51(i,j,l) continually transmits messages of the nil packet type to its parent while it [that is, the control network node 51(i,j,l)] is a logical root of a partition, and the parent transmits message packets of the same type to that child. If the parent receives a multiple source message packet from its other child, it forwards it to its parent.

The packet type field 65, combine function type field 66 and a pattern field 67 contain further information about the information in the control network message packet 60.

In one particular embodiment, the processing elements 11 can operate in two operational modes, identified herein as "supervisor" and "user." If the message type field 64 indicates that the control network message packet is a single source message packet, the packet type field 65 can identify a message packet as a broadcast supervisor packet or a broadcast user packet. If the packet type field 65 indicates that the control network message packet is a broadcast supervisor packet, it contains a command for execution by the processing elements 11 in the supervisor mode. On the other hand, if the packet type field indicates that the control network message packet contains a broadcast user packet, it contains a command for execution by the processing elements 11 in the user mode.

In addition, if the message type field 64 indicates that the control network message packet is a single source message packet, the packet type field 65 may indicate that the control network message packet is an interrupt packet. The interrupt packet may be used to initiate operations at particular ones of the processing elements 11. The operations and the particular ones of the processing elements 11 to perform them may be identified in the packet data portion 62.

Further, if the message type field 64 indicates that the control network message packet is a single source message packet, the packet type field 65 may indicate that the control network message packet contains configuration information which enables the establishment or elimination of a logical root at a particular control network node 51(i,j,l). If the packet type field identifies the message packet as containing configuration information, the first two flicks 70(0) and 70(1) of packet data portion 62 contain data specifying the level and sub-level in control network 14 at which the logical root is to be established. The control network node 51(i,j,l) at that level and sub-level which receives the configuration message packet establishes itself as the logical root.

If the message type field 64 identifies the messge packet as a multiple source message packet, the packet type field 65 identifies the operation to be performed as a scan involving data in a single packet or a plurality of packets, or to perform an operation to determine whether the data router 15 is empty. The data to be used is contained in data fields 70(0) through 70(7) (generally identified by reference numeral 70) of the packet data portion 62. If the packet type field 65 identifies a scan operation involving data in a single packet, the scan operation is limited to a data value having a single thirty-two bit word. However, if the packet type field identifies a scan operation involving data in a plurality of successively-transmitted packet, which will be identified as a "multi-word scan," the scan operation involves data values of more than thirty-two bits, which are contained in control network message packets 60 successively transmitted by the processing elements 11. In either case, if the packet type field 65 identifies the operation as a scan operation, the pattern field 67 further identifies it as either a scan forward or scan backward operation or a reduce operation, and combine function type field 66 identifies the particular arithmetic operator to be used in the operation.

As has been described above, control network message packets of the multiple source type may be used, with arithmetic operations, to determine whether the data router 15 is empty, using the contents of message counters maintained by the processing elements 11 as data. Similar control network message packets may also be used to perform other control operations using, for example, bits of the global information field 71. For example, the scalar processors 12 may need to be notified when all of the processing elements 11 have finished executing a particular command before they transmit a subsequent command. In that case, each processing element when it has finished executing a command, may tranmsit a control network message packet 60, of the multiple source type, indicating a reduce operation using the OR operator, with a particular bit in the global information field 71 being set. It will be appreciated that, after all of the processing elements 11 have executed the istruction and transmitted corresponding packets, the root node will as the result of the reduce operation, broadcast control network message packets down the control network tree in which the bit will be set. When the scalar processor 12 receives the resulting control network message packet from the control network node 51(1,j,l) connected thereto, it can determine the condition of the bit and determine therefrom that the command has been executed.

Bits of the global information field 71 may also be used by the processing elements 11. In processing certain commands from the scalar processors 12, the processing elements 11 sometimes may reach a point in processing a command at which they have to verify that all of the processing elements have reached the same point before they proceed. To accomplish that, when each processing element has reached the particular processing point it may transmit a control network message packet as described above, that is, of the multiple source type, indicating a reduce operation using the OR operator, with a particular bit in the global information field 71 being set. When the processing elements 11 receive the resulting control network message packet from their respective control network nodes 51(1,j,l) connected thereto, they can determine therefrom that all of the processing elements 11 have reached the required point in their processing of the command, and continue processing.

The tag bits of the successive flicks in a control network message packet 60 contain various types of control and status information. Several of the tag bits control the flow of control network message packets through the control network 14. Five tag bits comprise scan flow bits, generally identified by reference numerals 72(i) ("i" is an integer from "1" through "5"). The control network nodes 51(i,j,l), processing elements 11 and scalar processors 12, as well as any input/output processors 13 which transmit and receive control network message packets over the control network 14, use the scan flow bits to control the transfer of message packets between directly-connected components in the control network 14.

Two tag bits, including a broadcast user flow bit 73 and a broadcast supervisor flow bit 74 are conditioned by the processing elements 11, scalar processors 12 and those input/output processors 13 which transmit control network message packets over the control network 14, to indicate whether they are able to receive control network message packets containing control information for the supervisor and user modes respectively. Each processing element 11, scalar processor 12 and input/output processor 13, respectively, conditions bits 73 and 74 in any control network message packets that it transmits to indicate whether it can receive single source message packets having packet types, as indicated in packet type field 65, of broadcast supervisor type and broadcast user type, respectively.

Another tag bit that controls the control network 14 is a flush bit 75. When a control network node 51(i,j,l) receives a control network message packet in which the flush bit 75 is set, it clears its scan buffer. This may be used to clear intermediate results of a scan or reduce operation from the control network 14 during a context switch.

A soft error bit 76 is used by a control network node 51(i,j,l) to indicate that it has detected a software error from the contents of a control network message packet 60. For example, if the control network node 51(i,j,l) determines that the contents of the packet type field 65 do not identify one of the established packet types for the message type identified in message type field 65, the node may set the soft error bit 76.

As described above, the control network 14 performs segmented scan operations using data in message packets transmitted by the processing elements 11. A segment bit 77, when set, indicates that the control network message packet 60 contains data for the upper end of a segment. A scan overflow bit 80, when set, indicates that the result of the arithmetic operation is larger than can be accommodated in the data fields 70 of the control network message packet 60. The scan overflow bit 80 may also be used to indicate overflow during a reduce operation. If the scan overflow bit 80 is set, the operation can be repeated in a multi-word operation.

Finally, a control network message packet 60 includes an AFD all-fall-down bit 81. If a control network node 51(i,j,l) receives a control network message packet 60 in which the AFD all-fall-down bit 81 is set, it asserts an ADF(i,j,l) all-fall-down signal. The AFD(i,j,l) all-fall-down (i,j) signal from each parent control network node 51(i,j,P) is connected to the data router nodes 22(i,j,k) of the data router node group 20(i,j) having the same indices "i" and "j."

3. Diagnostic Network 16

As noted above, the diagnostic network 16, under control of a diagnostic processor, facilitates testing of other portions of the system 10 to identify, locate and diagnose defects. In addition, the diagnostic network 16 may be used to establish selected operating conditions in the other portions of the system 10 as described below. The general structure of the diagnostic network 16, and its connection to the other elements of the system 10, will be described in connection with FIGS. 8A through 8C. Messages transferred over the diagnostic network 16 will be described in connection with FIG. 9.

Figure 8A:
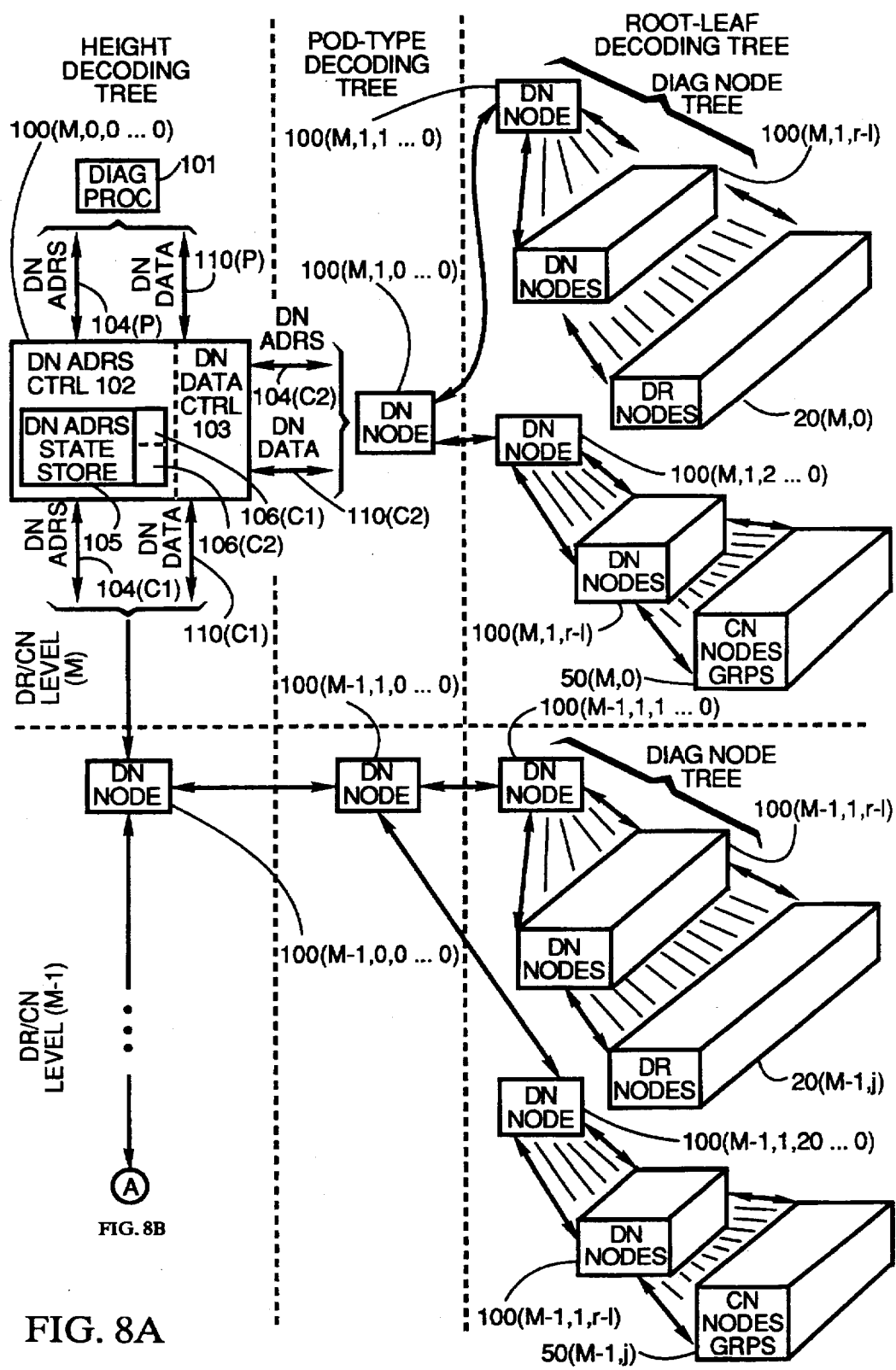
FIGS. 8A through 8C are block diagrams useful in understanding the structure and operation of the diagnostic network of the computer system of FIG. 1.
Figure 8B:
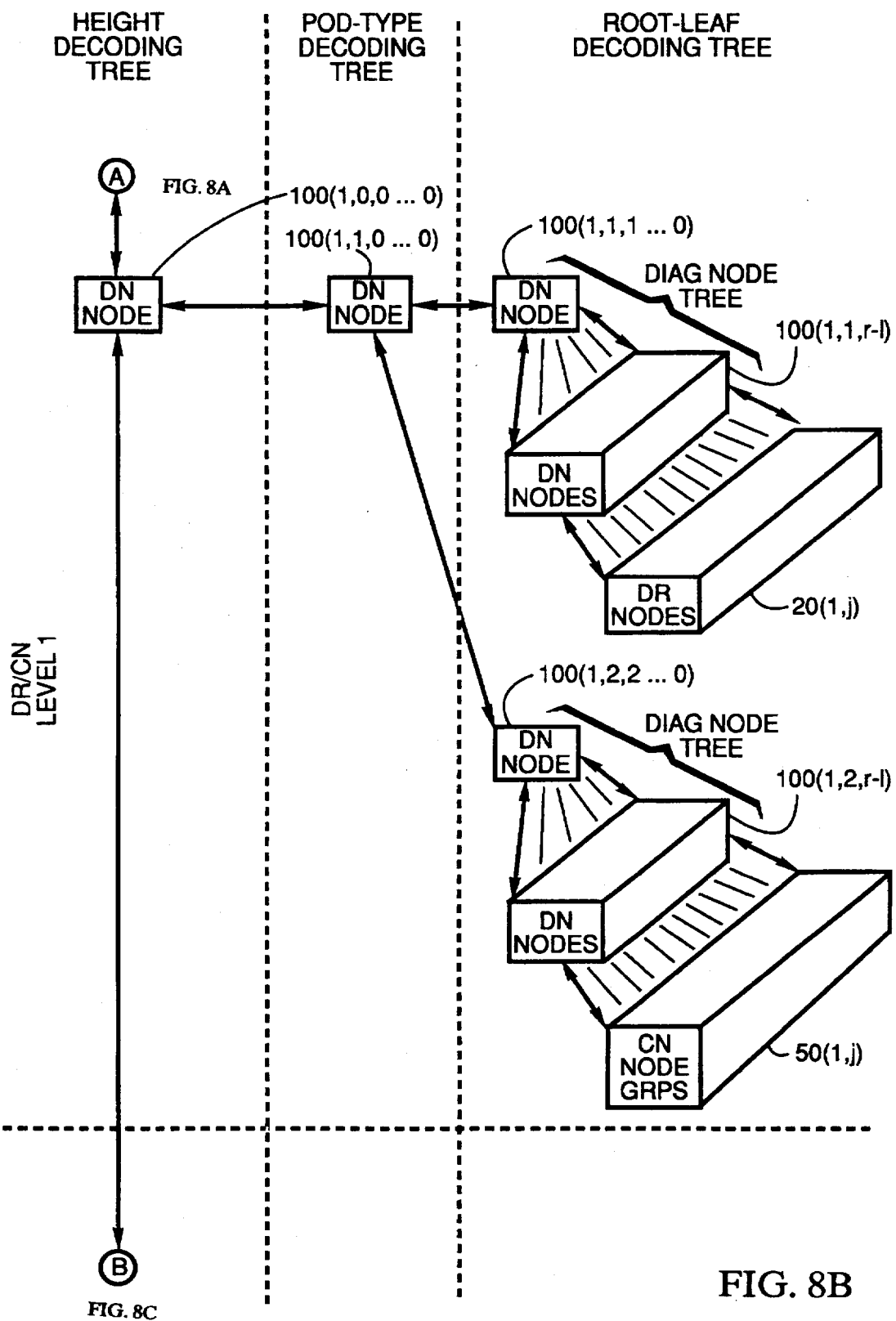
Figure 8C:
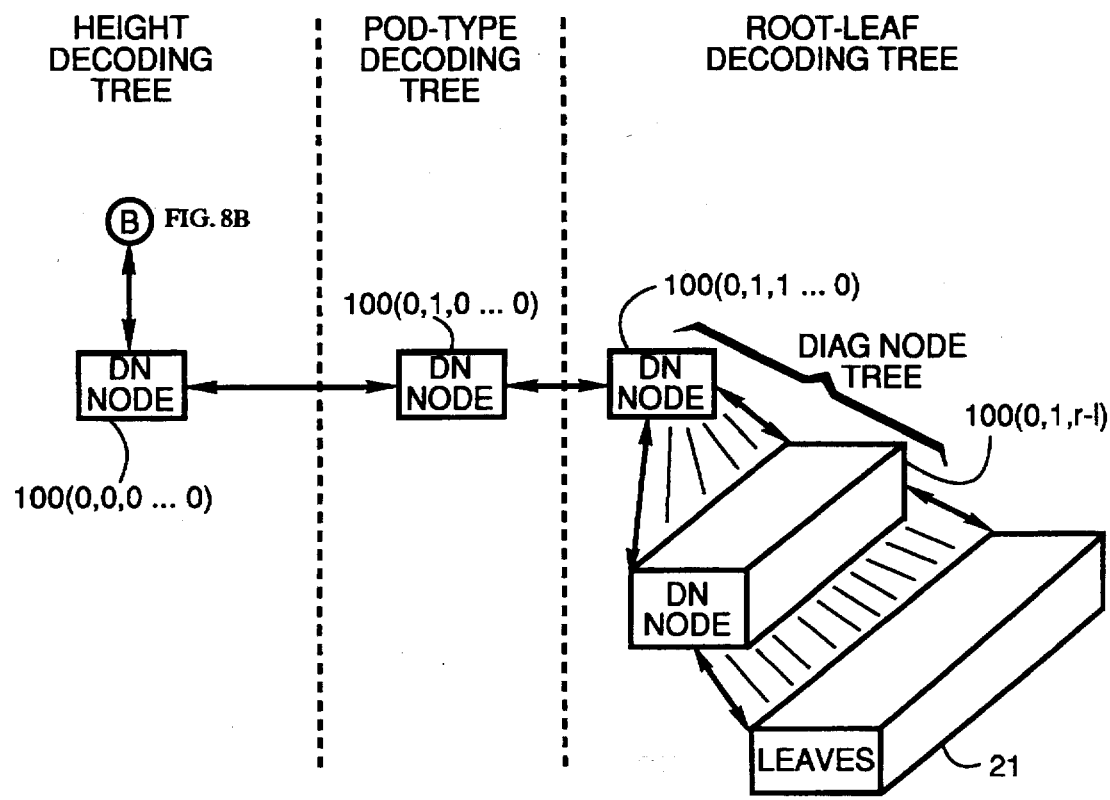

With reference to FIGS. 8A through 8C, the diagnostic network 16 includes a plurality of diagnostic network node generally identified by reference numeral 100(h,p,r–1), where "h" and "p" comprise integers representing a height value and a pod-type value, and "r–1" comprises one or more integers which together comprise a root-led value. The various diagnostic network nodes 100(h,p,r–1) are connected in a tree-type structure which actually forms a tree of trees as shown in the Figs. In particular, the diagnostic network 16 includes a high-order tree identified as a height-decoding tree, as represented by the diagnostic network nodes 100(h,p,r–1) in the left-most columns of the respective FIGS. 8A through 8C. Each diagnostic network node 100(h,p,r–1) in the height decoding tree is identified by a reference numeral 100(h,0,0 . . . 0), where the value of "h" is associated with a level in the data router 15 and control network 14. A diagnostic processor 101 is connected to the diagnostic network node 100(h,0,0 . . . 0) at the highest level of the height decoding tree.

The height decoding tree is essentially a linear tree, that is, there is no fan-out from level to level in the height decoding tree. The height decoding tree essentially forms the backbone of other lower-level trees in the diagnostic network 16, including a pod-type decoding tree, represented by diagnostic network nodes 100(h,p,r–1) in the middle column of FIGS. 8A through 8C, and a root-leaf decoding tree represented by diagnostic network node 100(h,p,r–1) in the right-hand column of FIGS. 8A through 8C. In particular, depending from each diagnostic network node 100(h,0,0 . . . 0) in the height decoding tree is a diagnostic network node 100(h,1,0 . . . 0), which comprises the pod-type decoding tree. Although only one diagnostic network node 100(h,1,0 . . . 0) is shown in the pod-type decoding tree at each level, the diagnostic network 16 may include multiple decoding nodes connected in a tree structure. In that case, the diagnostic network node 100(h,1,0 . . . 0) will comprise the root of the pod-type decoding tree, and other diagnostic network nodes 100(h,p,0 . . . 0) will comprise intermediate nodes and leaves of the pod-type decoding tree.

In addition, depending from diagnostic network nodes 100(h,1,0 . . . 0) in the pod-type decoding tree are diagnostic network nodes 100(h,p,r–1) comprising the root-leaf decoding tree. As shown in FIGS. 8A through 8C, depending from each diagnostic network node 100(h,1,0 . . . 0) in the pod-type decoding tree is a one or more trees of diagnostic network nodes 100(h,p,r–1) in the root-leaf decoding tree. In the embodiment depicted in FIGS. 8A through 8C, each diagnostic network node 100(h,p,r–1) can accommodate a fan-out of two, and so if the pod-type decoding tree includes one diagnostic network node 100(h,1,0 . . . 0), the diagnostic network 16 at that level may include up to two root-leaf decoding trees, which may connect to diverse types of other components in the system 10. Each root-leaf decoding tree includes a root diagnostic network node 100(h,p,r . . . 0) connected to the pod-type decoding tree, and extends to a plurality of leaf diagnostic network nodes 100(h,p,r–1) connected to a particular type of pods in the system 10.

The portions of system 10 comprising "pods" may depend upon the physical embodiment of the particular system. As depicted on FIGS. 8A through 8C, the data router nodes 22(i,j,k) may comprise one type of pod, the control network nodes 51(i,j,l) may comprise a second type of pod, and the leaves 21 may comprise a third type of pod. As shown in FIG. 8A, level "M," which corresponds to the root level of the control network 14 and data router 15, includes two root-leaf decoding trees. One root-leaf decoding tree comprises the diagnostic network nodes identified by reference numerals 100(M,1,1 . . . 0) through 100(M,1,r–1), which is connected to the pods of the data router nodes in the root data router node group 20(M,0). The other root-leaf decoding tree comprises the diagnostic network node identified by reference numeral 100(M,2,1 . . . 0), which is connected to the pod comprising the root control network node group 50(M,0).

Similarly, level "M–1," which corresponds to one level below the root level of the control network 14 and data router 15, also includes two root-leaf decoding trees. One root-leaf decoding tree comprises the diagnostic network nodes identified by reference numerals 100(M–1,1,1 . . . 0) through 100(M,1,r–1), which is connected to the pods of the data router nodes in the data router node groups 20(M–1,j), one level below the root level. The other root-leaf decoding tree comprises the diagnostic network nodes identified by reference numerals 100(M,2,1 0 . . . 0), 100(M,2,1 1 . . . 0), and 100(M,2,1 2 . . . 0) which are connected to the pods comprising the root control network node group 50(M,0). The other levels of the diagnostic network 16, down to level "1," which corresponds to the lowest levels in the control network 14 and data router 15, are similar, including two root-leaf decoding trees, one connected to pods comprising the data router node groups 20(i,j) and the other connected to pods comprising the control network node groups 50(i,j).

As indicated above, the diagnostic network 16 also includes a level "0" connected to leaves 21 in the system 10. That level includes only one root-leaf decoding tree, comprising the diagnostic network nodes 100(0,1,1 . . . 0) through 100(0,1,r–1), all of which are connected to leaves 21.

A "pod" may comprise an individual data router node 22(i,j,k), control network node 50(i,j,l) or leaf 21, or groups thereof. In one particular embodiment, a "pod" is a "field-replaceable unit," such as an entire circuit board, which is replaceable by field-service or maintenance personnel. In that embodiment, the diagnostic network 16 can diagnose and locate failures in such field-replaceable units.

It will be appreciated that, if a pod-type decoding tree at any particular level includes multiple diagnostic network nodes 100(h,p, 0 . . . 0) organized in a tree structure, multiple the root-leaf decoding trees can be provided each depending from a node comprising a leaf of the pod-type decoding tree. Thus, for example, if a particular level in the diagnostic network 16 required three or four root-leaf decoding trees, each connected to pods of particular types, if the fan-out from each level to the next in the pod-type decoding tree is two, the pod-type decoding tree would include at least three diagnostic network nodes 100(h,p,r–1), including a root node and two leaf nodes connected thereto. In that case, each leaf node would be able to connect to two root-leaf decoding trees. It will be appreciated that, if the fan-outs in each of the trees is different from two, the number of levels and number of nodes in each level within each tree may also differ from that specifically described herein. In one particular embodiment, fan-outs in particular diagnostic network nodes 100(h,p,r–1) of both two and eight are used, at different levels in the respective trees comprising the diagnostic network 16.

The diagnostic network nodes 100(h,p,r–1) are generally similar, and will be described in detail in connection with FIGS. 78 through 81. In brief, each diagnostic network node 100(h,p,r–1) includes an address control portion, generally identified by reference numeral 102, and a data control portion, generally identified by reference numeral 103. The address control portion of diagnostic network node 100(M, 0,0 . . . 0) receives address control signals from the diagnostic processor over a bus 104(P). The node uses the address control signals to establish address state in an address state store 105.

The address state maintained by the diagnostic network node 100(M,0,0 . . . 0) enables it to transmit subsequently-received address control signals (a) to one child node, in this case node 100(M−1,0,0 . . . 0) over a bus 104($C_1$), (b) to the other child node, in this case node 100(M,1,0 . . . 0) over a bus 104($C_2$, (c) to both child nodes over the same buses, or, alternatively, (d) to neither child node. The node's address control portion 102 includes flags 106($C_1$) and 106($C_2$) each associated with a corresponding bus 104($C_1$) and 104($C_2$). If the flag 106($C_i$) is set in response to the received address control signals, the node is enabled to thereafter transmit the address control signals to the respective child node over a bus 104($C_i$), and otherwise it is clear.

The diagnostic processor 101 controls the conditioning of each of the flags 106($C_i$) in the state store 105 of diagnostic network node 100(M,0,0 . . . 0) serially. After the address state has been established in the state store 105 of diagnostic network node 100(M,0,0 . . . 0), the node transmits the address control signals that it subsequently receives over bus 104(P) from the diagnostic processor 101 over the particular buses 104($C_i$) whose flags 106($C_i$) are set. If both flags 106($C_i$) are set, the diagnostic network node 100(M,0,0 . . . 0) transmits the address control signals over both buses 104($C_i$) in parallel. The address control signals thereafter enable either or both of those nodes to condition the flags 106($C_i$) in their respective address state stores 105, enabling them to thereafter transmit the address control signals received thereby to either or both of the diagnostic network nodes 100(h,p,r−1) connected thereto. This process continues until flags 106($C_i$) are set in selected ones of the leaf diagnostic network nodes 100(h,p,r−1) in the root-leaf decoding tree. This process may be repeated any number of times to condition flags 106($C_i$) in any combination of the leaf diagnostic network nodes 100(h,p,r−1).

The sequence of flags 106($C_i$) that are set in the various diagnostic network nodes 100(h,p,r−1), from the root diagnostic network node 100(1,0,0 . . . 0) in the height decoding tree to the leaf diagnostic network nodes 100(h,p,r−1) in the root-leaf decoding trees, essentially form paths from the diagnostic processor 101 to selected pods. The paths may be subsequently used to carry diagnostic test data in parallel from the diagnostic processor to the selected pods, and to return test results.

After it has conditioned flags 106($C_i$) in the various diagnostic network nodes 100(h,p,r−1), the diagnostic processor 101 may also retrieve the state from each of the diagnostic network nodes 100(h,p,r−1). After each flag 106 ($C_i$) is conditioned, the diagnostic network node 100(h,p,r−1) may transmit a signal representing its state its state over its bus 104(P), which is coupled up the tree to the diagnostic processor 101. If multiple flags are conditioned in diverse nodes in parallel, the diagnostic processor 101 transmits an expected address data signal, which enable the nodes intermediate the originating nodes and the diagnostic processor to combine the signals representing the state of the respective flags in response to a control signal from the diagnostic processor 101.

Thus, if the flags 106($C_i$) whose conditions are being retrieved are to be set, resulting in asserted state signals, the diagnostic processor 101 may enable the intermediate nodes to logically AND the flag state signals received from their child nodes. In that case, if an intermediate node receives a negated state signal, indicating that the flag 106($C_i$) whose condition is received is, erroneously, not set, the node will provide a negated state signal, which will be propagated up the tree to the diagnostic processor 101. On the other hand, if the flags whose conditions are being retrieved are to be cleared, resulting in negated state signals, the diagnostic processor 101 may enable the intermediate nodes to logically OR the flag state signals received from their child nodes. In that case, if an intermediate node receives an asserted state signal, indicating that the flag 106($C_i$) whose condition is received is, erroneously, not clear, the node will provide an asserted state signal, which will be propagated up the tree to the diagnostic processor 101.

After the diagnostic processor 101 has established the address states in the respective diagnostic network nodes 100(h,p,r−1) to selected pods, it may transmit a test data out signal and an expected test data control signal, which are received by the root diagnostic network node 100(M,0,0 . . . 0), over a bus 110(P). The root diagnostic network node 100(M,0,0 . . . 0) transmits the received signals over respective buses 110($C_1$) and 110($C_2$), as determined by the states of the respective flags 106($C_i$), and the other diagnostic network nodes do the same. Thus, the diagnostic network nodes 100(h,p,r−1) couple the test data out signal and expected test data control signal down the respective trees along paths defined by the set flags 106($C_i$). At some point, at least some of the leaf diagnostic network nodes 100(h,p, r−1) will couple test data signals to the selected pods, and obtain test data out signals representing diagnostic test results.

The diagnostic network nodes 100(h,p,r−1) will pass the test data out signals up the paths defined by the set flags 106($C_i$), each node combining the test data out signals received from its children in response to the expected test data control signal in a manner similar to that described above in connection with retrieval of the states of the respective flags. That is, if the test data out signal is expected to be asserted, the diagnostic processor 101 may enable the nodes to logically AND the test data signals received from the pods or child nodes connected thereto. In that case, if an intermediate node receives an erroneous negated test data out signal, the node will provide a negated test data out signal to its parent, which will be propagated up the tree defining the diagnostic network 16 to the diagnostic processor 101. On the other hand, if the test data out signal is expected to be negated, the diagnostic processor 101 may enable the intermediate nodes to logically OR the test data out signals received from the pods or the child nodes connected thereto. In that case, if an intermediate node receives an erroneous asserted test data out signal, the node will provide an asserted test data out signal to its parent, which will be propagated up the tree to the diagnostic processor 101.

If the diagnostic processor 101 receives an erroneous test data out signal, it can thereafter repeat the operations in connection with subsets of the previously-selected pods to identify the one which provided the erroneous signal. In that operation, the diagnostic processor 101 establishes states of the address flags 106($C_i$) in the diagnostic network nodes 100(h,p,r−1) to establish paths therethrough to a selected subset and repeats the test operation in connection with that subset. If the test data out signal indicates an erroneous result, the diagnostic processor 101 can reduce the size of the subset and repeat the operation. If the test data out signal indicates a correct result, on the other hand, the diagnostic processor 101 can repeat the operation in connection with a different subset. In one embodiment, the diagnostic processor 101 performs a binary search operation, iteratively repeating the operation in connection with half of the pods selected during the previous iteration to locate the pod providing the erroneous test data out signal.

Although not shown in FIGS. 8A through 8C, the diagnostic network 16 may include multiple diagnostic processors connected to various ones of the diagnostic network nodes 100(h,p,r−1). Each diagnostic processor may selectively control the portions of the tree defining the diagnostic network 16 below the diagnostic network node 100(h,p,r−1) connected thereto. Alternatively, the diagnostic processors may selectively condition the diagnostic network nodes 100(h,p,r−1) connected thereto to receive signals from, and transmit signals to, their respective parent diagnostic network nodes 100(h,p,r−1). The additional diagnostic processors may facilitate diverse diagnostic operations in various parts of the system 10 in concurrently.

In one specific embodiment, the interface between the leaf diagnostic network nodes 100(h,p,r−1) and the pods comprises the interface defined by the Joint Test Action Group ("JTAG"), as described in IEEE Std. 1149.1 (hereinafter "JTAG specification"). In any event, the interface provides a serial scan chain circuit in each pod. The serial scan chain circuit in each pod may extend through a number of registers and other storage elements in the respective pods, and may be used to establish the states thereof to thereby establish selected operating conditions in the respective pods. For example, each data router nodes 22(i,j,k) and control network nodes 51(i,j,l) uses height signals identifying the respective levels, which may be provided by a register thereon that can be loaded through the serial scan chain circuit. These nodes also use signals which indicate whether connections to the respective parent or child nodes are enabled or disabled, which may also be provided by registers loaded through the serial scan chain circuit.

Figure 9:
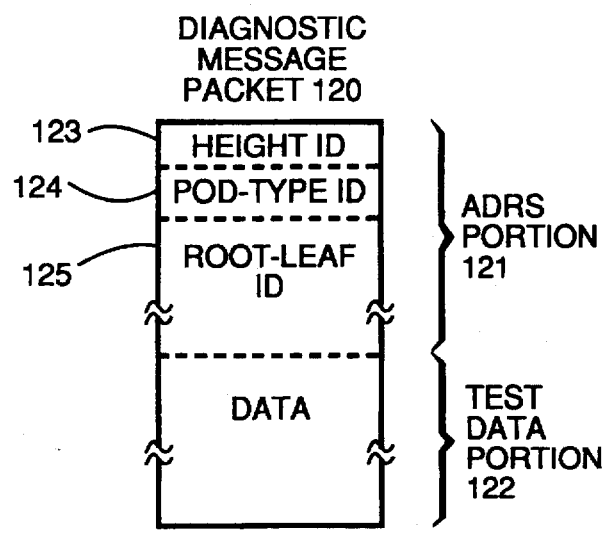
FIG. 9 is a diagram depicting the structure of message packets transferred over the diagnostic network.

FIG. 9 depicts the structure of a diagnostic message packet 120. Diagnostic message packets 120 differ from the data router message packets 30 and control network message packets 60, in that they are not generated by pods connected to the diagnostic network 16 for delivery through the diagnostic network 16 to other pods connected thereto. The diagnostic network message packets are generated by a diagnostic processor for delivery to the pods, which, in turn, generate response data for transmission to the diagnostic processor.

In any event, the diagnostic message packet 120 includes an address portion 121 and a test data portion 122. The address portion 121 conditions the respective address control portions 102 in the diagnostic network nodes 100(h,p,r−1). The test data portion 122 is represented by the test data in and and test data out signals, along with the expected test data in signals, coupled through the data control portions 103 of the respective diagnostic network nodes 100(h,p,r−1). Depending on the location of the diagnostic processor generating the diagnostic message packet 120, the packet 120 may include three sections in the address portion 121, including a height identification portion 123, a pod-type identification portion 124 and a root-leaf identification portion 125. Each of the portions 123 through 125 are used by diagnostic network nodes 100(h,p,r−1) in the respective height, pod-type and root-leaf decoding trees to condition the respective flags 106($C_i$) therein. It will be appreciated that the length of the respective portions 123 through 125 will vary, depending upon the number of diagnostic network nodes 100(h,p,r−1) whose flags 106($C_i$) are to be conditioned, and the number of flags in each node.

II. Detailed Description of Particular Circuits

A. General

The remainder of this specification will present details of circuits used in one embodiment to carry out the invention as set forth in the claims. In the following, the detailed logic of a leaf 21, in particular details of connection of a leaf 21 to the control network 14 and data router 15 will be discussed in connection with FIG. 10 through FIG. 44. Thereafter, the detailed logic of a data router node 22(i,j,k) will be described in connection with FIGS. 45 through 62, the detailed logic of a control network node 51(i,j,l) will be described in connection with FIGS. 63 through 77, and the detailed logic of a diagnostic network node 100 will be described in connection with FIGS. 78 through 81.

B. Leaf 21

1. General

Figure 10:
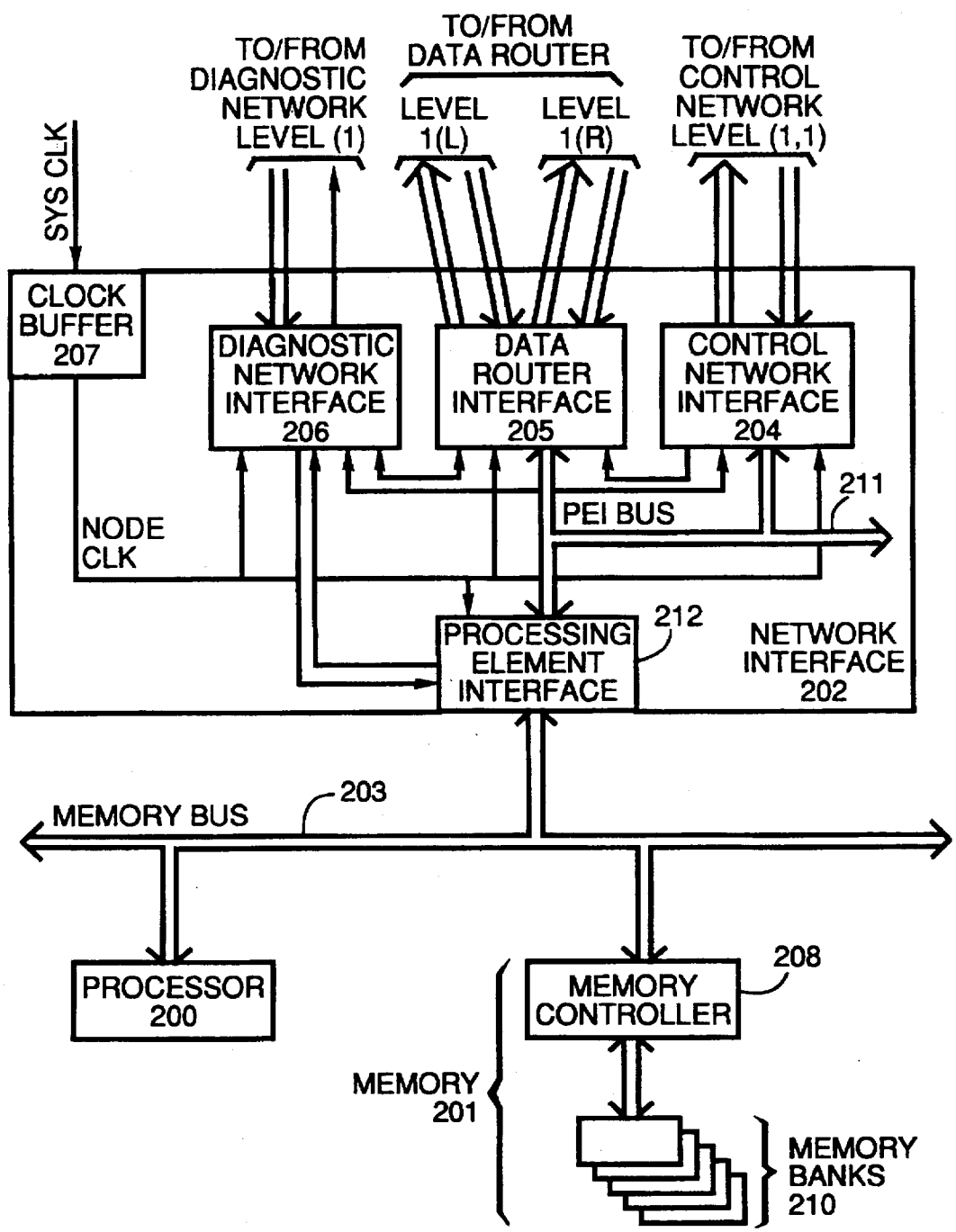
FIG. 10 is a general block diagram of a processing element in the computer system depicted in FIG. 1.

FIG. 10 is a general block diagram of a leaf 21, in particular, a processing element 11 in the computer system 10 depicted in FIG. 1. Other types of leaves, including a scalar processor 12 and an input/output processor 13 are generally similar at a block diagram level, except as noted below.

Figure 13:
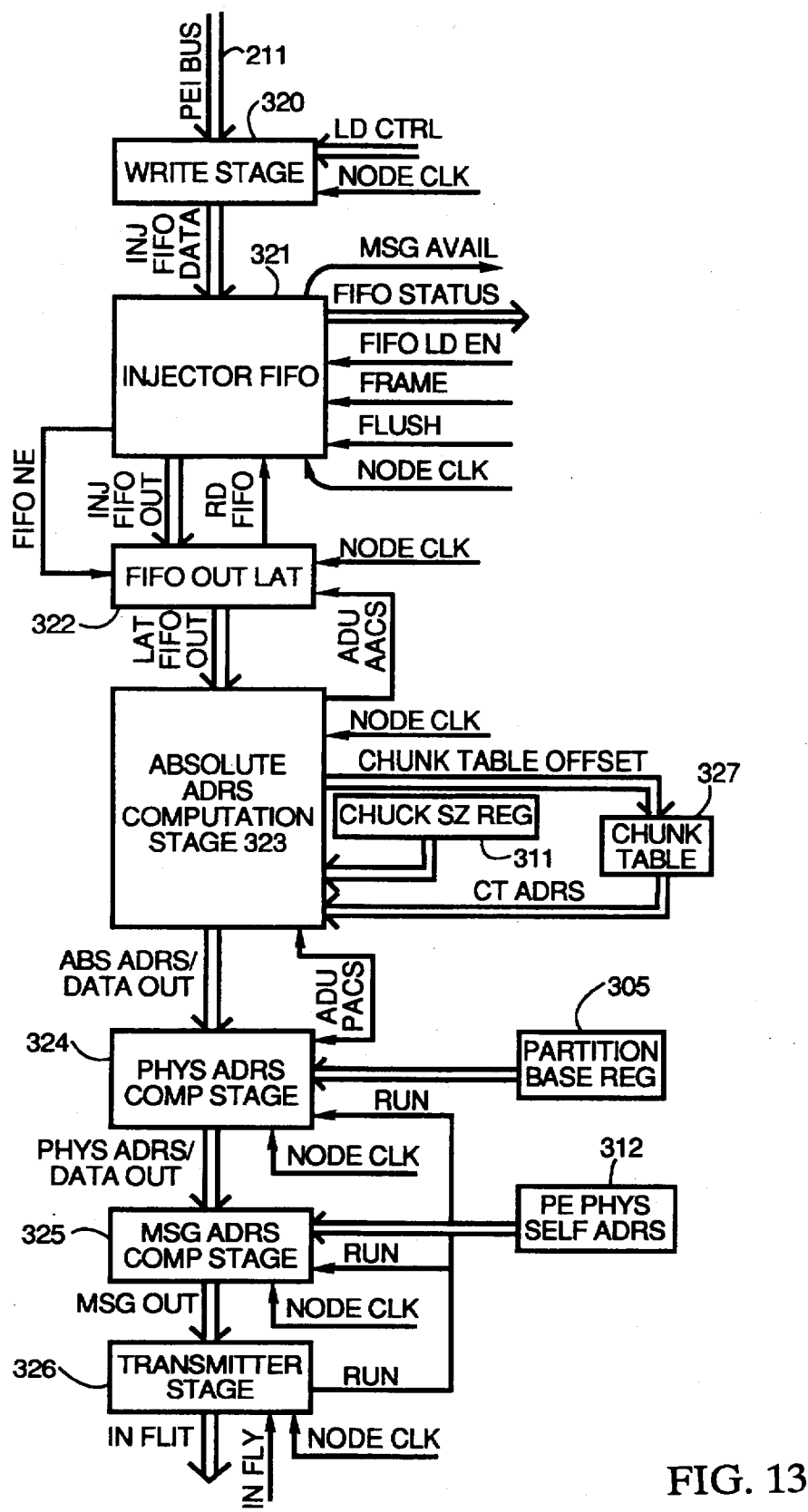
Figure 14:
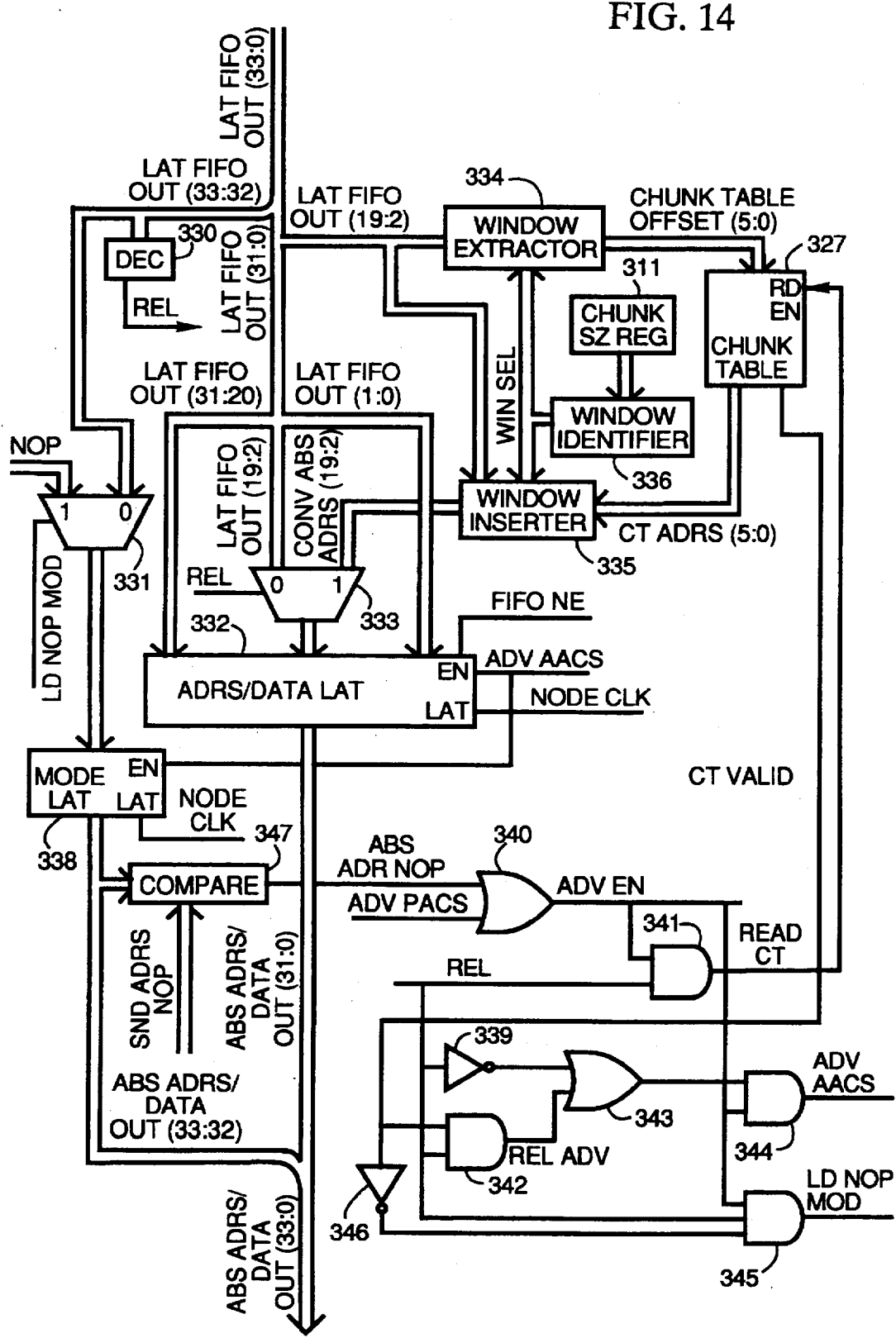

With reference to FIG. 10, processing element 11 includes a processor 200, memory 201 and network interface 202 all interconnected by a memory bus 203. The network interface 202 interfaces the processing element 11 to the various communication mechanisms 14, 15 and 16 in system 10. In particular, the network interface 202 includes a control network interface 204 (described below in more detail in connection with FIGS. 37 through 44) that receives (ejects) control network message packets 60 from the control network 14, and that transmits (injects) control network message packets 60 to the control network 14. Similarly, a data router interface 205 (described below in more detail in connection with FIG. 11 through FIG. 36) receives (ejects) data router message packets 30 from the data router 15 and transmits (injects) data router message packets 30 to the data router 15, and a diagnostic network interface 206 receives diagnostic network message packets from the diagnostic network 16 and transmits diagnostic network results over the diagnostic network 16. FIG. 14 depicts the logic diagram of an interface circuit that may be used as the diagnostic network interface 206 to interface the network interface 202 to the diagnostic network 16.

As noted above, scalar processors 12 and input/output processors 13 are generally similar, at a block diagram level, to the processing element 11 depicted on FIG. 10. Scalar processors 12 may also include, for example, video display terminals (not shown) which may comprise consoles to allow control of the system 10 by an operator. In addition, scalar processors 12 may include such elements as, for example, magnetic disk storage subsystems (also not shown) to store programs and data to be processed by the processor. It will be appreciated that processing element 11 may also include such elements. As noted above, an input/output processor 13 will include interfaces to external data input/output and storage devices, including frame buffers, magnetic disk storage devices, and other such elements that are well known in the art.

The network interface 202 includes a clock buffer 207 that receives the SYS CLK system clock signal from the clock circuit 17 and generates a NODE CLK node clock signal in response. In one particular embodiment, the clock buffer 207 comprises a buffer as described in U.S. patent application Ser. No. 07/489,079, filed Mar. 5, 1990, in the name of W. Daniel Hillis, et al., entitled Digital Clock Buffer Circuit Providing Controllable Delay, and assigned to the assignee of the present application. The network interface 202 uses the NODE CLK node clock signal to synchronize its operation with the control network 14, data router 15, and diagnostic network 16. The NODE CLK node clock signal may also be used in generating clock signals for controlling the other components of the processing element 11 shown in FIG. 8, but it will be appreciated that those components may alternatively be controlled by signals other than the NODE CLK node clock signal.

The memory bus 203 transfers address signals that define a processing element address space. The memory 201 includes a memory controller 208 and a plurality of memory banks generally identified by reference numeral 210, the memory banks 210 including a plurality of addressable storage locations within the processing element address space. In addition, the control network interface 204 and data router interface 205 include a plurality of registers, described in more detail below, which are also within the processing element address space.

The interfaces 204, 205 and 206 are connected through a bus 211 to a processing element interface 212, which, in turn, is connected to the memory bus 203. In response to receipt of control network message packets 60 from the control network 14 or diagnostic network message packets 30 from the data router 15, the processing element interface 212 can interrupt the processor 200. In response to the interrupt, the processor 200 can, by reading appropriate registers in the respective interface 204 or 205, retrieve the contents of the packet from the network interface 202. The processor may store the retrieved packet contents in the memory 201.

In addition, the processor 200 can initiate transfer of a control network message packet 60 over the control network 14 or a data router message packet 30 over the data router 15. In this operation, the processor 200 transmits packet information over bus 203 to particular registers in the network interface 202. The processing element interface 212, in response to address signals over memory bus 203 identifying the registers, receives the packet information and loads it into the respective registers. Upon receiving the packet information, the respective interface 204 or 205 initiates transmission of a message packet 60 or 30 over the respective control network 14 or data router 15.

The processor 200 executes the commands transmitted in control network message packets 16 over the control network 14 by the scalar processors 12 and received by the control network interface 204. In response to a command, the processor 200 processes one or more instructions, which are maintained in memory 201, which may enable the processor 200 to process data in the memory 201. In addition, the instructions may enable the processor 200 to transmit packet information to respective registers in the network interface 202 to initiate a transfer of a packet 30 or 60 over the respective data router 15 or control network 14, or to read information from respective registers to thereby retrieve the received packet information.

2. Data Router Interface 205
   i. General

Figure 11:
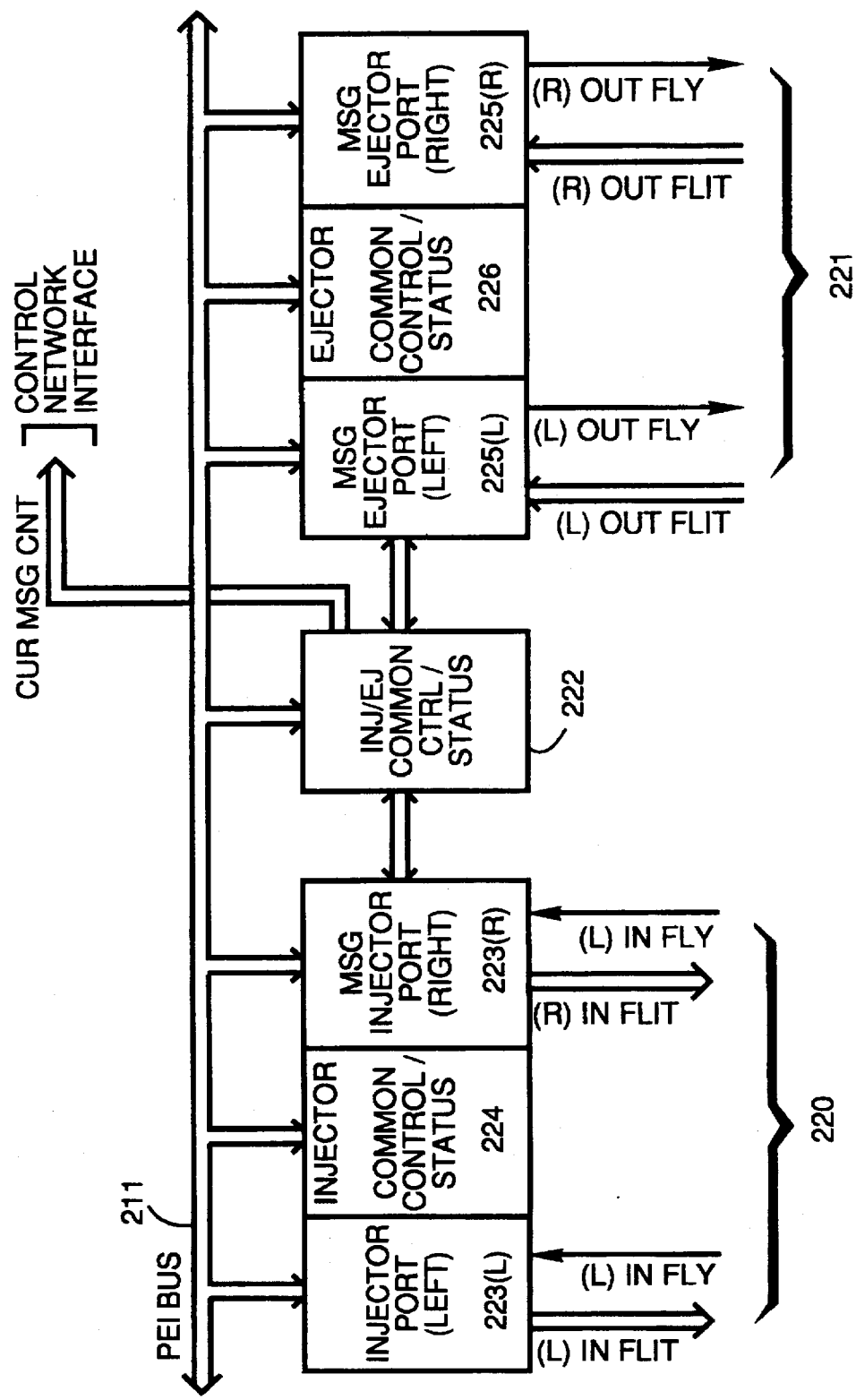
FIG. 11 comprises a general block diagram of a data router interface circuit useful in interfacing the processing element depicted in FIG. 10 to the data router of the computer system depicted in FIG. 1, FIGS. 12A and FIG. 12B contain definitions of registers in the data router interface and FIGS. 13 through 36 comprise logic diagrams of the data router interface.

The details of data router interface 205 will be described in connection with FIG. 11 through FIG. 36. With reference to FIG. 11, the data router interface 205 includes a data router message injector portion 220, a message ejector portion 221 and an injector/ejector common control/status portion 222, all connected to processing element interface bus 211. The data router message injector portion 220 injects data router message packets 30 over the data router 15; that is, it transmits data router message packets 30 to the data router nodes 22(1,j,0) and 22(1,j,l) connected thereto.

The data router message injector portion 220 includes two message injector ports identified as left message injector port 223(l) and right message injector port 223(r) for injecting message packets 30 into the data router 15. In the following, data router node 22(1,j,0) is termed the "left" node, and data router node 22(1,j,1) is termed the "right" node; in that case, left message injector port 223(l) is connected to transmit data router message packets to data router node 22(1,j,0) and right message injector port 223(r) is connected to transmit data router message packets to data router node 22(1,j,1).

Data router message injector portion 220 also includes an injector common control/status portion 224 that connects to, and controls certain operations of, both left and right message injector ports 223(l) and 223(r). For example, when the processor 200 initiates transmission of a data router message packet 30, it may specify that the message packet 30 be transmitted through either the left or the right message injector port 223(l) or 223(r). In that case, the data router interface 205 will transmit the packet 30 through the specified port 223(l) or 223(r). Alternatively, the processor may not specify the particular port 223(l) or 223(r), in which case the injector common control/status portion 224 will select one of the ports 223(l) or 223(r) to transmit the packet 30.

The message ejector portion 221 receives and buffers data router message packets 30 from the data router 15. In addition, the message ejector portion 221 may initiate interrupting of the processor 200 on receiving a new data router message packet, and it transmits the buffered packets over the processing element interface bus 211 in response to a retrieval request from the processor 200. The message ejector portion 221 includes a left message ejector port 225(l) and a right message ejector port 225(r) that are connected to receive data router message packets 30 from data router nodes 22 (1,j,0) and 22(1,j,1), respectively.

Data router message ejector portion 221 also includes an ejector common control/status portion 226 that connects to, and controls certain operations of, both left and right message ejector ports 225(l) and 225(r). For example, if both right and left ejector ports 225(l) and 225(r) have received message packets 30 and the processor 200 has requested that the message data be transmitted to it without identifying either the particular left or right ejector port 225(l) or 225(r), the ejector common control/status portion 226 determines the order in which the ports 225(l) and 225(r) will transmit the packets over the processing element interface bus 211.

To transmit a data router message packet 30 to the data router node 22(1,j,0) connected thereto, the left message injector port 223(l), in synchrony with the NODE CLK node clock signal, iteratively transmits (L) IN FLIT left inject flit signals to transmit successive flits of the packet 30 to the data router node 22(1,j,0). The left message injector port 223(l) may transmit while the data router node 22(1,j,0) is asserting an (L) IN FLY left input fly signal; if the data router node 22(1,j,0) negates the (L) IN FLY left input fly signal the left message injector port 223(l) stops transmitting. The right message injector port 223(r) transmits similar (R) IN FLIT right inject flit signals to data router node 22(1,j,1) in response to an asserted (R) IN FLY right input fly signal The left message ejector port 225(l), in synchrony with the NODE CLK node clock signal, iteratively receives (L) OUT FLIT left eject flit signals to for successive flits of the packet 30 from the data router node 22(1,j,0). The left message ejector port 225(l) may enable the data router node 22(1,j,0) to transmit by asserting an (L) OUT FLY left eject fly signal; if the port 225(l) negates the (L) OUT FLY left eject fly signal the data router node 22(1,j,0) stops transmitting. The data router node 22(1,j,1) transmits similar (R) OUT FLIT right eject flit signals to right message ejector port 225(r) in response to an asserted (R) OUT FLY right eject fly signal.

Figure 12A:
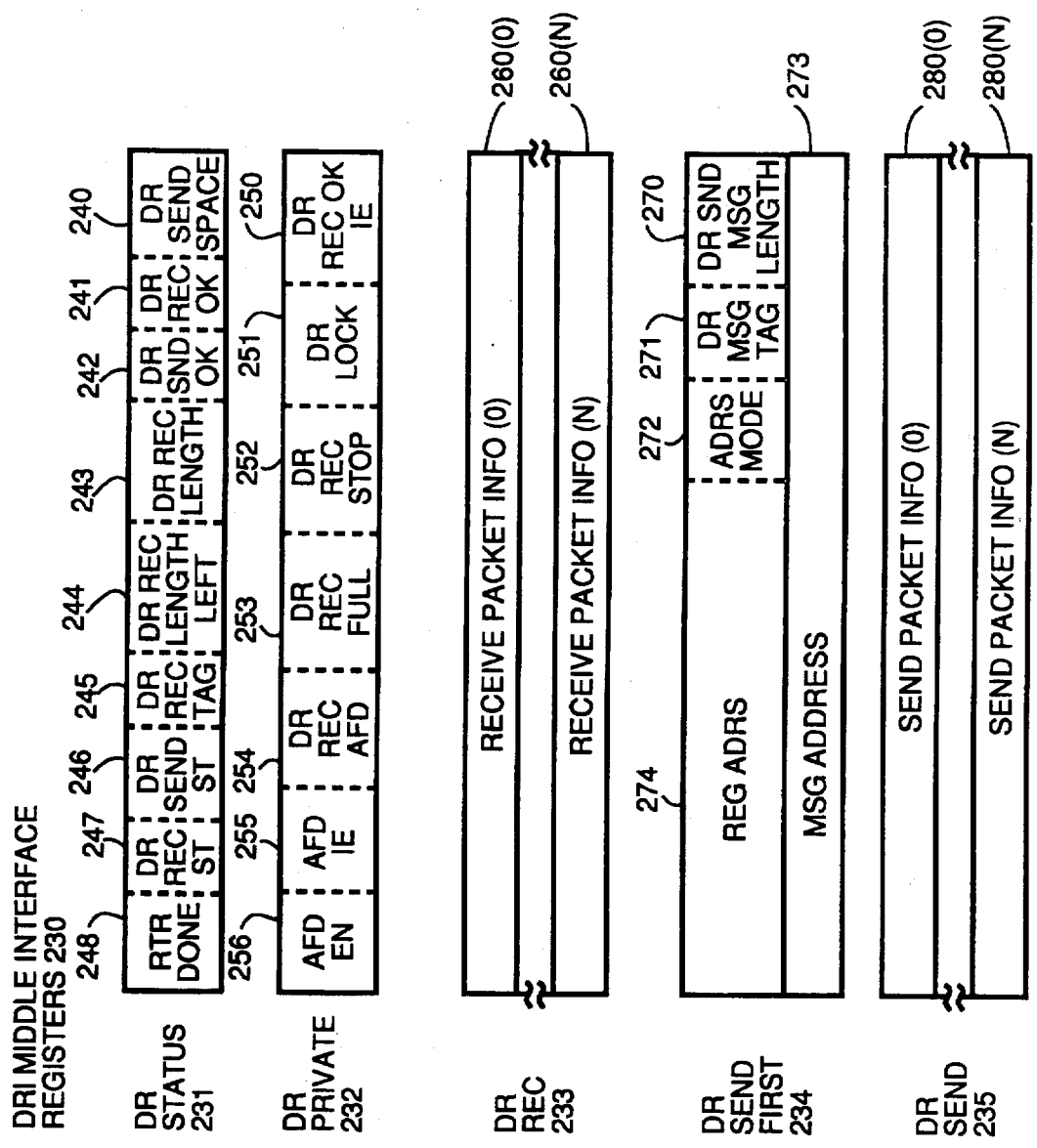

FIGS. 12A and 12B depict the registers in the control/ status portions 222, 224 and 226 in the data router interface 205. FIG. 12A depicts the details of a data router interface middle register set 230 which is used by the processor 200 when it does not specify the particular message injector port 223(l) or 223(r) to transmit a particular data router message packet 30, or the message ejector port 225(l) or 225(r) from which it is to receive a data router message packet 30. With reference to FIG. 12A register set 230 includes two status and control registers, including a status register 231 and a private register 232, a receive register 233, and two transmit registers, namely, a "send first" register 234 and a "send" register 235.

The status register 231 includes a number of fields shown in FIG. 12A. As described below in connection with FIG. 13, each data router message injector port 223(l) and 223(r) includes a first-in first-out buffer which buffers information from processor 200 from which the packet 30 is generated. A send space field 240 identifies the amount of space left in the buffer in the particular port 223(l) or 223(r) that is currently selected to transmit the packet 30. The contents of the send space field 240 are provided by the currently selected left or right data router message injector port 223(l) or 223(r).

Two flags 241 and 242 indicate the status of the last reception and transmission, respectively, of a data router message packet 30 through the currently selected port. If the last data router message packet 30 to be received can be successfully received, flag 241 is set, and if the last data router message packet 30 to be injected was successfully injected, flag 242 is set. The flags 241 and 242 are conditioned by message injector portion 220 and message ejector portion 221, respectively.

A receive message length field 243 indicates the length of the data router message packet 30 received through the currently selected port, and a length left field 244 identifies the amount of data in a data router message packet 30 currently being retrieved by the processor 200 that is remaining to be retrieved. The contents of the receive message length field 243 correspond to the contents of length field 34 (FIG. 4) of the data router message packet 30. The contents of a receive tag field 245 correspond to the contents of the tag field 35 of the same data router message packet 30. The length left field 244 is effectively provided by a counter into which the contents of length field 34 are loaded when the processor 200 begins retrieving the message packet 30, and which is decremented as the message data is transmitted to the processor 200. The contents of fields 243, 244 and 245 are provided by the message ejector portion 221.

A send state field 246 and receive state field 247 identify the state of injection and ejection, respectively, of respective message packets 30 by the message ejector portion 220 and message injector portion 221. The send state field 246, whose contents are provided by the message injector portion 220, indicates whether either or both of the left or right message injector ports 223(l) and 223(r) contain partially-injected data router message packets 30. Similarly, the receive state field 247, whose contents are provided by the message ejector portion 221, indicates whether either or both of the left or right message ejector ports 225(l) and 225(r) contain partially-ejected (that is, received) data router message packets 30.

Finally, a router done flag 248, whose contents are actually provided by the control network interface 204, indicates whether the router is empty following a message transfer operation. The condition of the router done flag 248 is derived from the reduce operation performed over the control network 14 to determine whether the data router 15 is empty as described above.

The private register 232 also includes a number of fields, comprising flags 250 through 256. Several flags, which are included in the ejector common control/status portion 226, control the operation of the message ejector portion 221. A receive interrupt enable flag 250, when set, enables the data router interface 205 to generate an interrupt for transmission by the network interface 202 to processor 200 when a data router message packet 30 is received by the currently selected left or right message ejector port 225(l) or 225(r). A receive stop flag 252, when set by the processor 200, disables reception of subsequent data router message packets 30 by the currently selected left or right message ejector port 225(l) or 225(r). The currently selected port 225(l) or 225(r) stops receiving flits immediately upon the flag 252 being set. A receiver full flag 252, when set by the currently-selected ejector port 225(l) or 225(r), indicates that a buffer maintained by the currently-selected ejector port is full.

The private register 232 also includes a lock flag 251, included in the injector common control/status portion 224, that controls the operation of the message injector portion 220. The lock flag 251 enables or disables the currently selected left or right message injector port 223(l) or 223(r). When set by processor 200, the currently selected left or right message injector port 223(l) or 223(r) ignores subsequent transmissions from processor 200, and the flag 242 in status register 231 is cleared, indicating unsuccessful injection of the data router message packet 30.

The private register 232 also includes three flags that control operation of the data router interface 205 in connection with the all-fall-down mode of the data router 15 as described above. A received all-fall-down flag 254, controlled by the control network interface 204, indicates that it has received a data router message packet 30 while the data router 15 is operating in all-fall-down mode, for which the leaf 21 is not the destination. An all-fall-down interrupt enable flag 255, when set by processor 200, enables the network interface 202 to generate an interrupt request for transmission to the processor upon the setting of the received all-fall-down flag 254. Finally, an all-fall-down enable flag 256, when set by processor 200, enables the control network interface 204 to set the all-fall-down bit 81 of the next control network message packet 60 that it transmits.

The remaining registers in the middle interface register set 230 are used to transmit and receive data router message packet information. A receive register 233 contains a number of words 260(0) through 260(N) representing the data in a data router message packet 30 received through the currently selected left or right message ejector port 225(l) or 225(r). In reference numeral 260(N), "N" is an integer related to the maximum amount of data that can be transmitted in a single data router message packet 30. The data stored in receive register 233 is from the data flits 36 of the received message packet 30. The receive register is represented by a single address in the address space of memory bus 203. The processor can retrieve the data from a message by iteratively using the address in a read operation over memory bus 203. It will be appreciated that the data router interface 205 decrements the contents of the receive length left field 244 as the processor 200 accesses the receive register to retrieve the message data.

Two registers, namely, the send first register 234 and the send register 235 are provided to enable the processor to supply information used by the message injector portion to generate data router message packets 30 for injection into the data router 15. The send first register 234 includes fields 270 and 271 in which message length and message tag information is loaded. The contents of fields 270 and 271 are copied into the message length and message tag fields 34 and 35 in a data router message packet 30.

The send first register 234 also includes a message address field 273 that is used to generate the contents of message address portion 31 of packet 30, and an address mode field 272. The message address in field 273 can be an physical address, which specifically identifies the leaf 21(y) to receive the message, or a relative address, which identifies a displacement from the leaf 21(x) transmitting the data router message packet 30 to the leaf 21(y) to receive the packet 30. The contents of the address mode field 272 indicate whether the message address in field 273 is an physical address or a relative address.

The send register 235, like receive register 233, contains a number of words 280(0) through 280(N) representing the data in a data router message packet 30 to be transmitted through the currently selected left or right message injector port 223(l) or 223(r). In reference numeral 280(N), "N" is an integer related to the maximum amount of data that can be transmitted in a single data router message packet 30. The data stored in send register 235 is copied into the data flits 36 of the transmitted message packet 30. The send register is represented by a single address in the address space of memory bus 203. The processor can load data into the register by iteratively using the address in a write operation over memory bus 203.

As noted above, the processor 200 uses the data router interface middle register set 230 when it does not specify the particular message injector port 223(l) or 223(r) to transmit a particular data router message packet 30. The data router interface 205 includes two additional register sets, identified as a left and right interface register sets 290 and 291 (shown on FIG. 12B), respectively, which the processor 200 uses when specifies a left or right message injector port 223(l) or 223(r) to transmit a particular data router message packet 30, or a left or right message ejector port 225(l) or 225(r) from which it will retrieve data router message packet data. Both left and right interface register sets 290 and 291 include respective status, private, receive, send first and send registers, identified by reference numerals 293–297 (left register set 290) and 300–304 (right register set 291). The registers in register sets 290 and 291 have fields and flags that are substantially the same as those of respective registers 231–235 of the middle interface register set, except that the left and right interface status registers 293 and 300 do not have fields corresponding to send and receive state fields 246 and 247 or router done flag 248 of status register 231. In addition, left and right interface private registers 294 and 301 do not have fields corresponding to all-fall-down interrupt enable flag 255 or all-fall-down enable flag 256 of private register 232.

The data router interface 205 also includes a set of registers 292 which contain information that it uses, along with the message address information in field 273 of the send first register 234 of the middle interface register set 230 or corresponding fields of send first registers 296 or 303 of the respective left or right interface register set, in generating address information for the message address field 31 of a data router message packet 30 to be transmitted. As described above, the system 10 can be partitioned, and a partition base register 305 and partition size register 306 contain values identifying the base and size of the processing element's partition. In particular, the partition base register 305 contains the index (i) of the leaf 21(i) in the system that is the lowest-indexed element in the partition. In addition, the contents of the partition size register 306 identify the number of leaves 21 in the partition. A physical self address register 312 for a particular leaf 21(i) identifies the leaf's own index "i" in the system 10, which comprises an address or other identifier that uniquely identifies the leaf 21 in the system.

The address information register set 292 also includes a set of registers 307 and 310–311 which are used with a chunk table 327 (which is described in more detail below in connection with FIGS. 13 and 14) and that provides additional addressing information used in generating address information for the message address field 31 of a data router message packet 30 to be transmitted. The chunk table is maintained by the injector common control/status portion 224 of the injector portion 220. The chunk table permits groups of leaves 21(i) to be to be substituted for other groups, without requiring the address provided by the processor 200 to reflect the substitution. This may facilitate, for example, one or more groups of leaves 21(i) being made inaccessible, or "mapped out," of the data router 15, which may be helpful if one or more leaves 21(i) in the group is defective. The chunk table contains information that is used in generating a portion of the message address for a data router message packet 30, permitting a message packet to be re-directed from the leaf 21(i) in the original group to the leaf 21(i) of a group that is assigned as a substitute group.

To accommodate that operation, as described below in more detail in connection with FIG. 14, the chunk table includes a memory including a plurality of entries. Each entry comprises a pointer, or bits comprising a portion of the address to be used as a substitute. If the address from the processor 200, in the particular send first register 234, 296 or 303, is a relative address, a portion of it is used to access the chunk table, to obtain the portion to be used in generating the address for the message address portion of the data router message packet 30. The particular portion of the relative address used to address the chunk table depends on the size of the group to be mapped in and out.

A chunk table address register 307 and chunk table data register 310 are used together to enable loading of the entries in the chunk table. The chunk table address in register 307 is used to identify the entry in the chunk table into which the contents of the chunk table data register 310 will be stored. The contents of the chunk size register 311 identify the number of leaves 21(i) in a group which may be mapped in or out, which, in turn, determines the particular bits of the relative address to be used in accessing the chunk table 327.

Finally, the registers maintained by the data router interface 205 include the previously-mentioned data router message counter 313. Data router message counter 313 is maintained by the injector/ejector common control/status portion 222. The message counter 313 is incremented to reflect the injection by data router message injector port 220 of a data router message packet over the data router 15 during a message transfer operation, and decremented to reflect the ejection, by the data router message ejector port 221 of a data router message packet 30 that it receives from the data router 15. The injector/ejector common control/status portion 222 generates a CUR MSG CNT current message count signal which identifies the current value of the message counter 313, and which it provides to the control network interface 204 for use in generating a router done control network message as described above.

ii. Message Injector Portion 220

With this background, details of circuits comprising the left and right message injector ports 223(l) and 223(r), along with portions of the injector common control/status portion 224, in the message injector portion 220 will be described in connection with FIGS. 13 through 20. Similarly, details of circuits comprising the left and right message ejector ports 225(l) and 225(r), along with portions of the ejector common control/status portion 226, in the message ejector portion 221 will be described in connection with FIGS. 22 through 29. In addition, details of circuits comprising the injector/ejector common control/status portion 222 will be described in connection with FIGS. 30 through 36.

Since the circuits comprising the left and right message injector ports 223(l) and 223(r) are substantially similar, only one (without reference to it being the left or right port) will be described in connection with FIGS. 13 through 21. FIG. 13 depicts a general block diagram of a message injector port 223. With reference to FIG. 13, the message injector port 223 includes a series of stages that receive information from the processor 200 to be used in generating the message packet 30 to be injected, buffer the information, perform any necessary address generation, divide the information into flits and, under control of the IN FLY injector fly signal, transmit the flits as successive IN FLIT injected flit signals. In the following description, the information received from the processor 200 is in the form of words each having, for example, thirty two bits, and each flit comprises four bits transmitted in parallel.

Information from the processor 200, received by the processing element interface 212, is first loaded into a write stage 320. The write stage 320 is connected to the processing element interface bus 211, is loaded in response to LD CTRL load control signals from the injector common control/status portion 224. The write stage 320 operates as the input to an injector first-in first-out buffer (FIFO) 321. When the processor 200 loads information into the send first registers 234, 296 and 303, or the send registers 235, 297 and 304, it is essentially received by the write stage 320.

If the information from the processor 200 is addressed to a send first register, the write stage 320 generates a thirty-four bit address word in which the low-order twenty bits comprise the address information, the middle bits comprise message packet length and tag information and the high-order bits comprise two address mode bits which it derives from the address mode field 272. In particular, if one of the address mode bits is set, the address information is an physical address, and if the other address mode bit is set the address information is a relative address. In response to the successive words thereafter addressed by the processor 200 to the send register, the write stage 320 generates successive thirty-four bit words in which the two high-order address mode bits have the value zero, with the thirty-two bits data appearing in the low-order portion. It will be appreciated that the zero address mode bits effectively identify the low-order thirty-two bits as comprising data.

The output of write stage 320, INJ FIFO DATA (33:0) injector first-in first-out buffer data signals defining thirty-four bit words, are coupled to the data input terminals of FIFO 321. The FIFO 321 stores successive words received thereby in thirty-four bit storage locations, thereby accommodating the thirty-four bit address words. The FIFO 321 loads INJ FIFO DATA (33:0) signals in response to FIFO LD EN load enable signals from the injector common control/status portion 224 and the NODE CLK signal. In addition, FIFO 321 generates FIFO STATUS status signals indicating whether it can accept additional words from the write state 320. The injector common control/status portion 224 can use the FIFO STATUS signals in controlling the operation of the write stage 320 and flow of information, including addresses and data, to FIFO 321.

In addition, the injector FIFO 321 receives a FRAME signal and a FLUSH signal from the injector common control/status portion 224. The FRAME signal, when asserted, indicates that address and data words for an entire data router message packet 30 have been loaded into the injector FIFO 321. At that point, the message injector port 223 will generate a data router message packet 30 using the words. The FLUSH signal, when asserted, indicates that address and data words being loaded into the injector FIFO 321 are to be flushed, and that no data router message packet 30 is to be generated in response to those words. The injector common control/status portion 224 may assert the FLUSH signal, for example, if it detects an error in connection with receipt of information for the data router message packet 30 as providd by the processor 200.

Essentially, the injector FIFO 321 includes a plurality of storage locations that are sequentially loaded with INJ FIFO DATA signals defining a word from the write stage 320. In addition the injector FIFO 321 includes a store pointer to the next location to store a word, and a message pointer pointing to the first word for a data router message packet 30. If the injector common control/status portion 224 asserts the FRAME signal, the message pointer is advanced to point to the same location as the store pointer. In addition, the injector FIFO 321 will assert a MSG AVAIL message available signal. On the other hand, if the injector common control/status portion 224 asserts the FLUSH signal, the store pointer is moved back to point to the same location as the message pointer, so that the previously-written words for the flushed data router message packet 30 can be overwritten.

In addition, the injector FIFO 321 includes a read pointer that points to the next location to be read, and as long as the read pointer has not advanced to point to the same location as the message pointer, the injector FIFO 321 asserts a FIFO NE not empty signal.

The FIFO 321 effectively operates as a buffer between processor 200 and the data router 15. As indicated above, when the message ejector port 223 begins transmitting a data router message packet 30, the data router node 21(1,j,k) connected thereto expects to receive successive flits in the packet 30 in synchrony with successive ticks of the SYS CLK system clock signal, as long as the node 21(1,j,k) maintains the IN FLY injector fly signal asserted. Thus, it will be appreciated that transfers from the FIFO 321, which are directly controlled by a RD FIFO read FIFO signal from an output latch 322 connected to the output of FIFO 321, are effectively controlled by the IN FLY injector fly signal, and by the conditions of stages in the message injector port after the FIFO 321. These stages include the output latch 322, an physical address computation stage 323, a physical address computation stage 324, a message address computation stage 325 and a transmitter stage 326. The transmitter stage 326, while the data router node 22(1,j,k) is asserting the IN FLY injector fly signal, receives the actual IN FLIT injector flit signals that control transmission of the successive flits of the data router message packet 30.

In any event, the FIFO 321, in response to the RD FIFO read FIFO signal from the output latch 322, transmits INJ FIFO OUT (33:0) injector FIFO output signals defining a word. In response to an ADV AACS advance absolute address computation stage signal from the absolute address computation stage 323, which indicates that the stage 323 can accept another word from the FIFO 321, and the FIFO NE not empty signal from the FIFO 321, and in synchrony with the NODE CLK node clock signal, the output latch 322 latches the INJ FIFO OUT injector FIFO output signals from FIFO 321. The output latch thereupon transmits the latched signals to absolute address computation stage 323 as LAT FIFO OUT (33:0) latched FIFO output signals. The output latch 322 also asserts the RD FIFO read FIFO signal to enable the FIFO 321 to transmit to it INJ FIFO OUT injector first-in first-out buffer output signals defining the next word stored in the FIFO 321.

The absolute address computation stage 323 receives the LAT FIFO OUT (33:0) latched FIFO output signals from the output latch 322, determines whether the signals comprise data, an physical address or a relative address, and if the signals comprise a relative address determine an physical address value. The absolute address computation stage 323, in response to an ADV PACS advance physical address computation stage signal from the physical address computation stage 324 and the NODE CLK node clock signal, transmits ABS ADRS/DATA OUT (33:0) absolute address or data output signals to the physical address computation stage 324. The ABS ADRS/DATA OUT (33:0) absolute address or data output signals comprise an physical address or a physical address if the LAT FIFO OUT (33:0) latched FIFO output signals received from the output latch 322 included an address, and data if the LAT FIFO OUT (33:0) latched FIFO output signals comprised data.

If the LAT FIFO OUT (33:0) latched FIFO output signals comprise a relative address, the absolute address computation stage 323 uses the chunk table 327 and the chunk size register 311, maintained by the injector common control/status portion 224 (FIG. 11), in determining the physical address. As will be described in more detail below in connection with FIG. 14, the absolute address computation stage 327 generates a CHUNK TABLE OFFSET (5:0) signals to identify a location in the chunk table 327. In response, the chunk table 327 transmits to the physical address computation stage 323 the contents of the identified location as CT ADRS chunk table address signals. The absolute address computation stage 323 uses the CT ADRS chunk table address signals in generating the physical address. The absolute address computation stage 323 uses the contents of the chunk size register 311 in generating the CHUNK TABLE OFFSET (5:0) signals, and in using the CT ADRS chunk table address signals in generating the physical address.

The physical address generated by absolute address computation stage 323 is the address of the destination leaf 21(y) relative to the beginning of the partition including the source leaf 21(x). The physical address computation stage 324 uses the physical address to determine a physical address, which is the address of the destination leaf 21(y) relative to the first leaf 21(0) in the system 10. In this operation, the stage 324 uses the contents of the partition base register 305. The physical address computation stage 324, in response to a RUN signal from the transmitter stage 326 and in synchrony with the NODE CLK signal, generates PHYS ADRS/DATA OUT (33:0) physical address or data output signals. The PHYS ADRS/DATA OUT (33:0) physical address or data output signals comprise the physical address if the ABS ADRS/DATA OUT (33:0) absolute address or data output signals comprised an address, or data if the ABS ADRS/DATA OUT (33:0) signals comprised data.

The message address computation stage 325 receives the PHYS ADRS/DATA OUT (33:0) physical address or data output signals and generates an address for inclusion in the message address portion 31 of the data router message packet 30. The message address computation stage 325 uses the contents of the physical self address register 312 in this operation. The message address computation stage 325, also in response to the RUN signal from the transmitter stage 326 and in synchrony with the NODE CLK signal, generates MSG OUT (31:0) message out signals. The MSG OUT (31:0) message out signals comprise the message address if the PHYS ADRS/DATA OUT (33:0) physical address or data output signals comprise a physical address, and data if the PHYS ADRS/DATA OUT (33:0) signals comprise data. The high-order MSG OUT (32) signal identifies whether the remaining MSG OUT (31:0) signals represent a message address or data. Finally, the transmitter stage 326 receives the MSG OUT (32:0) message out signals and generates therefrom the IN FLIT inject flit signals, comprising successive four-bit nibbles from the MSG OUT (31:0) signals. The transmitter stage 326 transmits successive nibbles in synchrony with the NODE CLK node clock signal while the IN FLY injector fly signal is asserted. In addition, the transmitter stage 326 uses the IN FLY injector fly signal in generating the RUN signal that controls the message address computation stage 325 and the physical address computation stage 324.

The details of various stages of address computation performed by stages 323 through 325 and of generating successive nibbles for transmission as IN FLIT input flit signals will be described in connection with FIGS. 14 through 20. FIG. 14 depicts details of the absolute address computation stage 323. With reference to FIG. 14, the absolute address computation stage 323 receives the LAT FIFO OUT (33:0) latched FIFO out signals from the output latch 322. The two high-order signals, namely, the LAT FIFO OUT (33:32) signals, which identify whether the LAT FIFO OUT (31:0) signals comprise and address and, if so, the address mode, are coupled to a decoder 330 and one input of a multiplexer 331. If the LAT FIFO OUT (33:32) signals identify the relative address mode, the decoder 330 asserts a REL relative signal.

The absolute address computation stage includes an address/data latch 332 that latches the physical address or data, which are derived from the LAT FIFO OUT (31:0) latched FIFO output signals. The latch 332 latches three groups of signals in unison in response to the ADV AACS advance absolute address computation stage and NODE CLK node clock signals. One group, the LAT FIFO OUT (31:20) signals, are coupled directly to the latch 332 from output latch 322. In one particular embodiment, if the low-order LAT FIFO OUT (19:0) signals comprise address signals, the LAT FIFO OUT (31:20) signals include the length and tag information, and thus would be invariant in the computation. In addition, a second group of signals latched by latch 332, namely, the low order LAT FIFO OUT (1:0) latched FIFO output signals, comprising the two low-order address signals, are also invariant in the computation, and thus are coupled directly to the latch 332.

The third group of signals latched by latch 332 are not invariant in the computation of the physical address. The LAT FIFO OUT (19:2) signals are coupled to one input terminal of a multiplexer 333, which is controlled by the REL relative signal from decoder 330. If the REL relative signal is negated, which will occur if the LAT FIFO OUT (31:0) signals comprise an physical address or data, the multiplexer couples the LAT FIFO OUT (19:2) signals directly to the latch 332. When the ADV PACS advance physical address computation stage signal is asserted, an OR gate 340 is energized to assert an ADV EN advance enable signal, which, in turn, energizes one input terminal of an AND gate 344.

If the REL relative signal is negated, an inverter 339 energizes an OR gate 343, which enables the other input terminal of AND gate 344, enabling it to assert the ADV AACS advance absolute address computation stage signal. The ADV AACS signal enables latch 332, which, in response to the next tick of the NODE CLK node clock signal, latches the LAT FIFO OUT (31:20) signals, the output of multiplexer 333, which corresponds to the LAT FIFO OUT (19:2) signals, and the LAT FIFO OUT (1:0) signals. Accordingly, the latch 332 will latch the entire physical address or data provided by the output latch 322. The latch 332 transmits the latched signals to the physical address computation stage as the ABS ADRS/DATA OUT (31:0) absolute address data out signals.

Contemporaneously, an address mode latch 338 will latch the output of multiplexer 331. The multiplexer 331 selectively couples either the LAT FIFO OUT (33:32) address mode signals or NOP (1:0) null operation signals to the input terminals of the address mode latch 338 in response to a LD NOP MOD load null operation mode signal from an AND gate 345. As will be described below in more detail, the NOP (1:0) null operation signals comprise a code that identifies an error condition in connection with conversion from a relative address to an physical address. In this case, since the REL relative signal is negated, the AND gate 345 is de-energized and the LD NOP MOD load null operation mode signal is negated, enabling the multiplexer 331 to couple the LAT FIFO OUT (33:32) signals to the mode latch 338. The mode latch 338 transmits the latched signals to the physical address computation stage as the ABS ADRS/ DATA OUT (33:32) absolute address/data out signals.

On the other hand, if the REL relative signal is asserted, which will occur if the LAT FIFO OUT (31:0) signals comprise a relative address, the multiplexer 333 couples CONV ABS ADRS (19:2) converted absolute address signals to the latch 332. The CONV ABS ADRS (19:2) converted absolute address signals are provided by a conversion circuit comprising a window extractor 334, the chunk table 327, a window inserter 335 and a window identifier 336.

The window extractor 334 receives the LAT FIFO OUT (17:2) signals and WIN SEL window select signals and generates, in response thereto, the CHUNK TABLE OFFSET (5:0) signals to address the chunk table 327. The WIN SEL window select signals identify a set of six consecutive signals in the LAT FIFO OUT (17:2) signals for the window extractor to couple to the chunk table 327 as the CHUNK TABLE OFFSET (5:0) signals.

As noted above, the contents of chunk size register 311 identify the level "i" in the data router 15 at which each data router node group 20(i,j) defines a chunk. In one particular embodiment, the lowest level in the data router 15 at which a chunk may be defined is level four, which has at least two-hundred and fifty six consecutive leaves 21(i) each identified by a data router address. In that embodiment, each chunk is defined by the encoding of the LAT FIFO OUT (7:2) signals. In the same embodiment, the highest level at which a chunk may be defined is level nine, which has at least 256 k (k=1024) consecutive leaves. In that case, each chunk is defined by the encoding of the LAT FIFO OUT (17:12) signals.

As the chunk size, as indicated by the value stored in the chunk size register 311, increases, higher order ones of the LAT FIFO OUT (19:2) signals are used to access the chunk table 327. The window identifier 336 decodes the contents of the chunk size register to identify the beginning of six sequential ones of the LAT FIFO OUT (17:2) signals to address the chunk table 327. The WIN SEL window select signals enable the window extractor 334 to select the particular ones of the LAT FIFO OUT (19:2) signals to address the chunk table 327, and transmit them to the chunk table 327 as the CHUNK TABLE OFFSET (5:0) signals. If, for example, the chunk size register 311 identifies the chunk size as being two-hundred and fifty six, the window extractor 334 selects the LAT FIFO OUT (7:2) signals, whereas if it identifies the chunk size as being 256 k (k=1024) the window extractor 334 selects the LAT FIFO OUT (17:12) signals. For window sizes between two hundred and fifty six and 256 k, incrementing by powers of "four," the window extractor selects six consecutive ones of the LAT FIFO OUT (9:4), LAT FIFO OUT (11:6), LAT FIFO OUT (13:10), and LAT FIFO OUT (15:12) signals, respectively.

When the physical address computation stage 324 asserts the ADV PACS advance physical address computation stage signal, the signal energizes an OR gate 340, which asserts an ADV EN advance enable signal. The ADV EN advance enable signal enables one input terminal of an AND gate 341. If the decoder 330 is asserting the REL relative signal, indicating that the LAT FIFO OUT (31:0) signals represent a relative address, the AND gate 341 is energized to assert a READ CT read chunk table signal, which is coupled to a read enable terminal of the chunk table 327. In response to the asserted READ CT read chunk table signal, the chunk table 327 transmits the contents of the location identified by the CHUNK TABLE OFFSET (5:0) signals as CT ADRS (5:0) chunk table address signals to the window inserter 335, and asserts a CT VALID chunk table valid signal.

The window inserter 335 essentially performs the reverse operation as the window extractor. The window inserter substitutes the six-bit CT ADRS (5:0) chunk table address signals into the LAT FIFO OUT (19:2) signals, into six sequential bit locations represented by the LAT FIFO OUT (19:2) signals, and couples the result as CONV ABS ADRS (19:2) converted absolute address signals to the second input terminal of multiplexer 333. The window inserter substitutes the CT ADRS (5:0) chunk table address signals for the same order signals as were extracted by the window extractor 334. The multiplexer 333, under control of the asserted REL relative signal from decoder 330, couples the CONV ABS ADRS (19:2) converted absolute address signals to the input terminal of latch 332.

The CT VALID chunk table valid signal, when asserted, indicates that the CT ADRS (5:0) chunk table address signals represent a valid value. In one embodiment, delays of several ticks of the NODE CLK signal may be required between the time the CHUNK TABLE OFFSET signals are coupled to the input terminals of the chunk table and the READ CT read chunk table signal is asserted, and the time the chunk table 327 provides valid CT ADRS (5:0) signals. During that time, signals may nonetheless be latched in the latches 332 and 338. The CT VALID signal, if negated, essentially enables signals representing a null operation code to be latched in the mode latch 338, which can be used by subsequent stages, if they progress thereto, to indicate that the latched signals should be ignored. It will be appreciated that, since the chunk table 327 is only used in connection with relative addresses, if the address is a physical address, or if the LAT FIFO OUT (33:0) signals represent data, the CT VALID signal will be ignored and the null operation code will not be used.

More specifically, if the chunk table 327 transmits a negated CT VALID chunk table valid signal, an inverter 346 enables an input terminal of AND gate 345. If (a) the REL signal is asserted, indicating that the LAT FIFO OUT (33:0) signals represent a relative address, and (b) an ADV PACS signal is asserted, which in turn enables an OR gate 340 to assert an ADV EN advance enable signal, the AND gate 345 is energized to assert the LD NOP MOD load null operation mode signal. The asserted LD NOP MOD signal enables the multiplexer 331 to couple NOP null operation signals to the input terminal of mode latch 338, which latches them instead of the LAT FIFO OUT (33:32) signals. AND gate 345 remains asserted until the CT VALID signal is asserted.

Contemporaneously, an address mode latch 338 will latch the output of multiplexer 331. The multiplexer 331 selectively couples either the LAT FIFO OUT (33:32) address mode signals or NOP (1:0) null operation signals to the address mode latch 338 in response to the LD NOP MOD load null operation mode signal from AND gate 345. Since the LD NOP MOD signal is asserted, the multiplexer 331 couples NOP null operation signals to the mode latch 338. If the absolut address computation stage 323 is asserting the ADV AACS advance enable signal, the mode latch 338 latches the coupled NOP signals at the next tick of the NODE CLK signal. The mode latch 338 transmits the latched signals to the physical address computation stage as the ABS ADRS/DATA OUT (33:32) absolute address/data out signals.

On the other hand, when the chunk table 327 transmits an asserted CT VALID signal, inverter 346 disables AND agate 345 to negate the LD NOP MOD signal. In addition, the asserted CT VALID signal enables one input terminal of an AND gate 342. The assertion of the REL relative signal enables the other input terminal of AND gate 342, which is energized to assert a REL ADV relative advance signal. The REL ADV relative advance signal energizes an OR gate 343, which, in turn, enables one input terminal of an AND gate 344. Since the asserted ADV EN advance enable signal is enabling the other input terminal of AND gate 344, the AND gate 344 is energized, thereby asserting an ADV AACS advance absolute address computation stage signal. The asserted ADV AACS signal enables the latch 332, which latches the LAT FIFO OUT (31:20), CONV ABS ADRS (19:2) and LAT FIFO OUT (1:0) signals at the next tick of the NODE CLK node clock signal. The latch 332 transmits the latched signals to the physical address computation stage as the ABS ADRS/DATA OUT (31:0) absolute address data out signals.

It will be appreciated that, since the ADV AACS advance absolute address computation stage signal is asserted, the output latch 322 will latch the next word from the injector FIFO 321. Since the next word will be the next word of the message, not an address word, the LAT FIFO OUT (33:32) signals will not indicate that the LAT FIFO OUT (31:0) signals represent a relative address. In that case the decoder 330 will negate the REL relative signal, enabling the multiplexer 333 to couple the LAT FIFO OUT (19:2) signals to the input terminal of address/data latch 332.

The negated REL relative signal also enables an inverter 339 to energize OR gate 343, which, in turn, enables one input terminal of AND gate 344. If the ABS ADR NOP absolute address null operation signal from comparator 347 is not asserted, when the physical address computation stage 324 next asserts the ADV PACS advance physical address computation state signal, OR gate 340 is energized. In response the AND gate 344 asserts the ADV AACS advance absolute address computation stage signal, enabling the address/data latch 332 to latch the LAT FIFO OUT (31:0) signals at the next tick of the NODE CLK signal.

In addition, since the REL relative signal is negated, AND gate 345 maintains the LD NOP MOD load null operation signal negated, thereby enabling the multiplexer 331 to couple the LAT FIFO OUT (33:32) signals to the input terminal of mode latch 338. The mode latch 338 latches these signals contemporaneously with the latching by the address/data latch 332 of the LAT FIFO OUT (31:0) signals. It will be appreciated that these operations will occur iteratively with each tick of the NODE CLK signal, while the ADV PACS advance physical address computation stage signal is set, enabling the data words to be iteratively latched in the latches 332 and 338 and thereby transmitted through the absolute address computation stage.

The absolute address computation stage 323 includes a comparator 347 that compares the ABS ADRS/DATA OUT (33:32) absolute address/data out signals to SND ADRS NOP send address null operation signals. If the multiplexer 331 coupled the NOP null operation signals to be latched by the mode latch 338, the comparator will assert an ABS ADR NOP absolute address null operation signal, which enables the OR gate 340 to assert the ADV EN advance enable signal. Since the REL relative signal is negated, inverter 339, through OR gate 343 enables one input terminal of AND gate 344, which is energized to assert the ADV AACS advance absolute address computation stage signal.

As described above, the ADV AACS signal enables the latches 332 and 338 to latch the next word defined by the LAT FIFO OUT (33:0) signals provided by the output latch 322 at the next tick of the NODE CLK signal, and enables the output latch 322 to supply the next word in the FIFO 321. This occurs iteratively with successive ticks of the NODE CLK node clock signal until the next address word is latched in latches 332 and 338, in which case the ABS ADR NOP absolute address null operation signal is negated. At that point, control over the sequencing through the absolute address computation stage 323 returns to the ADV PACS advance physical address computation stage signal from the physical address computation stage 324.

Figure 15:
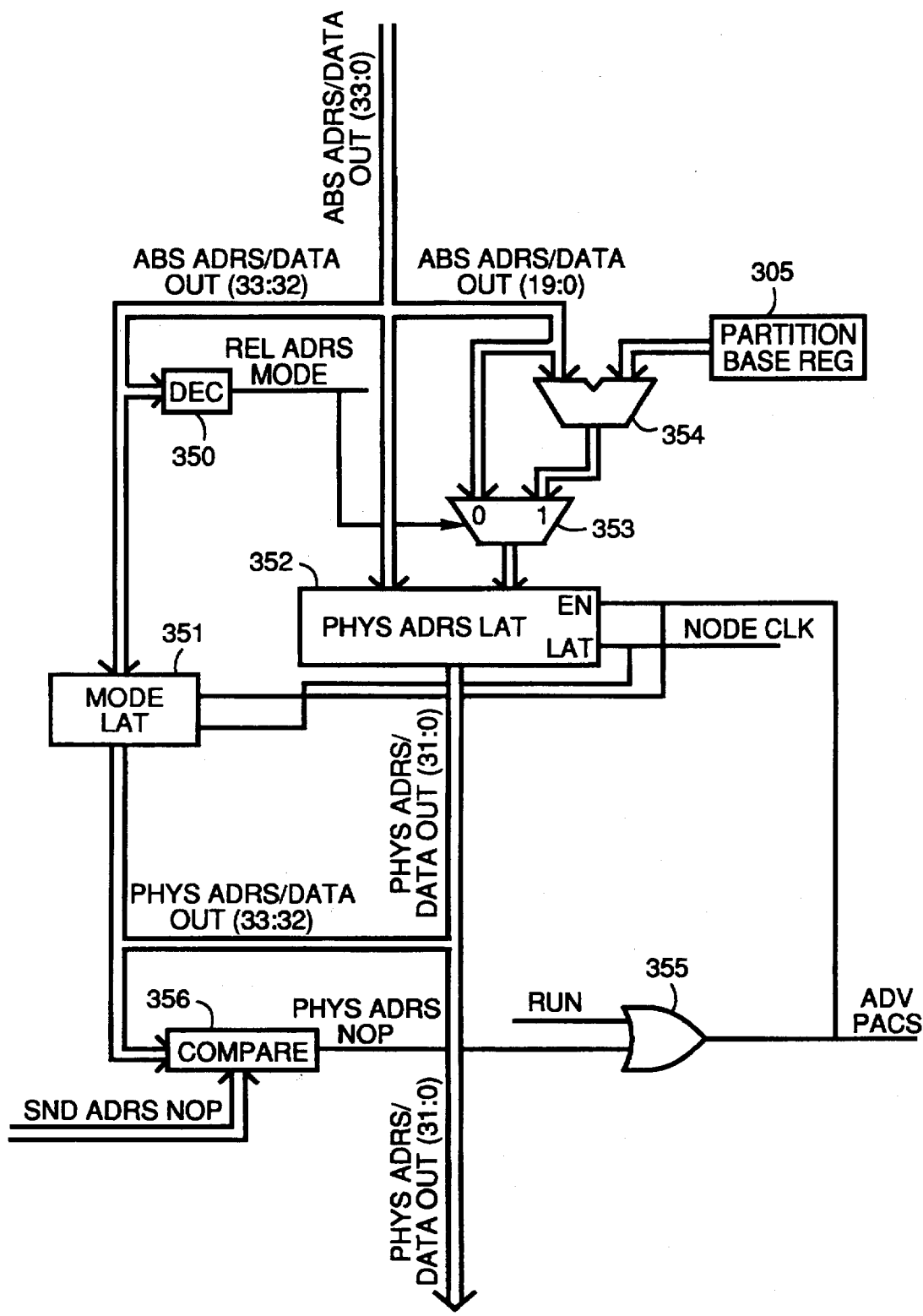

As noted above, the absolute address computation stage 323 transmits ABS ADRS/DATA OUT (33:0) absolute address/data output signals, in the form of successive words, to the physical address computation stage 324. In this operation, if the ABS ADRS/DATA OUT (31:0) signals represent an address derived from signals representing a relative address, the physical address is obtained by adding the address value to the value in the partition base register 305. If the ABS ADRS/DATA OUT (31:0) signals represent an address derived from signals representing an physical address, the address from the absolute address computation stage is the physical address. In either case, the address mode, as indicated by the high order ABS ADRS/DATA OUT (33:32) signals, control the operations of the physical address computation stage. FIG. 15 depicts a detailed block diagram of the physical address computation stage 324.

With reference to FIG. 15, the physical address computation stage 324 receives the ABS ADRS/DATA OUT (33:0) signals and couples the two high order ABS ADRS/DATA OUT (33:32) signals to the input terminal of a decoder 350 and one input terminal of a mode latch 351. At this point, if the ABS ADRS/DATA OUT (31:0) signals represent an address, the two high-order ABS ADRS/DATA OUT (33:32) signals continue to indicate the address mode of the original address. If the ABS ADRS/DATA OUT (33:32) signals identify the relative address mode, decoder 350 generates a REL ADRS MODE relative address mode signal.

Of the remaining ABS ADRS/DATA OUT (31:0) absolute address/data out signals, the high-order ABS ADRS/DATA OUT (31:20) signals are coupled directly to the input terminal of a physical address latch 352. As noted above, if the ABS ADRS/DATA OUT (31:0) signals represent an address, the high-order ABS ADRS/DATA OUT (31:0) signals carry the message length and tag signals for inclusion in fields 34 and 35 of a data router message packet 30, and thus are invariant under conversion. The remaining ABS ADRS/DATA OUT (19:0) signals, comprising the address are coupled to one input terminal of a multiplexer 353 and one input terminal of an adder 354. The second input terminal of adder 354 is provided by the partition base register 305.

The multiplexer 353 is controlled by the REL ADRS MODE relative address mode signal from the decoder 350. If the REL ADRS MODE relative address mode signal is negated, indicating that the ABS ADRS/DATA OUT (19:0) signals represent either an physical address or data, the multiplexer 353 couples them directly to the physical address latch 352. If the transmitter stage 326 is asserting the RUN signal, an OR gate 355 asserts the ADV PACS advance physical address computation stage signal, enabling the physical address latch 352 and the mode latch 352 to latch the signals at their respective input terminals in synchrony with the next tick of the NODE CLK signal. In this case, the physical address latch 352 will latch the ABS ADRS/DATA OUT (31:20) signals directly from the absolute address computation stage, and the ABS ADRS/DATA OUT (19:0) signals coupled thereto by the multiplexer 353.

On the other hand, if the decoder 350 is asserting the REL ADRS MODE relative address mode signal, indicating that the ABS ADRS/DATA OUT (31:0) signals are derived from a relative address, the multiplexer 353 couples signals output from the adder 354 to the physical address latch 352. These signals represent a value comprising the sum of the address defined by the current ABS ADRS/DATA OUT (19:0) absolute address/data output signals and the contents of the partition base register. If the OR gate 355 is asserting an ADV PACS advance physical address computation stage signal, the physical address latch 352 latches these signals, along with the ABS ADRS/DATA OUT (31:0) signals, in synchrony with the next tick of the NODE CLK signal. The mode latch 351 provides the high-order PHYS ADRS/DATA OUT (33:32) physical address/data output signals, and the physical address latch 352 provides the low order PHYS ADRS/DATA OUT (31:0) signals, both of which are coupled to the message address computation stage 325.

The high-order PHYS ADRS/DATA OUT (33:32) physical address/data output signals are also coupled to an input terminal of a comparator 356. The comparator 356 also receives the SND ADRS NOP send address null operation signals. If the PHYS ADRS/DATA OUT (33:32) signals correspond to the SND ADRS NOP send address null operation signals, the comparator 351 generates a PHYS ADRS NOP physical address null operation signal. It will be appreciated that the comparator 356 asserts the PHYS ADRS NOP signal under the same circumstance as the comparator 347 asserts the ABS ADRS NOP absolute address null operation signal. That is, the comparator 356 asserts the PHYS ADRS NOP signal in response to the coincidence of (i) the ABS ADRS/DATA OUT (19:0) signals representing a relative address and (ii) the chunk table location 327 used by the absolute address computation stage 323 (FIG. 14) was not valid.

The asserted PHYS ADRS NOP physical address null operation signal also enables the physical address computation stage to perform operations similar to that performed by the absolute address computation stage in response to the asserted ABS ADRS NOP signal, that is, sequencing through words of a message provided thereto by the absolute address computation stage until it receives a valid word. The asserted PHYS ADRS NOP physical address null operation signal enables the OR gate 355 to maintain the ADV PACS advance physical address computation stage signal asserted, enabling the latches 351 and 352 to iteratively latch the signals provided thereto in response to successive ticks of the NODE CLK signal, until the comparator 356 determines that the contents of the mode latch 351 are associated with a valid address word.

The PHYS ADRS/DATA OUT (33:0) physical address data out signals are coupled to the message address computation stage 325. If the high-order PHYS ADRS/DATA OUT (33:32) signals indicate that the remaining PHYS ADRS/DATA OUT (31:0) signals correspond to an address, the message address computation stage 325 (i) determines the contents of the header field 40, (ii) arranges the first thirty-two bit message word, which includes the header, the down path identification portion 41, the message length field 34 and the message tag field 35, and (iii) latches the message word for transmission to the transmitter stage. If the PHYS ADRS/DATA OUT (33:32) signals indicate that the remaining PHYS ADRS/DATA OUT (31:0) signals do not comprise an address, they comprise data that are latched for transmission to the transmitter stage.

Figure 16:
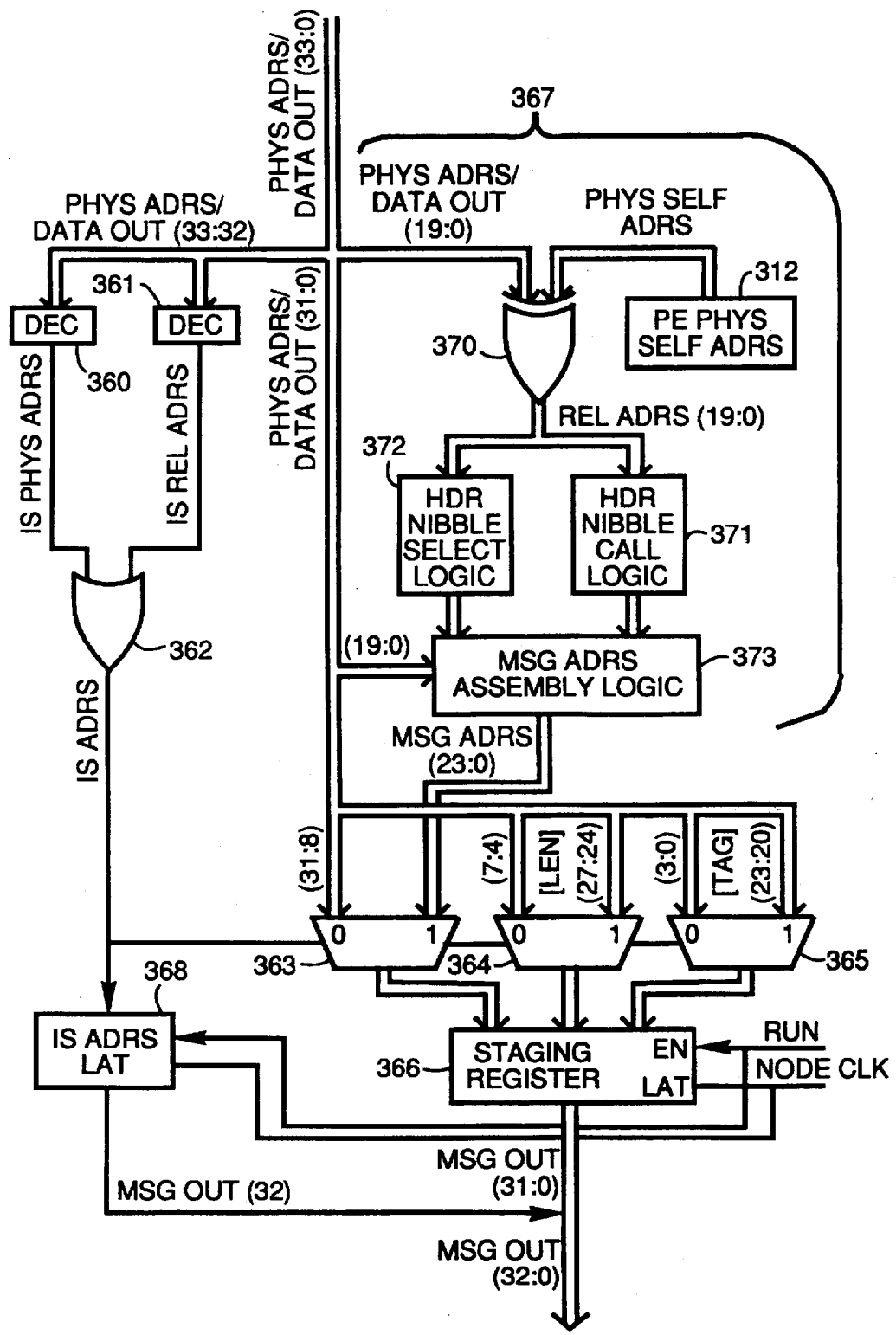

A detailed block diagram of the message address computation stage is depicted in FIG. 16. With reference to FIG. 16, the high-order PHYS ADRS/DATA OUT (33:32) physical address/data out signals are coupled to two decoders 360 and 316. If the PHYS ADRS/DATA OUT (33:32) signals indicate that the associated low order PHYS ADRS/DATA OUT (31:0) signals are derived from an address word including a physical address, decoder 360 asserts an IS PHY ADRS signal. On the other hand, if the PHYS ADRS/DATA OUT (33:32) signals indicate that the associated low order PHYS ADRS/DATA OUT (31:0) signals are derived from an address word including a relative address, decoder 360 asserts an IS REL ADRS signal. Both the IS PHYS ADRS signal and IS REL ADRS signal are coupled to input terminals of an OR gate 362, which generates an asserted IS ADRS is address signal when either the IS PHYS ADRS signal or the IS REL ADRS signal is asserted. Thus, the IS ADRS signal will be asserted if the PHYS ADRS/DATA OUT (31:0) signals represent an address word.

Selected ones of the low-order PHYS ADRS/DATA OUT (31:0) physical address/data out signals are coupled to respective input terminals of three multiplexers 363, 364, and 365. In particular, the PHYS ADRS/DATA OUT (31:8) signals are coupled to one data input terminal of multiplexer 363, the PHYS ADRS/DATA OUT (7:4) signals are coupled to the corresponding data input terminal of multiplexer 364, and the PHYS ADRS/DATA OUT (3:0) signals are coupled to the corresponding data input terminal of multiplexer 365. If the IS ADRS signal is negated, which occurs if the PHYS ADRS/DATA OUT (31:0) signals represent data, the multiplexers 363, 364 and 365 couple the signals at these data input terminals through their respective output terminals to the input terminal of a staging register 366. If the transmitter stage 326 is asserting the RUN signal, the staging register latches these signals in response to the next tick of the NODE CLK signal. The latched signals are coupled to the transmitter stage 326 as the MSG OUT (31:0) signals.

The second data input terminals of multiplexers 364 and 365 are coupled to PHYS ADRS/DATA OUT (27:24) signals and PHYS ADRS/DATA OUT (23:20) signals respectively. These signals represent the message length and message tag, which are inserted into fields 34 and 35, respectively, of the data router message packet 30 (FIG. 4). The second data input terminal of multiplexer 363 is coupled to a message address portion generating circuit 367 which, in response to the PHYS ADRS/DATA OUT signals (19:0), generates MSG ADRS (23:0) signals, which represent the header 40 and down path identification portion 41 of the message address portion 31 of the data router message packet 30 to be transmitted. When the OR gate 362 asserts the IS ADRS signal, multiplexers 363, 364 and 365 couple the signals at their second data input terminals to the input terminals of staging register 366. If the transmitter stage 326 is asserting the RUN signal, the staging register latches these signals in response to the next tick of the NODE CLK signal. In particular, the staging register 366 latches the message address portion in its bits thirty-one through eight, the length in bits seven through four, and the tag in bits three through zero. The latched signals are coupled to the transmitter stage 326 as the MSG OUT (31:0) signals.

In addition, if the transmitter stage 326 is asserting the RUN signal, a register 368 latches the IS ADRS is address signal in response to the next tick of the NODE CLK signal. The latched signal is coupled to the transmitter stage 326 as the MSG OUT (32:0) signal.

The general block diagram of the message address portion generating circuit 367 is depicted in FIG. 16, and logic diagrams of several circuits therein are depicted in FIGS. 16 through 19. The message address portion generating circuit 367 includes an exclusive-OR ("XOR") gate 370, which receives the PHYS ADRS/DATA OUT (19:0) signals and the contents of physical self address register 312, and generates REL ADRS (19:0) relative address signals which comprises the bit-wise exclusive-OR of the input signals. That is, for example, the XOR gate 370 generates the REL ADRS (19) signal as the exclusive-OR of the PHYS ADRS/DATA OUT (19) signal and bit nineteen from the physical self address register 312. The REL ADRS (19:0) relative address signals have a binary-encoded value that represents the displacement from the source leaf 21(x) to the destination leaf 21(y).

The REL ADRS (19:0) relative address signals are coupled to input terminals of a header nibble calculation logic circuit 371 and a header nibble select logic circuit 372. The header nibble calculation logic 371 (FIG. 17) uses the REL ADRS (19:0) signals to determine the level in data router 15 to which the data router message packet 30 must be sent to reach its destination. As described above, the height is the level "i" of the first data router node group 20(i,j) which the data router node packet 30 reaches in the upward path through the data router 15 that is the root of a sub-tree that includes both the source leaf 21(x) and destination leaf 21(y). The header nibble calculation logic 371 generates a four-bit nibble, comprising HDR (3:0) header signals, that is binary-encoded to identify this level.

The header nibble select logic circuit 372 (FIG. 18) determines the four-bit nibble, in the MSG ADRS (23:0) message address signals, into which the HDR (3:0) header signals will be inserted. This will depend upon the number of flits in the down path identification portion 41 of the message, which, in turn, depends on the level "i" to which the data router node groups 20(i,j) transmit the message packet 30 in the data router 15. Essentially, the header nibble select logic circuit 372 identifies the first nibble, beginning with the most-significant nibble, in the PHYS ADRS/DATA OUT (19:0) signals from the physical address computation stage 324 (FIG. 15) which do not all represent the value zero. The header is inserted into the message address signals just above the identified nibble.

Figure 19:
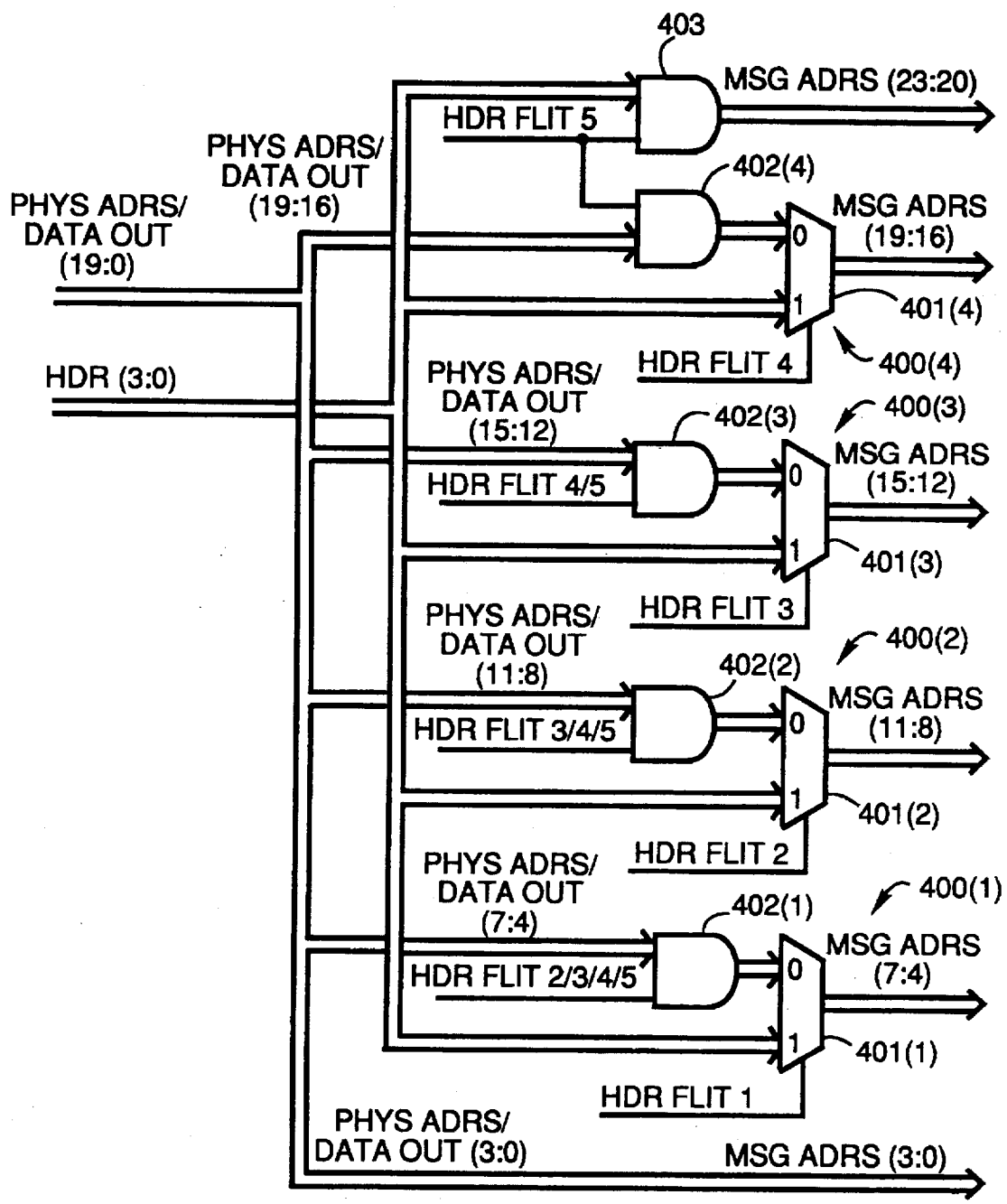

The HDR (3:0) header signals and the signals from the header nibble select logic circuit 372 are coupled to a message address assembly logic circuit 373 (FIG. 19). This circuit also receives the PHYS ADRS/DATA OUT (19:0) physical address/data out signals from the physical address computation stage 324 (FIG. 15). The message address assembly logic circuit 373 generates the MSG ADRS (23:0) message address signals by inserting the HDR (3:0) signals into the four-bit nibble identified by the signals from the header nibble select logic circuit 372. It will be appreciated that the message address assembly logic circuit 373 essentially transmits the nibbles of the PHYS ADRS/DATA OUT (19:0) signals which do not represent the value zero as low-order MSG ADRS message address signals, and the HDR (3:0) header signals in the next higher-order nibble.

Figure 17:
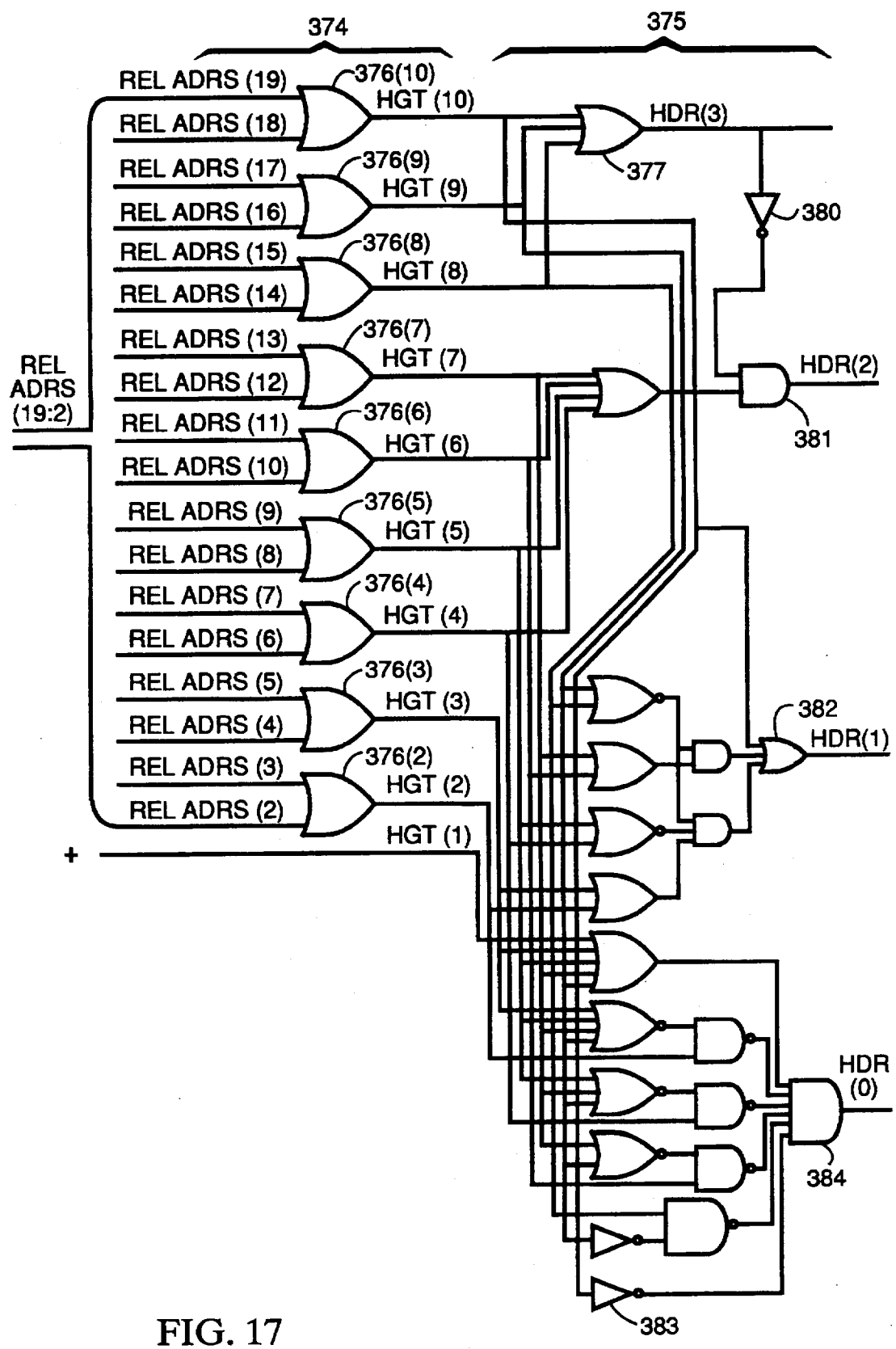

FIG. 17 depicts the logic diagram of the header nibble calculation logic circuit 371. With reference to FIG. 17, the circuit 371 includes a height identifier circuit 374 that generates HGT (10:1) height identifier signals in response to the REL ADRS (19:2) relative address signals, and a decoder 375. The height identifier circuit 374 includes nine OR gates 376(2) through 376(10) [generally identified by reference numeral 376(i)], each of which receives two of the REL ADRS (19:2) signals and generates a HGT (i) signal in response. If a HGT (i) signal is asserted, the message packet 30 will go to at least that level "i" to reach a data router node group 20(i,j) that is the root of the smallest sub-tree including both the source leaf 21(x) and the destination leaf 21(y). If a HGT (i') signal having a higher index "i" is asserted, the message packet 30 will have to go at least to that level "i."

Thus, OR gate 376(10) receives the REL ADRS (19) and REL ADRS (19) signals and generates the HGT (10) height signal in response thereto. If either the REL ADRS (19) or REL ADRS (18) signals are asserted, the root of the smallest sub-tree of data router 15 including both the source leaf 21(x) and destination leaf 21(y) is at level 10. On the other hand, if, for example, the REL ADRS (19:14) signals are negated, and the REL ADRS (13) signal is asserted, the displacement between the source leaf 21(x) and the destination leaf 21(y) is not as great, and so the root of the sub-tree including both leaves will be at a lower level. In that case, the root of the smallest sub-tree including both the source and destination leaves 21(x) and 21(y) is at level 7. OR gate 376(7), which receives the REL ADRS (13) signal, asserts the HGT (7) height signal in response to the asserted REL ADRS(13) signal.

Since the message packet 30 will always be transmitted to at least level 1 in the data router 15, a HGT (1) height signal is maintained at an asserted level.

It will be appreciated that, depending on the particular encoding of the REL ADRS (19:2) relative address signals, several of the HGT (10:2) signals may be asserted. In any case, the HGT (i) signal that identifies the level "i" of the smallest sub-tree including both the source and destination leaves 21(x) and 21(y) will always be asserted. The decoder 375 generates HDR (3:0) header signals that are binary-encoded with the largest index value "i" of the asserted HGT (i) signals. Thus, for example, if the HGT (10) height signal is asserted, index (10) is represented by binary encoding (1010). To accommodate that encoding, the HGT (10) height signal enables an OR gate 377 to assert the HDR (3) signal, which provides the high-order "1" in the binary encoding (1010). The high-order "1" is also asserted in response to the assertions of the HGT (9) signal and the HGT (8) signal, and so the OR gate 377 is also connected to OR gates 376(9) and 376(8).

Since the highest level in the embodiment of data router 15 disclosed herein is 10, if the high-order HDR (3) header signal is asserted, the second-order HDR (2) signal is never asserted; otherwise the encoding of the HDR (3:0) signals would represent binary-encoded values greater than ten. Accordingly, if the HDR (3) header signal is asserted, an inverter 380 disables an AND gate 381 to maintain the HDR (2) signal at a negated level. Thus, the HDR (2) signal would be negated even if a HGT (i) signal is asserted that would otherwise result in assertion of the HDR (2) signal.

Continuing with the example in which the HGT (10) signal is asserted, the asserted HGT (10) signal also enables an OR gate 382 to assert the HDR (1) signal, providing the third-order "1" in the binary encoding (1010). In addition, an inverter 383 disables an AND gate 384 to negate the HDR (0) signal and providing the low-order "0." The inverter 383 maintains the HDR (0) signal at a negated state even if other HGT (i) signals are asserted that would otherwise result in assertion of the HDR (1) signal.

The decoder 375 includes a number of other gates that selectively enable and disable gates 377, 381, 382 and 384 to enable generation of the appropriate HDR (3:0) header signals in response to the HGT (i) height signals. Since the operation of the decoder will be apparent to those skilled in the art, it will not be further described herein.

Figure 18:
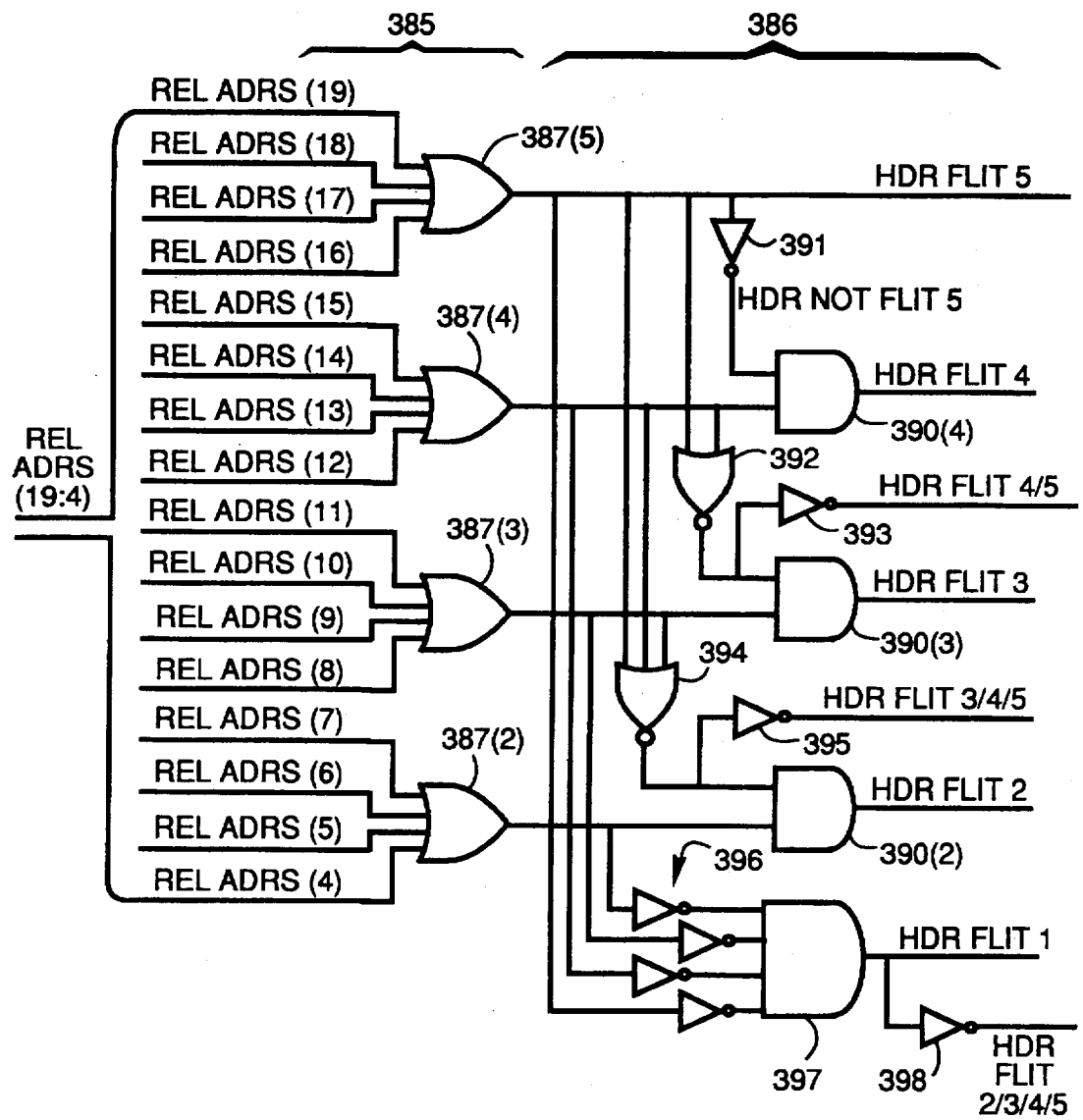

The header nibble select logic circuit 372 (FIG. 16) is depicted in FIG. 18. With reference to FIG. 18, the circuit 372 comprises a height-pair identifier circuit 385 and a decoder 386. The height-pair identifier circuit includes a set of OR gates 387(5) through 387(2) [generally identified by reference numeral 387(i)], each of which receives four of the REL ADRS (19:4) relative address signals. With reference to FIG. 17 as well, it will be appreciated that each OR gate 387(i) corresponds to two OR gates 376(i); that is, each OR gate 387(i) is energized by the REL ADRS signals when either of two OR gates 376(i) is energized thereby. Thus, for example, if either of OR gate 376(3) or 376(4) is energized to assert the HGT(4) OR HGT(3) signals, indicating that the message packet 30 will be transmitted to at least either of those levels in the data router 15, OR gate 387(2) will also be energized. Similarly, OR gate 387(3) is energized when either the HGT (5) or HGT (6) signal is asserted, OR gate 387(4) is energized when the HGT (7) or HGT (8) signal is asserted, and OR gate 387(5) is energized when the HGT (9) or HGT (10) signal is asserted.

If an OR gate 387(i) is energized, the header 40 comprises flit "i" of the message address portion 31 of the message packet 30, counting from the first flit of the message address portion 31 which is identified as flit zero. If one of the REL ADRS (19:16) relative address signals are asserted, there are nine or ten down-path identifiers 42 requiring five flits in the down path identifier portion 41. Thus, if any of the REL ADRS (19:16) signals is asserted, OR gate 387(5) asserts a HDR FLIT 5 signal, indicating that the header 40 comprises flit "5" of the message address portion 31. OR gates 387(4) through 387(2) operate similarly in response to the other REL ADRS (15:4) signals.

The decoder 386 determines the energized OR gate 387(i) with the highest index value (i) and in response generates signals for controlling the message address assembly logic circuit 373 (FIG. 19). If the OR gate 387(5) is energized, the decoder 386 asserts a HDR FLIT 5 signal, indicating that the header 40 is in flit "5" of the message address portion 31. The decoder 386 includes three AND gates 390(2) through 390(4), each of which has one input terminal connected to the output of a respective OR gate 387(2) through 387(4). If the OR gate 387(4) is energized, one input terminal of AND gate 390(4) is enabled. If the OR gate 387(5) is not energized, an inverter 391 asserts a HDR NOT FLIT 5 signals, energizing the AND gate to assert a HDR FLIT 4 signal indicating that the header 40 comprises flit "4" of the message address portion, and that there are four flits in the down path identification portion.

Similarly, if OR gate 387(3) is energized, one input terminal of AND gate 390(3) is enabled. If both the OR gates 387(4) and 387(5) are disabled, a NOR gate 392 energizes the second input terminal of AND gate 390(3), enabling it to assert the HDR FLIT 3 signal, indicating that the header 40 comprises flit "3" of the message address portion 31, and that there are three flits in the down path identification portion 41. An inverter 393 inverts the output of NOR gate 392 to assert an HDR FLIT 4/5 signal, indicating that the header is in either flit "4" or "5". AND gate 390(2) operates similarly in response to the energization of the OR gate 387(2) and a NOR gate 394. If the OR gate 387(2) is energized and OR gates 387(3) through 387(5) disabled, AND gate 390(2) asserts a HDR FLIT 2 signal, indicating that the header 40 comprises flit "2" of the message address portion 31. If the NOR gate 394 is not energized, an inverter 395 asserts a HDR FLIT 3/4/5 signal indicating that the header comprises either flit "3," "4," or "5."

Finally, if all of the OR gates 387(2) through 387(5) are disabled, a set of inverters 396 enables an AND gate 397 to assert a HDR FLIT 1 signal, indicating that the header 40 is in flit "1" of the message address portion 31, and that the down path identification portion 41 of the message packet includes one flit, namely, flit "0." If the AND gate 397 is disabled, such that the HDR FLIT 1 signal is negated, an inverter 398 asserts a HDR FLIT 2/3/4/5 signal indicating that the header 40 is in either flit "2," "3," "4," or "5."

The message address assembly logic 373 (FIG. 19) uses the signals from the header nibble select logic 372 to control the insertion of the HDR (3:0) header signals in the MSG ADRS (23:0) message address signals. With reference to FIG. 19, the message address assembly logic 373 receives the PHYS ADRS/DATA OUT (19:0) physical address/data out signals and directs four-bit nibbles to gate circuits 400(1) through 400(4) [generally identified by reference numeral 401(i)] which control the selection of the nibble of the MSG ADRS message address signals onto which the HDR (3:0) header signals are transmitted. Since the message address portion 31 of a data router message packet 30 always includes at least one flit in the down path identification portion 41, which is represented by the low-order nibble MSG ADRS (3:0) signals, the PHYS ADRS/DATA OUT (3:0) signals are transmitted directly as MSG ADRS (3:0) message address signals.

Each gate circuit 400(1) through 400(4) includes a multiplexer 401(1) through 401(4) [generally identified by reference numeral 401(i)] and an AND gate 402(1) through 402(4) [generally identified by reference numeral 402(i)]. In each gate circuit 400(i), the multiplexer 401(i) couples either the HDR (3:0) signals or a nibble of the PHYS ADRS/DATA OUT coupled to its associated AND gate 402(i) over one particular nibble of the MSG ADRS message address signals, in response to the HDR FLIT (i) signal from the header nibble select logic 372. The respective AND gate 402(i) is controlled by the HDR FLIT i+1/ . . . /5 signal from the header nibble select logic.

Thus, if, for example, the header nibble select logic determines that the header comprises, flit "1" of the message address portion 372, the HDR FLIT 2/3/4/5 signal is negated, disabling the AND gate 402(1). The HDR FLIT 1 signal is asserted, enabling the multiplexer 401(1) to transmit the HDR (3:0) header signals as the MSG ADRS (7:4) message address signals. As noted above, the message address assembly logic transmits the PHYS ADRS/DATA OUT (3:0) physical address/data out signals as the MSG ADRS (3:0) message address signals.

The other HDR FLIT (i) signals are negated, enabling the respective multiplexers 401(i) (i=2, 3 and 4) to couple the values at their "zero" data input terminals as the respective MSG ADRS signals. In that case, since the other HDR FLIT i+1/ . . . /5 signals are also negated, the other AND gates 402(i) are disabled, so that the input terminals to multiplexers at the "zero" data input terminals are all zero, thus ensuring that the respective MSG ADRS message address signals transmitted thereby all represent the value zero. In addition, an AND gate 403, which receives the HDR (3:0) signals, is disabled by the negated HDR FLIT 5 signal, thereby ensuring that the MSG ADRS (23:20) message address signals all represent the value zero.

If, as another example, the header nibble select logic 372 is asserting the HDR FLIT (3) signal, indicating that the header 40 comprises flit "3" of the message address portion 31, the HDR FLIT 2/3/4/5 and HDR FLIT 3/4/5 signals are asserted, and the HDR FLIT 4, HDR FLIT 5 and HDR FLIT 4/5 signals are negated. In that case, the multiplexer 401(3) is enabled to transmit the HDR (3:0) header signals as the MSG ADRS (15:12) message address signals. Since the HDR FLIT 4, HDR FLIT 5 and HDR FLIT 4/5 signals are negated, AND gates 402(3) through 402(5) are all disabled. As a result, the MSG ADRS (23:20) message address signals are all negated, representing the value zero. Similarly, the negated HDR FLIT 4 signal enables the multiplexer 402(4) to couple the signals from AND gate 402(4) as the MSG ADRS (19:16) signal. Since the AND gate 402(4) is disabled, the MSG ADRS (19:16) represent the value zero.

Continuing with the example, since the HDR FLIT 1 and HDR FLIT 2 signals are also negated, multiplexers 401(1) and 401(2) transmit the signals from their respective AND gates 402(1) and 402(2) as the respective MSG ADRS signals. Since the AND gates are enabled by the asserted HDR FLIT 2/3/4/5 and HDR FLIT 3/4/5 signals, the MSG ADRS (7:4) and MSG ADRS (11:8) signals, from multiplexers 401(1) and 401(2) correspond to the PHYS ADRS/ DATA OUT (7:4) and (11:8) signals, respectively. The message address assembly logic operates similarly if the header is to be in other flits in the message address portion 31.

Figure 20:
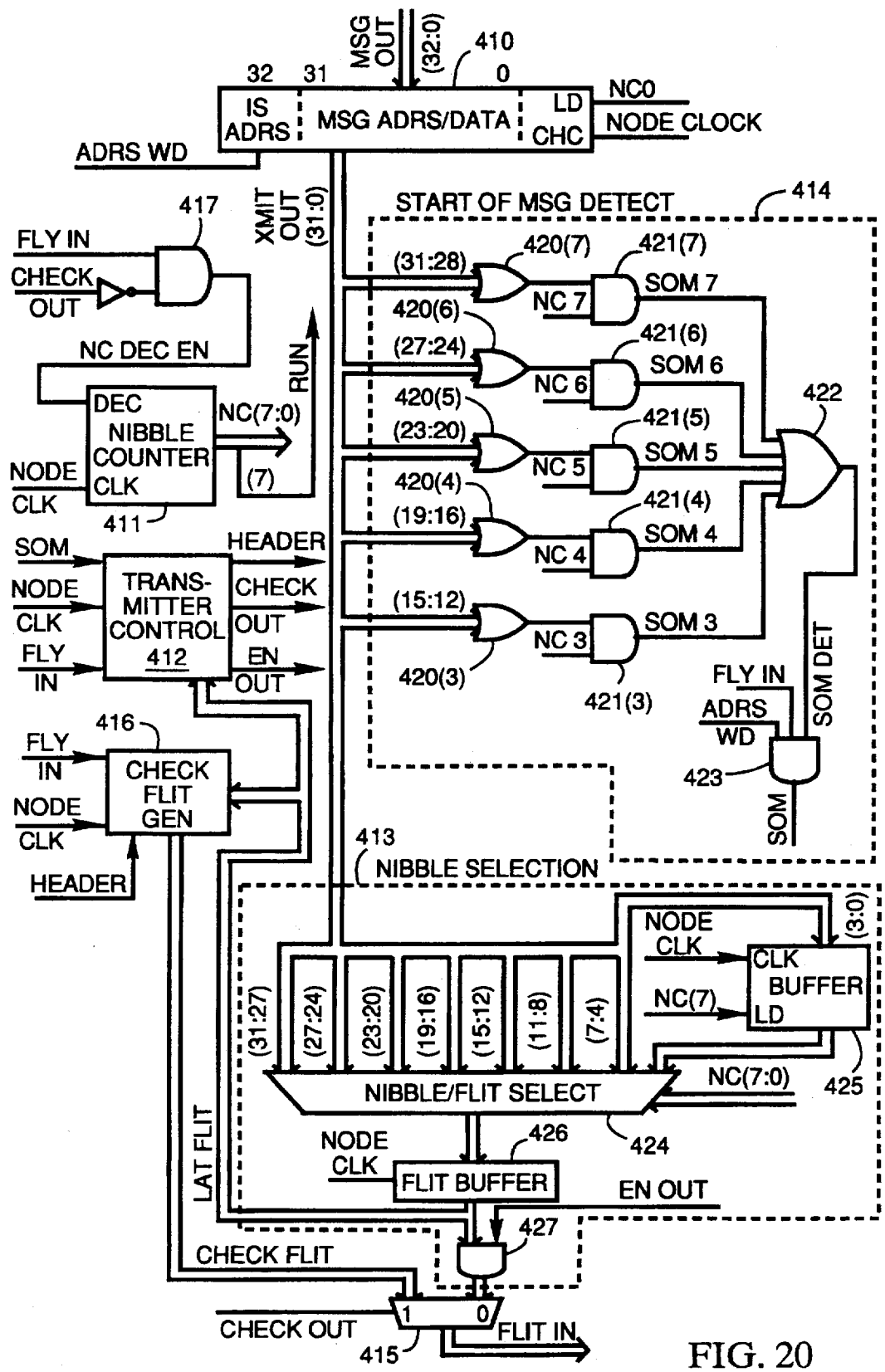

Returning to FIG. 16, as noted above, the staging register 366 latches the signals representing the message address, length, tag and data in response to the RUN signal from the transmitter stage 326 (FIG. 13) and the NODE CLK signal, and contemporaneously the latch 368 latches the IS ADRS signal. The latches transmit the latched signals as the MSG OUT (32:0) message out signals, which are coupled to the transmitter stage 326. FIG. 20 depicts a detailed logic diagram of the transmitter stage 326.

With reference to FIG. 20, the transmitter stage includes a buffer register 410 and a nibble counter 411. The buffer register latches the MSG OUT (32:0) message out signals and transmits the high order bit as an ADRS WD address word signal, and the remaining bits as XMIT OUT (31:0) transmitter out signals. If the ADRS WD address word signal is asserted, the XMIT OUT (31:0) signals correspond to a message address.

The nibble counter 411 transmits NC (7:0) nibble count signals each of which is associated with one of the successive four-bit nibbles of the XMIT OUT (31:0) signals. When enabled by an asserted NC DEC EN nibble counter decrement enable signal from an AND gate 417, the nibble counter 411 decrements in synchrony with the NODE CLK node clock signal, iteratively asserting the NC 7 through NC 0 nibble count signals. The AND gate 417 is energized while the FLY IN signal is asserted, if a normally-negated CHECK OUT signal is negated.

When the NC 0 nibble count signal is asserted, it enables the buffer register 410 to latch the MSG OUT (32:0) message out signals from the message address computation stage 325 (FIG. 16) at the next tick of the NODE CLK signal. The NC 7 nibble count signal is transmitted to the message address computation stage 325 and the physical address computation stage 324. When the NC 7 nibble count signal is asserted, which occurs after the current contents of the staging register 366 and latch 368 in the message address computation stage 325 have been latched in the buffer register 410, the NC 7 nibble count signal enables those stages to operate, to generate new MSG OUT (32:0) message out signals.

The NC (7:0) nibble count signals also control two circuits in the transmitter stage 326. A flit selection circuit 413, in response to the NC (7:0) nibble count signals, selects successively lower-order four-bit nibbles of the XMIT OUT (31:0) transmitter out signals for transmission as the four-bit FLIT IN signals. In addition, a start of message detect circuit 414 scans the nibbles of the XMIT OUT (31:0) signals, and, if the XMIT OUT (31:0) signals represent an address word, as indicated by an asserted ADRS WD address word signal, asserts an SOM start of message signal.

The transmitter control circuit 412 uses the SOM start of message signal to identify the first flit of a data router message packet 30. When the SOM signal is asserted, if the FLY IN signal is asserted it asserts an EN OUT enable out signal, which enables the nibble selection circuit 413 to begin transmitting nibbles in synchrony with ticks of the NODE CLK signal. A normally-negated CHECK OUT signal from the transmitter control 412 enables a multiplexer 415 to couple the output from the nibble selection circuit 413 as FLIT IN signals.

In addition, the transmitter control circuit 412 asserts a HEADER signal that resets and enables a check flit generator 416. The check flit generator 416 receives LAT FLIT (3:0) signals from the nibble selection circuit 413, that, at each tick of the NODE CLK signal, are representative of the flit then being transmitted, and generates error detection check bits in response thereto.

The transmitter control circuit 412 also receives the LAT FLIT (3:0) latched flit signals representative of the header 40 of the message packet 30 and determines therefrom the number of flits in the message address portion 31. After that number of flits have been transmitted, the next flit corresponds to the data router message packet's message length field 34. The transmitter control circuit 412 uses the value identified by that flit in determining when the message data portion 32 has been transmitted. When the transmitter control circuit 412 determines that the message data portion has been transmitted, it asserts the CHECK OUT signal, which enables the multiplexer 415 to couple CHECK FLIT (3:0) signals from the check flit generator as the FLIT IN signals. The asserted CHECK OUT signal also disables the nibble counter 411, inhibiting it from decrementing.

The start of message detection circuit 414 includes a plurality of OR gates 420(3) through 420(7) [generally identified by reference numeral 420(i)]. Each OR gate 420(i) receives the signals from the "i-th" nibble of the XMIT OUT (31:0) transmitter output signals. If all of the signals of the nibble coupled to OR gate 420(i) are negated, the OR gate produces a negated output signal. On the other hand, if one of the signals of the nibble is asserted, the OR gate produces an asserted output signal.

The output of each OR gate 420(i) is connected to the input terminal of one of AND gates 421(3) through 421(7). The other input terminal of each AND gate 423 (i) is connected to receive a corresponding one of the NC i nibble counter signals. Thus, the nibble counter 411 decrements, successively asserting the NC 7 through NC 3 nibble count signals, enabling the successive AND gates 421(7) through 421(3). If an OR gate 420(i) is energized by the assertion of at least one of the signals in the nibble coupled thereto, the associated AND gate 421(i) is energized to assert a corresponding one of the SOM "i" start of message (nibble "i") signals ("i" is an integer from seven to three, corresponding to the nibble). When the first SOM "i" signal is asserted, an OR gate 422 is energized to assert an SOM DET start of message detect signal.

It will be appreciated that the SOM DET start of message detect signal is asserted whenever a nibble of the XMIT OUT (31:12) transmitter out signals includes an asserted signal, in synchrony with the corresponding NC "i" nibble count signal. The SOM DET start of message detect signal is coupled to an input terminal of an AND gate 423. If the AND gate is enabled by asserted ADRS WD address word and asserted FLY IN signals, which occurs if the buffer register 410 contains the first word of a new data router message packet 30 and the transmitter stage 326 is enabled to transmit, the AND gate 423 asserts the SOM start of message signal.

It will be appreciated that the start of message detection circuit 414 of the embodiment disclosed herein does not need elements corresponding to OR gates 420(i) or AND gates 421(i) for "i" equal to zero, one or two. The associated nibbles, comprising XMIT OUT (11:0) transmitter out signals, if they are in a word which contains the first flit of a new data router message packet, would contain the message length and message tag fields 34 and 35 and first flit of the down path identification portion 41. Thus, the nibble containing the header, which must contain at least one asserted signal, must be in the XMIT OUT (31:12) signals.

The nibble selection circuit 413 receives the nibbles of the XMIT OUT (31:0) signals and selectively transmits them under control of the EN OUT enable out signal from the transmitter control circuit 412. The four-bit nibbles comprising XMIT OUT (31:4) signals are coupled to associated data input terminals of a selector 424. Under control of the NC (7:0) nibble count signals, the selector 424 gates the signals from the corresponding "i-th" nibble to the input terminal of a flit buffer 426, which latches the selected signals in response to the next tick of the NODE CLK signal. The low-order nibble, comprising the XMIT OUT (3:0) signals, is loaded into a buffer 425. The buffer 425 is enabled in response to the NC 7 nibble count signal, and it latches the nibble in response to the next tick of the NODE CLK signal. It will be appreciated that the buffer 425 latches the low-order nibble contemporaneous with the transmission by the selector 424 of the high-order nibble, that is, the XMIT OUT (31:27) transmitter out signals. The selector 424 transmits the contents of buffer 425 to the input terminal of flit buffer 426 in response to the NC 0 nibble count signal. The latching of the low-order nibble in the buffer 425 permits the contents of the buffer register 410 to be updated in response to the NC 0 nibble count signal, making the next word available for transmission immediately after transmission of the low-order nibble in buffer 425.

As noted above, the output of the selector 424 are latched in the flit buffer 426 in response to the NODE CLK signal. The output of flit buffer 426, namely, the LAT FLIT (3:0) latched flit signals, are coupled to the check flit generator 416, the transmitter control circuit 412, and also to the input terminal of a gated driver 427. When the transmitter control circuit 412 asserts the EN OUT enable output signal, the gated driver 417 couples the LAT FLIT (3:0) latched flit signals to one set of data input terminals of multiplexer 415. As described above, if the transmitter control circuit 412 is negating the CHECK OUT signal, the multiplexer 415 couples the contents of flit buffer 426 as the FLIT IN signal to the data router node 22(i,j,k) connected thereto.

As described above, the data router interface 205 includes two message injector ports 223(l) and 223(r). The processor 200 (FIG. 10) controlling the processing element 11 can select one of the message injector ports to inject the data router message packet 30 into the data router 14, in which case the information used in forming the message packet 30 are coupled to the identified message injector port 223. On the other hand, the processor 200 can initiate injection of a data router message packet 30 by referencing a "middle" message injector port, and the injector common control/status portion 224 will select one of the left or right ports 223 to inject the message packet 30. FIG. 21 depicts a target select circuit 426, in the injector common control/status portion 224, for accomplishing this.

With reference to FIG. 21, the target select circuit receives (L) FIFO FULL and (R) FIFO FULL FIFO full status signals from the first-in first-out buffers 321 (FIG. 13) in the left and right injector ports 223(l) and 223(r), respectively. The target select circuit 426 includes a set of AND gates that use these status signals, and pointer signals CUR TARGET L current target left and CUR TARGET R current target right generated by a flip-flop 442 and inverter 443. The assertion or negation of the CUR TARGET L and CUR TARGET R identify whether the left or right injector port will be selected to transmit a data router message packet 30 addressed by the processor 200 to the "middle" message injector port.

AND gate 430 is energized by the coincident assertion of the (L) FIFO FULL signal and of the CUR TARGET L signal to assert a CUR L FULL current left/full signal. The assertion of the CUR L FULL signal indicates that the left injector port 223(l) is currently selected by the target select circuit 426, but that its FIFO 321 is full. Similarly, AND gate 431 is energized by the coincident assertion of the (R) FIFO FULL signal and of the CUR TARGET (R) signal to assert a CUR R FULL current right/full signal. The assertion of the CUR R FULL signal indicates that the right injector port 223(4) is currently selected by the target select circuit, but that its FIFO 321 is full.

AND gate 432 is energized by the coincident assertion of the (L) FIFO FULL signal and the CUR TARGET R signal to assert a NEW R FULL L new right/full left signal. The assertion of the NEW R FULL L signal indicates that the right injector port 223(r) is currently selected by the target selector circuit and that the FIFO 321 of the left injector port 223(l) is full. Similarly, AND gate 433 is energized by the coincident assertion of the (R) FIFO FULL signal and the CUR TARGET L signal to assert a NEW L FULL R new left/full right signal. The assertion of the NEW L FULL R signal indicates that the left injector port 223(l) is currently selected by the target selector circuit 426 and that the FIFO 321 of the right injector port 223(r) is full. The NEW R FULL L and NEW L FULL R signals are coupled to input terminals of an OR gate 435, whose output is complemented by an inverter 436 to generate a NEW TARG NOT FULL new target not full signal.

The CUR L FULL, CUR R FULL and NEW TARG NOT FULL signals are coupled to an OR gate 437, which generates a TOGGLE EN toggle enable signal. If an OR gate 440 is energized, which occurs when the processor 200 enables the data router interface 205 to inject a new data router message packet 30, it asserts a NEW MSG new message signal. If the TOGGLE EN and NEW MSG signals are asserted, and AND gate 441 is energized, which, in turn, enables the clock input terminal of flip-flop 442. The flip-flop 442 generates the CUR TARGET L current target left signal, which is coupled to AND gates 430 and 433. In addition, the CUR TARGET L signal is complemented by inverter 443 to generate the CUR TARGET R current target right signal is coupled to the AND gates 431 and 433. The CUR TARGET R signal is also coupled to the data input terminal of flip-flop 442, so that, when the AND gate 441 is energized, the flip-flop 442 toggles its state. The CUR TARGET L and CUR TARGET R signals are also coupled to circuitry (not shown) that controls loading of information into the write stages 320 of the respective left and right message injector ports 223(l) and 223(r), thus selecting the respective ports in response to the conditions of their respective buffers 321 and the port through which the last data router message packet 30 was being injected.

While the message injector port 223 has been described as including ciruits all of which operate in response to the NODE CLK signal provided by the clock buffer 207, it will be appreciated that that will normally require substantial portions of the network interface 202, and in some cases the entire processing element 11 (FIG. 10) to operate in response to the NODE CLK signal. In many cases, it may be desirable to have most of the processing element 11, including most of the network interface 202, to operate in response to a processing element clock signal (not shown) which synchronizes most operations on the processing element 11, and only small portions of the network interface 202 operate in response to the NODE CLK signal. In particular, it may be desirable to have at least the stages of the message injector ports 310 through 325 (FIG. 13), that is, those stages in advance of the transmitter stage 326, operate in response to the processing element clock signal.

In that situation, the various circuits of the transmitter stage 326, as shown on FIG. 20, will operate in response to the NODE CLK signal from the clock buffer 207. In addition, the RUN signal, generated by the nibble counter 411, will not be coupled directly to the message address computation stage 325 and physical address computation stage 324. Instead, the RUN signal will be directed to a synchronizer 444 that generates, in response to the RUN signal, a SYNCH RUN synchronized run signal that controls the message address computation stage 325 and physical address computation stage 324.

FIG. 21 depicts details of the synchronizer 444. With reference to FIG. 21, synchronizer 444 includes a set-reset flip-flop 445 that is set in response to the assertion of the RUN signal. Flip-flop 445 includes direct set and direct reset terminals, identified as "S" and "R", respectively. When a signal applied to either terminal changes condition from negated to asserted, the flip-flop is, respectively, set or reset.

The set flip-flop 445 energizes the data input terminal of a second flip-flop 446, which operates as a buffer. In response to the next tick of a PE CLK processing element clock signal, the flip-flop 446 is set, to assert a BUF RUN signal. The asserted BUF RUN signal, in turn, enables a state machine 447, which actually asserts the SYNCH RUN synchronized run signal to control the message address computation stage 325 and physical address computation stage 324.

The state machine 447, which is clocked in response to the PE CLK signal, has a state diagram which is also shown on FIG. 21. In particular, the state machine 447 has three states, namely, an initial state, represented by the box labelled "INIT", an intermediate state, represented by the box labelled "MID," and a synchronized run assert state, represented by the box labelled "SYNCH RUN," in which it asserts the SYNCH RUN signal. Transitions between states occur in synchronism with the PE CLK signal.

The state machine 447 is initially in the initial state. When the BUF RUN buffered run signal is asserted, the state machine sequences to the intermediate state at the next tick of the PE CLK signal. Regardless of the condition of the BUF RUN signal, the state machine 447 sequences to the synchronized run assert state at the next tick of the PE CLK signal. As noted above, the state machine 447 asserts the SYNCH RUN signal when in the synchronized run assert state. The assertion of the SYNCH RUN signal, in addition to controlling the message address computation stage 325 and physical address computation stage 324, also resets the flip-flop 445, enabling the flip-flop 446 to be reset at the next tick of the PE CLK signal, to negate the BUF RUN signal. The next tick of the PE CLK signal also sequences the state machine 447 to the initial state. Since at that point the BUF RUN signal is negated, the state machine will remain in the initial state.

iii. Message Ejector Portion 221

Figure 22:
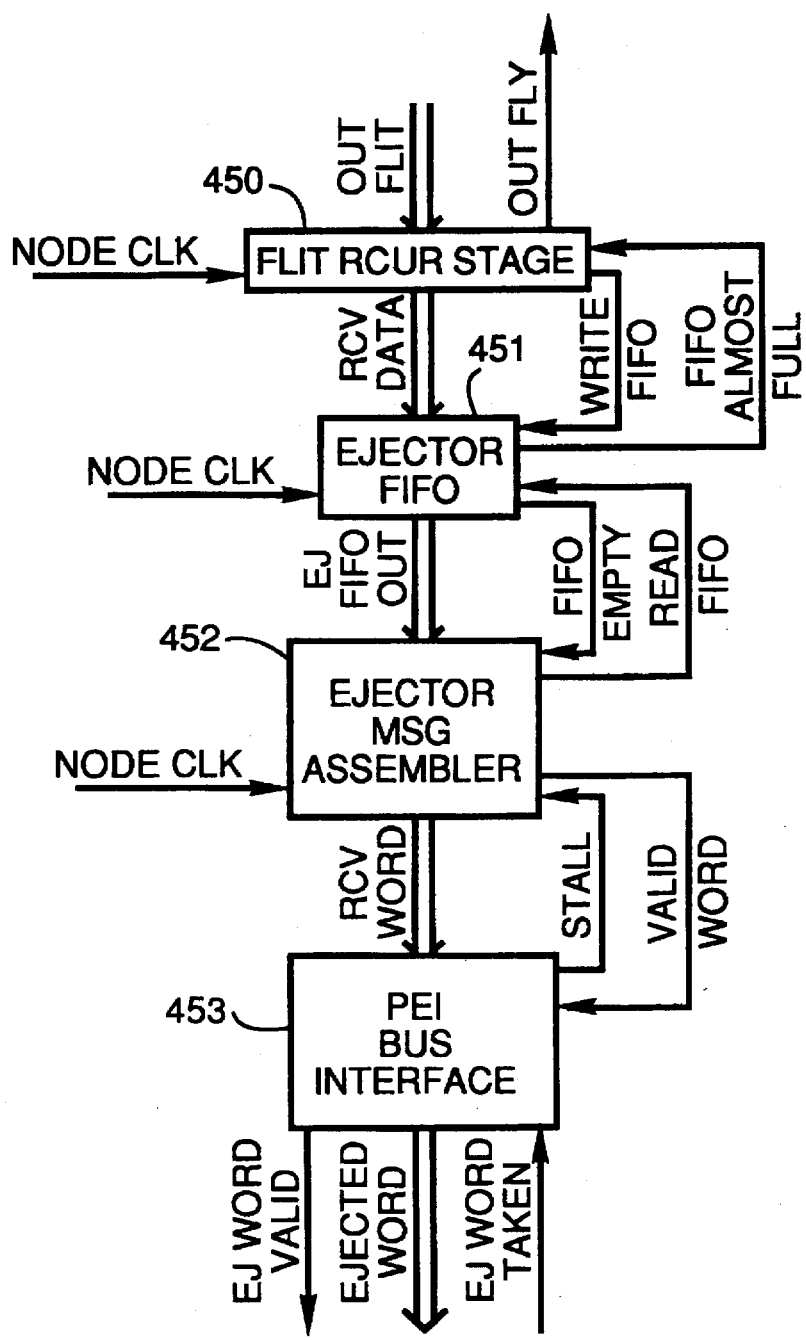

With reference again to FIG. 11, the data router interface 201 includes left and right message ejector ports 225(l) and 225(r). Since the left and right message ejector ports are generally similar, only one (without reference to it being the left or right port) will be described. FIG. 22 depicts a general block diagram of a message ejector port 225, and FIGS. 23 through 29 depict more detailed logic diagrams of selected elements depicted in FIG. 22.

With reference to FIG. 22, the message ejector port includes a flit receiver stage 450, an ejector flit first-in first-out buffer (FIFO) 451, a message assembler 452 and a bus interface 453. The flit receiver stage is connected to the data router 15 and receives the successive four-bit OUT FLIT signals from the data router node 22(i,j,k) connected thereto. The flit receiver stage also performs an error detection operation, in which it verifies correct transmission of the data router message packet through the data router 15. The flit receiver stage 450 controls loading of nibbles representative of the successively-received flits into the ejector first-in first-out FIFO 451.

The message assembler 452 receives the successive four-bit nibbles from the FIFO 451 and assembles thirty-two bit words in response thereto. The thirty-two bit words are available to the processor 200 through the respective receive register 260, 295 or 302. Each of the successive thirty-two bit words receive in a message packet effectively has the same word organization as the successive words transmitted by the source leaf 21(x).

The bus interface 453 controls the transmission of data from data router message packets 30 to the processor. The bus interface 453 also has a first-in first-out buffer to buffer data received from the data router 15 before it can be retrieved by the processor 200.

Figure 23:
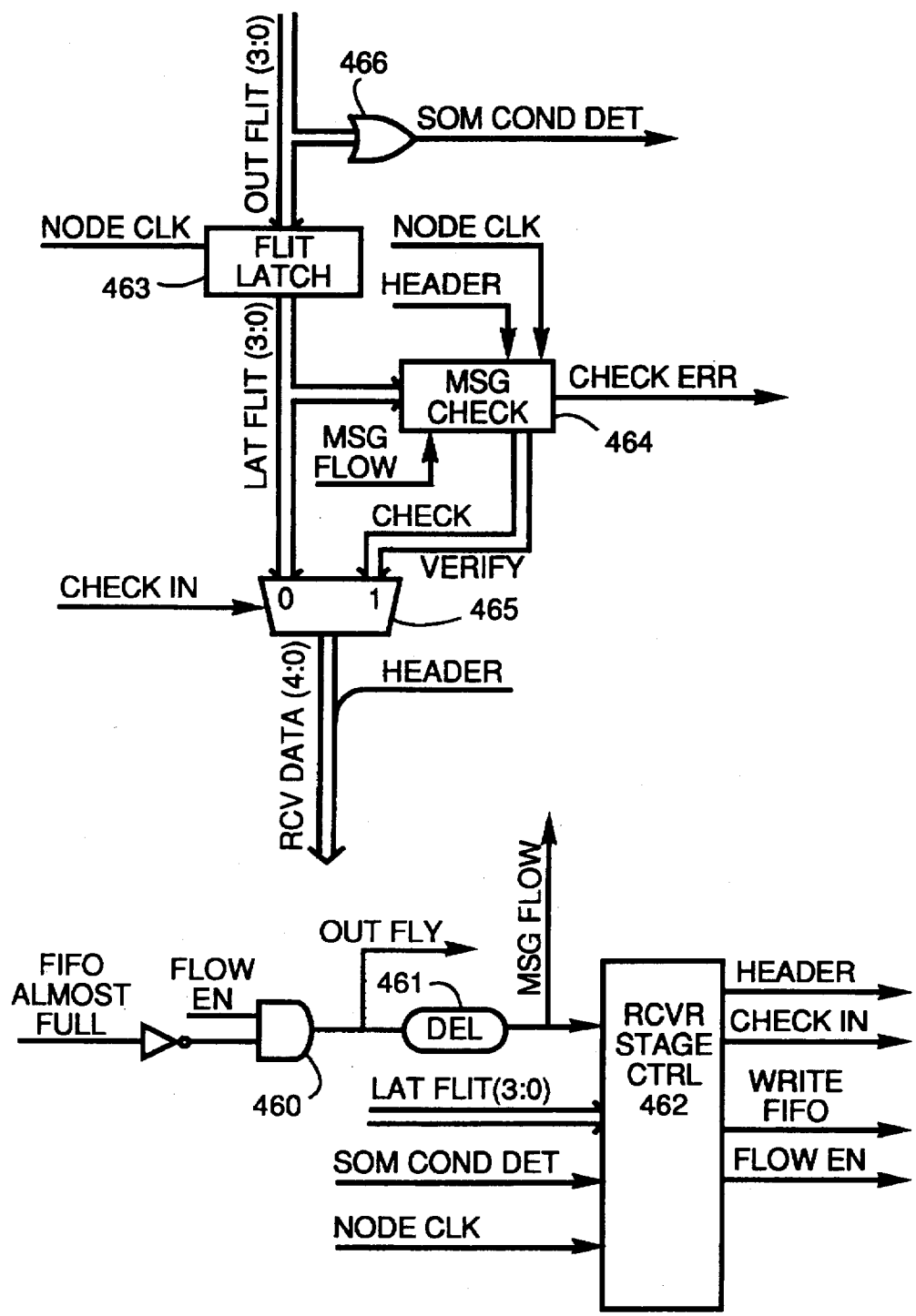
Figure 24:
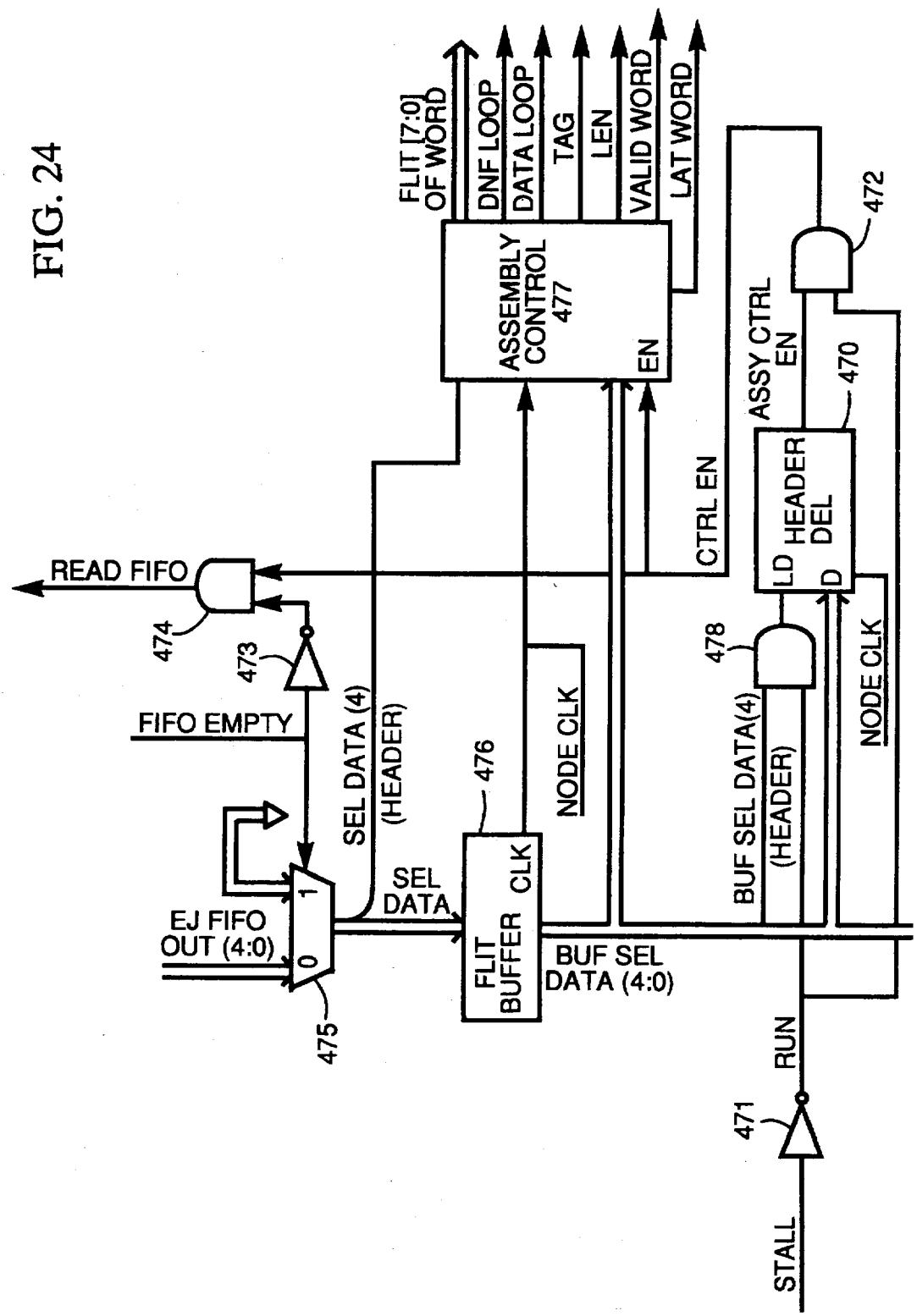
Figure 25:
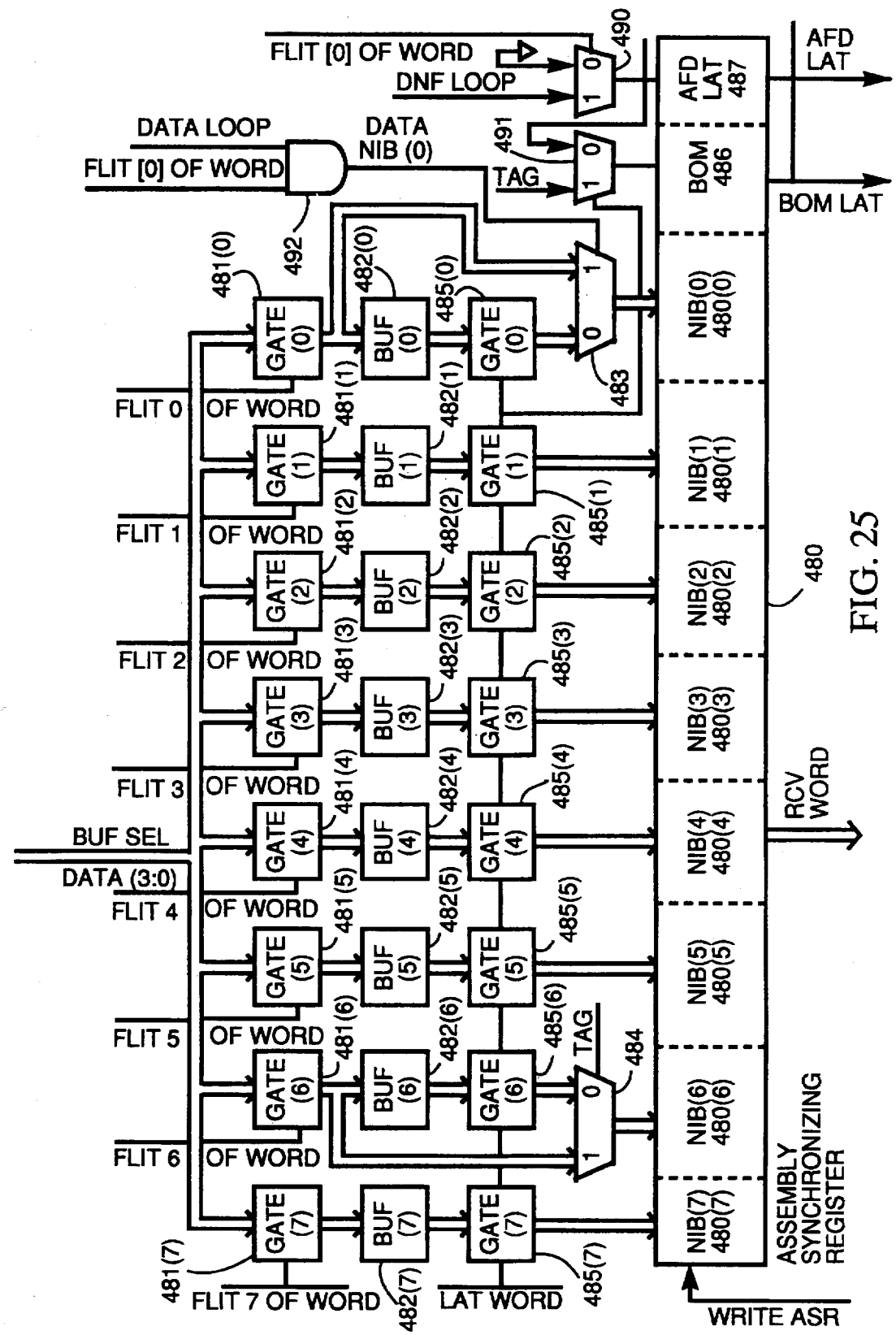

FIG. 23 depicts a detailed logic of the flit receiver stage 450. With reference to FIG. 23, the flit receiver stage includes an AND gate 460 that is enabled by a normally asserted FLOW EN flow enable signal from a receiver stage control circuit 461. If the FLOW EN flow enable signal is asserted, and if a FIFO ALMOST FULL signal from FIFO 451 is not asserted, the AND gate 461 asserts an OUT FLY signal that is transmitted to the data router node 22(i,j,k) connected thereto. The FLOW EN flow enable signal may be conditioned by a register (not shown) that may be conditioned by the diagnostic network 16 to effectively enable or disable the ejector port 225. The FIFO 451 asserts the FIFO ALMOST FULL signal when it is nearly full to regulate flow of flit data thereto for storage.

The output terminal of AND gate 460 is also coupled to a delay line 461 so that, when the OUT FLY signal is asserted, a MSG FLOW message flow signal is asserted a brief time thereafter. The MSG FLOW signal is coupled to a receiver stage control circuit 462.

The four-bit OUT FLIT (3:0) output flit signals from the connected data router node 22(1,j,k) are received at input terminals of a latch 463 and latched in response to successive ticks of the NODE CLK signal. The contents of latch 463 are coupled as LAT FLIT (3:0) latched flit signals to input terminals of the receiver stage control circuit 462, to a message check circuit 464, and to one set of input terminals of a multiplexer 465.

The receiver stage control circuit 462 receives the LAT FLIT (3:0) latched flit signals from the latch 463 in synchrony with the NODE CLK signal. If the immediately-preceding data router message packet 30 has been completely received, and if a SOM COND DET start-of-message signal from an OR gate 466 is asserted, the receiver stage control circuit 462 asserts a HEADER signal. The OR gate 466 generates the SOM COND DET start-of-message condition detect signal if at least one of the four OUT FLIT (3:0) output flit signals is asserted, indicating the start of a new data router message packet 30 if the immediately-preceding data router message packet has been completely received.

The asserted HEADER signal resets the message check circuit 464 and enables it to initiate a check operation in connection with the LAT FLIT (3:0) latched flit signals in synchrony with the NODE CLK signals, while it is enabled the MSG FLOW message flow signal is asserted. If the MSG FLOW signal is negated, the message check circuit 464 is disabled. The output of the message check circuit 464 is coupled to a second set of data input terminals of multiplexer 465.

The multiplexer 465 is controlled by a CHECK IN signal from the receiver stage control circuit 462. The CHECK IN signal, when negated, enables the multiplexer 465 to couple the LAT FLIT (3:0) latched flit signals as RCV DATA (3:0) received data signals to the input terminal of ejector first-in first-out FIFO 451 (FIG. 22). The HEADER signal from receiver stage control circuit 462 is also coupled to the input terminal of FIFO 451 as a high-order RCV DATA (4) signal. The HEADER signal, since it is asserted during the receipt of the first flit of a data router message packet 30 and negated otherwise, is used as a start of message indicator in successive stages of the message ejector port 225.

The receiver stage control circuit 462, while the MSG FLOW signal is asserted, asserts a WRITE FIFO signal that enables the FIFO 451 to latch the successive five-bit RCV DATA (4:0) receive data words, representing successively-received flits, in synchrony with the NODE CLK signal. It will be appreciated that, if the FIFO 451 asserts the FIFO ALMOST FULL signal, which negates the MSG FLOW signal, the receiver stage control circuit 462 will negate the WRITE FIFO signal, disabling loading of additional data into FIFO 451.

As indicated above, the receiver stage control circuit 462 also receives the LAT FLIT (3:0) latched flit signals. The receiver stage control circuit specifically latches the signals of the header field 40 and the message length 34 of the data router message packet 30 and uses them to indicate when the receiver stage 30 has received all flits of a data router message packet 30. When the receiver stage control circuit determines that all of the flits have been received, it asserts the CHECK IN signal, enabling the multiplexer 465 to couple CHECK VERIFY signals from the message check circuit 464, which indicate whether the data router message packet was correctly transferred through the data router 15, as the RCV DATA (3:0) receive data signals. The receiver stage control circuit 462 may then, in response to the next assertion of the SOM COND DET start-of-message condition detect signal by the OR gate 466, determine that the OUT FLIT (3:0) signals represent the first flit of a new data router message packet, in which case it enables the operations as described above to be repeated.

The first-in first-out FIFO 451 buffers the RCV DATA (4:0) receive data signals, representing five-bit words, from the flit receiver stage 450. In response to READ FIFO signals from the ejector message assembler 452, the FIFO 451 transmits the buffered words to the message assembler 452 as EJ FIFO OUT (4:0) ejector first-in first-out buffer out signals.

The message assembler 452 receives successive words represented by the five-bit EJ FIFO OUT (4:0) signals and forms, from the low-order four bits, thirty-two bit words. The message assembler 452 assembles the first thirty-two bit word from the contents of the header, message length and message tag fields 40, 34 and 35 of a received data router message packet 30. In addition, if the data router message packet 30 was received while the data router 15 is in all-fall-down mode, the first word includes the contents of the down path identification portion 41, as received by the ejector port 225. The message assembler 452 forms each of the succeeding thirty-two bit words from the successive data flits 36. Each of the successive thirty-two bit words formed by the message assembler 452 from the data flits 36 from a data router message packet 30 received by an ejector port 225 at a destination leaf 21(y) have the same contents as the successive thirty-two bit words from which data router message packet 30 was formed by the injector port 223 at the source leaf 21(x). Accordingly, the binary-encoded values represented by the successive thirty-two bit words received by the ejector port 225 at the destination leaf 21(y) are the same as the binary-encoded values represented by the thirty-two bit words transmitted by the injector port 223 at the source leaf 21(x).

In the message assembler 452, a header delay circuit 470 generates a normally-asserted ASSY CTRL EN assembly control enable signal, which enables one input terminal of an AND gate 472. If a STALL signal from the bus interface 453 is not asserted, an inverter 471 asserts a RUN signal, which energizes an AND gate 472 to assert a CTRL EN control enable signal. If the first-in first-out FIFO 451 is not empty, it negates a FIFO EMPTY signal, which is complemented by an inverter 473 to enable an AND gate 474. The asserted CTRL EN control enable signal energizes the AND gate 474 to assert a READ FIFO signal. While the READ FIFO signal is asserted, the FIFO 451 transmits successive five-bit words, defined by the EJ FIFO OUT (4:0) signals, in synchrony with the NODE CLK signal.

The bus interface 453 maintains the STALL signal in a negated condition if it can receive data from the message assembler 452. When the bus interface 453 cannot receive data from the message assembler 452, it asserts the STALL signal to negate the RUN signal. The negated RUN signal disables the AND gate 472 to negate the CTRL EN signal, thereby enabling the AND gate 474 to negate the READ FIFO signal. In addition, if the FIFO 451 asserts the FIFO EMPTY signal, inverter 473 disables the AND gate 474, enabling it to negate the READ FIFO signal. While the READ FIFO signal is negated, transmissions from the FIFO 451 stop.

A multiplexer 475 has one data input terminal connected to receive the five-bit word defined by the EJ FIFO OUT (4:0) signals from the first-in first-out FIFO 451. If the FIFO EMPTY signal is asserted, the multiplexer 475 couples negated signals, having a binary-encoded value of zero, as SEL DATA selected data signals to the input terminal of a flit buffer 476, which latches them in response to successive ticks of the NODE CLK signal.

On the other hand, if the FIFO EMPTY signal is negated, the multiplexer 475 couples the EJ FIFO OUT (4:0) signals as SEL DATA selected data signals to the input terminal of a flit buffer 476 and the high-order EJ FIFO OUT (4) signal as an SEL DATA (4) (HEADER) signal to an assembly control circuit 477. The SEL DATA (4) (HEADER) signal indicates whether the remaining EJ FIFO OUT (3:0) signals comprise the header of the received data router message packet 30. The assembly control circuit 477, in response to the CTRL EN control enable signal from AND gate 472, and in response to successive ticks of the NODE CLK signal, generates timing control signals for controlling the other elements of the message assembler 452.

Each tick of the NODE CLK signal enables the buffer 476 to latch SEL DATA selected data signals defining a five-bit word as received from the FIFO 451. The buffer 476 transmits the latched signals as BUF SEL DATA (4:0) buffered selected data signals. If the BUF SEL DATA (3:0) signals from flit buffer 476 represent the header field 40 of the data router message packet 30, the high-order BUF SEL DATA (4) buffered selected data signal from buffer 476 is asserted, which enables an AND gate 481. If the RUN signal is also asserted, the AND gate 481 is energized to enable a load enable input terminal of the header delay circuit 470. The header delay circuit 470 receives BUF SEL DATA (3:0) signals in response to the next tick of the NODE CLK signal. It will be appreciated that at that point the BUF SEL DATA (3:0) signals buffered by flit buffer 476 represent the header field 40 of the message packet 30. At that point, the header delay circuit 470 negates the ASSY CTRL EN assembly control enable signal, which, as described above, results in negation of the READ FIFO signal.

The header delay circuit 470 maintains the ASSY CTRL EN assembly control enable signal negated for a number of ticks of the NODE CLK signal which depends on the binary-decoded value of the BUF SEL DATA (3:0) signals, to provide timing synchronization with the bus interface 453. The number of NODE CLK ticks that the ASSY CTRL EN signal remains negated is, in turn, related to the number of flits in the down path identification portion 41 of the received data router message packet 30, which, in turn, relates to the binary encoded value of the BUF SEL DATA (3:0) signals.

The assembly control circuit 477 generates timing and control signals that control the arrangement of four-bit nibbles, represented by the successive low-order BUF SEL DATA (3:0) buffered selected data signals into thirty-two bit words, which are assembled in an assembly synchronizer register 480.

The assembly synchronizing register 480 includes eight four-bit nibbles identified by reference numerals 480(7) through 480 (0) [generally identified by reference numeral 480(i)], a beginning-of-message flag 486 and an all-fall-down mode flag 487. The beginning-of-message flag 486, when set, indicates that the word assembled in nibbles 480(i) comprise the first word from a data router message packet 30 being received. The all-fall-down mode flag 487, when set, indicates that the data router message packet 30 is being received while the data router 15 is in all-fall-down mode. The all-fall-down mode flag 487 is used to condition the received all-fall-down flag 254 of the appropriate private register 232, 294 or 301 (FIGS. 12A and 12B).

In addition, the assembly control circuit 477 generates a VALID WORD signal, which is transmitted to the bus interface 453. If asserted, the VALID WORD signal indicates that the message assembler 452 has assembled a thirty-two bit word at register 480 for transmission to the bus interface 453. The bus interface 453 controls the latching of the thirty-two bit word by the register 480.

If the SEL DATA (4) (HEADER) signal from multiplexer 475 is asserted, the assembly control circuit 477 receives the latched BUF SEL DATA (3:0) signals defining the header from the buffer 476. The assembly control circuit 477 uses the BUF SEL DATA (3:0) signals to determine whether the data router message packet 30 is being received while the data router 15 all-fall-down mode. If the data router 15 is not in all-fall-down mode, the data router node (1,j,k) connected to the ejector port 225 will have decremented the contents of the header field 40 of the data router message packet 30 to a condition in which all of the BUF SEL DATA (3:0) buffered selected data signals are asserted, representing the binary-encoded value "fifteen." In addition, the data router node (1,j,k) will have discarded the last flit of the down path identification portion 41, and so only the message data portion 32 remains after the header field 40.

As a result, the assembly control circuit 477 generates timing and control signals that enable the BUF SEL DATA (3:0) signals representing the header, length and tag fields 40, 34 and 35 to be latched as the first word in the assembly synchronizing register 480. Thereafter, the timing and control signals from the assembly control circuit 477 enable the assembly synchronizing register 480 to form successive thirty-two bit words from successive sets of eight four-bit words, each of the four-bit words being defined by the BUF SEL DATA (3:0) signals at successive ticks of the NODE CLK signal. The assembly control circuit 477 enables the assembly synchronizing register to form a number of thirty-two bit words, the number corresponding to the value in the length field 34. Thereafter, the assembly control circuit enables the assembly synchronizing register to form another word to accommodate BUF SEL DATA (3:0) signals comprising the check bits as generated by the message check circuit 464 (FIG. 23).

On the other hand, if the assembly control circuit 477 determines from the BUF SEL DATA (3:0) signals that the data router message packet 30 being received while the data router 15 is in all-fall-down mode, the BUF SEL DATA (3:0) buffered selected data signals that define the header field 40 are not all asserted. As noted above, when in all-fall-down mode, the data router nodes 22(i,j,k) in the data router 15 will maintain the contents of the header fields 40 of the data router message packets 30 at their respective values at the time the all-fall-down mode is initiated. In one particular embodiment, the number of levels in the data router 15 is selected so that the binary-encoded value of the BUF SEL DATA (3:0) signals will be less than "fifteen." Thus, the assembly control circuit 477 can determine whether the data router 15 is in an all-fall-down mode by determining whether the binary-encoded value represented by the BUF SEL DATA (3:0) signals is "fifteen."

As also noted above, when in all-fall-down mode, data router message packets that the ejector port 225 receives include at least some flits comprising the down path identification portion 41. In that case, the assembly control circuit 477 generates timing and control signals that enable the BUF SEL DATA (3:0) signals representing the down path identification portion 41, as well as those representing the header, length and tag fields 40, 34 and 35, to be latched as the first word in the assembly synchronizing register 480. Thereafter, the timing and control signals from the assembly control circuit 477 enable the assembly synchronizing register 480 to form successive thirty-two bit words in the same manner as when the data router 15 is not in all-fall-down mode.

With this background, the assembly control circuit 477 includes circuitry, which is described below in connection with FIGS. 26 and 27 that successively generates FLIT "i" OF WORD signals ("i" is an integer from seven to zero) that in control coupling of the low-order BUF SEL DATA (3:0) signals for latching in particular nibbles of the assembly synchronizing register 480. The BUF SEL DATA (3:0) buffered selected data signals are coupled to the input terminals of respective gates 481(7) through 481(0) [generally identified by reference numeral 481(i)] which are controlled by the respective FLIT "i" OF WORD signals. The output terminals of the gates 481(i) are connected to respective ones of buffers 482(7) through 482(0) [generally identified by reference numeral 482(i)] which latch and buffer the signals gated by the respective gates 481(i). Effectively, each buffer 482(i) latches the signals gated thereto by the respective buffer 481(i), in response to an enabling signal comprising the coincidence of the FLIT "i" OF WORD SIGNAL and the NODE CLK signal, the enabling signal being delayed to accommodate delay of propagation of the gated signals to the input terminals of the respective buffer 481(i).

The output terminals respective buffers 482(7) through 482(0) are connected to input terminals of respective gates 485(7) through 485(0) [generally identified by reference numeral 485(i)]. In response to an asserted LAT WORD latch word signal from the assembly control circuit 477, the gates 485(7) and 485(5) through 485(1) couple the signals directed thereto by the buffers 482(i) to respective nibbles 480(i) of the assembly synchronizing register 480. The nibbles 480(i) all latch the signals in unison in response to the assertion of the WRITE ASR write assembly synchronizing register signal from the bus interface 453.

The input signals to nibbles 480(0) and 480(6) of the assembly synchronizing register 480 are provided by multiplexers 483 and 484, respectively. The multiplexer 483, under control of a DATA NIB (0) data nibble "zero" signal from an AND gate 486, selectively couples the output signals from either gate 481(0) or 485(0) to the nibble (0) of the assembly synchronizing register 480. Similarly, the multiplexer 484, under control of a TAG signal from the assembly control circuit 477, selectively couples the output signals from either the gate 481(6) or 485(6) to the nibble (6) of the assembly synchronizing register 480.

The assembly control circuit 477 controls the assembly synchronizing register 480, the gates 481(i), buffers 482(i) and gates 485(i), as well as multiplexers 483 and 484, as follows. When the SEL DATA (4) (HEADER) signal is asserted, the assembly control circuit 477 latches the BUF SEL DATA (3:0) buffered selected data signals comprising the header field 40 of the data router message packet 30 being received. The assembly control circuit 477 asserts the FLIT 7 OF WORD signal, enabling the gate 481(7) to couple the BUF SEL DATA (3:0) signals to the input terminal of buffer 482(7), which latches them in response to the next NODE CLK signal.

As noted above, the BUF SEL DATA (3:0) signals correspond to the contents of the message packet's header field 40. If the signals indicate that the data router 15 is in all-fall-down mode, the assembly control circuit 477 asserts a DNF LOOP down flit loop signal and enables a down flit counter, described below in connection with FIG. 27. The down flit counter generates count signals that control generation of the FLIT "i" OF WORD signals to enable gating and buffering of BUF SEL DATA (3:0) signals representing the successive flits of the down path identification portion 41 in the successive ones of buffers 482(i). In one particular embodiment, in which data router message packets 30 have a maximum of five flits in the down path identification portion, the FLIT "i" OF WORD signals enable the BUF SEL DATA (3:0) signals to be successively buffered in buffers 482(4) through 482(0). If a particular message packet 30 has fewer than five flits in the down path identification portion, the FLIT "i" OF WORD signals enable the buffered BUF SEL DATA (3:0) signals to be packed toward the buffers 482(i) with lower indices "i"; that is, if a data router message packet 30 has only "j" flits ("j" less than five) in the down path identification portion 41, the assembly control circuit 477 successively generates the FLIT "j–1" OF WORD through FLIT 0 OF WORD signals, to enable the BUF SEL DATA (3:0) signals representative of those flits to be loaded into buffers 482(j–1) through 482(0).

In addition, when the assembly control circuit 477 asserts the FLIT 0 OF WORD signal, a multiplexer 490 couples the DNF LOOP signal, which sets the all-fall-down mode flag 487.

After the BUF SEL DATA (3:0) signals representative of the down path identification portion 41 have been buffered in appropriate ones of buffers 482(4) through 482(0), the assembly control circuit successively asserts a LEN length signal and a TAG signal, in synchronism with successive ticks of the NODE CLK signal. Contemporaneous with its assertion of the LEN length signal, the assembly control circuit 477 also asserts the FLIT 5 OF WORD signal, enabling the BUF SEL DATA (3:0) signals to be gated to and latched by buffer 482(5). At that point the BUF SEL DATA (3:0) buffered selected data signals are representative of the length field 34 of the data router message packet 30. In addition, the assembly control circuit 477 stores the length information from the BUF SEL DATA (3:0) signals for its later use in assembling thirty-two bit words from data flits 36.

Contemporaneous with its assertion of the TAG signal, the assembly control circuit 477 asserts the FLIT 6 OF WORD signal, enabling gate 481(6) to couple the BUF SEL DATA (3:0) buffered selected data signals to the input terminal of both buffer 482(6) and to one set of data input terminals of multiplexer 484. Since the TAG signal is asserted, the multiplexer 484 couples the output of gate 481(6) directly to the input terminal of the respective nibble (6) of the assembly synchronizing register 480. In addition, the TAG signal is coupled to one input terminal of a multiplexer 491, which controls the input to beginning-of-message flag 486 of the assembly synchronizing register 480.

Contemporaneously with the assertion of the TAG signal, the assembly control circuit 477 asserts the LAT WORD latch word signal, which enables the gates 485(7) and 485(5) through 485(1) to couple signals from buffers 482(7) and 482(5) through 482(1) to respective nibbles (7) and (5) through (1) of the assembly synchronizing register. In addition, the LAT WORD signal enables the gate 485(0) to couple signals from buffer 482(0) to the multiplexer 483.

Since the DATA NIB (0) data nibble signal is negated, multiplexer 483 couples the signals from gate 485(0) to nibble (0) of the assembly synchronizing register 480. In addition, the assembly control circuit asserts the VALID WORD signal, to indicate to the bus interface that a word is available at the input terminals of the assembly synchronizing register 480.

When the bus interface 453 can receive the word from the message assembler 452, it asserts the WRITE ASR write assembly synchronizing register signal, which enables the assembly synchronizing register 480 to latch the signals at its input terminals. The assembly synchronizing register 480 transmits its contents to the bus interface as RCV WORD (34:0) received word signals, comprising the thirty-two bits from nibbles 480(7) through 480(0), a BOM LAT beginning-of-message latched signal, and an AFD LAT all-fall-down latched signal.

It will be appreciated that multiplexer 484 is provided to reduce the amount of time required to direct the respective signals to all of the nibbles 480(i) of the assembly synchronizing register 480 when it is forming the first word from a data router message packet 30. In particular, since the gate 482(6) is the last to be enabled for the word, the multiplexer 484 ensures that the signals from gate 481(6) do not have to be latched in buffer 482(6) before they are coupled to the input terminals of nibble 480(6). This can reduce the amount of time required to assemble signals at the input terminals of all of the nibbles 481(6) by approximately one tick of the NODE CLK signal.

After the assembly synchronizing register 480 has transmitted RCV WORD (34:0) signals defining the first word of the data router message packet, the assembly control circuit generates the timing and control signal to enable the assembly synchronizing register 480 to assemble one or more thirty-two bit data words, the number corresponding to the previously-stored length information. In assembling each word, the assembly control circuit 477 asserts a DATA LOOP signal and successively asserts the FLIT 7 OF WORD through FLIT 1 OF WORD signals. In response, the successive gates 481(7) through 481(0) couple the BUF SEL DATA (3:0) signals, which at successive ticks of the NODE CLK signal represent contents of successive data flits 36 for latching in the successive buffers 482(7) through 482(1).

When the FLIT 0 OF WORD signal is asserted, the coincidence of the assertions of that signal and the asserted DATA LOOP signal enable an AND gate 492 to assert a DATA NIB (0) data nibble signal, which enables multiplexer 483 to couple the output signals from gate 481(0) to the nibble 480(0) of the assembly synchronizing register 480. In addition, contemporaneous with the assertion of the FLIT 0 OF WORD signal, the assembly control circuit 477 asserts the LAT WORD signal to enable gates 485(7) through 485(1) to couple the contents of buffers 482(7) through 482(1) to respective nibbles 480(7) through 480(1) of the assembly synchronizing register 480. The assembly control circuit 477 also asserts the VALID WORD signal to notify the bus interface 453 that it may assert the WRITE ASR write assembly synchronizing register signal to enable the assembly synchronizing register 480 to latch the signals input thereto.

It will be appreciated that multiplexer 483 is provided to reduce the amount of time required to direct the respective signals to all of the nibbles 480(i) of the assembly synchronizing register 480 when it is forming words from the data flits 36. In particular, since the gate 481(0) is the last to be enabled for a word, the multiplexer 483 ensures that the signals from gate 481(0) do not have to be latched in buffer 482(0) before they are coupled to the input terminals of nibble 480(0). This can reduce the amount of time required to assemble signals at the input terminals of all of the nibbles 481(0) by approximately one tick of the NODE CLK signal.

The assembly control circuit 477 iteratively enables these operations to occur until the assembly synchronizing register 480 has formed data words from all of the data flits 32 in the data router message packet 30. Thereafter, the assembly control circuit enables the assembly synchronizing register 480 to form one last data word, which includes the check signals generated by the message check generator 464 (FIG. 23), which are latched in the nibble 480(7) of the assembly synchronizing register 480.

If the bus interface 452 is unable to accept a word from the assembly synchronizing register 480 when the assembly control circuit 477 asserts the VALID WORD signal, it may assert the STALL signal, which, as described above, stalls the ejector first-in first-out buffer from transmitting signals representing successive flits to the message assembler. Accordingly, the contents of the flit buffer 476 remain unchanged while the STALL signal is asserted. Thus, if the BUF SEL DATA (3:0) buffered selected data signals represent the tag field 35 if the message assembler 452 is assembling the first word from the data router message packet, or data flits 36 to be loaded in the low-order nibble 480(0) of the assembly synchronizing register 480 if it is assembling a word from the data flits 36, the flit buffer 476 maintains the signals while the STALL signal is asserted. Accordingly, the signals will not have to be buffered in the respective buffers 482(6) or 482(2).

It will be appreciated that the first word formed in response to a new data router message packet 30 includes the contents of the header field 40 of a received data router message packet 30. It will be appreciated that, the processor 200, when it loads the send first register 234, 296 or 303 to enable transmission of a new data router message packet, does not supply a value for the header field 40, since, as described above, the message injector port 223 generates the value itself. However, the message assembler 452 keeps the value of the header field 40 of a received data router message packet 30. If the message packet 30 was received when the data router 15 is in all-fall-down mode, the value of the header field 40, which is loaded into the nibble 480(7) during creation of the first word, is used to identify the ones of nibbles 480(4) through 480(0) which contain values from flits of the down path identification portion 41. If the value from the header field 40 were not kept, the contents of nibbles 480(4) through 480(0) would be zeroed or purged at some point before the down path identification portion 41 were loaded therein. The processor 200, when it retransmits the data router message packet, can use the header information stored in the nibble 480(7) to identify the number of valid flits for the down path identification portion 41.

Figure 26:
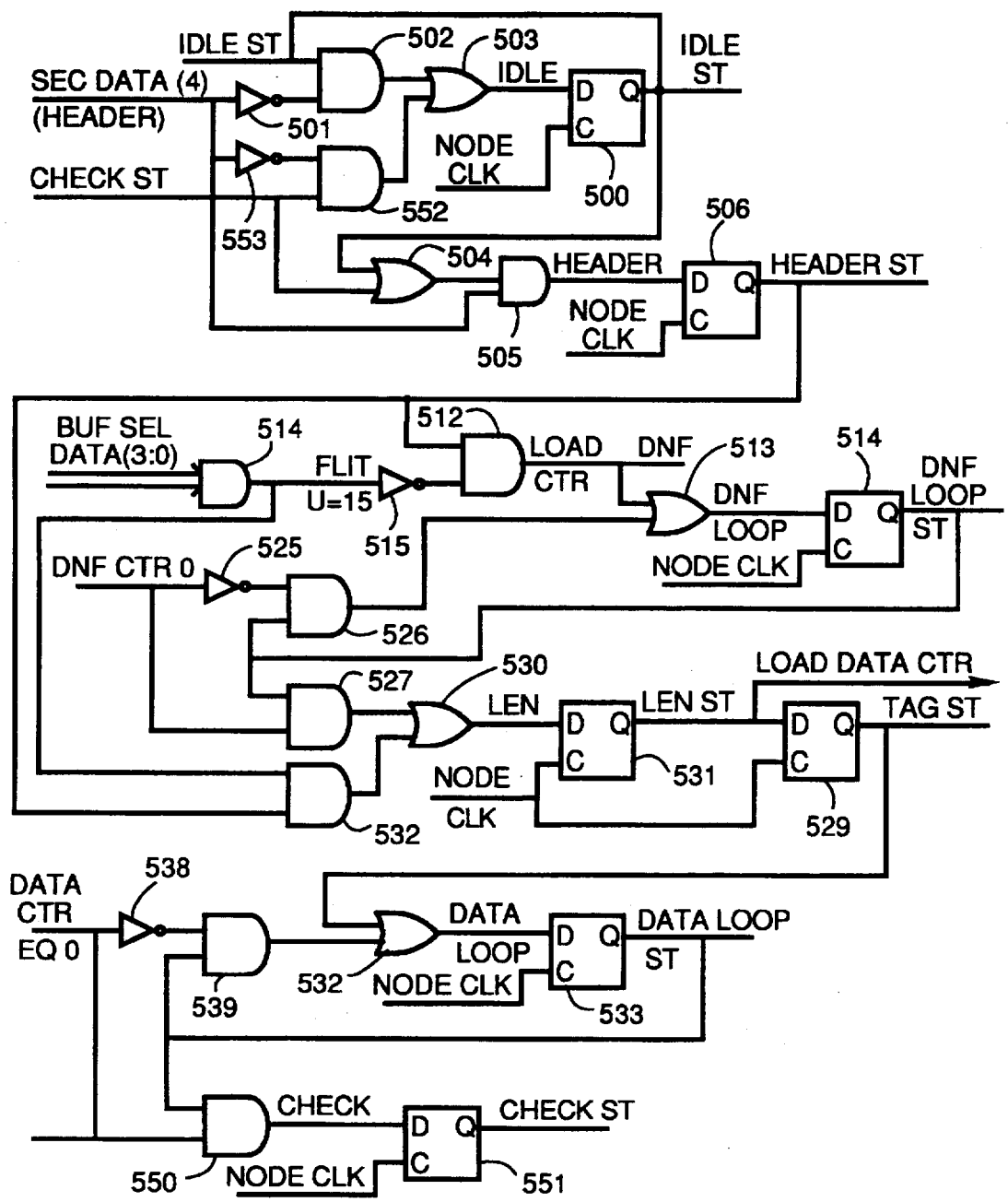
Figure 27:
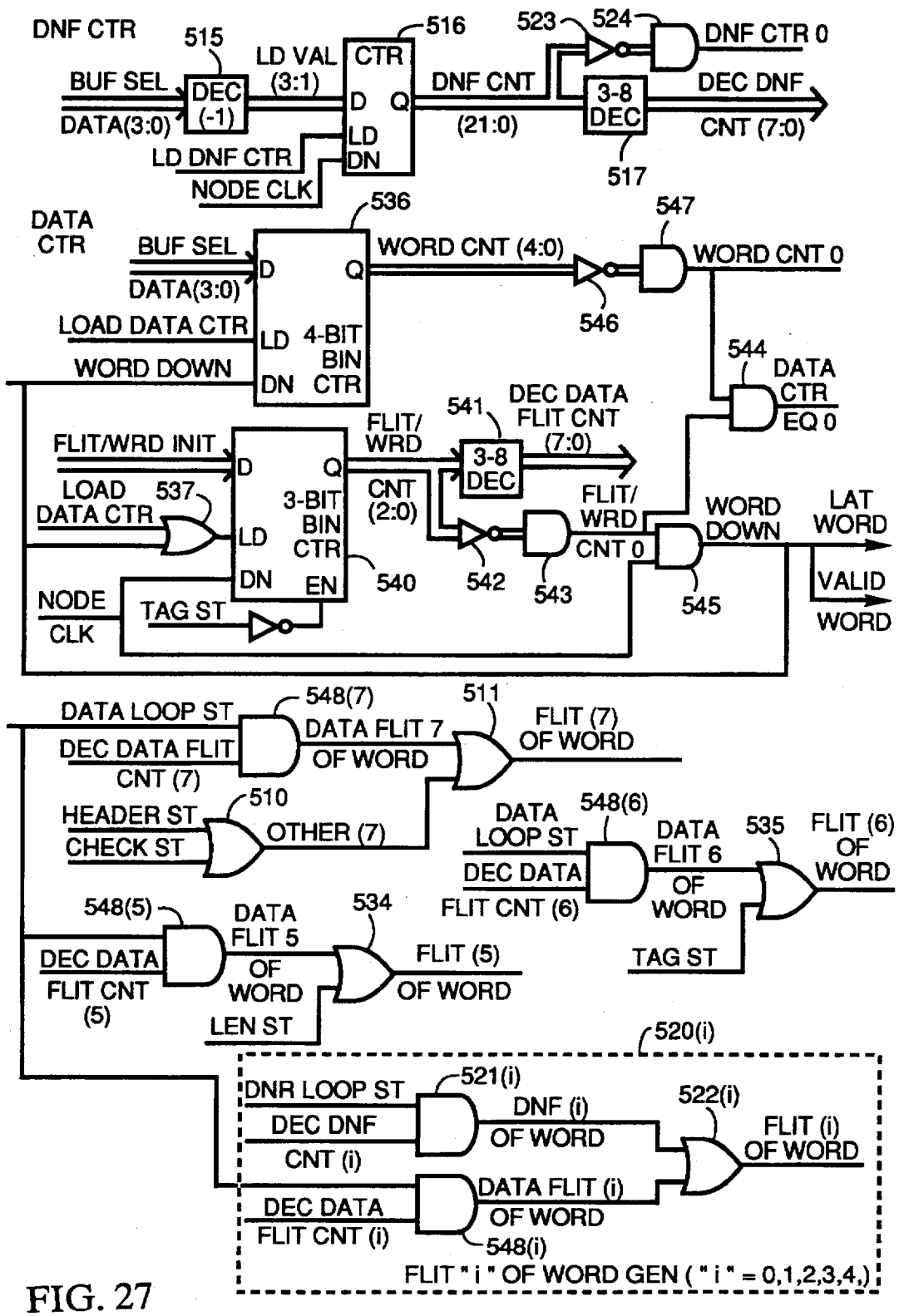

FIGS. 26 and 27 depict logic diagrams of some elements of the assembly control circuit 477. FIG. 26 depicts state machine circuitry, that generates the LEN length, TAG, DNF down flit and DATA LOOP data loop signals. FIG. 27 depicts circuitry that generates the FLIT "i" OF WORD signals. With reference first to FIG. 26, initially a flip-flop 500 is set, thereby asserting an IDLE ST idle state signal. If the SEL DATA (4) (HEADER) signal is negated, an inverter 501 maintains an AND gate 501 in an energized condition, which, in turn, enables an OR gate 503 to assert an IDLE signal, which is latched by the flip-flop 500 at each tick of the NODE CLK signal. Thus, while the SEL DATA (4) (HEADER) signal is negated, the IDLE signal remains asserted, enabling the flip-flop 500 to maintain the IDLE ST idle state signal asserted.

The asserted IDLE ST idle state signal also energizes an OR gate 504, which, in turn, enables one input terminal of an AND gate 505. If the SEL DATA (4) (HEADER) signal is asserted, the AND gate 505 is energized to assert a HEADER signal. In response to the next tick of the NODE CLK signal, a flip-flop 506 is set to assert a HEADER ST header state signal. Contemporaneously, the asserted SEL DATA (4) (HEADER) signal enables inverter 501 to disable AND gate 502, in turn enabling the OR gate 503 to negate the IDLE signal. At the same tick of the NODE CLK signal, the flip-flop 500 is reset, negating the IDLE ST idle state signal.

The HEADER ST header state signal is asserted contemporaneously with the latching by the flit buffer 476 (FIG. 24) of SEL DATA selected data signals corresponding to the contents of the header field 40 of the data router message packet 30 being received. Turning to FIG. 27, the asserted HEADER ST signal energizes an OR gate 510 to assert an OTHER (7) signal, that, in turn, enables an OR gate 511 to assert the FLIT 7 OF WORD signal. As described above, this enables gate 481(7) to couple the BUF SEL DATA (3:0) buffered selected data signals, which at that point correspond to the contents of the header field 40, to the buffer 482(7).

Returning to FIG. 26, it will be appreciated that the AND gate 505 will assert the HEADER signal only while the SEL DATA (4) (HEADER) signal is asserted, which is the case only for one tick of the NODE CLK signal. When the SEL DATA (4) (HEADER) signal is negated, the AND gate 505 negates the HEADER signal, the flip-flop 506 is reset at the next tick of the NODE CLK signal, negating the HEADER ST header state signal. As a result, the OTHER (7) signal generated by OR gate 510 (FIG. 27) is negated, thereby enabling the OR gate 511 to negate the FLIT 7 OF WORD signal.

While the HEADER ST header state signal is asserted, it also enables one input terminal of an AND gate 512 and of a second AND gate 531. A third AND gate 514 receives the BUF SEL DATA (3:0) buffered selected data signals, which still correspond to the contents of the header field 40. The AND gate 514 effectively determines whether the ejector port's leaf 21 is the destination or if the message packet 30 is being received while the data router 15 is operating in an all-fall-down mode. As described above, if the data router 15 is not operating in an all-fall-down mode, the BUF SEL DAT (3:0) signals are all asserted, in which case the AND gate 514 is energized to assert a FLIT V=15 flit value equals fifteen signal. On the other hand, if the data router 15 is operating in an all-fall-down mode, the AND gate is disabled, negating the FLIT V=15 signal.

If the FLIT V=15 flit value equals fifteen signal is negated, the second input terminal of AND gate 532 is disabled. However, the negated FLIT V=15 signal enables an inverter 515 to, in turn, enable the second input terminal of AND gate 512. The coincidence of the asserted HEADER ST header state and FLIT V=15 signals energizes the AND gate 512, enabling it to assert a LOAD DNF CTR load down flit counter signal. It will be appreciated that the AND gate 514 will assert the FLIT V=15 signal whenever all of the BUF SEL DATA (3:0) signals are asserted, which may also occur when signals represent other fields of the data router message packet 30. However, the AND gate 512 will assert the LOAD DNF CTR load down flit counter signal only when the HEADER ST header state signal is asserted, which will occur when the BUF SEL DATA (3:0) signals represent the header field 40. The asserted LOAD DNF CTR load down flit counter signal enables an OR gate 513 to assert a DNF LOOP down flit loop signal. In response to the next tick of the NODE CLK signal, a flip-flop 514 is set, enabling a DNF LOOP ST down flit loop state to be asserted. It will be appreciated that the HEADER ST header state signal will at this point be negated.

At this point, a DNF CTR 0 down flit counter equals zero signal is asserted, which enables an inverter 525 to disable an AND gate 526. Returning to FIG. 27, the BUF SEL DATA (3:0) buffered selected data signals, which at this point represent the header 40 of the data router message packet 30 being received, are also coupled to a decrementation circuit 515. The decrementation circuit 515 receives the four BUF SEL DATA (3:0) signals and generates four signals representing a binary-encoded value that is one less than the binary-encoded value of the BUF SEL DATA (3:0) signals, and transmits the three high-order signals as LD VAL (3:1) load value signals to the initial data input terminals of a counter 516. The asserted LD DNF CTR load down flit counter signal enables the counter 516 to load the LD VAL (3:1) signals as an initial count value.

The counter 516 transmits DNF CNT (3:0) down flit count signals, decrementing their binary-encoded value in response to successive ticks of the NODE CLK signal. The DNF CNT (3:0) signals are coupled to an inverter 523 that couples the complements of each of the signals to input terminals of an AND gate 524. If all of the DNF CNT (2:0) signals are negated, which occurs if the binary-encoded value equals zero, the AND gate 524 asserts a DNF CTR 0 down flit counter equals zero signal. However, when the counter 516 generates DNF CNT (2:0) down flit count signals having other binary-encoded values, the inverter 523 will disable the AND gate 524 to negate the DNF CTR 0 down flit counter signal.

The negated DNF CTR 0 down flit counter signal is coupled to an inverter 525 (FIG. 26) which enables one input terminal of an AND gate 526. Since the other input terminal of AND gate 526 is then enabled by the asserted DNF LOOP ST down flit loop state signal, the AND gate 526 is energized. The energized AND gate 526 enables the OR gate to maintain the DNF LOOP down flit loop signal in an asserted condition, which, in turn, causes the flip-flop 514 to remain set during succeeding ticks of the NODE CLK signal. This, in turn, maintains the DNF LOOP ST down flit loop state signal in an asserted condition. Thus, the DNF LOOP ST down flit loop state signal remains asserted until the DNF CTR 0 down flit counter equals zero signal is asserted, as described below, which causes the inverter 525 to disable AND gate 526.

In addition, the DNF CNT (2:0) down flit count signals are coupled to a decoder 517 that asserts a respective one of eight DEC DNF CNT (7:0) decoded down flit count signals associated with the binary-encoded value of the DNF CNT (2:0) down flit count signals. The DEC DNF CNT (4:0) decoded down flit count signals are coupled to respective ones of flit "i" of word signal generating circuits, one of which, identified by reference numeral 520(i), is shown in FIG. 27. Circuit 520(i) includes an AND gate 521 that is enabled by the asserted DNF LOOP ST down flit loop state signal from flip-flop 514 (FIG. 26). When the decoder 517 asserts the particular DEC DNF CNT (i) decoded down flit signal associated with the circuit 520(i), the AND gate 521(i) is energized to assert a DNF (i) OF WORD down flit "i" of word signal. This signal, when asserted, in turn energizes an OR gate 522(i), enabling it to assert the FLIT "i" OF WORD signal.

In one embodiment, in which the down path identification portion 41 of a data router message packet 30 may have five flits, only the five low-order DEC DNF CNT (4:0) decoded down flit count signals may be asserted. In addition, the assembly control circuit 477 includes five circuits 520(i), each associated with one of the DEC DNF CNT (4:0) signals. The DNF LOOP ST down flit loop state signal enables AND gates 521(i) in all of the circuits 520(i) in parallel. However, the decoder 517 asserts only one DEC DNF CNT "i" decoded down flit signal at a time, which in turn determines the FLIT "i" OF WORD signal asserted. The FLIT "i" OF WORD signals determine the ones of buffers 482(4) through 482(0) which will receive and latch the BUF SEL DATA (3:0) signals, at each of the successive ticks of the NODE CLK signal, as described above.

At some point in the decrementing of counter 517, the binary-encoded value of the DNF CNT (2:0) down flit count signals from counter 516 will equal zero. When that occurs, the signals are all negated, in which case the inverter 523 enables all input terminals of an AND gate 524, which is energized to assert the DNF CTR 0 down flit counter equals zero signal. The asserted DNF CTR 0 signal causes the inverter 525 (FIG. 26) to disable AND gate 525, and causing the OR gate 513 to negate the DNF LOOP down flit loop signal. The negated DNF LOOP signal causes the flip-flop 514 to be reset at the next tick of the NODE CLK signal. At this point, if the data router message packet 30 being received has any flits in the down path identification portion 41, they have been latched in the respective buffers 482(4) through 482(0).

If the data router message packet 30 being received has flits in the down path identification portion 41, the asserted DNF LOOP ST down flit loop state signal also enables one input terminal of an AND gate 527. When the DNF CTR 0 down flit counter equals zero signal is asserted as described above, the AND gate 527 is energized, which, in turn, energizes an OR gate 530 to assert a LEN length signal. The asserted LEN length signal enables a flip-flop 531 to be set in response to the next tick of the NODE CLK signal, enabling the assertion of a LEN ST length state signal. It will be appreciated that when the LEN ST length state signal is asserted, the BUF SEL DATA (3:0) buffered selected data signals correspond to the contents of the message length field 34 of the data router message packet being received.

Alternatively, if the down path identification portion 41 of the data router message packet 30 is empty, when the HEADER ST header state signal is asserted the BUF SEL DATA (3:0) buffer selected data signals will all be asserted. The asserted BUF SEL DATA (3:0) signals enable AND gate 514 to assert the FLIT V=15 flit value equals fifteen signal. The asserted FLIT V=15 signal causes inverter 515 to disable AND gate 512, which, in turn, prevents flip-flop 514 from being set. The disabled AND gate 512 maintains the LOAD DNF CTR load down flit counter signal in a negated condition, keeping the counter 516 (FIG. 27) from operating.

The asserted FLIT V=15 flit value equals fifteen signal also enables one input terminal of an AND gate 532. Since the flip-flop 506 at that point is asserting the HEADER ST header state signal, AND gate 532 is energized, which energizes the second input terminal of OR gate 530 to assert the LEN signal. The asserted LEN signal enables the flip-flop 531 to be set in response to the next tick of the NODE CLK signal, enabling the assertion of a LEN ST length state signal. It will be appreciated that the LEN ST length state signal is asserted one tick of the NODE CLK signal after assertion of the HEADER ST header state signal by flip-flop 506, indicating that the BUF SEL DATA (3:0) buffered selected data signals represent the message length field 35 one tick of the NODE CLK signal after they represent the header field 40, as would be the case if the down path identification portion 41 of the data router message packet 30 being received is empty. Immediately after the flip-flop 531 has been set, the HEADER ST header state signal is negated, thereby enabling AND gate 532 and OR gate 320 to negate the LEN length signal.

At the next tick of the NODE CLK signal, the asserted LEN ST signal enables a flip-flop 529 to be set to assert a TAG ST tag state signal. Contemporaneously, since the LEN length signal is negated, the flip-flop 531 is reset to negate the LEN ST length state signal. The asserted TAG ST tag state signal energizes an OR gate 532 to assert a DATA LOOP signal, which enables a flip-flop 533 to be set in response to the next NODE CLK node clock signal to assert a DATA LOOP ST data loop state signal. In response to the same tick of the NODE CLK signal, the negated LEN ST length state signal enables the flip-flop 529 to be reset, negating the TAG ST tag state signal.

Accordingly, it will be appreciated that flip-flops 531, 529 and 533 are set in response to sequential ticks of the NODE CLK signal, to sequentially assert the LEN ST length state, TAG ST tag state and DATA LOOP ST data loop state signal. In addition, the flip-flops 531 and 529 are reset after being set for one tick, so that the LEN ST and TAG ST signals are only asserted for one tick of the NODE CLK signal. It will be appreciated that while the LEN ST and TAG ST signals are asserted, the BUF SEL DATA (3:0) signals represent, consecutively, the contents of the length and tag fields 34 and 35 of the data router message packet 30 being received.

In addition, a DATA CTR EQ 0 data counter equals zero signal is initially negated, which, in turn, enables an inverter 538 to enable one input terminal of an AND gate 539. The asserted DATA LOOP ST data loop state signal energizes the AND gate 539, which enables the OR gate 532 to maintain the DATA LOOP signal in an asserted condition. Accordingly, the flip-flop 533 will remain in a set condition, maintaining the DATA LOOP ST data loop state signal asserted. As will be described in more detail below, the DATA CTR EQ 0 signal is asserted when the BUF SEL DATA (3:0) signals represent the last data flit 36 of the data router message packet 30 being received. At that point, the asserted DATA CTR EQ 0 signal disables AND gate 539, enabling OR gate 532 to negate the DATA LOOP signal and causing the flip-flop 533 to be reset, negating the DATA LOOP ST signal, in response to the next tick of the NODE CLK signal.

Returning to FIG. 27, the LEN ST length state and TAG ST tag state signals are coupled to respective ones of OR gates 534 and 535, to enable them to assert the FLIT 5 OF WORD and FLIT 6 OF WORD signals, respectively. This enables the BUF SEL DATA (3:0) buffered selected data signals, which sequentially correspond to the contents of the message length and message tag fields 34 and 35 to be directed to and latched by respective buffers 482(5) and 482(6).

The LEN ST length state signal is also directed to a data flit counter circuit (FIG. 9C-5) as a LOAD DATA CTR load data counter signal. When the LOAD DATA CTR load data counter signal is asserted, it enables a four-bit binary word counter 536 to load the BUF SEL DATA (3:0) buffered selected data signals, which at this point represent the contents of the message length field 34 of the data router message packet 30 being received. The asserted LOAD DATA CTR load data counter signal also energizes an OR gate 537, which, in turn, enables a three-bit flits-per-word binary counter 540 to load an initialization value.

As described above, the value in the message length field 34 represents the number of thirty-two bit words in the four-bit data flits 36 in the message packet 30. The initialization value loaded by flits-per-word counter 540 identifies the number of data flits 36 in each word enumerated by the message length field 34. Since the BUF SEL DATA (3:0) buffered selected data signals at successive ticks of the NODE CLK node clock signal, after representing the message tag field 35, represent the data flits 36, counter 34 is initially disabled by the TAG ST tag state signal, and then decremented in response to successive ticks of the NODE CLK signal.

The flits-per-word counter 540 generates binary-encoded FLIT/WRD CNT (2:0) flits-per-word count signals which are directed to a decoder 541. The decoder 541 generates DEC DATA FLIT CNT (7:0) decoded data flit count signals, each of which is asserted in response to the associated binary value of the FLIT/WRD CNT (2:0) signals. The DEC FLIT/WRD CNT (7:0) signals are used in the generation of the FLIT "i" OF WORD signals to enable the gates 481(i) and buffers 482(i) to assemble the particular portions of a thirty-two bit data word. In particular, each DEC FLIT/WRD CNT (i) signal is coupled to one input terminal of an AND gate 548(i) ("i" is an integer between 7 and 0), all of which are enabled in parallel by the asserted DATA LOOP ST data loop state signal from the flip-flop 533 (FIG. 26). While the DATA LOOP ST signal is asserted, as the DEC FLIT/WRD CNT (7) through DEC FLIT/WRD CNT (0) signals are sequentially asserted, the AND gates 548(7) through 548(0) are sequentially energized.

When AND gate 548(7) is energized, it asserts a DATA FLIT 7 OF WORD signal to energize the OR gate 511, which, in turn, asserts the FLIT 7 OF WORD signal. When AND gate 487(6) is energized, it asserts a DATA FLIT 6 OF WORD signal to energize OR gate 535, which, in turn, asserts the FLIT 6 OF WORD signal. Similarly, when AND gate 548(5) is energized, it asserts a DATA FLIT 5 OF WORD signal to energized OR gate 534, which, in turn, asserts the FLIT 5 OF WORD signal. In addition, each of the circuits 520(i) includes an AND gate 548(i), which it energized when the corresponding DEC DATA FLIT CNT (i) signal is asserted, enabling it to assert a DATA FLIT "i" OF WORD signal. The asserted signal energizes the OR gate 522(i), which, in turn, asserts the FLIT "i" OF WORD signal. Each of the FLIT "i" OF WORD signals enables the gates 481(i) and buffers 482(i) to successively gate and latch BUF SEL DATA (3:0) buffered selected data signals representing successive data flits 36 to form a thirty-two bit word, as described above.

The FLIT/WRD CNT (2:0) flits-per-word count signals are also directed to an inverter 542, which couples complemented signals to an AND gate 543. When the binary-encoded value of the FLIT/WRD CNT (2:0) signals is zero, all of the complemented signals are asserted and inverter 542 energizes the AND gate 543 to assert a FLIT/WRD CNT 0 flit-per-word count equals zero signal. When the FLIT/WRD CNT 0 signal is asserted, the BUF SEL DATA (3:0) buffered selected data signals corresponds to the low-order nibble of a thirty-two bit data word. The asserted FLIT/WRD CNT 0 signal enables one input terminal of an AND gate 544. If a WORD CNT 0 word count equals zero signal, which is generated in response to the current value of the word counter 536, is not asserted, AND gate 544 is de-energized to negate the DATA CTR EQ 0 data counter equal zero signal. As will be described in more detail below, when the WORD CNT 0 word count equals zero signal is asserted, the thirty-two bit word currently being formed by the gates 481(i) and buffers 482(i) is the last in the data router message packet 30 being received.

The FLIT/WRD CNT 0 flits-per-word count equals zero signal is coupled to an input terminal of an AND gate 545. In addition, in response to the next tick of the NODE CLK signal after assertion of the FLIT/WRD CNT 0 signal, the AND gate 545 is energized to assert a WORD DOWN signal, which is used to form the asserted LAT WORD latch word and VALID WORD signals. The asserted WORD DOWN signal energizes the OR gate 537, which, in turn, enables the flits-per-word counter 540 to reload. In addition, the asserted WORD DOWN signal enables the word counter 536 to decrement.

The word counter 536 generates binary-encoded WORD CNT (4:0) word count signals that identify the number of thirty-two bit data words that have been received. An inverter 546 couples complemented WORD CNT (4:0) signals to the input terminals of an AND gate 547. If all of the WORD CNT (4:0) signals are negated, which will occur when the BUF SEL DATA (3:0) buffered selected data signal represent the data flits 36 of the last thirty-two bit word in the data router message packet 30. When the FLIT/WRD CNT 0 flits-per-word count equals zero signal is also asserted, which will occur when BUF SEL DATA (3:0) signals represent the last data flit 36 of the last thirty-two bit word, the AND gate 544 is energized to assert the DATA CTR EQ 0 data counter equals zero signal.

Returning to FIG. 26, the assertion of the DATA CTR EQ 0 data counter equals zero signal enables inverter 538 to disable AND gate 539, which de-energizes OR gate 532 causing the DATA LOOP signal to be negated. On the other hand, since the DATA LOOP ST data loop state signal is asserted, the assertion of the DATA CTR EQ 0 signal energizes an AND gate 550 to assert a CHECK signal. In response to the next tick of the NODE CLK signal, the negated DATA LOOP signal will enable the flip-flop 533 to be reset, negating the DATA LOOP ST signal, and the flip-flop 551 to be set, asserting a CHECK ST signal. Since at this point, the DATA LOOP ST signal is negated, the AND gate 550 is disabled thereby negating the CHECK signal. The negated CHECK signal causes the flip-flop 551 to be reset in response to the next tick of the NODE CLK signal, thereby negating the CHECK ST signal. Accordingly, the CHECK ST signal is asserted for only one tick of the NODE CLK signal.

It will be appreciated that the CHECK ST signal is asserted when the BUF SEL DATA (3:0) signals represent the check bits from the check generator 464 (FIG. 23). The CHECK ST signal is coupled to OR gate 510 (FIG. 27) which is energized to assert the OTHER 7 signal. This signal, as described above, enables the OR gate 511 to assert the FLIT 7 OF WORD signal, enabling the gate 481(7) to direct the signals to the buffer 482(7), which latches them as described above.

The CHECK ST signal is also coupled to an AND gate 552. If the SEL DATA (4) (HEADER) signal is negated, an inverter 553 enables one input terminal of the AND gate 552. The assertion of the CHECK ST signal energizes the AND gate, which, in turn, energizes the OR gate 503, enabling it to assert the IDLE signal. In response to the next tick of the NODE CLK signal, the flip-flop 500 is set to assert the IDLE ST idle state signal. At this point, the sequence of operations described above in connection with FIGS. 26 and 27 can be repeated.

If, on the other hand, the SEL DATA (4) (HEADER) signal is asserted, which can occur if the FIFO 451 is transmitting FIFO OUT (4:0) signals representing the first flit of a new data router message packet 30, at the same time the BUF SEL DATA (3:0) signals represent the last flit of a current data router message packet 30, the inverter 553 maintains the AND gate 552 in a de-energized condition. If that occurs, the asserted CHECK ST signal energizes OR gate 504, which enables one input terminal of AND gate 505. The asserted SEL DATA (4) (HEADER) signal energizes the AND gate 505, enabling it to assert the HEADER signal, which sets flip-flop 506 at the next tick of the NODE CLK signal, enabling the operations described above to be performed without requiring assertion of the IDLE ST signal. This allows the message assembler 452 to begin processing the new message packet 30 one tick of the NODE CLK signal earlier than would be the case if the CHECK ST signal only operated to enable setting of flip-flop 500.

Returning to FIG. 24, as described above, after the bus interface 453 has been notified by the assertion of the VALID WORD signal that a new word is available for latching in the assembly synchronizing register 480, it may assert the WRITE ASR write assembly synchronizing register signal. The asserted WRITE ASR signal enables the register 480 to latch the signals in the respective nibbles 480(i), in the beginning of message flag 486 and in the all-fall-down flag 48. The assembly synchronizing register 480 transmits the latched signals to the bus interface 453 as RCV WORD (34:0) signals, comprising a include thirty-two bit data word as the RCV WORD (32:0) signals, a BOM LAT latched beginning-of-message signal as the RCV WORD (33) signal, and an AFD EAT latched all-fall-down mode signal as the RCV WORD (34) signal.

Figure 28:
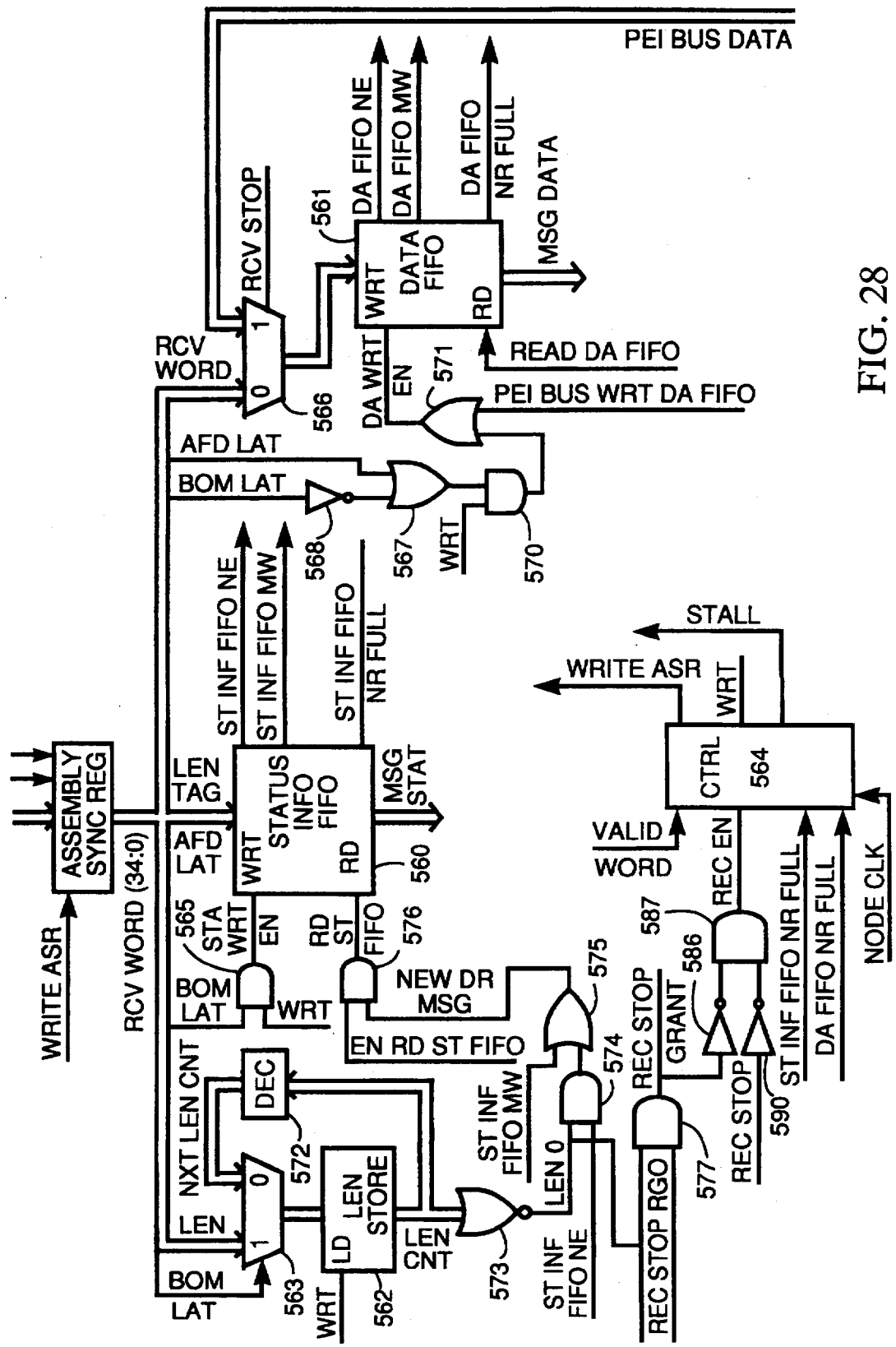

FIG. 28 depicts a detailed logic diagram of the bus interface 453 in one embodiment of the data router interface 205. With reference to FIG. 28, the bus interface includes two first-in first-out buffers (FIFOs) 560 and 561, both of which are connected to receive selected portions of the RCV WORD (34:0) received word signals from the assembly synchronizing register 480, and a length store 562, which receives selected portions of the REV DATA (34:0) signals from a multiplexer 563.

FIFO 560 receives the length and tag portions, comprising the RCV WORD (28:22) signals from nibbles 480(5) and 480(6) respectively, and the AFD LAT all-fall-down latch signal from all-fall-down flag 487 of the assembly synchronizing register 480. The FIFO 560 is used to control the contents of the received length field 253, received tag field 245, and received all-fall-down mode field 254 of the status and private registers 293 and 294 of left interface register set 290, or of status and private registers 300 and 301 of right interface register set 291 (FIG. 12B).

If (i) the FIFO 560 is not asserting a ST INF FIFO NR FULL status information buffer nearly full signal, which indicates whether the FIFO 560 is able to buffer additional information, (ii) the FIFO 561 is not asserting a DA INF FIFO NR FULL data information buffer nearly full signal, and (iii) a REC EN receive enable signal is asserted, a control circuit 564 generates a WRT write signal to energize one input terminal of an AND gate 565. When the RCV WORD receive word signals represent the first word of a data router message packet 30, they have the length, tag and all-fall-down mode information. In that case, the BOM LAT latched beginning-of-message signal, which comprises the RCV WORD (33) signal, is asserted, which energizes the second input terminal of an AND gate 564, enabling it to assert a STA WRT EN status write enable signal. When the STA WRT EN signal is asserted, the FIFO 560 latches the portion of the RCV DATA (34:0) signals representing the length, tag and all-fall-down mode information at the next tick of the NODE CLK signal.

The data first-in first-out FIFO 561 is used to buffer the RCV WORD (31:0) signals from the assembly synchronizing register 480. The FIFO 561 is used to control the contents of the receive registers 233, 295 and 302 of the middle, left and right register sets 230, 290 and 291 (FIGS. 12A and 12B).

The BOM LAT latched beginning-of-message signal and AFD LAT latched all-fall-down mode signal are used, along with the WRT write enable signal from control circuit 564, to control buffering of the RCV WORD (32:0) received word signals, by FIFO 561. If a normally-negated RCV STOP receive stop signal is negated, a multiplexer 566 couples the RCV WORD (32:0) receive word signals to the data input terminal of the FIFO 561. If the AFD LAT latched all-fall-down mode is negated indicating that the data router message packet 30 was not received while data router 15 was in all-fall-down mode, the BOM LAT and WRT signals control storage of the RCV WORD (32:0) signals in the FIFO 561. In that case, when the BOM LAT signal is asserted, which occurs when the RCV WORD (32:0) receive word signals define the length, tag and all-fall-down mode information, an inverter 578 maintains an OR gate 567 in a de-energized condition, causing it to disable one input terminal of an AND gate 570.

The AND gate 570 remains disabled regardless of the assertion level of the WRT write enable signal, in turn disabling one input terminal of an OR gate 571. If a PEI BUS WRT DA FIFO interface bus write data FIFO buffer signal is negated, which is the case unless the processor 200 is attempting to load the data words into the first-in first-out FIFO 561, the OR gate 571 remains disabled and negates a DA WRT EN data FIFO buffer write enable signal, inhibiting the FIFO 561 from loading the RCV WORD (32:0) signals.

For each succeeding word derived from the message packet 30, the BOM LAT latched beginning-of-message signal will be negated. In that case, the inverter 568 will energize the OR gate 567, enabling it to enable one input terminal of AND gate 570. In response to the assertion of the WRT write enable signal from control circuit 564, the AND gate will be asserted, in turn energizing OR gate 571. The energized OR gate 571 asserts the DA WRT EN data write enable signals. While the DA WRT EN signal is asserted, the data first-in first-out FIFO 561 latches the next word of the message packet 30.

If the FIFO 561 becomes nearly full, it can assert the DA FIFO NR FULL nearly full signal, which disables the control circuit 564 from asserting the WRITE ASR write assembly synchronizing register signal, and inhibiting it from asserting the WRT signal in response to receipt of a VALID WORD signal from the message assembler 452. In addition, the control circuit 564 will assert the STALL signal to stall the message assembler 452 as described above.

It will be appreciated that the concurrent assertion of the BOM LAT latched beginning-of-message signal and negation of the AFD LAT latched all-fall-down mode signal inhibits the data first-in first-out FIFO 561 from latching the first word of a new message packet 30. This condition will occur when the message packet 30 is received while the data router 15 is not in all-fall-down mode, in which case the address information, defined by the RCV WORD (31:28) and RCV WORD (19:0) receive word signals need not be retained. Further, the remaining information, namely, the length and tag information represented by the RCV WORD (27:20) receive word signals, as well as the AFD LAT latched all-fall-down mode signal, are available in the FIFO 560 and the appropriate status register. By inhibiting the data first-in first-out FIFO 561 from latching the first word assembled by the message assembler 452 from a data router message packet 30 that was received when the data router 15 is not in all-fall-down mode, the number of words that the processor 200 must retrieve from the FIFO 561 for a particular message packet 30 is reduced. Otherwise stated, this enables the FIFO 561 to hold more words formed from data flits 36 of the received message packets 30.

On the other hand, if the data router message packet 30 is being received while the data router 15 is in all-fall-down mode, the first word of the RCV WORD (31:0) receive word signals is buffered in the FIFO 561. Enabling the word to be buffered in the FIFO 561 permits the address information, defined by the RCV WORD (31:28) and RCV WORD (19:0) signals to be retained, which will facilitate retransmission of the message packet 30 through the data router interface 205 as described above. In that case, the asserted AFD LAT latched all-fall-down mode signal energizes OR gate 567, which enables one input terminal of AND gate 570. The AND gate 570 is energized in response to the asserted WRT signal as described above, which energizes OR gate 571 to assert the DA WRT EN data buffer write enable signal, also as described above. It will be appreciated that the data FIFO 561 will latch the RCV WORD (31:0) signals defining the first word of the data router message packet 30 at the same time the status FIFO 560 is latching the RCV WORD (27:20) and RCV WORD (33) signals defining the length, tag and all-fall-down mode information for the same word. The data first-in first-out FIFO 561 buffers RCV WORD (32:0) signals defining succeeding words of the data router message packet 30 in the same manner as described above.

The contents of the length store 562 identify the number of thirty-two bit data words of the data router message packet 30 remaining to be received and buffered in the FIFO 561. The asserted BOM LAT latched beginning-of-message signal also enables the multiplexer 563 to couple the portion of the RCV DATA (34:0) signals representing the length information to the input terminals of the length store 562. The asserted WRT write enable signal enables the length store 562 to latch the signals at its input terminals, which at this point identify the length of the data router message packet 30 being received.

The LEN CNT length count output signals from length store 562 are coupled to the input terminals of a decrementation circuit 572, which generates NXT LEN CNT next length count signals that have a binary-encoded value one less than the binary-encoded value of the LEN CNT length count signals. With successive words of the RCV WORD receive word signals, the BOM LAT latched beginning-of-message signal is asserted, enabling multiplexer 563 to couple the NXT LEN CNT next length count signals to the input terminal of length store 562, which latches them in response to the asserted WRT write enable signal. Since the successive assertions of the WRT write enable signal also control the loading of RCV WORD (31:0) receive word signals defining successive words in the data router message packet being received, the length store is successively decremented for each word latched in the FIFO 561.

Further, since the value initially loaded into the length store 562 identifies the number of words in the data router message packet 30 being received, when the contents of the length store 562 go to zero, all of the data words will be in the FIFO 561. When that occurs, the LEN CNT length count signals are all negated, defining a binary-encoded value of zero. The LEN CNT length count signals from length store 562 are coupled to a NOR gate 573, which generates an asserted LEN 0 length equals zero signal when all of the LEN CNT signals are negated.

If the first-in first-out HFO 560 is asserting the ST INF FIFO NE status information first-in first-out buffer not empty signal, it and the asserted LEN 0 length count equals zero signal energize an AND gate 574, which, in turn, energizes an OR gate 575 to assert an NEW DR MSG new data router message signal. The asserted NE DR MSG signal indicates that the data router interface 205 has received a new data router message packet 30 from the data router 15. The signal may be used to condition the receive bit 241 of the corresponding status register 231, 293 or 300 (FIGS. 12A and 12B), and may also enable the network interface 202 to interrupt the processor 200, in turn enabling the processor 200 to retrieve the data router message packet 30.

In addition, the asserted NEW DR MSG new data router message signal enables one input terminal of an AND gate 576. When the other input terminal of AND gate 576 is also enabled by an EN RD ST FIFO enable read status first-in first-out buffer signal, the AND gate 576 asserts a RD ST FIFO read status first-in first-out buffer signal. The state of the EN RD ST FIFO signal is effectively controlled by circuitry controlling the status register 231, 293 or 300, and is asserted by the injector/ejector common control/status circuit 222 when the processor 200 has finished retrieving a previously-received message packet 30 whose length, tag and all-fall-down mode were in the status register. At that point, the circuitry controlling the status register can enable the information from the FIFO 560 to be loaded into the appropriate fields of the status register, and so it asserts the EN RD ST FIFO signal, enabling the AND gate to assert the RD ST FIFO signal.

Retrieving the contents of the data first-in first-out FIFO 561 is controlled by a READ DA FIFO read data first-in first-out buffer signal. This signal is asserted by the ejector common control/status circuit 226 when the processor 200 is reading the respective receive register 233.

The bus interface 453 also includes several other facilities. First, it will be appreciated that, at the point of a context switch operation the data first-in first-out FIFO 561 may contain data router message packet data. In the performing the context switch, it is necessary to drain the contents of the data first-in first-out FIFO 561 so that data of message packets that were transferred in one context are retrieved by the processor 200 and processed in that context, and not in some other context. The processor 200 can perform that operation by retrieving the data through the receive registers 260, 295 and 302. On the other hand, when the context is restored, it will be necessary to load the data words that were in the FIFO 561 at the point of the context switch back into the FIFO 561. This will restore the context to the same condition as at the point of the context switch.

To accommodate that, the second input terminal of multiplexer 566 is connected to receive data from the interface bus 211. In this condition, the RCV STOP receive stop signal is asserted, enabling the multiplexer to couple the data from the bus 211 to the input terminal of the first-in first-out FIFO 561. In addition, the interface 212 asserts a PEI BUS WRT DA FIFO write data first-in first-out buffer signal that energizes OR gate 571 to assert the DA WRT EN data first-in first-out buffer write enable signal. This enables the first-in first-out FIFO 561 to load the data from the interface bus 211, enabling the processor 200 to restore the context to the point at which the context switch occurred.

It will be appreciated that the processor 200 may need to load data into the first-in first-out buffer 562 for other reasons, as well. For example, the processor 200 may need to perform a loop-back test, in which it loads data into the FIFO 561, and reads it back to verify proper working of the data router interface 205. This facility permits it to do that.

Another facility allows the processor 200 to control disabling of reception of data router message packets 30 by the ejector port 225, while at the same time ensuring that the bus ejector port 225 receives a complete data router message packet even if the processor 200 disables reception while the port is receiving a message packet 30. As noted above, the processor 200 can disable the ejector port 225 from receiving data router message packets 30 by setting the receive stop bit 252 of the private register 233, or of corresponding bits of private registers 295 or 301 of the left and right register sets 290 and 291, respectively.

In particular, as noted above when the bus interface 453 has received all of the data words off a data router message packet 30, the contents of the length store 562 have the value zero. When that occurs, the LEN CNT length count signals are all negated to represent the binary-encoded value zero, causing the NOR gate 573 to assert the LEN 0 length equals zero signal. In addition to controlling retrievals from FIFO 560 through AND gate 574, the LEN 0 signal enables one input terminal of an AND gate 577.

Figure 29:
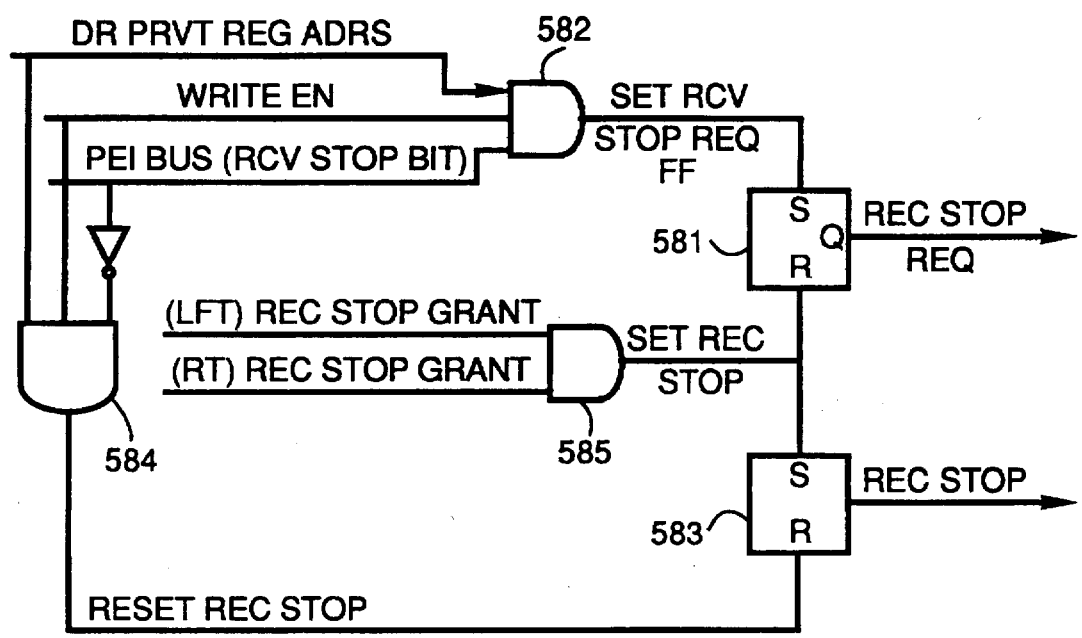

The second input terminal of AND gate 577 is controlled by a REC STOP REQ receive stop request signal from a receive stop control circuit 580, which is depicted in FIG. 29. With reference to FIG. 29, the receive stop control circuit 580 includes a flip-flop 581 which is set in response to an asserted SET RCV STOP REQ FF set receive stop request flip-flop signal from an AND gate 582. The AND gate 582 is energized to assert the SET RCV STOP REQ FF signal in response to signals from the interface 212 (FIG. 10) that control setting of the receive stop bit of the respective private registers 233, 290 or 291.

The asserted REC STOP REQ receive stop request signal energizes the second input terminal of AND gate 577. When the LEN 0 length equals zero signal is also asserted, the AND gate is energized to assert the REC STOP GRANT receive stop grant signal. An inverter 586 disables an AND gate 587, causing to negate the REC EN receive enable signal to disable the control circuit 564 from asserting the WRT write enable signal, effectively disabling the bus interface 453 from receiving from the assembly synchronizing register 480. Since the AND gate 577 is not energized until the LEN 0 signal is asserted, the AND gate 587 is not disabled until all of the data words of a data router message packet 30 that was being received when the SET RCV STOP REQ FF set receive stop request flip-flop signal was asserted, have been loaded into the FIFO 561.

The REC STOP GRANT receive stop grant signal from AND gate 577 is also coupled to an input terminal of an AND gate 585 of the receive stop control circuit 580 (FIG. 9C-7). When the REC STOP GRANT signals have been asserted by both the left and right ejector ports 225(l) and 225(r), an AND gate 585 is energized to assert a SET REC STOP set receive stop signal, which resets flip-flop 581, which negates the REC STOP REQ receive stop request signal, and sets a flip-flop 583 to assert a REC STOP receive stop signal.

Returning to FIG. 28, the negated REC STOP REQ receive stop request signal disables AND gate 577, causing it to negate the REC STOP GRANT receive stop grant signal. The inverter 586 complements this signal, thereby enabling one input terminal of AND gate 587. However, the asserted REC STOP receive stop signal from flip-flop 583 (FIG. 29), through an inverter 590, causes the AND gate 587 to maintain the REC EN receive enable signal in a negated condition.

The negated REC STOP GRANT signal also disables AND gate 585, causing it to negate the SET REC STOP set receive stop signal. The processor 200 can thereafter enable the respective ejector port to resume receiving by clearing the receive stop bit of the respective private register. In doing so, and AND gate 584 is energized to assert a RESET REC STOP reset receive stop signal, enabling the flip-flop 583 to be reset, thereby negating the REC STOP receive stop signal. Returning to FIG. 28, the negated REC STOP receive stop signal is complemented by inverter 590 to enable the second input terminal of AND gate 587, thereby energizing it to assert the REC EN receive enable signal. Thereafter, the control circuit 564 can resume asserting WRITE ASR write assembly synchronizing register signal and the WRT EN write enable signal to enable receipt of data router message packets 30 to be resumed.

As with the description of the message injector port 223 as noted above, in the preceding description of the message ejector port 225, all of the circuits operate in response to the NODE CLK signal provided by the clock buffer 207, whereas it may be desirable to have most of the processing element 11, including most of the network interface 202, to operate in response to a processing element clock signal (not shown) which synchronizes most operations on the processing element 11, and only small portions of the network interface 202 operate in response to the NODE CLK signal. In that situation, in one embodiment the fit receiver stage 450, ejector FIFO 451 and ejector message assembler 452 operate in response to the NODE CLK signal, whereas the bus interface circuit 453 operates in response to the PE CLK signal. In that embodiment, the VALID WORD signal provided by the bus interface 453 is not coupled directly to the ejector message assembler 452, but instead is synchronized through a synchronizer circuit similar to the synchronizer circuit 444 depicted in FIG. 21.

iv. Status/Control Circuitry

Figure 30:
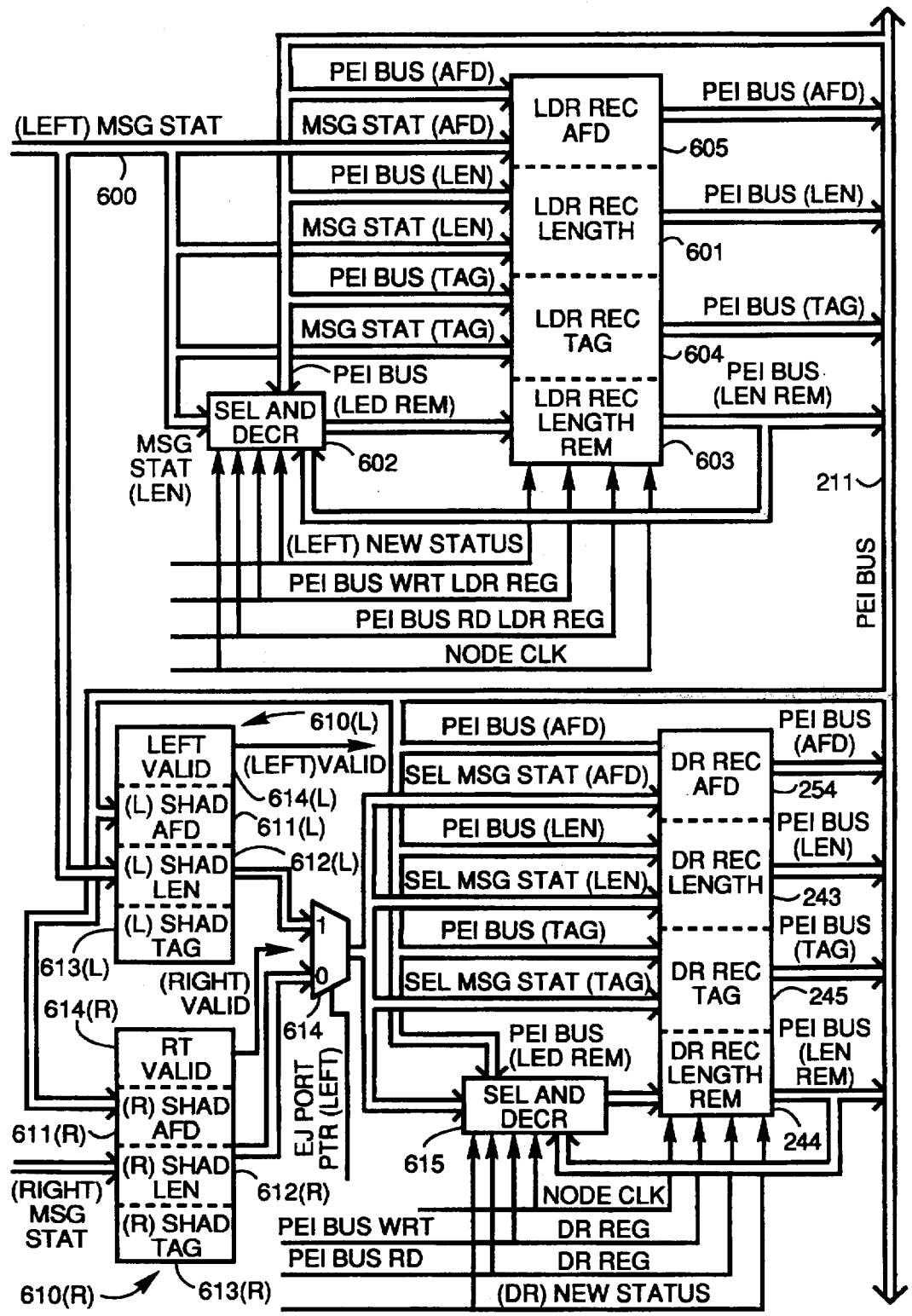

FIGS. 30 through 36 depict details of circuitry controlling several fields of the status registers 231, 293 and 300 (FIGS. 12A and 12B), and private registers 232, 294 and 301, as well as the message count register 313. FIGS. 30 through 34 depicts details of circuitry controlling loading of the status and private registers in response to receipt of data router message packets 30 from the data router 15 and in response to loading by the processor 200 (FIG. 10) over the interface bus 211. It will be appreciated that loading of the respective registers under control of the processor 200 enables the processor 200 to initialize them, and also to establish context in response to a context switch. FIG. 30 depicts a detailed block diagram, and FIGS. 31 through 34 depicts detailed circuitry for controlling loading of, and reading from, the "middle" registers, in a manner transparent to the processor 200.

With reference to FIG. 30, the [LEFT] MSG STAT message status signals for a message received by the left message ejector port 225(l) are coupled from the status information FIFO 560 over a bus 600. In response to [LEFT] NEW STATUS signals from the bus interface 453, indicating receipt of a new data router message packet 30 to be retrieved by the processor 200, the [LEFT] MSG STAT signals are latched in various fields of the status register 293 and private register 294. In particular, a field comprising MSG [LEFT] STAT [REC LENGTH] signals, indicating the length of the received message 30, are latched by a latch 601, which provides the receive length field of the status register 293. In addition, the [LEFT] MSG STAT [REC LENGTH] signals are coupled through a selection and decrementation circuit 602 and latched in a latch 603, which provides the receive length remaining field of the status register 293. Similarly, the [LEFT] MSG STAT [TAG] signals, representative of the tag field of the received message packet 30, are latched in a latch 604, which provides the receive tag field of the status register 294. Finally, the [LEFT] MSG STAT [AFD] signals, which indicate whether the message packet 30 is received while the data router 15 is in all-fall-down mode and that the message packet 30 has not arrived at its destination leaf 21, are latched in a latch 605, which provides the received all-fall-down flag of the private register 294. A similar bus and set of latches (not shown) are provided for the right port ejector 225(r).

The latches 601, 603, 604 and 605 can also be loaded from the interface bus 211. In particular, the appropriate ones of the data lines carrying signals, identified on FIG. 30 as the PEI BUS [LEN], PEI BUS [TAG], and PEI BUS [AFD], respectively, are connected to the latches 601, 603, and 605, respectively. In addition, the data lines carrying signals identified as PEI BUS [LEN REM] are connected to the selection and decrementation circuit 602. In any case, the respective signals can be latched by the various latches in response to write enable signals, generally identified as PEI BUS WRT LDR REG write left data router registers signals from the interface 212 under control of the processor 200. The interface 212, under control of the processor 200, can also enable the contents of the various latches to be coupled onto the bus 211 in response to corresponding PEI BUS RD LDR REG register read enabling signals.

The selection and decrementation circuit 602 performs several functions. When either the [LEFT] MSG STAT signals or signals from bus 211 are being loaded into latch 603, it selectively couples the signals from one or the other to the latch 603. In addition, when the processor 200 is reading from the receive register 295, it decrements the binary-encoded value represented by the signals latched in the latch 603 and enables the result to be latched therein, to represent the length of the message packet 30 remaining to be read. In addition, if the [LEFT] MSG STAT [AFD] all-fall-down signal is asserted, when the latch 603 is initially loaded, it increments the value of the MSG STAT [LENGTH] signals before coupling them to the latch 603. It will be appreciated that, if the leaf 21 is an intermediate destination for a data router message packet 30 while the data router 15 is in all-fall-down mode, the length of the packet 30 is actually the length as represented by the contents of the message length field 34, which, in turn, is represented by the binary-encoded value of the [LEFT] MSG STAT [LENGTH] signals, incremented by one. This accommodates the additional word constituting the header 40, down path identification portion 41, and the message length and tag fields 34 and 35, which are retained by the port ejector 225(l).

When the [LEFT] MSG STAT message status signals are loaded into the latches 601, 604 and 605, they are also loaded into a shadow register 610. In particular, the [LEFT] MSG STAT [AFD] signal is loaded into a latch 611(l), the [LEFT] MSG STAT [LENGTH] signals are loaded into a latch 612(l), and the [LEFT] MSG STAT [TAG] signals are loaded into a latch 613(l). In addition, a valid flag 614(l) is conditioned to indicate the status of the contents of the latches 611(l) through 613(l) in the shadow register 610(l). The valid flag 614(l), when set, asserts a [LEFT] VALID signal. A shadow register 610(0 is provided, having similar latches 611(r) through 613(r) and a similar valid flag 614(r) for the [RIGHT] MSG STATUS signals from the right ejector port 225(r). When the latches 601, 604 and 605 are loaded from the interface bus 211, the corresponding latches of the shadow register 610(l) are also loaded therefrom.

The latched signals output from both shadow registers 610(l) and 610(r) are coupled to respective data input terminal of a multiplexer 614, whose data output terminal is connected to latches providing the received length field 243 and the received tag field 245 of the status register 231, the received all-fall-down field 254 of the private register 22, and to a selection and decrementation circuit 615. The selection and decrementation circuit 615, like circuit 602, controls selection and decrementation of signals coupled to a latch 244, which provides the length remaining field 244 of the status register 231. The latches 243, 244, 245 and 254 are loaded in response to a [DR] NEW STATUS signal, which are generated in response to the [LEFT] NEW STATUS and [LEFT] VALID signals, as well as the [RIGHT] NEW STATUS and [RIGHT] VALID signals.

The multiplexer 614 is controlled by an EJ PORT PTR [LEFT] ejector port pointer [left] signal generated by control circuitry described below in connection with FIG. 35. When the EJ PORT PTR [LEFT] signal is asserted, if the processor 200 reads the middle receive register 260 (FIG. 12A) the left ejector port 225(l) provides the data. On the other hand, when the EJ PORT PTR [LEFT] signal is negated, if the processor 200 reads the middle receive register 260 (FIG. 12A) the right ejector port 225(r) provides the data. Accordingly, if the EJ PORT PTR [LEFT] signal is asserted, the multiplexer 614 will couple the contents of the left shadow register 610(l) to latches 243, 244, 245 and 254 for loading if the processor 200 reads from the middle receive register 260. Otherwise, the multiplexer 614 will couple the contents of the right shadow register 610(r) thereto.

The contents of the latches 243, 244, 245 and 254 can also be read onto, and provided by, respective lines of the bus 211 in the same manner as latches 601, 603, 604 and 605, as described above. The interface 212, under control of the processor 200, may provide signals, generally identified as PEI BUS WRT DR REG and PEI BUS RD DR REG signals, to control writing to and reading from the respective latches.

Figure 31:
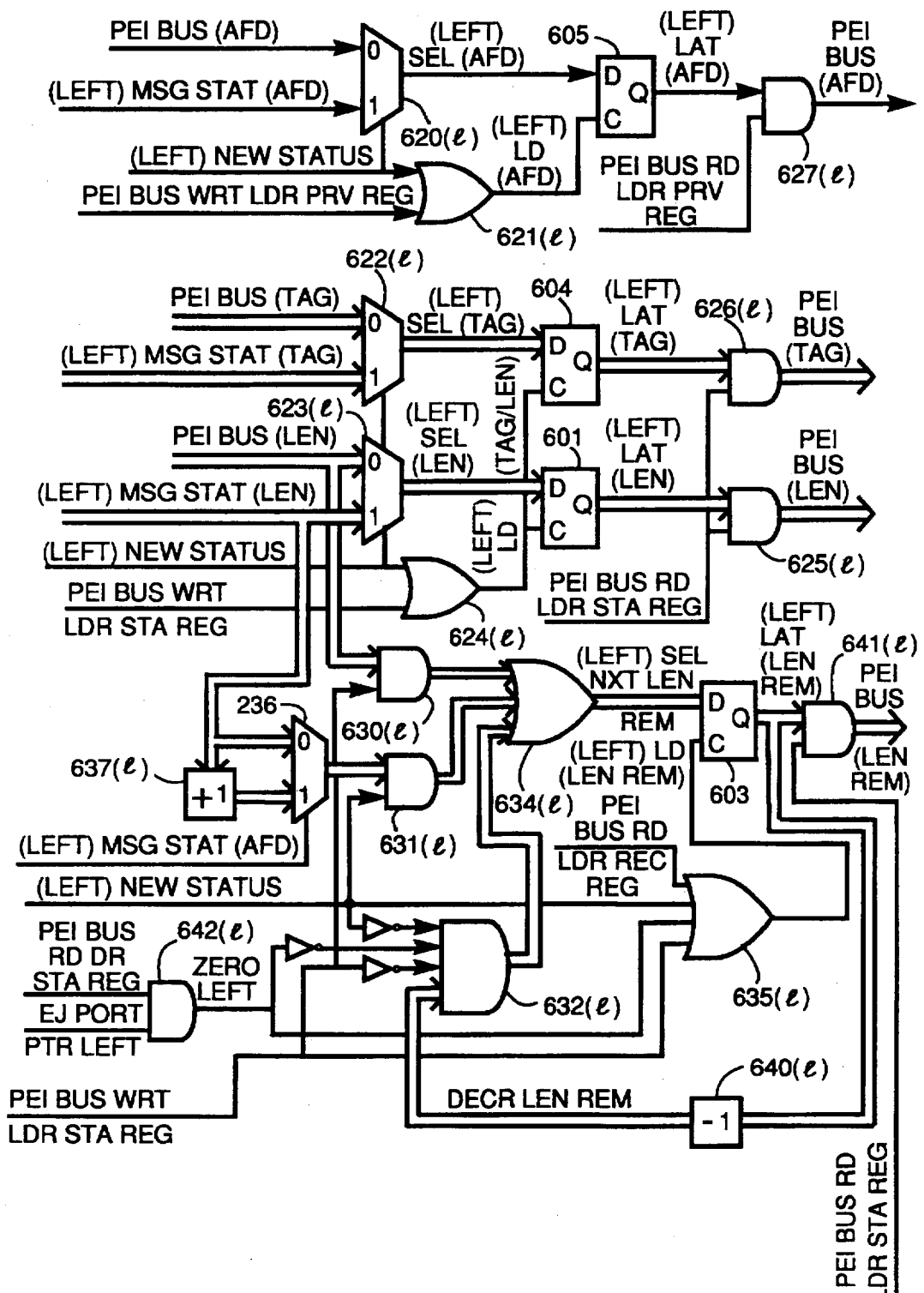

FIG. 31 depicts circuitry for controlling coupling of respective signals for storage in the latches 601, 604 and 605, and the selection and decrementation circuit 602 for controlling coupling of signals for storage in the latch 603. With reference to FIG. 31, the [LEFT] MSG STAT [AFD] signal, from the left ejector port 225(l), is coupled to one data input terminal of a multiplexer 620(l). The PEI BUS [AFD] signal is also coupled to the other data input terminal of multiplexer 620(l). If the [LEFT] NEW STATUS signal is asserted, the multiplexer 620(l) couples the [LEFT] MSG STAT [AFD] signal from the status information FIFO 560 as a [LEFT] SEL [AFD] left selected all-fall-down signal, to the data input terminal of latch 605. the assertion of the [LEFT] NEW STATUS signal also energizes and OR gate 621(l) to assert a [LEFT] LD [AFD] left load all-fall-down signal, which clocks the latch 605, enabling it to latch the [LEFT] SEL [AFD] signal.

On the other hand, if the [LEFT] NEW STATUS signal is negated, the multiplexer 620(l) couples the PEI BUS [AFD] signal to the data input terminal of latch 605. If a PEI BUS WRT LDR PRVT REG write left data router private register signal is asserted, the OR gate 621(l) is also energized to assert the [LEFT] LD [AFD] signal.

Similarly, the latches 604 and 601 are associated with multiplexers 622(l) and 623(l), respectively. Multiplexer 622(l) receives, at its data input terminals, the PEI BUS [TAG] and the [LEFT] MSG STAT [TAG] signals, and, under control of the [LEFT] NEW STATUS signal, couples one of them as the [LEFT] SEL [TAG] selected tag signals to the data input terminal of latch 604. Multiplexer 623(l) receives at its data input terminals, the PEI BUS [LEN] and the [LEFT] MSG STAT [LEN] signals, and, under control of the [LEFT] NEW STATUS signal, couples one of them as the [LEFT] SEL [LEN] selected tag signals to the data input terminal of latch 601. The assertion of the [LEFT] NEW STATUS signal also energizes an OR gate 624(l) to assert a [LEFT] LD [TAG/LEN] left load tag and length signal, which enables the latches 604 to latch the respective [LEFT] SEL [TAG] and [LEFT] SEL [LEN] signals. If the [LEFT] NEW STATUS signal is negated, the multiplexers 622(l) and 623(l) couple the PEI BUS [TAG] and PEI BUS [LEN] signals to the data input terminals of latches 604 and 601. If a PEI BUS WRT LDR STA REG write left data router status register signal is asserted, the OR gate 624(l) is also energized to assert the [LEFT] LD [TAG/LEN] signal.

As noted above, the contents of latches 601, 604 and 605 can also be coupled onto the interface bus 211. Associated with each latch is a gated driver 625(l), 626(l) and 627(l), which, when energized by a PEI BUS RD LDR STA REG read left data router status register signal, or a PEI BUS RD LDR PRVT REG read left data router private register signal, couples the contents of the respective latches onto respective lines of the interface bus 211.

The selection and decrementation circuit 602 includes gated drivers 630(l), 631(l) and 632(l) which receives signals from the three sources from which the length remaining latch 603 may be loaded. Gated driver 630(l) enables the length information from the interface bus 211 to be loaded into the latch 603. Gated driver 630(l), under control of an asserted PEI BUS WRT LDR STA REG signal, gates the PEI BUS [LEN] signals to an OR circuit 624(l). If the PEI BUS WRT LDR STA REG signal is asserted, the OR circuit 634(l) couples the PEI BUS [LEN] signal as [LEFT] SEL NXT LEN REM left selected next length remaining signal. The asserted PEI BUS WRT LDR STA REG signal also energizes an OR gate 635(l) to assert a [LEFT] LD [LEN REM] left load length remaining latch signal, which enables the latch 603 to latch the [LEFT] SEL NXT LEN REM signals.

The length remaining information from the left message ejector port 225(l) is coupled through gated driver 631(l). The [LEFT] MSG STAT [LEN] signals are coupled to one data input terminal of a multiplexer 636(l). The signals are also coupled to an incrementation circuit 637(l), which provides signals to the other data input terminal of multiplexer 636(l) whose binary-encoded value is one greater than the binary-encoded value of the [LEFT] MSG STAT [[LEN] signals. The incrementation provided by the circuit 637(l) accommodates the additional message length of a data router message packet 30 received while the data router 15 is in all-fall-down mode and the leaf 21 is not the destination. The multiplexer 636(l) is controlled by the [LEFT] MSG STAT [AFD] signal, to couple one of the signals at its input terminal to the gated driver 631(l). If the [LEFT] MSG STAT [AFD] signal is negated, the multiplexer 636(l) couples the [LEFT] MSG STAT [LEN] signals to the gated driver, and if the [LEFT] MSG STAT [AFD] signal is asserted it couples the incremented signals thereto.

If the [LEE] NEW STATUS signal is asserted, it enables the gated driver 631(l) to couple the signals selected by multiplexer 636(l) to OR circuit 634(l), which, in turn, couples them as the [LEFT] SEL NXT LEN REM signals to the latch 603. The asserted [LEFT] NEW STATUS signal also energizes OR gate 635(l) to assert the [LEFT] LD [LEN REM] signal, enabling the latch 603 to latch the [LEFT] SEL NXT LEN REM signals.

The [LEFT] LAT [LEN REM] left latched length remaining signals from latch 603 are coupled to a decrementation circuit 640(l), which generates DECR LEN REM decremented length remaining signals whose binary-encoded value is one less than the binary-encoded value of the [LEFT] LAT [LEN REM] signals. The DECR LEN REM signals are coupled to gated driver 632(l). If the [LEFT] NEW STATUS and PEI BUS WRT LDR STA REG signals are negated, and if a ZERO LEFT signal is also negated, the gated driver 632(l) couples the DECR LEN REM signals to the OR circuit 634(l), which couples them as the [LEFT] SEL NXT LEN REM signals to latch 603. When the PEI BUS RD LDR REC REG signal is asserted, indicating that the processor 200 is enabling the left ejector port's receive register 295 to be read, the OR gate 635(l) is energized to assert the [LEFT] LD [LEN REM] signal. The asserted [LEFT] LD [LEN REM] signal enables the latch 603 to latch the [LEE] SEL NXT LEN REM signals. Accordingly, gated driver 632(l) enables the contents of latch 603 to be decremented when the processor 200 retrieves the data router message packet 30 from the left receive register 295.

As with the other latches 601, 604, and 605, the contents of latch 603 can be retrieved under control of the processor 200. If the PEI BUS RD LDR STA REG signal is asserted, a gated driver 641(l) couples the [LEFT] LAT [LEN REM] signals onto the interface bus 211.

As noted above, gated driver 632(l) is also controlled by a ZERO LEFT signal. The ZERO LEFT signal is generated by an AND gate 642(l), which is energized by the coincidence of the PEI BUS RD DR STA REG and the EJ PORT PTR LEFT signals. When the ZERO LEFT signal is asserted, driver 632(l) is disabled, effectively negating the signals coupled to OR circuit 634(l). The processing element interface 212 asserts the PEI BUS RD DR STA REG when the processor 200 enables retrieval of the contents of the middle status register 231. With the coincident assertion of the EJ PORT PTR LEFT signal, the contents of the middle status register 231 is provided by the left status register 293. When the processor subsequently retrieves the data router message packet 30 by retrievals from the middle receive register 233, the data router message packet 30 will be provided by the left receive register 295. Since the data router message packet 30 whose length is represented by the contents of the latch 603 will be retrieved through the middle receive register 233, the latch 603 is zeroed, by the assertion of the ZERO LEFT signal, to prevent the processor 200 from also attempting to retrieve the same data router message packet 30 by retrieval requests directed to the left receive register 295.

Figure 32:
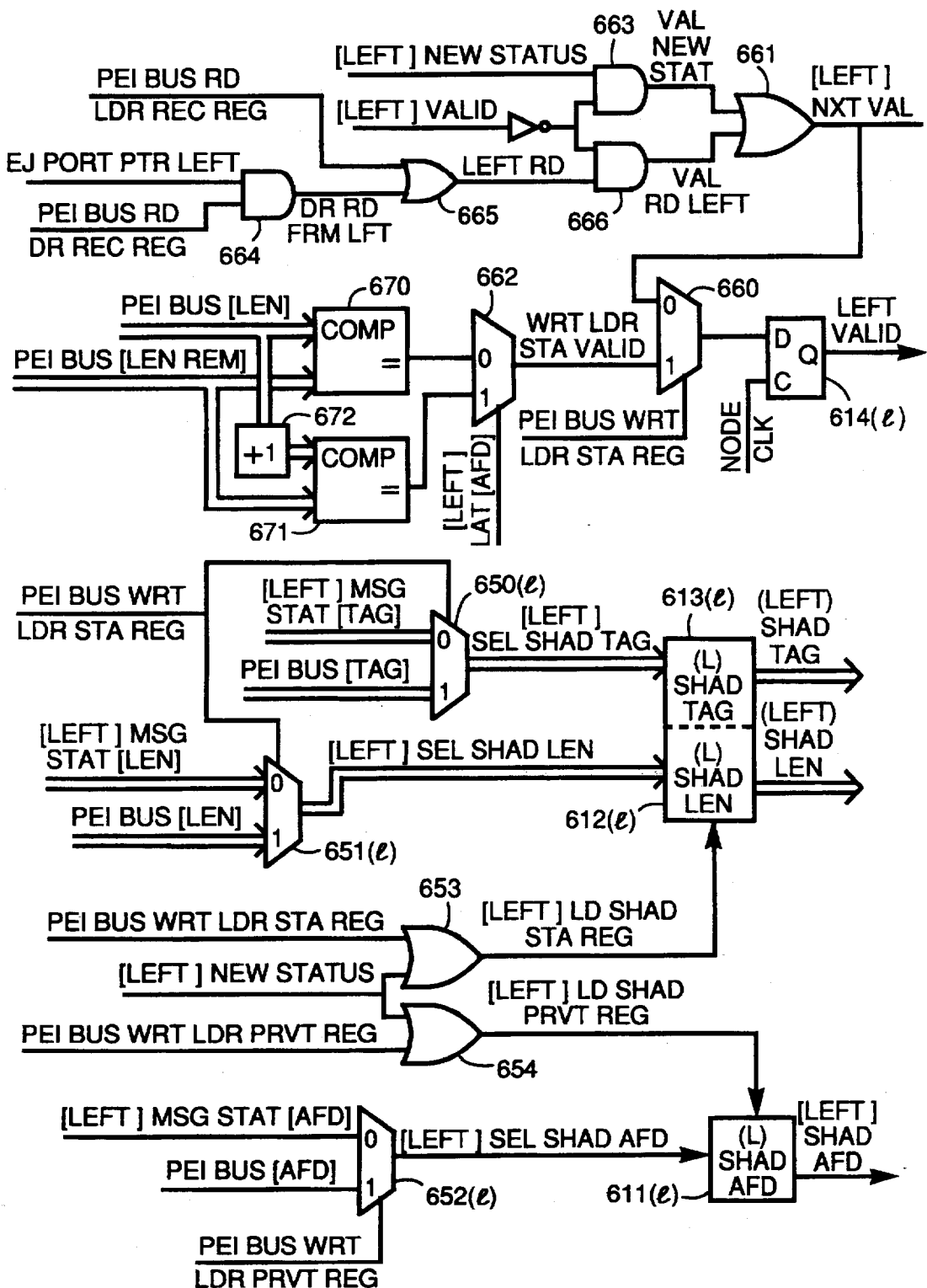

FIG. 32 depicts the left shadow register 610(l) and circuitry for controlling contents thereof. As with latches 605, 604 and 601 (FIG. 31), the data input terminals of latches 613(l), 612(l) and 611(l) receive signals from multiplexers, identified by reference numerals 650(l), 651(l) and 651(l), respectively. Under control of the PEI BUS WRT LDR STA REG signal from the processor element interface 212, the multiplexer 650(l) selectively couples either the [LEFT] MSG STAT [TAG] signals or the PEI BUS [TAG] signals as [LEFT] SEL SHAD TAG left selected shadow tag signals to the data input terminal of the latch 613(l) of shadow register 610(l). Similarly, the multiplexer 651(l) selectively couples either the [LEFT] MSG STAT [1 LEN] signals or the PEI BUS [LEN] signals to the data input terminal of the latch 612(l) of shadow register 610(l). If either the PEI BUS WRT LDR STA REG signal or the [LEFT] NEW STATUS signal is asserted, an OR gate 653 is energized to assert a [LEFT] LD SHAD STA REG left load shadow status register signal, which enables the respective latches 612(l) and 613(l) to latch the signals at their data input terminals.

Similarly, under control of the PEI BUS WRT LDR PRVT REG signal from the processor element interface 212, the multiplexer 650(l) selectively couples either the [LEFT] MSG STAT [AFD] signal or the PEI BUS [AFD] signal as [LEFT] SEL SHAD AFD left selected shadow all-fall-down signal to the data input terminal of the latch 611(l) of shadow register 610(l). If either the PEI BUS WRT LDR PRVT REG signal or the [LEFT] NEW STATUS signal is asserted, an OR gate 654 is energized to assert a [LEFT] LD SHAD PRVT REG left load shadow private register signal, which enables latch 611(l) to latch the signals at its data input terminal.

FIG. 32 also depicts circuitry for controlling left valid flag 614(l), which generates the LEFT VALID signal. In particular, a multiplexer 660 receives a [LEFT] NXT VAL left next valid signal from an OR gate 661 and a WRT LDR STA VALID write left status register/valid signal from a multiplexer 662. The OR gate 661 asserts the [LEFT] NXT VAL signal under two general circumstances. In particular, if, when the left message ejector port 225(l) is asserting the [LEFT] NEW STATUS signal indicating receipt of a data router message packet 30 to be retrieved by the processor 200, the [LEFT] VALID signal is negated by a reset valid flag 614(l), a VAL NEW STAT valid because of new status signal is asserted. The asserted VAL NEW STAT signal energizes OR gate 661 to assert the [LEFT] NXT VAL signal.

In addition, if, while the EJ PORT PTR LEFT signal is asserted, the processor 200 initiates a retrieval operation through the middle receive register 233, which enables the processor element interface 212 to assert the PEI BUS RD DR REC REG read middle receive register signal, an AND gate 664 is energized to assert a DR READ FRM LEFT signal. The assertion of either the DR READ FRM LEFT signal or the PEI BUS RD LDR REC REG, which indicates that the processor 200 is initiating a retrieval operation through the left receive register 295, energizes the OR gate 665 to assert a LEFT RID signal. If the [LEFT] VALID signal is then negated, an AND gate 666 is energized to assert a VAL RD LEFT valid on read from left signal, which also energized OR gate 661 to assert the [LEFT] NXT VAL left next valid signal. If the processor element interface 212 is not asserting the PEI BUS WRT LDR STA REG, which occurs when the processor 200 is enabling the left status register 293 to be loaded, the multiplexer 660 couples the [LEFT] NXT VAL left next valid signal to the data input terminal of valid flag 614(l), to condition the flag 614(l).

On the other hand, if the PEI BUS WRT LDR STA REG signal is asserted, indicating that the processor 200 is enabling loading of the left status register 293, the multiplexer 660 couples a WRT LDR STA VALID write left status register valid signal to condition valid flag 614(l). The WRT LDR STA VALID signal is provided by multiplexer 662. In particular, if the all-fall-down latch 605 (FIG. 31) is negating the [LEFT] LAT [AFD] signal, multiplexer 662 couples an output signal from a comparator 670, which generates an asserted signal if the PEI BUS [LEN] signals and the PEI BUS [LEN REM] signals have the same binary-encoded value, as the WRT LDR STA VALID signal. On the other hand, if the all-fall-down latch 605 is asserting the [LEFT] LAT [AFD] signal, multiplexer 662 couples, as the WRT LDR STA VALID signals, an output signal from a comparator 671, which generates an asserted signal if the PEI BUS [LEN REM] signals have the same binary-encoded value as that of the PEI BUS [LEN] signals, as incremented by one by an incrementation circuit 672.

The comparators 670 and 671 enable conditioning of the valid flag 614(l) using the contents of the receive length and receive length remaining fields of the left status register 293 as it is being loaded by the processor 200, which will occur, for example, during a context switch operation. In particular, if the length (as adjusted by the incrementation circuit 672 if the [LEFT] LAT [AFD] signal is asserted) and length remaining values are the same, no pan of the data router message packet 30 whose status is indicated by the length and length remaining fields in the status register will not have been retrieved, and so the processor 200 could enable retrieval of the message packet 30 through either the left receive register 295 or the middle receive register 233.

On the other hand, if the lengths indicated by the values of the length (as adjusted) and length remaining fields differ, the processor 200 will have partially retrieved the data router message packet 30 through the left receive register 295, and it will resume retrieval therethrough after the context has been switched. In that case, the WRT LDR STA VALID signal will be negated, which will enable the multiplexer 660 to, in turn, enable the valid flag 614(l) to be clear.

Figure 33:
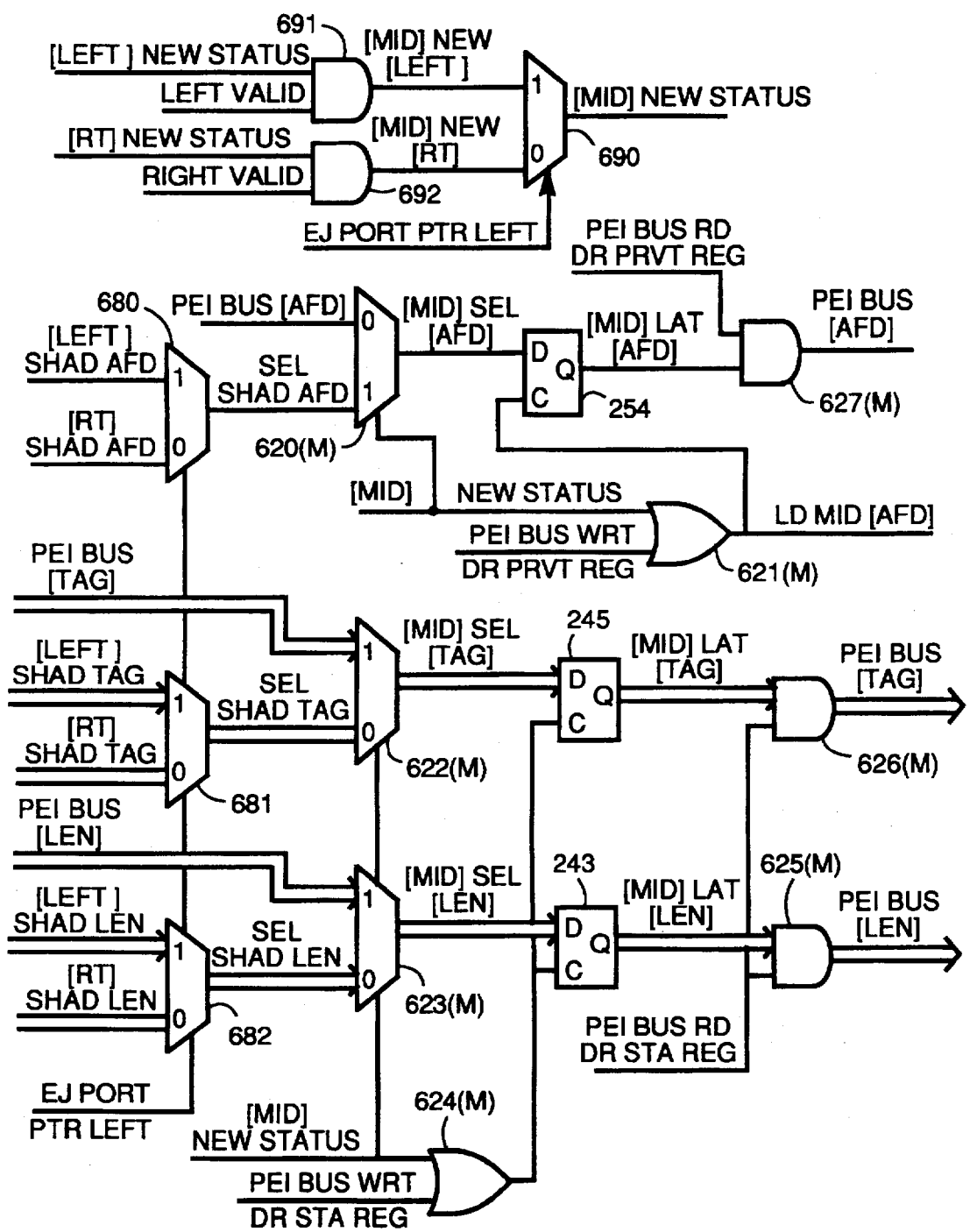
Figure 34:
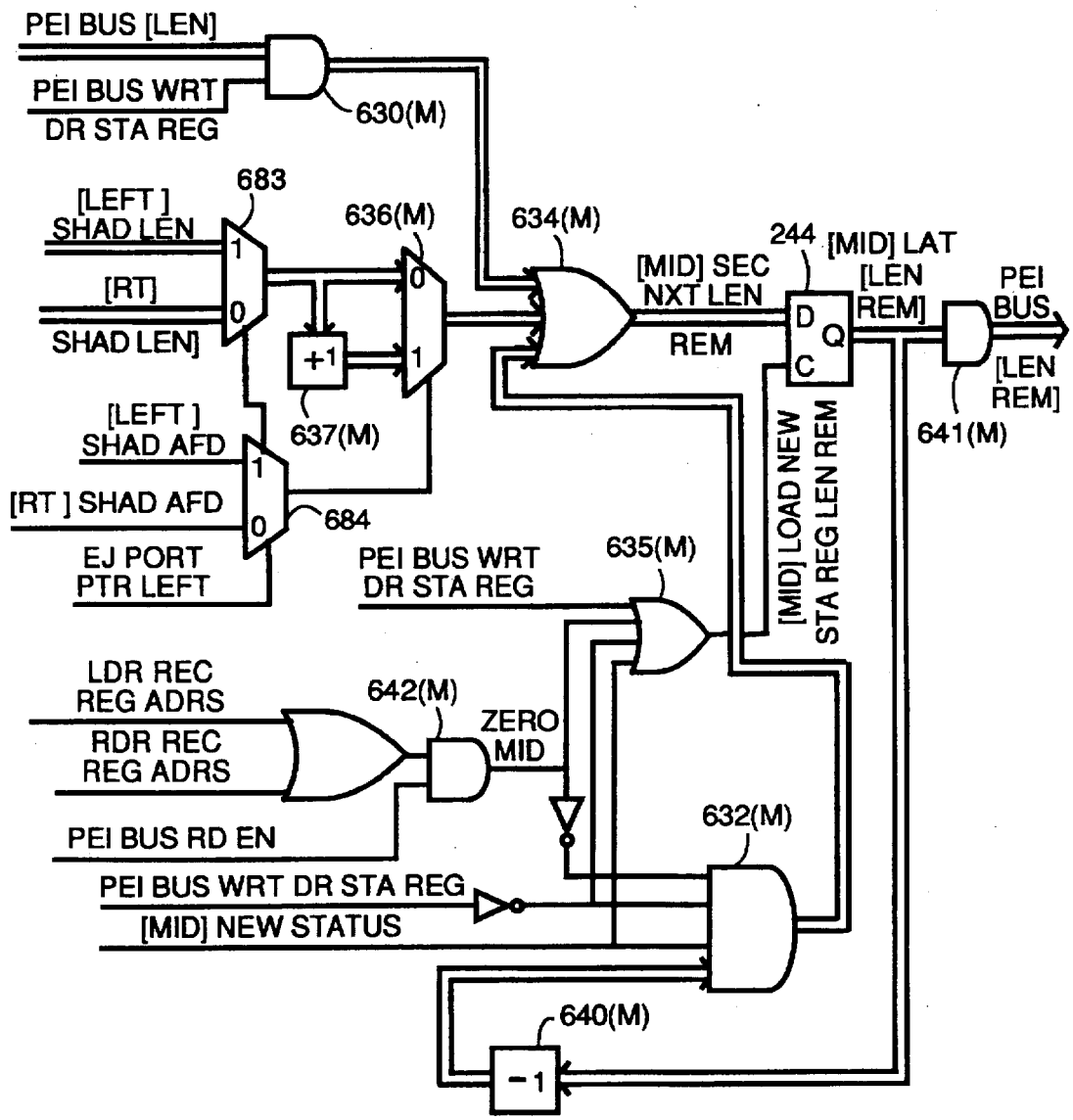

The [LEFT] VALID and [RIGHT] VALID signals are used by the circuitry for controlling the middle status and private registers 231 and 232, which is depicted in FIGS. 33 and 34. Much of the circuitry depicted on FIGS. 33 and 34 is similar to that described above in connection with FIG. 32, and will not be described herein. In particular, multiplexers and gates for controlling the loading of the respective latches 254, 245, 243 and 244, where similar, is identified by reference numerals having the tag "(M)" instead of "(l)", and such circuitry operates in substantially the same way. FIG. 33 also includes circuitry for generating a [MID] NEW STATUS signal. In addition, the circuitry depicted on FIG. 33 includes multiplexers 680 through 684 which, under control of the EJ PORT PTR LEFT signal, selecting between the left and right shadow registers 610(l) and 610(r) for providing signals to the respective multiplexers 620(M), 622(M), 623(m) and 636(m), substituting for the [LEFT] MSG STAT signals in the circuit depicted in FIG. 31. The EJ PORT PTR LEFT signal, when asserted, enables retrievals initiated by the processor 200 from the middle receive register 233 to be provided by the left message ejector port 225(l). On the other hand, when the EJ PORT PTR LEFT signal is negated, the retrievals initiated by the processor from the middle receive register 233 are provided by the right message ejector port 225(r).

The [MID] NEW STATUS signal is generated by a multiplexer 690 and AND gates 691 and 692. if the [LEFT] NEW STATUS signal is asserted, and if the valid flag 614(l) is asserting the [LEFT] VALID signal, AND gate 691 is energized to assert a [MID] NEW [LEFT] middle new status from left signal. If the EJ PORT PTR LEFT ejector port pointer left signal is asserted the multiplexer 690 couples the [MID] NEW [LEFT] signal as the [MID] NEW STATUS signal. If either the [LEFT] NEW STATUS or the [LEFT] VALID signals are negated when the EJ PORT PTR LEFT signal is asserted, the [MID] NEW STATUS signal will be negated.

Similarly, if the [RIGHT] NEW STATUS signal is asserted, and if the valid flag 614(R) is asserting the [RIGHT] VALID signal, AND gate 692 is energized to assert a [MID] NEW [RT] middle new status from right signal. If the EJ PORT PTR LEFT ejector port pointer left signal is negated, to identify the left message ejector port 225(r), the multiplexer 690 couples the [MID] NEW [RT] signal as the [MID] NEW STATUS signal. If either the [RIGHT] NEW STATUS or the [RIGHT] VALID signals are negated when the EJ PORT PTR LEFT signal is negated, the [MID] NEW STATUS signal will also be negated.

Figure 35:
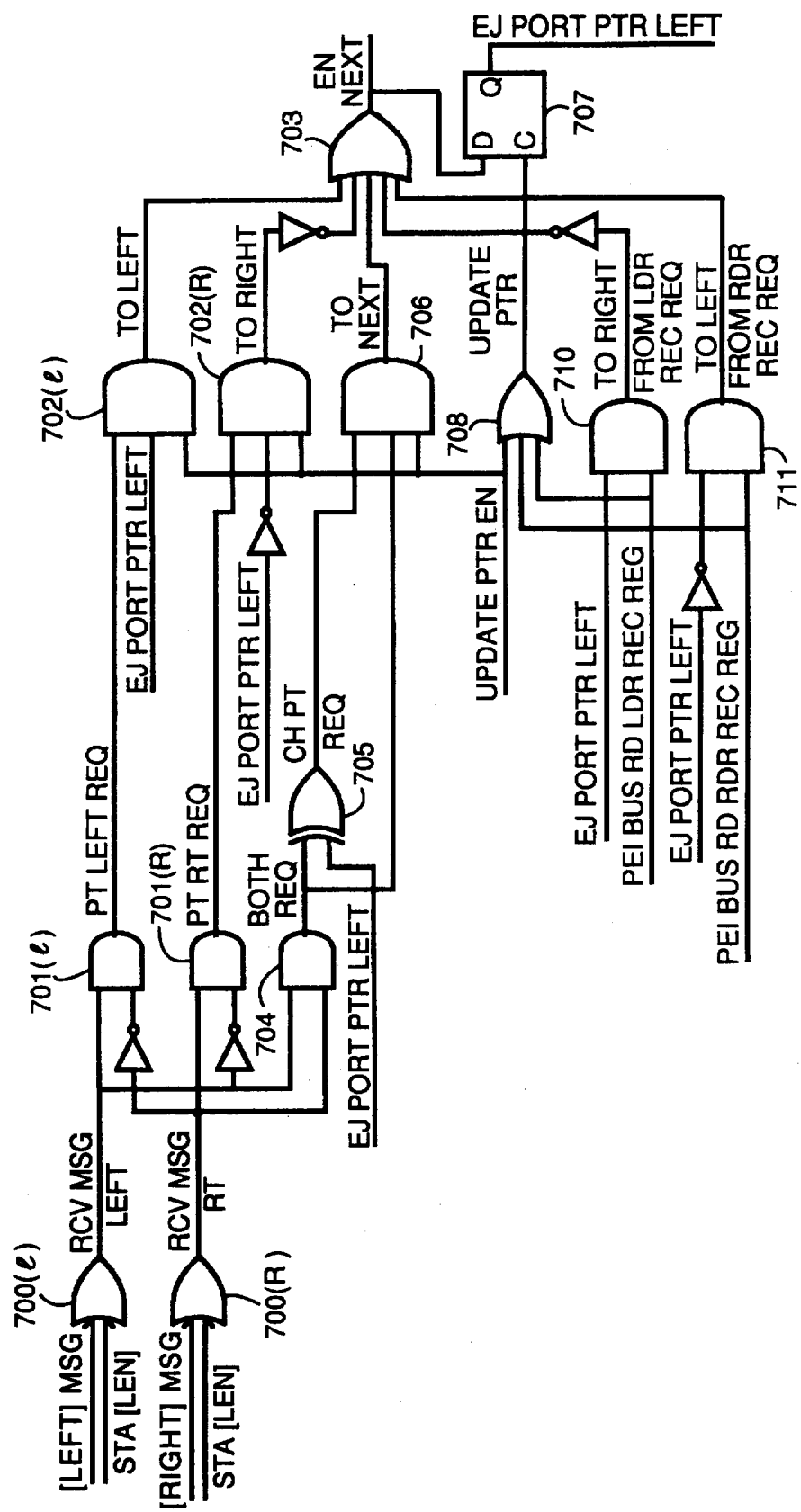

FIG. 35 depicts circuitry for controlling the condition of the EJ PORT PTR LEFT signal. Generally, the EJ PORT PTR LEFT signal is controlled in response to the receipt by the left and right message ejector ports 225(l) and 225(r) of a data router message packet 30 to be retrieved by the processor 200, by the processor 200 enabling retrieval of a data router message packet 30 through either the left or right receive registers 295 and 303, and by the condition of the EJ PORT PTR LEFT signal. In particular, if, for example, the left message ejector port 225(l) has a new data router message packet 30 for retrieval by the processor 200, and the right message ejector port 225(r) does not, and if further the EJ PORT PTR LEFT signal is asserted, the circuit enables the EJ PORT PTR LEFT to remain asserted. On the other hand, if both message ejector ports 225(l) and 225(r) have new data router message packets 30 for retrieval by the processor 200, the EJ PORT PTR LEFT is enabled to toggle.

Retrieval requests from the processor 200 also can change the condition of the EJ PORT PTR LEFT signal. In particular, if the processor enables a retrieval operation from the left receive register 295, while the EJ PORT PTR LEFT signal is asserted, the circuit negates the EJ PORT PTR LEFT signal. On the other hand, if the processor 200 enables a retrieval operation from the right receive register 302 while the EJ PORT PTR LEFT signal is negated, the circuit asserts the EJ PORT PTR LEFT signal.

More specifically, with reference to FIG. 35, if at least one of the [LEFT] MSG STAT [LEN] signals is asserted, an OR gate 700(l) is energized to assert a RCV MSG LEFT received message left signal. This will occur if the [LEFT] MSG STAT [LEN] signals from the left message ejector port 225(l) indicate receipt of a new data router message packet 30. If an OR gate 700(r), which receives the [RIGHT] MSG STAT [LEN] signals, generates a negated RCV MSG RT signal, indicating that the right message ejector port 225(r) does not have a new data router message packet 30, an AND gate 701(l) is energized, to assert a PT LEFT REQ point left request. If the EJ PORT PTR LEFT signal is asserted, and if a periodically-asserted UPDATE PTR EN update pointer enable signal is also asserted, an AND gate 702(l) is energized to assert a TO LEFT signal. The TO LEFT signal, in turn, energizes an OR gate 703 to assert an EN NEXT enable next signal which is coupled to the data input terminal of a flip-flop 707. The asserted UPDATE PTR EN signal also enables an OR gate 708 to assert an UPDATE PTR update pointer signal, which enables the flip-flop 707 to be set in response to the asserted EN NEXT signal, thereby asserting the EJ PORT PTR LEFT signal.

Similarly, if at least one the [RIGHT] MSG STA [LEN] signal is asserted, and the [LEFT] MSG STAT [LEN] signals are negated, an AND gate 701(R) asserts a PT RT REQ point right request. If the EJ PORT PTR LEFT signal is negated, AND gate 702(r) will be energized to assert a TO RIGHT signal, which disables OR gate 703 to negate the EN NEXT signal. When the UPDATE PTR signal is asserted, the flip-flop 707 will be reset to negate the EJ PORT PTR LEFT signal.

On the other hand, if both RCV MSG LEFT and RCV MSG RT signals are asserted, indicating both left and right message ejector ports 225(l) and 225(r) have received data router message packets 30 for retrieval by the processor 200, an AND gate 704 asserts a BOTH REQ both request signal, which is coupled to one input terminal of an XOR exclusive OR gate 705. If the EJ PORT PTR LEFT signal is asserted, the XOR gate 705 negates a CH PTR REQ change pointer request signal, which disables an AND gate 706 to negate a TO NEXT signal. The negated TO NEXT signal disables OR gate 703 to negate the EN NEXT signal, which, in turn, enables the flip-flop 707 to be reset when the UPDATE PTR update pointer signal is next asserted. On the other hand, if the EJ PORT PTR LEFT signal is negated when the BOTH REQ both requested signal is asserted, AND gate 706 is energized to assert the TO NEXT signal, which enables OR gate 703. Accordingly, flip-flop 707 will be energized in response to the assertion of the UPDATE PTR signal.

As noted above, the EJ PORT PTR LEFT signal can be controlled in response to requests from the processor 200 initiating retrievals from the left and right receive registers 295 and 304. In particular, if the processing element interface 212 is asserting the PEI BUS RD LDR REC REG signal, indicating that the processor 200 is requesting a retrieval from the left receive register 295, and if the EJ PORT PTR LEFT signal is asserted, an AND gate 710 is energized to assert a TO RIGHT/FROM LDR REC REQ signal, which is complemented to disable the OR gate 703. The disabled OR gate 703 provides a negated EN NEXT signal, which resets the flip-flop 707 in response to the assertion of the UPDATE PTR signal, thereby negating the EJ PORT PTR LEFT signal.

On the other hand, if the processing element interface 212 is asserting the PEI BUS RD RDR REC REG signal, indicating that the processor 200 is requesting a retrieval from the left receive register 295, and if the EJ PORT PTR LEFT signal is negated, an AND gate 711 is energized to assert a TO LEFT/FROM RDR REC REQ signal, which is complemented to enable the OR gate 703. The enabled OR gate 703 provides an asserted EN NEXT signal, which sets the flip-flop 707 in response to the assertion of the UPDATE PTR signal, thereby asserting the EJ PORT PTR LEFT signal.

Figure 36:
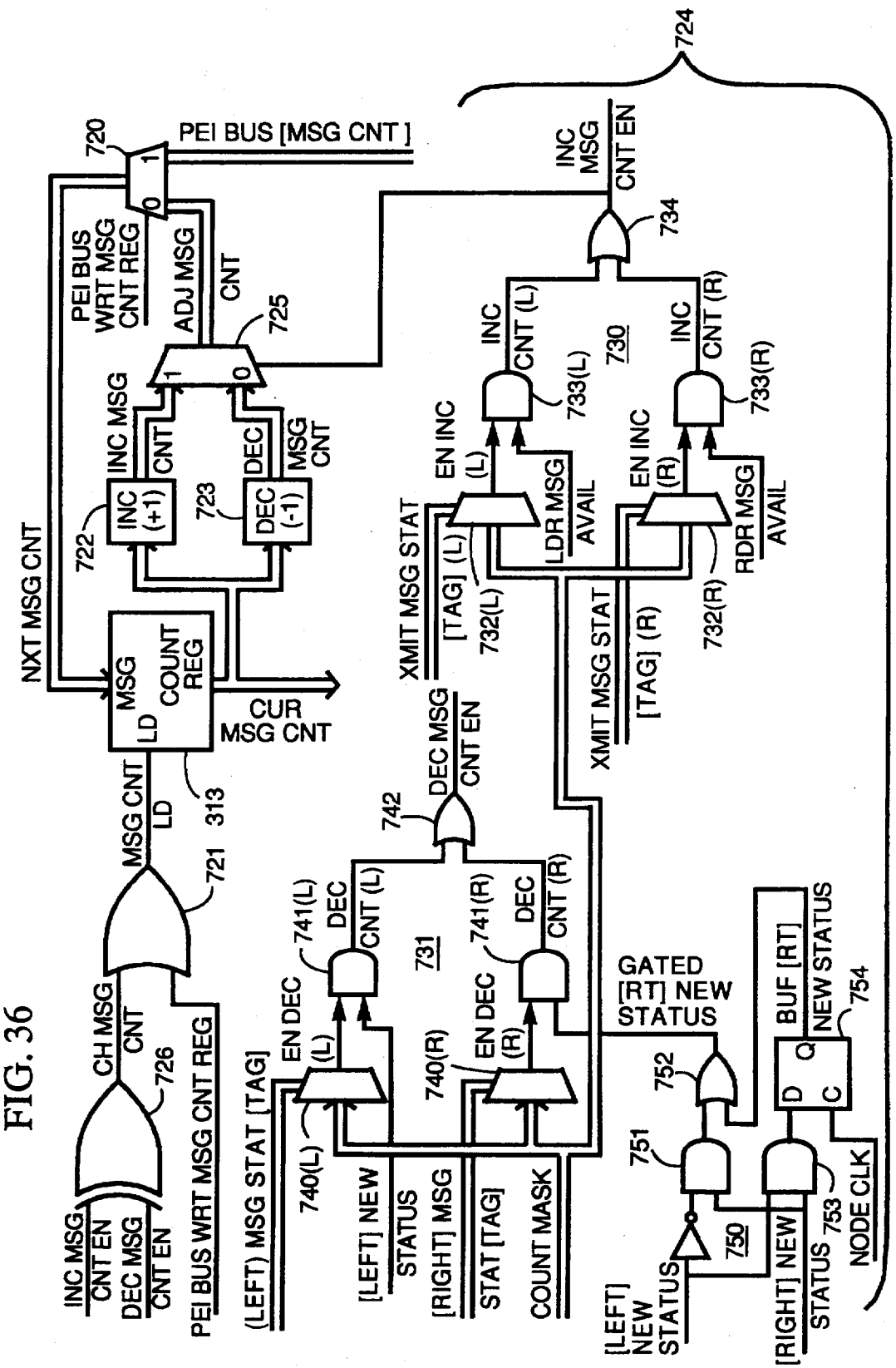

FIG. 36 depicts the message count register 313 (FIG. 12B) and circuitry for controlling the register 313. As noted above, and as will be described in detail below, the contents of the message count register 313 are incremented in response to the transmission by the leaf 21 of data router message packets 30, and decremented in response to the receipt thereof. In addition, CUR MSG CNT current message count signals, which represent the value contained in the message count register 313, are used in control network message packets 60 to determine when the data router 15 is empty.

With reference to FIG. 36, the message count register 313 may be written with an initial value by the processor 200 through a multiplexer 720. In that operation, the processor 200 provides the initial value to the processor element interface 212, and enables it to transfer the value as PEI BUS [MSG CNT] message count signals and assert a PEI BUS WRT MSG CNT REG write message count register enable signal. In response to the PEI BUS WRT MSG CNT REG signal, the multiplexer 720 couples the PEI BUS [MSG CNT] signals as NXT MSG CNT next message count signals to data input terminals of the message count register. The asserted PEI BUS WRT MSG CNT REG signal also energizes an OR gate 721 to assert a MSG CNT LD message count load signal, enabling the message count register 313 to load the NXT MSG CNT signals.

Incrementation and decrementation of the message count value stored in the message count register 313 are accomplished by an incrementation circuit 722 and a decrementation circuit 723, respectfully, under control of a control circuit 724. The control circuit 724 generates an INC MSG CNT EN increment message count enable signal to enable the message count value in the register 313 to be incremented, and a DEC MSG CNT EN decrement message count enable signal. Generally, the control circuit 724 asserts the INC MSG CNT EN signal in response to transmission of a data router message packet 30 by the left and right message injector ports 223(l) and 223(r). In addition, the control circuit asserts the DEC MSG CNT EN signal in response to reception of a data router message packet 30 by the left and right message ejector ports 225(l) and 225(r).

The incrementation circuit 722 receives the CUR MSG CNT current message count signals from the message count register 313 and generates INC MSG CNT incremented message count signals in response. The INC MSG CNT signals have a binary-encoded value that is one greater than the binary-encoded value of the CUR MSG CNT signals. Similarly, the decrementation circuit 723 receives the CUR MSG CNT signals and generates DEC MSG CNT decremented message count signals having a binary-encoded value that is one less than the binary-encoded value of the CUR MSG CNT signals.

Both the INC MSG CNT signals and the DEC MSG CNT signals are coupled to data input terminals of a multiplexer 725, which is controlled by the INC MSG CNT EN increment message count enable signal from the control circuit 724. If the INC MSG CNT EN signal is asserted, the multiplexer 725 couples the INC MSG CNT signals as ADJ MSG CNT adjusted message count signals to the second data input terminals of multiplexer 720. Similarly, if the control circuit 724 is not asserting the INC MSG CNT EN signal, the multiplexer 725 couples the DEC MSG CNT signals from decrementation circuit 723 as the ADJ MSG CNT signals. In either case, at this point the PEI BUS WRT MSG CNT REG is negated, which enables the multiplexer 720 to couple the ADJ MSG CNT signals as the NXT MSG CNT signals to the message count register 313.

If the control circuit 724 is not also at that point asserting the DEC MSG CNT EN decrement message count enable signal, an XOR exclusive OR gate 726 is energized to assert a CH MSG CNT change message count signal. The asserted CH MSG CNT signal energizes OR gate 721 to assert the MSG CNT LD signal, to enable the message count register 313 to load the NXT MSG CNT signals from multiplexer 720. It will be appreciated that, if the control circuit 724 is asserting both the INC MSG CNT EN signal and the DEC MSG CNT EN signal, the XOR gate 726 will be de-energized to negate the CH MSG CNT signal. If the PEI BUS WRT MSG CNT REG signal is also negated, OR gate 721 will be de-energized, negating the MSG CNT LD signal and disabling the message count register 313 from loading the NXT MSG CNT signals. The XOR gate 726 is provided since, if control circuit 724 is simultaneously asserting both the INC MSG CNT EN signal, to enable incrementation of the value in 313 message count register, and the DEC MSG CNT EN signal, to enable decrementation of the value in the message count register 313, the value in the register 313 will remain unchanged.

The control circuit 724 includes an incrementation enabling portion 730, which controls the INC MSG CNT EN signal, and a decrementation enabling portion 731, which controls the DEC MSG CNT EN signal. The incrementation enabling portion 730, generally, controls the INC MSG CNT EN signal in response to XMIT MSG STAT [TAG] (x) signals ("x" referencing "L" or "R") representative of the message tag field of the data router message packet 30 to be transmitted, the [xDR] MSG AVAIL signal from the left or right message injector port 223(l) or 223(r) indicating that the packet is being transmitted, and COUNT MASK signals provided by a count mask register (not shown).

As with other registers, the count mask register may be loaded by the processor 200 The COUNT MASK signals permit the message count value in the register 313 to be selectively adjusted based on the XMIT MSG STAT [TAG] signals of the message packet 30 being transmitted or received, and so the processor 200 can control particular conditions, represented by the various encodings of the tag fields 35, under which transmission or reception of messages will affect the message count value in the message count register 313. In the incrementation enabling portion 730, the COUNT MASK signals are directed to data input terminals of multiplexers 732(x), which is controlled by the XMIT MSG STAT [TAG] (x).

In response, each multiplexer 732(x) couples one of the COUNT MASK signals, selected based on the encoding of the XMIT MSG STAT [TAG] (x) signals, as an EN INC (x) enable increment signal. Whether the EN INC (x) enable increment signal is asserted will be determined in response to the particular assertion pattern of the COUNT MASK signals and the encoding of the XMIT MSG STAT [TAG] (x) signals. The SEL CNT (x) signal and xDR MSG AVAIL signal ("x" referencing "L" and "R") are coupled to an AND gate 733(x). If both signals are asserted, the AND gate 733(x) is energized to assert an INC CNT (x) increment count signal, which energizes and OR gate 734 to assert the INC MSG CNT EN increment message count enable signal. On the other hand, if either the EN INC (x) signal, or the xDR MSG AVAIL signal are negated, AND gate 733(x) will be de-energized to negate the INC CNT (x) signal. If both the AND gates 733(l) and 733(r) are negating their INC CNT (L) and the INC CNT (R) signals, the OR gate 734 will be de-energized to negate the INC MSG CNT EN signal.

The decrementation enabling portion 731 has similar multiplexers 740(x) and AND gates 741(x) and an OR gate 742 for generating the DEC MSG CNT EN decrement message count enable signal. The multiplexers 740(x) are controlled by the [LEFT] MSG STAT [TAG] and [RIGHT] MSG STAT [TAG] signals from the left and right message ejector portions 225(l) and 225(r) respectively. In response to the [x] MSG STAT [TAG] signals, the corresponding multiplexer 740(x) couples a selected one of the COUNT MASK signals as an EN DEC (x) enable decrement signal to the AND gate 741(x). AND gate 741(l) is also controlled by the [LEFT] NEW STATUS signal from left message ejector port 225(l). If the EN DEC (L) and [LEFT] NEW STATUS signals are asserted, AND gate 741(l) is energized to assert a DEC CNT (L) decrement count signal, which energizes OR gate 742 to assert the DEC MSG CNT EN signal.

The AND gate 741(r), on the other hand, is controlled by a GATED [RT] NEW STATUS signal from a buffer circuit 750. Buffer circuit 750 buffers and delays the effect of the assertion of the [RIGHT] NEW STATUS signal in connection with AND gate 741(r) if both it and the [LEFT] NEW STATUS signal are asserted simultaneously, indicating simultaneous reception of data router message packets 30 by both message ejector ports 225(l) and 225(r). If the [RIGHT] NEW STATUS signal is asserted, but the [LEFT] NEW STATUS signal is negated, an AND gate 751 is energized, which, in turn, energizes an OR gate 752 to assert the GATED [RT] NEW STATUS signal.

On the other hand, if both the [RIGHT] NEW STATUS and the [LEFT] NEW STATUS signals are asserted, AND gate 751 is de-energized, and an AND gate 753 is energized. The energized AND gate 753 provides an asserted signal to the data input terminal of a flip-flop 754, which is set at the next tick of the NODE CLK signal to assert a BUF [RT] NEW STATUS buffered right new status signal. The asserted BUF [RT] NEW STATUS signal energizes OR gate 752 to assert the GATED [RT] NEW STATUS signal, which enables the AND gate 741(r). Thus, if both the [LEFT] NEW STATUS and the [RIGHT] NEW STATUS signals are asserted simultaneously, buffer circuit 750 delays the enablement of the AND gate 741(r), which controls the DEC CNT (R) signal, to ensure decrementation of the value in the message count register 313 in response to reception of data router message packets 30 by both message ejector ports 225(l) and 225(r).

iii. Control Network Interface 204 a. General

As noted above, the control network interface 204 receives (ejects) control network message packets 60 from the control network 14, and transmits (injects) control network message packets 60 to the control network 14. A general block diagram of control network interface 204 is shown in FIG. 37, and more detailed diagrams are shown in FIGS. 39 through 44.

Figure 37:
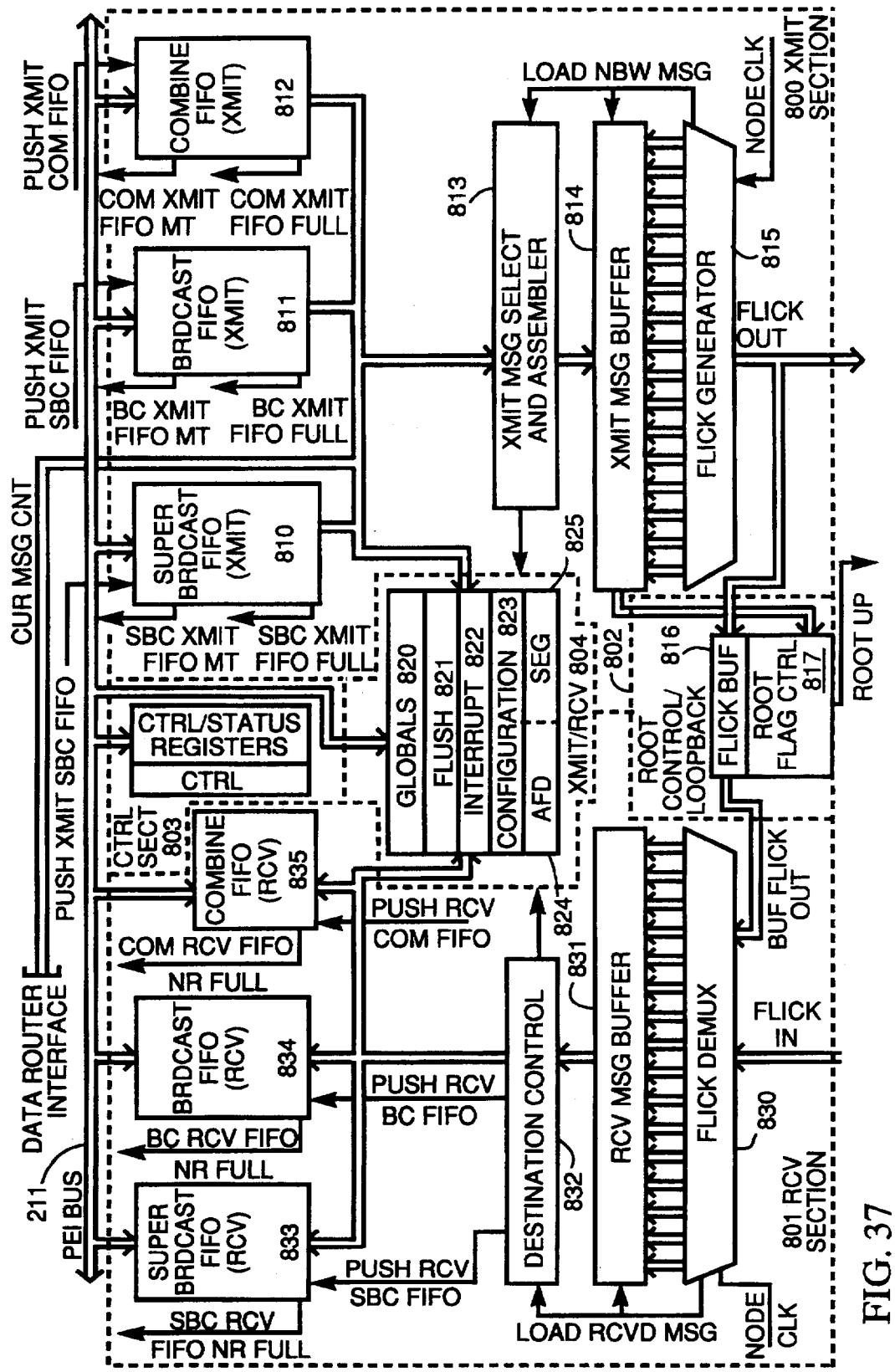
FIG. 37 comprises a general block diagram of a control network interface circuit useful in interfacing the processing element depicted in FIG. 10 to the control network of the computer system depicted in FIG. 1, FIG. 37 contains a definitions of a register in the control network interface and FIGS. 39 through 44 comprise logic diagrams of the control network interface.

With reference to FIG. 37, the control network interface 204 includes a transmit section 800 that transmits control network message packets 60 over the control network 14, a receive section 801 that receives control network message packets 60 from the control network 14, and a root control/loopback section 802, all of which are controlled by a common control section 803 and set of registers 804. The transmit section 800 transmits, that is, injects, control network message packets 60 over the control network 14. The receive section 801 receives, that is, ejects, control network message packets from the control network 14, in particular, from the control network node 50(1,j) (FIG. 4A) connected thereto.

The root control/loopback section 802 determines whether the control network interface 204 is a logical root of a sub-tree, and if so asserts a ROOT UP signal, which is received by the control network node 50(1,j). It will be appreciated that, if the control network interface 204 is asserting the ROOT UP signal, it is the root of a sub-tree that comprises only the single leaf 21.

The common control section 803 maintains several control and status registers and effectively controls the operations of the interface 204 as will be described below. The registers 804 contain information which is used in generating control network message packets 60. The registers 804 can be written by the processor 200 to transmit some control information over the control network 14 in message packets 60 transmitted by the transmit section 800. Alternatively, the registers 804 may be loaded with control information which the receive section 801 obtained from control network message packets 60 received thereby.

Like the data router interface 205, the control network interface 204 also makes use of a number of registers to enable the processor 200 to initiate transfers of message packets 60 over the control network 14, and facilitate reception by the processor 200 of data from control network message packets 60 that the control network interface 204 receives from the control network 14. In particular, the processor may initiate transmissions over the control network 14, by loading information in a supervisor broadcast register set, a broadcast register set and a combine register set provided in the control network interface 204. All of the register sets are generally similar to the send first, send and receive registers 234, 235, and 233, respectively of the data router interface 205 (FIG. 12A), except that the first word of the send first register in the control net-work interface includes diverse fields, as will be described in connection with FIG. 38. Since the send and receive registers in each of the supervisor broadcast, supervisor, and combine register sets are similar to the correspondingly-named registers as shown on FIG. 12A, they will not be described further herein.

The processor 200 enables the control network interface 204 to generate control network message packets 60 in a manner similar to that in which it enables the data router interface 205 to generate data router message packets 30. In particular, the processor 200 first transmits information to the control network send first register. Thereafter, if the control network message packet 60 is, for example, for a multi-word scan operation, requiring multiple control network message packets 60 each having a thirty-two bit word, the processor 200 can provide the additional words by loading them into the send register in the particular register set.

When the control network interface 204 receives a control network message packet 60 from the control network 14, it enables the processing element interface 212 to interrupt the processor 200, identifying the particular register set into which the information from the message packet 60 was loaded. The processor 200 can obtain the data received from a particular control network message packet 60 by retrieving the contents of the receive register in the particular register set identified in the interrupt.

Figure 38:
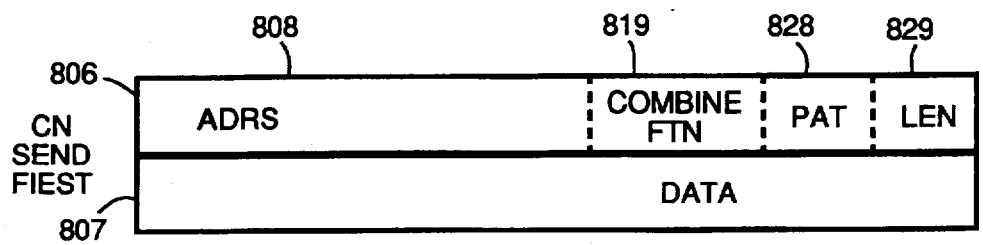

The send first registers in the supervisor broadcast, broadcast and combine register sets all have the same general structure, which is shown in FIG. 38. With reference to FIG. 38, each send first register includes two words 806 and 807. A high-order address field 808 in the first word 806 contains an address value, in the address space defined for the memory bus 203 (FIG. 10) of the network interface 202 and, specifically, of the control network interface 204.

The remaining fields 819 through 829 of the first word 806 include information which the control network interface 204 uses in generating the packet header 61. A combine function field 819, and pattern field 828 in the first word 806 of the send first register contain information that is copied into fields 65, 66 and 67, respectively, of the packet header 61. The second word 807 of a send first register contains data to be transmitted in data fields 70 of the packet data 62. If the contents of length field 829 if the send first register indicates that a message is to include multiple thirty-two bit words, each thirty two bit word is sent in a control network message packet 60, with the contents of successive data fields 70 being provided through the send register.

Returning to FIG. 37, the transmit section includes three first-in first-out buffers, namely, a supervisor broadcast transmit first-in first-out buffer (FIFO) 810, a broadcast transmit FIFO 811 and a combine transmit FIFO 812. Generally, the supervisor broadcast transmit FIFO 810 stores information used by the control network interface 204 in creating control network message packets 60 of the single source message type, while the processor 200 is in its supervisor operating mode. Similarly, the broadcast transmit FIFO 811 stores information used by the control network interface 204 in creating control network message packets 60 of the single source message type, while the processor 200 is in its user operating mode. The combine transmit FIFO 812 stores information used by the control network interface in creating control network message packets 60 of the multiple-source message type, including router done packets 60 which are used to determine if the data router 15 is empty. Information in the combine transmit FIFO 812 that enables creation of packets other than a router done packet includes the data that will be used in establishing the contents of the data nibbles 70(i) (FIG. 7) of the packet 60. However, information in the combine transmit FIFO 812 that enables creation of router done packets does not include such data; the data is instead provided by the CUR MSG CNT current message count signals from the data router interface 205.

Each FIFO 810 through 812 has data input terminals that are connected to the interface bus 211 and is loaded by the interface 212 with the contents of the send first and send registers of the respective supervisor broadcast, broadcast and combine register set when the processor 200 transfers information thereto. The interface 212 asserts a PUSH XMIT SBC FIFO push transmit supervisor broadcast first-in first-out buffer signal, a PUSH XMIT BC FIFO push transmit broadcast first-in first-out buffer signal or a PUSH XMIT COM FIFO push transmit combine first-in first-out buffer signal to enable the respective FIFO 810 through 812 to receive and store the information.

Each FIFO 810 through 812 generates status signals "XXX" XMIT FIFO FULL transmit buffer full signal and "XXX" XMIT FIFO MT transmit buffer empty signal ("XXX" may comprise "SBC" which identifies the supervisor broadcast transmit FIFO 810, "BC" which identifies the broadcast transmit FIFO 811, or "COM" which identifies the combine transmit FIFO 812) which indicate whether the respective buffer is nearly full or nearly empty. If a particular FIFO 810 through 812 is asserting its "XXX" XMIT FIFO FULL signal, the interface 212 rejects attempts by the processor 200 to load information therein.

Each FIFO 810 through 812 also includes data output terminals that are connected to a transmit message select and assembler circuit 813. Under control of a LOAD NEW MSG load new message signal, circuit 813 receives the "XXX" XMIT FIFO MT signals, determines whether any of them have information to be used in a control network message packet 60, and if so assembles a control network message packet 60. In assembling the message packet, the circuit 813 may also use the contents of registers 804 and CUR MSG CNT current message count signals from the data router interface 205 if the PKT TYPE XMIT signals indicate that the control network message packet 60 is a router done packet.

The transmit message select and assembler 813 couples forty-eight bit words representing the header 61 and data portion 62 of the assembled message packet 60 to a transmit message buffer 814, which latches it in response to the LOAD NEW MSG signal. In response to successive ticks of the NODE CLK signal, a flick generator iteratively selects four-bit nibbles from the transmit message buffer 814 and appends to each selected nibble a high-order bit comprising the tag bit. The flick generator 815 transmits the result as FLICK OUT (4:0) tick output signals to the control network node 50(1,j) connected thereto, and also to a flick buffer 816 in the root control/loopback circuit 802.

As it iteratively transmits the FLICK OUT (4:0) signals, the flick generator 815 generates a checksum, which it transmits as the thirteenth flick of the control network message packet. Contemporaneously with transmission of the last flick of the message packet 60, the flick generator 815 asserts the LOAD NEW MSG load new message signal to enable the transmit message buffer 814 to latch a new word and the circuit 813 to generate a new control network message packet 60 for transmission.

As noted above, the control network interface 204 includes a set of registers 804 that provide information which may also be used in generating message packets. A globals register 820 contains global bits that can be used to perform a global operation as described above. A flush flag 821 can be used to control the flush bit 75 in the control network message packet 60; if set, the flush bit 75 enables the control network 14 to flush intermediate results of a scan operation. An interrupt register 822 can be loaded with an interrupt value that can be transmitted in a single-source message packet of the interrupt type, to broadcast interrupt information to other leaves 21 in the partition.

A configuration register 823 contains a value that can be used in a single-source message packet of the configuration type to identifies the level and sub-level at which the logical root is to be established for the partition; this information is loaded into flicks 70(0) and 70(1) of the packet data portion 62. An all-fall-down mode flag 824, which is derived from all-fall-down enable bit 256 of the private register 232 (FIG. 12A) is used to initiate an all-fall-down operation in the data router 15; the all-fall-down mode flag 824 is used to condition all-fall-down mode bit 81 of the control network message packet 81. Finally, a segment flag 825, which may be conditioned by the processor 200, is used in segment bit 77 of a multi-source control network message packet 60 to identify the beginning of a segment in a segmented scan operation.

The receive section 801 includes a flick demultiplexer 830 that iteratively receives, at each tick of the NODE CLK signal, either the FLICK IN signals from the control network node 50(i,j) or the BUF FLICK OUT buffered flick out signals from the root control/loopback circuit 802. If the root control/loopback circuit 802 is asserting SEL XMIT select transmit section signal, generally indicating that the control network interface 204 is a logical root, the flick demultiplexer 830 selects the BUF FLICK OUT signals, and otherwise it selects the FLICK IN signals. The flick demultiplexer 830 strips off the tag signals, some of which it buffers, and demultiplexes the other received signals to so that successively received signals are used to form successive nibbles of a forty-eight bit word. At the same time, the flick demultiplexer 830 maintains a running checksum of the signals received at each tick of the NODE CLK signal. The flick generator uses the checksum to determine whether the control network message packet was correctly received, and, if so, it asserts a LOAD RCVD MSG load received message packet signal.

The assertion of the LOAD RCVD MSG signal enables a received message buffer 831 to latch the word generated by the flick demultiplexer. In addition, the asserted LOAD RCVD MSG signal enables a receive message buffer and destination select circuit 832 to examine the word contained in the received message buffer 831, and determine which of a supervisor receiver broadcast FIFO 833, a broadcast receiver FIFO 834, a combine receiver FIFO 835, or one of the registers 804, in which the word should be loaded.

Each FIFO 833, 834 and 835 generates an "XXX" RCV FIFO NR FULL receive FIFO nearly full signal ("XXX" may comprise "SBC" which identifies the supervisor receiver FIFO 833, "BC" which identifies the broadcast receiver FIFO 834, or "COM" which identifies the combine receiver FIFO 835) which indicate whether the respective FIFO is nearly full. As will be described below in connection with FIG. 40, the "XXX RCV FIFO NR FULL signal is used by the transmit message select and assembler 813 in generating several of the tag signals for the various flicks. In addition, the flick demultiplexer 830 couples several of the tag signals which it receives to the flick generator to control transmission of control network message packets 60 thereby.

b. Transmit Section 800

Figure 39:
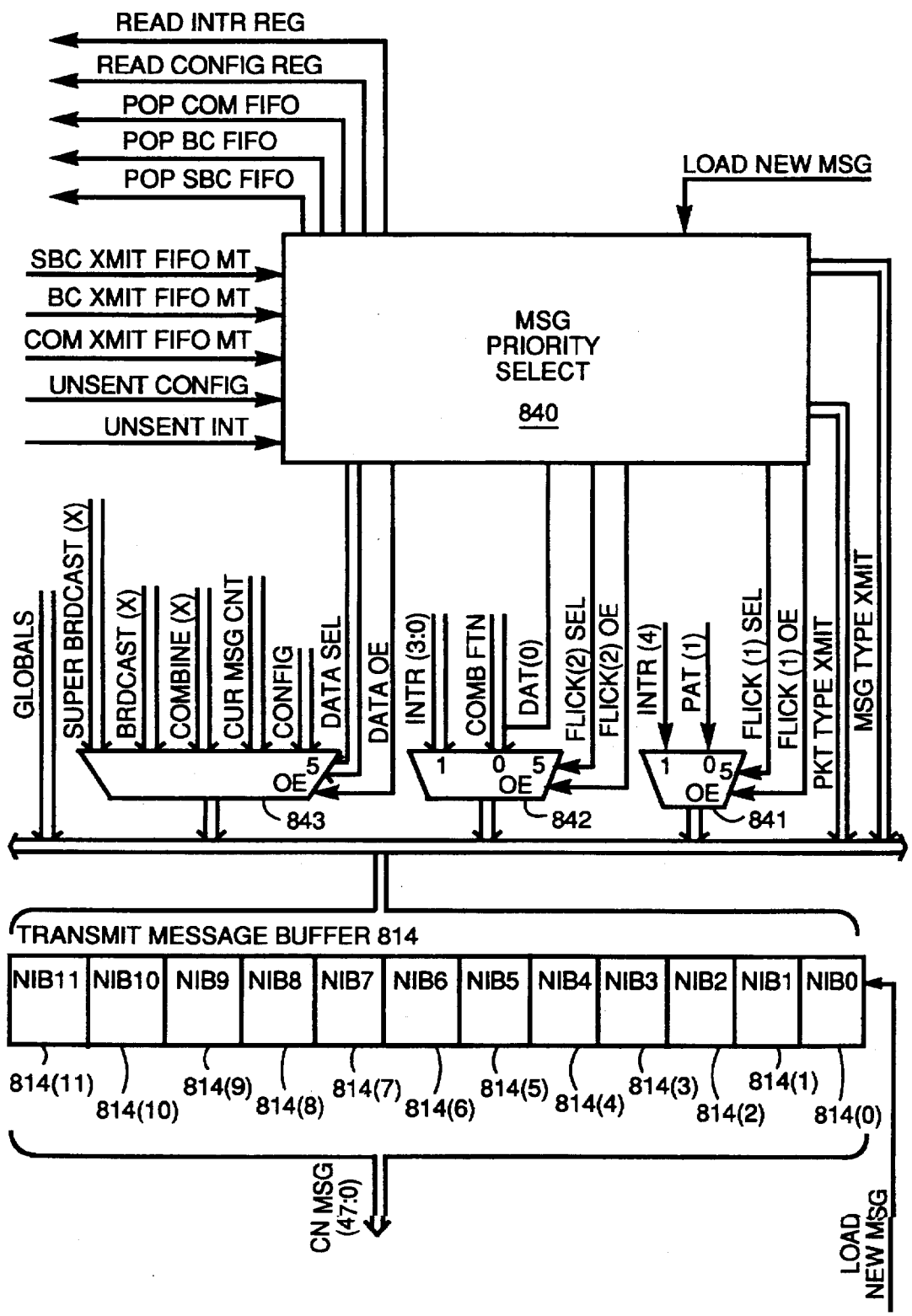

With this background, details of various portions of the control network interface 204 will be described in connection with FIGS. 39 though 44. FIG. 39 depicts a detailed functional block diagram of the transmit message select and assembler circuit 813 and the transmit message buffer 814. With reference to FIG. 39, the transmit message select and assembler circuit 813 includes a message priority select circuit 840 that performs several functions in response to the assertion of the LOAD NEW MSG load new message signal from the flick generator 815 enable generation of a word to be loaded into the transmit message buffer 814.

First, the message priority select circuit 840 receives status signals from various sources of message information such as the various FIFOs 810, 811 and 812, and the interrupt and configuration registers 822 and 823. In particular, the message priority select circuit 840 receives from the FIFOs 810 through 812 the "XXX" XMIT FIFO MT CXXX" being SBC, BC and COM) supervisor broadcast, broadcast and combine transmit FIFO empty signals. If any of these signals are negated, the corresponding FIFO 810, 811 or 812 contains data to be transmitted in a control network message packet 60. In addition, the message priority select circuit 840 receives an UNSENT CONFIG unsent configuration signal from the configuration register 823 and an UNSENT INT unsent interrupt signal from the interrupt register indicating that the processor 200 has loaded a new value therein that is to be transmitted in a control network message packet 60.

In response to the assertion of the LOAD NEW MSG load new message signal from the flick generator 815, the message priority select circuit 840 uses these status signals to select one FIFO as a control network message packet 60 information source in response to a predetermined priority to use in generating a control network message packet 60. The circuit 840 obtains a word from the data output terminals of the selected FIFO for use in creating the control network message packet 60. In addition, the circuit 840 generates POP "XXX" FIFO ("XXX" referencing SBC, BC and COM) first-in first-out buffer pop signal, which, when asserted, enables the respective FIFO 810, 811 and 812 to provide a new word at its data output terminals which may be used in creating a subsequent control network message packet 60. In particular, since the FIFOs 810 through 812 are first-in first-out buffers, the words provided in response to successive POP "XXX" FIFO signals will be in the order in which they were stored in the respective FIFO.

The circuit 840 also generates a READ INTR REG read interrupt register signal and a READ CONFIG REG read configuration register signal, which, when asserted, enables the respective interrupt register 822 or configuration register 823 to couple its contents to the circuit 813. When the respective register couples its contents to the circuit 813, it will negate its UNSENT CONFIG unsent configuration or UNSENT INT unsent interrupt signal until it is again loaded by the processor 200.

The message priority circuit 840 also generates MSG TYPE XMIT message type transmit signals and PKT TYPE XMIT that are coupled to input terminals of the transmit message buffer 814, in particular to input terminals of nibbles 814(0) and 814(1), respectively. The signals will be used in forming the contents of message type field 64 and packet type field 65, respectively. It will be appreciated that the particular encoding of the MSG TYPE XMIT and PKT TYPE XMIT signals will reflect the particular information source identified by the particular one of the POP "XXX" FIFO signals or READ INTR REG or READ CONFIG REG signal that it asserts.

Alternatively, it will be appreciated that all of the "XXX" XMIT FIFO MT signals may be asserted, indicating that none of the FIFOs 810 through 812 contain information to be used in establishing control network message packets 60, and the UNSENT CONFIG or UNSENT INT signals may be negated when the flick generator 815 asserts the LOAD NEW MSG signal. When that occurs, the message priority select circuit 840 may generate MSG TYPE XMIT message type transmit signals that identify a control network message packet 60 of the idle type, which it couples to nibble 814(0) of the transmit message buffer 814. In either case, the PKT TYPE XMIT packet type transmit signals from circuit 840 are all negated.

The transmit message select and assembler circuit 813 also includes several multiplexers 841, 842 and 843 which provide additional signals that are coupled to the transmit message buffer 814 along with the MSG TYPE XMIT and PKT TYPE XMIT signals. With reference also to FIG. 7, the PKT TYPE XMIT signals comprise only three signals that form the low-order three bits of the flick "1." The high-order signal is obtained from a multiplexer 841, which, under control of a FLICK (1) SEL flick 1 select signal from message priority select circuit 840, selects either a INTR (4) signal representing the high-order bit from the interrupt register 822 or a high-order PAT(1) pattern signal from a word popped from the combine first-in first-out buffer 812. If the circuit 840 is asserting a FLICK (1) OE flick 1 output enable signal, the multiplexer 841 couples the selected signal to a high-order input terminal of the nibble 814(1) of transmit message buffer 814. It will be appreciated that the FLICK (1) SEL signal will be conditioned to select the PAT (1) signal only if the message priority select circuit 840 has selected the combine buffer 812 as the source of information for the control network message packet 60 to be transmitted. Further, the FLICK (1) OE signal will not be asserted if the MSG TYPE XMIT message type transmit signals from circuit 840 contain the encoding identifying an idle message packet, to ensure that the contents of the respective fields of the message packet 60 will be zero.

Multiplexer 842 is used to select information that will be used in establishing the low-order four bits of flick 2 of the control network message packet 60. Under control of a FLICK (2) SEL flick "2" select signal from the circuit 840, the multiplexer 842 selects one of the INTR (3:0) interrupt signals, or COMB FTN (2:0) combine function signals and a low-order PAT (0) pattern signal. If a FLICK (2) OE flick (2) output enable signal is asserted, the multiplexer 842 couples the selected signals to the input terminals of nibble 814(2) of the transmit message buffer 814. The INTR (3:0) interrupt signals are based on low-order bits contained in the interrupt register 822. The COMB FTN (2:0) signals and PAT (0) signal are from the word popped from the combine buffer 812. It will be appreciated that the FLICK (2) SEL signal will be conditioned to select the COMB FTN and PAT (0) signals only if the message priority select circuit 840 has selected the combine buffer 812 as the source of information for the control network message packet 60 to be transmitted. Further, the FLICK (2) OE signal will not be asserted if the MSG TYPE XMIT message type transmit signals from circuit 840 contain the encoding identifying an idle message packet, to ensure that the contents of the respective fields of the message packet 60 will be zero.

Finally, the multiplexer 843 selects information that will be used in establishing the contents of data nibbles 70(0) through 70(7) in the control network message packet 60 under control of DATA SEL data select signals from the message priority select circuit 840. If the PKT TYPE XMIT signals identify a router done message the DATA SEL signals will enable the multiplexer 843 to select the CUR MSG CNT current message count signals from the data router interface 205 to the input terminals of nibbles 814(4) through 814(10) of the transmit message buffer 814. Otherwise, the particular source selected by multiplexer 843 in response to the DATA SEL data select signals will correspond to the source identified by the one of the POP "XXX" FIFO signals, the READ INTR REG signal or the READ CONFIG REG signal asserted by the message priority select circuit 840. If the message priority select circuit 840 is also asserting a DATA OE data output enable signal, the multiplexer 843 will couple the selected signals to respective input terminals of transmit message buffer 814. It will be appreciated that the DATA OE signal will not be asserted if the MSG TYPE XMIT message type transmit signals from circuit 840 contain the encoding identifying an idle message packet, to ensure that the contents of the respective fields of the message packet 60 will be zero.

In addition to these signals, GLOBAL signals representing the contents of the globals register 820 are coupled to respective input terminals of nibble 814(11) of the transmit message buffer 814, which latches the GLOBAL signals along with the other signals at its input terminals. In response to the next assertion of the LOAD NEW MSG load new message signal from the flick generator 815, the transmit message buffer 814 latches all of the signals at its input terminals. The latched signals are transmitted as CN MSG control network message signals to the flick generator 15. The CN MSG signals define forty-eight bits in twelve four-bit nibbles. In response to the same assertion of the LOAD NEW MSG signal, the message priority select circuit repeats the above-described operations to enable generation of a new word to be loaded into the transmit message buffer in response to the subsequent assertion of the LOAD NEW MSG signal.

Figure 40:
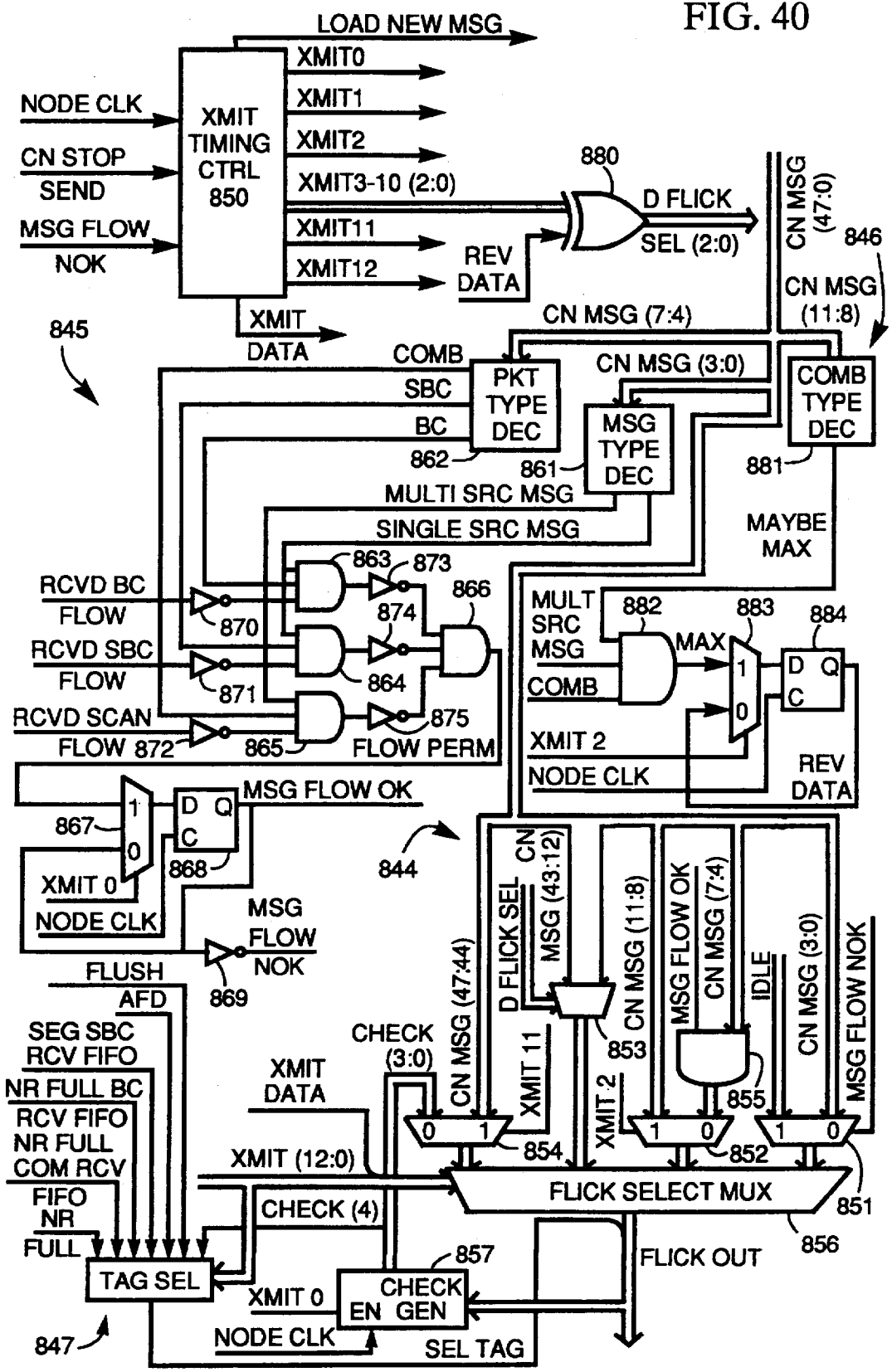

The flick generator 815 successively selects nibbles from the message buffer 814, appends to each nibble a tag bit to form five-bit flicks and transmits them as FLICK OUT (4:0) signals at each of twelve successive ticks of the NODE CLK signal. In addition, the flick generator maintains a running checksum which it transmits as the thirteenth flick. FIG. 40 depicts a detailed block diagram of the flick generator 815.

With reference to FIG. 40, the flick generator 815 includes a transmit timing control circuit 850 that iteratively generates XMIT 0 transmit flick zero through XMIT 12 transmit flick 12 signals, including binary-encoded XMIT 3-10(2:0) transmit flicks three through ten signals. The XMIT 0 through XMIT 12 signals enable other circuitry depicted on FIG. 40 to transmit successive ones of the thirteen flicks comprising a control network message packet 60. The transmit timing control circuit 850 generates the XMIT 0 through XMIT 12 signals in synchronism with successive ticks of the NODE CLK signal, while enabled by a negated CN STOP SEND control network stop sending signal and a negated MSG FLOW NOK message flow not ok signal, with the proviso that once the transmit timing control circuit 850 has begin transmitting a control network message packet 60 and has sequenced from the XMIT 0 transmit flick zero signal to the transmit flick one signal, it will continue sequencing through the remaining XMIT 2 through XMIT 12 signals, and stop when it recycles to the XMIT 0 transmit flick zero signal again.

Various ones of the CN MSG control network message signals, representing various ones of the nibbles in the transmit message buffer 814, are coupled to several circuits in the flick generator 815. In particular, the transmit flick generator includes a flick selector circuit 844 that, generally, selects signals from successive nibbles of the transmit message buffer for transmission in successive flicks. A flow control circuit 845 receives flow control signals from the receiver section 801 (described below in further detail in FIG. 41) that control transmission of control network message packets by the flick generator 815. A data nibble order circuit 846 determines the order in which nibbles 814(4) through 814(10) will be selected for transmission by the flick selector circuit 844. Finally, a tag signal generator circuit 847 generates tag signals to be transmitted as the high-order FLICK OUT signal.

As noted above, the flow control circuit 845 receives flow control signals from the receiver section 801 (described below in further detail in FIG. 41) that control transmission of control network message packets 60 by the flick generator 815 in response to selected tag signals in control network message packet 60 received by the receiver section 801. The control network node 50(1,j) connected to the control network interface 204 in each leaf 21 can control the flow of control network message packets 60 thereto from the same control network interface 204 by suitable conditioning of the scan flow bits 72(1) through 72(5), the broadcast user flow bit 73 and the broadcast supervisor flow bit 74.

For example, if the receiver section 801 receives a control network message packet 60 in which the broadcast supervisor flow bit 74 is clear, the flick generator 815 is disabled from transmitting control network message packets 60 from information in transmit message buffer 814 that originated from the supervisor broadcast transmit FIFO 810. Similarly, if the receiver section 801 receives a control network message packet in which the broadcast user bit 73 is clear, the flick generator 815 is disabled from transmitting control network message packets 60 from information in transmit message buffer 814 that originated from the broadcast buffer 811. Finally, if the receiver section 801 receives a control network message packet 60 in which a scan flow bit 72(1) through 72(5) is clear, the flick generator 815 is disabled from transmitting control network message packets 60 from information in transmit message buffer 815 that originated from the combine buffer 812.

In each case, the flick generator 815 will stall the transmit message select and assembly circuit 813 and will remain disabled from transmitting a message packet 60 containing information originating from the particular FIFO 810 through 812 until the receiver section 801 receives a control network message packet 60 in which the particular bit is set. However, if the transmit message buffer 814 contains information that originated from a different one of FIFOs 810 through 812 than that from which it is disabled, the tick generator 815 may transmit a control network message packet 60 using that information.

More specifically, the flow control circuit 845 includes two decoders, namely, a message type decoder 861 and a packet type decoder 862 that receive the ones of the CN MSG (3:0) and CN MSG (7:0) control network message signals from nibbles 414(0) and 414(1) of transmit message buffer 814. The CN MSG (3:0) signals received by decoder 861 comprise the ones of the CN MSG signals that contain the message type information. If the CN MSG (3:0) signals have the encoding for a multi-source message, the decoder 861 asserts a MULT SRC MSG multi-source message signal, and if they have the encoding for a single source message the decoder 861 asserts a SINGLE SRC MSG single source message signal.

The CN MSG (7:4) signals received by decoder 862 comprise the ones of the CN MSG signals that contain the packet type information. In particular, the PKT TYPE signals identify whether the contents of the transmit message buffer 814 originated in any of the FIFOs 810 through 812, and, if so, which one. The decoder 862 generates three output signals, identified as COMB combine, SBC supervisor broadcast and BC broadcast, which, if asserted, indicate that the contents of message buffer originated in the combine transmit FIFO 812, the supervisor broadcast transmit FIFO 810 or the broadcast transmit FIFO 811, respectively.

The SINGLE SRC MSG single source message and MULT SRC MSG multi-source message signals from decoder 861, and the COMB, SBC and BC signals from decoder 862 are coupled, along with a RCVD BC FLOW received broadcast buffer flow signal, a RCVD SBC FLOW received supervisor broadcast buffer flow signal and a RCVD SCAN FLOW received scan flow signal to a circuit comprising a plurality of AND gates 864 through 866 and inverters 870 through 875. The RCVD BC FLOW, RCVD SBC FLOW and RCVD SCAN FLOW signals comprise the flow control signals generated by the receive section 801 in response to the respective tag bits of control network message packets 60 received from the control network node 50(1,j). If all of these signals are asserted, inverters 870 through 872 will disable AND gates 863 through 865, enabling, in turn, inverters 873 through 875 to energize AND gate 866 to assert a FLOW PERM flow permitted signal.

On the other hand, if one of the flow control signals from the receive section 801 is negated, and if the signals from decoders 861 and 862 have appropriate conditions, the AND gate 866 will be disabled and the FLOW PERM flow permitted signal will be negated. If, for example, the RCV'D SCAN FLOW signal is negated, if the MULT SRC MSG multi-source message and COMB signals are asserted and inverter 872 will complement the negated RCVD SCAN FLOW signal to energize the AND gate 865. The energized AND gate 865 will enable inverter 875 to disable AND gate 866, causing the FLOW PERM flow permitted signal to be negated. The other AND gates 863 and 864, and respective inverters connected thereto, operate similarly in response to the RCVD BC FLOW and RCVD SBC FLOW signals, respectively if decoder 861 is asserting the SINGLE SRC MSG single source message signal.

The FLOW PERM flow permitted signal is coupled to one input terminal of a multiplexer 867. If the transmit timing control circuit 850 is asserting the XMIT 0 transmit flick zero signal, the multiplexer 867 couples the FLOW PERM signal to a flip-flop 868, which latches the signal at the next tick of the NODE CLK signal. If the FLOW PERM signal is asserted, the flip-flop 868 asserts the MSG FLOW OK signal. The MSG FLOW OK signal is complemented by an inverter 869. Thus, if the FLOW PERM signal is not asserted, causing the flip-flop 868 to negate the MSG FLOW OK signal, inverter 869 asserts a MSG FLOW NOK message flow not ok signal.

The MSG FLOW OK signal from flip-flop 868 is coupled to the other input of multiplexer 867. It will be appreciated that at subsequent ticks of the NODE CLK signal, the XMIT 0 transmit flick zero signal will be negated, enabling the multiplexer 867 to couple the MSG FLOW OK signal back to the data input terminal of the flip-flop 868. Thus, the flip-flop 868 will maintain its condition at subsequent ticks of the NODE CLK signal as the transmit timing control circuit 850 asserts the XMIT 1 through XMIT 12 signals. At the next assertion of the XMIT 0 signal, the multiplexer 867 again couples the FLOW PERM flow permitted signal to the data input terminal of flip-flop 868, at which point it latches the condition of the signal at that point.

It will be appreciated that, if the decoder 861 is not asserting the SINGLE SRC MSG single source message signal, the conditions of the RCVD BC FLOW and RCVD SBC FLOW signals will not affect the condition of the FLOW PERM flow permitted signal, and, thus, will not affect the condition of the MSG FLOW OK and MSG FLOW NOK signals. In addition, if the decoder 861 is not asserting the MULT SRC MSG multi-source message signal, the condition of the RCVD SCAN FLOW signal will not affect the condition of the FLOW PERM flow permitted signal. Thus, if, for example, the MSG TYPE signals identify the idle or abstain message packet types, neither the MULT SRC MSG nor the SINGLE SRC MSG signal will be asserted, and so the FLOW PERM signal will be asserted, as will the MSG FLOW OK signal.

The portion of the CN MSG control network message signals from nibble 814(2) of the transmit message buffer 814 is coupled to the data nibble order circuit 846. That circuit 846 determines the order in which the flick selector circuit 844 transmits signals from nibbles 814(3) through 814(10) in the FLICK OUT signals. If the control network message packet 60 being transmitted is a multiple source message initiating certain types of arithmetic operations, such as addition, the nibbles 70(0) through 70(7) of the packet data portion 62 will carry data of increasing significance. This permits the control network nodes 50 to properly generate carries from one nibble 70(i) to the next nibble 70(i+1). On the other hand, in some operations, such as determination of a maximum, the control network nodes 50 will perform nibble-by-nibble comparisons of data in nibbles 70(0) through 70(7) of the multiple-source message packets. Accordingly, the successive nibbles 70(0) through 70(7) will carry data of decreasing significance.

The binary-encoded XMIT 3-10 (2:0) signals generated by the transmit timing control circuit 850 are coupled to an XOE (exclusive-OR) gate circuit 880. The XOR gate circuit 880 generates D FLICK SEL (2:0) data flick select signals representing the exclusive-OR of each of the corresponding XMIT 3-10 (2:0) signals with a REV DATA reverse data signal, which is controlled by the data nibble order circuit 846. The sequence of D FLICK SEL (2:0) data flick select signals determines the sequence of nibbles 814(3) through 814(10) of transmit message buffer 814, and thus the order of significance of the data transmitted in the successive nibbles 70(0) through 70(7) in the control network message packet 60. If the REV DATA signal is negated, the sequence of binary-encoded values of the D FLICK SEL (2:0) signals corresponds to the sequence of binary-encoded values of the XMIT 3-10 (2:0) signals, and so contents of nibbles 814(3) through 814(10) are transmitted in nibbles 70(0) through 70(7), respectively.

On the other hand, if the REV DATA reverse data signal is asserted, the D FLICK SEL (2:0) data flick select signals correspond to the complement of the respective XMIT 3-10 (2:0) signals. In that case, the sequence of the binary encoded values of the D FLICK SEL (2:0) signals is the reverse of the sequence of binary-encoded values of the XMIT 3-10 (2:0) signals, and so the nibbles 70(0) through 70(7) of the control network message packet 60 carry the contents of nibbles 814(10) through 814(3).

The data nibble order circuit 846 generates the REV DATA reverse data signal. Circuit 846 includes a decoder 881 that receives CN MSG (11:8) control network message signals from nibble 814(2) of the transmit message buffer 814. If these signals have the encoding to identify a maximum arithmetic operation, the decoder asserts a MAYBE MAX signal, which enables one input of an AND gate 882. If contemporaneously the decoders 861 and 862 are asserting the MULT SRC MSG multiple source message signal and COMB combine signal, the control network message packet 60 generated from the contents of transmit message buffer 814 will enable a maximum arithmetic operation. When that occurs, AND gate 882 is energized to assert a MAX signal. When the XMIT 2 transmit flick two signal is asserted, a multiplexer 883 couples the MAX signal to the data input terminal of a flip-flop 884, which latches the MAX signal at the next tick of the NODE CLK signal.

The flip-flop 884 generates the REV DATA reverse data signal. In addition to controlling the XOR gate 880, the REV DATA signal is also coupled to the other data input terminal of multiplexer 883, which couples that signal to the data input terminal of the flip-flop 884 while the XMIT 2 transmit flick two signal is not asserted. It will be appreciated that the condition of the REV DATA reverse data signal subsequent to the time at which the XMIT 2 transmit flick two signal is asserted will correspond to the condition of the MAX signal at the time the XMIT 2 signal is asserted.

Accordingly, if any of the MULT SRC MSG multiple source message, COMB combine and MAYBE MAX signals is negated, which indicates that the control network message packet 60 being transmitted is not enabling a maximum arithmetic operation, the AND gate 882 does not assert the MAX signal and so the REV DATA signal is not asserted. On the other hand, if all of the MULT SRC MSG multiple source message, COMB combine and MAYBE MAX signals are asserted, indicating that the control network message packet 60 being transmitted is enabling a maximum arithmetic operation, the AND gate 882 will assert the MAX signal and so the REV DATA signal will be asserted. As noted above, the asserted REV DATA signal enables the sequence of binary-encoded values of the D FLICK SEL (2:0) data flick select signals generated by XOR gate 880 to have the reverse order than if the REV DATA signal is negated.

The flick selector circuit 844 receives the CN MSG (47:0) signals at input terminals of a group of multiplexers 851 through 856 and an AND gate 855. The output terminals of multiplexers 851 through 854 are coupled to respective input terminals of a flick select multiplexer 856. The multiplexers 851 through 854 and 856, along with AND gate 855, cooperate to select successive four-bit nibbles for transmission as successive flicks of a control network message packet 60.

In particular, CN MSG (3:0) control network message signals identifying the message type, transmitted by nibble 814(0) of the transmit message buffer 814, are coupled to one set of input terminals of multiplexer 851. The other set of input terminals of multiplexer 851 receive IDLE signals representing the message type encoding for an control network message packet 60 of the idle type. The multiplexer 851 is controlled by the MSG FLOW NOK message flow not ok signal from the flow control circuit 845. If the MSG FLOW NOK signal is asserted, the multiplexer 851 couples the IDLE signals to the respective input terminals of the flick select multiplexer 856. On the other hand, if the MSG FLOW NOK signal is negated, the multiplexer 851 couples the CN MSG (3:0) signals to the same input terminals of flick select multiplexer 856.

The CN MSG (7:4) signals, which are transmitted by nibble 814(1) of the transmit message buffer 814 and identify the packet type, are coupled to input terminals of AND gate 855. If the message flow circuit 845 is asserting the MSG FLOW OK signal, the AND gate 855 gates CN MSG (7:4) signals to one set of input terminals of the multiplexer 855. The other set of input terminal receive the CN MSG (11:8) signals, which are transmitted by nibble 814(2) of the transmit message buffer. If the XMIT 2 transmit flick two signal is negated, the multiplexer 852 couples the signals from AND gate 855 to a set of input terminals of flick select multiplexer 856. On the other hand, if the XMIT 2 signal is asserted, the multiplexer 852 couples the CN MSG (11:8) signals thereto.

The multiplexer 853 has eight sets of input terminals, each receiving four CN MSG signals from one of nibbles 814(3) through 814(10) of the transmit message buffer. The multiplexer 853 is controlled by the D FLICK SEL (2:0) signals from XOR gate 880. The multiplexer 853 couples signals at selected sets of inputs, as identified by the D FLICK SEL (2:0) signals, to a set of input terminals of the flick select multiplexer 856. The D FLICK SEL (2:0) signals determine the order in which the signals from the nibbles 814(3) through 814(10) are coupled to the flick select multiplexer 856.

Finally, multiplexer 854 has one set of input terminals that receive CN MSG (47:44) signals from the nibble 814(11) of the transmit message buffer 814. The CN MSG (47:44) signals represent the contents of the globals register 820, which, as shown in FIG. 7, are transmitted in the last flick of a control network message packet 60 before the flick containing the checksum. If the XMIT 11 transmit flick eleven signal is asserted, the multiplexer 854 couples the signals from this set of terminals to a fourth set of input terminals of the flick selector multiplexer 856. When the XMIT 11 signal is not asserted, the multiplexer 854 couples CHECK (3:0) signals from a checksum generator 857 to the same set of input terminals.

The flick select multiplexer 856 is controlled by the XMIT 0 through XMIT 12 signals from transmit timing control circuit 850. When the XMIT 0 signal is asserted, the flick select multiplexer 856 couples the signals from multiplexer 851 as the low-order FLICK OUT (3:0) signals. If the MSG FLOW NOK signal is negated, the flick includes the contents of nibble 814(0) of the transmit message buffer 814. However, if the MSG FLOW NOK signal is asserted, the flick includes the idle message packet type code.

The sequential assertion of the XMIT 1 and XMIT 2 signals enables the flick select multiplexer 856 to couple the signals from multiplexer 852 as the low-order FLICK OUT (3:0) signals for the next two flicks. If the MSG FLOW OK signal is asserted, the flicks include the contents of nibbles 814(1) and 814(2) of the transmit message buffer 814. If, however, the MSG FLOW OK signal is negated, the signals from multiplexer 851 while the XMIT 1 signal is asserted will all be negated, and so the FLICK OUT (3:0) signals at the point will also be negated.

The assertion of the XMIT 3-10(2:0) signals and the XMIT DATA signal enables the flick select multiplexer 856 to couple signals from multiplexer 853 as the low-order FLICK OUT (3:0) signals for the next eight flicks. The flicks will include the contents of nibbles 814(3) through 814(10) of the transmit nibble buffer 814, with the order depending on the condition of the REV DATA signal.

Finally, the sequential assertion of the XMIT 11 and XMIT 12 signals enables the flick select multiplexer to couple the signals from multiplexer 854 as the low-order FLICK OUT (3:0) signals for the final two flicks. When the XMIT 11 signal is asserted, the flick includes the contents of the nibble 814(11) of the transmit message buffer 814. On the other hand if the XMIT 12 signal is asserted, the flick includes the low-order CHECK (3:0) checksum signals from checksum generator 857.

The tag signal generator circuit 847 receives signals from a number of sources and, in response to each the XMIT (0) through XMIT (12) signals, selects one to couple as a SEL TAG selected tag signal. The SEL TAG signal is transmitted to the control network node 50(1,j) and to the checksum generator 857 as the FLICK OUT (4) signal. In particular, the tag signal generator circuit 847 couples a COM RCV FIFO NR FULL combine receive first-in first-out buffer near full signal, from buffer 835 (FIG. 37) as the SEL TAG signal in response to the XMIT 0 signal and encodings of the XMIT 3-10(2:0) signals having the values three, six, eight and ten. This signal provides the scan flow bits 72(1) through 72(5) of the control network message packet 60.

The tag signal generator circuit 847 couples as the SEL TAG signal a signal representing the segment flag 825, the BC RCV FIFO NR FULL broadcast receive first-in first-out buffer nearly full signal, and the SBC RCV FIFO NR FULL supervisor broadcast receive first-in first-out buffer nearly full signal in response, respectively, to the XMIT 1 and XMIT 2 signals and the encoding of the XMIT 3-10 (2:0) signals having the value one. These signals provide the segment, broadcast user flow, and broadcast supervisor user flow bits 77, 73 and 74 in the control network message packet 60 (FIG. 7).

In addition, the circuit 847 couples as the SEL TAG signal a signal representing the condition of the all-fall-down mode flag 824 and flush register 821 in response to the encodings of the XMIT 3-10 (2:0) signals representing the values two and four. These signals provide the all-fall-down mode bit 81 and flush bit 75 in the control network message packet 60 (FIG. 7).

Finally, tag signal generator circuit 847 couples as the SEL TAG selected tag signal the CHECK (4) high-order checksum signal from the checksum generator 857. This provides the high-order bit of the checksum flick 63 in the control network message packet 60 (FIG. 7).

As noted above, the checksum generator 857 generates CHECK (4:0) checksum signals representing a checksum value. The checksum generator 857 generates the checksum over the first twelve flicks of the control network message packet 60. The checksum generator 857 is reset by the assertion of the XMIT 0 transmit flick zero signal and updates the checksum value in response to each successive tick of the NODE CLK signal.

The transmit section 800 couples the FLICK OUT (4:0) flick output signals to the control network node 50(1,j) connected thereto, and also to the root control/loopback section 802. As noted above, if the root control/loopback portion is asserting the ROOT UP signal, which occurs if the control network interface 204 is a logical root, it buffers the flicks defining control network message packets 60 for transmission to the receive section 801.

c. Receive Section 801

The receive section 801 includes several elements, including the flick demultiplexer 830 which receives the sequential flicks of a control network message packet 60 and assembles them in the receive message buffer 831. The destination control 832 determines one of several destinations for the contents of the receive message buffer, including the FIFOs 833 through 835 and interrupt register 822, and coupled the contents to the identified destination. Details of the flick demultiplexer 830 and receive message buffer 831 will be described in connection with FIG. 41, and the destination control will be described in connection with FIG. 42.

Figure 41:
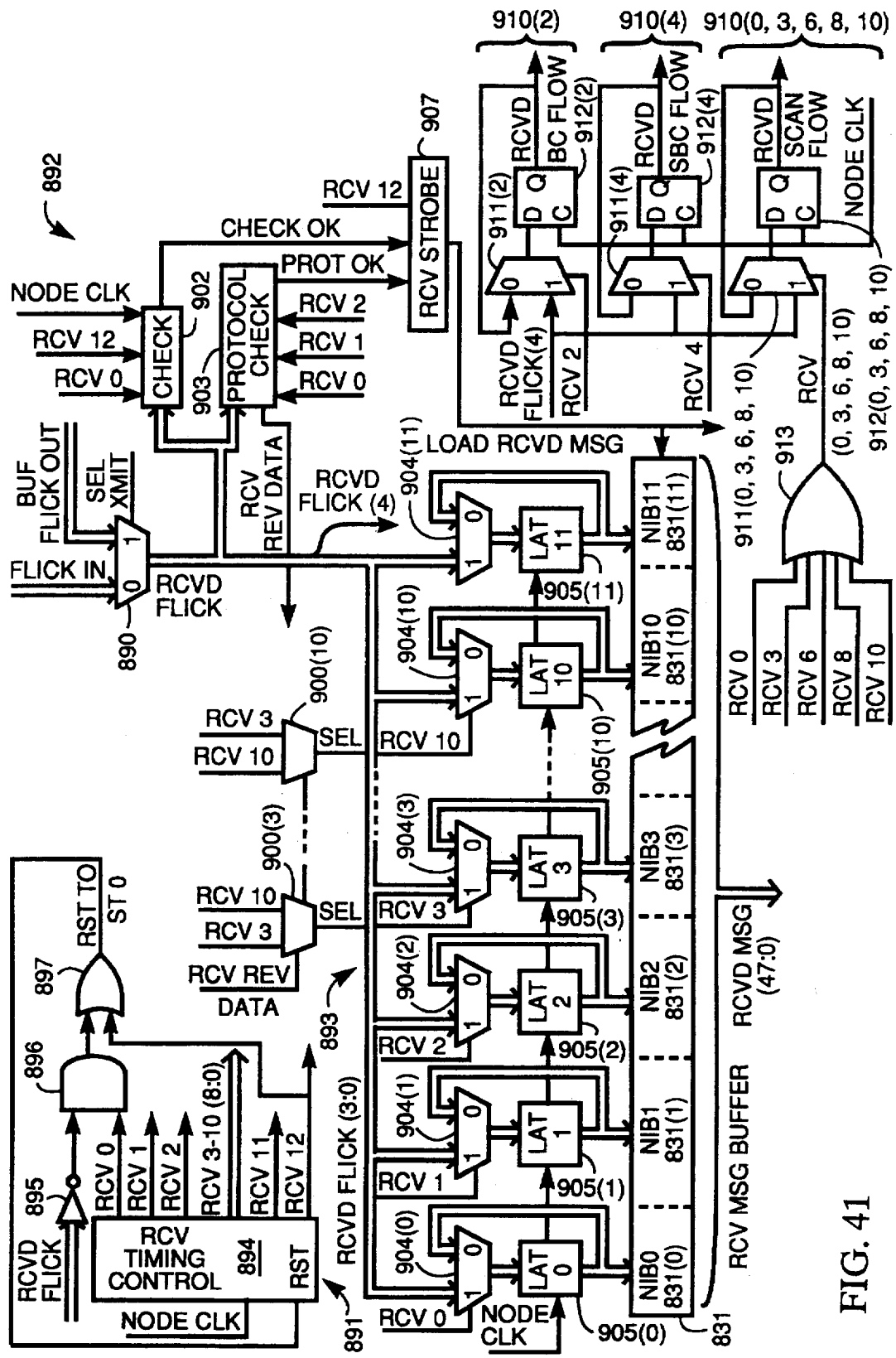

With reference to FIG. 41, the flick demultiplexer 830 includes a flick source multiplexer 890 that selects from among two sources of signals for control network message packets 60 in response to a SEL XMIT select transmit section signal from the root control/loopback section 802. In particular, if the SEL XMIT signal is negated, the flick source multiplexer 890 couples the FLICK IN (4:0) flick input signals, which it receives from the control network node 50(1,j) connected thereto at one set of input terminals, as RCVD FLICK (4:0) received flick signals. On the other hand, if the SEL XMIT signal is asserted, which generally occurs when the control network interface 204 is a logical root, the multiplexer 890 couples the BUF FLICK OUT (4:0) buffered flick output signals from the flick buffer 816 as the RCVD FLICK (4:0) received flick signals.

In either case, the RCVD FLICK (4:0) received flick signals are coupled to several portions of the flick demultiplexer 830. In particular, the RCVD FLICK (4:0) signals are connected to a receive timing generator circuit 891, a check circuit 892, and a flick distribution and latch circuit 893. The receive timing generator circuit 891, like the transmit timing control circuit 850, iteratively generates RCV 0 receive flick zero through RCV 12 receive flick 12 signals. The RCV 0 through RCV 12 signals enable other circuitry depicted on FIG. 41 to receive low-order RCVD FLICK (3:0) signals corresponding successive ones of the first twelve flicks of a control network message packet 60, and to latch the flicks in respective nibbles 831(0) through 831(11) of the receive message buffer 831. In addition, the RCV 0 through RCV 12 signals enable other circuitry to latch successive high-order RCVD FLICK (4) signals representing the tag bit in each flick and to direct the latched signals to appropriate destinations.

The receive timing generator circuit 891 includes a receive timing control circuit 894 that actually generates the RCV 0 through RCV 12 timing signals. If all of the RCVD FUCK (4:0) received flick signals are negated, a NOR gate 895 enables one input of an AND gate 896. If the receive timing control circuit 894 is asserting the RCV 0 timing signal, and if all of the RCVD FLICK (4:0) signals are negated, AND gate 896 is energized, which, in turn, energizes an OR gate 897 to assert a RST TO ST 0 reset to state zero signal. The RST TO ST 0 signal is coupled to a reset terminal of the receive timing control circuit 894 to enable the circuit 894 to continue asserting the RCV 0 signal.

The first flick of a control network message packet is identified by at least one of the RCVD FLICK (4:0) signals being asserted when the receive timing control circuit 894 is asserting the RCV 0 receive zero signal. When that occurs, the NOR gate 895 disables the AND gate 895, in turn disabling the OR gate 897 and negating the RST TO ST 0 reset to state zero signal. This enables the timing control circuit to begin stepping through the RCV 0 through RCV 12 signals in synchronism with successive ticks of the NODE CLK signal. It will be appreciated that the flick demultiplexer 830 will receive RCVD FLICK (4:0) signals representing all thirteen flicks of the control network message packet 60 as the receive timing control circuit 894 is stepping through the RCV 0 through RCV 12 signals.

When the receive timing control circuit 894 asserts the RCV 12 signal, that signal energizes the OR gate 897 to again assert the RST TO ST 0 reset to state zero signal, which enables the circuit 894 to reset and assert the RCV 0 signal at the next tick of the NODE CLK signal. At this point, if the RCVD FLICK (4:0) signals are all negated, indicating that the first flick of a new control network message packet 60 is not then being received, the NOR gate 895 is energized and it and the asserted RCV 0 signal maintain the OR gate 897 in the energized condition. The receive timing control circuit 894 thus maintains the RCV 0 signal in the asserted condition until at least one of the RCVD FLICK (4:0) signals is asserted.

As with transmissions of data nibbles 70(0) through 70(7) in successive flicks by the flick generator 815 as described above, the order of numerical significance of the received nibbles 70(0) through 70(7) of a control network message packet received by the flick demultiplexer 830 will depend upon whether the control network message packet 60 is a multiple source message with the results of a maximum arithmetic operation. If not, the RCV REV DATA signal is negated, which enables a series of multiplexers 900(3) through 900(10) to assert SEL RCV 3 through SEL RCV 10 timing signals in the same sequence as the RCV 3 through RCV 10 timing signals. On the other hand, if the control network message packet 60 being received is a multiple source message with the results of a maximum arithmetic operation, the RCV REV DATA signal is asserted, which enables the multiplexers 900(3) through 900(10) to assert the SEL RCV 3 through SEL RCV 10 signals in the reverse order as the RCV 3 through RCV 10 receive timing signals.

The check circuit 892 includes two elements. A checksum check circuit 902 iteratively receives the RCVD FLICK (4:0) signals representing successive flicks of a control network message packet 60. The checksum check circuit 902 is reset in response to the RCV 0 signal from receive timing control circuit 894, and receives the successive flicks at each tick of the NODE CLK signal thereafter. In response to the RCV 12 signal, which is asserted at the point at which the RCVD FLICK (4:0) signals represent the checksum portion 63 of the received message packet 60, if the checksum check circuit 902 determines that the message packet was properly received, it asserts the CHECK OK signal.

A protocol check circuit 903 iteratively receives the low-order RCVD FLICK (3:0) signals in response to the RCV 0 through RCV 2 signals, that is, the signals representing the flicks comprising packet header 61 of a control network message packet 60, and determines whether the encodings correspond to those that are permissible in the particular system 10. If the protocol check circuit 903 determines that the encodings are permissible, it asserts a PROT OK protocol ok signal. In addition, the protocol check circuit 903 determines whether the message packet 60 being received is of the multiple source ,type and has the result of a maximum arithmetic operation, and if so, it asserts the RCV REV DATA receive reverse data signal, which is coupled to XOR gate 900.

The low-order RCVD FLICK (3:0) received flick signals are also coupled to data input terminals of a series of multiplexers 904(0) through 904(11) [generally identified by reference numeral 904(i)]. Each of the multiplexers 904(0) through 904(2) and 904(11) is controlled by one of the respective RCV 0 through RCV 2 and RCV 11 receive timing signals from receive timing generator circuit 891. When the respective RCV 0 through RCV 2 and RCV 11 receive timing signals are asserted, the respective multiplexer 904(i) couples the RCVD FLICK (3:0) signals to input terminals of a respective latch generally identified by reference numeral 905(i), which latch the signals at the next tick of the NODE CLK signal. If the respective RCV "i" receive timing signal is negated, the multiplexers 904(i) couple the latched signals from the respective latches 905(0 back to their input terminals, to enable the latches will maintain their conditions at subsequent ticks of the NODE CLK signal.

The multiplexers 904(3) through 904(10), on the other hand, are controlled by the SEL RCV 3 through SEL RCV 10 selected receive timing signals from multiplexers 900(3) through 900(10). When the SEL RCV 3 through SEL RCV 10 signals are asserted, multiplexers 904(3) through 904(10) couple the RCVD FLICK (3:0) signals to input terminals of a respective latch 905(3) through 905(10), which latch the signals at the next tick of the NODE CLK signal. Accordingly, if the protocol check circuit 903 is negating the RCV REV DATA receive reverse data signal, the RCVD FLICK (3:0) signals received during sequential assertions of the RCV 3 through RCV 10 signals will be latched into the successive latches 905(3) through 905(10). On the other hand, if the protocol check circuit 903 is asserting the RCV REV DATA receive reverse data signal, the RCVD FLICK (3:0) signals received during sequential assertions of the RCV 3 through RCV 10 signals will be latched into the successive latches in the reverse order, that is, into latches 905(10) through 905(3).

The CHECK OK and PROT OK signals from check circuit 892, along with the RCV 12 signal are coupled to a receive strobe enable circuit 907. If, during receipt of the RCVD FLICK (4:0) signals representing successive flicks of the control network message packet 60, check circuit 892 asserting both the CHECK OK and the PROT OK signals, the RCV 12 signal enables the receive strobe enable circuit 907 to assert a LOAD RCVD MSG load received message signal, which enables the receive message buffer to latch the signals coupled to its input terminals by the latches 905(i). The received message buffer 831 transmits the latched signals as RCVD MSG (47:0) received message signals to the destination control circuit 832.

The flick demultiplexer 815 also includes a number of tag signal latch circuits 910(i), some of which are also depicted on FIG. 41. The index "i" in reference numeral 910(i) corresponds to the index "i" of the receive timing signal RCV "i" that is asserted when the particular tag signal is being received. The tag signal latch circuits are all similar, and so only circuit 910(2) that generates the RCVD BC FLOW received broadcast flow signal, circuit 910(4) RCVD SBC FLOW received supervisor broadcast flow signal and circuit 910(0,3,6,8,10) that generates the RCVD SCAN FLOW received scan flow signal, which are used to control the transmit flick generator 815 (FIG. 40), are depicted in FIG. 41.

As shown in FIG. 41, each tag signal latch circuit 910(i) includes a multiplexer 911(i), which receives at one input terminal the RCVD FLICK(4) received flick signal representing the tag bit of each flick. Each multiplexer 911(i) is controlled by the corresponding RCV "i" receive timing signal to couple the RCVD FLICK (4) signal to the data input terminal of a flip-flop 912(i). The tag signal latch circuit 910(0,3,6,8,10) also includes an OR gate 913 that asserts a RCV (0,3,6,8,10) signal when any of the RCV 0, RCV 3, RCV 6, RCV 8, or RCV 10 signals are asserted to then enable multiplexer 911(0,3,6,8,10) to couple the RCVD FLICK (4) signal to the data input terminal of flip-flop 912(0,3,6,8,10). With reference to FIG. 7, it will be appreciated that, when the RCV 0, RCV 3, RCV 6, RCV 8, and RCV 10 signals are asserted, the RCVD FLICK (4) signal representing the flicks received at those points in time will represent the scan flow bits 72(1) through 72(5), which is latched in tag signal latch circuit 910(0,3,6,8,10).

Each flip-flop 912(i) is clocked in response to the NODE CLK signal. Thus, the tag signal as latched by each tag signal latch circuit 910(i) is updated at the next tick of the NODE CLK signal after the assertion of the RCV "i" signal. The output signal from each flip-flop 912(i) is coupled to the other data input terminal of the associated multiplexer 911(i), which couples that signal back to the data input terminal of the flip-flop 912(i) when the RCV "i" receive timing signal is not asserted. Accordingly, each tag signal latch circuit 910(i) is updated at the next tick of the NODE CLK signal following the associated RCV "i" receive timing signal, and maintains the state until the next update.

Figure 42:
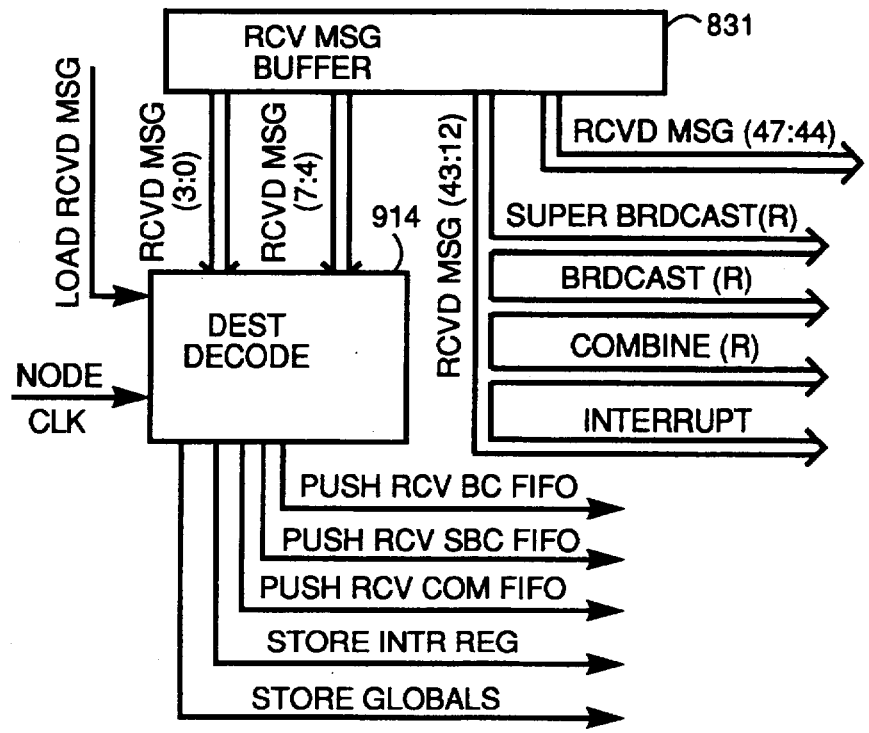

The destination control circuit 832, when an control network message packet 60 is received, identifies the particular FIFO 833, 834 or 835, or the one of registers 804 into which the contents of the receive message buffer 831 are to be stored, and enables the contents to be stored therein. With reference to FIG. 42, the destination control circuit 832, includes a destination decode circuit 914 which receives the RCVD MSG (3:0) and RCVD MSG (7:4) received message signals from the receive message buffer 831. These signals represent the contents of, respectively, the message type field 64 and packet type field 65 of the received control network message packet 60.

In response to the assertion of the LOAD RCVD MSG load received message signal from the receive strobe enable circuit 907, the destination decode circuit 914 uses these RCVD MSG signals to select for assertion one of a PUSH RCV BC FIFO push receive broadcast first-in first-out buffer signal, a PUSH RCV SBC FIFO push receive supervisor broadcast first-in first-out buffer signal, a PUSH RCV COM FIFO push receive combine first-in first-out buffer signal and a STORE INTR REG store interrupt register signal. The asserted signal enables the contents of nibbles 831(3) through 831(10) of received message buffer 831, which correspond to the contents of data nibbles 70(0) through 70(7) of the received message packet 60 and which are represented by the RCVD MSG (43:12) received message signals, to be stored in one of the FIFO 833 through 835 or in interrupt register 822.

In addition, the destination decode circuit 814 also generates a STORE GLOBALS signal that enables the globals register 820 to latch the RCVD MSG (47:44) received message signals. These signals represent the contents of nibble 831(11) of received message buffer 831, which, in turn, correspond to the contents of the global information nibble 71 of the receive control network message packet 60.

d. Root Control/Loopback Section 802

Figure 43:
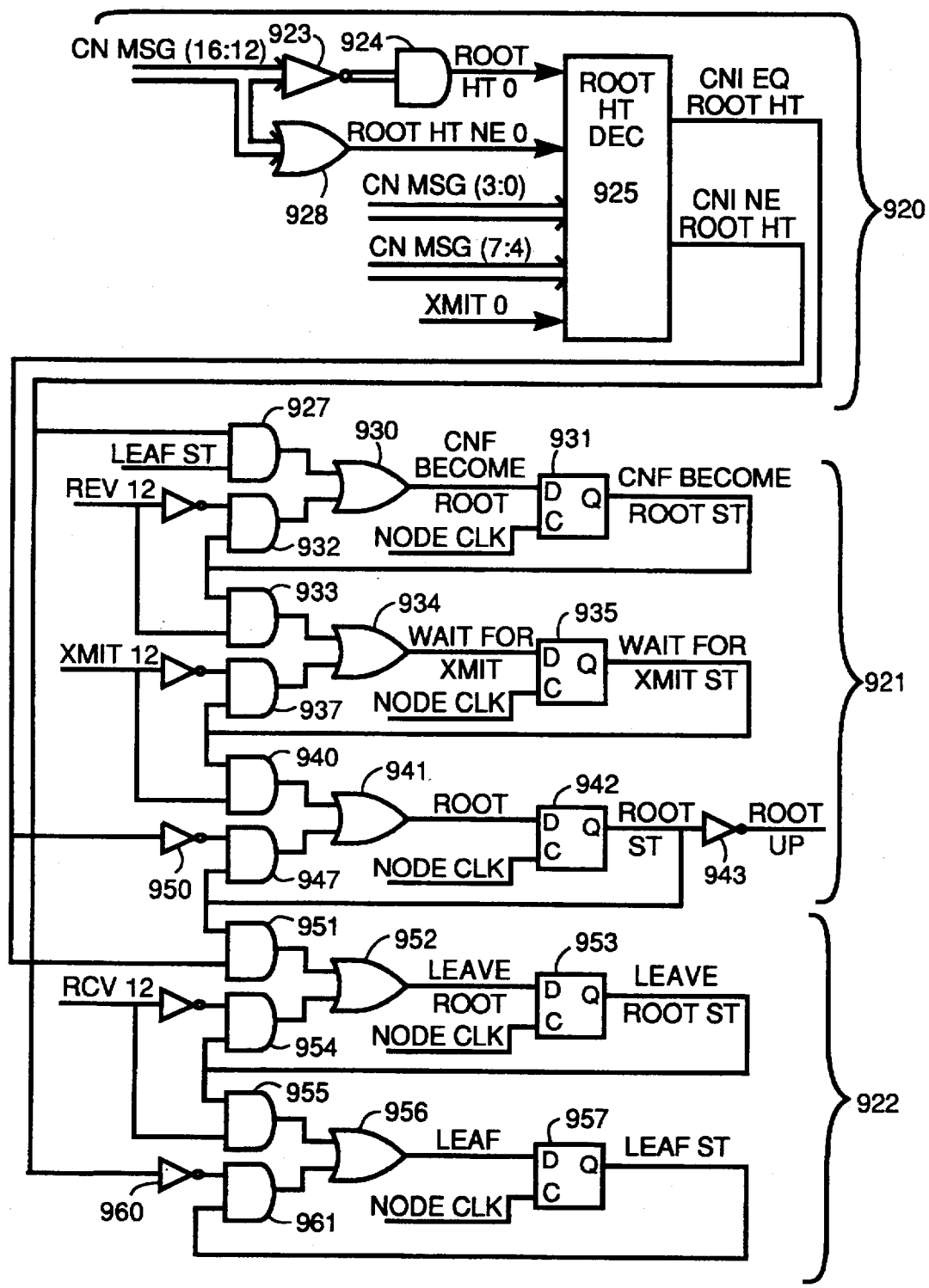
Figure 44:
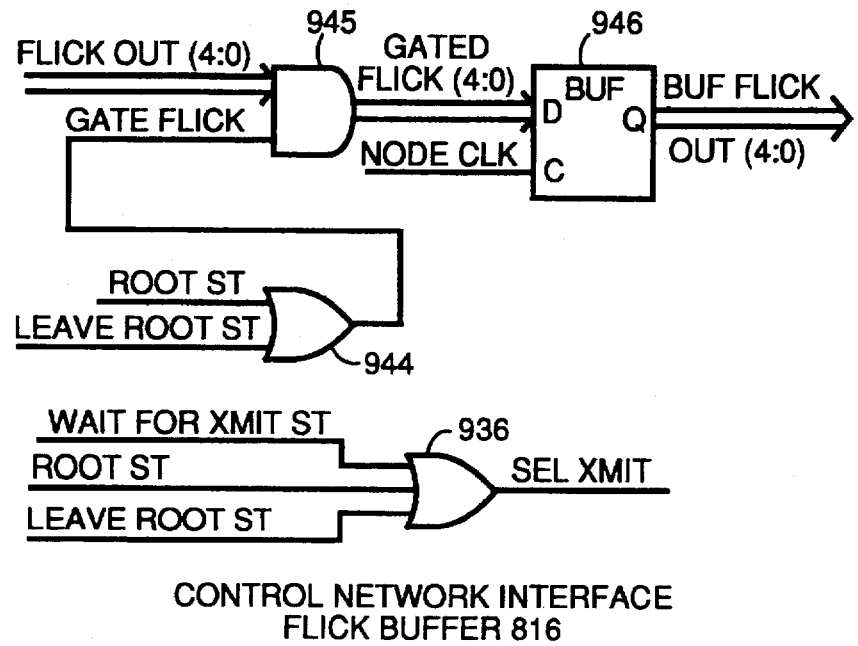

FIGS. 43 and 44 depict details of the root control/loopback section 802. In particular, FIG. 43 depicts a detailed logic diagram of the root flag control circuit 817. With reference to FIG. 43, the root flag control circuit 817 includes three general portions, including a decoder circuit 920, a root establishment timing circuit 921 and a root deletion timing circuit 922. The decoder circuit 920 determines whether the control network interface is transmitting a control network message packet 60 of the single source message type and of the configuration packet type, and, if so, determines whether the height value contained therein identifies the control network interface 204 or a control network node 50(i,j) as a logical root.

If the decoder circuit 920 determines whether the control network interface 204 is transmitting a control network message packet 60 to establish the control network interface 204 as a logical root, and if the control network interface 204 is not then a logical root, the root establishment timing circuit 921 establishes the control network interface 204 as a logical root, and asserts the ROOT UP signal. Thereafter, the receive section 801 is enabled to receive subsequent control network message packets 60 from the transmitter section 800 of the control network interface 204. On the other hand, if the decoder circuit 920 determines that the control network interface is transmitting a control network message packet 60 to establish a control network node 50(i,j) as a logical root, and if the root establishment timing circuit 921 is currently asserting the ROOT UP signal, the root deletion timing circuit 922 enables the root establishment timing circuit 921 to negate the ROOT UP signal, so that the receive section will receive subsequent control network message packets 60 from the control network node 50(1,j) connected thereto. The root establishment timing circuit 921 and the root deletion timing circuit 922 operate so as to ensure that the ROOT UP signal is asserted and negated at control network message packet boundaries, that is, after the receive section has finished receiving a control network message packet 60 that it is then receiving. This ensures that the receive section 801 does not misinterpret the FLICK IN (4:0) signals representing successive flicks of a control network message packet 60 that it is receiving.

If the CN MSG (3:0) signals indicate that the control network message packet is of the single source message type and the CN MSG (7:4) signals indicate that the packet is of the configuration type, and if the CN MSG (16:12) signals have a binary-encoded value of zero, the control network interface 204 is to become a logical root. The decoder circuit 920 includes an inverter 923 that receives the CN MSG (16:12) signals, representing the contents of the first nibble 70(0) (FIG. 7) and one bit of the second nibble 70(1) of the packet data portion 62 of the message packet 60 to be transmitted. The inverter 924 couples complements of these signals to input terminals of an AND gate 924. If all of the CN MSG (16:12) signals are negated, which will occur if they have the binary-encoded value of zero, the AND gate 924 asserts a ROOT HT 0 root height zero signal.

The decoder circuit 920 also includes an OR gate 928 that also receives the CN MSG (16:12) control network message signals and asserts a ROOT HT NE 0 root height not equal to zero signal if at least one of the CN MSG (16:12) signals is asserted. It will be appreciated that, if at least one of the CN MSG (16:12) signals is asserted, the binary-encoded value thereof is not zero. Accordingly, if the CN MSG (3:0) and CN MSG (7:4) signals indicate that the control network message packet 60 is of the single source message type and the configuration packet type, the control network message packet 60 is establishing a control network node 50(i,j) as a logical root. If that occurs while the control network interface 204 is a logical root, the root flag control circuit 817 will delete, that is, disestablish, the root condition at the control network interface 204.

It will be appreciated that the CN MSG (16:12) signals may all be negated in connection with control network message packets 60 having message types other than single source or packet types other than configuration. Accordingly, the decoder circuit 920 includes a decoder 925 that receives the CN MSG (3:0) control network message signals and the CN MSG (7:4) signals, which identify the message type and the packet type, respectively. If the ROOT HT 0 signal is asserted, and the CN MSG (3:0) and CN MSG (7:4) signals identify the single source message type and the configuration packet type, the decoder 925 asserts a CNI ROOT HT control network interface root height signal in response to the assertion of the XMIT 0 transmit flick zero timing signal.

The CNI ROOT HT signal is coupled to the root establishment timing circuit 921, specifically to an input terminal of an AND gate 927. The second input terminal of AND gate 927 is controlled by a LEAF ST leaf state signal from the root deletion timing circuit 922. If the LEAF ST signal is asserted, the control network interface 204 is not then a logical root. In that case, the asserted CNI ROOT HT signal energizes AND gate 927, which, in turn, energizes an OR gate 930, enabling it to assert a CNI BECOME ROOT control network interface become root signal. The CNI BECOME ROOT signal is coupled to the data input terminal of a flip-flop 931, which is set in response to the next tick of the NODE CLK signal to assert a CNI BECOME ROOT ST control network interface become root state signal.

The CNI BECOME ROOT ST control network interface become root state signal is coupled to one input terminal of an AND gate 932. While the RCV 12 receive tick twelve signal is not asserted, the other input terminal of AND gate 932 is enabled, and the assertion of the CNI BECOME ROOT ST signal causes the AND gate 932 to be energized. While the AND gate 932 remains energized, the OR gate 930 also remains energized to, in turn, maintain the CNI BECOME ROOT signal in its asserted condition.

When the RCV 12 receive timing signal is next asserted, it and the asserted CNI BECOME ROOT ST signal energize an AND gate 933, which, in turn, energizes an OR gate 934 to assert a WAIT FOR XMIT wait for transmit state signal. It will be appreciated that this assertion of the RCV 12 receive timing signal occurs when the receive section 801 is receiving the FLICK IN signals representing the last flick of the control network message packet it is then receiving. The WAIT FOR XMIT signal is coupled to the data input terminal of a flip-flop 935, which is set at the next tick of the NODE CLK signal to assert a WAIT FOR XMIT ST wait for transmit state signal. The assertion of the RCV 12 signal also disables AND gate 932, which, in turn, disables OR gate 930 to negate the CNI BECOME ROOT signal. The negated CNI BECOME ROOT signal resets the flip-flop 931 at the same tick of the NODE CLK signal, which, in turn, negates the CNI BECOME ROOT ST signal.

With reference to FIG. 44, which depicts circuitry in the flick buffer 816, the asserted WAIT FOR XMIT ST wait for transmit state signal generated by flip-flop 935 energizes an OR gate 936 to assert the SEL XMIT select transmit signal. As described above in connection with FIG. 41, the assertion of the SEL XMIT select transmit signal enables the multiplexer 890 to receive and use the BUF FLICK OUT buffered flick out signals from the flick buffer 816, instead of the FLICK IN signals from the control network node 50(1,j) connected thereto. At this point, the BUF FLICK OUT signals to the receive section 801 are all negated, and so the flick buffer 816 is essentially providing the equivalent of control network message packets of the nil packet type, as described above. However, it will be appreciated that, since this occurs in response to the RCV 12 signal, this operation occurs only after the receive section has finished receiving a complete control network message packet 60 from the control network node 50(1,j) connected thereto.

Returning to FIG. 43, the WAIT FOR XMIT ST wait for transmit state signal from flip-flop 935 is coupled to two AND gates 937 and 940. If the WAIT FOR XMIT ST signal is asserted, and if the XMIT 12 transmit timing signal is negated, which is the case before the transmit section 800 has finished transmitting a control network message packet 60 it is currently transmitting, the AND gate 937 is energized, which in turn energizes the OR gate 934 to maintain the WAIT FOR XMIT wait for transmit signal asserted. It will be appreciated that, at this point, the control network message packet 60 being transmitted by the transmit section 800 is the configuration packet that identifies the control network interface 204 as the logical root.

When the transmit section 800 is transmitting the last flick of the control network message packet 60, it asserts the XMIT 12 signal. The coincidence of the asserted XMIT 12 signal and the asserted WAIT FOR XMIT ST wait for transmit state signal energize an AND gate 940, which, in turn, energizes an OR gate 941 to assert a ROOT signal. The ROOT signal is coupled to the data input terminal of a flip-flop 942. At the next tick of the NODE CLK signal, flip-flop 942 is set, to assert a ROOT ST root state signal. A driver 943, connected to the data output terminal of the flip-flop 942 receives the ROOT ST signal and couples it as the ROOT UP signal to the control network node 50(1,j) connected to the control network interface 204. The asserted XMIT 12 signal also disables AND gate 937, which, in turn, disables OR gate 934, causing it to negate the WAIT FOR XMIT signal. The negation of the WAIT FOR XMIT signal, in turn, causes the flip-flop 935 to be reset in response to the same tick of the NODE CLK signal, negating the WAIT FOR XMIT ST signal.

With reference again to FIG. 44, the asserted ROOT ST signal maintains the OR gate 936 in the energized condition, which, in turn, maintains the SEL XMIT select transmit signal in the asserted condition. Accordingly, the multiplexer 890 in the flick demultiplexer 830 of the receive section 801 continues to couple the BUF FLICK OUT buffered flick out signals from the flick buffer 816 as the RCVD FLICK (4:0) received flick signals. The asserted ROOT ST signal also energizes an OR gate 944 to assert a GATE FLICK signal, which enables a gate 945 to couple the FLICK OUT (4:0) signals from the transmit section 800 as GATED FLICK (4:0) signals to the data input terminals of a buffer 946. The buffer 946 latches the GATED FLICK (4:0) signals in response to each tick of the NODE CLK signal, and provides at its data output terminals the BUF FLICK OUT (4:0) buffered flick out signals that are coupled to the receive section 801.

It will be appreciated that this occurs as the transmitter section 800 is beginning transmission of a new control network message packet 60. Accordingly, the receive section 801 will begin receiving a control network message packet 60, other than the packets of the nil packet type, from the transmit section 800 at the first flick of the respective packet. As noted above, the receive section 801 can identify the first flick as the first flick for which the RCVD FLICK signals are not all negated.

Returning to FIG. 43, as noted above, if the transmit message buffer 814 contains a control network message packet 60 of the single source message type and configuration packet type which identifies a height other than zero as the root level, the decoder 925 asserts the CNI NE ROOT HT control network interface not equal to root height signal, and otherwise negates the signal. If the CNI NE ROOT HT signal is negated, an inverter 950 enables one input of an AND gate 947. If the flip-flop 942 is asserting the ROOT ST signal, the AND gate 947 is energized, which maintains OR gate 941 in an energized condition and the ROOT signal asserted. The asserted ROOT signal, in turn, maintains the flip-flop 942 set and the ROOT ST and ROOT UP signals asserted. While the ROOT ST signal is asserted, the energized OR gate 936 (FIG. 44) maintains the SEL XMIT signal asserted and the gate 945 enabled so that the receive section 801 receives the FLICK OUT signals from the transmit section 800 representing the successive flicks of control network message packet.

When the decoder 925 asserts the CNI NE ROOT HT signal, the coincidence of that signal and the asserted ROOT ST signal energize an AND gate 951, which, in turn, energizes an OR gate 952 to assert a LEAVE ROOT signal, which is coupled to the data input terminal of a flip-flop 953. The asserted LEAVE ROOT signal causes the flip-flop 953 to be set at the next tick of the NODE CLK signal, enabling the flip-flop 953 to assert a LEAVE ROOT ST leave root state signal. Contemporaneously, the asserted CNI NE ROOT HT signal causes inverter 950 to disable AND gate 947, which, in turn, disables the OR gate 941, causing it to negate the ROOT signal. The negated ROOT signal enables the flip-flop 942 to reset at the same tick of the NODE CLK signal.

The asserted LEAVE ROOT ST leave root state signal also maintains the OR gate 936 (FIG. 44) energized to assert the SEL XMIT select transmit signal and OR gate 944 energized to enable gate 945. Accordingly, while the LEAVE ROOT ST signal is asserted, the receive section 801 continues to receive and use BUF FLICK OUT (4:0) buffered flick out signals representing successive flicks of a control network message packet.

The LEAVE ROOT ST leave root state signal will remain asserted until the receive section 801 asserts the RCV 12 signal, indicating it has received BUF FLICK OUT (4:0) buffered flick out signals representing the last flick of a control network message packet 60. In particular, prior to assertion of the RCV 12 signal, the coincidence of the negated RCV 12 signal and the asserted LEAVE ROOT ST leave root state signal maintain an AND gate 954 in an energized condition, which, in turn, maintains OR gate 952 energized to assert the LEAVE ROOT signal. As above, the while the LEAVE ROOT signal remains asserted at successive ticks of the NODE CLK signal, the flip-flop 953 remains set to maintain the LEAVE ROOT ST signal asserted.

However, when the receive section 801 asserts the RCV 12 signal, the AND gate 954 is disabled, which, in turn, disables the OR gate 952, causing it to negate the LEAVE ROOT signal. The negated LEAVE ROOT signal causes the FLIP-FLOP 953 to be reset, which, in turn, negates the LEAVE ROOT ST signal. The negated LEAVE ROOT ST signal, in turn, disables OR gate 936, enabling it to negate the SEL XMIT select transmit signal. The negated SEL XMIT signal enables the multiplexer 890 of flick demultiplexer 830 to begin coupling the FLICK IN (4:0) signals from the control network node 50(1,j) connected thereto as the RCVD FLICK (4:0) received flick signals. Prior to this point, while the control network interface 204 had been asserting the ROOT UP signal, the control network node 50(1,j) had been transmitting FLICK IN (4:0) signals all of which were negated, essentially transmitting control network message packets 60 of the nil packet type. After negation of the ROOT UP signal, the control network node 50(1,j) begins transmitting control network message packets 60 of other message types. As described above, the flick demultiplexer 830 identifies the first flick of one of these control network message packet 60 as that is the first flick for which the RCVD FLICK (4:0) signals are not all negated.

In addition, the negation of the LEAVE ROOT ST leave root state signal also disables OR gate 944, causing it to negate the GATE FLICK signal to disable gate 945. Thereafter, until the GATE FLICK signal is again asserted in response to assertion of the ROOT ST root state signal, the GATED FLICK (4:0) signals latched by the buffer 946 will all be negated.

Returning to FIG. 43, the assertion of the RCV 12 receive timing signal while the flip-flop 953 is asserting the LEAVE ROOT ST signal also energizes an AND gate 955. The energized AND gate 955, in turn, energizes an OR gate 956 which, in turn, asserts a LEAF signal, which is coupled to the data input terminal of a flip-flop 957. The flip-flop 957 is set at the next tick of the NODE CLK signal, enabling it to assert a LEAF ST signal. As noted above, the LEAF ST signal controls one input terminal of AND gate 927.

The asserted LEAF ST signal also enables one input terminal of an AND gate 961, whose other input terminal is controlled by the CNI EQ ROOT HT control network interface equals root height signal through an inverter 960. While the LEAF ST signal is asserted and the CNI EQ ROOT HT signal is negated, the AND gate 961 remains energized, in turn enabling the OR gate to remain energized to maintain the LEAF signal asserted. While the LEAF signal is asserted, successive ticks of NODE CLK signal maintain the flip-flop 957 in the set condition, maintaining, in turn, the LEAF ST signal asserted. With the LEAF ST signal in the asserted condition, when the CNI EQ ROOT HT signal is asserted, the AND gate 927 can be energized to initiate the sequence described above.

Assertion of the CNI EQ ROOT HT signal also, through inverter 960, disables AND gate 961, which, in turn, disables OR gate 956 causing the LEAF signal to be negated. The negation of the LEAF signal causes the flip-flop 957 to be reset, which, in turn, causes the LEAF ST signal to be negated at the next tick of the NODE CLK signal. Accordingly, the AND gate 927 is disabled, by negation of the LEAF ST signal, on tick of the NODE CLK signal after the GNI EQ ROOT HT signal is asserted, and is not enabled again until the LEAF ST signal is again asserted. It will be appreciated that the AND gate 927 is provided so that, if the control network interface 204 is already a logical root, which will be the case if the LEAF ST signal is negated, the rest of the root establishment timing circuit 921 will be inhibited from sequencing if the CNI EQ ROOT HT signal again is asserted without intervening assertion of the CNI NE ROOT HT signal, as the sequencing may cause a momentary glitch or noise in the ROOT UP signal.

C. Data Router Node 22

1. General

Figure 45:
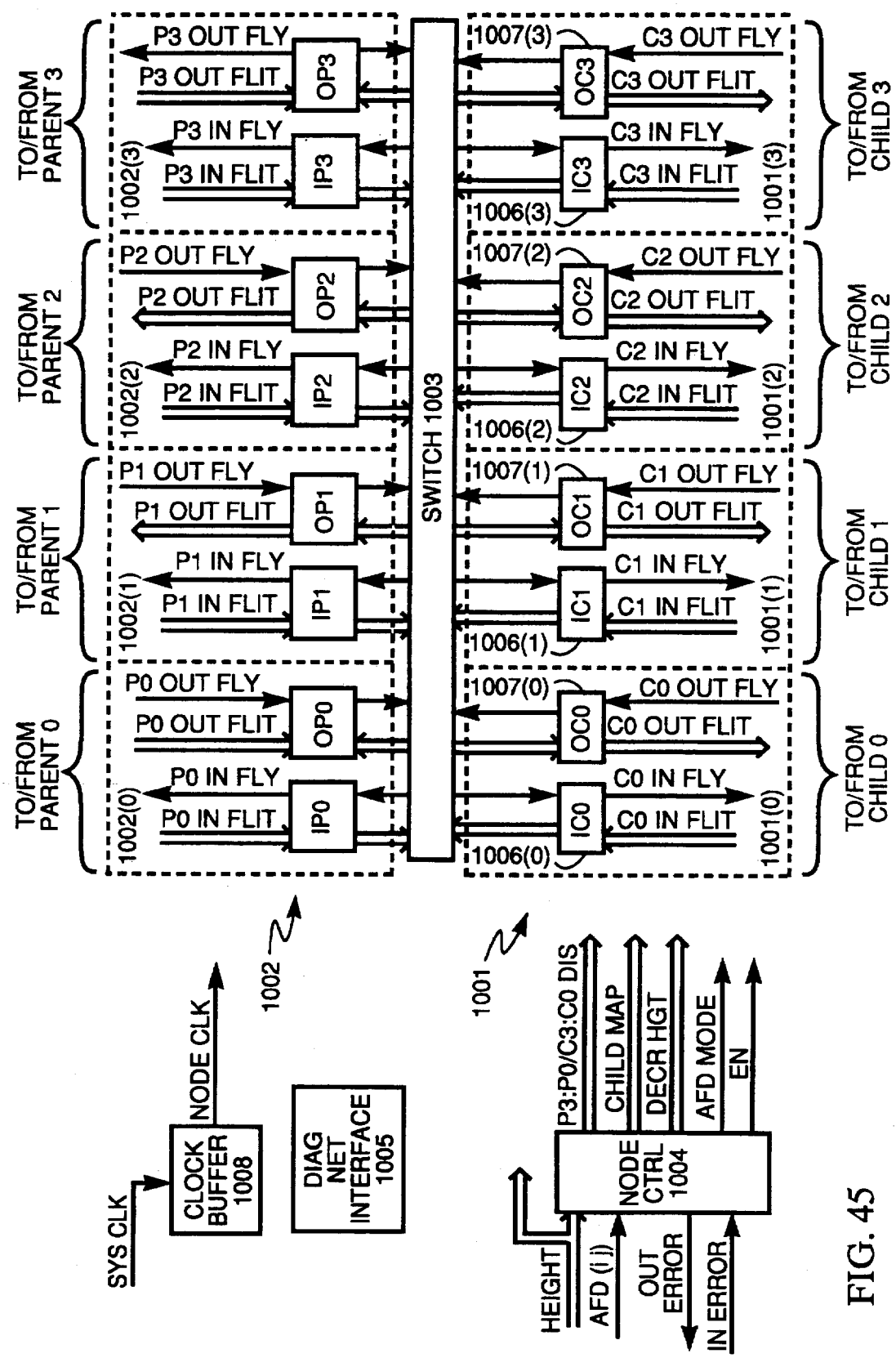
FIG. 45 is a general block diagram of a data router node used in the data router described in connection with FIGS. 2 and 3, and FIGS. 47 through 62 comprise detailed block and logic diagrams of the data router node.

FIG. 45 is a general block diagram of a data router node 22 used in the data router described above, and FIGS. 47 through 62 comprise detailed block and logic diagrams of the data router node 22. With reference to FIG. 45, the data router node 22 includes a child interface 1001, a parent interface 1002 and a switch 1003, all controlled by a node control circuit 1004. The data router node also includes a diagnostic network interface 1005, which provides an interface to the diagnostic network 16. In addition, the data router node 22 includes a clock buffer 1008 that receives the SYS CLK system clock signal from the clock circuit 17 and generates a NODE CLK node clock signal in response. In one particular embodiment, the clock buffer 1008 comprises a buffer as described in aforementioned Hillis, et al., patent application Ser. No. 07/489,079, filed Mar. 5, 1990, entitled Digital Clock Buffer Circuit Providing Controllable Delay.

The child interface 1001 includes a set of child interface modules generally identified by reference numeral 1001(i) ("i" being an integer). Each child interface module 1001(i) is connected to a child in the data router 15, which may comprise either a leaf 21, in the case of a data router node 22(1,j,k) in the first level of the data router 15, or a data router node 22(i–1,j,k) that forms part of a child data router node group 20(i–1,j) in the case of data router nodes at higher levels. Each child interface module 1001(i) receives data router message packets 30 from the child connected thereto and couples them to the switch 1003. In addition, each child interface module 1001(i) receives data router message packets from the switch 1003 and couples them to the child connected thereto. It will be appreciated that the number of child interface modules 1001(i) in a child interface 1001 of a particular data router node 22(i,j,k) will generally depend upon the fan-out from one level "i" to the next lower level "i–1" in the data router 15. In the system 10 described herein, the fan-out is four, and the child interface 1001 depicted in FIG. 45 includes four child interface modules 1001(0) through 1001(3).

The parent interface 1002 also includes a set of parent interface modules generally identified by reference numeral 1002(i) ("i" being an integer). In data router nodes 22(i,j,k)

at levels below the level of the root data router node group 20(M,0), each parent interface module 1002(i) is connected to a data router node 22(i+1,j,k) that forms pan of a parent data router node group 20(i+1,j). In the case of data router nodes 22(M,0,k) in the root data router node group 20(M,0), those nodes do not require any parent interface modules 1002(i). Each parent interface module 1002(i) receives data router message packets 30 from the parent, if any, connected thereto and couples them to the switch 1003. In addition, each parent interface module 1002(i) receives data router message packets from the switch 1003 and couples them to the parent, if any, connected thereto. The number of parent interface modules 1002(i) in a parent interface 1002 of a particular data router node 22(i,j,k) will generally depend upon the fan out from one level "i" to the next higher level "i+1" in the fat-tree defining the data router 15. In the system 10 described herein, the fan-out at some levels is two and at other levels is four. The parent interface depicted in FIG. 45 includes four parent interface modules 1002(0) through 1002(3), which will accommodate a fan-out of four.

It will be appreciated that in other embodiments of system 10, the fan-out, both up and down the fat-tree, may be different, in which case different numbers of child interface modules 1001(i) and parent interface modules 1002(i) may be provided in a particular data router node 22(i,j,k). In addition, if, as is the case with one embodiment, all of the circuitry for the data router node 22(i,j,k) is fabricated on a single integrated circuit chip, the circuit may include a number of child interface modules 1001(i) and parent interface modules 1002(i) corresponding to the maximum fan-outs in the system 10. In that case, particular ones of the child interface modules 1001(i) and parent interface modules 1002(i) that are not connected to child or parent data router nodes 22(i,j,k) may be disabled.

The switch 1003 receives data router message packets 30 from the child interface modules 1001(i) and the parent interface modules 1002(i). In the case of a data router message packet from a child interface module 1001(i), the switch 1003 may transmit the message packet either to a child interface module 1001(i) or to a parent interface module 1002(i). if the header field 40 of the data router message packet 30 contains a value that corresponds to the level of the data router node 22(i,j,k), or if the AFD MODE signal indicates that the data router is in all-fall-down mode, the switch 1003 will direct the packet 30 to a child interface module 1001(i). Otherwise, the switch directs the message packet 30 to a parent interface module 1002(i). Alternatively, in the case of a data router message packet 30 from a parent interface module 1002(i), the switch 1003 will transmit the message packet 30 to a child interface module 1001(i).

The node control circuit 1004 receives selected signals from and generates various control signals in response. For example, the node control circuit 1004 receives binary-encoded HEIGHT (2:0) signals which identify the level of the data router node 22(i,j,k) and generates DECR HGT decremented height signals which are binary encoded to identify the next lower level in the data router 15. As described above, as the data router nodes 22(i,j,k) transfer the data router message packets 30 down the data router 15, the nodes decrement the value contained in the header field 40, which identifies the level. In that case, the DECR HGT decremented height signals are used to form the contents of the header field 40, as described below.

In addition, the node control circuit 1004 receives the AFD (i,j) all-fall-down (i,j) signal from the control network 14 and generates, in response thereto, an AFD MODE all-fall-down mode signal which controls operations in the child interface modules 1001(i) and the parent interface modules 1002(i) as described below. The node control circuit also generates an EN enable signal, which enables the data router node 22(i,j,k) to operate, and P3:P0/C3:C0 DIS parent interface module/child interface module disable signals that disable selected ones of the child interface modules 1001(i) and parent interface modules 1002(i).

The node control circuit 1004 also generates a set of CHILD MAP signals which are coupled to the child interface modules 1001(i) and parent interface modules 1002(i) and are used to force the association of each of the modules 1001(i) and 1002(i) with a particular the child interface module 1001(i) during while the AFD MODE all-fall-down mode signal is asserted. This forces the switch 103 to couple data router message packets 30 received from a particular source, a particular parent or child, to a particular child interface module 1001(i).

Finally, the node control circuit 1004 also transmits selected error signals, represented by an OUT ERROR signal on FIG. 45, to the diagnostic network 16 if it detects the presence of selected error conditions.

Each child interface module 1001(i) includes an input child circuit, generally identified by reference numeral 1006 (i), and an output child circuit generally identified by reference numeral 1007(i). The input child circuit 1006(i) transmits a C"i" IN FLY child "i" input fly signal to the child connected thereto, and receives C"i" IN FLIT child "i" input flit signals, comprising four signals received in parallel. The C"i" IN FLIT signals received at successive ticks of the NODE CLK signal represent four-bit flits of the data router message packet 30 from the child connected thereto.

The input child circuit 1006(i), in response to the message address portion 31 of the message packet determines whether it is to be transmitted up the tree or down the tree defining the data router 15. If the input child circuit 1006(i) determines that the data router message packet 30 is to be transmitted up the tree, it enables the switch 1003 to direct the successive flits comprising the packet 30 to a parent interface module 1002(i) selected by the switch 1003 at random. On the other hand, if the input child circuit 1006(i) determines that the data router message packet 30 is to be transmitted down the tree, it identifies one of the child interface modules 1001(i) to which the switch 1003 is to direct the packet 30. The switch 1003 then directs the successive flits of the message packet 30 to the output child circuit 1007(i) of the identified child interface module 1001(i).

Each output child circuit 1007(i) receives a C"i" OUT FLY child "i" output fly signal from the child connected thereto, and transmits thereto C"i" OUT FLIT child "i" output flit signals, comprising four signals transmitted in parallel. The C"i" IN FLIT child "i" input flit signals transmitted at successive ticks of the NODE CLK signal represent four bit flits of the data router message packet 30 transmitted to the child connected thereto.

Each parent interface module 1002(i) includes an input parent circuit, generally identified by reference numeral 1010(i), and an output parent circuit generally identified by reference numeral 1011(i). The input parent circuit 1010(i) transmits a P"i" IN FLY parent "i" input fly signal to the parent connected thereto, and receives P"i" IN FLIT parent "i" input flit signals, comprising four signals received in parallel. It will be appreciated that the C"i" OUT FLY child "i" output fly and C"i" OUT FLIT child "i" output flit signals described above in connection with an output child circuit 1007(i) in a data router node 22(i,j,k) at one level "i" will correspond to the P"i" IN FLY parent "i" input fly and P"i" IN FLIT parent "i" input flit signals of input parent circuits 1010(i) in the child data router nodes 22(i−1,j,k) in the next lower level.

The input parent circuit 1010(i), in response to the message address portion 31 of the message packet, identifies one of the child interface modules 1001(i) to which the switch 1003 is to direct the packet 30. The switch 1003 then directs the successive flits of the message packet 30 to the output child circuit 1007(i) of the identified child interface module 1001(i). It will be appreciated that, in the system 10 described herein, data router message packets 30, once they have been transmitted up the tree defined by the data router 15 to the level identified in the message packet 30 and have started down the tree, are not thereafter transmitted up the tree again. Accordingly, message packets 30 coupled by input parent circuits 1010(i) to switch 1003 are directed only to an output child circuit 1007(i), and not to an output parent circuit 1011(i).

The output parent circuits 1011(i) operate in a similar manner as the output child circuits 1007(i). Each output parent circuit 1011(i) receives a P"i" OUT FLY parent "i" output fly signal from the parent connected thereto, and transmits thereto P"i" OUT FLIT parent "i" output flit signals, comprising four signals transmitted in parallel. The P"i" IN FLIT parent "i" input flit signals transmitted at successive ticks of the NODE CLK signal represent four bit flits of the data router message packet 30 transmitted to the parent connected thereto. It will be appreciated that the C"i" IN FLY child "i" input fly and C"i" IN FLIT child "i" input flit signals described above in connection with an input child circuit 1006(i) in a data router node 22(i,j,k) at one level "i" will correspond to the P"i" OUT FLY parent "i" output fly and P"i" OUT FLIT parent "i" output flit signals of output parent circuits 1011(i) in the parent data router nodes 22(i+1,j,k) in the next higher level.

Thus, it will be recognized that the input child circuit 1006(i), which receives the C"i" IN FLIT child input flit signals representing flits of data router message packets 30, regulate the flow of flits thereto by means of the C"i" IN FLY child input fly signal. When the input child circuit 1006(0 circuit negates the C"i" IN FLY signal while the child data router node 22(i−1,j,k) connected thereto is transmitting a data router message packet 30, it stops transmitting signals, which the input child circuit 1006(i) receives as the C"i" IN FLIT signals, representing the flits. The child data router node 22(i−1,j,k) effectively provides negated C"i" IN FLIT signals.

When the input child circuit 1006(i) again asserts the P"i" IN FLY signal, the child data router node 22(i−1,j,k) resumes transmitting signals, which the input child circuit 1006(i) receives as the C"i" IN FLIT signals, which, at successive ticks of the NODE CLK signal, represent successive flits of the packet 30. Between data router message packets 30, the child data router node 22(i,j,k) negates the C"i" IN FLIT signals, regardless of the condition of the C"i" IN FLY signal. Accordingly, the input child circuit 1006(i) can identify the first flit of a new data router message packet 30 as the first tick of the NODE CLK signal following the end of a previous packet at which the C"i" IN FLIT signals are not all negated.

Similarly, the input parent circuit 1010(i), which receives the P"i" IN FLIT parent input flit signals representing flits of data router message packets 30, regulate the flow of flits thereto by means of the P"i" IN FLY parent input fly signal. When the input parent circuit 1010(i) circuit negates the P"i" IN FLY signal while the parent data router node 22(i+1,j,k) connected thereto is transmitting a data router message packet 30, the parent data router node 22(i+1,j,k) stops transmitting signals, which the input parent circuit 1010(i) receives as the P"i" IN FLIT signals, representing the flits. The parent data router node 22(i+1,j,k) effectively provides negated P"i" IN FLIT signals.

When the input parent circuit 1010(i) again asserts the P"i" IN FLY signal, the parent data router node 22(i+1,j,k) resumes transmitting signals, which the input parent circuit 1010(i) receives as the P"i" IN FLIT signals, which, at successive ticks of the NODE CLK signal, represent successive flits of the packet 30. Between data router message packets 30, the parent data router node 22(i+1,j,k) negates the P"i" IN FLIT signals, regardless of the condition of the P"i" IN FLY signal. Accordingly, the input parent circuit 1010(i) can identify the first flit of a new data router message packet 30 as the first tick of the NODE CLK signal following the end of a previous packet at which the P"i" IN FLIT signals are not all negated.

The parent and child input circuits 1006(i) and 1010(i) are generally similar, as are the parent and child output circuits 1007(i) and 1011(i). The details of child input circuit 1006 (0) will be described in connection with FIGS. 46 through 54. The details of the switch 1003 will be described in connection with FIGS. 56 through 61. Finally, the details of output child circuit 1007(0) will be described in connection with FIG. 62.

2. Input Child Circuit 1006(0)
   i. General

Figure 46:
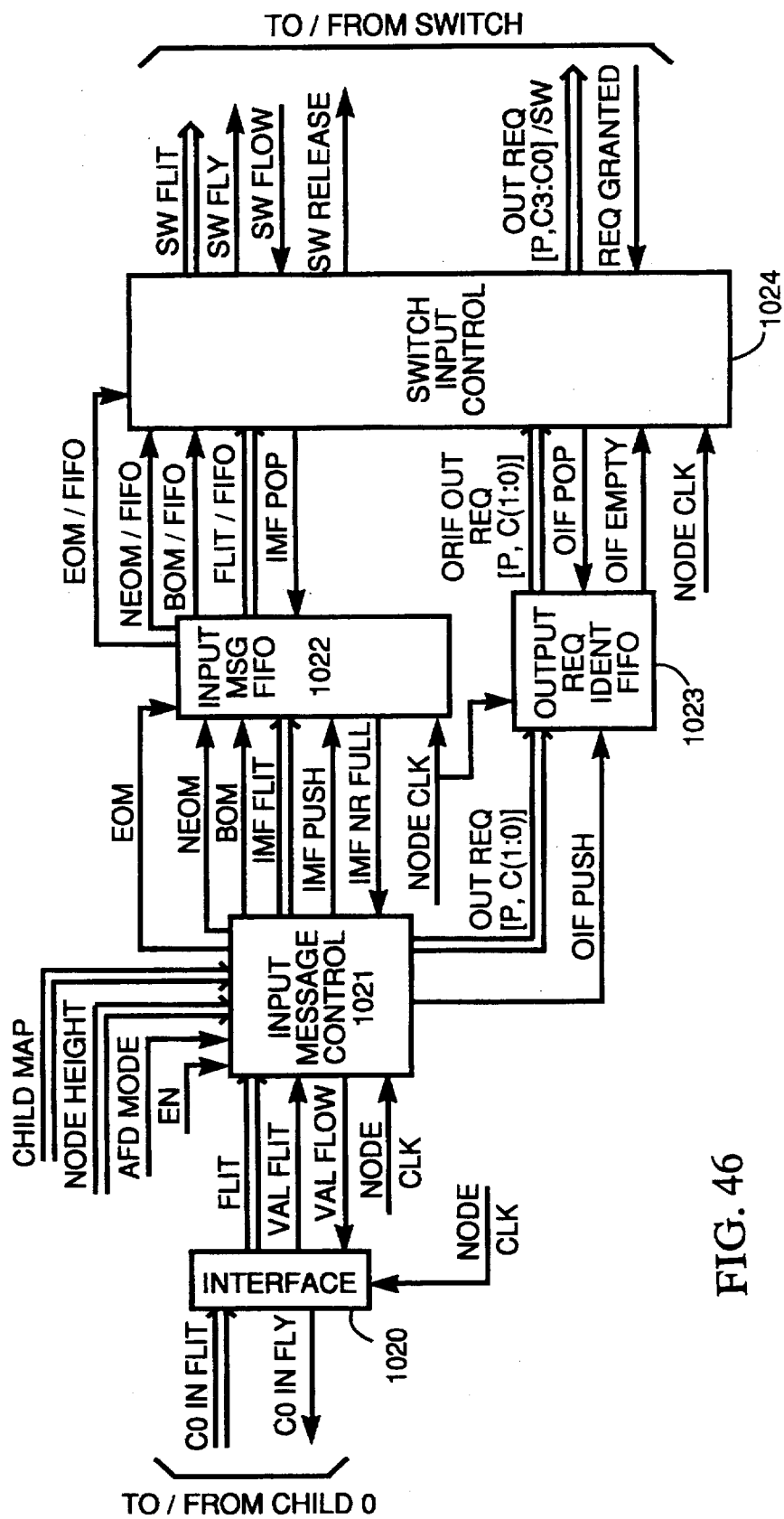

FIG. 46 depicts a general block diagram of input child circuit 1006(0). With reference to FIG. 46, the input child circuit 1006(0) includes an interface circuit 1020, an input message control circuit 1021, an input message first-in first-out buffer (FIFO) 1022, an output request identification FIFO 1023 and a switch input control 1024. The interface circuit 1020 receives a VAL FLOW valid flow signal from the input message control circuit 2021, and transmits in response the CO IN FLY input fly signal to the parent output circuit 1011 connected thereto.

The interface circuit 1020 also receives the CO IN FLIT input flit signal from the same parent output circuit 1011 and couples, in response thereto, FLIT signals to the input message control circuit 1021. The VAL FLOW valid flow signal provided by the input message control circuit 1021 operates as a flow control signal regulating the flow of flits represented by the FLIT signals from the interface circuit 1020 to the input message control circuit 1021. The interface circuit 1020 provides a VAL FLIT signal to the input message control circuit 1021 to indicate that the FLIT signals represent valid flits of a data router message packet 30, or the binary-encoded value of zero if the interface 1020 is not receiving a message packet 30.

The input message control circuit 1021 performs a number of operations. In particular, input message control circuit 1021 monitors the FLIT signals from the interface to detect the beginning of a data router message packet 30. In response to the FLIT signals representing successive flits of a data router message packet 30, the input message control circuit 1021 couples IMF FLIT input message FIFO flit signals representing successive flits to the input message FIFO 1022.

In providing IMF FLIT input message FIFO flit signals to the input message HFO 1022, the input message control circuit 1021 also performs some processing on the FLIT signals representing the first two flits of a data router message packet. In addition, the input message control circuit 1021 determines whether the data router message packet is to be transferred to a parent or to a child data router node 22(i,j,k), and if to a child the particular child. The input message control circuit 1021 generates OUT REQ [P,C(1:0)] output request (parent, child) signals, which it transfers to the output request identification FIFO 1023, along with an OIF PUSH output identification FIFO push signal. When the input message control circuit 1021 asserts the OIF PUSH signal, the output request identification FIFO 1023 stores the OUT REQ [P,C(1:0)] signals.

In processing the first two flits of the data router message packet 30, if the AFD MODE all-fall-down mode signal is not asserted, the input message control circuit 1021 compares the binary-encoded value of the FLIT signals representing the header field 40 of the data router message packet 30 to the binary-encoded value of the NODE HEIGHT (2:0) signals representing the level of the data router node 22(i,j,k) in the data router 15. If binary-encoded value of the FLIT signals representing the header field 40 is less than that of the NODE HEIGHT (2:0) signals, the data router message packet 30 is to be transferred up the tree. Accordingly, the input message control circuit 1021 couples the FLIT signals representing the header field 40, as well as the FLIT signals representing the succeeding flits of the message address portion 31, as the IM"i" FLIT signals to the input message FIFO 1022. In addition, the OUT REQ [P,C(1,0)] output request signals loaded onto the output request identification FIFO 1023 indicate that the data router message packet 30 is to be transferred to the parent data router node 22(i,j,k).

On the other hand, if, while the AFD MODE all-fall-down mode signal is not asserted, the input message control circuit 1021 determines that the binary-encoded value of the FLIT signals representing the header field 40 is the same as that represented by the NODE HEIGHT (2:0) signals, the data router node 22(i,j,k) is to transfer the data router message packet 30 down the data router 15. Accordingly, the input message control circuit generates IMF FLIT input message FIFO flit signals having a binary-encoded value that is one less than the binary-encoded value represented by the FLIT signals representing the header field 40, which it couples to the input message FIFO 1022 as the first flit of the data router message packet 30. The input message control circuit 1021 also determines whether the first flit of the down path identification portion 41 is to be eliminated, and if so does not transfer signals representing that flit to the input message FIFO 1022. In addition, the input message control circuit 1021 generates OUT REQ [P,C(1,0)] output request signals for transfer to the output request identification FIFO 1023 which have a binary-encoded value that identify the child data router node 22(i,j,k) to which the message packet 30 is to be transmitted.

Finally, if the AFD MODE all-fall-down mode signal is asserted, the input message control circuit 1021 transfers the FLIT signals representing the header field 40 and the down path identification portion 41 unchanged to the input message FIFO 1022 as the IMF FLIT input message FIFO flit signals. In addition, the input message control circuit 1021 generates OUT REQ [P,C(1:0)] output request signals for transfer to the output request identification FIFO 1023 which have a binary-encoded value that identifies the child data router node 22(i,j,k) identified by the CHILD MAP signals.

The input message control circuit 1021 also generates a BOM beginning-of-message signal, an NEOM near end-of-message signal and an EOM end-of-message signal, all of which it couples to the input message FIFO 1022 along with the IMF FLIT signals representing the first flit, a flit a selected number of flits from the last, and the last flit of a data router message packet 30, respectively. The input message FIFO 1022 receives and stores the BOM, NEOM and EOM signals along with the corresponding IMF FLIT signals.

The input message control circuit 1021 generates an IMF PUSH input message FIFO push signal, which it asserts to enable the input message FIFO 1022 to receive IMF FLIT signals representing a flit, along with the associated BOM, NEOM, and EOM signals. In addition, input message control circuit 1021 receives an IMF NR FULL input message FIFO nearly full signal from the input message FIFO 1022. When the IMF NR FULL signal is asserted, the input message FIFO 1022 is nearly full. The input message control circuit 1021 uses the asserted or negated condition of the IMF NR FULL signal in controlling the assertion and negation of the VAL FLOW signal. As noted above, the interface 1020 uses the condition of the VAL FLOW signal in controlling the condition of the CO IN FLY signal. Accordingly, the asserted or negated condition of CO IN FLY signal will represent the extent to which the input message FIFO 1022 is able to receive and store additional flits.

Finally, the input message control circuit 1021, when it receives FLIT signals representing the check field 33 of the data router message packet 30, verifies that the data router message packet 30 was properly received. If the input message control circuit 1021 determines that the data router message packet 30 was properly received, it generates a new check value which it couples as IMF FIFO input message FIFO signals to the input message FIFO 1022, representing the last flit of the data router message packet 30. If, on the other hand, the input message control circuit 1021 determines that the data router message packet 30 was not properly received, it couples an error code as the IMF FIFO signals, and also enables the node control circuit 1004 to assert an OUT ERROR signal. In one embodiment, the error code generated by the input message control circuit 1021 corresponds to the complement of the check value that the circuit 1021 would otherwise provide.

The switch input control circuit 1024 performs several operations. First, the switch input control circuit 1024 retrieves from the output request identification FIFO 1023 the buffered OUT REQ [P,C(1,0)] output request signals, which it receives as ORIF OUT REQ [P,C(1:0)] buffered output request signals. To initiate the retrieval, the switch input control circuit 1024 asserts an OIF POP output identification FIFO pop signal. When the output request identification FIFO 1023 is empty, it asserts an OFF EMPTY output identification FIFO empty signal.

In response to retrieved ORIF OUT REQ [P,C(1:0)] buffered output request signals, the switch input control circuit decodes the encoded child identification portion to generate OUT REQ [P,C3:C0]/SW output request to switch signals. The OUT REQ [P,C3:C0]/SW signals comprise one signal which, if asserted, indicate that the flits comprising the associated data router message packet 30 are to be coupled to the parent data router node 22(i,j,k), and a signal associated with each child data router node 22(i,j,k) which, if asserted, indicate that the flits are to be coupled to the associated child data router node 22(i,j,k). The OUT REQ [P,C3:C0]/SW signals are coupled to the switch 1003

When the switch 1003 is in a condition to couple the flits comprising the associated data router message packet 30 to the recipient identified by the OUT REQ [P,C3:C0]/SW signals, it grants the request, represented by those signals by asserting a REQ GRANTED request granted signal. At that point, the switch input control circuit may assert the OFF POP output identification FIFO pop signal and repeat the operation. If the output request identification FIFO 1023 is at that point asserting the OIF EMPTY output identification FIFO empty signal, the operation will be delayed until it negates the OIF EMPTY signal.

After the switch 1003 has granted a request, the switch input control circuit 1024 retrieves flits representing the data router message packet 30 from the input message FIFO 1022 and couples them to the switch 1003. While it is able to receive the individual flits, the switch 1003 maintains a SW FLOW switch flow signal in an asserted condition. In response, the switch input control circuit asserts an IMF POP input message FIFO pop signal which enables the input message FIFO 1022 to transmit FLIT/FIFO buffered flit signals which, in synchrony with successive ticks of the NODE CLK signal, represent successive flits of the data router message packet 30. The switch input control circuit, in turn, couples these signals to the switch 1003 as SW FLIT switch flit signals, and asserts a SW FLY switch fly signal.

While the switch input control circuit 1024 is transmitting SW FLIT switch flit signals representative of successive flits of a data router message packet 30, it asserts the OIF POP output identification HFO pop signal to enable the output request identification FIFO 1023 to transmit to it new ORFF OUT REQ [P,C(1:0)] signals for the next data router message packet 30, if any. If no additional data router message packets have been received, the output request identification FIFO 1023 maintains the OIF EMPTY output identification FIFO signal in an asserted condition. If the OIF EMPTY signal is negated it transmits the ORIF OUT REQ [P,C(1:0)] output request signals therefor, which the switch input control circuit 1024 receives at the next tick of the NODE CLK signal, decodes and couples to the switch 1003 as described above.

The switch 1003 identifies and sets up the connection for the new data router message packet while the flits for the current data router message packet 30 are being coupled therethrough. When the switch input control circuit 1024 receives the NEOM/FIFO near end-of-message from FIFO signal for the current data router message packet, it asserts a SW RELEASE switch release signal that enables the switch 1003 to finish the connection for the new data router message packet 30, and the switch 1003 can begin receiving SW FLIT switch flit signals for the flits of the data router message packet 30 immediately after all of the flits for the current packet 30 have been coupled.

ii. Interface Circuit

Figure 47:
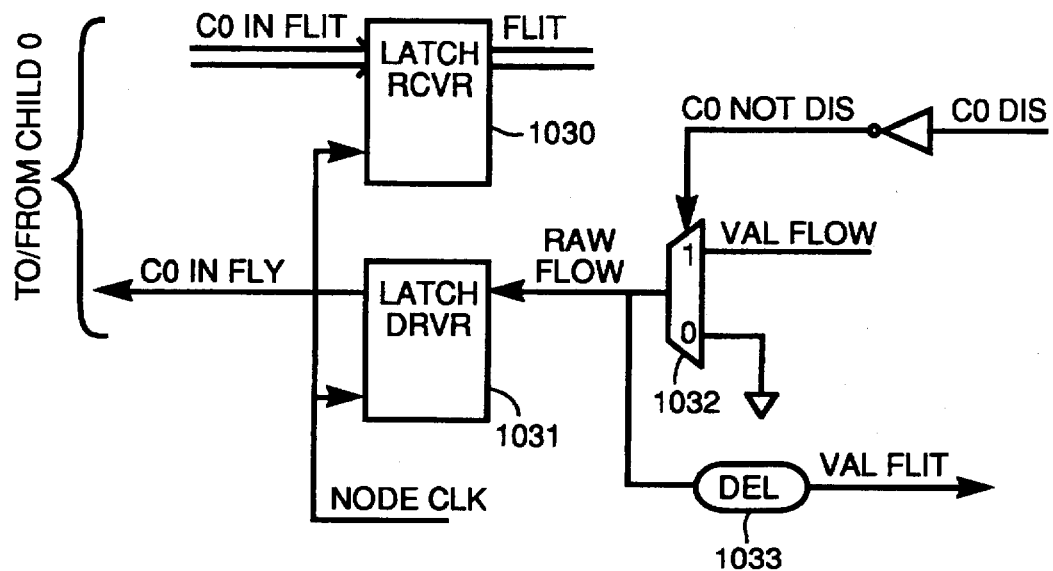

FIG. 47 depicts a detailed block diagram of an interface 1020 in the input child circuit 1006(0). With reference to FIG. 47, the interface 1020 includes a receiver 1030 that receives the C0 IN FLIT input flit signals at a data input terminal, and latches them at each tick of the NODE CLK signal. The data output terminal of latch 1030 provides the FLIT signals, which are coupled to the input message control circuit 1021.

A latch driver 1031 transmits the C0 IN FLY input fly signal. The VAL FLOW valid flow signal from the input message control circuit 1021 is received at one input terminal of a multiplexer 1032. The multiplexer's other input terminal is maintained at a negated signal level. The multiplexer 1032 is controlled by a C0 NOT DIS not disabled signals, which represents the complement of the C0 DIS disable signal from node control circuit 1004 (FIG. 7). As noted above, the node control circuit 1004 asserts the C0 DIS disable signal to disable the child interface module 1001(0).

If the C0 DIS signal is asserted, the multiplexer 1032 couples a negated level signal as a RAW FLOW signal to the data input terminal of the latch driver 1031. The negated-level RAW FLOW signal, which the latch driver 1031 latches at each tick of the NODE CLK signal, maintains the C0 IN FLY input fly signal at a negated condition.

In addition, the RAW FLOW raw flow signal is coupled to the input terminal of a delay line 1033. The delay line couples the delayed RAW FLOW signal as the VAL FLIT valid flit signal to the input message control circuit 1021. While the RAW FLOW signal is maintained in a negated condition, the VAL FLIT signal is also negated. If, however, the condition of the RAW FLOW signal changes from the asserted state to the negated state, the delay line 1033 delays provides a delay in a transition of the VAL FLIT signal from an asserted state to a negated state.

The amount of delay provided by delay line 1033 is on the order of the propagation time for the C0 IN FLY input fly signal from the child input interface 1020 to the output interface of the child data router node 22(i,j,k) or injector port 225 of the leaf 21 connected thereto, since that circuit may have transmitted signals, which will be received as C0 IN FLIT input flit signals representing several flits before it receives the negated C0 IN FLY signal. These flits will be received by the receiver 1030 and coupled to the input message control circuit 1021. The delayed negation of the VAL FLIT valid flit signal enables the input message control circuit 1021 to receive these flits from the receiver 1030 and couple them to the input message FIFO 1022. The delay provided by delay line 1033 ensures that the negation of the VAL FLIT signal, as received by the input message control circuit 1021, is synchronous with the provision thereto of FLIT signals by receiver 1030 representing a the last flit provided by the child data router node 22(i,j,k) or injector port 223 of the leaf 22 connected thereto. It will be appreciated that the input message FIFO 1022 will enable the input message control 1021 to negate the VAL FLOW signal sufficiently ahead of its becoming full to enable it to receive and store these additional flits.

On the other hand, if the C0 DIS signal is negated, the multiplexer 1032 couples the VAL FLOW signal from the input message control circuit as the RAW FLOW signal. The RAW FLOW signal, accordingly, reflects the ability of the input message FIFO 1022 to accept and store additional flits. If the RAW FLOW signal is negated, indicating that the input message FIFO 1022 is nearly full, the VAL FLOW signal is will also be negated. As above, the negated VAL FLOW signal will be latched by driver 1031 in response to the NODE CLK signal, which will drive the C0 IN FLY input fly signal to the data router node 22(i,j,k) to a negated level to disable the child data router node 22(i,j,k) or leaf 21 connected thereto from transmitting flits.

If, however, the input message FIFO 1022 is able to receive additional flits, the input message control circuit 1021 asserts the VAL FLOW valid flow signal. If the C0 DIS disable signal is negated, the multiplexer 1032 couples the asserted level VAL FLOW valid flow signal as an asserted level RAW FLOW signal to the input terminal of driver 1031. Driver 1031, in turn, latches the asserted RAW FLOW signal and drives it as an asserted C0 IN FLY input fly signal at the next tick of the NODE CLK signal.

The delay line 1033 also receives the asserted RAW FLOW signal and asserts the VAL FLIT valid flit signal. In a transition of the VAL FLIT signal from a negated condition to an asserted condition, the transition in the VAL FLIT signal is also delayed by the delay line 1033. As above, the delay is provided to permit the child data router node 22(i,j,k) or injector port 223 of the leaf 21 connected thereto to receive the asserted C0 IN FLY input fly signal and begin transmitting signals, which will be received at receiver 1030 as the C0 IN FLIT signals, representing flits. The delay provided by delay line 1033 ensures that the assertion of the VAL FLIT signal, as received by the input message control circuit 1021, is synchronous with the provision thereto of FLIT signals by receiver 1030 representing a flit.

iii. Input Message Control Circuit

Figure 48:
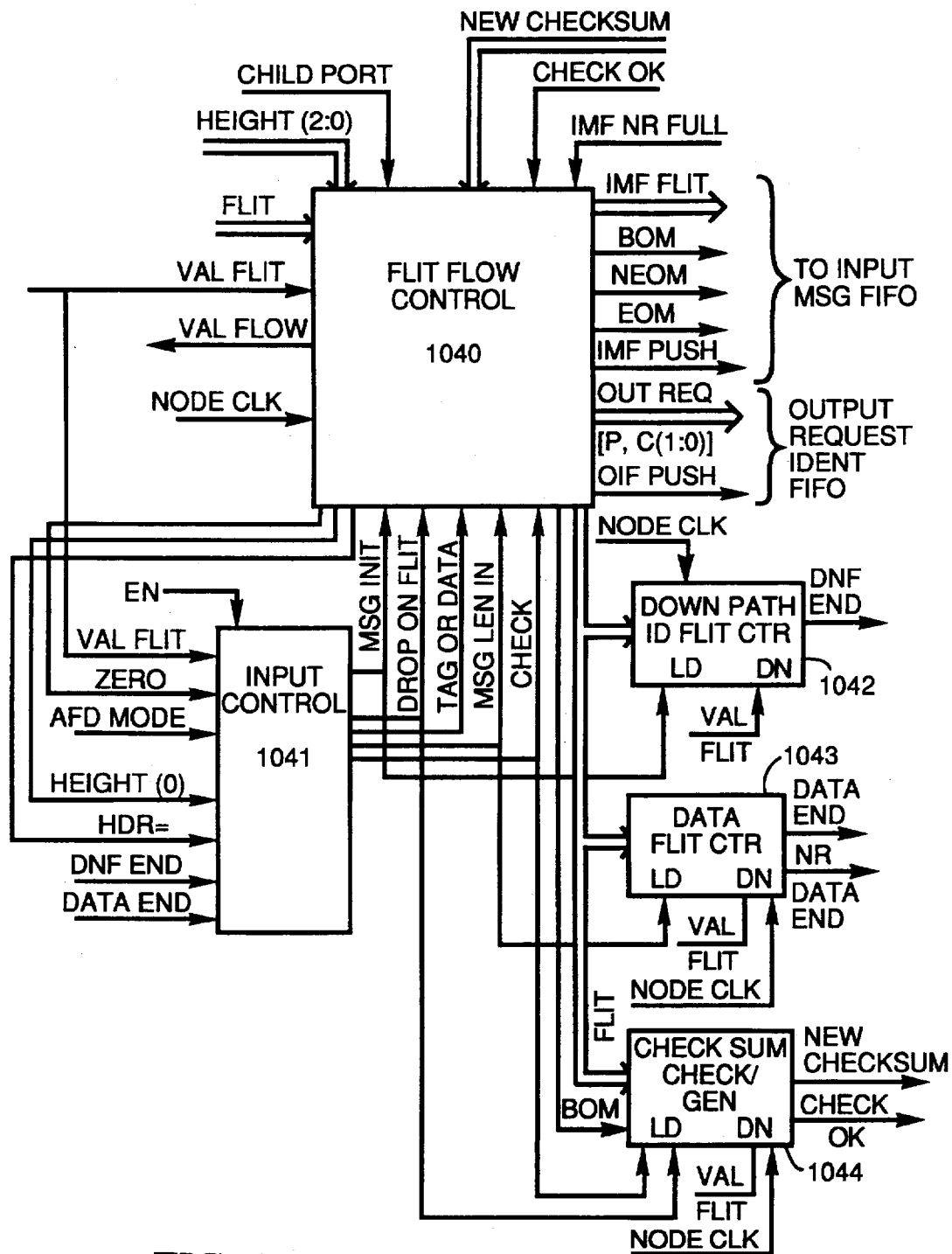

FIG. 48 depicts a general block diagram of the input message control circuit 1021 (FIG. 46). With reference to FIG. 48, the input message control circuit 1021 includes a flit flow control circuit 1040, an input control circuit 1041, a down path identification flit counter 1042, a data flit counter 1043 and a checksum check/generator circuit 1044. The flit flow control circuit 1040, which is depicted in greater detail in FIGS. 50 and 51, receives the FLIT signals from the interface 1020 and generates, under control of the input control circuit 1041, IMF FLIT input message FIFO flit signals and the BOM beginning-of-message signal, NEOM near end-of-message signal, and EOM end-of-message signal for storage in the input message FIFO 1022. In addition, the flit flow control circuit 1040 generates the OUT REQ [P,C(1:0)] output request signals for storage in the output request identification FIFO 1023. The flit flow control circuit 1040 also generates the VAL FLOW signal used by the interface circuit 1020 and receives the VAL FLIT valid flit signal which controls its use of the FLIT signals.

The flit flow control circuit also provides several signals to the input control circuit 1041. The input control circuit 1041 is essentially a state machine, that operates in a plurality of states as depicted on FIG. 49. The input control circuit 1041 provides several signals to the flit flow control circuit 1040 that effectively identify various states in receipt of a data router message packet 30. In particular, the input control circuit 1041 provides a MSG INIT message initialization signal that enables the flit flow control circuit 1040 to identify the first flit of a data router message packet. If the MSG INIT signal is asserted, and if the VAL FLIT signal is asserted, the first flit of a data router message packet 30 is indicated by the FLIT signals received by the flit flow control circuit 1040 having a non-zero binary-encoded value.

The asserted MSG INIT message initialization signal is also coupled to the down path identification flit counter 1042 to enable it to load the FLIT signals. It will be appreciated that the input message control circuit 1041 will maintain the MSG INIT signal in an asserted condition until the FLIT signals represent the header field 41 of a data router message packet 30, and while the MSG INIT signal is asserted the counter 1042 will continually load the FLIT signals.

As described above, if a data router node 22(i,j,k) receives a data router message packet, traversing the data router 15 down the tree, the node may discard flits representing the down path identification portion 41 as they are used. The input control circuit 1041 generates a DROP DN FLIT drop down flit signal which, if asserted, enables the flit flow control circuit 1040 to discard the first flit of the down path identification portion 41. The input control circuit 1041 uses a HDR=header equal signal, the low-order NODE EIGHT (0) height signal and the AFD MODE all-fall-down mode signal to determine whether to assert the DROP DN FLIT drop down flit signal. If the flit flow control circuit 1040 is asserting the HDR=signal, the data router message packet 30 is being transmitted down the data router tree. A data router node 22(i,j,k) drops a flit in the down path identification portion 41 only in the odd-numbered levels (i), which is indicated by the low-order NODE HEIGHT(0) signal.

Finally, the data router nodes 22(i,j,k) do not drip flits in the down path identification portion 41 if data router 15 is in all-fall-down mode, as indicated by the assertion of the AFD MODE all-fall-down mode signal.

Finally, the input control circuit 1041 also asserts a MSG LEN IN message length in signal, a TAG OR DATA signal and a CHECK signal contemporaneously with FLIT signals representing the corresponding flits of the data router message packet. In generating these signals, the input control circuit uses signals from the down path identification flit counter 1042 and the data flit counter 1043.

The flit flow control circuit 1040 also provides the received FLIT signals to the down path identification flit counter 1042, the data flit counter 1043 and the checksum check/generator circuit 1044. The down path identification flit counter 1042, which will be described in greater detail below in connection with FIG. 53, receives the FLIT signals representative of the header field 40 (FIG. 4) of a data router message packet 30. The counter 1042 iteratively decrements in response to successive ticks of the NODE CLK signal while the VAL FLIT valid flit signal is asserted. During this time, the FLIT signals represent the down path identification portion 41 of the data router message packet 30 being received. When the value of counter 1042 decrements to zero, it asserts a DNF END down flit end signal, which indicates that the entire down flit identification portion 41 has been received.

Similarly, the data flit counter 1043, which will be described below in connection with FIG. 52, receives the FLIT signals representative of the message length field 34 of a data router message packet 30. The counter 1042 iteratively decrements in response to successive ticks of the NODE CLK signal while the VAL FLIT valid flit signal is asserted. During this time, the FLIT signals represent the message data portion 32 of the data router message packet 30 being received. When the value of counter 1043 decrements to nearly zero, it asserts a NR DATA END signal, which the flit flow control circuit uses in generating the NEOM near end-of-message signal. When counter 1043 decrements to zero, it asserts a DATA END data end signal, which indicates that the entire message data portion 32 has been received. The flit flow control circuit uses the DATA END signal in generating the EOM end-of-message signal.

The checksum check/generator circuit 1044 receives the FLIT signals and verifies the checksum of the FLIT signals representative of check field 33. The checksum check/ generator circuit 1044 is reset in response to the BOM beginning-of-message signal provided by the flit flow control circuit 1040. In response to FLIT signals representative of successive flits of a data router message packet 30, the checksum check/generator circuit 1044 generates NEW CHECKSUM signals. When the input control circuit 1041 asserts the CHECK signal, the circuit 1044 generates a CHECK OK signal whose condition indicates whether the checksum generated by the checksum check/generator circuit matches the value in the check field 33 of the data router message packet. The flit flow control circuit 1040 uses these signals in generating the IMF FLIT input message FIFO flit signals representing the check field 33 of the data router message packet for storage in the input message FIFO 1022.

Figure 50:
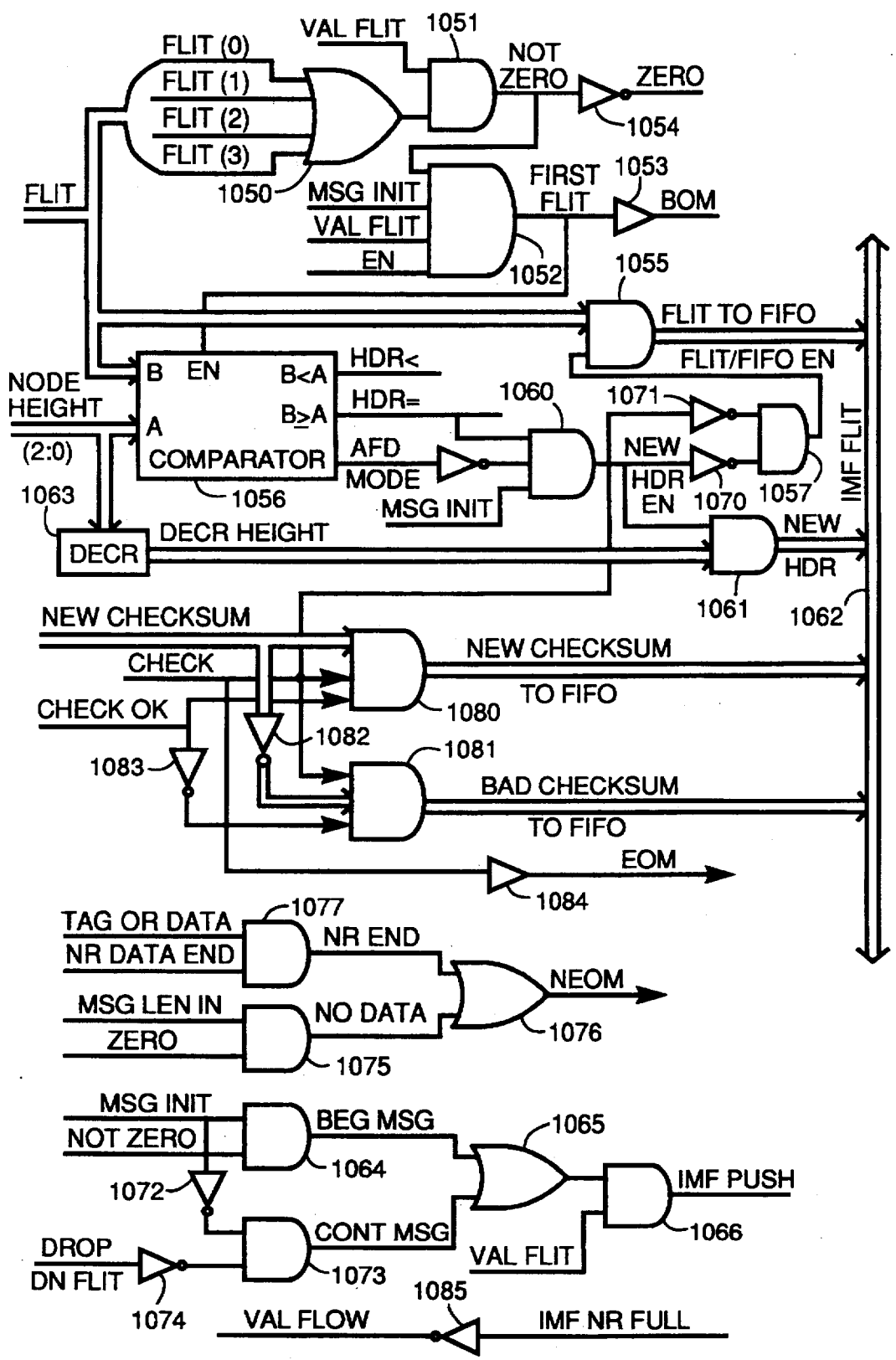
Figure 51:
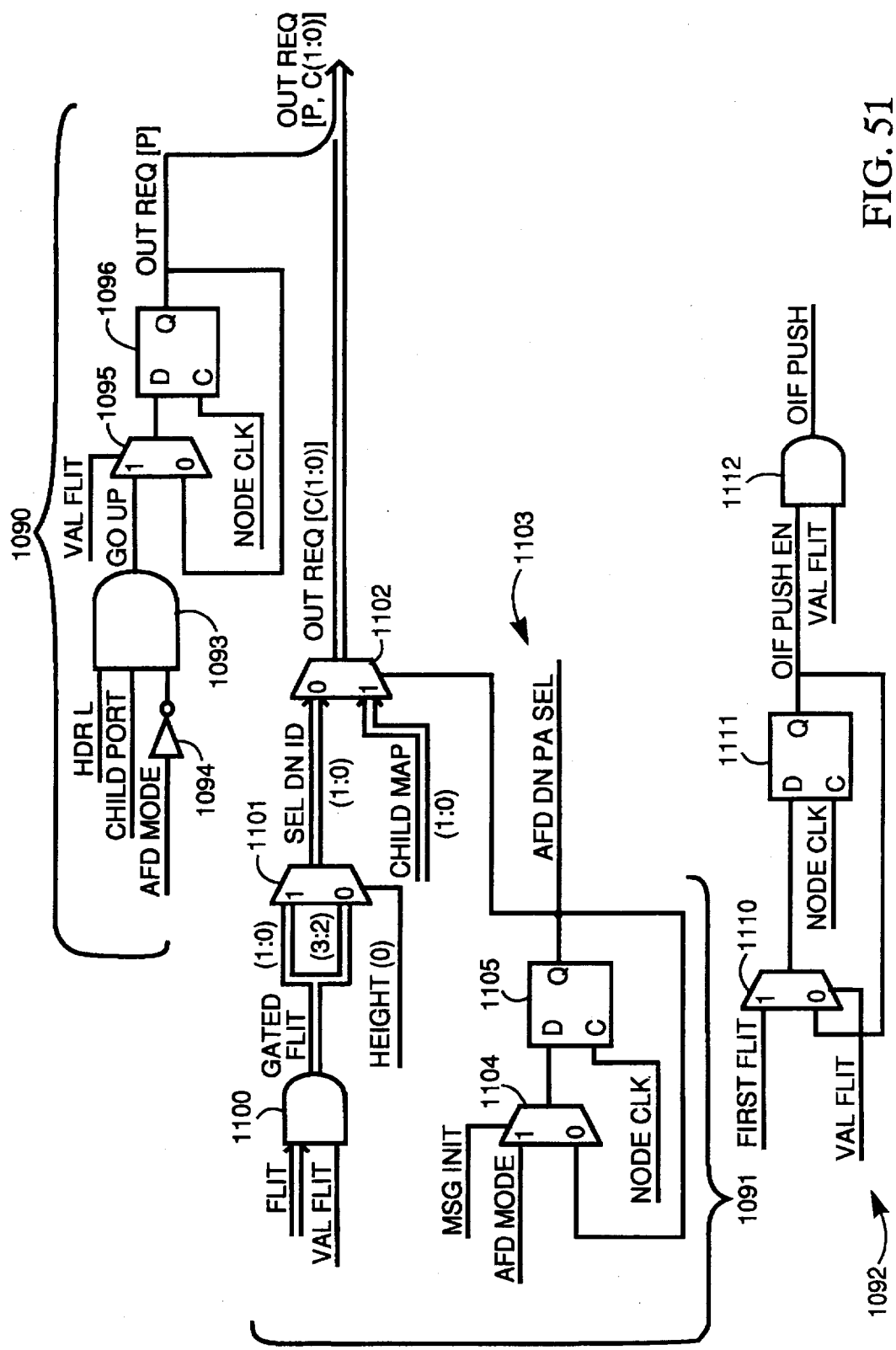

The flit flow control circuit 1040 will be described in connection with FIGS. 50 and 51, and in connection with FIG. 49, which depicts a state transition diagram for the input control circuit 1041. FIG. 50 depicts a portion of the flit flow control circuit that generates signals for the input message FIFO 1022, and FIG. 51 depicts a portion that generates signals for the output request identification FIFO 1023.

With reference to FIG. 50, the flit flow control circuit 1040 receives the FLIT signals at an OR gate 1050. If at least one of the flit signals is asserted, the OR gate 1050 is energized, which enables one input of an AND gate 1051. If the VAL FLIT valid flit signal is also asserted, AND gate 1051 is energized to assert a NOT ZERO signal. If the input control circuit 1041 is asserting the MSG INIT message initialization signal, and if the node control circuit 1004 (FIG. 45) is asserting the EN enable signal, the assertion of the NOT ZERO signal, while the VAL FLIT signal is asserted, energizes the AND gate 1052, enabling it to assert a FIRST FLIT signal. A driver 1053 receives the asserted FIRST FLIT signal and asserts BOM beginning-of-message signal.

The NOT ZERO signal is also coupled to an inverter 1054, which generates a ZERO signal. If the ZERO signal is asserted, either the VAL FLIT signal is negated, which disables AND gate 1051, or the OR gate 1050 may be de-energized. The OR gate 1050 is de-energized if all of the FLIT signals are negated.

Figure 49:
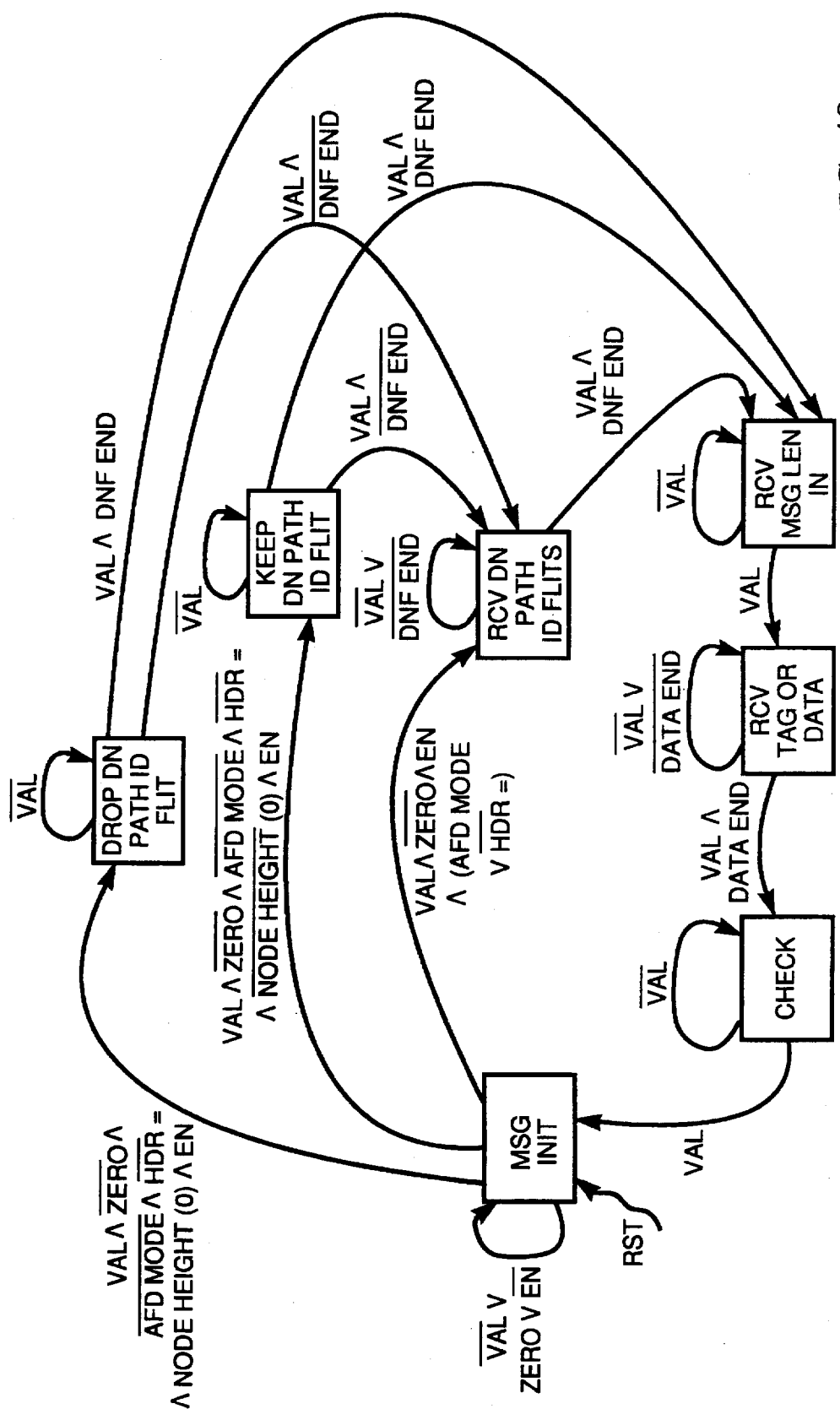

With reference to FIG. 49, as noted above, the input control circuit 1041 is initially asserting the MSG INIT message initialization signal. At that point, the circuit 1041 is in a message initialization state, indicated by the box labelled "MSG IN/T." The input control circuit remains in that state if the VAL FLIT valid flit or EN enable signals are not asserted, or of the inverter 1054 is asserting the ZERO signal. However, while the input control circuit 1041 is in the message initialization state, in response to the coincidence of the assertion of the VAL FLIT and EN signals, and the assertion by AND gate 1051 of the NOT ZERO signal resulting in the negation of the ZERO signal, the input control circuit 1041 sequences to one of three other states, as described below.

Returning to FIG. 50, the FLIT signals are also coupled to the input terminal of a gated driver 1055 and to an input terminal of a comparator 1056. The gated driver 1055 controls the coupling of FLIT signals to the input message FIFO 1022 in response to a FLIT/FIFO EN flit to FIFO enable signal from an AND gate 1057. The comparator 1056 receives the FLIT signals and the NODE HEIGHT (2:0) signals identifying the level "i" of the data router node 22(i,j,k) in the tree of data router 15. If the AND gate 1052 is asserting the FIRST FLIT signal, which occurs when the FLIT signals represent the header field 40 of the data router message packet 30, the comparator 1056 is enabled to compare the binary-encoded value of the NODE HEIGHT (2:0) signals to that of the FLIT signals.

If the comparator 1056 determines that the binary-encoded value of the FLIT signals is greater than that of the NODE HEIGHT (2:0) signals, it asserts a HDR<header less than node height signal. It will be appreciated that, with the binary-encoded value of the FLIT signals in this condition, the data router message packet 30 is to be transmitted up the tree defined by the data router 15, unless the AFD MODE all-fall-down mode signal is asserted. On the other hand, if the comparator 1056 determines that the binary-encoded value of the FLIT signals is less than or equal to that of the NODE HEIGHT (2:0) signals, which will occur if the data router message packet 30 is to be transmitted down the tree defined by the data router 15, it asserts a HDR=header equals node height signal.

If the comparator 1056 is asserting the HDR=header equals node height signal, and if the AFD MODE all-fall-down mode signal is negated and the input control circuit 1041 is asserting the MSG INIT message initialization signal, an AND gate 1060 is de-energized enabling it to assert a NEW HDR EN new header enable signal. It will be appreciated that this occurs when the FLIT signals represent the header field 40 of a data router message packet 30 to be transmitted down the tree represented by the data router 15 while it is not in all-fall-down mode. As noted above, the contents of the header field 40 as transmitted by a data router node 22(i,j,k) have a binary-encoded value corresponding to that as received, decremented by one.

To provide the new contents for header field 40, the asserted NEW HDR EN new header enable signal, in turn, enables a gated driver 1061 to coupled DECR HEIGHT decremented height signals as NEW HDR new header signals onto a bus 1062. The DECR HEIGHT decremented height signals are provided by a decrementation circuit 1063, which receives the NODE HEIGHT (2:0) signals and generates DECR HEIGHT signals whose binary-encoded value is one less than that of the he NODE HEIGHT (2:0) signals node height. Accordingly, the NEW HDR signals have a binary-encoded value one less than that of the NODE HEIGHT (2:0) signal.

If the comparator 1056 is not asserting the HDR=header equals node height signal, indicating that the data router message packet 30 is to be transferred up the tree defining data router 15, an AND gate 1060 is disabled. AND gate 1060 is also disabled if the AFD MODE all-fall-down mode signal is asserted indicating that the data router 15 is in all-fall-down mode, and if the MSG INIT message initialization signal is negated, indicating that the FLIT signals represent flits of a data router message packet 30 other than the header 40. In any of these cases, an inverter 1070 enables one input terminal of AND gate 1057. If the input control circuit 1041 is not asserting the CHECK signal, an inverter 1071 enables the second input terminal of AND gate 1057, enabling it to assert the FLIT/FIFO EN flit to FIFO enable signal. The asserted FLIT/FIFO EN signal enables the AND gate 1055 to couple the FLIT signals as FLIT TO FIFO signals onto bus 1062. Thus, the gate 1055 couples the FLIT signals to the bus 1062 if:

(i) the FLIT signals represent the header field 40 and the data router message packet 30 is to be transferred up the tree defining data router 15;

(ii) the FLIT signals represent the header field 40 and the AFD MODE all-fall-down mode signal is asserted; and (iii) the FLIT signals represent fields other than the header field 40 or the check field 33.

While the FLIT signals represent the header field 40, the asserted MSG INIT message initialization and NOT ZERO signals energize an AND gate 1064 to assert a BEG MSG begin message signal. The asserted BEG MSG signal energizes an OR gate 1065, which, in turn, enables one input terminal of an AND gate 1066. Since the VAL FLIT valid flit signal is asserted, the second input terminal of AND gate 1066 is also enabled, energizing the AND gate and enabling it to assert the IMF PUSH input message FIFO push signal. The asserted IMF PUSH signal enables the input message FIFO 1022 to store the IMF FLIT input message FIFO flit signals, which, as noted above, have a binary-encoded value corresponding to the binary-encoded value of the NODE HEIGHT (2:0) signals decremented by one.

Thereafter, the operations of the flit flow control circuit will depend on the particular state, following the message initialization state, to which the input control circuit 1041 sequences (FIG. 49). As noted above, the input control circuit 1041 may sequence from the message initialization state to one of three states. In two states, namely, a keep down path identification flit state identified by the box labelled "KEEP DN PATH ID FLIT," and a receive down path identification flits state identified by the box labelled "RCV DN PATH ID FLITS," the input control circuit 1041 enables the flit flow control circuit 1040 to receive FLIT signals representing the all of the successive flits of the down path identification portion 41 of the data router message packet 30. In that operation, the input control circuit 1041 negates the MSG INIT message initialization signal and maintains the DROP DN FLIT drop down path identification flit signal in a negated condition.

In the third state, identified as a drop down path identification flit state represented by the box labelled "DROP DN PATH ID FLIT," the input control circuit 1041 enables the flit flow control circuit 1040 to drop the first flit of the down path identification portion 41. In that state, the input control circuit 1041 asserts the DROP DN FLIT drop down path identification flit signal, and also negates the MSG INIT message initialization signal.

The input control circuit 1041 sequences from the message initialization stage in response to the coincidence of several conditions represented by signals having selected states. If the VAL FLIT valid flit, EN enable, and NOT ZERO signals are asserted, and if either the AFD MODE all-fall-down mode signal is asserted or the HDR=header equals node height signal is negated, the input control circuit 1041 sequences to the receive down path identification flits state. Thus, if the data router 15 is in all-fall-down mode, or if the flit flow control circuit 1040 determines, while the input control circuit is in the message initialization state, that the data router message packet 30 is to be transferred up the tree defining data router 15, the input control circuit 1041 sequences to the receive down path identification state.

On the other hand, if the VAL FLIT valid flit, EN enable, and NOT ZERO signals are asserted, and if the HDR=header equals node height signal is asserted while the NODE HEIGHT (0) and AFD MODE all-fall-down mode signals are negated, the input control circuit 1041 sequences to the keep down path identification flit state. Thus, if (a) the data router is not in all-fall-down mode, (b) the level "i" of the data router node 22(i,j,k) is an even number, and (c) the data router message packet is to be transferred down the tree defining data router 15, the input control circuit 1041 sequences to the keep down path identification flit state.

Finally, if the VAL FLIT valid flit, EN enable, and NOT ZERO signals are asserted, and if the HDR=header equals node height and NODE HEIGHT (0) signals are asserted when the AFD MODE all-fall-down mode signal is negated, the input control circuit 1041 sequences to the drop down path identification flit state. Thus, if (a) the data router is not in all-fall-down mode, (b) the level "i" of the data router node 22(i,j,k) is an odd number, and (c) the data router message packet is to be transferred down the tree defining data router 15, the input control circuit 1041 sequences to the drop down path identification flit state. As noted above, in that state the input control circuit 1041 asserts the DROP DN FLIT drop down flit signal.

Returning to FIG. 50, when the input control circuit 1041 sequences from the message initialization state it negates the MSG INIT message initialization signal. The negated MSG INIT signal is complemented by inverter 1070 to enable one input terminal of AND gate 1057. In any of the states immediately following the message initialization state, the input control circuit 1041 also negates the CHECK signal, which is complemented by inverter 1071. In that condition, the AND gate 1057 is energized, enabling it to assert the FLIT/FIFO EN flit to FIFO enable signal, which enabled gated driver 1055 to couple the FLIT signals as FLIT TO FIFO signals onto bus 1062.

The negated MSG INIT signal also disables the AND gate 1064, causing it to negate the BEG MSG begin message signal, which, in turn, disables one input terminal of the OR gate 1065. The negated MSG INIT message initialization signal, on the other hand, is complemented by an inverter 1072 to enable one input of an AND gate 1073. If the DROP DN FLIT signal is negated, which occurs if the input message control sequences to the keep down path identification flit state or the receive down path identification flits state, an inverter 1074 enables the second input terminal of AND gate 1073, thereby energizing the AND gate to assert a CONT MSG continue message signal. The asserted CONT MSG signal maintains the OR gate 1065 in an energized condition, enabling, in turn, AND gate 1066 to maintain the IMF PUSH input message FIFO push signal in an asserted condition while the VAL FLIT signal remains asserted. Thus, if the input control circuit 1041 sequences from the message initialization state to either the keep down path identification flit state or the receive down path identification flits state, it enables the flit flow control circuit 1040 to maintain the IMF PUSH input message FIFO push signal at an asserted level while FLIT TO FIFO signals representing both the header field 40 and the first flit of the down path identification portion 41 are coupled onto bus 1062.

On the other hand, if the input control circuit 1041 sequences from the message initialization state to the drop down path identification flit state, and thereby asserts the DROP DN FLIT drop down flit signal, the inverter 1074 disables the AND gate 1073 to negate the CONT MSG continue message signal. Since the AND gate 1064 is also negating the BEG MSG begin message signal, the OR gate 1065 is de-energized, disabling AND gate 1066 to thereby negate the IMF PUSH input message FIFO push signal. The AND gate 1055 is at that point coupling the FLIT signals as FLIT TO FIFO signals onto bus 1062 representing the first flit of the down path identification portion 41. However, since the IMF PUSH signal is negated, the input message FIFO 1022 is disabled from storing the signals. Accordingly, the asserted DROP DN FLIT drop down flit signal causes the first flit of the down flit identification portion 41 to be dropped from the data router message packet 30 to be transferred.

The negation of the MSG INIT message initialization signal by the input control circuit 1041 also inhibits the down path identification flit counter 1042 from continuing to load the FLIT signals. Thereafter, while the VAL FLIT valid flit signal is asserted, the counter 1042 is enabled to decrement in response to each tick of the NODE CLK signal. As noted above, while the VAL FLIT signal is asserted, the FLIT signals at successive ticks of the NODE CLK signal represent successive flits of the data router message packet 30. When the MSG INIT message initialization signal is negated, the FLIT signals loaded by the down path identification flit counter 1042 represent the header field 40 of the data router message packet 30 being transferred, which, as noted above, identifies the number of flits in the down path identification portion 41.

Returning to FIG. 49, the input control circuit 1041 stays in the drop down path identification flit state or the keep down path identification flit state while the flit flow control circuit 1040 receives only one flit, namely, the first flit of the down path identification portion. Thereafter, the input control circuit 1041 sequences to either the receive down path identification flits state or a receive message length in state, the latter being represented by the box labelled "RCV MSG LEN IN." If, with the input control circuit 1041 being in the drop down flit identification flit state or in the keep down path identification flit state, the down path identification flit counter 1042 is not asserting the DNF END down flit end signal, the input control circuit 1041 sequences to the receive down path identification flits state. In that state, the input control circuit 1041 continues to maintain all of its output signals, including the DROP DN FLIT signal, in a negated condition. As described above, while the VAL FLIT signal is asserted, the negated DROP DN FLIT signal maintains the AND gate 1066 (FIG. 50) energized to maintain the IMF PUSH input message FIFO push signal in an asserted condition.

If, on the other hand, when the input control circuit 1041 is in either the drop down path identification fit state or the keep down path identification flit state and the down path identification flit counter 1042 counts out and asserts the DNF END signal, it (that is, the input control circuit 1041) will sequence to the receive message length in state. That will occur if the down path identification portion 41 of the data router message packet 30 being received has a length of one flit. If the input control circuit 1041 is in the receive down path identification flits state, it will also sequence to the receive message length in state when the down path identification flit counter 1042 counts out and asserts the DNF END signal. This will occur when the down path identification portion 41 of the data router message packet 30 that is being received has a length greater than one flit. In either case, when the input control circuit is in the receive message length in state, it asserts a MSG LEN IN message length in signal.

The input control circuit 1041 asserts the MSG LEN IN message length in signal when the FLIT signals represent the message length field 34 of the data router message packet 30. The asserted MSG LEN IN signal enables the data flit counter 1043 to load the FLIT signals. The MSG LEN IN signal also enables one input terminal of an AND gate 1075. If the FLIT signals have a binary-encoded value of zero, which will be indicated if the inverter 1054 is asserting the ZERO signal, the message data portion 32 has no data flits 36. In that case, the second input terminal of the AND gate 1075 is also enabled, energizing the AND gate, enabling it to assert a NO DATA signal. The asserted NO DATA signal energizes OR gate 1076, enabling it to assert the NEOM near end-of-message signal, which is coupled to the input message FIFO 1022 as described above.

On the other hand, if the FLIT signals do not have a binary-encoded value of zero, the data flit counter 1043 will decrement, while the VAL FLIT valid flit signal is asserted, in response to successive ticks of the NODE CLK signal, and will assert the NR DATA END near data end signal a predetermined number of flits prior to the last data flit 36, and the DATA END signal contemporaneously with the last data flit 36 in the data router message packet 30 being received.

With the input control circuit 1041 in the receive message length in state, if the VAL FLIT signal valid flit signal is asserted the input control circuit 1041 sequences to a receive tag or data state. In that state, the input control circuit 1041 asserts a TAG OR DATA signal. The input control circuit maintains the TAG OR DATA signal in the asserted condition while the FLIT signals represent the tag field 35 or data flits 36 of the received data router message packet 30. The asserted TAG OR DATA signal enables one input terminal of an AND gate 1077. When the data flit counter 1043 asserts the NR DATA END near data end signal, the second input terminal of AND gate 1077 is enabled, thereby energizing the AND gate 1077 to assert a NR END near end signal. The asserted NR END signal energizes the OR gate 1076 to assert the NEOM near end of message signal.

Thereafter, the data flit counter 1043 decrements again in response to receipt of the next flit of the data router message packet 30. At that point, the counter negates the NR DATA END near data end signal, causing the AND gate 1077 to be de-energized and thereby negating the NR END near end signal. The negation NR END signal, in turn, de-energizes the OR gate 1076 to negate the NEOM near end-of-message signal.

While the input control circuit 1041 is in the receive tag or data state, if the VAL FLIT valid flit signal is asserted the flit flow control circuit 1040 maintains the IMF PUSH input message FIFO push signal in the asserted state to enable the input message FIFO 1022 to receive and store the successive flits of the data router message packet 30. While the input control circuit 1041 is in the receive tag or data state, it maintains the MSG INIT message initialization and DROP DN FLIT drop down flit signals in the negated condition. Accordingly, inverters 1072 and 1074 maintain the AND gate 1073 in the energized condition, which, in turn, maintain OR gate 1065 energized to enable one input terminal of AND gate 1066. While the VAL FLIT valid flit signal is asserted, the AND gate 1066 maintains the IMF PUSH signal asserted, as indicated above.

As shown on FIG. 49, when the data flit counter 1044 asserts the DATA END signal, the input control circuit 1041 sequences to a check state. During the check state, the input control circuit 1041 enables the flit flow control circuit 1040 to couple IMF FLIT input message FIFO flit signals corresponding to either the true or complement of the NEW CHECKSUM signals generated by the checksum check/generator circuit 1044 as the checksum field 33 of the data router message packet 3. If the checksum check/generator circuit 1044, while receiving the successive flits of the data router message packet 30 being received, computes a checksum that corresponds to the checksum in the checksum field 33, the flit flow control circuit 1040 couples the true of the NEW CHECKSUM signals as the IMF FLIT signals. On the other hand, if the checksum check/generator circuit 1044 computes a checksum that differs from the checksum in the checksum field 33, the flit flow control circuit 1040 couples that the complement of the NEW CHECKSUM signals as the IMF FLIT signals.

By providing the complement of the checksum signals in the checksum field 33 upon detection of an error by the checksum check/generator circuit 1044, the flit flow control circuit 1040 enhances the likelihood that the error indication will propagate through subsequent data router nodes 22(i,j, k) in the path from the source leaf 21(x) to the destination leaf 21(y). Since all of the signals in the checksum field 33 are complemented, the next data router node 22(i,j,k) to receive the data router message packet 30 will likely detect an error indication, and will couple the complement of the checksum signals computed by the checksum check/generator circuit 1044 at that node to the next data router node 22(i,j,k), and so on. In particular, since all of the signals in the checksum field 33 are complemented, single-bit errors in one or several of the signals in the transmission through subsequent data router nodes 22(i,j,k) is unlikely to result in masking of the error condition in connection with the data router message packet 30.

To accomplish this, in the check state, the input control circuit 1041 negates the TAG OR DATA signal and asserts a CHECK signal. The asserted CHECK signal enables the checksum check/generator circuit 1044 (FIG. 48) to transmit the checksum value generated thereby as NEW CHECKSUM signals, and to transmit a CHECK OK signal indicating whether the flit flow control circuit 1040 properly received the data router message packet 30. If the CHECK OK signal is asserted, the flit flow control circuit 1040 properly received the data router message packet 30, and if the signal is negated the flit flow control circuit 1040 did not properly receive the data router message packet 30.

The CHECK, NEW CHECKSUM and CHECK OK signals are also coupled to the flit flow control circuit 1040. As shown on FIG. 50, the asserted CHECK signal is complemented by inverter 1071 to disable AND gate 1057, thereby disabling gated driver 1055 from coupling the FLIT signals then being received as FLIT TO FIFO signals onto bus 1062. It will be appreciated that the FLIT signals at this point correspond to the CHECKSUM field 33 of the data router message packet 30 being received. The CHECK signal also controls two gated drivers 1080 and 1081, which are also controlled by the true and complement, respectively, of the CHECK OK signal from checksum check/generator circuit 1044. The gated driver 1080 also receives the true of the NEW CHECKSUM signals, and gates them as NEW CHECKSUM TO FIFO signals onto bus 1062 if both the CHECK and CHECK OK signals are asserted.

An inverter 1082 receives the NEW CHECKSUM signals and generates complements of the respective signals, which are coupled to input terminals of gated driver 1081. If the CHECK OK signal is negated, indicating that the checksum check/generator circuit 1044 detected an error in the received data router message packet 30, an inverter 1083 enables a respective input terminal of gated driver 1081. If the CHECK signal is also asserted, the gated driver 1081 couples the complements of the NEW CHECKSUM signals provided by inverter 1082 as BAD CHECKSUM TO FIFO signals onto bus 1062.

In either case, since at this point the input control circuit is maintaining the MSG INIT message initialization and DROP DN FLIT drop down flit signals in a negated condition, the AND gate 1073 and OR gate 1065 are energized. If the VAL FLIT signal is asserted, AND gate 1066 remains energized to assert the IMF PUSH input message FIFO push signal, enabling the input message FIFO 1022 to load the signals on bus 1062 as the new checksum field 33 of the data router message packet 30. If the CHECK OK signal is asserted, indicating that the data router message packet 30 as received was properly received, the input message FIFO 1022 loads the NEW CHECKSUM TO FIFO signals as the checksum field 33. However, if the CHECK OK signal is negated, indicating that the data router message packet 30 as received was not properly received, the input message FIFO 1022 loads the BAD CHECKSUM TO FIFO signals as the checksum field 33.

The CHECK signal is also coupled to a driver 1084 which provides the EOM end-of-message signal. When the CHECK signal is asserted, the driver 1084 asserts the EOM signal, which is loaded along with the IMF FLIT input message FIFO flit signals on bus 1062.

Returning to FIG. 49, when the input control circuit 1041 is in the CHECK state, if the VAL FLIT signal is asserted it sequences to the message initialization state at the next tick of the NODE CLK signal. Thus, the input control circuit 1041 remains in the check state while the flit flow control circuit 1040 receives FLIT signals representing one flit, namely the flit representing checksum field 33. When the input control circuit 1041 leaves the check state, it negates the CHECK signal, which disables gated drivers 1080 and 1081 (FIG. 50). In addition, the negated CHECK signal is complemented by inverter 1071 to enable one input terminal of AND gate 1057, to allow the AND gate 1057 to be thereafter controlled by the complemented NEW HDR EN new header enable signal as provided by inverter 1070.

As described above, when the input control circuit 1041 is in the message in itialization state, it asserts the MSG INIT message initialization signal, which enables respective input terminals of AND gates 1052, 1060 and 1064, and through inverter 1072 disables an input terminal of AND gate 1073. Thus, the flit flow control circuit 1040 is in condition to begin receiving flits for a new data router message packet 30.

The flit flow control circuit 1040 also provides the VAL FLOW valid flow signal to the interface 1020, which the interface uses to control the condition of the C0 IN FLY input fly signal. With reference to FIG. 50, the flit flow control circuit 1040 includes an inverter 1085, which receives the IMF NR FULL input message FIFO nearly full signal from the input message FIFO 1022 and transmits the complement as the VAL FLOW signal. Thus, the VAL FLOW signal reflects the extent to which the input message HFO 1022 has been filled.

As noted above, the flit flow control circuit 1040 also provides the OUT REQ [P,C(1:0)] output request signal and OIF PUSH output identification FIFO push signal to output request identification FIFO 1023. The circuitry for this is depicted on FIG. 51. With reference to FIG. 51, the circuitry includes a parent request generator portion 1090, a child request generator portion 1091 and a push signal generator portion 1092. The parent request generator portion 1090 includes an AND gate 1093 that receives a CHILD PORT signal which is asserted if the circuit is in an input child interface 1006(i), and the complement of the AFD MODE all-fall-down mode signal as complemented by an inverter 1094. If the CHILD PORT signal is asserted and the AFD MODE all-fall-down mode signal is negated, if HDR<header value less than node height signal from comparator 1056 is asserted, indicating that the data router message packet 30 is to be transmitted up the tree defining data router 15, the AND gate 1093 is energized to assert a GO UP signal.

The GO UP signal is coupled to one data input terminal of a multiplexer 1095. If the VAL FLIT signal is asserted, multiplexer 1095 couples the GO UP signal, now asserted, to the data input terminal of a flip-flop 1096, which is set in response to the next tick of the NODE CLOCK signal. The set flip-flop 1096 asserts the OUT REQ [P] output request (parent) signal, which forms one of the OUT REQ [P,C(1:0)] output request signals. If the VAL FLIT signal is negated with the flip-flop 1096 in that condition, multiplexer 1095 is enabled to couple the OUT REQ [P] signal to the data input terminal of the flip-flop 1096, so that the flip-flop 1096 will remain set in response to subsequent ticks of the NODE CLK signal.

If (a) the HDR<header value less than node height signal from comparator 1056 is negated, or (b) the CHILD PORT signal is negated indicating that the circuit is in an input parent interface 1010(i), or (c) the AFD MODE all-fall-down mode signal is asserted, indicating that the data router 15 is in all-fall-down mode, the data router node 22(i,j,k) is to transfer the data router message packet 30 being received down the tree defining the data router 15. In that case, the AND gate 1093 is de-energized to negate the GO UP signal. If the VAL FLIT valid flit signal is asserted, multiplexer 1095 couples the negated GO UP signal to the data input terminal of flip-flop, which is clear in response to the next tick of the NODE CLK signal, to, in turn, negate the OUT REQ [P] output request (parent) signal. If the VAL FLIT signal is negated with the flip-flop 1096 in that condition, multiplexer 1095 is enabled to couple the OUT REQ [P] signal to the data input terminal of the flip-flop 1096, so that the flip-flop 1096 will remain clear in response to subsequent ticks of the NODE CLK signal.

The child request generator portion 1091 includes a gated driver 1100 that receives the FLIT signals from the interface 1020 and the VAL FLIT valid flit signal. If the VAL FLIT signal is asserted, the gated driver 1100 couples the FLIT signals as GATED FLIT signals to input terminals of a multiplexer 1101. As noted above, the FLIT signals comprise four signals in parallel. The high-order GATED FLIT signals, identified as GATED FLIT (3:2) signals, are coupled to one set of input terminals of multiplexer 1101, and the low-order GATED FLIT signals, identified as GATED FLIT (1:0) signals, are coupled to a second set of input terminals of multiplexer 1101.

As noted above, if the FLIT signals represent flits in the down path identification portion 41, the high-order bits in each flit, which are represented by the high-order GATED FLIT (3:2) signals, are used in a data router node 22(i,j,k) at an even-numbered level "i" to determine the child to receive the data router message packet 30. On the other hand, the low-order bits in each flit, which are represented by the low-order GATED FLIT (1:0) signals, are used in a data router node 22(i,j,k) at an odd-numbered level "i" to determine the child. In addition, the low-order NODE HEIGHT (0) signal, which if asserted indicates that the data router node 22(i,j,k) is at an odd-numbered level and if negated indicates that it is at an even-numbered level.

Accordingly, the NODE HEIGHT (0) signal controls the multiplexer 1101. If the NODE HEIGHT (0) signal is asserted, multiplexer 1101 couples the GATED FLIT (1:0) signals as SEL DN ID (1:0) selected down path identification signals to an input terminal of a second multiplexer 1102. On the other hand, if the NODE HEIGHT (0) signal is negated, the multiplexer 1101 couples the GATED FLIT (3:2) signals as the SEL DN ID (1:0) signals.

Multiplexer 1102 receives the SEL DN ID (1:0) selected down path identification signals at one set of input terminals. At a second set of input terminals, the multiplexer 1102 receives CHILD MAP (1:0) child map signals.. The CHILD MAP (1:0) signals are provided by the node control circuit 1004 (FIG. 45) to identify, for each of the input child and parent interface circuits 1006(i) and 1010(i), one output child circuit 1007(i) to which data router message packets 30 are to be coupled while the data router 15 is in all-fall-down mode. The multiplexer 1102 is controlled by an AFD DN PA SEL all-fall-down down path select signal from an all-fall-down latch circuit 1103.

The all-fall-down latch circuit 1104 includes a multiplexer 1104 which receives the AFD MODE all-fall-down mode signal at one input terminal. If the input control circuit 1041 is asserting the MSG INIT message initialization signal, the multiplexer 1104 couples the AFD MODE all-fall-down mode to the input terminal of a flip-flop 1105. The flip-flop 1105 is set or clear in response to the next tick of the NODE CLK signal to generate an asserted or negated AFD DN PA SEL AFD MODE all-fall-down down path select signal. As noted above, the input control circuit 1041 maintains the MSG INIT signal asserted for only one tick of the NODE CLK signal following receipt of FLIT signals representing the first flit of a data router message packet 30. Thereafter, the MSG INIT signal is negated, which enables the multiplexer 1104 to couple the AFD DN PA SEL signal to the data input terminal of the flip-flop 1105.

Accordingly, the flip-flop 1105 maintains the AFD DN PA SEL all-fall-down down path select signal in a constant condition after the flit flow control circuit 1040 receives the first flit of the data router message packet 30. If the AFD MODE all-fall-down mode signal is at that point negated, indicating that the data router 15 is not in all-fall-down mode, the flip-flop 1105 is clear, thereby negating the AFD DN PA SEL signal. On the other hand, if the AFD MODE all-fall-down mode signal is asserted, indicating that the data router 15 is in all-fall-down mode, the flip-flop 1105 is set, thereby asserting the AFD DN PA SEL signal.

If the AFD DN PA SEL signal is negated, the multiplexer 1102 is enabled to couple the SEL DN ID (1:0) selected down path identification signal as the OUT REQ [C(1:0)] output request signals. In this condition, the OUT REQ [C(1:0)] signals are derived from the FLIT signals representing flits of the down path identification portion 41 of the data router message packet 30. If, on the other hand, the AFD MODE all-fall-down mode signal is asserted, the multiplexer 1102 is enabled to couple the CHILD MAP (1:0) signals as the OUT REQ [C(1:0)] signals.

It will be appreciated that the parent request generator portion 1090 and child request generator portion 1091 will respond to FLIT signals representing all of the successive flits received by the flit flow control portion 1040. The push signal generator portion 1092, which generates the OIF PUSH output identification FIFO push signal, enables the output request identification FIFO 1023 to load the OUT REQ [P,C(1:0)] signals when they are based on FLIT signals representing the header field 40 and first flit of the down path identification portion 41. The push signal generator portion includes a multiplexer 1110 that receives at one input terminal FIRST FLIT signal from AND gate 1052 (FIG. 50). As noted above, the FIRST FLIT signal is asserted when the FLIT signals represent the header field 40 of the data router message packet 30 being received. It will be appreciated that at that point the HDR<header value less than node height signal received by the AND gate 1093 (FIG. 51) corresponds to the result of the comparison between the node height and the value of the header field 40 as performed by comparator 1056.

The output of multiplexer 1110 is coupled to the data input terminal of a flip-flop 1111, which is set in response to the next tick of the NODE CLK signal to assert an OIF PUSH EN output identification FIFO push enable signal. It will be appreciated that at that point, the flip-flop 1096 in the parent request generator portion 1090 also latches the signal from the multiplexer 1095 that represents the state of the GO UP signal. Accordingly, the OIF PUSH EN signal is asserted at the same point that the OUT REQ [P] signal indicates whether the data router message packet 30 is to be transmitted up the tree defining the data router 15.

Contemporaneously, if the VAL FLIT signal is asserted, the GATED FLIT signals will represent the first flit of the down path identification portion 41 of the data router message packet 30 being receive. Thus, the OUT REQ [C(1:0)] signals will identify a down path identifier. Since the VAL FLIT and OIF PUSH EN output identification FIFO push enable signals are asserted, an AND gate 111 is energized to assert the OIF PUSH output identification FIFO push signal, which is coupled to the output request identification FIFO 1022 (FIG. 46). The output request identification FIFO 1022 loads the OUT REQ [P,C(1:0)] signals at the next tick of the NODE CLK signal.

As noted above, the FIRST FLIT signal is asserted by AND gate 1052 only while the FLIT signals represent the header field 1041. Accordingly, at that point, the FIRST FLIT signal will be negated. Since the VAL FLIT signal is asserted, multiplexer 1110 couples a negated signal to the data input terminal of flip-flop 1111, which is reset at the next tick of the NODE CLK signal to negate the OIF PUSH EN output identification FIFO push enable signal. Since the OIF PUSH EN signal is negated, the OIF PUSH output identification FIFO push signal will also be negated.

It will be appreciated that the flip-flop 1096 in parent request generator portion 1090 and flip-flop 1111 in push signal generator portion 1092 effectively correspond to delay lines. The respective flip-flops delay the respective GO UP and OIF PUSH EN output identification FIFO push enable signals so that they will be coupled to the output request identification FIFO 1023 contemporaneously with the generation by the child request generator portion 1091 of the OUT REQ [C(1:0)] signals in response to FLIT signals representing the first flit of the down path identification portion 41 of the data router message packet 30 being received. It will be appreciated, however that the FLIT signals representing the first flit of the down path identification portion 41 may be stalled. In that case, the VAL FLIT valid flit signal be negated. The negated VAL FLIT signal enables the multiplexers 1095 and 1110 to, in turn, enable respective flip-flops 1096 and 1111 to maintain their respective condition at subsequent ticks of the NODE CLK signal. The negated VAL FLIT signal also disables AND gate 1112, which also negates the OIF PUSH output identification FIFO push signal, inhibiting the output request identification FIFO 1022 from loading the OUT REQ [P,C(1:0)] signals.

Figure 52:
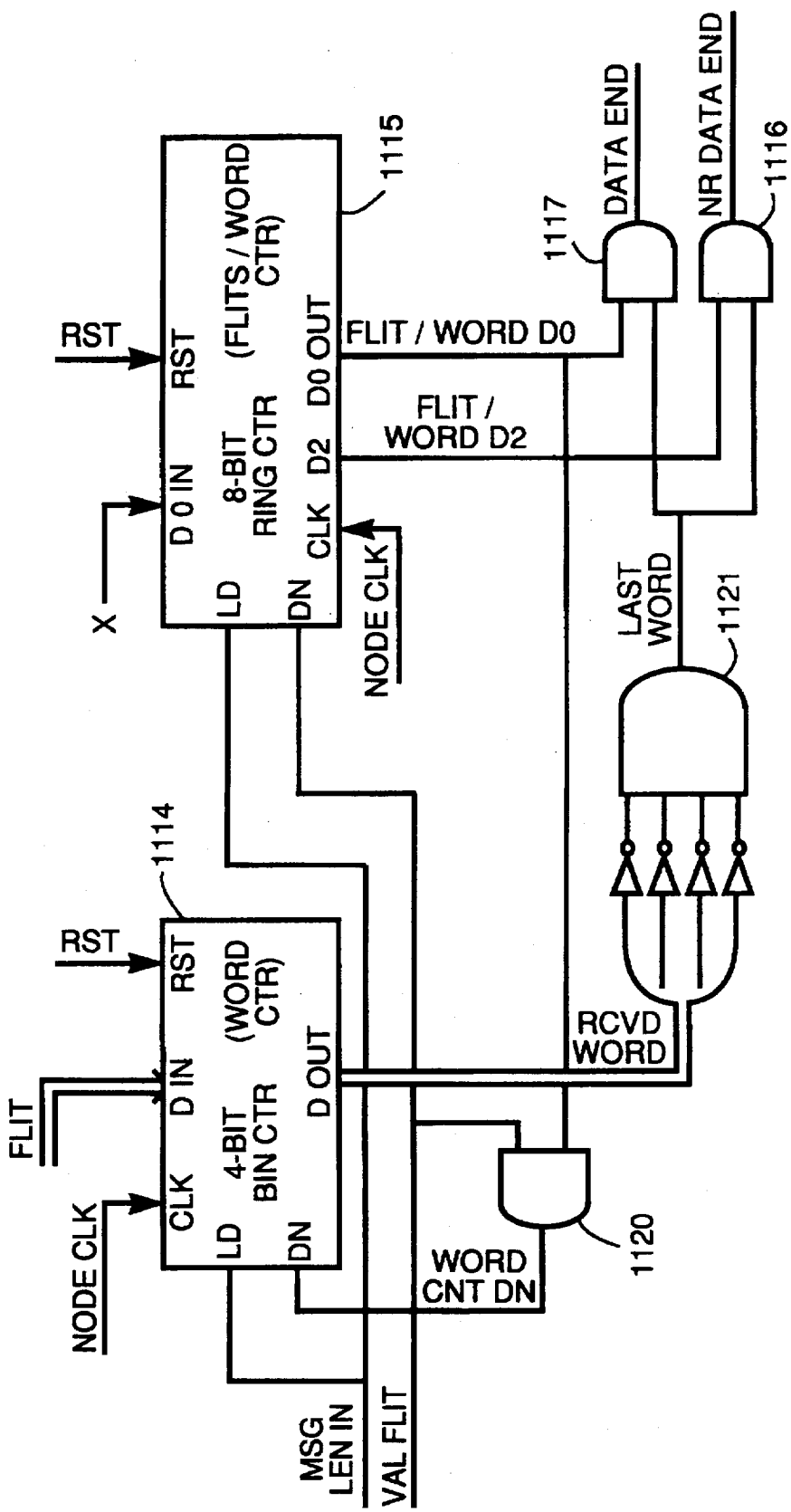
Figure 53:
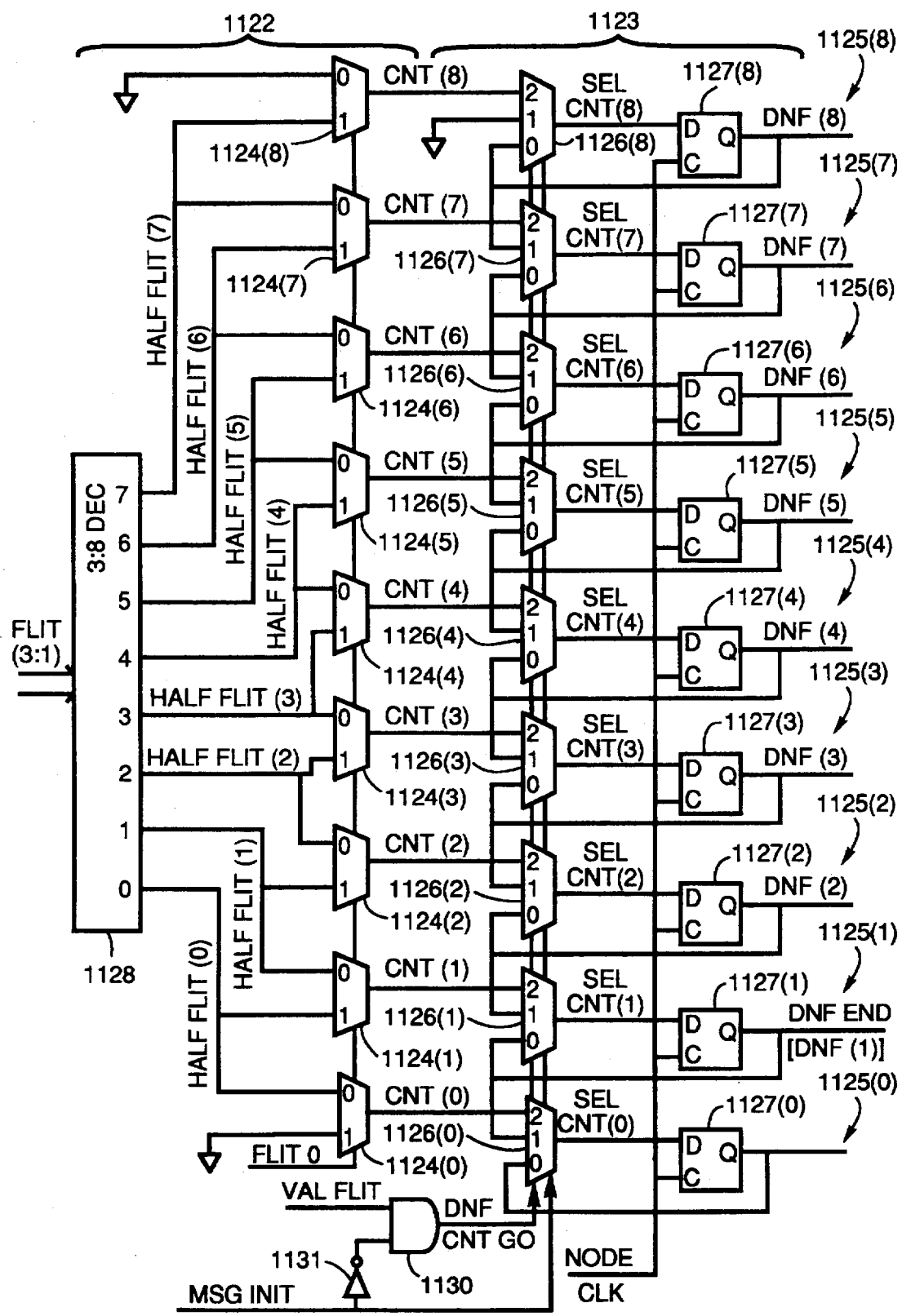

FIGS. 52 and 53 depict detailed diagrams of, respectively, the data flit counter 1043 and down path identification flit counter 1042. With reference to FIG. 52, the data flit counter 1042 comprises two counters, namely, a binary counter 1114 and a ring counter 1115. As noted above, the value in the message length field 34 of a data router message packet 30 identifies the number of thirty-two bit words contained in the data flits 36 in the data portion 32, and each thirty-two bit word is contained in eight successive four-bit flits. In that case, the ring counter 1115 decrements when each flit is received and counts out after receipt of the number of flits containing each word. When the ring counter 1115 counts out, it enables the binary counter 1114 to decrement. At that point, the ring counter is reinitialized and resumes decrementing while flits for the next word are being received. These operations are repeated until the binary counter 1114 has counted out and the ring counter 1115 has almost counted out, AND gate 1116 is energized to assert the NR DATA END near data end signal. When the ring counter 1115 later counts out, an AND gate 1117 is energized to assert the DATA END signal.

More particularly, the FLIT signals are coupled to the data input terminals of binary counter 1114. When the input control circuit 1041 asserts the MSG LEN IN message, at which point the FLIT signals represent the flit corresponding to the message length field 34 of the data router message packet 30, the binary counter 1114 loads the FLIT signals. Contemporaneously, the ring counter 1115 is initialized to load a value corresponding to the number of flits in the data portion 32 of a data router message packet 30 are required to hold a thirty-two bit data word. Since in one embodiment eight flits are required, the ring counter 1115 has eight bits. It will be appreciated that, in embodiments having a different number of flits for each data word, the ring counter 1115 may have a corresponding different number of bits. To accommodate the additional flit for the tag field 35, the low-order bit of the ring counter 1115 is energized to load a value of "one," and the other bits are de-energized load values of "zero."

While the VAL FLIT valid signal is asserted, indicating that FLIT signals representative of flits of the data router message packet 30 are being received, the ring counter 115 is enabled to decrement. While enabled, since the flit flow control circuit 1040 receives successive flits in synchronism with successive ticks of the NODE CLK signal, the ring counter decrements at each tick of the NODE CLK signal. At the first tick of the NODE CLK signal after being loaded, which occurs when the flit containing the tag field 35 is being received, the ring counter 1115 sequences to energize its high-order bit. It will be appreciated that that high-order bit is energized contemporaneously with the receipt by the flit flow control circuit 1040 of FLIT signals corresponding to the first data flit 36. While the VAL FLIT signal is asserted, in synchrony with successive ticks of the NODE CLK signal, the flit flow control circuit 1040 receives successive data flits 36 of the data router message packet 30 being received, and when it counts out, the number of data flits 36 have been received corresponding to the number of flits in a thirty-two bit word.

At that point, the ring counter 1115 asserts a FLIT/WORD D0 flits-per-word D0 signal, which energizes one input terminal of an AND gate 1120. If the VAL FLIT signal is asserted, the other input terminal of AND gate 1120 is also energized to assert a WORD CNT DN word count down signal, which enables the binary counter 1114 to decrement. In response to the next tick of the NODE CLK signal, the binary counter 1114 decrements. The binary counter 1114 transmits RCVD WORD received word signals that identify, in binary-encoded form, the number of thirty-two bit words to be received.

While the VAL FLIT signal is asserted, since the counter 1115 is a ring counter, at the next tick of the NODE CLK signal after its low-order bit is energized, the high-order bit will be energized, and with successive NODE CLK signals the bit that is energized will correspond to the number of data flits 36 remaining to be received for the thirty-two bit data word. If the VAL FLIT signal is negated, indicating that the reception of flits has been stalled, the ring counter 1115 stops decrementing. It resumes decrementing when the VAL FLIT signal is again asserted, indicating that reception of flits has resumed.

These operations continue until the RCVD WORD received word signals are all negated. At that point, the RCVD WORD signals have a binary-encoded value of zero, indicating that the flit flow control circuit 1040 is receiving the data flits 36 representing the last thirty-two bit data word in the data router message packet 30. The negated RCVD WORD signals are complemented to energize an AND gate 1121, which asserts a LAST WORD signal. The asserted LAST WORD signal, in turn, enables one input terminal of AND gates 1116 and 1117. Contemporaneously with the reception by the flit flow control circuit of the third to last data flit 36 in the data portion 32 of the data router message packet 30 being received, the ring counter 1115 asserts a FLIT/WORD D2 flits per word D2 signal, which enables the second input terminal of AND gate 1116. This energizes the AND gate to assert the NR DATA END near data end signal. As described above, the flit flow control circuit 1040 uses this signal in generating the NEOM near end-of-message signal.

Thereafter, contemporaneously with the reception by the flit flow control circuit of the last data flit 36 in the data portion 32, the ring counter asserts the FLIT/WORD D0 flits per word D0 signal, which enables the second input terminal of AND gate 1117. This energizes the AND gate to assert the DATA END signal. As described above, the flit flow control circuit 1040 uses this signal in generating the EOM end-of-message signal.

It will be appreciated that the ring counter 1115 also generates the FLIT/WORD D2 and FLIT/WORD D0 signals contemporaneously with reception by the flit flow control circuit 1040 of the third to last and last flits 36 of the data portion 32. However, except during reception of the last thirty-two bit data word, the AND gate 1121 is de-energized, which maintains the LAST WORD signal negated, which consequently maintains the AND gates de-energized and the NR DATA END and DATA END signals negated.

FIG. 53 depicts a detailed logic diagram of the down path identification flit counter 1042. With reference to FIG. 53, the counter 1042 includes a decoder portion 1122 and a counter portion 1123. The decoder portion generates a plurality of CNT (i) count signals ("i" is an integer from zero to eight) that identifies the number of flits in the down path identification portion 41 of the data router message packet 30 being received. The counter portion 1123 decrements contemporaneously with the receipt by the flit flow control circuit 1040 of FLIT signals representing the successive flits of the down path identification portion, and generates the DNF END down flit end signal when the last flit in portion 41 is being received.

As described above, the header field 40 in a data router message packet 30 contains a value that essentially identifies the number of down path identification fields 42 in the down path identification portion 41. In addition, each flit in the down path identification portion 41 includes two down path identification fields 42. Thus, if the value in header field 40 is an even number, the number of flits in the down path identification portion is one-half the value in the header field 40. On the other hand, if the value in the header field 40 is an odd number, the number of flits in the down path identification portion is the one plus the greatest integer in one-half the value in the header field 40. The decoder portion 1122 energizes the CNT (i) count signal whose index "i" corresponds to this number.

In particular, the decoder portion 1122 includes a decoder 1128 that receives the high-order FLIT (3:1) signals and generates in response thereto HALF FLIT (i) signals ("i" is an integer from zero to eight). The high-order FLIT (3:1) signals represent a binary-encoded value corresponding to the greatest integer in one half of the binary-encoded value of the four-bit FLIT signals. The decoder 1128 asserts one of the HALF FLIT (i) signals whose index "i" corresponds to this value.

The decoder portion 1122 also includes a set of multiplexers 1124(i) ("i" is an integer from zero to eight). Each multiplexer 1124(i) generates one of the CNT (i) count signals of corresponding index "i". In addition, each multiplexer 1124(i) receives, at one input terminal the HALF FLIT (i) signal and at the other input terminal the HALF FLIT (i−1) signal from the decoder 1128.

The multiplexers 1124(i) are controlled in parallel by the low-order FLIT (0) signal, which, if negated, indicates that the down path identification portion 41 includes an even number of down path identification fields 42, and if asserted indicates that it includes an odd number of down path identification fields 42. If the FLIT (0) signal is negated, indicating that the down path identification portion 41 contains an even number of flits, it enables the multiplexers 1124(i) to couple the HALF FLIT (i) signals as the CNT (i) signal, so that the one of the CNT(i) signals that is asserted corresponds to one-half the value of the header field 40. On the other hand, if the FLIT (0) signal is asserted, indicating that the down path identification portion 41 contains an odd number of flits, it enables the multiplexers 1124(i) to couple the HALF FLIT (i−1) signals as the CNT (i) signal. In that case, the one of the CNT (I) signals that is asserted corresponds to one plus one-half the value of the header field 40.

The counter portion 1123 includes a plurality of count stages 1125(i) ("i" is an index from zero to eight) each of generates one DNF (i) down flit signal ("i" is an index from zero to eight) whose index "i" identifies the number of flits in the down path identification portion 41 currently being received. Each stage 1125(i) includes a multiplexer 1126(i) and a flip-flop 1127(i). Each multiplexer 1126(i) receives at one input terminal one of the CNT (i) signals of corresponding index "i." Each multiplexer 1126(i) provides a SEL CNT (i) selected count signal that is coupled to the data output terminal of the flip-flop 1127(i) of corresponding index "i." Each multiplexer 1126(i) also has an input terminal connected to the data output terminal of the flip-flop 1127(i) and another input terminal connected to the data output terminal of the flip-flop 1127(i+1). The multiplexers 1126(i) are controlled in parallel by the MSG INIT message initialization signal from the input control circuit 1141 and by a DNF CNT GO down flit count go signal from an AND gate 1130. The flip-flops 1127(i) are docked in parallel by the NODE CLK signal.

Prior to and during receipt by the flit flow control circuit 1040 of the FLIT signals representing the header field 40 of a data router message packet 30, the MSG INIT message initialization signal enables the multiplexers 1126(i) to couple the CNT (i) count signals as SEL CNT (i) selected count signals to the data input terminals of flip-flops 1127(i). When the flit flow control circuit 1040 is receiving FLIT signals representing the header field 40, the decoder portion 1122 asserts one CNT (i') count signal whose index "i'" identifies the number of flits in the down flit identification portion 41 of the data router message packet 30. Each flip-flop 1127(i) latches the SEL CNT (i) signal, including the SEL CNT (i') signal that is asserted, at the next tick of the NODE CLK signal. The one flip-flop 1127(i') is set to assert the DNF (i') down flit signal, while the other flip-flops are cleared to negate the DNF (i) down flit signals of other indices "i." At that point, the input control circuit 1041 negates the MSG INIT signal.

The AND gate 1130 is controlled by the VAL FLIT valid flit signal and the complement of the MSG INIT message initialization signal as generated by an inverter 1130. If the MSG INIT signal is asserted, inverter 1131 maintains the AND gate 1130 in a de-energized condition, so that the DNF CNT GO down flit count go signal will remain negated. However when the MSG INIT signal is negated, one input terminal of AND gate 1130 is enabled and the other input terminal, which is controlled by the VAL FLIT valid flit signal, controls the energization of the AND gate 1130 and thus the condition of the DNF CNT GO signal. Thus, while the VAL FLIT signal is asserted, indicating that successive flits are being received, the DNF CNT GO signal is asserted, and otherwise it is negated.

While the DNF CNT GO signal is asserted, the multiplexers 1126(i) are enabled to couple the DNF (i+1) down flit signal as the SEL FLIT (i) signal. As noted above, the corresponding flip-flops 1127(i) latch the SEL FLIT (i) signal at each tick of the NODE CLK signal. Thus, while the DNF CNT GO signal is asserted, the index "i'" of the one SEL FLIT (i') signal that is asserted is decremented at successive ticks of the NODE CLK signal. Accordingly, successive ticks of the NODE CLK signal, the corresponding index "i'" of DNF (i') down flit that is asserted is also decremented. It will be appreciated that at some point the flip-flop 1127(1) will be set to assert the DNF (1) signal, which corresponds to the DNF END down flit end signal.

If during this process the VAL FLIT signal is negated, indicating a stall condition, the AND gate 1130 negates the DNF CNT GO down flit count go signal. The negated DNF CNT GO signal enables the multiplexers 1126(i) to couple the DNF (i) signals from their respective flip-flops 1127(i) as the SEL CNT (i) selected count signals, instead of the DNF (i+1) signal from the flip-flop in the next higher indexed stage 1125(i+1). Thus, each flip-flop 1127(i), including the one flip-flop 1127(i') that is set, maintains it condition. When the VAL FLIT is again asserted, indicating termination of the stall condition, the AND gate 1130 again asserts the DNF CNT GO signal, to enable the counter portion 1123 to operate as described above.

iv. Switch Input Control Circuit

Figure 54:
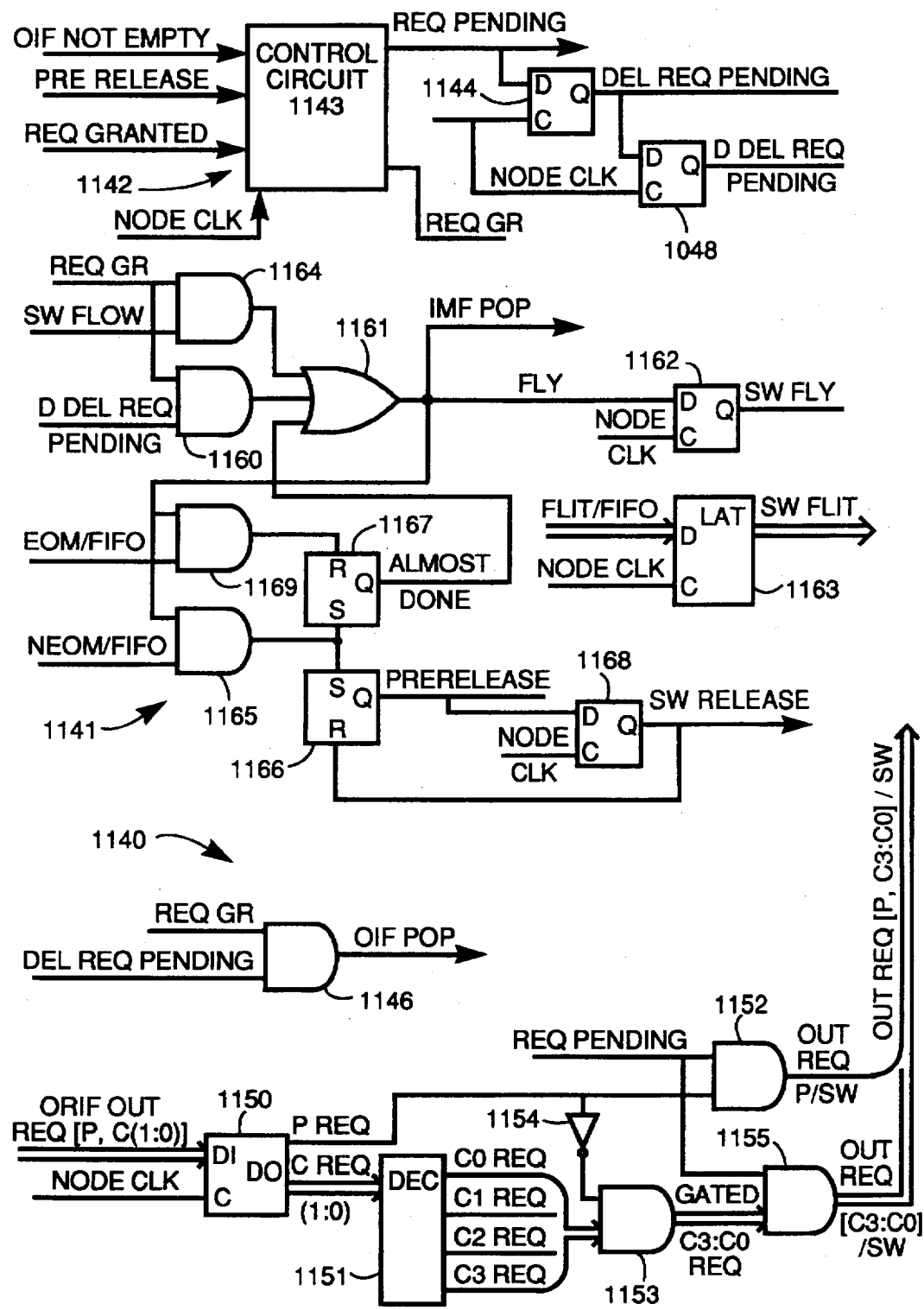

FIG. 54 depicts a logic diagram of the switch input control circuit 1024 (FIG. 46). With reference to FIG. 54, the switch input control circuit 1024 includes three primary sections. An output request section 1140 controls the obtaining of switch control information from the output request identification FIFO 1023, decoding it, and providing the decoded information to the switch 1003 (FIG. 45). A message flit control section 1141 controls retrieval of flits of data router message packets 30 stored in the input message FIFO 1022 and transmittal to the switch 1003. In addition, the message flit control section 1141 receives an generates control signals for controlling transfer of flits from the input message FIFO 1022 to the message flit control section 1141 and from the section 1141 to the switch 1003. Finally, a control section 1142 synchronizes the operations of both the output request section and the message flit control section 1141.

Figure 55:
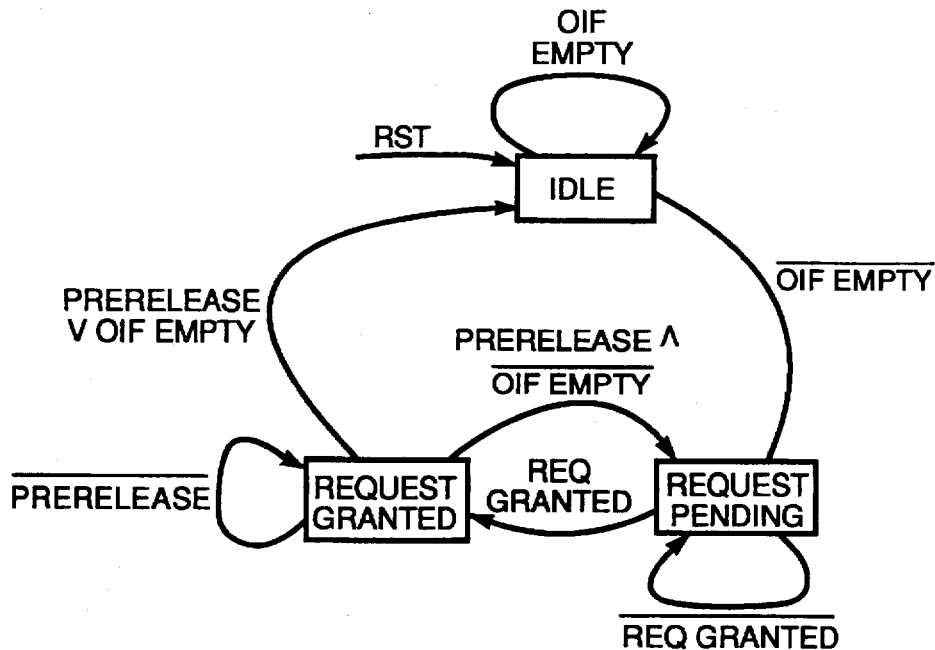

The control section 1142 includes a control circuit 1143 that is essentially a state machine. FIG. 55 comprises a state transition diagram depicting the conditions of input signals under which the control circuit sequences from state to state. In each state transition, the control circuit 1143 changes state at a tick of the NODE CLK signal. Initially, the control circuit 1143 is in an idle state, as identified by the box labelled "IDLE," and it remains there as long as the output request identification FIFO 1023 (FIG. 46) is asserting the OIF EMPTY output identification FIFO empty signal. As noted above, if the output request identification FIFO 1023 is asserting the OIF EMPTY signal, it is empty. If the output request identification FIFO 1123 becomes not empty, it negates the OIF EMPTY signal, and the control circuit 1143 at the next tick of the NODE CLK signal sequences to the request pending state, as identified by the box labelled REQUEST PENDING. In that state, the control circuit 1143 asserts a REQ PENDING request pending signal.

Contemporaneously, the output request identification FIFO 1023 transmits the new request as ORIF OUT REQ [P,C(I:0)] buffered output request signals. Returning to FIG. 54, the ORIF OUT REQ [P,C(1:0)] signals are coupled to data input terminals of a latch 1150, which latches them in response to the next tick of the NODE CLK signal. In response to the latched signals, the latch 1150 transmits a P REQ parent requested signal and binary-encoded C REQ (1:0) child request signals. The P REQ parent requested signal is enables one input terminal of an AND gate 1152.

The C REQ(1:0) child request signals are coupled to a decoder 1151, which decodes the C REQ (1:0) signals and transmits in response four signals identified as C0 REQ through C3 REQ (generally identified as "Ci REQ" child "i" requested signals). The decoder 1151 asserts the one of the Ci REQ signals ("i" having a value from zero to three) that has the index "i" having the value identified by the binary encoding of the C REQ (1:0) signals.

The Ci REQ child "i" requested signals from decoder 1151 are coupled to a gated driver 1153. If the P REQ parent requested signal is not asserted, an inverter 1154 enables the gated driver 1153 to couple the Ci REQ signals to input terminals of a second gated driver 1155. The REQ PENDING request pending signal from the control circuit 1143 enables the AND gate 1152 to generate the OUT REQ P/SW output requested parent to switch signal and the gated driver 1155 to generate the OUT REQ [C3:C0]/SW output request children to switch signals, which together form the OUT REQ [P,C3:C0] output request signals (FIG. 46) that are transmitted to the switch 1003. Thus, if the P REQ parent requested signal is asserted, the asserted REQ PENDING signal will enable AND gate 1152 to assert the OUT REQ P/SW signal, and otherwise the OUT REQ P/SW signal will be negated. Similarly, if the P REQ signal is negated and one of the Ci REQ child "i" requested signals is asserted, the asserted REQ PENDING signal will enable the assertion of the one "i-th" OUT REQ [Ci]/SW output request to switch signal.

It will be appreciated that the inverter 1154 ensures that the gated driver 1153 will be disabled if the P REQ parent requested signal is asserted, ensuring that the request that the data router message packet 30 be transmitted to a parent data router node 22(i,j,k) will take precedence over a request that it be transmitted to a child data router node 22(i,j,k). This, in turn, ensures that the data router message packet 30 will be transmitted up the tree defining data router 15 until it reaches a data router node 22(i,j,k) at the level "i" identified in the data router message packet 30 as originally transmitted.

The REQ PENDING signal is also coupled to the data input terminal of a flip-flop 1144 in the control section 1142. The assertion of the REQ PENDING signal enables the flip-flop 1144 to be set at the next tick of the NODE CLK signal, enabling it to assert a DEL REQ PENDING delayed request pending signal. The asserted DEL REQ PENDING signal enables one input terminal of an AND gate 1146 in the output request section. The asserted DEL REQ PENDING signal also enables a second flip-flop 1048 to be set at the next tick of the NODE CLK signal, enabling it to assert a DDEL REQ PENDING delayed (twice) request pending. The DEL REQ PENDING and DDEL REQ PENDING signals are thus asserted one and two ticks, respectively, of the NODE CLK signal after assertion of the REQ PENDING signal. It will also be appreciated that the DEL REQ PENDING and DDEL REQ PENDING signals will be negated one and two ticks, respectively, after negation of the REQ PENDING signal.

As will be described below in connection with FIGS. 56 through 61, when the switch 1003 receives one of the OUT REQ [P,C3:C0] signals that is asserted, it performs an arbitration operation in connection with requests from other input child and parent circuits 1006(i) and 1010(i) for a parent or the child identified by the asserted OUT REQ [P,C3:C0] signal. At some point, the request will be granted, at which point the switch 1003 asserts the REQ GRANTED request granted signal. The control circuit 1143 receives the REQ GRANTED signal, and when asserted sequences to the request granted state at the next tick of the NODE CLK signal (see FIG. 55). In that state, the control circuit 1143 negates the REQ PENDING request pending signal and asserts a REQ GR request granted signal.

The asserted REQ GR request granted signal enables the second input terminal of AND gate 1146. Since, as noted above, the DEL REQ PENDING signal remains asserted for one tick of the NODE CLK signal after negation of the REQ PENDING signal, both input terminals of AND gate 1146 will be enabled, thereby energizing the AND gate to assert the OIF POP output identification FIFO pop signal. This enables the output request identification FIFO 1023 to couple new ORIF OUT REQ [P,C(1:0)] signals to the output request section 1140, which can be latched and decoded as described above and the resulting GATED C3:C0 REQ and P REQ signals coupled to the respective input terminals of gated driver 1155 and AND gate 1152 to be available for gating as the OUT REQ [P,C3:C0] signals when the REQ PENDING signal is next asserted.

The asserted REQ GR request granted signal also enables an input terminal of an AND gate 1160 in the message flit control section 1141. Since the DDEL REQ PENDING delayed (twice) request pending signal is asserted, AND gate 1160 is energized, which, in turn, energizes an OR gate 1161 to assert a FLY signal. The FLY signal is coupled to the data input terminal of a flip-flop 1162, which is set in response to the next tick of the NODE CLK signal to assert the SW FLY fly to switch signal, which is coupled to the switch 1003.

The FLY signal is also coupled to the input message FIFO 1022 as the IMF POP input message FIFO pop signal. When the IMF POP signal is asserted, the input message FIFO 1022 is enabled to transmit FL1T/FIFO flit from FIFO signals representing, at successive ticks of the NODE CLK signal, successive flits of the data router message packet 30.

At the point at which the OR gate 1161 first asserts the FLY signal, the input message FIFO 1022 (FIG. 46) is transmitting FLIT/FIFO flit from FIFO signals representing the first flit of the data router message packet 30. The FLIT/FIFO signals are buffered in a latch 1163, and are latched thereby in response to the ticks of the NODE CLK signal. The output signals transmitted by the latch 1163 comprise the SW FLIT flit to switch signals that are transmitted to the switch 1003. While FLY signal is negated, the input message FIFO 1022 maintains the FLIT/FIFO signals unchanged, representing the first flit of the data router message packet 30, so that the SW FLIT signals continually represent the first flit at successive ticks of the NODE CLK signal. However, while the FLY signal is asserted, the asserted IMF POP signal enables the input message FIFO 1022 to transmit the successive flits to the latch 1163, which latches them and transmits them as the SW FLIT signals to switch 1003.

As noted above, the DDEL REQ PENDING delayed (twice) request pending signal remains asserted for two ticks of the NODE CLK signal after the control circuit 1143 negates the REQ PENDING signal. When the DDEL REQ PENDING signal is negated, the AND gate 1160 is de-energized. At that point, the latch 1163 will have transmitted SW FLIT flit to switch signals representing the first two flits of the data router message packet 30. To enable transmission of SW FLIT signals representing additional flits, the switch 1003 asserts the SW FLOW flow from switch signal. The coincidence of the asserted REQ GR request granted and SW FLOW flow from switch signals energize an AND gate 1164, which maintains the OR gate 1161 energized.

The switch 1003 may, after receiving SW FLIT flit to switch signals representing the first two flits of the data router message packet 30, stop the flow of successive flits thereto by negating the SW FLOW signal. If it negates the SW FLOW signal, the AND gate 1164 is de-energized, which de-energizes the OR gate 1161 in turn negating the FLY signal. At the next tick of the NODE CLK signal, the negated FLY signal clears flip-flop 1162, which negates the SW FLY signal. Negation of the FLY signal also causes the IMF POP input message FIFO pop signal to be negated, which stops sequencing of the input message FIFO 1022. The switch 1003 may thereafter enable the flow of the successive flits to resume by re-asserting the SW FLOW switch flow signal, which re-energizes the AND gate 1164 and OR gate 1161 to assert the FLY and IMF POP signals, and enables the flip-flop to again be set to assert the SW FLY signal.

At some point in transmission of FLIT/FIFO flit from FIFO signals representing the successive flits of a data router message packet 30, the input message FIFO will assert the NEOM/FIFO near end-of-message from FIFO signal. As indicated above, the NEOM/FIFO signal is asserted contemporaneously with the FLIT/FIFO flit from FIFO signals representing the third-from-last flit of the data router message packet 30. The NEOM/FIFO signal enables one input terminal of an AND gate 1165. Since the FLY signal is asserted, the AND gate 1165 is energized, which enables the direct-set input terminals of two flip-flops 1166 and 1167, in turn setting both flip-flops. The set flip-flop 1166 asserts a PRERELEASE signal.

Returning to FIG. 55, the assertion of the PRERELEASE signal enables the control circuit 1143 to sequence to another state. If the OIF EMPTY signal is contemporaneously asserted, indicating that the output request identification FIFO 1023 is empty, the control circuit 1143 sequences to the idle state at the next tick of the NODE CLK signal, and negates the REQ GR request granted signal. On the other hand, if the OIF EMPTY signal is negated, the control circuit returns to the request pending state. In the request pending state, the control circuit 1143 also negates the REQ GR signal and also asserts the REQ PENDING request pending signal.

Since in either case the REQ GR signal is negated, the AND gate 1164 is de-energized. However, the set flip-flop 1167 asserts an ALMOST DONE signal, which maintains the OR gate 1161 in an energized condition, in turn maintaining the FLY signal asserted. At this point, since the switch 1003 cannot, through the SW FLOW flow from switch signal, control the FLY and SW FLY signals, it accepts the SW FLIT signals representing the last few flits of the data router message packet 30.

As noted above, the flip-flop 1166 asserts the PRERELEASE signal at the same point that the SW FLIT signals from latch 1163 represent the third-from-last flit of the data router message packet 30. The asserted PRERELEASE signal also enables the data input terminal of a flip-flop 1168, which is set in response to the next tick of the NODE CLK signal. The set flip-flop 1168 asserts the SW RELEASE release to switch signal. It will be appreciated that the SW RELEASE signal is asserted contemporaneous with the second-to-last flit of the data router message packet 30. The SW RELEASE signal also controls the direct-reset input terminal of flip-flop 1167, and resets the flip-flop when the signal is asserted. The reset flip-flop 1167 negates the PRERELEASE signal, which enables the flip-flop 1168 to be reset in response to the next tick of the NODE CLK signal. It will be appreciated that at that point, the SW FLIT flit to switch signals will represent the last flit of the data router message packet 30.

At the same time, the input message FIFO 1022 will be asserting the EOM/FIFO end-of-message from FIFO signal. Since the ALMOST DONE signal is still asserted, energizing OR gate 1163, the FLY signal is also asserted. The coincidence of assertion of the EOM/FIFO and FLY signals energizes an AND gate 1169, which energizes the direct-reset input terminal of flip-flop 1167. This enables the flip-flop 1167 to be reset, in turn negating the FLY and IMF POP input message FIFO pop signals. At the next tick of the NODE CLK signal, the flip-flop 1163 is reset, negating the SW FLY signal.

As noted above, the control circuit 1143 sequences from the request granted state to either the idle state or the request pending state at the same point that the SW FLIT signals represent the third-to-last flit of the data router message packet 30, the particular state depending on the state of the OFF EMPTY signal. If the control circuit 1143 sequences to the idle state, the switch input control circuit 1024 can repeat operations, as described above, when the OFF EMPTY signal is negated. If, on the other hand, the control circuit 1143 sequences to the request pending state, it will be appreciated that the REQ PENDING signal will be contemporaneously asserted, enabling the AND gate 1152 and gated driver 1155 to couple OUT REQ [P,C3:C0]/SW output request to switch signals to the switch 1003. As will be described below in connection with FIGS. 56 through 61, the switch 1003 may assert the REQ GRANTED signal, enabling the control circuit 1143 to sequence to the request granted state, immediately after the message flit control circuit 1141 transmits SW FLIT flit to switch signals representing the last flit of a data router message packet 30, to enable the message flit control circuit 1141 to immediately begin transmitting SW FLIT signals representing the first flit of the next data router message packet 30.

As described above, the input parent circuits 1010(i) are similar to the input child circuits 1006(i) described above in connection with FIGS. 46 through 54, with one exception noted here. In particular, as described above, when data router nodes 22(i,j,k) begin passing a data router message packet 30 down the tree defining data router 15, the nodes 22(i,j,k) do not thereafter pass the packet 30 back up the tree. If an input parent circuit 1010(i) receives a data router message packet 30 the packet 30 is being passed down the tree. Thus, the input parent circuit 1010(i) will not enable the switch 1003 to couple the packet 30 to an output parent circuit 1011(i), since that would pass the packet 30 back up the tree. Accordingly, the input parent circuits 1010(i) need not include circuitry, in their respective input message control circuits 1021 and switch input control circuits 1024 for generating signals corresponding to the OUT REQ P output request parent signals in the OUT REQ [P,C(1:0) signals and the OUT REQ [P,C3:C0]/SW signals as described above in connection with FIGS. 46 through 54.

3. Switch 1003 i. General

Figure 56:
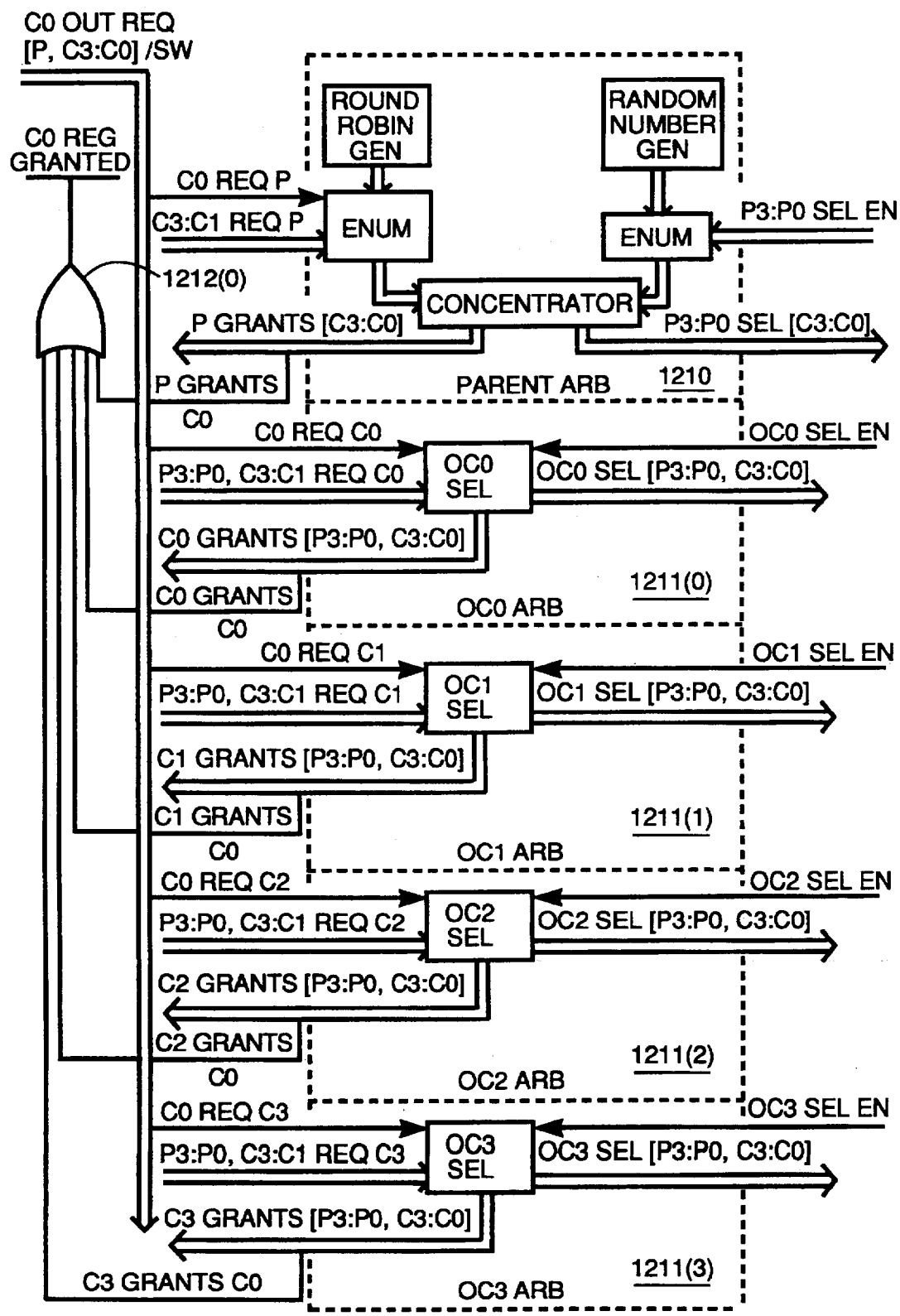
Figure 57:
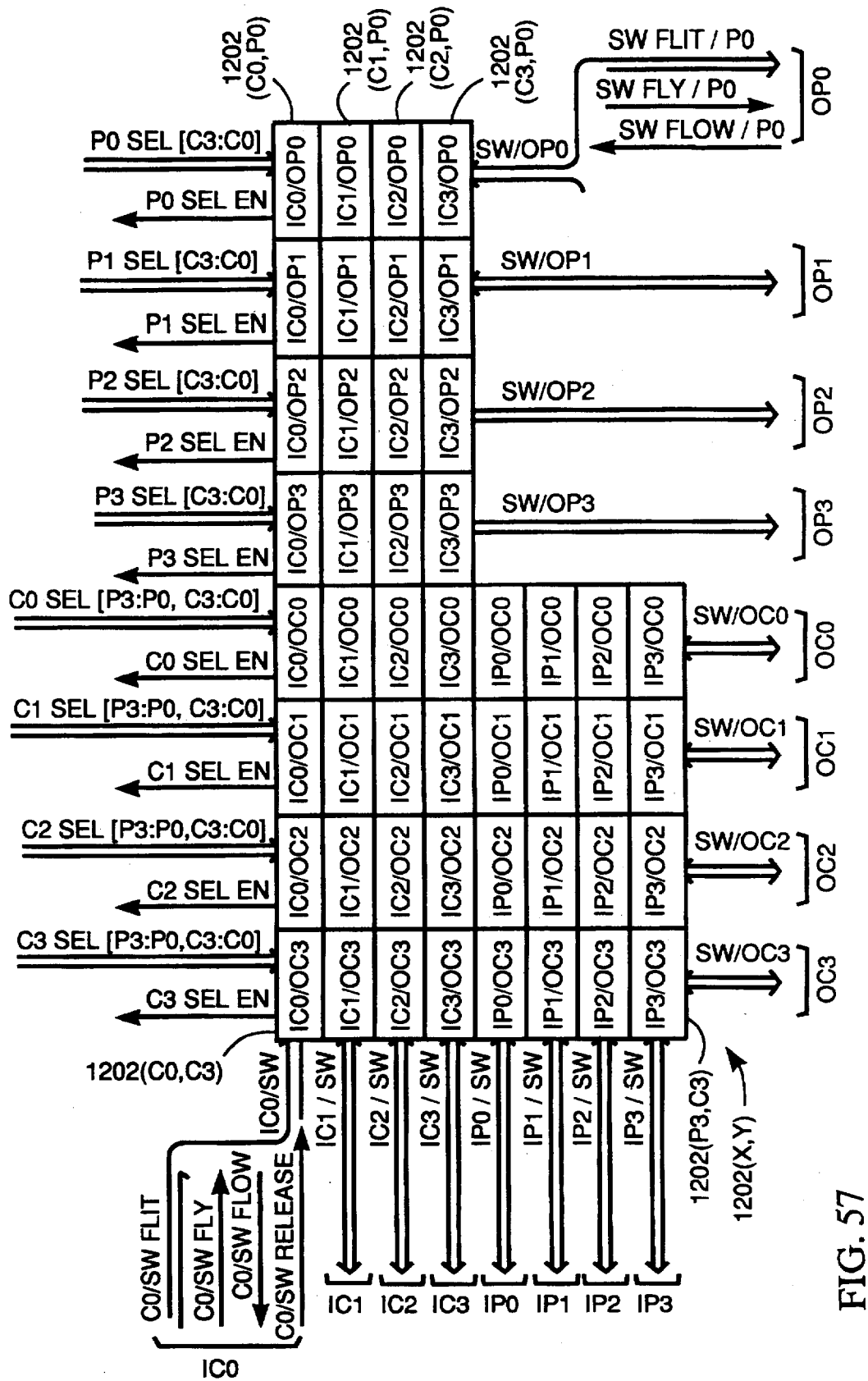

FIGS. 56 and 57 together depict, in general block diagram form, switch 1003 (FIG. 45) in a data router node 22(i,j,k). The switch 1003 includes a control section 1200 shown in FIG. 56 and a switching section 1201 shown in FIG. 57. With reference initially to FIG. 57, the switching section 1201 includes a plurality of switch cells, each generally identified herein by reference numeral 1202(x,y). The details of a switch cell 1202(x,y) will be described below in connection with FIG. 61. As depicted in FIG. 57, the switch cells are arranged in a matrix having a plurality of rows and columns. The switching cells in each row are associated with a particular input child or parent circuit 1006(i) or 1010(i) (FIG. 45) identified by the mnemonic identifier "ICi" (input child "Ci") or "IPi" (input parent "Pi"), where "i" is an index having values from zero to three. The switching cells in each column depicted in FIG. 57 are associated with a particular output child or parent circuit 1007(i) or 1011(i), which are identified by the mnemonic identifier "OCi" (output child "Ci") or IPi (output parent "Pi"), where "i" is an index having values from zero to three. In the reference numeral 1202(x,y) for a switching cell, the index "x" refers to the input child or parent circuit associated with the cell's row, and the index "y" refers to the output child or parent circuit associated with the row's column.

Each switch cell 1202(x,y) selectively couples the SW FLIT flit to switch signals from the input child or parent circuits 1006(i) or 1010(i) that is associated with the cell's row to the output child or parent circuit 1007(i) or 1011(i) that is associated with the cell's column, under control of enabling signals from the control section 1200. The switch cell 1202(x,y) couples the SW FLIT signals received thereby as SW FLIT/Ci switched flit to child "Ci" signals or SW FLIT/Pi switched flit to parent "Pi" signals, depending on the output child or parent circuit 1007(i) or 1011(i) connected thereto. For example, switch cell 1202(C0,C3) selectively couples the SW FLIT signals from input child circuit 1006(0) (which are identified on FIG. 57 as C0/SW FLIT signals, where the "C0" ahead of the slash identifies the source of the SW FLIT signals) as SW FLIT/C3 switched flit to child C3 signals to output child circuit 1007(3). Similarly, switch cell 1202(C0,P0) selectively couples the SW FLIT signals from input child circuit 1006(0) to as SW FLIT/output parent circuit 1011(0).

Each switch cell 1202(x,y) also receives the SW FLY fly to switch signal from the corresponding input child or parent circuits 1006(i) and 1010(i) and selectively couples it to the output parent or child circuit 1007(i) or 1011(i) connected thereto as the SW FLY/Ci switched fly to child "Ci" signal or SW FLY/Pi switched fly to parent "Pi" signal. The switch cell 1202(x,y) also receives a SW FLOW/Pi flow to switch from parent "Pi" signal or SW FLOW/Ci flow to switch from child "Ci" signal, as appropriate, from the input child or parent circuit 1011(i) or 1007(i) and selectively couples it to the input child or parent circuit 1006(i) or 1010(i) connected thereto as the SW FLOW/Ci flow from switch to child "Ci" signal or SW FLOW/Pi flow from switch to parent "Pi" signal. With reference to FIG. 46, the input child circuit 1006(i) of child "Ci" interface circuit 1001(i) (FIG. 45), for example, receives the SW FLOW/Ci signal as the SW FLOW flow from switch signal. Each input parent circuit 1010(i) receives the SW FLOW/Pi signal similarly.

Each switch cell 1202(x,y) also receives a Ci/SW RELEASE switch release from child "Ci" signal or the Pi/SW RELEASE switch release from parent "Pi" signal from the input child or parent circuit 1006(i) or 1010(i) connected thereto. Each Ci/SW RELEASE signal is directed to all of the switch cells 1202(Ci,y) and, when asserted disables the one that is coupling the Ci/SW FLIT switch to flit from child "Ci" signals to an output child or parent circuit 1007(i) or 1011(i) connected thereto. At that point, the switching section 1200 generates a "Y" SEL EN select enable signal indicating that the cells 1202(x,y) connected to output child or parent circuit 1007(y) or 1011(y) are available for selection.

It should be noted that the columns associated with the output parent circuits 1011(i) in the embodiment depicted in FIG. 57 do not include includes switching cells in rows associated with the input parent circuits 1010(i). In that embodiment, as noted above, when the data router nodes 22(i,j,k) begin directing a data router message packet 30 down the tree defining data router 15, they do not thereafter direct the packet 30 back up the tree. Thus, if the switching circuit 1201 receives a data router message packet 30 from an input parent circuit 1010(i), it will not direct the packet 30 to an output parent circuit 1011(i), and so the switching circuit 1201 does not need switching cells 1202(x,y) therefor.

The control section 1200, which is shown generally in FIG. 56, generates selection control signals that selectively enable the cells 1202(x,y). In this operation, the control section 1200 uses the Ci OUT REQ [P, C3:C0]/SW output request from child "Ci" to switch signals and Pi OUT REQ [P,C3:C0]/SW output request from parent "Pi" to switch signals from the input child and parent circuits 1006(i) and 1010(i), and P3:P0 SEL EN output parent selection enable signals and Ci SEL EN output child selection enable signals from the switching section 1201. {The "Ci" or "Pi" prefix in the mnemonic signal identifiers Ci OUT REQ [P,C3:C0]/SW and Pi OUT REQ [P,C3:C0]/SW identifies the source input child or parent circuit 1006(i) or 1010(i). Thus, for example, the Ci OUT REQ [P, C3:C0]/SW signals, for Ci corresponding to C0, comprise the OUT REQ [P, C3:C0]/SW depicted on FIG. 46.}. In response to all of these signals, the control section 1200 generates P3:P0 SEL [C3:C0] selection signals and OCy SEL [P3:P0,C3:C0] selection signals ["y" is an index identifying the particular output child circuits 1006(y)].

The switch control section 1200 includes five circuits, including one parent arbitration circuit 1210 and four child arbitration circuits 1211(y) ("y" being an index having integer values from zero to three). The parent arbitration circuit 1210 receives C3:C0 REQ P child requests parent signals and P3:P0 SEL EN parent select enable signals and generates the P3:P0 SEL [C3:C0] output parent selection signals in response. The C3:C0 REQ P signals comprise the parent request portions of the Ci OUT REQ [P,C3:C0]/SW output request from child "Ci" to switch signals from the input child circuits 1006(i).

The P3:P0 SEL [C3:C0] selection signals generated by the parent arbitration circuit 1210 comprise sixteen signals that control the switching cells in the columns associated with the output parent circuits 1011(i). Each signal, which has a mnemonic identifier of the form "Py SEL Cx," when asserted enables the switching cell 1202(x,y). It will be appreciated that one Py SEL Cx signal may be asserted at any given time for each value of "y". This ensures that SW FLIT signals from only one input child circuit 1006(i) are coupled to an output parent circuit 1011(i) at any given time.

The parent arbitration circuit 1210 also transmits the P3:P0 SEL [C3:C0] selection signals to the input child circuits 1006(i) as P GRANTS [C3:C0] parent grants child signals. The P GRANTS [C3:C0] signals comprise four signals, each identified by the mnemonic "P GRANTS Ci," one associated with each input child circuit 1006(i). When the parent arbitration circuit 1210 asserts a P3:P0 SEL [C3:C0] selection signal to enable a switching cell 1202(x,y) in the row of associated with the input child circuit 1006(i), it also asserts the P GRANTS Ci signal.

Each child arbitration circuit 1211(y) is associated with one column of switching cells 1202(x,y), identified by index "y." Each child arbitration circuit 1211(y) receives P3:P0, C3:C0 REQ Cy parent and child request child signals and the OCy SEL EN output select enable signal from the associated column of switching cells 1202(x,y). In response, the child arbitration circuit 1211(3,) generates the OCy SEL [P3:P0,C3:C0] output child selection signals for that column.

The OCy SEL [P3:P0,C3:C0] signals actually comprises eight signals, having the general mnemonic identifiers "OCy SEL Px" and "OCy SEL Cx", where "x" identifies a input child or parent circuit and, thus, a particular row of switching cells 1202(x,y) in the switching section 1201. Each signal OCy SEL Px and OCy SEL Cx, when asserted, enables the switching cell 1202(x,y). It will be appreciated that only one of the OCy SEL Px and OCy SEL Cx signals can be asserted at any given time. This ensures that SW FLIT signals from only one input child or parent circuit 1006(i) and 1010(i) are coupled to an output child circuit 1007(i) at any given time.

Each child arbitration circuit 1211(y) also transmits the OCy SEL [P3:P0,C3:C0] selection signals to the input child and parent circuits 1006(i) and 1010(i) as Cy GRANTS [P3:P0,C3:C0] child grants parent and child signals. The Cy GRANTS [P3:P0,C3:C0] signals comprise eight signals, each identified by the mnemonic "Cy GRANTS Pi," one associated with each input parent circuit 1010(i), or "Cy GRANTS Ci", one associated with each input child circuit 1006(i). When the child arbitration circuit 1211(y) asserts an OCy SEL [P3:P0,C3:C0] selection signal to enable a switching cell 1202(x,y) in the row associated with the input child or parent circuit 1006(i) or 1010(i), it also asserts the Cy GRANTS Pi or Cy GRANTS Ci signal.

The switch control section 1200 also ORs together the P GRANTS Ci and Cy GRANTS Ci signals associated with each input child circuit 1006(i) to form the Ci REQ GRANTED signal, which is coupled to the input child circuit 1006(i) as the REQ GRANTED signal (FIGS. 46 and 54). The OR operation for input child circuit 1006(0) is represented in FIG. 56 by an OR gate 1212(0). It will be appreciated that the switch control section 1200 will include an OR gate to generate the corresponding Ci REQ GRANTED signal for each of the other input child circuits 1006(i) in response to the P GRANTS Ci and Cy GRANTS Ci signals. In addition, the switch control section with include an OR gate to generate the corresponding Pi REQ GRANTED signals for each of the input parent circuits 1010(i) in response to the Cy GRANTS Pi signals.

The parent arbitration circuit 1210, which will be described in more detail below, essentially comprises a two-dimensional priority chain. The circuit * * *

Figure 58:
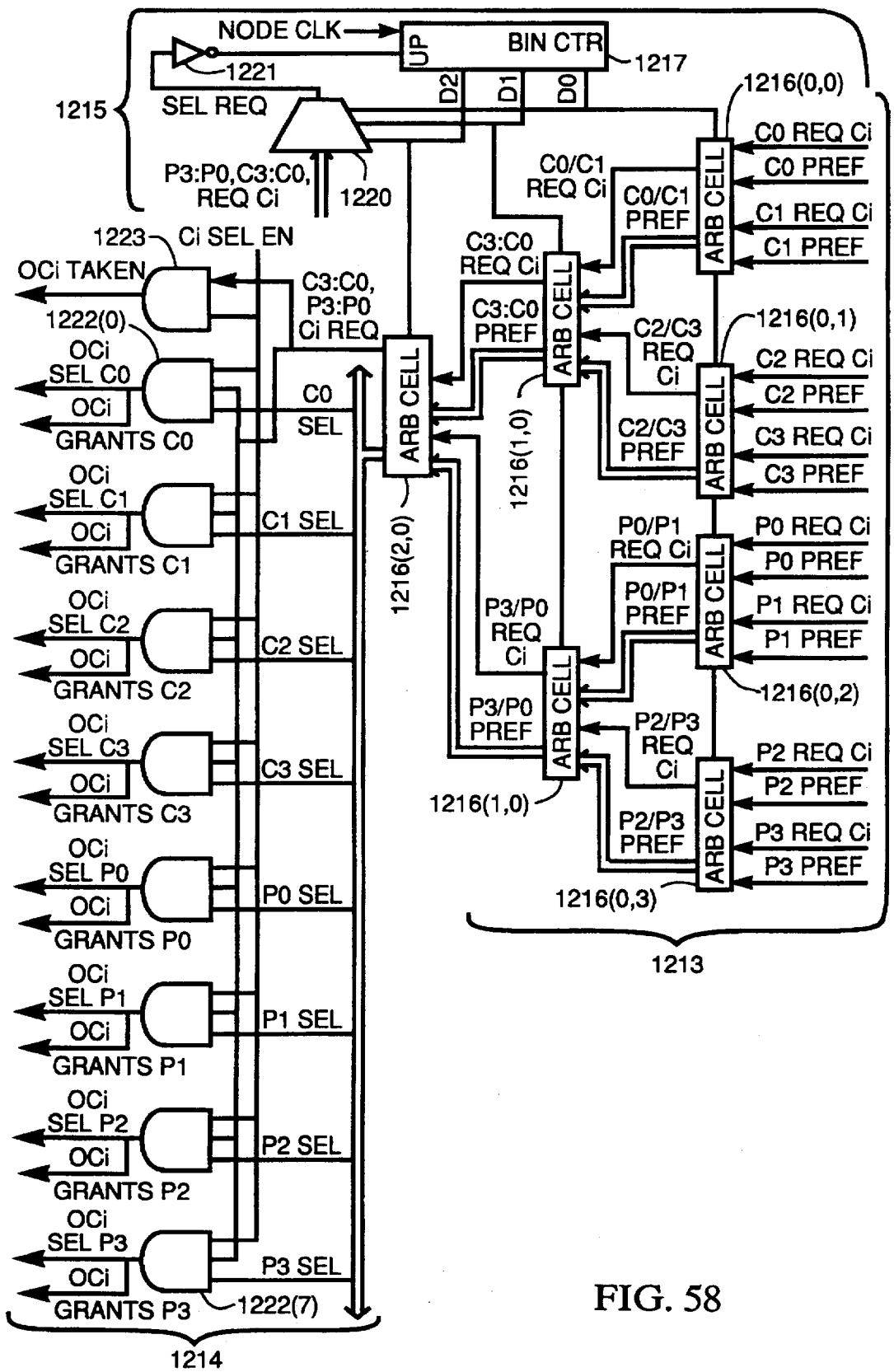

Each child arbitration circuit 1211(i), which will be described in more detail below in connection with FIGS. 58 and 59, essentially comprises a one-dimensional priority chain. In this connection, each child arbitration circuit 1211(y) assigns up to eight requests, each represented by one of the eight P3:P0,C3:C0 REQ Ci signals, to one resource, which is represented by the column of switching cells 1202(x,y) associated with the output child or parent circuit 1007(y) or 1011(y). The child arbitration circuits 1211(y) grants access to the resource on a priority basis, but where the priority rotates among the requesters so that no requester can be inhibited from accessing the resource for an undue length of time by large numbers of requests from other requesters.

ii. Switch Control Section a. Child Arbitration Circuit 1211(i)

The details of a child arbitration circuit 1211(i) will be described in connection with FIGS. 58 and 59. With reference to FIG. 58, the child arbitration circuit 1211(i) controlling access by the input child and parent interface circuits includes a binary arbitration tree 1213, an output circuit 1214 and a round-robin counter circuit 1215. The round-robin counter circuit 1215 generates binary-encoded D(2:0) signals representing values from zero to seven, each associated with one of the eight request signals, that is, the four Cx REQ Ci input child "Cx" requests output child "Ci" signals and four Px REQ Ci input parent "Px" requests output child "Ci" signals, that are received by the child arbitration circuit 1211(i).

The arbitration tree 1213 receives the eight Cx REQ Ci and Px REQ Ci request signals and selects one identified by the D(2:0) signals from the round-robin counter circuit 1215, and asserts a Cx SEL input child "Cx" select signal or a Px SEL input parent "Px" select signal in response. The output circuit 1214 asserts a corresponding Ci SEL Cx output child "Ci" selects input child "Cx" signal or Ci SEL Px output child "Cx" selects input parent "Px" signal when the switching section 1201 asserts the Ci SEL EN output child "Ci" select enable signal. Contemporaneously, the output circuit 1214 asserts the corresponding Ci GRANTS Cx or Ci GRANTS Cx signal, which, as described above in connection with FIG. 56, is used by the switch control section 1200 in generating the Cx REQ GRANTED signal for transmission to the selected input child circuit 1006(x), or a corresponding signal for transmission to the selected input parent circuit 1010(x). As described above in connection with FIGS. 46 through 54, the input child or parent circuit 1006(x) or 1010(x) then negates the Cx REQ Ci or Px REQ Ci request signal.

If the selected input parent or child circuit 1006(i) or 1010(i) is not asserting the one of the Cx REQ Ci or Px REQ Ci signals associated with the current value of the D(2:0) signals, the round-robin counter increments until the value of the D(2:0) signals is associated with an asserted Cx REQ Ci or Px REQ Ci signal. When the counter 1215 reaches such a value, it stops incrementing. In addition, the arbitration tree 1213 at that point asserts the Cx SEL input child select signal or Px SEL input parent select signal that is associated with that binary-encoded value of the D(2:0) signals. Thus, the round-robin counter 1215 ensures that priority among the Cx REQ Ci and Px REQ Ci signals rotates, so that the input child and parent circuits 1006(i) and 1010(i) all have a reasonably equal likelihood of being selected, and that none are inhibited from coupling data router message packets 30 for an unduly long time.

Generally, the arbitration tree 1213 comprises arbitration cells generally identified by reference numeral 1216(i,j) organized a plurality of levels where index "i" identifies the level of the arbitration cell in the arbitration tree 1213 and index "j" uniquely identifies the arbitration cell among others in the same level. Each arbitration cell 1216(i,j) performs two general operations. First, each arbitration cell 1216(i,j) receives request signals from two input child or parent circuits 1006(i) or 1010(i), or from two arbitration cells 1216(i−1) in the next lower level, and generates a consolidated request signal that is the OR thereof.

Second, each arbitration cell 1216(i,j) performs a pair-wise arbitration determination in response to (a) the request or consolidated request signals from the input child or parent circuits 1006(i) and 1010(i), or the consolidated request signals, (b) unary preference signals that generated by the next lower level 1216(i−1,j), and (c) the D(i) signals for the particular level (i). In that operation, the arbitration cell 1216(i,j) generates unary preference signals to identify one of the input child or parent circuits 1006(x) or 1010(x) that is asserting a request signal, for use by the arbitration cell 1216(i+1,j) in the arbitration tree 1213. Thus, each arbitration cell 1216(i,j) produces a preference signal for each of the input child or parent circuits 1006(i) or 1010(i) that is connected to those arbitration cells 1216(0,j) in the first level which are in the sub-tree depending from the arbitration cell 1216(i,j).

For example, the arbitration cell 1216(0,0) in the first level receives C0 REQ Ci and C1 REQ Ci input child "C0" and "C1" request output child "Ci" signals and asserts a C0/C1 REQ Ci input child "C0" or "C1" requests output child "Ci" signal if either of the C0 REQ Ci or C1 REQ Ci signals are asserted. In addition, arbitration cell 1216(0,0) asserts the one of unary-encoded C0/C1 PREF input child "C0" or "C1" preferred signals to identify child "C0" or child "C1" as being preferred. The C0/C1 PREF signals actually comprises two signals, one associated with the input child circuit "C0" 1006(0) and the other associated with input child "C1" 1006(1), with at most one signal being asserted. The arbitration cell 1216(0,0) selects at most one of the C0/C1 PREF signals to be asserted in response to the conditions of the C0 REQ Ci and C1 REQ Ci request signals, C0 PREF and C1 PREF child "C0" or "C1" preferred signals and a low-order D(0) round-robin count signal from round-robin counter circuit 1215.

The other arbitration cells in the first level, namely cells 1216(1) through 1216(3) operate similarly. It will be appreciated that D(0) round-robin select signal enables the arbitration cells 1216(0,j) in the first level, if both Cx REQ Ci or Px REQ Ci signals received thereby are asserted, to select one of the corresponding input child or parent circuit whose preference signal is to be asserted. If the D(0) signal is asserted, the arbitration cell 1216(0,j) will assert the preference signal that is associated with the input child circuit 1006(x) whose index "x" is odd. On the other hand, if the D(0) signal is negated, the arbitration cell 1216(0,j) will assert the preference signal that is associated with the input child circuit 1006(x) whose index "x" is zero or even.

The arbitration cell 1216(1,0) in the second level receives (a) the C0/C1 REQ Ci input child "C0" or "C1" requests output child "Ci" signal from arbitration cell 1216(0,0) and (b) the C2/C3 REQ Ci input child "C0" or "C1" requests output child "Ci" signal from arbitration cell 1216(0,1) and generates in response a C3:C0 REQ Ci input child requests output child "Ci" signal. The C3:C0 REQ Ci signal is asserted if any of the Cx REQ Ci signals is asserted.

In addition, the arbitration cell 1216(1,0) generates C3:C0 PREF preference signals, which comprises four unary-encoded signals each associated with one of the input child circuits 1006(3) through 1006(0). If the arbitration cell is asserting the C3:C0 REQ Ci signal, it also asserts one of the C3:C0 PREF signals. The arbitration cell 1216(1,0) uses the C0/C1 PREF and C2/C3 PREF preference signals which it receives from the arbitration cells 1216(0,0) and 1216(0,1) in its sub-tree, along with the D(1) signal from the round-robin counter 1215. As noted above, at most one of the C0/C1 PREF signals asserted, and similarly at most one of the C2/C3 PREF signals will be asserted. If one of the signals in each pair of C0/C1 PREF signals and C2/C3 PREF signals is asserted, the D1 signal is used to select one of the C3:C0 PREF signals to be asserted. The arbitration cell 1216(1,1) operates similarly to generate the P3:P0 REQ input parent request signal and the P3:P0 PREF input parent preferred signals.

Finally, the arbitration cell 1216(2,0) at the root of the arbitration tree 1213 operates similarly to generate an C3:C0/P3:P0 REQ Ci input child/input parent requests output child "Ci" signal in response to the C3:C0 REQ Ci input child requests output child "Ci" signal and P3:P0 RE0 Ci input parent requests output child "Ci" signal. In addition, the arbitration cell 1216(2,0) operates similarly, in response to the C3:C0 REQ Ci and the P3:P0 REQ Ci request signals, the C3:C0 PREF and the P3:P0 PREF preference signals, and the D(2) signals, to generate unary-encoded Cx SEL input child "Cx" select signals and Px SEL input parent "Px" select signals. If one of the C3:C0 PREF preference signals and one of the P3:P0 PREF preference signals is asserted, the D(2) signal will determine which of the Cx SEL signals or Px SEL signals will be asserted. If the D(2) signal is asserted, the arbitration cell will assert one of the Px SEL signals, corresponding to the one of the P3:P0 PREF preference signals that is asserted. In addition, if the D(2) signal is negated, the arbitration cell 1216(2) will assert one of the Cx SEL signals, corresponding to the one of the C3:C0 PREF preference signals that is asserted.

As noted above, the round-robin counter circuit 1215 generates binary-encoded D(2:0) signals having values between zero and seven, each of which is associated with one of the Cx RE0 Ci or Px RE0 Ci request signals from the input child and parent circuits 1006(i) or 1010(i). If the Cx REQ Ci or Px REQ Ci request signal associated with the current binary-encoded value of the D(2:0) signals is not asserted, the round-robin counter increments until the value of the D(2:0) signals is associated with an asserted Cx REQ Ci or Px REQ Ci signal. As shown in FIG. 58, the round-robin counter circuit 1215 includes a binary counter 1217, a multiplexer 1220 and an inverter 1221. The binary counter 1217 generates the D(2:0) signals, which are identified in FIG. 58 as signals D(2), D(1) and D(0).

In addition to being directed to the arbitration tree 1213, the D(2:0) signals are also directed to control input terminals of multiplexer 1220. The data input terminals of multiplexer 1220 receive the Cx REQ Ci and Px REQ Ci request signals, and the multiplexer 1220 couples as a SEL REQ selected request signal the one associated with the binary-encoded value of the D(2:0) signals. The inverter 1221, which controls an increment enable terminal of the counter 1217, complements the SEL REQ selected request signal, to enable the counter 1217 if the SEL REQ, and thus the selected Cx REQ Ci or Px REQ Ci signal, is negated. If the counter 1217 is enabled, it increments in response to successive ticks of the NODE CLK signal. Thus, the SEL REQ signal is asserted, enabling inverter 1221 to disable counter 1217, when the D(2:0) signals identify one of the Cx REQ Ci or Px REQ Ci signals that is asserted.

The output circuit 1214 includes a plurality of AND gates 1222(0) through 1222(7), each of which generates a Ci SEL Cx or Ci SEL Px signal and an associated Ci GRANTS Cx or Ci GRANTS Px signal. Each AND gate 1222(i) asserts its respective output signals in response to the coincidence of the corresponding Cx SEL or Px SEL signal and the C3:C0, P3:P0 REQ CI signal from the arbitration cell 1216(2,0) and the Ci SEL EN select enable signal from the switching section 1201 (FIG. 57). In addition, the output circuit 1214 includes an AND gate 1223 which generates a Ci TAKEN signal in response to the coincidence of the C3:C0,P3:P0 REQ CI signal and the Ci SEL EN select enable signal. The Ci TAKEN signal is coupled to the node control circuit 1004 (FIG. 45) to indicate when the arbitration circuit 1211(i) for a particular output child circuit 1007(i) has selected one of the input child or parent circuits 1006(i) or 1010(i).

Figure 59:
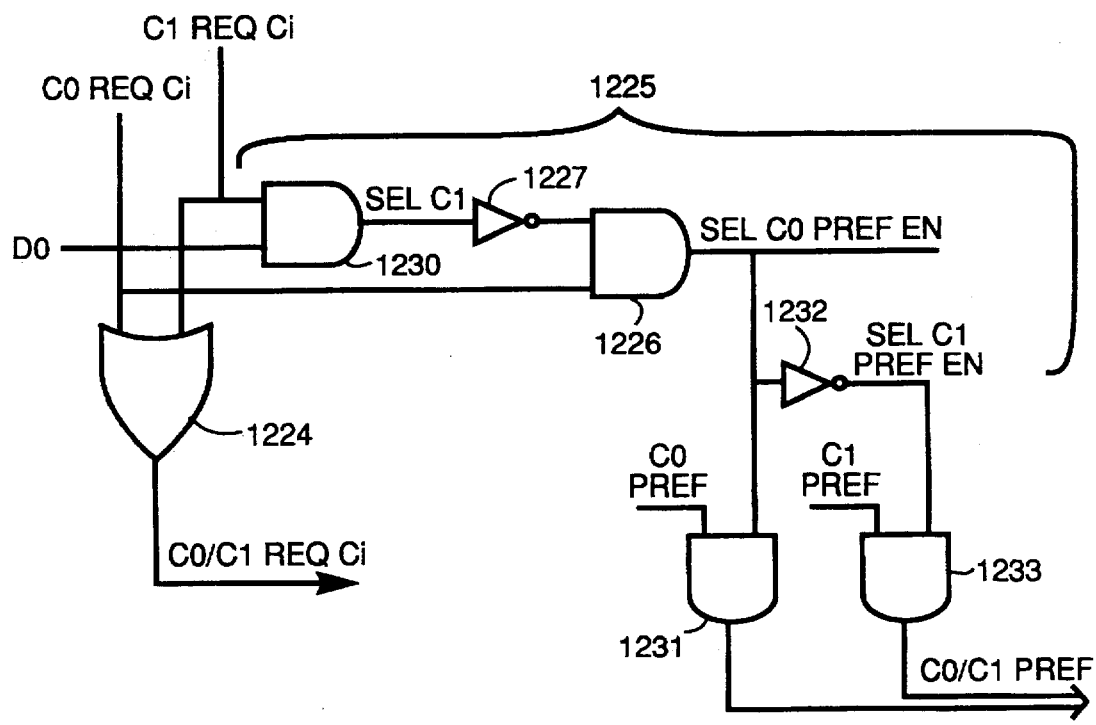

FIG. 59 depicts a logic diagram of an arbitration cell 1216(0,0) in the first level of the arbitration tree 1213. The other arbitration cells 1216(i,j) are similar. With reference to FIG. 59, the arbitration cell includes an OR gate 1224 that receives the C0 REQ Ci and C1 REQ Ci request signals from the input child circuits 1006(0) and 1006(1) and generates the C0/C1 REQ Ci consolidated request signal if either input signal is asserted.

The C0 REQ Ci and C1 REQ Ci signals are also coupled, along with the D(0) signal from round-robin counter 1217, to a selector circuit 1225. The selector circuit includes an AND gate 1226 that generates a SEL C0 PREF EN select child "C0" preferred enable in response to the coincidence of the C0 REQ Ci request signal and the complement of a SEL C1 select child "CI" signal from an inverter 1226. The SEL C1 signal, in turn, is generated by an AND gate 1230. If either or both of the D0 or C1 REQ Ci signals is negated, the AND gate 1230 is disabled to negate the SEL C1 signal. The negated SEL C1 signal is, in turn, complemented by the inverter 1227 to enable one input terminal of AND gate 1226. Thus, if the C0 REQ Ci signal is asserted, the AND gate 1226 asserts the SEL C0 PREF EN signal.

The asserted SEL C0 PREF EN signal, in turn, energizes one input terminal of an AND gate 1231, whose other input terminal is maintained in an enabled condition by an asserted C0 PREF child "C0" preferred signal. The AND gate 1231 is thus energized to assert the one of the C0/C1 PREF preferred signals associated with input child circuit 1006(0). The asserted SEL C0 PREF EN signal, in turn, is complemented by an inverter 1232 to negate a SEL C1 PREF EN select child "C1" preferred enable signal. The negated SEL C1 PREF EN signal disables an AND gate 1233, causing it to negate the one of the C0/C1 PREF preferred signals associated with input child circuit 1006(1).

On the other hand, if both of the C1 REQ Ci and the D(0) signals are asserted, the AND gate 1230 is energized to assert the SEL C1 signal. The asserted SEL C1 signal, in turn, enables the inverter 1227 to disable AND gate 1226, regardless of the condition of the C0 REQ Ci signal, to maintain the SEL C0 PREF EN signal in a negated condition. The negated SEL C0 PREF EN signal disables AND gate 1231, causing it to negate the one of the C0/C1 PREF preferred signals associated with input child circuit 1006(0). On the other hand, inverter 1232 asserts the SEL C1 PREF EN signal, which enables one input terminal of AND gate 1233. The other input terminal of AND gate 1233 is maintained in an enabled condition by an asserted C1 PREF child "C1" preferred signal. The AND gate 1233 is thus energized to assert the one of the C0/C1 PREF signals associated with the input child circuit 1006(1).

As noted above, the other arbitration cells 1216(i,j) are similar. In arbitration cells 1216(i,j) in the second and third levels (for which "i" in the respective reference numeral is "1" or "2"), it will be appreciated that there will be multiple AND gates for each of AND gates 1231 and 1233, one for each of the unary preferred signals received by the respective cell, controlled in parallel by the signals corresponding to the SEL C0 PREF EN and SEL C1 PREF EN signals.

b. Parent Arbitration Circuit 1210

Figure 60:
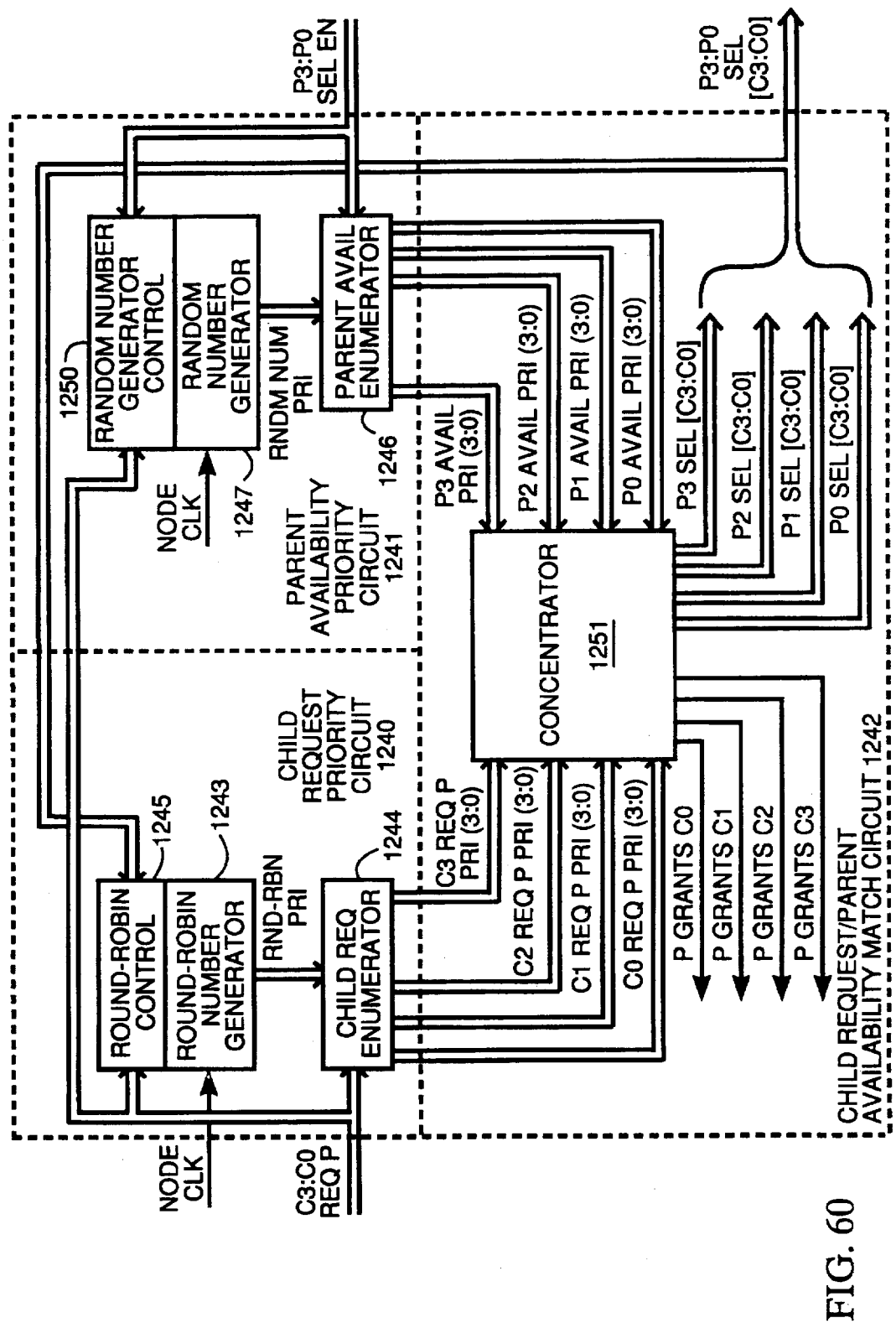

FIG. 60 depicts the detailed circuit of the parent arbitration circuit 1210. With reference to FIG. 60, the parent arbitration circuit 1210 includes a child request priority circuit 1240, a parent availability priority circuit 1241 and a child request/parent availability match circuit 1242. Generally, the child request priority circuit 1240 receives the C3:C0 REQ P child "Ci" requests parent signals from the input child circuits 1006(i) and establishes priorities thereamong. The priorities periodically change, on a round-robin basis. The parent availability priority circuit 1241 receives the P3:P0 SEL EN parent select enable signals from the switching section 1201 and establishes priorities thereamong. The priorities established by the parent availability priority circuit also change periodically, but the priorities are established on a generally random basis. Finally, the child request/parent availability match circuit matches child requests with parents available in the respective priorities, and generates the P3:P0 SEL [C3:C0] signals in response.

More specifically, the child request priority circuit 1240 receives the C3:C0 REQ P child "Ci" request parent signals from the input child circuits 1006(i) and generates, for each, a set of Ci REQ P PRI (3:0) child "Ci" requests parent priority signals. The Ci REQ P PRI (3:0) signals for each input child circuit 1006(i) comprise a plurality of priority signals identified by the mnemonic Ci REQ P PRI (x), each representative of a priority level. The Ci REQ P PRI (x) signals for each input child port 1006(i), and for descending values of "x" represents descending priority levels for the input child port 1006(i).

The child request priority circuit 1240, in response to assertion by at least one input child circuit 1006(i) of a Ci REQ P signal, determines a priority ranking among the input child circuits. In that operation, the child request priority circuit 1040 makes use of a round-robin number generator 1243 and a child request enumerator 1244. The round-robin number generator 1243 generates RND-RBN PRI round-robin priority signals representing a value "i" which identifies one of the input child circuits 1006(i') as having the highest priority. The child request enumerator 1244 receives the RND-RBN PRI signals and asserts the Ci' REQ P PRI (3) signal for that input child circuit 1006(i'). The child request enumerator 1244 also negates the Ci REQ P PRI (3) signals for the other input child circuits 1006(i) (where "i" does not equal "i'")

If any of the other input child circuits 1006(i) are asserting their Ci REQ P child "Ci" requests parent signals, the child request enumerator 1244 asserts the Ci REQ P PRI (x) signals, for "x" and "i" both in descending order (with the value of "i" returning to and descending from the maximum value if the value represented by the value of the RND-RBN PRI signal is less than the maximum value of "i"). Thus, if, for example, the input child circuits 1006(0), 1006(2) and 1006(3) are asserting their Ci REQ P signals, and if the RND-RBN PRI signal has the value "i" equalling "two," indicating that input child circuit 1006(2) has the highest priority, the child request enumerator 1244 will assert the C2 REQ P PRI (3) signal, representative of the highest priority. The child request enumerator will negate the Ci REQ P PRI (3) signals for the other input child circuits.

Continuing with the example, since the input child circuit 1006(1) is not asserting its C1 REQ P signal, the child request enumerator 1244 will negate all of the C1 REQ P PRI (3:0) signals. The assertion by the input child circuit 1006(1) of the C1 REQ P signal will enable the child request enumerator 1244 to assert the C0 REQ P PRI (2) signal, and to negate the Ci REQ P PRI (2) signals for other input child circuits. Further, since the input child circuit 1006(3) is the lowest priority as identified by the value represented by the RND-RBN PRI round-robin priority signal, the asserted C3 REQ P signal enables the child request enumerator to assert the C3 REQ P PRI (1) signal, and to negate the Ci REQ P PRI (1) signals for the other input child circuits. Finally, since only three input child circuits 1006(i) are asserting their Ci REQ P signals, the child request enumerator 1244 does not assert any of the low priority Ci REQ P PRI (0) signals.

The round-robin number generator 1243 is essentially a counter that is enabled to increment by a round-robin control circuit 1245. The round-robin control circuit 1245 receives the Ci REQ P child "Ci" requests parent signals from all input child circuits 1006(i) and the P3:P0 SEL [C3:C0] signals and enables the round-robin number generator 1243 to increment under two circumstances. First, if the round-robin control circuit 1245 determines the condition of the Ci REQ P signal from the input child circuit 1006(i) whose index "i" corresponds to the value represented by the RND-RBN PRI round robin priority signals from the round-robin number generator 1243, and, if it is negated, it enables the round-robin number generator 1243 to increment. Second, the round-robin control circuit 1245 also enables the round-robin number generator 1243 to increment if it determines that one of the P3:P0 SEL [Ci] signals, whose index "i" corresponds to the value represented by the RND-RBN PRI round robin priority signals, is asserted.

The parent availability priority circuit 1241 receives the P3:P0 SEL EN parent select enable signals from the switching section 1201 and generates, for each, a set of Pi AVAIL PRI (3:0) parent "Pi" availability priority signals. The Pi AVAIL PRI (3:0) signals for each "Pi" comprise a plurality of priority signals identified by the mnemonic Pi AVAIL PRI (x), each representative of a priority level. The Pi AVAIL PRI (x) signals for each "Pi," and for descending values of "x" represents descending priority levels for the "Pi."

The parent availability priority circuit 1242 operates in a manner generally similar to that of the child request priority circuit, except that the parent "Pi" having the highest priority is selected at random. The parent availability priority circuit 1242 includes a parent availability enumerator 1246 that operates in response to the P3:P0 SEL EN parent "Pi" select enable signal and RNDM NUM PRI random-number priority signals representing a random number. The parent availability enumerator 1246 operates in response to these signals in the same way that the child request enumerator 1244 operates in response to the Ci REQ P and RND-RBN PRI signals, respectively. The parent availability enumerator 1246 generates Pi AVAIL PRI (3:0) parent "Pi" availability priority signals which identify the priority level for each "Pi," in a manner similar to the priorities for each "Ci" as identified by Ci REQ P PRI (3:0) signals produced by child request enumerator 1244.

As noted above, the parent "Pi" having the highest priority, as established by the parent availability priority circuit 1241, is selected at random. This selection is enabled by the random values represented by the RNDM NUM PRI random number priority signals. The RNDM NUM PRI signals are generated by a random number generator 1247, under control of a control circuit 1250. The control circuit 1250 receives the Ci REQ P request signals and the Pi SEL EN select enable signals and enables the random number generator 1247 to generate a new random number in response to the coincidence of the conditions that (a) at least one of the Ci REQ P signals is asserted and (b) at least two of the Pi SEL EN select enable signals is asserted.

The child request/parent availability match circuit 1242 includes a concentrator 1251 that receives all of the Ci REQ P PRI (3:0)) input child "Ci" requests parent priority signals for all input child circuits 1006(i), and all of the Pi AVAIL PRI (3:0) parent "Pi" availability priority signals for all "Pi" and generates in response thereto the Pi SEL [C3:C0] select signals that control the switching section 1201. In generating the Pi SEL [C3:C0] select signals, the concentrator 1251 effectively determines the one of the $Cx_3$ REQ P PRI (3:0) signals having the highest priority and the one of the $Py_3$ AVAIL PRI (3:0) signals having the highest priority, and asserts the $Py_3$ SEL $Cx_3$ signal. This signal enables switching cell 1202($x_3$,$y_3$), so that the data router message packet 30 from input child circuit 1006($x_3$) to be coupled through the switching section 1201 and transmitted through output parent circuit 1011($y_3$). The concentrator 1251 does the same in connection with the remaining Ci REQ P PRI (3:0) signals.

The concentrator 1251 also generates the P GRANTS Ci parent grants child "Ci" signals, which are used by the switch control section 1200 (FIG. 56) in generating the Ci REQ GRANTED signal. In particular, the concentrator 1251 generates each P GRANTS Ci signal as essentially the OR of the Pj SEL Ci parent "Pj" selects child "Ci" signals for all parents "Pj."

As noted above, in one embodiment of data router 15 the fan-out, going up the fat-tree defining the data router, may vary from level to level. At some levels, the fan-out is four, so that the data router node 22(i,j,k) will have four input child circuits 1006(i) and four output parent circuits 1011(i). At other levels, the fan-out is two, so that the data router node 22(i,j,k) will have four input child circuits 1006(i) but only two active output parent circuits 1011(i). In that embodiment, the data router nodes 22(i,j,k) are all implemented in the circuitry, and so the circuitry for the other two output parent circuits 1011(i) will be present, but rendered inactive by the node control circuit 1003 (FIG. 45). In that case, the Pi SEL EN select enable signals for the inactive output parent circuits 1011(i) will be continually negated, and the parent availability enumerator 1246 will maintain the Pi AVAIL PRI (3:0) signals in a negated condition. Since, in those levels, there will be fewer output parent circuits 1011(i) that input child circuits 1006(i), the round-robin priority maintained for the input child circuits 1006(i) by the child request priority circuit 1240 will ensure that the input child circuits 1006(i) will have be able to transmit their data router message packets 30 on a reasonably equal basis.

In addition, it will be appreciated that the random-number priority provided for the Pi AVAIL PRI (3:0) signals, under control of the random number generator 1247, will ensure that the data router message packets 30 going up the tree defining data router 15 are distributed randomly among the data router nodes 22(i,j,k). This minimizes the likelihood of bottlenecks developing as data router message packets 30 are transmitted up the tree.

iii. Switch Cell 1202(i)

Figure 61:
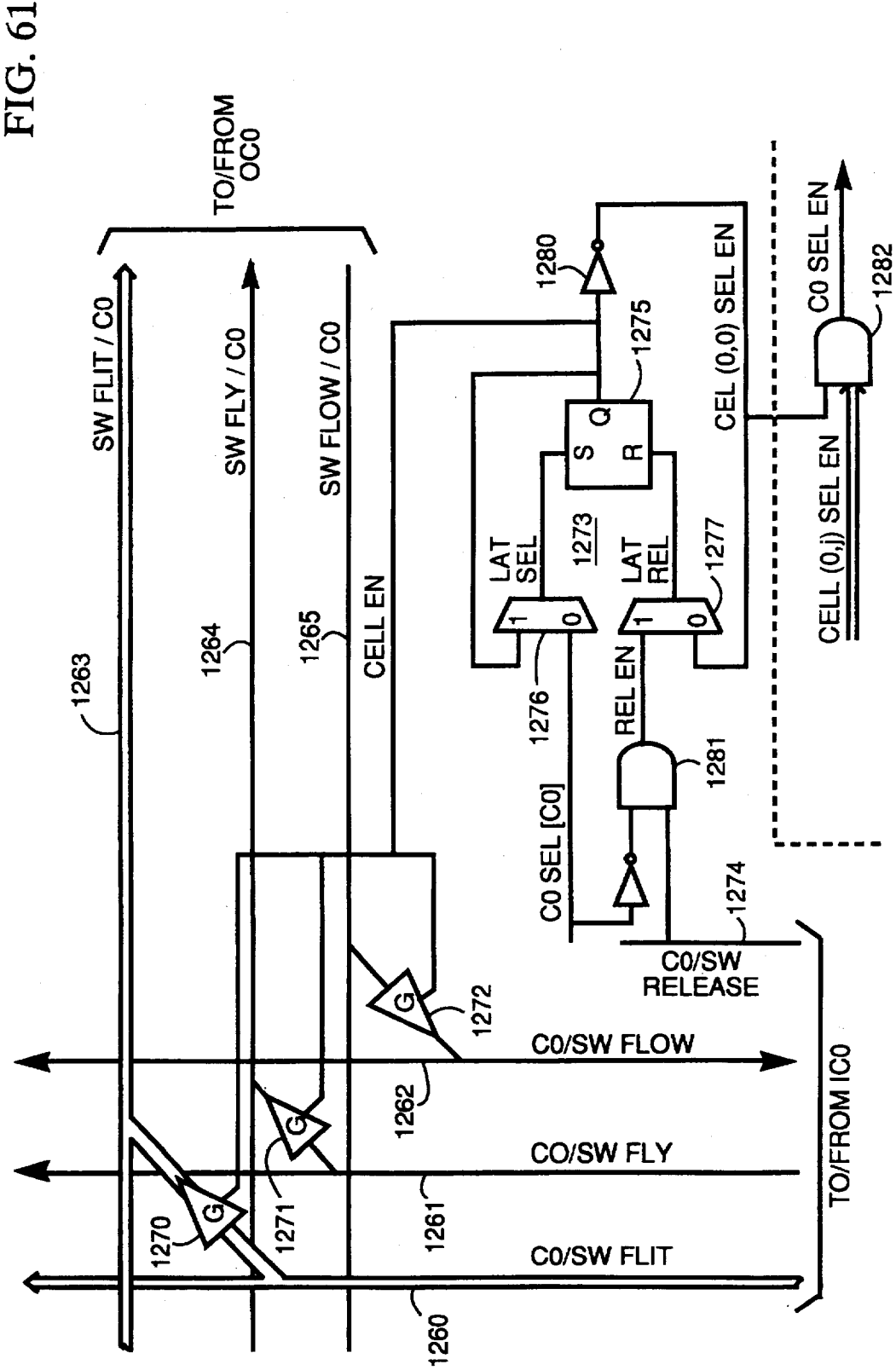

FIG. 61 depicts the detailed circuit of a switch cell 1202(0,0) in the switching section 1201 (FIG. 56). All of the switch cells 1202 are generally similar. With reference to FIG. 61, the switch cell 1202(0,0) receives the C0/SW FLIT input child "C0" flit to switch signals in parallel on a bus 1260, the C0/SW FLY input child "C0" fly to switch signal on a line 1261, and C0/SW FLOW flow from switch to input child "C0" signal on a line 1262. It will be appreciated that bus 1260 and lines 1261 and 1262 extend through all switching cells 1202(0,j) in the row of switching section 1201 associated with input child circuit 1006(0). The switch cell also includes a bus 1263 that carries SW FLIT/C0 flit from switch to output child "C0" signals, a line 1264 that carries a SW FLY/C0 fly from switch to output child "C0" signal; and a line 1265 that carries a SW FLOW/C0 flow to switch from output child "C0" signal. Similarly, bus 1263 and lines 1264 and 1265 extend through all switching cells 1202(i,0) in the column of switching cells associated with output child circuit 1007(0).

The switch cell 1202(0,0) also includes three gated driver circuits 1270, 1271 and 1272, that are controlled in parallel by a CELL EN cell enable signal. Gated driver circuit 1270 has an input terminal connected to bus 1260, and, when enabled, couples the C0/SW FLIT signals through its output terminal onto the bus 1263 as the SW FLIT/C0 signals. Similarly, gated driver circuit 1271 has an input terminal connected to line 1261 and, when enabled, couples the SW FLY/C0 signal through its output terminal onto to line 1264 as the SW FLY/C0 signal. Finally, gated driver 1272 has an input terminal connected to line 1262 and, when enabled, it couples the SW FLOW/C0 signal through its an output terminal onto line 1265 as the C0/SW FLOW signal.

As noted above, the gated drivers 1270, 1271 and 1272 are controlled in parallel by the CELL EN cell enable signal. The CELL EN signal is controlled by a cell control circuit 1273. The cell control circuit 1273 asserts the CELL EN signal upon receipt of an asserted C0 SEL [C0] signal from arbitration circuit 1211(0), and negates the CELL EN signal upon receipt of an asserted C0/SW RELEASE release to switch from input child "CO" signal on a line 1274. As with bus 1260 and lines 1261 and 1262, the line 1274 extend through all switching cells 1202(0,j) in the row of switching section 1201 associated with input child circuit 1006(0).

The control circuit 1273 includes a flip-flop 1275 whose data output terminal provides the CELL EN cell enable signal. If the switch cell 1202(0,0) is not enabled, the flip-flop 1275 is reset to negate the CELL EN signal. In that condition, a multiplexer 1276 is in condition to couple the C0 SEL [C0] signal as a LAT SEL latch select signal to the flip-flop's direct set terminal. The CELL EN cell enable signal is also complemented by an inverter 1280 to provide an asserted CELL(0,0) SEL EN cell (0,0) select enable signal, which is coupled by a multiplexer 1277 as a LAT REL latch release signal to the direct reset terminal of flip-flop 1275 to maintain the flip-flop in a reset condition.

When the C0 SEL [CO] signal is asserted to enable switch cell 1202(0,0) the multiplexer 1276 asserts the LAT SEL signal, which sets the flip-flop 1276 to assert the CELL EN signal and enable gated drivers 1270, 1271 and 1272. In addition, the asserted CELL EN signal enables the multiplexer 1276 to couple the CELL EN signal as the LAT SEL latch select signal to maintain the flip-flop 1275 in the set condition. In addition, inverter 1280 negates the CELL (0,0) SEL EN signal.

The negated CELL (0,0) SEL EN signal enables multiplexer 1277 to couple a REL EN release enable signal from an AND gate 1281 signal as the LAT REL latch release signal. The REL EN signal is generated by an AND gate 1281. AND gate 1281 is energized, to assert the REL EN signal in response to the coincidence of the negation of the C0 SEL [C0] output child "C0" select input child "C0" signal and the assertion of the C0/SW RELEASE release from input child "C0" to switch signal. Thus, if either the C0 SEL [C0] signal is asserted, indicating that the switch cell 1202(0,0) is being selected by switch control section 1200 (FIG. 56) or the C0/SW RELEASE signal is negated, indicating that the switch cell is being released, the AND gate 1281 maintains the REL EN signal in a negated condition.

When, after selection of the switch cell 1202(0,0), the input child circuit 1006(0) asserts the C0/SW RELEASE signal at the end of a data router message packet 30, if the C0 SEL [C0] signal is negated the AND gate 1281 is energized to assert the REL EN signal. When that occurs, the multiplexer 1277 asserts the LAT REL signal to reset the flip-flop 1275 to negate the CELL EN cell enable signal, which, in turn, disables gated drivers 1270, 1271 and 1272. In addition, the negated CELL EN signal enables the inverter 1280 to assert the CELL (0,0) SEL EN signal. In that condition, the multiplexer 1276 couples the negated C0 SEL [C0] signal as the LAT SEL to the direct set input terminal of flip-flop 1275, and the multiplexer 1277 couples the asserted CELL (0,0) SEL EN signal as the LAT REL signal to the flip-flop's direct reset terminal, to maintain the flip-flop 1275 in the reset condition.

It will be appreciated that, when the input child circuit 1006(0) asserts the C0/SW REI RELEASE signal at the end of a data router message packet 30, if the C0 SEL [C0] signal is asserted the AND gate 1281 remains de-energized, to maintain the REL EN signal in a negated condition. When that occurs, the arbitration circuit 1211(0) is maintaining selection of switch cell 1202(0,0) for the next data router message packet 30 from input child circuit 1006(0), and so the switch control circuit 1273 maintains the gated drivers 1270, 1271 and 1272 enabled.

As noted above, when the flip-flop 1275 negates the CELL EN cell enable signal at the end of a data router message packet 30, inverter 1280 asserts the CELL (0,0) SEL EN select enable signal indicating that the switch cell 1202(0,0) is in a released condition. As shown on FIG. 61, the CELL (0,0) SEL EN signal is coupled to an AND gate 1282, which receives corresponding CELL (0,j) SEL EN signals from the other switching cells 1202(0,j) in the same column of switching section 1201 and generates the CO SEL EN select enable signal when all of these signals are asserted. It will be appreciated that all of the switching cells 1202(0,j) in that column will be connected to the same output child circuit 1007(0), and so if the C0 SEL EN signal is asserted, all of the switch cells 1202(0,j) in the column will be in the released condition. As noted above, the assertion of the C0 SEL EN signal enables the arbitration circuit 1211(0) to perform select an input child or parent circuit 1006(i) or 1010(i) to begin transmitting a data router message packet 30 through a switching cell 1202(0,j) in the column to the output child circuit 1007(0).

4. Output Child Circuit 1007(0)

Figure 62:
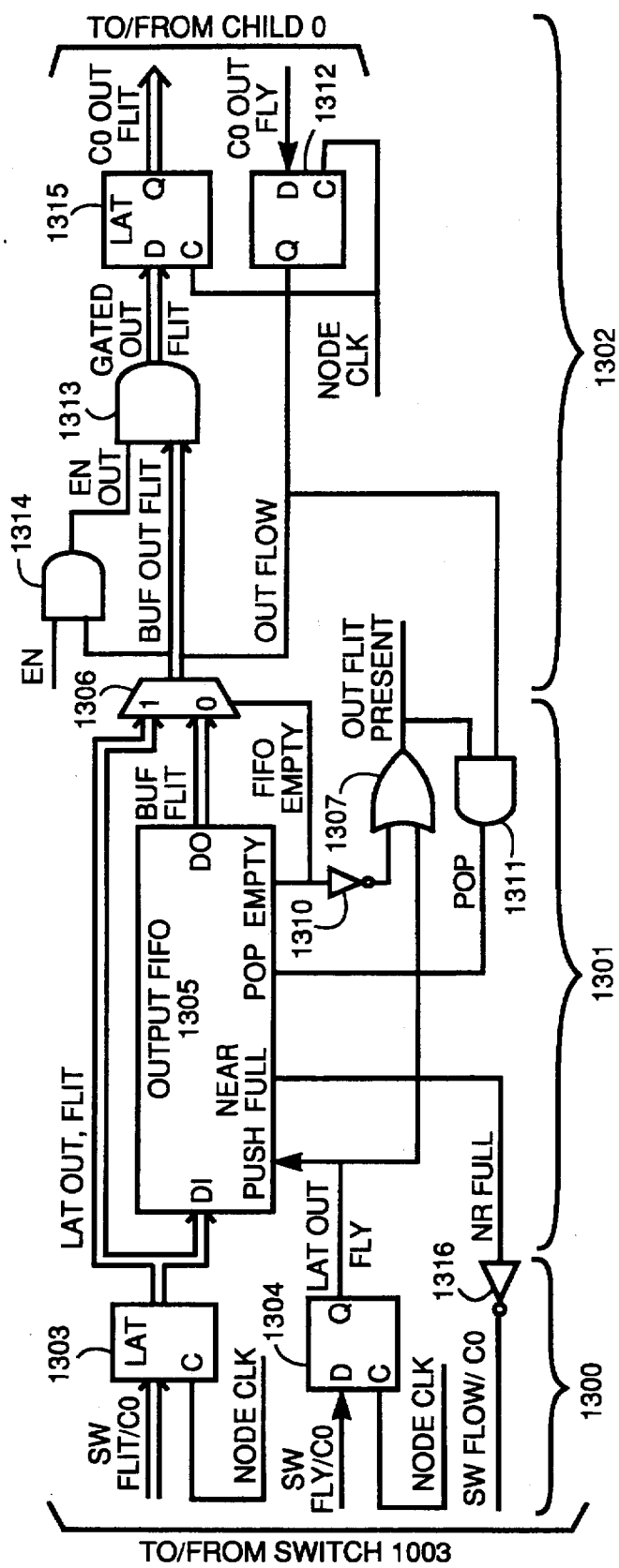

FIG. 62 depicts a detailed diagram of output child circuit 1007(0). With reference to FIG. 62, the output child circuit 1007(0) includes a switch interface section 1300, a buffer section 1301 and an output interface section 1302. Generally, the switch interface section 1300 receives flits of data router message packets 30 from the switching section, provided from an input child or parent circuit 1006(i) or 1010(i), and couples them to the buffer section 1301. If the C0 OUT FLY signal from child data router node 22(i,j,k) connected to the output child circuit 1007(0) is asserted, indicating that it can receive the flit, the output interface section 1302 receives the flit from the buffer section and transmits it as C0 OUT FLIT signals. In addition, the buffer section 1302 enables the switch interface section 1300 to maintain the SW FLOW/C0 signal asserted, which indicates that the output child circuit 1007(0) is able to receive additional flits.

On the other hand, if the CO OUT FLY signal becomes negated, indicating that the child data router node 22(i,j,k) is unable to receive additional flits, the output interface section enables the buffer section 1301 to begin buffering flits from the switch interface section. If the C0 OUT FLY signal is later asserted, the output interface section 1302 enables the buffer section 1301 to resume providing flits for it to transmit, which the buffer section 1301 provides from the flits it has buffered. If at some point the buffer section 1301 has buffered a number of flits, such that it becomes nearly full, it negates the SW FLOW/CO signal, which is coupled through the switch 1003 to the input child or parent circuit 1006(i) or 1010(i) supplying the flits. The negated SW FLOW/C0 signal disables the input child or parent circuit 1006(i) or 1010(i). If the number of flits buffered in the buffer section 1301 thereafter is reduced, the buffer section 1301 may thereafter enable the switch interface section to assert the SW FLOW/C0 signal to, in turn, enable the input child or parent circuit 1006(i) or 1010(i) to resume supply flits for transmission to the child data router node 22(i,j,k).

More specifically, the switch interface section 1300 includes a latch 1303 that latches the SW FLIT/C0 flit from switch to output child "C0" signals and a latch 1304 that latches the SW FLY/CO fly from switch to output child "CO" signal from the switch 1003 in response to the successive ticks of the NODE CLK signal. In addition, the switch interface section 1300 provides the SW FLOW/CO signal to the switch 1003. As described above in connection with FIG. 61, the enabled switch cell in switch 1003 couples the SW FLOW/CO signal to the appropriate input child or parent circuit 1007(i) or 1011(i) as the Ci/SW FLOW or the Pi/SW FLOW signal. In response, the input child or parent circuit couples signals which the enabled switch cell will couple to the output child circuit 1007(0) as the SW FLIT/ C0 and SW FLY/C0 signal. Accordingly, it will be appreciated that, if the SW FLY/C0 signal is asserted at a tick of the NODE CLK signal, the SW FLIT/C0 signals represent a flit of a data router message packet 30 being transmitted by the source input child or parent circuit.

The SW FLIT/C0 signals are latched by latch 1303 at every tick of the NODE CLK signal. Latch 1303 provides, at its output terminals, LAT OUT FLIT latched output flit signals. The LAT OUT FLIT signals are coupled to one input terminal of a multiplexer 1306. If a first-in first-out buffer 1305 is empty, it asserts a FIFO EMPTY signal, enabling the FIFO 1306 to couple the LAT OUT FLIT signals as BUF OUT FLIT buffered output flit signals to a gated driver 1313.

A latch 1312 latches the CO OUT FLY signal from the child data router node 22(i,j,k) at each tick of the NODE CLK signal. If the C0 OUT FLY signal is asserted when the latch 1312 is enabled by the ticks of the NODE CLK signal, the latch 1312 maintains the OUT FLOW signal asserted. If the OUT FLOW signal, and if an EN enable signal is asserted by node control circuit 1004 (FIG. 45) an AND gate asserts an EN OUT enable out signal. The asserted EN OUT signal, in turn, enables the gated driver 1313 to couple the BUF OUT FLIT signals as GATED OUT FLIT signals to data input terminals of a latch 1315. The latch 1315, in turn, latches the GATED OUT FLIT signals at each tick of the NODE CLK signal, and transmits the latched signals as CO OUT FLIT signals to the child data router node 22(i,j,k) connected thereto.

Contemporaneously, since the SW FLIT/C0 signals at that point represent a flit of a data router message packet 30, the SW FLY/CO signal is also asserted. The asserted SW FLY/C0 signal enables a latch 1304 to be set in response to the NODE CLK signal to assert a LAT OUT FLY latched output fly signal. The asserted LAT OUT FLY signal is coupled to the buffer section 1301, in particular to a push enable terminal of a first-in first-out buffer (FIFO) 1305, to enable the FIFO 1305 to buffer the flit represented by the LAT OUT FLIT signals.

The asserted LAT OUT FLY signal also energizes an OR gate 1307 to assert and OUT FLIT PRESET signal. The asserted OUT FLIT PRESENT signal enables one input terminal of an AND gate 1311. The second input terminal of AND gate 1311 is controlled by the OUT FLOW signal from the output interface section 1302, which at that point is asserted, energizing the AND gate to assert a POP signal. The POP signal enables the FIFO 1305 to transmit the buffered flit as BUF FLIT signals. In addition, the FIFO 1305 negates the FIFO EMPTY signal, enabling the multiplexer 1306 to thereafter couple the LAT OUT FLIT signals as the BUF OUT FLIT signals.

It will be appreciated that connecting multiplexer 1306 to selectively couple the LAT FLIT OUT signals or the BUF FLIT signals as the BUF OUT FLIT signals, in response to a FIFO EMPTY signal indicating whether the FIFO 1305 is empty, enables the signals from the switch 1003 to be coupled to the BUF OUT FLIT signals directly, through multiplexer 1306, without requiring them to be first buffered in FIFO 1305. This will eliminate any propagation delay through the FIFO 1305 if the FIFO 1305 is empty.

On the other hand, if the C0 OUT FLY signal is negated, the latch 1312 will negate the OUT FLOW. The disabled OUT FLOW signal disables AND gate 1314 to negate the EN OUT signal, which, in turn, disables gated driver 1313 from coupling the BUF OUT FLIT signals as the GATED OUT FLIT signals. Accordingly, the latch 1315 thereafter transmits negated CO OUT FLIT signals to the child data router node 22(i,j,k) connected thereto.

The negated OUT FLOW signal also disables AND gate 1311, thereby negating the POP signal. Accordingly, while the latch 1304 is asserting the LAT OUT FLY signal, FIFO 1305 is enabled to buffer the LAT OUT FLIT signals, which represent successive flits of one or more data router message packets 30, at successive ticks of the NODE CLK signal. If the FIFO 1305 becomes nearly full, it asserts a NR FULL signal, which is complemented by an inverter 1316 to negate the SW FLOW/C0 signal. The negated SW FLOW/CO signal, in turn, disables the input child or parent circuit 1006(i) or 1010(i) from continuing to couple flits thereto. In addition, the SW FLY/C0 signal will be negated, enabling the latch 1304 to negate the LAT OUT FLY signal, which disables the FIFO 1305 from latching the LAT OUT FLIT signals.

When the child data router node 22(i,j,k) again asserts the C0 OUT FLY signal, the latch 1312 asserts the OUT FLOW signal at the next tick of the NODE CLK signal. The asserted OUT FLOW signal energizes AND gate 1314 to assert the EN OUT enable out signal, which, in turn, enables gated driver 1313. The asserted OUT FLOW signal also enables one input terminal of AND gate 1311. Since at this point the FIFO 1305 is not empty, the FIFO negates the FIFO EMPTY signal, which is complemented by inverter 1310 to energize OR gate 1307 to assert the OUT FLIT PRESENT signal. The asserted OUT FLIT PRESENT signal also energizes the second input terminal of AND gate 1311, enabling it to assert the POP signal. While the POP signal is asserted, the FIFO 1305, at successive ticks of the NODE CLK signal, transmits BUF FLIT signals representing the successive flits buffered therein as the BUF FLIT buffered flit signals. In addition, the negated FIFO EMPTY signals enables the multiplexer 1306 to couple the BUF FLIT signals as the BUF OUT FLIT signals to gated driver 1313. Since the gated driver is enabled, it couples the BUF FLIT OUT signals as the GATED OUT FLIT signals to latch 1315.

When the contents of the FIFO 1305 has been reduced below a predetermined number of buffered flits, it will negate the NR FULL signal, enabling, in turn, the inverter 1316 to assert the SW FLOW/CO signal. The asserted SW FLOW/C0 signal is coupled through the switch 1003 to enable the appropriate input child or parent circuit 1006(i) or 1010(i) to resume transmitting flits thereto.

When the FIFO 1305 thereafter becomes empty, it re-asserts the FIFO EMPTY signal, which conditions multiplexer 1306 to resume coupling the LAT OUT FLIT signals as the BUF OUT FLIT signals.

D. Control Network

1. General

Figure 63:
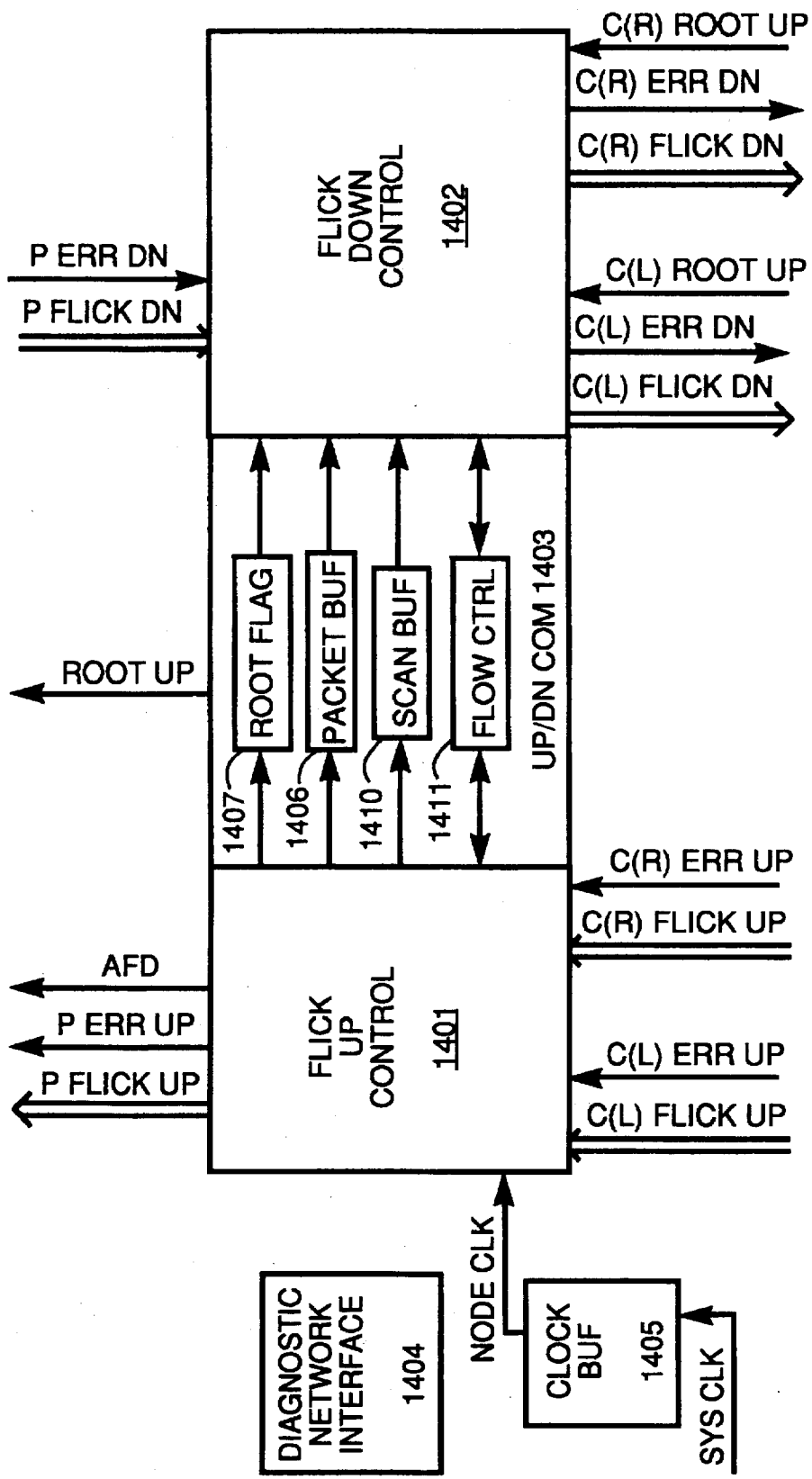
FIG. 63 is a general block diagram of a control network node used in the control network described in connection with FIGS. 5 and 6, and FIG. 65 through FIG. 77 comprise detailed block and logic diagrams of the control router node.

FIG. 63 is a general block diagram of a control network node 51 used in the control network 14 described above, and FIGS. 64 through 77 comprise detailed block and logic diagrams of the control network node 51. With reference to FIG. 63, the control network node 51 includes a flick up control portion 1401, a flick down control portion 1402 and an up/down common portion 1403. The control network node 51 also includes a diagnostic network interface 1404, which provides an interface to the diagnostic network 16. In addition, the control network node 51 includes a clock buffer 1405 that receives the SYS CLK system clock signal from the clock circuit 17 (FIG. 1) and generates a NODE CLK node clock signal in response. In one particular embodiment, the clock buffer 1405 comprises a buffer as described in aforementioned Hillis, et al., patent application Ser. No. 07/489,079, filed Mar. 5, 1990, entitled Digital Clock Buffer Circuit Providing Controllable Delay. It will be appreciated that if all control network nodes 51 in a control network node group 50 (FIG. 6) are packaged together on, for example, a single integrated circuit chip, as is the case in one embodiment, the chip may be provided with one clock buffer 1405 which can provide the NODE CLK signal to all control network nodes 51 in the control network node group 50.

Generally, the flick up control portion 1401 receives control network message packets 60 from its child nodes and generates a control network message packet 60 in response. If the control network node 51 is not a root node, the flick up control portion 1401 transmits the generated control network message packet 60 to the parent control network node, thereby transmitting the packet up the tree defining the control network 14. On the other hand, if the control network node 51 is a root node, the flick up control portion 1401 transmits the generated control network message packet 60 to the flick down control portion 1402 of the same control network node 51 for transmission down the tree comprising the partition of the control network 14 of which the control network node 51 is the root node. In addition, if the control network message packets 60 enable the node 51 to perform a scan operation, the flick up control portion 1401 generates scan data and provides it to the flick down control portion 1402.

The flick down control portion 1402 receives control network message packets 60 and generates control network message packets 60 representative thereof for transmission to the child control network nodes, thereby transmitting message packets down the tree defining control network 14. If the control network node 51 is not a root node, the flick down control portion 1402 uses control network message packets 60 from the parent node. On the other hand, if the node 51 is a root node, it uses the control network message packets 60 from the flick up control portion 1401 of the node 51. In addition, if the node 51 is not a root node, if the control network message packets 60 enable a scan operation, the flick down control portion 1402 uses scan data provided by the flick up control portion 1402.

The common portion 1403 provides communications between the flick up control portion 1401 and the flick down control portion 1402. The common portion 1403 transmits control network message packets 60 and scan data from the flick up control portion 1401 to the flick down control portion 1402. In addition, if the flick up control portion 1401 determines that the node 51 is to be a root node, the common portion 1403 notifies the flick down control portion 1402 and enables it to begin receiving control network message packets 60 provided by the flick up control portion 1401.

More specifically, the flick up control portion 1401 receives C(L) FLICK UP (4:0) signals representing successive flicks of control network message packets 60 (FIG. 7) from a left child control network node 51 and C(R) FLICK UP (4:0) signals representing successive flicks of control network message packets 60 from a right child control network node 51 and, in response thereto, generates P FLICK UP (4:0) signals. If the control network node 51 is not a root node, it transmits the P FLICK UP (4:0) signals to the parent control network node. On the other hand, if the control network node 51 is a root node, it buffers the P FLICK UP (4:0) signals in a packet buffer 1406 in the up/down common portion 1403. In either case, if the received message packets 60 are of the multiple-source type ("multiple-source messages") initiating scan operations, the control network node 51 also loads data generated in response to the message packets in a scan buffer 1410 in the common portion 1403.

In addition, the flick up control portion 1401 also controls establishment or elimination of the control network node 51 as a root node. If it receives a control network message packets 60 that it determined to be of the single source message type ("single-source message") and configuration packet type, which establishes or eliminates the control network node 51 as a root node, the flick up control portion 1401 conditions a root flag 1407 in the common portion 1403, and enables assertion or negation of a ROOT UP signal. The root flag 1407 controls selection by the flick down control portion 1402 of the source of control network message packets 60 received thereby.

The ROOT UP signal provided by the control network node 51 is received by the parent node. If the ROOT UP signal is asserted, indicating that the node 51 is a root node, the parent node internally couples to its flick up control portion control network message packets 60 of the abstain type. In addition, the parent node is thereafter enabled to transmit control network message packets of the nil packet type to the flick down control portion 1402. It will be appreciated that, if the parent's other child node is not a root node, the parent node will continue transmitting to that other child node control network message packets 60 of message types representative of the packets it receives from its parent, or representative of the packets its flick up control portion receives if it is also a root node. If the control network node 51 thereafter negates the ROOT UP signal, the parent node continues transmitting, to the child node comprising a root node, control network message packets of the nil packet type, until it is ready to begin transmission of a control network message packet 60 of another type. Thus, the parent node does not begin transmission of a control network message packet 60 to a child node 51, whose status as a root node has been eliminated, in the middle of the packet; instead, the parent node waits until the beginning of the next packet after the end of the packet it is then transmitting.

The flick up control portion 1401 also generates, in response to receipt of a control network message packet 60 in which the all-fall-down bit 81 (FIG. 7) is set, an AFD all-fall-down signal which may be coupled to the data router 15.

The flick down control portion 1402 receives P FLICK DN (4:0) signals or, if the control network node 51 is a root node, signals buffered in the packet buffer 1406, and data buffered in the scan buffer 1410. In response, the flick down control portion 1402 transmits C(L) FLICK DN (4:0) signals representing flicks of a control network message packet 60 (FIG. 5) to a left child control network node 51 and C(R) FLICK DN (4:0) signals representing flicks of a control network message packet 60 to a right child control network node 51.

The flick down control portion 1402 also receives a C(L) ROOT UP signal from the left child node and a C(R) ROOT UP signal from the right child node, which are used to control the types of message packets transmitted to the respective child nodes. If the C(x) ROOT UP signal ("x" referring to "R" or "L") is asserted, the respective child node is a root node, and in that case the flick down control portion 1402 transmits message packets of the NPAC nil packet type to the child node.

Otherwise, if the control network node 51 itself is a root node, the flick down control portion 1402 receives control network message packets from the packet buffer 1406 and uses them to generate message packets for transmission to the child nodes. If the message packet received by the flick down control portion 1402 is of the single-source or idle types, it transmits it to the child nodes that are not asserting their C(x) ROOT UP signals. On the other hand, if the received message packet is a multiple-source message, the flick down control portion 1402 uses the message packet from the packet buffer 1406 in generating multiple source message packets for transmission to the child nodes that are not asserting their C(x) ROOT UP signals.

Both the flick up control portion 1401 and the flick down control portion 1402 also exchange flow control information over a link 1411, that they provide in the scan flow bits 72(i) (FIG. 7) in the control network message packets 60 that they transmit. In addition, each portion 1401 and 1402 provides the flow control information from the control network message packets 60 that they receive to the other portion, which uses the information in regulating the transmission of packets 60. The respective portions remain disabled, until the other portion receives flicks in which the scan flow bit 72(i) is clear, after which they resume transmission.

In the control network nodes 51 comprising the control network 14, the flow control is on a control network message packet basis, so that if a control network node 51 begins transmission of a control network message packet 60 to another node, the receiving node receives the entire packet. Thus, if the receiving node transmits a control network message packet 60 to the transmitting node in which the scan flow bit 72(i) is set, to disable transmission by the transmitting node, the transmitting node will continue transmission of the packet it is currently transmitting and will thereafter become disabled.

In addition, the flow control only controls transmission of message packets 60 of the multiple source type. If a disabled node is to transmit a message packet of a type other than multiple source, it transmits it in the same manner as if it were not disabled. On the other hand, if the is the next message packet to be transmitted by a disabled node is of the multiple source type, it delays transmission and instead transmits message packets of the idle type. When the receiving node at some point later indicates that it can resume reception, after it finishes transmission of the current idle message packet, the transmitting node transmits the delayed multiple source message packet 60.

The details of several elements depicted on FIG. 63 will be described in connection with FIGS. 64 through 77. In particular, the flick up control portion 1401 will be described in connection with FIGS. 64 through 69. The details of the root flag 1407 and control circuitry therefor will be described in connection with FIG. 75. Finally, the details of the flick down control portion will be described in connection with FIGS. 64 through 77.

2. flick up control portion 1401 i. General

Figure 64:
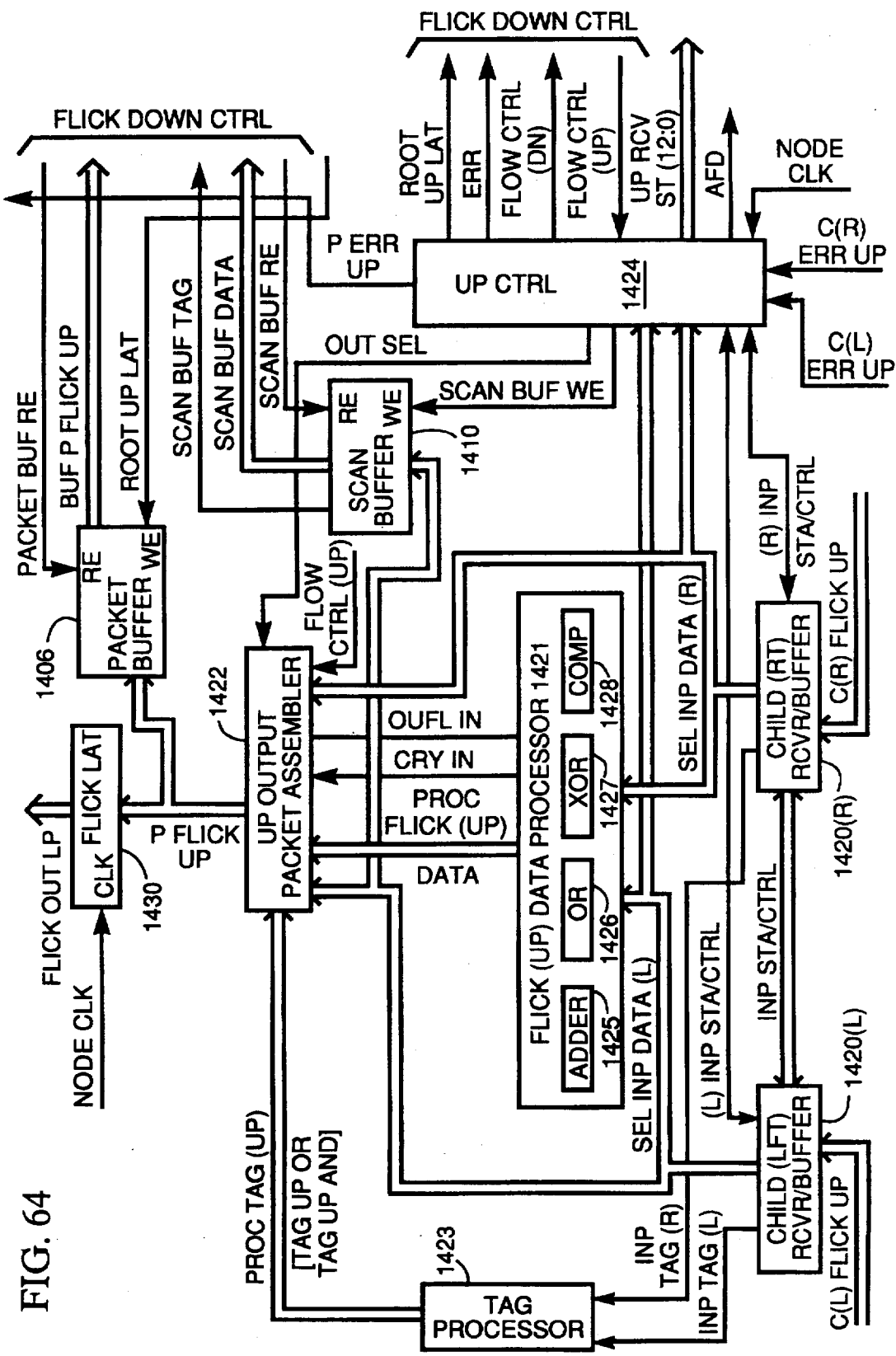

FIGS. 64 depicts a general block diagram of the flick up control portion 1401, and FIGS. 65 through 69 depict detailed block and logic diagrams of the flick up control portion 1401. With reference to FIG. 64, the flick up control portion 1401 includes a child (left) receiver/buffer 1420(L) which receives the C(L) FLICK UP (4:0) signals from the left child control network node 51 and a child (right) receiver/buffer 1420(R) which receives the C(R) FLICK UP (4:0) signals from the right child control network node 51. The receiver/buffers, which are generally identified by reference numeral 1420(x) are generally similar, and will be described below in connection with FIGS. 65 through 72.

Generally, each receiver/buffer 1420(x) receives the C(x) FLICK UP signals from the respective left or right child control network node 51 representing successive flicks of control network message packets 60. In response, the buffer/receivers 1420(x) provides SEL INP DATA (x) selected input data signals to a flick up data processor 1421 and to an up output packet assembler 1422, and INP TAG (x) input tag signals to a tag processor 1423. In addition, the receiver/buffers 1420(x) provide (X) INP STA/CTRL left and right status/control signals to an up control circuit 1424 identifying the timing of receipt of the respective control network message packets 60, and the respective .types of message packets being received.

In response to the (X) INP STA/CTRL status/control signals identifying the types of message packets being received by the respective buffer/receivers 1420(x), the up control circuit 1424 provides OUT SEL output select signals that identifies a message type to be generated by the up output packet assembler 1422. The up output packet assembler 1422 begins generating P FLICK UP signals for a control network message packet 60 of the type identified by the OUT SEL signals. A flick latch 1430 latches P FLICK UP signals at each tick of the NODE CLK signal, and transmits the latched signals to its parent node as FLICK OUT (P) flick out to parent signals.

In addition, as the up output packet assembler 1422 generates P FLICK UP signals representing the sequential flicks of the control network message packet 60, the OUT SEL signals enable it to use the SEL INP DATA (x) signals from the left or right child buffer/receiver 1420(x) or PROC FLICK (UP) DATA processed flick data signals form the flick (up) data processor 1421. The PROC FLICK (UP) DATA signals represent the sum, logical OR, logical XOR and maximum of the SEL INP DATA (x) signals, as generated by an adder 1425, an OR circuit 1426, an XOR circuit 1427 and a comparator 1428, respectively. The OUT SEL output select signals may enable the up output packet assembler 1422 to use the PROC FLICK (UP) DATA signals from one of these circuits 1425 through 1428 in a control network message packet 60 it is currently generating.

It will be appreciated that the PROC FLICK (UP) DATA signals from the flick (up) data processor 1421 are used in connection with control network message packets 60 of the multiple-source message type and scan and reduce packet types. The flick (up) data processor 1421 provides the combination, as called for by the scan or reduce operation initiated by the received message packets 60, of the data in the data nibbles 70(i) (FIG. 7). Thus, the up control circuit 1424 enables the up output packet assembler 1422 to use the PROC FLICK (UP) DATA signals in a control network message packet 60 if the packets 60 received from the children are of the appropriate message and packet types.

The particular type of control network message packet 60 identified by the OUT SEL output select signals from the up control circuit 1424 depend on the types of packets 60 received by the receiver/buffers 1420(x) and by a selected priority arrangement. In one particular embodiment, if both receiver/buffers 1420(x) receive message packets 60 of the same message type, the OUT SEL signals will generally enable the up output packet assembler 1422 to generate P FLICK UP signals for a control network message packet 60 of that type. If, for example, the receiver/buffers 1420(x) both receive single-source messages, the up control circuit 1424 will enable the up output packet assembler 1422 to transmit a single-source message.

In that case, if the message packet is of the configuration packet type, the up control circuit 1424 will also enable the up output packet assembler to use a signal, provided by the comparator 1428 identifying which of the SEL INP DATA (L) and SEL INP DATA (R) selected input data signals represents the larger value, and uses the identified selected input data signals in the outgoing control network message packet 60. Thus, the root height value provided in data nibbles 70(0) and 70(1) is the maximum of the values in the control network message packets 60 received by the receiver/buffers 1420(x). However, if the root height values in the received message packets differ, an error has occurred in the system 10. In that case the up control circuit 1424 generates an ERR error signal, which enables the flick down control portion 1422 to set the S ERR software error bit 76 in the control network message packets 60 it is transmitting.

Similarly, if the control network message packets 60 being received by the receiver/buffers 1420(x) are of the multiple-source message type, and of the same packet type, the up control circuit 1424 generates OUT SEL signals that enable the up output packet assembler 1422 to generate P FLICK UP signals representing a control network message packet 60 of the same message and packet type. The up control circuit 1424 enables the up output packet assembler 1422 to include, in the packet data portion 62 (FIG. 7), PROC FLICK (UP) DATA processed flick up data signals from the flick (up) data processor 1421. The particular one of circuits 1425 through 1428 whose PROC FLICK (UP) DATA signals are used depends upon the particular type of scan or reduce operation is enabled by the received control network message packets 60. In addition, the up control circuit 1424 generates SCAN BUF WE scan buffer write enable signals that enable the scan buffer 1410 to load the SEL INP DATA (L) signals from the receiver/buffer 1420(1) representing the successive data nibbles 70(i).

On the other hand, if one receiver/buffer 1420(x) receives a single-source message, and the other receiver/buffer 1420 (x') receives either a multiple-source message or a control network message packet 60 of the abstain message type (an "abstain message") or the idle message type (an "idle message"), the up control circuit 1420 generates OUT SEL signals that enable the up output packet assembler 1422 to transmit a single-source message. In that operation, the up output packet assembler uses the SEL INP DATA (x) signals from the receiver/buffer 1420(x) that received the single-source message. Thus, a single-source message takes priority over multiple-source, abstain or idle messages. If the receiver/buffer 1420(x') receives a multiple-source message, the up control circuit 1424 also enables it to buffer the packet. As will be described below, the buffered packet 60 will be used in connection with a multiple-source message when received by the first receiver/buffer 1420(x), that is, the receiver/buffer that received the single-source message.

In addition, if a receiver/buffer 1420(x) is buffering a multiple-source message, the up control circuit 1424 generates FLOW CTRL (DN) flow control signals that are coupled through the line 1411 (FIG. 63) to the flick down control portion 1402. In response, the flick down control portion sets the scan flow bits 72(i) (FIG. 7) of the control network message packets 60 of the particular left or right child node connected to the receiver/buffer 1420(x), to disable the child node from transmitting additional message packets 60. When the buffered packet 60 is thereafter used, the up control circuit 1424 generates FLOW CTRL (DN) signals that thereafter enable the flick down control portion to clear the scan flow bits 72(i) of the packets 60 transmitted to that child node, enabling the child node to resume transmitting message packets thereto.

Alternatively, if one receiver/buffer 1420(x) receives or is buffering a multiple-source message and the other receives an abstain message, the up control circuit 1424 generates OUT SEL output select signals that enable the up output packet assembler to generate P FLICK UP signals from the SEL INP DATA (x) signals representing the received multiple source message. The abstain message indicates that the leaf 21 (FIGS. 5 and 6) comprising the source of the message is abstaining from the operation initiated by the multiple-source message received or buffered by the other receiver/buffer 1420.

In addition, if a receiver/buffer 1420(x) receives a multiple-source message and the other receiver/buffer 1420 (x') receives an idle message, the up control circuit 1424 enables the receiver/buffer 1420(x) to buffer the multiple-source message. When the other receiver/buffer 1420(x') thereafter receives an abstain or multiple-source message, the up control circuit 1424 enables the receiver/buffer 1420 (x) to provide the buffered message as SEL INP DATA (x) signals to be used by the flick up data processor 1421 and up output packet assembler 1422 in generating a control network message packet 60 for transmission to the parent control network node 51. In that case, the buffered multiple-source message is used in the same manner as if it were being received contemporaneously with receipt by the receiver/buffer 1420(x') of the abstain or multiple-source message being received thereby. Similarly, if both receiver/buffers 1420(x) are buffering multiple-source messages, and if both receive idle messages, the up control circuit enables them to provide the buffered messages as SEL INP DATA signals to be used by the flick up data processor 1421 and up output packet assembler 1422 in generating a control network message packet 60 for transmission to the parent control network node 51.

Finally, if both receiver/buffers 1420(x) receive control network message packets 60 of the idle, abstain or NPAC (nil packet) message types, and if they are not buffering multiple-source message packets, the up control circuit 1424 enables the up output packet assembler 1422 to transmit a control network message packet 60 to the parent control network node 51 of the same message type.

In generating P FLICK UP signals representing the sequential flicks of a control network message packet 60, the up output packet assembler uses PROC TAG (UP) processed tag signals from the tag processor 1423. the tag processor 1423 receives the INP TAG (x) signals from the receiver/buffers 1420(x) and generates PROC TAG (UP) processed tag signals that the up output packet assembler 1422 uses in generating the tag bit in each flick. The PROC TAG (UP) signals represents the logical AND and logical OR of the INP TAG (x) input tag signals. Depending on the particular flick and tag bit being transmitted, the up control circuit 1424 may enable the up output packet assembler 1422 to transmit the signal representing the logical AND or the signal representing the logical OR.

For some flicks, particularly those containing the scan flow bits 72(i) and the overflow bit, the up control circuit 1424 enables the up output packet assembler 1422 to use signals from other circuits in generating the tag bits. In particular, when the up output packet assembler 1422 is generating P FLICK UP signals representing flicks in which the tag bits comprise the scan flow bits 72(i), the up control circuit 1424 enables the up output packet assembler 1422 to use FLOW CONTROL (UP) signals in generating the bits. The up output packet assembler 1422 receives the FLOW CONTROL (UP) signals from the flick down control circuit 1402 through the flow control link 1411 in the common control portion 1403.

In addition, when the up output packet assembler 1422 is generating the flick containing the scan overflow bit 80 (FIG. 7), the up control circuit 1424, if it enabled the up output packet assembler 1422 to transmit PROC FLICK (UP) DATA signals from the adder circuit 1425 in the data nibbles 70(i), also enables it to use a CRY IN carry in signal and an OVFL overflow signal from the flick up data processor 1421. The CRY IN and OVFL signals represent carry and overflow signals generated by the adder circuit 1425, and if asserted indicates a carry and overflow, respectively, in the sum provided by the adder circuit 1425.

The up control circuit 1424 provides several additional signals for controlling the operation of the flick up control portion 1401. In particular, the up control circuit 1424 generates timing control signals, identified as UP RCV ST (12:0) signals, which are timing signals similar to the XMIT (12:0) transmit flick and RCV (12:0) receive flick signals generated by the control network interface 204 in the network interface 202 (FIG. 10) as described above. In addition, the up control circuit 1424 generates an UP RCV RESET receive reset timing signal. In particular, the up control circuit 1424 receives the SEL INP DATA (x) selected input data signals from the receiver/buffer circuits 1420(x) and, if they indicate that flicks being received represent NPAC nil packet message packets 60, the up control circuit 1424 asserts the UP RCV RESET timing signal.

On the other hand, if the SEL INP DATA (x) signals indicate that at least one receiver/buffer is receiving the first flick of a control network message packet 60, up control circuit 1424 begins asserting successive ones of UP RCV ST (12:0) up receive state signals that identify successive receive states. The UP RCV ST (12:0) signals represent thirteen signals, identified by the mnemonic UP RCV ST 0 through UP RCV ST 12, which the up control circuit 1424 successively asserts, at successive ticks of the NODE CLK timing signal. Generally, the successive UP RCV ST "i" signals ("i" is an integer between zero and twelve) are asserted in synchronism with the receipt by the receiver/buffers 1420(x) of corresponding ones of the thirteen flicks of a control network message packet 60. The up RCV ST 0 through UP RCV ST 12 signals are used to other circuitry on the flick up control portion 1401.

In addition, the up control circuit 1424 depicted on FIG. 64 generates a ROOT UP LAT root up latch signal that enables conditioning of the root flag 1407 (FIG. 63) which, in turn, controls the condition of the ROOT UP signal. If the SEL INP DATA (x) signals represent a single-source messages of the configuration type, and if the root height value corresponds to the level and sub-level of the control network node 51, the up control circuit 1424 asserts the ROOT UP LAT signal to set the root flag 1407. On the other hand, if the SEL INP DATA (x) signals represent a single-source messages of the configuration type, and if the root height value is greater than the level and sub-level of the control network node 51, the up control circuit negates the ROOT UP LAT signal to enable clearing of the root flag 1407. When the root flag 1407 is set, the ROOT UP signal is asserted, which energizes a write enable terminal of the packet buffer 1406, enabling the buffer 1406 to buffer the P FLICK UP signals from the up output packet assembler 1422. The packet buffer 1406 provides BUF P FLICK UP buffered parent flick up signals to the flick down control portion 1402.

As described above, the flick latch 1430 latches the P FLICK UP signals at each tick of the NODE CLK signal. In addition, while the ROOT UP signal is asserted, the packet buffer 1406 latches the P FLICK UP signals at each tick of the NODE CLK signal. In one particular embodiment, the right and left child receiver/buffers 1420 also latch the respective C(x) FLICK UP signals from their respective child nodes at each tick of the NODE CLK signal. In that embodiment, the delay of the signals from the receiver/buffers 1420 to the flick latch 1430 and packet buffer 1406 is one tick of the NODE CLK signal. That is, unless a message packet 60 is being buffered by a receiver/buffer 1420(x), the flick latched by the receiver/buffers 1420 is processed by the flick (up) data processor 1421, tag processor 1423, and up output packet assembler 1422 during the time between successive ticks of the NODE CLK signal. In that embodiment, the up output packet assembler 1422 maintains information as to the type message and packet it is transmitting for use by other circuits shown on FIG. 64.

Figure 65:
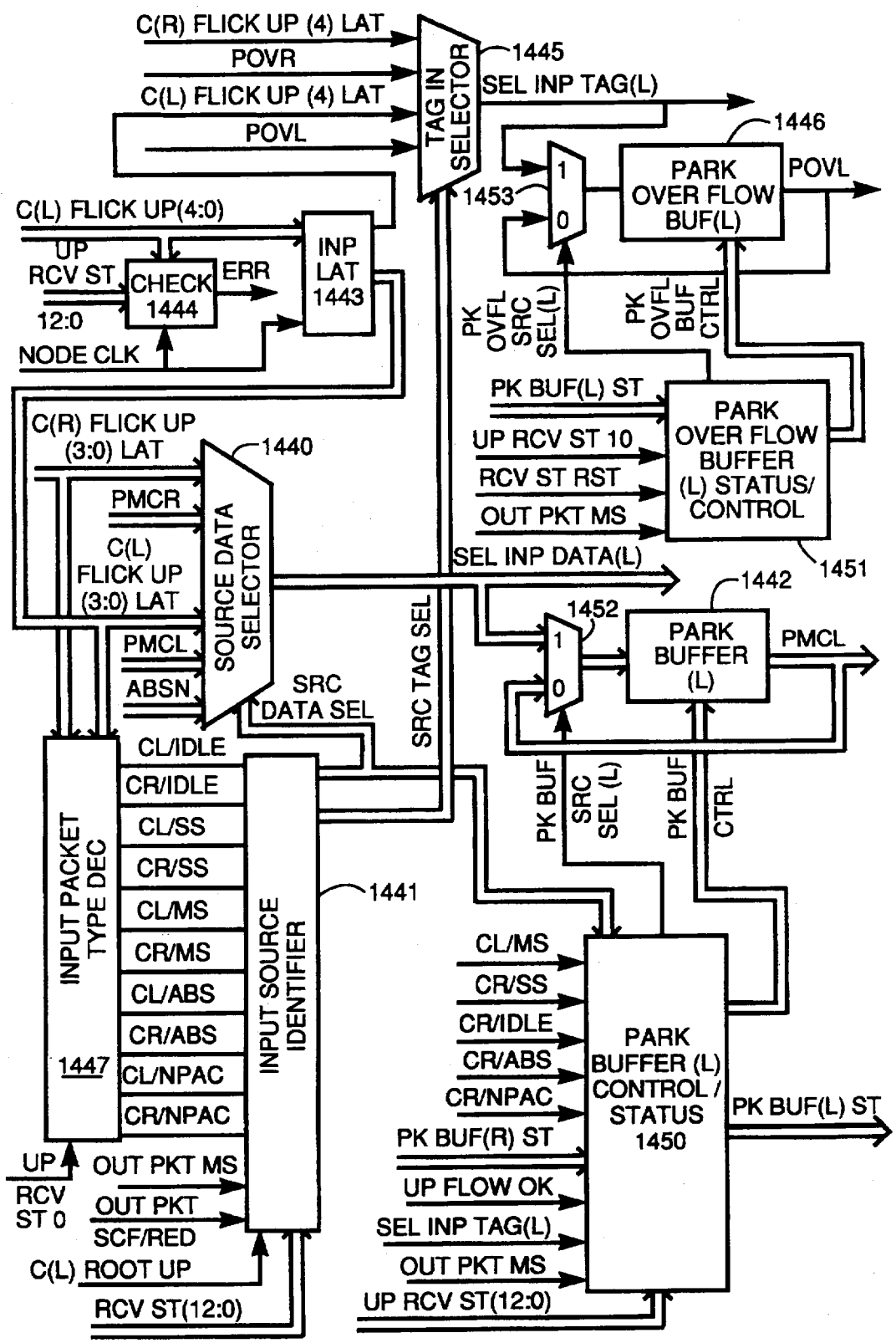
Figure 73:
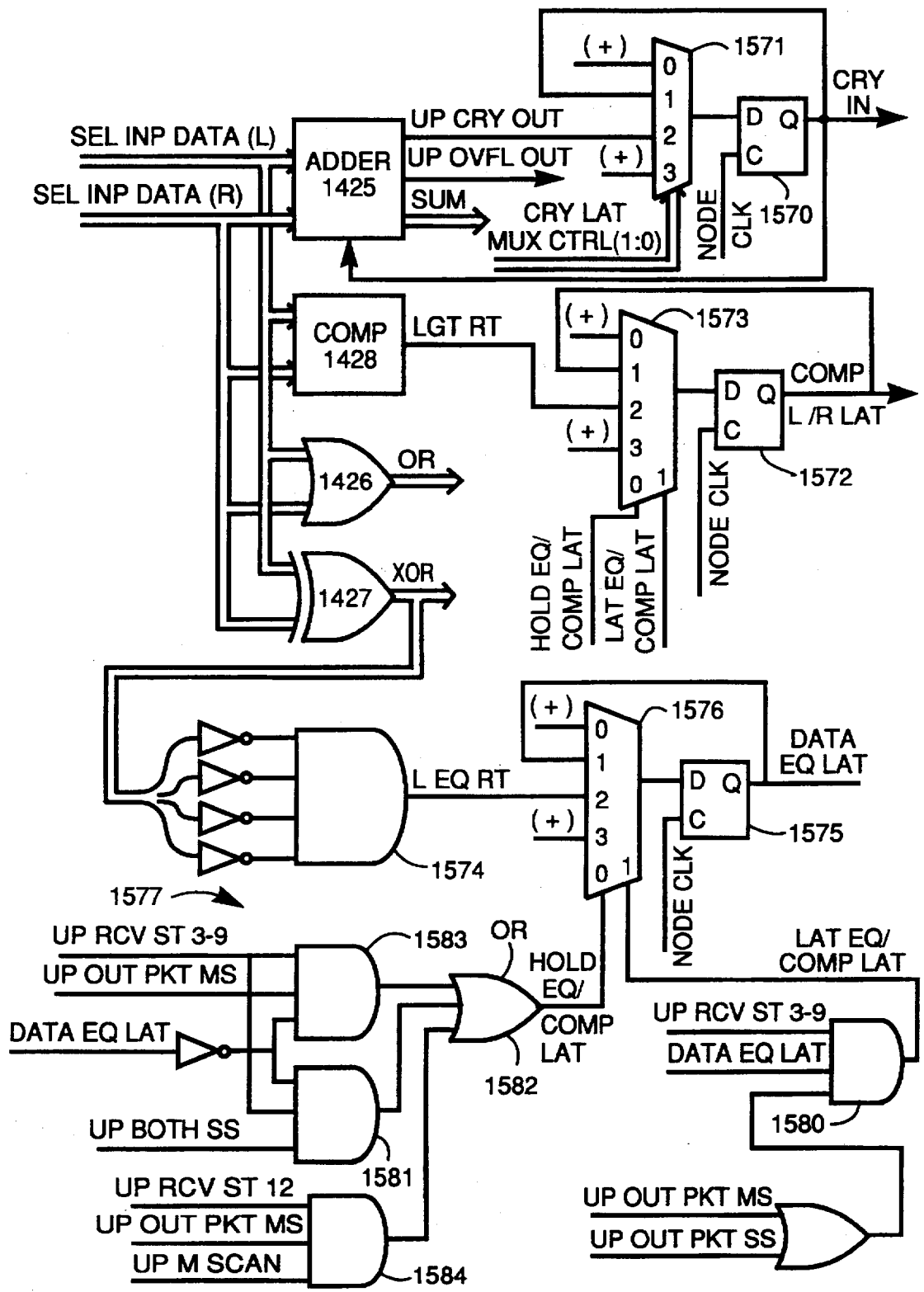
Figure 74:
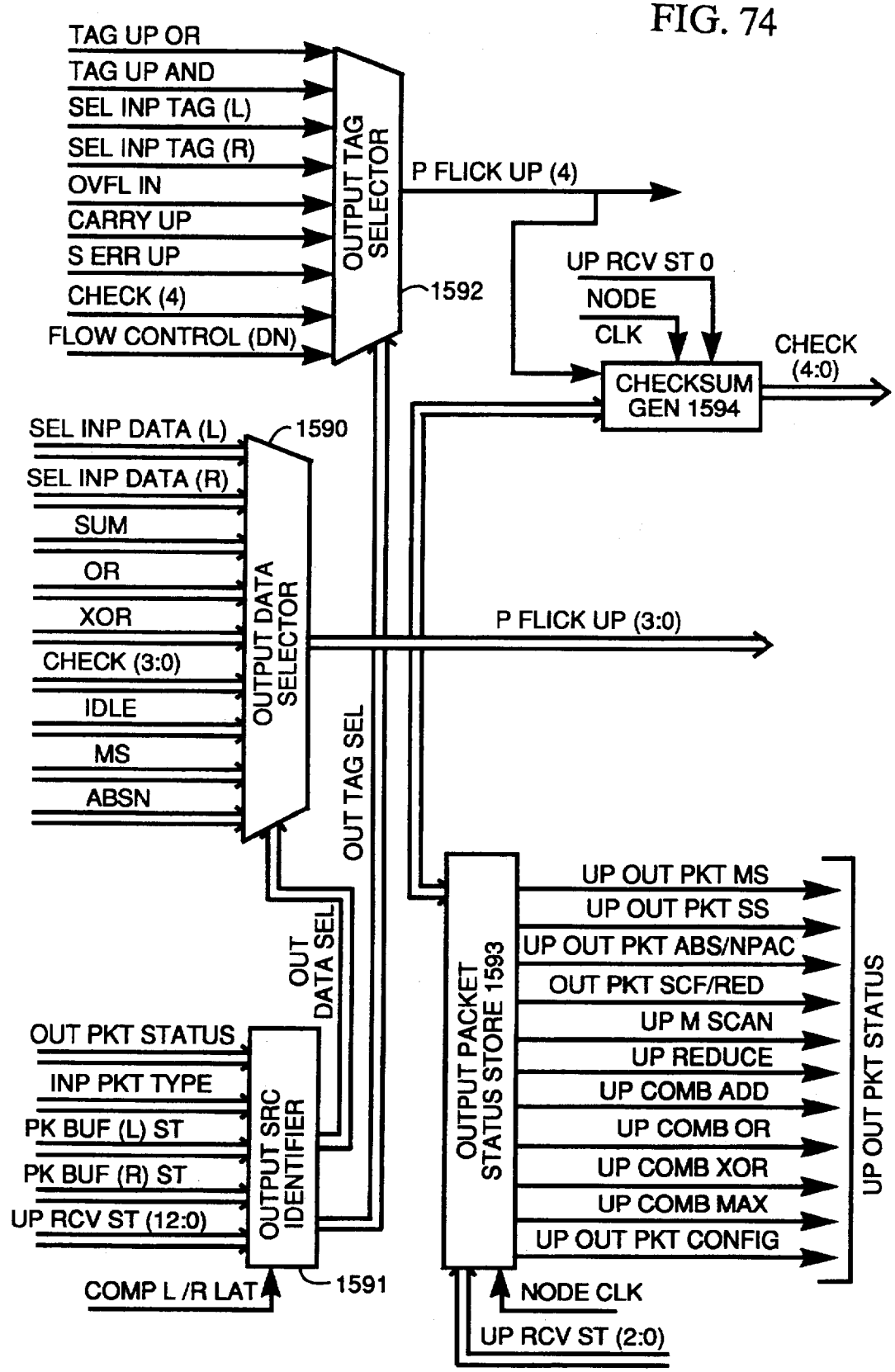

FIGS. 65 through 74 depict details of some of the circuits in the flick up control portion 1401. In particular, FIG. 65 depicts a detailed block diagram of the child (left) receiver/ buffer 1420(L), and FIGS. 66 through 72 depicts details of circuits in the child (left) receiver buffer 1420(L). The child (right) receiver/buffer 1420(R) is substantially similar to the child (left) receiver buffer 1420(L) and will not be described in detail. FIG. 73 depicts details of the flick (up) data processor 1421. Finally, FIG. 74 depicts a detailed block diagram of the output packet assembler.

i. Child (Left) Receiver/Buffer 1420(L)

FIG. 65 depicts a detailed block diagram of the child (left) receiver/buffer 1420(L), and FIGS. 66 through 72 depicts details of circuits in the child (left) receiver buffer 1420(L). With reference to FIG. 65, the child (left) receiver/buffer 1420(L) includes a source data selector 1440 that, under control of SRC DATA SEL source data select signals from an input source identifier circuit 1441, selects from among several signal sources to provide the SEL INP DATA (L) selected input data (left) signals.

The source data selector 1440 can select among number of signals input thereto. In particular, the source data selector 1440 may select C(L) FLICK UP (3:0) LAT latched child (left) flick up signals, as latched by an input latch 1443. The input latch latches the C(L) FLICK UP (4:0) signals received from the child control network node 51 at each tick of the NODE CLK signal. In addition, the C(L) FLICK UP (4:0) signals are coupled to a check circuit 1444 that, in response to the NODE CLK and RCV ST (12:0) receive state signals, performs a check operation in connection with the checksum in field 63 (FIG. 7) of the control network message packet 60 being received to verify proper receipt of the packet 60.

The source data selector 1440 may also select PMCL parked multi-source left child signals from a left park buffer 1442. As noted above, the receiver/buffer 1420(L) may buffer data from a multiple source message if the other receiver/buffer is not then receiving a multiple-source message whose data is to be used in the required mathematical operation. The left park buffer 1442 provides this facility in the receiver/buffer 1420(L).

As also noted above, in connection with a scan backward operation enabled by a multiple-source message, the left and right inputs to each control network node 51 are effectively reversed. To accommodate that, the source data selector 1440 of the left receiver/buffer 1420(L) can also receive C(R) FLICK UP (3:0) LAT latched flick up signals from the right child node, and also PMCR parked multi-source right child signal from a right park buffer (not shown). Finally, if both child nodes are root nodes, the source data selector 1440 may couple ABSN abstain signals which have the encoding corresponding to that in the message type field 64 of a control network message packet 60.

The receiver/buffer 1420(L) also includes a tag input selector 1445 that, under control of the input source identifier, selects among a number of signal sources as the SEL INP TAG (L) selected input tag signal. The tag input selector 1445 also may couple the C(L) FLICK UP (4) LAT latched left child flick up signal from the input latch 1443, or the corresponding C(R) FLICK UP (R) LAT signal received by the receiver buffer 1420(R) from the right child. It will be appreciated that, if the input source identifier conditions the SRC DATA SEL source data select signals to enable the source data selector 1440 to couple the C(x) FLICK UP (3:0) LAT signals ("x" is "L" or "R") as the SEL INP DATA (L) signals, it will also condition the SRC TAG SEL signals to enable the tag in selector 1445 to couple the C(x) FLICK UP (4) LAT signals as the SEL INP TAG (L) signal.

In addition, the tag input selector can select a POVL parked overflow left signal from a park overflow buffer 1446 in the left child receiver/buffer 1420(L), or a POVR parked overflow right signal from a corresponding buffer in the right child receiver/buffer 1420(R). The park overflow buffer 1446 buffers the scan overflow bit 80 of a received control network message packet 60, whose data is parked in the park buffer 1442. Thus, if the input source identifier 1441 enables the source data selector 1440 to couple PMCx ("x" is "L" or "R") parked multi-source signals from a park buffer 1442, or the corresponding buffer in the right child receiver/buffer 1420(R), it will also enable the tag in selector 1445 to use the POVx parked overflow signal as the SEL INP TAG (L) selected input tag signal for the scan overflow bit. It will be appreciated that, if the input source identifier conditions the SRC DATA SEL source data select signals to enable the source data selector 1440 to couple the PMCx signals ("x" is "L" or "R") as the SEL INP DATA (L) signals, it will also condition the SRC TAG SEL signals to enable the tag in selector 1445 to couple the POVx signals as the SEL INP TAG (L) signal for the scan overflow bit.

The input source identifier 1441 uses a number of signals in generating the SRC DATA SEL source data select signals. In particular, an input packet type decoder 1447 receives the C(L) FLICK UP (3:0) LAT from the input latch 1443, the C(R) FLICK UP (3:0) LAT signals from the right child receiver/buffer 1420(R) and the UP RCV ST 0 signal. It will be appreciated that the C(x) FLICK UP (3:0) LAT signals, when the UP RCV ST 0 signal is asserted, identifies the particular message type of the incoming control network message packet 60. The input packet type decoder 1447 generates a series of signals, including signals Cx/IDLE idle, Cx/SS single-source, Cx/MS multiple-source, Cx/ABS abstain, and Cx/NPAC nil packet ["x" identifies "L" (left) and "R" (right)]. These signals identify the particular type of control network message packet 60 being received from each of the left and right child nodes. The input source identifier 1440 uses these signals, along with the UP RCV ST (12:0) up receive state signals, to determine whether the source data selector 1440 should couple signals from an input latch, such as latch 1443, or from a park buffer 1442, or the ABSN signals, as the SEL INP DATA (L) selected input data signals.

The input source identifier 1441 uses an OUT PKT MS output packet multiple-source signal and an OUT PKT SCF/RED output packet scan forward/reduce signal, both of which are generated by the up output packet assember 1422, to determine whether the source data selector 1440 is to couple signals from the right or left child, or right or left park buffer, as the SEL INP DATA (L) signals. As described above, the up output packet assembler 1422 generates signals providing information as to the packet 60 being transmitted thereby, of which the OUT PKT MS and OUT PKT SCF/RED signals are two. The OUT PKT MS and OUT PKT SCF/RED reduce signals, when asserted, indicate that the P FLICK UP signals generated by the up output packet assember 1422 comprise a multiple source control network message packet 60, and that the packet type enables a scan forward or reduce operation. In that case, the input source identifier 1441 enables the source data selector 1440 to couple either the C(L) FLICK UP (3:0) LAT signals or the PMCL signals as the SEL INP DATA (L) signals. Contemporaneously, the input source identifier 1441 generates SRC TAG SEL source tag select signals that enable the tat input selector 1445 to couple either the C(L) FLICK UP (4) LAT signal or the POVL signal as the SEL INP TAG (L).

On the other hand, if the OUT PKT MS signal is asserted, but the OUT PKT SCF/RED signal is negated, the control network message packet 60 is of the multiple-source message type, and indicating a scan backward operation. In that case, the input source identifier generates SRC DATA SEL signals that enable the source data selector 1440 to couple either the CR FLICK UP (3:0) LAT signals latched by the right child receiver/buffer 1420(R), or the PMCR signals provided by the park buffer of the right child receiver/buffer 1420(R) as the SEL INP DATA (L) left selected input data. Thus, if the control network message packet 60 is of the multiple-source message type, and enabling a scan backward operation, the right and left child receiver/buffers 1420 interchange the C(x) FLICK UP signals received thereby, as described above.

Furthermore, if the C(L) ROOT UP signal from the child node connected thereto is asserted, indicating that the child node is a root node, the input source identifier 1441 generates SRC DATA SEL signals to enable the source data selector to couple ABSN abstain signals as the SEL INP DATA (L) signals. Thus, if the child node is root node, the child receiver/buffer 1420(1) internally provides abstain packets, regardless of the types of control network message packets 60 directed thereto by the child node.

In any case, the input source identifier 1441, while the RCV ST 11 and RCV ST 12 signals are asserted, indicating that the global information field 71 and checksum field 63 of the control network message packet 60 are being received, generates SRC DATA SEL source data select signals to enable the source data selector 1440 to couple the C(L) FLICK UP (3:0) LAT signals as the SEL INP DATA (L) signals. With respect to the global information field 71, regardless of the message types of the messages including the field 71, the signals representative of the field are ORed together with corresponding signals from the right child receiver/buffer 1420(r). The resulting signals are transmitted in control network message packets 60 up the tree comprising the control network 14 to the root node, which, in turn, broadcasts them in control network message packets 60 transmitted down the tree to the leaves 21 in the partition. Thus, the global bits may be used to provide information concerning, for example, synchronization of the operations of the processing elements 11, regardless of the types of control network message packets 60 being transmitted up and down the tree defining the control network 14.

The left child receiver/buffer 1420(L) also includes control and status circuits 1450 and 1451 for controlling the park buffer 1442 and park overflow buffer 1446, respectively. The park buffer control and status circuit also receives a number of signals and generates, in response, PK BUF (L) CTRL left park buffer control signals, a PK BUF SRC SEL (L) left park buffer source select signal, and PK BUF (L) ST left park buffer status signals. The PK PUB SRC SEL (L) signal enables a multiplexer 1452 to couple either the SEL INP DATA (L) selected input data signals representing a control network message packet 60 from the source data selector 1440 to data input terminals of the park buffer 1442. The PK BUF (L) CTRL signals enable the signals from the multiplexer 1452 to be buffered in the park buffer 1442, to enable it to buffer a control network message packet 60. In particular, the contents of park buffer 1442 comprise the low-order four bits of each flick of the control network message packet 60. The PK BUF (L) ST left park buffer status signals indicate whether the park buffer 1442 is buffering a control network message packet 60, and, if so, whether the segment bit 77 is set or cleared.

The only tag information buffered by the receiver/buffer 1420(L) indicates the condition of the segment bit 77 and the scan overflow bit 80. It will be appreciated that these tag bits 77 and 80 are associated with, or provide information as to the processing of the data in the data nibbles 70(i) of the control network message packet 60. On the other hand, the other tag bits of a control network message packet 60 provide control information to control the flow of control network message packets 60 through the control network 14, or to control the all-fall-down operations of the data router 15.

In any event, if the input packet type decoder 1447 is asserting the CL/MS signal and either the CR/SS or CR/IDLE signal, the control network message packet 60 represented by the SEL INP DATA (L) signals is a candidate to be buffered in the park buffer 1442. In that case, the packet 60 received by the left child receiver/buffer 1420(L) is a multiple-source message, and the right child receiver/buffer 1420(R) is not receiving a multiple-source message to be used in connection therewith. If the park buffer in the right child receiver/buffer 1420(R) is not buffering a packet 60 which can be used with the multiple-source message being received by the left child receiver/buffer 1420(L), the park buffer control/status circuit 1450 will condition the PK BUF SRC SEL (L) park buffer source select signals to enable multiplexer 1452 to couple the SEL INP DATA (L) signals representing the packet 60 to the park buffer 1442, and the PK BUF CTRL (L) park buffer control signals to enable the park buffer to buffer the packet 60.

On the other hand, if the right child receiver/buffer 1420(R) is receiving a multiple-source message packet while (a) the park buffer 1442 of the left child receiver/buffer 1420(L) is buffering a multiple-source message packet, and (b), the left child receiver/buffer 1420(L) is not receiving a control network message packet 60 of a type, such as a single-source message packet having higher priority of transfer through the control network 14, the park buffer control/status 1450 enables the input source identifier 1441 to, in turn, enable the park buffer control/status 1450 to transmit the PMCL signals representative of the successive flicks of the multiple-source control network message packet 60. The input source identifier 1441 of the left child receiver 1420(L), or the corresponding circuit of the right child receiver 1420(R), enables the respective source data selector 1440 to couple the PMCL signals as the SEL INP DATA (L) signals, if the operation enabled is a scan forward or reduce operation on the one hand, or a scan backward operation on the other hand.

As noted above, the PK BUF (L) ST left park buffer status signals from the park buffer control/status circuit 1450 provide information as to whether the segment bit 77 was set in the message packet 60 buffered in park buffer 1442. The left park buffer control/status circuit 1450 receives the SEL INP TAG (L) selected left input tag signal from the tag input selector 1445 for this.

The park overflow buffer status/control circuit 1451 uses the PK BUF (L) ST left park buffer status signals, the UP RCV ST 10 receive timing signal, and the OUT PKT MS output packet multiple-source signal, and generates a PK OVFL SRC SEL (L) park overflow source select and PK OVFL BUF CTRL park overflow buffer control signals to control the park overflow buffer 1446 and an input multiplexer 1453. If the PK BUF (L) ST left park buffer status signals indicate that the park buffer control/status circuit 1450 is enabling buffering of a control network message packet 60, the park overflow buffer status/control circuit 1451 enables the multiplexer 1453 to couple the SEL INP TAG (L) signal representing the scan overflow bit 80 to be buffered in the park overflow buffer 1446.

Figure 66:
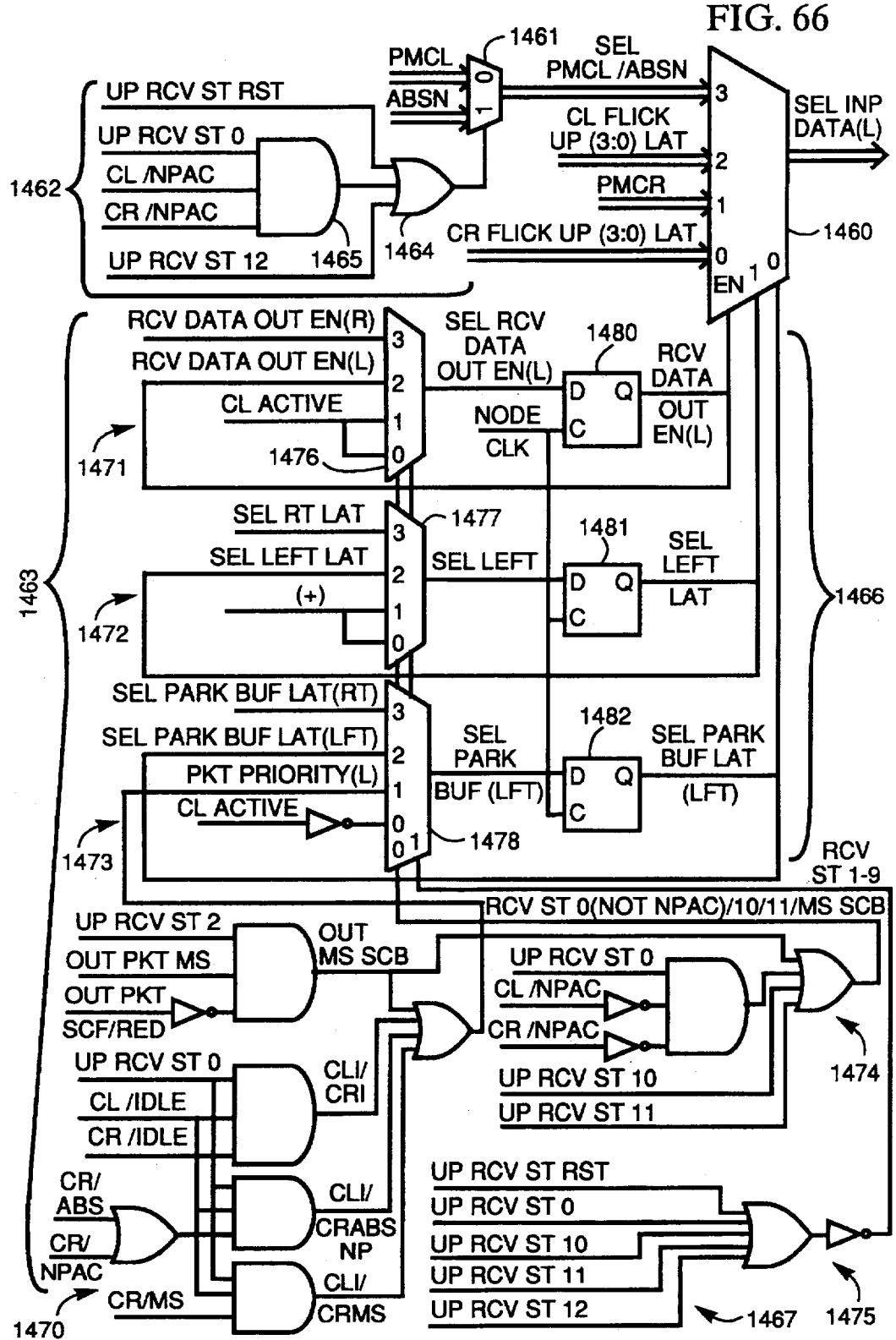
Figure 67:
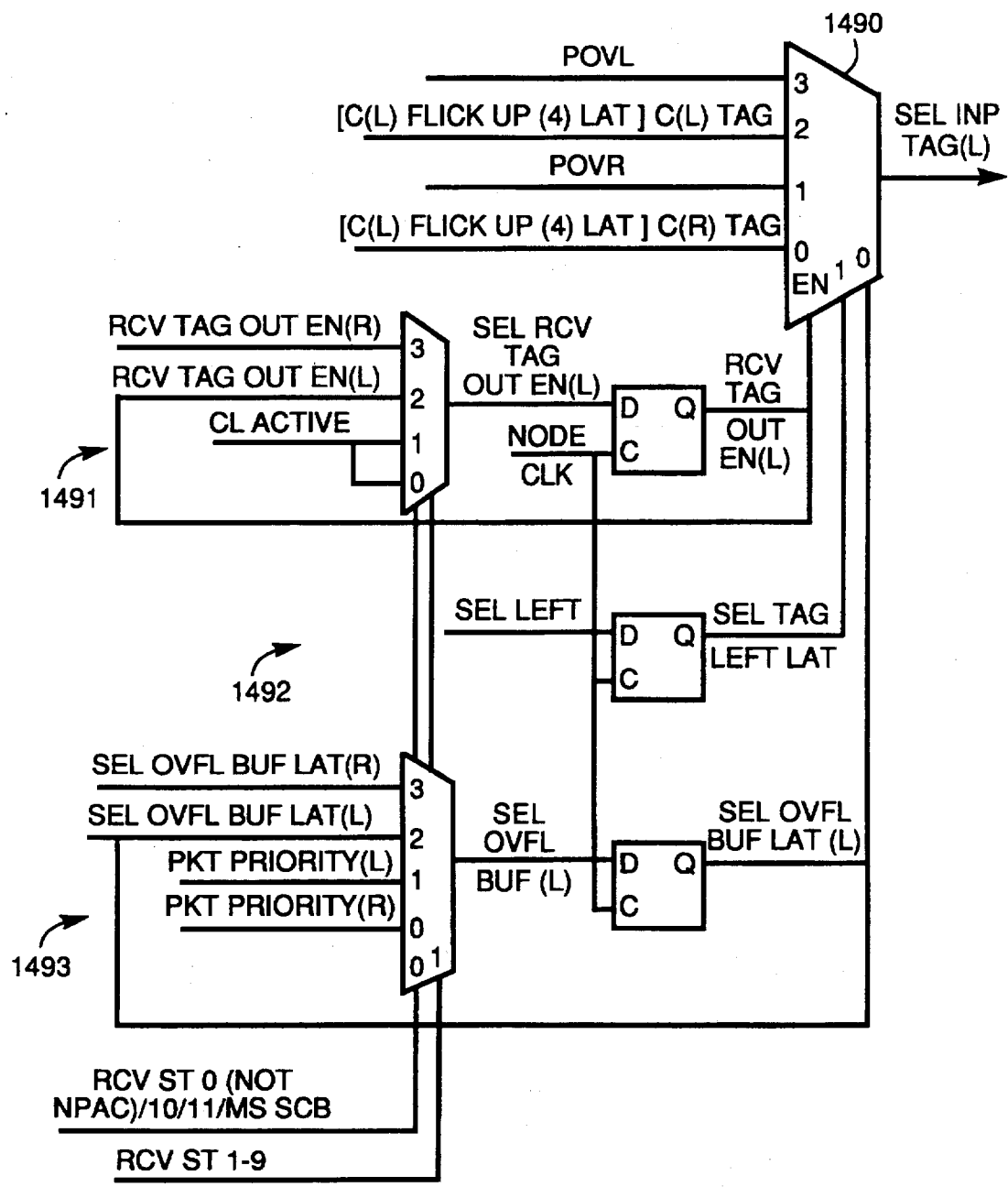
Figure 68:
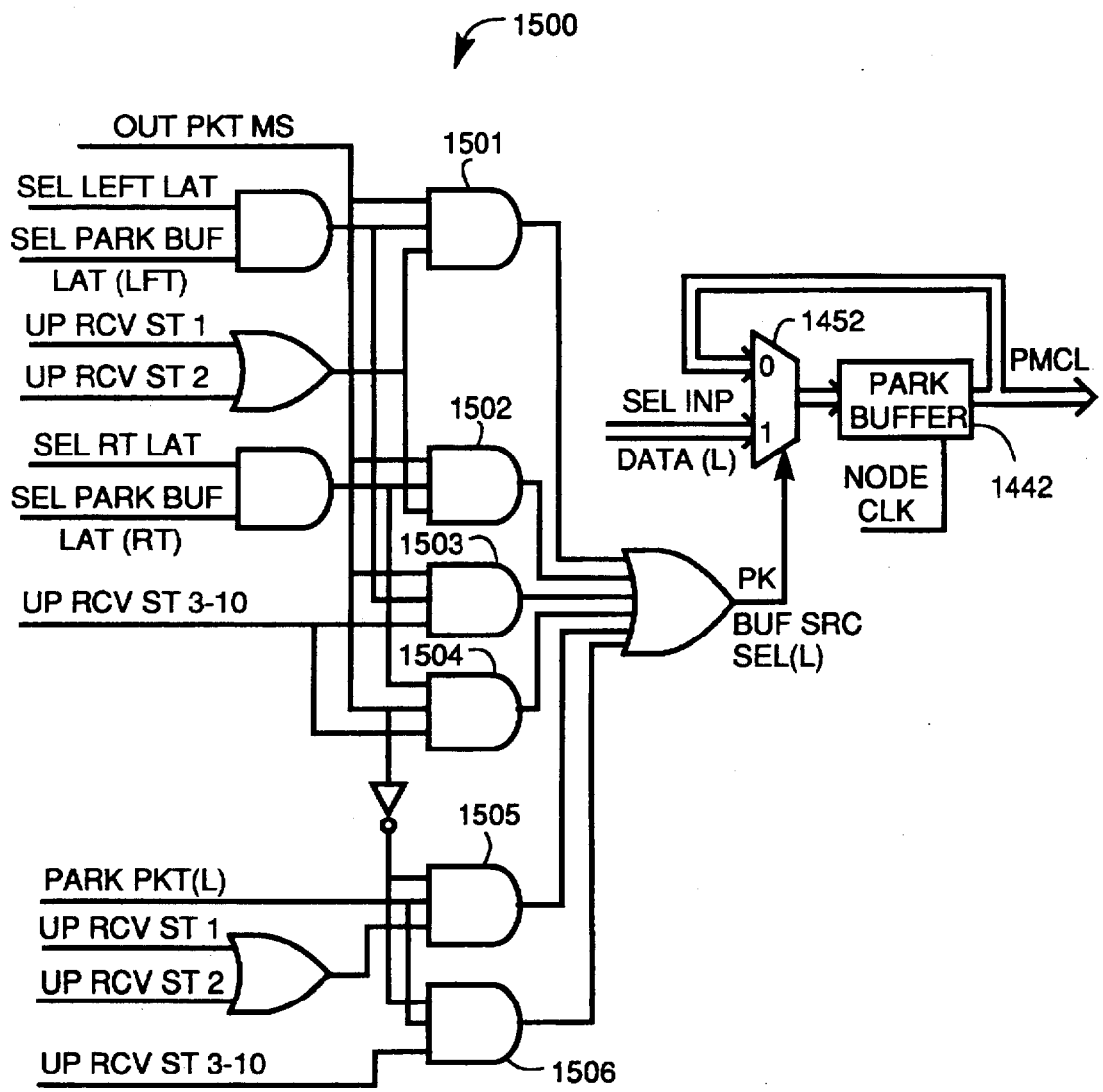
Figure 69:
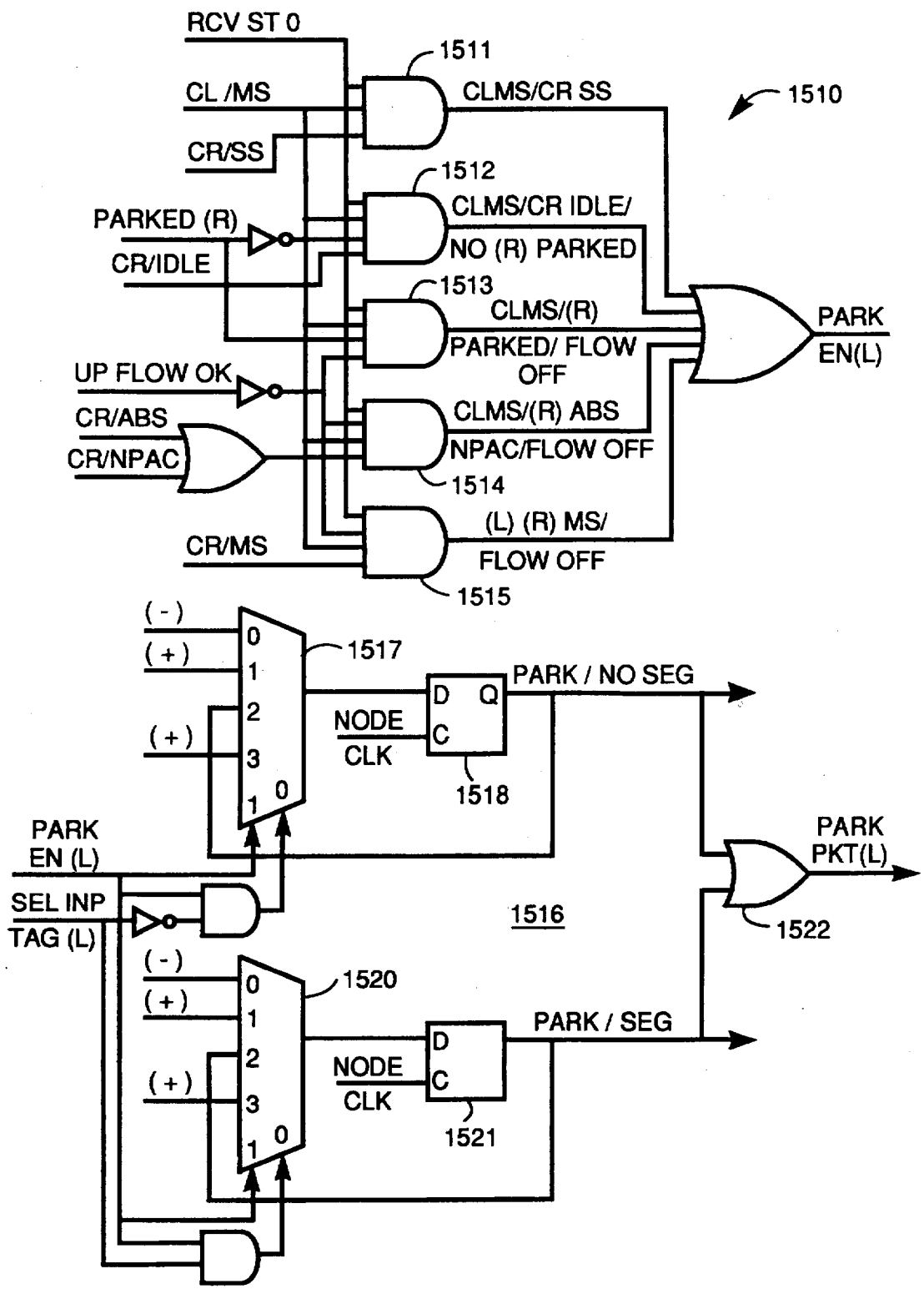
Figure 70:
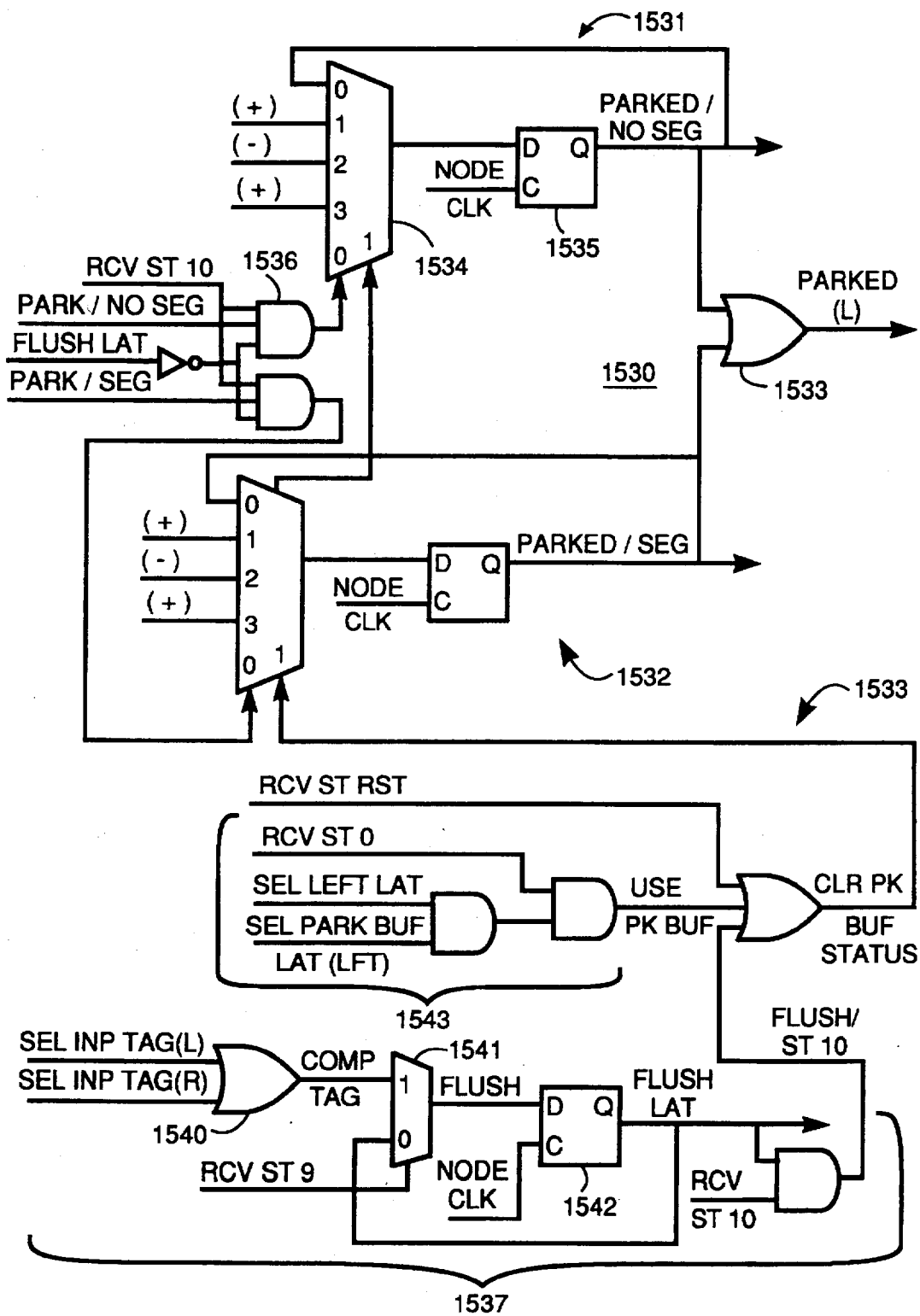
Figure 71:
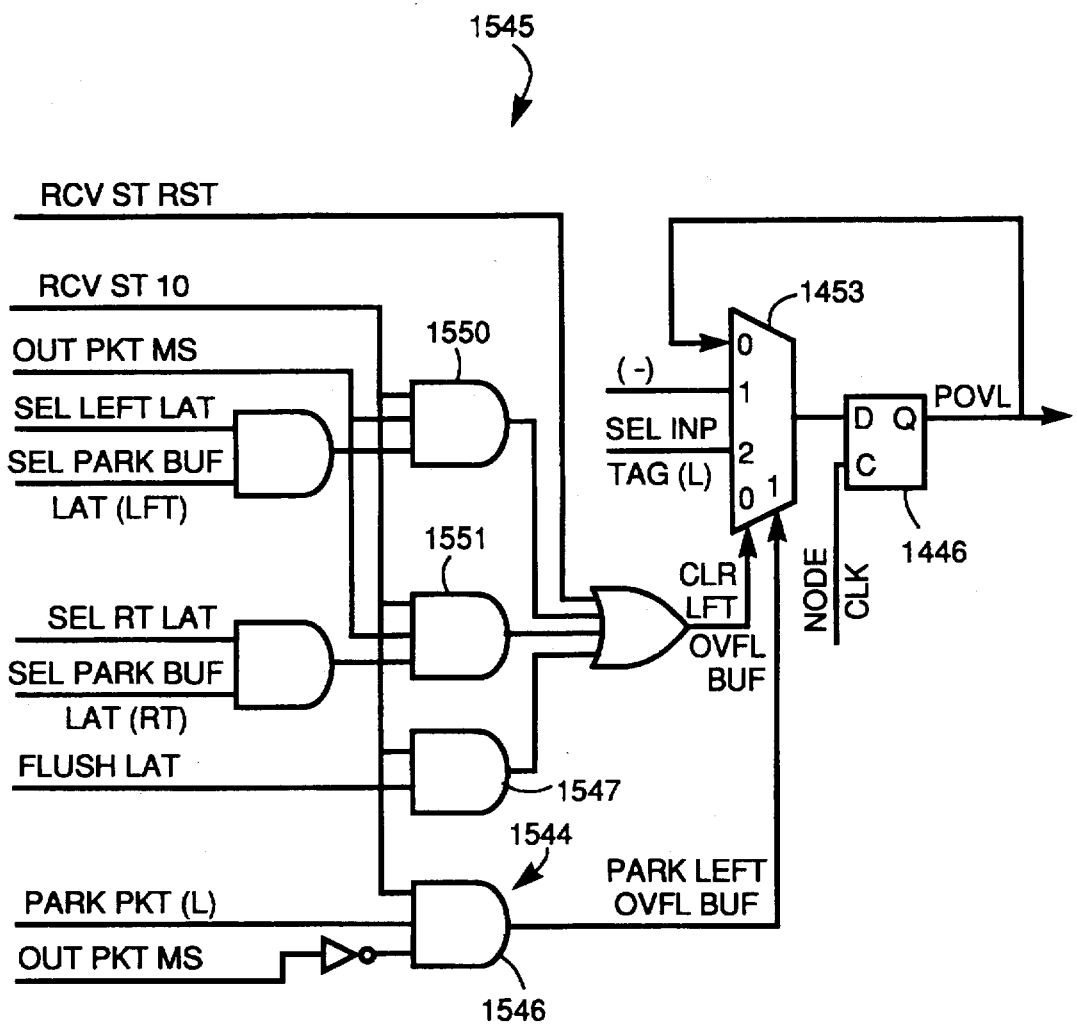

With this background, the details of the left child receiver/ buffer 1420(L) will be briefly described in connection with FIGS. 66 through 77. FIGS. 66 and 67 depict details of the source data selector 1240 and tag input selector 1445, respectfully, along with respective portions of the input source identifier 1441. FIGS. 68 through 70 depict details of the park buffer 1442, multiplexer 1452 and the park buffer control/status circuit 1450. FIG. 71 depicts details of the park overflow buffer 1446, multiplexer 1453 and the park overflow buffer status/control circuit 1451. Finally, FIG. 72 depicts details of a segment bit latch, in the park buffer control/status circuit 1450, which provides a SEG L left segment signal indicating the condition of the received or buffered segment bit of the control network message packet 60 defined by the successive SEL INP DATA (L) selected input data signals. The SEG L signal is buffered in the scan buffer 1410.

Since the operation of the circuits depicted on FIGS. 66 through 72 will, in view of the description in connection with FIGS. 63 and 65, be apparent to those skilled in the art, they will not be described in detail. In any event, with reference to FIG. 66, the source data selector 1440 includes to multiplexers 1460 and 1461. The multiplexer 1460 select among the C(x) FLICK UP (3:0) LAT latched left and right child flick up signals, the PMCR signals from the park buffer of the right child receiver/buffer 1420(R), and SEL PMCL/ ABSN signals from the multiplexer 1461. The multiplexer 1461 selects among the PMCL signals from the park buffer 1442 of the left child receiver/buffer 1420(L) and ABSN abstain signals encoded to conform to the encoding which, in message type field 64 of a control network message packet 60, identifies the abstain message type.

The multiplexer 1461 is controlled by an abstain/park buffer select control circuit 1462, and the multiplexer 1460 is controlled by a control circuit 1463. The abstain/park buffer select control circuit 1462 enables the multiplexer 1461 to couple the ABSN signals to the multiplexer 1460 if an OR gate 1464 is energized, which occurs when either the UP RCV ST RST or the UP RCV ST 12 receive timing signal is asserted, or when an AND gate 1465 is energized. AND gate 1465 is energized in response to the coincidence of the UP RCV ST 0 signal is asserted and both the Cx/NPAC signals are asserted. The last condition occurs if both the child nodes are root nodes.

The control circuit 1463 includes several sections, including a multiplexer control circuit 1466, a left/right select enable circuit 1467, and a message packet priority circuit 1470. The multiplexer control circuit 1466, in turn, includes three parts. An output enable part 1471 generates a RCV DATA OUT EN (L) left received data output enable signal, which enables or disables output by the multiplexer 1460. A left/right select circuit 1472 enables the multiplexer 1460 to generally selectively couple either signals received from the left child or the right child as the SEL INP DATA (L) selected left input data signals.

More specifically, the left/right select circuit 1472 provides a high-order SEL LEFT LAT select left latched signal, that, when asserted, enables the multiplexer 1460 to couple either the C(L) FLICK UP (3:0) LAT or SEL PMCL/ABSN signals as the SEL INP DATA (L) signals, and when negated enables it to couple the C(R) FLICK UP (3:0) LAT or PMCR signals as the SEL INP DATA (L) signals. Finally, a latch/ buffer select circuit 1473 provides a low-order SEL PARK BUF LAT (LFT) select left park buffer latched signal that enables the multiplexer 1450 to select between the PMCR and the C(R) FLICK UP (3:0) LAT signals if the left/right select circuit 1472 is negating the SEL LEFT LAT signal, and between the C(L) FLICK UP (3:0) LAT and SEL PMCL/ABSN signals if the left right circuit 1472 is asserting the SEL LEFT LAT signal.

The left/right select enable circuit 1467 provides two signals for controlling the various circuits 1471 through 1473 of the multiplexer control section 1466 in unison, namely, a low-order select enable portion 1474 and a high-order select enable portion 1475. The low-order select enable portion 1474 provides an asserted RCV ST 0 (NOT NPAC)/10/11/MS SCB signal generally during three timing periods as identified by the asserted UP RCV ST (12:0) signals. In particular, the RCV ST 0 (NOT NPAC)/10/11/MS SCB signal is asserted if (a) the RCV ST 0 timing signal is asserted, and if the CL/NPAC and CR/NPAC signals are not both asserted, (b) the RCV ST 10 timing signal is asserted, and (c) the RCV ST 11 timing signal is asserted.

In addition, the signal is asserted if the control network message packet 60 being transmitted by the up output packet assembler 1422 is a multiple-source message enabling a scan backward operation, as indicated by an asserted OUT MS SCB signal from the message packet priority circuit 1470. It will be appreciated that, if the RCV ST 0 timing signal is asserted, the first flick of the control network message packet 60 is being received, which contains the message type field 64. If the CL/NPAC or CR/NPAC signals are then asserted, the control network message packet 60 received from the respective left or right child is of the NPAC nil packet type.

Similarly, if the RCV ST 10 or RCV ST 11 signal is asserted, flicks ten and eleven of the control network message packet 60 are currently being received. However, the multiplexer control section 1466 provides a delay of one tick of the NODE CLK signal in controlling the multiplexer 1460, and so the control of multiplexer 1460 enabled by the RCV ST 0(NOT NPAC)/10/11/MS SCB signal will be effective with flicks eleven and twelve, that is, the last two flicks of the control network message packet 60. It will be appreciated that these flicks contain the global information field 71 and the checksum field 63.

The high-order select enable portion provides a RCV ST 1–9 signal which is asserted when the UP RCV ST 1 through UP RCV ST 9 signals are asserted, and is otherwise negated. As noted above, the multiplexer control section 1466 provides a delay on one tick of the NODE CLK signal in controlling the multiplexer 1460, and so the control of the multiplexer 1460 enabled by the RCV ST 1–9 signal will be effective with flicks two through ten, which contain the combine function field 66 and the data nibbles 70(i) (FIG. 7).

It will be appreciated that the RCV ST 0(NOT NPAC)/ 10/11/MS SCB and RCV ST 1–9 signals are not asserted contemporaneously, but instead contemporaneous with receipt of different portions of a control network message packet 60. In one embodiment, the RCV ST 0(NOT NPAC) /10/11/MS SCB signal will be asserted during receipt of the message type field 64, unless the message type is NPAC nil packet, and the Each of the enable and select circuits 1471 through 1473 includes a multiplexer 1476 through 1478 and a flip-flop 1480 through 1482 clocked by the NODE CLK signal. The output signals provided by the flip-flops 1480 and 1482 comprise the enable and select signals for the multiplexer 1460, and so the flip-flops 1480 through 1482 effectively provide the one-tick delay noted above. The multiplexers 1477 through 1478 are controlled in unison by the RCV ST 0(NOT NPAC)/10/11/MS SCB and RCV ST 1-9 signals. Thus, while the RCV ST 0(NOT NPAC)/10/11/MS SCB signal is asserted, the multiplexer 1476 in enable circuit 1472 couples a CL ACTIVE left child active signal as a SEL RCV DATA OUT EN (L) select receive data out enable (left) signal to the data input terminal of flip-flop 1480, which is latched at the next tick of the NODE CLK signal. The CL ACTIVE signal is controlled by a control register (not shown) on control network node 51, which is set by the diagnostic network 16 if the node is connected to a left child. In that case, the multiplexer 1460 is enabled to provide SEL INP DATA (L) selected left input data signals.

Contemporaneously, the left/right select circuit 1472 couples an asserted signal (as identified by "+" on the Fig.) as a SEL LEFT select left signal to the data input terminal of flip-flop 1481. The flip-flop 1481 is set at the next tick of the NODE CLK signal, to provide an asserted SEL LEFT LAT select left latch signal. The asserted SEL LEFT LAT signal enables the multiplexer 1460 to couple either the C(L) FLICK UP (3:0) LAT signals or the SEL PMCL/ABSN signals as the SEL INP DATA (L) signals.

In one embodiment, in the right child receiver/buffer 1420(R), the multiplexer corresponding to multiplexer 1477 receives a negated signal instead of the as serted signal. In that case, the corresponding SEL RT selected right output signal is negated, resulting in a negated SEL RT LAT selected right latched signal.

Finally, the latch/buffer select circuit 1473 couples a PKT PRIORITY (L) packet priority signal as a SEL PARK BUF (LFT) select park buffer left signal to the data input terminal of flip-flop 1482. The PKT PRIORITY (L) signal is controlled by the message packet priority circuit 1470, and is generally asserted if the left child receiver/buffer 1420(L) is receiving an idle message packet, and the right child receiver/buffer 1420(R) is receiving either a idle, abstain, NPAC nil packet or a multiple-source message packet. If the right child receiver/buffer 1420(R) is receiving such a control network message packet 60, the PKT PRIORITY (L) signal is asserted, to enable the latch/buffer select circuit 1473 to, in turn, enable the multiplexer 1460 to couple signals from the park buffer 1442 as the SEL INP DATA (L) signals. Otherwise, the multiplexer 1460 is conditioned to couple the C(x) FLICK UP (3:0) LAT signals as the SEL INP DATA (L) signal. As noted above, while the RCV ST 0(NOT NPAC)/10/11/MS SCB is asserted, the multiplexer 1478 couples the PKT PRIORITY (L) as the SEL PARK BUF (LFT) signal, which is latched by flip-flop 1482 at the next tick of the NODE CLK signal. The flip-flop 1482 provides the SEL PARK BUF LAT (LFT) signal.

While the RCV ST 1-9 signal is asserted, if the packet priority circuit 1470 is negating the OUT MS SCB output multiple-source scan backward signal, the RCV ST 1-9 signal enables the multiplexers 1476 through 1478 to couple the output signals of the respective flip-flops 1480 through 1482 to their respective data input terminals. Thus, the flip-flops maintain their state at the successive ticks of the NODE CLK signal, and the multiplexer 1460 continues to couple the selected SEL PMCL/ABSN or C(L) FLICK UP (3:0) LAT signals as the SEL INP DATA (L) signals.

However, if the OUT MS SCB signal is asserted, which may occur while the UP RCV ST 2 timing signal is asserted to indicate that a scan backward operation is taking place, the RCV ST 0(NOT NPAC)/10/11/MS SCB is also asserted. In that case, the multiplexers 1476 through 1478 couple the corresponding signals the flip-flops in corresponding enable and select circuits in the right child receiver/buffer 1420(R) to the flip-flops 1480 through 1482, where they are latched at the next tick of the NODE CLK signal.

In that case, if the RCV DATA OUT EN (R) receive data out enable (right) signal is asserted, the right child is active, and so the flip-flop 1480 will be set to assert the RCV DATA OUT EN (L) signal to enable the output of multiplexer 1460. In addition, the SEL RT LAT signal from the right child receiver/buffer 1420(R) will be negated, enabling the flip-flop 1481 to be cleared to negate the SEL LEFT LAT signal. When that occurs, the multiplexer 1460 is enabled to couple the PMCR or C(R) FLICK UP (3:0) LAT signals as the SEL INP DATA (L) signals. The SEL PARK BUF LAT (RT) select park buffer latched (right) signal from right child receiver/buffer 1420(R), latched by flip-flop 1482, will control which of the PMCR or C(R) FLICK UP (3:0) LAT signals will be coupled by the multiplexer 1460.

When the UP RCV ST 2 signal is again negated, the OUT MS SCB signal is also negated, which negates the RCV ST 0(NOT NPAC)/10/11/MS SCB. Thus, for the rest of the time the RCV ST 1-9 is asserted, the multiplexers 1476 through 1478 will couple the output signals from the flip-flops 1480 through 1482 to their data input terminals, enabling, in turn, them to maintain the condition they were in while the UP RCV ST 2 signal was asserted. Thus, if the OUT MS SCB signal was negated during the assertion of the UP RCV ST 2 signal, the multiplexer 1460 will couple either the SEL PMCL/ABSN or the C(L) FLICK UP (3:0) LAT signals, originating from the left child node, as the SEL INP DATA (L) signals.

On the other hand, if the OUT MS SCB signal was asserted at that point, indicating a scan backward operation, the multiplexer 1460 will couple either the PMCR or C(R) UP (3:0) LAT signals, originating from the right child node, as the SEL INP DATA (L) signals. Thus, the enable and select circuits 1471 through 1473, and in particular the left/right select circuit 1472, enables the left child buffer/receiver 1420(L) to couple signals from the right child node as the left input signals if a scan backward operation is occurring. It will be appreciated that, while the reversal is initiated by the OUT MS SCB signal in synchronism with the UP RCV ST 2 signal, because of the one-tick delay provided by the enable and select circuits 1471 through 1473, the SEL INP DATA (L) signals reflect the reversal in flick three, which is the beginning of the data nibbles 70(i). In addition, the reversal will end in response to the negation of the RCV ST 1-9 signal, and, because of the one-tick delay, will be after flick 10, which contains the last of the data nibbles 70(i).

The tag input selector 1445 also includes a multiplexer 1490 and enable and select circuits 1491 through 1493. The multiplexer 1490 selects P OV "x" parked overflow signals ("x" reference left or right) and C(x) TAG signals, which corresponds to the C(x) FLICK UP (4) LAT signals, as the SEL INP TAG (L) selected input tag signals. The multiplexer 1490 is controlled by enable and select signals in a manner similar that of multiplexer 1460. In addition, the enable and select circuits 1491 through 1493 are controlled by the RCV ST 0(NOT NPAC)/10/11/MS SCB and RCV ST 1-9 signals in a manner similar to that of the enable and select circuits 1471 through 1473.

FIGS. 68 through 70 depict details of the park buffer 1442, multiplexer 1452 and the park buffer control/status circuit 1450. Generally, FIGS. 68 and 69 include circuitry for controlling storage of data from a control network message packet 60 in the park buffer 1442. FIG. 70 includes circuitry for indicating the status of the park buffer, that is, whether it is storing data from a control network message packet 60 and, if so, whether the packet's segment bit 77 (FIG. 7) was set.

With reference to FIGS. 68 and 69, the multiplexer 1252 is controlled by a multiplexer control circuit 1500, which generates the PK BUF SRC SEL (L) packet buffer source select (left) signal. If the PK BUF SRC SEL (L) signal is asserted, multiplexer 1452 couples the SEL INP DATA (L) signals to data input terminals of the park buffer 1442 for storage. The park buffer 1442 buffers the signals at its data input terminals at successive ticks of the NODE CLK signal. On the other hand, if the PK BUF SRC SEL (L) signal is negated, the multiplexer 1452 couples the PMCL signals at the park buffer's output terminals to its input terminals.

The multiplexer control circuit 1500 asserts the PK BUF SRC SEL (L) signal under several circumstances. In particular, if the up output packet assembler 1422 is asserting the OUT PK MS signal, indicating that it is transmitting a multiple-source message packet, several of gates 1501 through 1504 will be energized if the multiplexer control section 1466 (FIG. 66) is asserting both the SEL LEFT LAT and SEL PARK BUF LAT (LFT) signals, or the corresponding circuit in the right child receiver/buffer 1420(R) is asserting both the SEL RT LAT and SEL PARK BUF LAT (RT) signals, and if the up control circuit 1424 is asserting the UP RCV ST 1 through UP RCV ST 10 timing signals. This occurs if the source data selector 1440 in either child receiver buffer 1420(x) is coupling signals from its respective park buffer as its SEL INP DATA (x) selected input data signals.

In addition, the multiplexer control circuit 1500 asserts the PK BUF SRC SEL (L) park buffer source select signal if the up output packet assembler 1422 is negating the OUT PKT MS output packet multiple source signal, indicating that it is transmitting a message packet of other than the multiple source message type. In that case, if a PARK PKT (L) park packet (left) signal is asserted, gates 1505 and 1506 enable the PK BUF SRC SEL (L) to be asserted while the up control circuit 1424 is asserting the UP RCV ST 1 through UP RCV ST 10 timing signals. The PARK PKT (L) signal is generated by circuitry depicted on FIG. 68.

With reference to FIG. 69, a park enable circuit 15 10 generates a PARK EN (L) park enable (left) signal, which, when asserted, enables a control network message packet 60 being received by the left child receiver buffer 1420(L) to be buffered in park buffer 1442. The park enable circuit 15 10 asserts the PARK EN (L) signal in response to conditions, each represented by an AND gate 1511 through 1515. If any one of the conditions is satisfied, when the UP RCV 0 receive state signal is asserted, the park enable circuit asserts the PARK EN (L) signal.

In particular, AND gate 1511 asserts a CLMS/SRSS signal if the left child node is providing a multiple-source message, and the right child node is providing a single-source message packet. As noted above, the single-source message has priority, and so the left child buffer/receiver 1420(L) will buffer the multiple-source message packet. If the left child node provides a multiple-source message, the CL/MS left child multiple-source signal is asserted when the UP RCV ST 0 signal is asserted, and when the right child node is providing a single-source message the CR/SS right child single-source signal is asserted, when the UP RCV ST 0 signal is asserted.

Similarly, AND gate 1512 asserts a CLMS/CR IDLE/NO (R) PARKED signal if both (a) the left child node is providing a multiple-source message packet, and (b) the right child node is providing an idle message, as indicated by the asserted CR/IDLE signal and the park buffer in the right child receiver/buffer 1420(R) is not buffering a message packet, as indicated by a negated PARKED (R) signal. In that case, the right child receiver/buffer 1420(R) has no message packet to be used in connection with the multiple-source message packet being received by the left child receiver/buffer, and so the PARK EN (L) signal is asserted to enable the multiple-source message packet to be buffered.

The remaining gates 1513 through 1515 of the park enable circuit 1500 enable assertion of the PARK EN under several conditions while the parent node is disabling flow, as indicated by the negation of an UP FLOW OK signal. The UP FLOW OK signal is derived from the FLOW CTRL (UP) flow control signals received from the flick down control portion 1400. While the UP FLOW OK signal is asserted, the flick up control portion 1400 can transmit control network message packets 60 to its parent, but when negated the flick up control portion is disabled from transmitting multiple-source message packets thereto. In particular, if the UP FLOW OK signal is negated, and if the right child receiver/buffer's park buffer is buffering a message packet 60, while the left child receiver/buffer 1420(L) is receiving a multiple-source message, a CLMS/(R) PARKED/FLOW OFF signal is asserted, enabling assertion of the PARK EN (L) signal. Similarly, if the left child receiver/buffer 1420(L) is receiving a multiple-source message, while the right child node is providing an absolute or a NPAC nil packet message, AND gate 1514 asserts the CLMS/(R) ABSNPAC/FLOW OFF signal, which enables assertion of the PARK EN (L) signal. Finally, if both child nodes are providing multiple source messages, AND gate 1515 asserts a (L)(R) MS/FLOW OFF signal, which also enables assertion of the PARK EN (L) signal.

A park control circuit 1516, also shown on FIG. 69, generates the PARK PKT (L) park packet signal which controls gates 1505 and 1506 (FIG. 68). The park control circuit 1516 also generates signals which indicate whether the segment bit 77 (FIG. 7) of the control network message packet 60 being buffered in the park buffer 1442 is set or cleared. If the segment bit is cleared, a multiplexer 1517, under control if the PARK EN (L) signal and the negated SEL INP TAG (L) signal, which at that point corresponds to the segment bit 77, enables a flip-flop 1518 to be set to assert a PARK/NO SEG park/segment clear signal. The asserted PARK/NO SEG signal indicates that a control network message packet 60 whose segment bit is cleared is being buffered in park buffer 1442. On the other hand, if the segment bit is set, a multiplexer 1520, under control of the asserted PARK EN (L) signal and asserted SEL INP TAG (L) signal, enables a flip-flop 1521 to be set to assert a PARK/SEG park/segment set signal. The PARK/SEG and PARK/NO SET signals are both coupled to an OR gate 1522, which generates the PARK PKT (L) signal which is coupled to AND gates 1505 and 1506 (FIG. 68).

FIG. 12B-1E depicts park buffer status circuitry 1530 which indicates the status of the park buffer 1442 (FIG. 66). Normally, the park buffer status circuitry 1530 will indicate, after a control network message packet 60 has been buffered in the park buffer 1442, that a packet has been buffered, and whether the packet's segment bit 77 was set. However, under some circumstances, if, for example, a set flush bit 75 is received in the either control network message packet 60 being buffered in a control network message packet 60 being received by the right child receiver/buffer 1420(R), the control network message packet 60 buffered is flushed, in which case park buffer status circuitry 1530 is conditioned to indicate that the packet buffer 1442 is empty. Further, if the source data selector 1440 couples the contents of the park buffer 1442 as the SEL INP DATA (L) signals, the park buffer status circuitry 1530 is conditioned to indicate that the packet buffer is empty.

More specifically, the park buffer status circuitry 1530 includes a parked/segment clear status section 1531 and a parked/segment set status section 1532, and a clear control section 1533. The parked/segment clear status section 1531 generates a PARKED/NO SEG parked/segment clear signal that, when asserted, indicates that a control network message packet 60 whose segment bit 77 was clear is parked park buffer 1442. The parked/segment set status section 1532, on the other hand, generates a PARKED/SEG parked/segment clear signal that, when asserted, indicates that a control network message packet 60 whose segment bit 77 was set is parked park buffer 1442. The PARED/NO SEG and PARKED/SEG signals, when asserted, energize an OR gate 1533 which generates a PARKED (L) parked signal which controls a gate corresponding to AND gate 1512 in the right child receiver/buffer 1420(R) to control the operations of the park enable circuitry therein.

The clear control section 1533 controls a CLR PK BUF STATUS clear park buffer status signal. Section 1533 includes a flush control portion 1537 that asserts a FLUSH/ST 10 signal in response to the coincidence of the FLUSH LAT signal and the UP RCV ST 10 signal. The SEL INP TAG (L) selected input tag signal from tag input selector 1445 and SEL INP TAG (R) from the right child receiver/buffer 1420(R) are coupled to an OR gate 1540, which provides a COMP TAG composite tag signal to one data input terminal of a multiplexer 1541. If the UP RCV ST 9 signal is then asserted, the COMP TAG signal represents the flush bit 75 of the control network message packet 60 being received, and so at this point the multiplexer 1541 couples COMP TAG signal is coupled as a FLUSH signal to a flip-flop 1542. The flip-flop 1542 latches the FLUSH signal at the next tick of the NODE CLK signal to provide the FLUSH LAT signal. If the FLUSH LAT signal is negated, neither control network message packet 60 being received by a child buffer/receiver 1420(x) has a set flush bit 75. On the other hand, if the FLUSH LAT signal is asserted, at least one such control network message packet 60 does have a set flush bit 75.

Clear control section 1533 also has a circuit 1543 that generates a USE PK BUF signal if the input source identifier enables the source data selector 1440 (FIG. 65) to use the control network message packet 60 buffered in the park buffer 1442. This is indicated if both the SEL LEFT LAT and SEL PARK BUF LAT (LFT) signals are asserted by left/ right select circuit 1472 and latch/buffer select circuit 1473 in synchronism with the RCV ST 0 signal. In that case, the USE PK BUF signal is asserted.

The parked/segment clear status section 1531 includes a multiplexer 1534 and flip-flop 1535. Multiplexer 1534 is controlled by an AND gate 1536, which is energized if the UP RCV ST 10 and PARK/NO SEG signals are asserted, and if the FLUSH LAT signal is negated. As noted above, the FLUSH LAT signal is controlled by the clear control section 1533, and is negated if no control network message packet 60 is received in which the flush bit 75 is asserted. If the clear control section is negating a CLR PK BUF STATUS clear park buffer status signal, multiplexer 1534 couples an asserted signal to the flip-flop 1535, which is set in response to the next tick of the NODE CLK signal to assert the PARKED/NO SEG signal. On the other hand, if the FLUSH LAT signal is asserted, the AND gate 1536 is de-energized, but the clear control section 1533 will be asserting the CLR PK BUF STATUS signal. In that case, multiplexer 1534 will couple a negated signal to flip-flop 1535, to reset the flip-flop 1535 and negate the PARKED/NO SEG signal.

After parked/segment clear status section 1531 has established the condition of the PARKED/NO SEG signal while a control network message packet 60 is loaded into the park buffer 1442, the multiplexer 1534 normally couples the PARKED/NO SEG signal to the data input terminal of the flip-flop 1535 to enable it to maintain its condition. However, the clear control section may enable a change in the PARKED/NO SEG signal under two circumstances, namely, if a control network message packet 60 is received in which the flush bit 75 is set, or if the buffered packet is used by the source data selector 1440. If, while the packet is being buffered, a control network message packet 60 is received in which the flush bit 75 is set, the FLUSH/ST 10 signal will be asserted, enabling assertion of the CLR PK BUF STATUS clear park buffer status signal. Similarly, if the source data selector 1440 selects the buffered packet as the SEL INP DATA (L) signal, the USE PK BUF signal is asserted, also enabling assertion of the CLR PK BUF STATUS signal. In either case, the asserted CLR PK BUF STATUS signal enables the multiplexer 1534 to coupled a negated signal to the data input terminal of the flip-flop 1534, enabling the flip-flop 1534 to be cleared to negate the PARED/NO SEG signal.

The parked/segment set status section 1532 operates in a manner similar to the parked/segment clear status section 1531 if the PARK/SEG signal is asserted instead of the PARK/NO SEG signal.

FIG. 71 depicts details of the park overflow buffer 1446, multiplexer 1453 and park overflow buffer (left) status/control circuit 1451. With reference to FIG. 71, the park overflow buffer 1446 comprises a flip-flop, identified by the same reference numeral. The status/control circuit 1451 includes a condition circuit 1544 and a clear enable circuit 1545. The condition circuit 1544 enables the flip-flop 1446 to be conditioned in response to the scan overflow bit 80 of the control network message packet 60. In particular, if a control network message packet 60 is being stored in the park buffer 1442 an AND gate 1546 is energized in coincidence with the assertion of the UP RCV ST signal to assert the PARK LEFT OVFL BUF park left overflow buffer signal. The asserted PARK LEFT OVFL BUF signal enables the multiplexer 1453 to couple the SEL INP TAG (L) selected input tag signal from tag input selector 1445 (FIG. 65) to the data input terminal of flip-flop 1446. The signal conditions flip-flop 1446 at the next tick of the NODE CLK signal.

Thereafter, the PARK LEFT OVFL BUF signal is negated. If a CRL LEFT OVFL BUF clear left overflow buffer signal from clear enable circuit 1545 is also negated, multiplexer 1453 couples the POVL park overflow left signal from flip-flop 1446 back to its input terminal, to enable flip-flop 1446 to maintain its condition at successive ticks of the NODE CLK signal. If the clear enable circuit 1545 thereafter asserts the CLR LEFT OVFL BUF signal, the multiplexer 1453 couples a negated signal to the data input terminal of the flip-flop 1446, enabling the flip-flop to be cleared at the next tick of the NODE CLK signal, to negate the POVL signal.

The clear enable circuit 1545 asserts the CLR LEFT OVFL BUF signal under four circumstances. First, the clear enable circuit 1545 asserts the CLR LEFT OVFL BUF signal if the up control circuit 1424 asserts the LIP RCV ST RST signal, which occurs if both child nodes are root nodes. Second, the clear enable circuit 1545 asserts the signal if an AND gate 1547 is energized, which occurs if flush control portion 1537 (FIG. 70) asserts the FLUSH LAT signal indicating reception of a control network message packet 60 in which the flush bit 75 is set. In addition, if AND gates 1550 or 1551 are energized, indicating respectively, that a packet buffered in packet buffer in the left or right child receiver/buffer 1420(x), is coupled by the respective source data selector 1440 as the SEL INP DATA (x) signals.

Finally, FIG. 72 depicts a segment bit latch 1560 maintained by the park buffer control/status circuit 1450. the segment bit latch 1560 provides a SEG L segment left signal that indicates the condition of the segment bit 77 in a control network message packet 60 received from the left child if it is a multiple-source message enabling a scan forward or reduce operation, or of a packet received from the right child it is a multiple-source message enabling a scan backward operation. The SEG L signal indicates the state of the segment bit of the control network message packet 60 regardless of whether the multiple-source message data is processed when received, or if it is buffered in the packet buffer 1442.

The segment bit latch 1560 includes a flip-flop 1561, which generates the SEG L signal, and a multiplexer 1562 which controls the source of signals coupled to the data input terminal of the flip-flop 1561. A segment latch source control circuit 1563 generates a SEG BIT SRCE SEL segment bit source select signal to control the source of the signal coupled by the multiplexer 1562 to the flip-flop 1561, effectively selecting between the C(L) FLICK UP (4) LAT signal, representing the received tag signal, or the PARKED/ SEG parked/segment signal from parked/segment set status section 1532 (FIG. 70). A segment latch hold select circuit 1564 generates a SEG BIT HOLD segment bit hold signal to enable the multiplexer 1562 to maintain its condition, or to interchange conditions with the segment bit latch in the right child receiver/buffer 1420(R). The segment latch hold select circuit 1564 asserts the SEG BIT HOLD signal contemporaneous with the assertion by the up control circuit 1424 of the UP RCV ST 1 through UP RCV ST 9 signals.

If neither the SEG BIT SRCE SEL signal nor the SEG BIT HOLD signal is asserted, the multiplexer 1563 couples the C(L) FLICK UP (4) LAT signal as a SEL SEG (L) selected segment (left) signal to the data input terminal of flip-flop 1561. The flip-flop 1561 latches the SEL SEG (L) signal at each tick of the NODE CLK signal. The circuit comprising segment latch source control 1563 is similar to the circuit of the message packet priority circuit 1470, and provides an asserted SEG BIT SRCE SEL signal, contemporaneous with the assertion of the UP RCV ST 0 signal, if the control network message packet 60 being received is to be buffered in the park buffer 1442. In that case, the asserted SEG BIT SRCE SEL signal enables the multiplexer 1562 to couple the PARKED/SEG parked/segment signal from parked/segment set status section 1532 (FIG. 70), which indicates whether the segment bit 77 of the buffered control network message packet 60 was set.

When the UP RCV ST 0 signal is negated, the SEG BIT SRCE SEL signal is negated, and the segment latch hold select circuit 1564 asserts the SEG BIT HOLD signal. This enables the multiplexer 1562 to couple the SEG L signal from flip-flop 1561 as the SEL SEG (L) signal to the data input terminal of flip-flop 1561, enabling it to maintain its state while the SEG BIT HOLD signal is asserted. If, while the SEG BIT HOLD signal is asserted, an AND gate 1565 in the segment latch source control circuit 1563 is also energized, contemporaneous with the assertion of the UP RCV ST 2 signal, to assert the SEG BIT LAT SRCE SEL signal. This will occur if the control network node 51 is transmitting a multiple-source message enabling a scan backward operation. In that case, the multiplexer 1562 couples a SEG R segment right signal from a segment bit latch 1560 in the right child receiver/buffer 1420(R) as the SEL SEG (L) selected segment (left) signal, which the flip-flop 1561 latches. In that case, the conditions of the SEG "x" ("x" indicates "L" or "R") are effectively interchanged, thereby completing the interchange of data from control network message packets 60 from the left and right child nodes. When the UP RCV ST 2 signal is then negated, the SEG BIT SRCE SEL signal is again negated, to enable only the SEG BIT HOLD signal to control the multiplexer 1562.

When the SEG BIT HOLD signal is later negated, contemporaneous with the assertion of the UP RCV ST 10 signal, the SEG BIT HOLD signal is negated, enabling the multiplexer 1562 to couple the C(L) FLICK UP (4) LAT signal to the flip-flop 1561 as the SEL SEG (L) signal.

ii. Flick (Up) Data Processor 1421

FIG. 73 depicts details of the flick (up) data processor 1421. With reference to FIG. 73, the flick (up) data processor 1421 includes the adder 1425, OR circuit 1426, XOR (exclusive OR) circuit 1427 and comparator 1428, as represented on FIG. 64. The adder 1425 provides, in response to the SEL INP DATA (x) selected input data signals from the left and right child receiver buffers 1420(x), SUM signals an UP CRY OUT carry signal and an OVFL overflow in signal, which together represent the sum of the values represented by the SEL INP DATA (x) signals. Associated with the adder 1425 is a carry latch 1570 and a carry select multiplexer 1571 that, under control of a control circuit 1577, selectively latches the UP CRY OUT carry signal. The carry latch 1570, at each tick of the NODE CLK signal provides a CRY IN carry in signal which is also used by the adder 1425 in generating the SUM signals. Similar circuitry (not shown) is provided for the OVFL overflow signal, to provide the OVFL IN signal. In addition, if the SEL INP DATA (x) signals represent the last data nibbles 70(i) of their respective control network message packets 60, and if the control network message packets 60 enable a scan or reduce operation, the up output packet assember 1422 uses the CRY IN and OVFL IN signal in conditioning the scan overflow bit 80 of the control network message packet 60 it is transmitting.

The OR circuit 1426 and XOR circuit 1427 generate OR and XOR signals representing the bit-wise OR and XOR, respectively, of the SEL INP DATA (x) signals. In addition, the complements of the XOR signals are directed to an AND gate 1574. If all of the XOR signals are negated, which occurs if the corresponding bits of the SEL INP DATA (L) and SEL INP DATA (R) signals have the same value, the AND gate 1574 is energized to assert a L EQ RT left equals right signal. Associated with the XOR gate 1427 is a latch 1575 and a multiplexer 1576 that selectively latches the L EQ RT signal. The latch 1575, at each tick of the NODE CLK signal, generates a DATA EQ LAT data equals latched signal.

The comparator 1428 generates L GT RT left greater than right signal whose condition indicates whether the binary-encoded value of the SEL INP DATA (L) signals is greater than the binary-encoded value of the SEL INP DATA (R) signals. Associated with the comparator 1428 is a latch 1572 and multiplexer 1573 which selectively latches the L GT RT signal. The multiplexer 1573, along with multiplexer 1576, are controlled by the control circuit 1577. Generally, while the DATA EQ LAT signal is asserted, indicating that the binary-encoded value of the successive data nibbles 70(i), represented by the SEL INP DATA (x) signals at successive ticks of the NODE CLK signal, are equal, the control circuit 1577 enables the multiplexers 1576 and 1573 to direct the L EQ RT and L GT RT signals, respectively, to their respective latches 1575 and 1572.

However, if the L EQ RT signal is negated, indicating that the binary-encoded values of the SEL INP DATA (x) signals are not equal, the latch 1575 negates the DATA EQ LAT signal. At that point the L GT RT signal, which is latched by the latch 1572, indicates which of the SEL INP DATA (x) signals has the greater binary-encoded value. The control circuit 1577 thereafter enables the multiplexers 1576 and 1573 to couple the output signals from their latches 1572 to their input terminals, so that they maintain their conditions at succeeding ticks of the NODE CLK signals. Thus, the control circuit 1577 ensures that the COMP L/R LAT signal will identify the control network message packet 60, represented by the SEL INP DATA (x) signals, having a packet data portion 62 with the greater binary-encoded value.

The control circuit 1577 generates two control signals for controlling the multiplexers 1573 and 1576, namely, a LAT EQ/COMP LAT latch equal/comparator latch signal and a HOLD EQ/COMP LAT hold equal/comparator latch signal. While the LAT EQ/COMP LAT signal is asserted, the multiplexers 1573 and 1576 couple the L GT RT and L EQ RT signal to the data input terminals of their respective latches 1572 and 1575. Initially, contemporaneous with the assertions of the UP RCV ST 0 through UP RCV ST 2 signals by the up control circuit 1424, both the HOLD EQ/COMP LAT and LAT EQ/COMP LAT signals will be negated. In that condition, the multiplexers 1573 and 1573 couple asserted signals to the data input latches of their respective latches 1572 and 1575, to set the latches and assert the COMP L/R LAT and DATA EQ LAT signals.

However, while the UP RCV ST 3 through UP RCV ST 9 signals are asserted, which occurs while the SEL INP DATA (x) signals represent the successive data nibbles 70(i) of the control network message packets 60, an AND gate 1580 asserts the LAT EQ/COMP LAT signal, if the latch 1575 is asserting the DATA EQ LAT signal, indicating that the binary-encoded values of the data nibbles 70(i) are equal, and if the up output packet assember 1422 is asserting either the UP OUT PKT MS or UP OUT PKT SS signals. The last condition indicates that the data represented by at least one of the SEL INP DATA (x) signals is from a single-source or multiple-source message. If the DATA EQ LAT signal is negated, indicating that the binary-encoded values of the SEL INP DATA (x) signals are not the same, the LAT EQ/COMP LAT signal is negated.

The control circuit 1577 asserts the HOLD EQ/COMP LAT signal under several circumstances. If, while the UP RCV ST 3 through UP RCV ST 9 signals are asserted, an UP BOTH SS signal is asserted, and if the DATA EQ LAT signal is negated, an AND gate 1581 is energized to enable an OR gate 1582 to assert the HOLD EQ/COMP LAT signal. The UP BOTH SS signal is asserted if both child nodes are transmitting single-source messages. In this case, if both single-source message are of the configuration type, and if AND gate 1581 is energized, the data nibbles 70(i) single-source messages will represent different height values. As noted above, if control network node 51 receives single-source messages, of the configuration type, having different height values, it transmits a single-source message in which the height value is the maximum of the two received height values. AND gate 1581 enables this to occur.

In addition, if, while the UP RCV ST 3 through UP RCV ST 9 signals are asserted, if the up output packet assembler 1422 is asserting the UP OUT PKT MS up output packet multiple-source signal, indicating that it is transmitting a multiple-source message, an AND gate 1583 is energized to enable the OR gate 1582 to assert the HOLD EQ/COMP LAT signal. This enables the latch 1572 to maintain its condition at that point, and, if the multiple-source message enables a maximum operation, the up output message assembler may use the COMP L/R LAT signal in determining which of the SEL INP DATA (x) signals to use in the control network message packet 60 it is transmitting.

In addition, if the control network message packet 60 being transmitted by the up output packet assember 1422 is multiple-source message enabling a multiple-word operation, which effectively uses subsequent control network message packets 60 of the multiple-source message type, an AND gate 1584 enables the OR gate 1582 to maintain the HOLD EQ/COMP LAT signal asserted. That a multiple-source message enables a multiple word operation is indicated by the assertion, by the up output packet assembler 1422 of a UP M SCAN multiple-word scan signal, along with the assertion of the UP OUT PKT MS signal. When the up control circuit 1421 then asserts the UP RCV ST 12, AND gate 1584 is energized to enable the OR gate 1582 to assert the HOLD EQ/COMP LAT signal.

It will be appreciated that the adder 1425, OR circuit 1426, XOR circuit 1427 and comparator 1428 operate in response to each set of the SEL INP DATA (x) signals provided thereto, without regard to the types of messages and message packets as represented by the SEL INP DATA (x) signals, or the operations enabled thereby. The up output packet assembler determines which, if any, of the output signals provided by each of the circuits 1425 through 1428 to use in assembling control network message packet 60 for transmission thereby. Thus, the circuits 1425 through 1428 do not require or use enabling signals based on the type of control network message packet 60 being assembled in order to operate.

iii. Up Output Packet Assembler 1422

FIG. 74 depicts a detailed block diagram of the up output packet assembler. With reference to FIG. 74, the up output packet assembler 1422 comprises an output data selector 1590 that receives signals from a number of sources and, under control of OUT DATA SEL output data source select signals from an output source identifier circuit 1592, couples signals from one source as the low-order P FLICK UP (3:0) signals. In addition, an output tag selector circuit 1592 that, under control of OUT TAG SEL output tag select signals from the output source identifier circuit 1591, selectively couples signals from a number of sources as the P FLICK UP (4) signal. It will be appreciated that the low-order P FLICK UP (3:0) signals, at successive ticks of the NODE CLK signal, represents the packet information portion of successive flicks of a control network message packet 60. Similarly, the high-order P FLICK UP (4) signal, also at successive ticks of the NODE CLK signal, represents the successive tag signals in the control network message packet 60.

The up output packet assembler 1422 also includes an output packet status store 1593 that receives the P FLICK UP (3:0) signals, as well as the UP RCV ST (2:0) signals and the NODE CLK signal and generates up output packet status signals identifying the message type, packet type and, if the control network message packet 60 represented by the P FLICK UP (4:0) signals is of the multiple-source type, the particular operations enabled thereby. In addition, the up output packet assembler 1422 includes a checksum generator 1594 that, after being reset by the UP RCV ST 0 signal, at successive ticks of the NODE CLK signal provides CHECK (4:0) checksum signals in response to the P FLICK UP (4:0) signals. During transmission of the last flick of the control network message packet 60, containing the checksum field 63 (FIG. 7), the output source identifier circuit 1591 enables the output data and tag selectors 1590 and 1592 to couple the CHECK (3:0) and CHECK (4) checksum signals, respectively, as the P FUCK UP (3:0) and P FLICK UP (4) signals.

The structures of the various circuits depicted on FIG. 74 will not be described in detail. The output data and tag selectors 1590 and 1592 each comprise one or more multiplexers, which, under control of the OUT DATA SEL and OUT TAG SEL signal, selectively couple signals input thereto to their respective output terminals. The particular signals coupled by the respective selectors 1590, as determined by the output source identifier circuit 1591, depends on several factors, including which types of control network message packets 60 are being received by the left and right child receiver/buffers 1420(x), on whether the park buffers 1442 in the left and right child receiver/buffers 1420(x) are storing message packets, and on which UP RCV ST (12:0) state signal is being asserted. The output source identifier 1591 determines which type of control network message packet 60 to generate, which information is latched in the output packet status store for use by the output source identifier 1591 as it enables the output data selector 1590 to provide P FLICK UP (3:0) signals representing the successive flicks of the control network message packet 60.

In addition, the output source identifer 1591 in response to the INP PKT TYPE signals and the UP RCV ST (12:0) signals, enables the output tag selector 1592 to selectively couple signals input thereto as the P FLICK UP (4) signal. The particular input signal selected to be coupled will depend on the particular UP RCV ST (12:0) signal asserted, so that the control network message packet 60 generated has the correct sequence of tag bits represented by the successive P FLICK UP (4) signal.

Generally, the output data selector 1590 receives the SEL INP DATA (x) signals from the left and right child receiver/buffers 1420(x), as well as the SUM, OR, and XOR signals from the flick (up) data processor 1421. In addition, the output data selector 1590 receives IDLE, MS and ABSN signals representing the encoding of the message type field 64 for a control network message packet 60 of, respectively, the abstain, multiple-source and abstain message type. Finally, the output data selector 1590 receives the CHECK (3:0) checksum signals from the checksum generator 1594.

The output source identifier 1591 enables the output data selector 1590, at each tick of the NODE CLK signal, and in synchronism with the UP RCV ST (12:0) signals, to couple one of these sets of signals to its output terminals as the P FLICK UP (3:0) signals. In selecting which signals to be coupled, the output source identifier uses INP PKT TYPE input packet type signals from the input packet type decoders 1447 in the child receiver/buffers 1420(x), representing the types of messages received from the left and right children. Thus, if control network message packets 60 of different message types are being received from the child nodes, the output source identifier 1591 determines which, if either, type will be transmitted.

If, for example, the INP PKT TYPE signals indicate that a single-source message is being received from one child node and no message is being received from the other child node, the output source identifier 1591 will generate OUT DATA SEL signals to enable the output data selector to couple the SEL INP DATA (x) signals from the child receiver/buffer 1420(x) whose child node is providing the single-source message. The output source identifier 1591 enables the output data selector 1590 to couple the SEL INP DATA (x) signals while the UP RCV ST 0 through UP RCV ST 10 signals are being asserted. In that case, the output packet status store 1593 asserts the UP OUT PK SS up output packet single-source signal while the UP RCV ST 0 is asserted in synchronism with the next tick of the NODE CLK signal. In addition, if the single-source message is of the configuration type, the output packet status store 1593 asserts the UP OUT PKT CONFIG up output packet configuration signal while the UP RCV ST 1 is asserted in synchronism with the next tick of the NODE CLK signal. The output source identifier uses the UP OUT PKT SS and UP OUT PKT CONFIG signals to identify the type of packet it is generating as it generates OUT DATA SEL signals enabling generation of successive flicks of the message packet.

However, if INP PKT TYPE signals indicate that single-source messages of the configuration type are being received from both child nodes, the output source identifier 1591 will generate OUT DATA SEL signals to enable the output data selector to couple the SEL INP DATA (x) signals from either child receiver/buffer 1420(x). If the COMP L/R LAT compare left/right latched signal from comparator 1428 (FIG. 63) indicates that the binary-encoded value of the packet data portion 62 from one child is greater than the binary-encoded value of the packet data portion 62 received from the other, it generates OUT DATA SEL signals to enable the output data selector at that point to begin coupling the SEL INP DATA (x) signals from that child's receiver/buffer 1420(x) as the P FLICK UP (3:0) signals. The output source identifier 1591 enables the output data selector 1590 to couple the SEL INP DATA (x) signals while the UP RCV ST 0 through UP RCV ST 10 signals are being asserted. In addition, the output packet status store 1593 asserts the UP OUT PK SS up output packet single-source signal and UP OUT PKT CONFIG up output packet configuration signal while, respectively, the UP RCV ST 0 and UP RCV ST 1 signals are asserted in synchronism with the next tick of the NODE CLK signal. The output source identifier uses the UP OUT PKT SS and UP OUT PKT CONFIG signals to identify the type of packet it is generating as it generates OUT DATA SEL signals enabling generation of successive flicks of the message packet.

However, if INP PKT TYPE signals indicate that multiple-source messages are being received from both child nodes, the output source identifier 1591 will, in synchronism with the assertion of the UP RCV ST 0 signal, generate OUT DATA SEL signals to enable the output data selector 1590 to couple the MS signals, which correspond to the MS message type code, as the P FLICK UP (3:0) signals. The output packet status store 1593, in response, asserts the UP OUT PKT MS up output packet multiple-source signal, which controls subsequent operations by the output source identifier circuit 1591. The output source identifier circuit, at the assertion of the UP RCV ST 1 and UP RCV ST 2 signals, generates OUT DATA SEL signals that enable the output data selector to couple the SEL INP DATA (x) signals from either of the child receiver/buffers 1420(x) as the P FLICK UP (3:0) signals. The output data selector 1590 may selectively couple either the SEL INP DATA (x) signals, since the operation enabled by the multiple source messages will be the same.

The output packet status store 1593, enabled by the assertion of the UP RCV ST 1 signals, in synchronism with the tick of the NODE CLK signal, may also assert the OUT PKT SCF/RED output packet scan forward/reduce signal, an UP REDUCE signal and the UP M SCAN up multi-word scan signal. Thes signals, which are derived from the encoding of the packet type fields 65 and pattern bits 67 of the message packets 60 being received, provide information as to the operation enabled by the multiple-source messages. If the OUT PKT SCF/RED signal is asserted, the operation enabled by the multiple-source message is either a scan forward operation or a reduce operation; if the signal is negated the operation is a scan backward operation. If the operation is a reduce operation, the output packet status store 1593 also asserts the UP REDUCE signals. In addition, if the operation is a multi-word scan operation, the output packet store 1593 asserts the UP M SCAN signal. The output source identifier 1591 uses these signals in subsequent operations.

When the UP RCV ST 2 signal is asserted, in synchronism with the tick of the NODE CLK signal, the output packet status store 1593 asserts one of the UP COMB ADD, UP COMB OR, UP COMB XOR and UP COMB MAX up combine add, OR, XOR, and maximum signals. These signals, which are derived from the encoding of the combine function field 66 of the message packets 60 being received, provide additional information as to the operaion enabled thereby. The output source identifier 1591 uses these signals in subsequent operations. In particular, if the UP COMB ADD, UP COMB OR, UP COMB XOR signals are asserted at the assertions of the UP RCV ST 3 through UP RCV ST 10 signals, the output source identifier circuit 1591 generates OUT DATA SEL signals to enable the output data selector to couple the SUM, OR or XOR signals, respectively, as the P FLICK UP (3:0) signals.

On the other hand, if the UP COMB MAX signal is asserted, the output source identifer 1591 uses the COMP L/R LAT compare left/right latched signal to select one of the SEL INP DATA (L) or SEL INP DATA (R) signals to be coupled as the P FLICK UP (3:0) signal, and generates appropriate OUT DATA SEL signals. In particular, if the COMP L/R LAT compare left/right latched signal from comparator 1428 (FIG. 63) indicates that the binary-encoded value of the packet data portion 62 from one child is greater than the binary-encoded value of the packet data portion 62 received from the other, it generates OUT DATA SEL signals to enable the output data selector at that point to begin coupling the SEL INP DATA (x) signals from that child's receiver/buffer 1420(x) as the P FLICK UP (3:0) signals.

If INP PKT TYPE signals indicate that a multiple-source message is being received from one child node, and an idle message is being received from the other child node, the output source identifier uses the PK BUF (x) ST park buffer status signals to determine whether a message packet from the other child node is being buffered in a packet buffer. If so, the operations described above are performed, in the same manner as if multiple-source messages were being received from both child nodes. Similarly, if the input packet type signals indicate that idle or NPAC nil packet messages are being received from both child nodes, and the PK BUF (x) ST status signals indicate that park buffers 1442 in both child receiver/buffers 1420(X) are buffering message packets, the operations described above are performed, in the same manner if multiple-source messages were being received from both child nodes.

In any case, while the UP RCV ST 11 signal is asserted, which occurs during transmission of the global information portion 71, the output source identifier generates OUT DATA SEL signals that enable the output data selector to couple the OR signals as the P FLICK UP (3:0) signals. This occurs regardless of the message types of the message packets 60 received from the respective child nodes, or the message type of the message packet 60 transmitted to the parent node. As noted above, the global information portion 71 in the packets 60 as transmitted by the leaves 21 (FIGS. 1, 5 and 6) contains status information that is ORed by the control network 14 and the result broadcasted to all leaves in the partition, including the scalar processors 12. Thus, by monitoring the global information portion 71 of packets 60 that they receive, the scalar processors 12 can determine status of, for example, the processing elements 11.

In addition, while the UP RCV ST 12 signal is asserted, it enables the output data selector 1590 to couple the CHECK (3:0) checksum signals as the P FLICK UP (3:0) signals to provide the low-order portion of the checksum field 63 of the control network message packet 60 being generated.

3. Root Flag 1407 And Associated Control Circuitry

Figure 75:
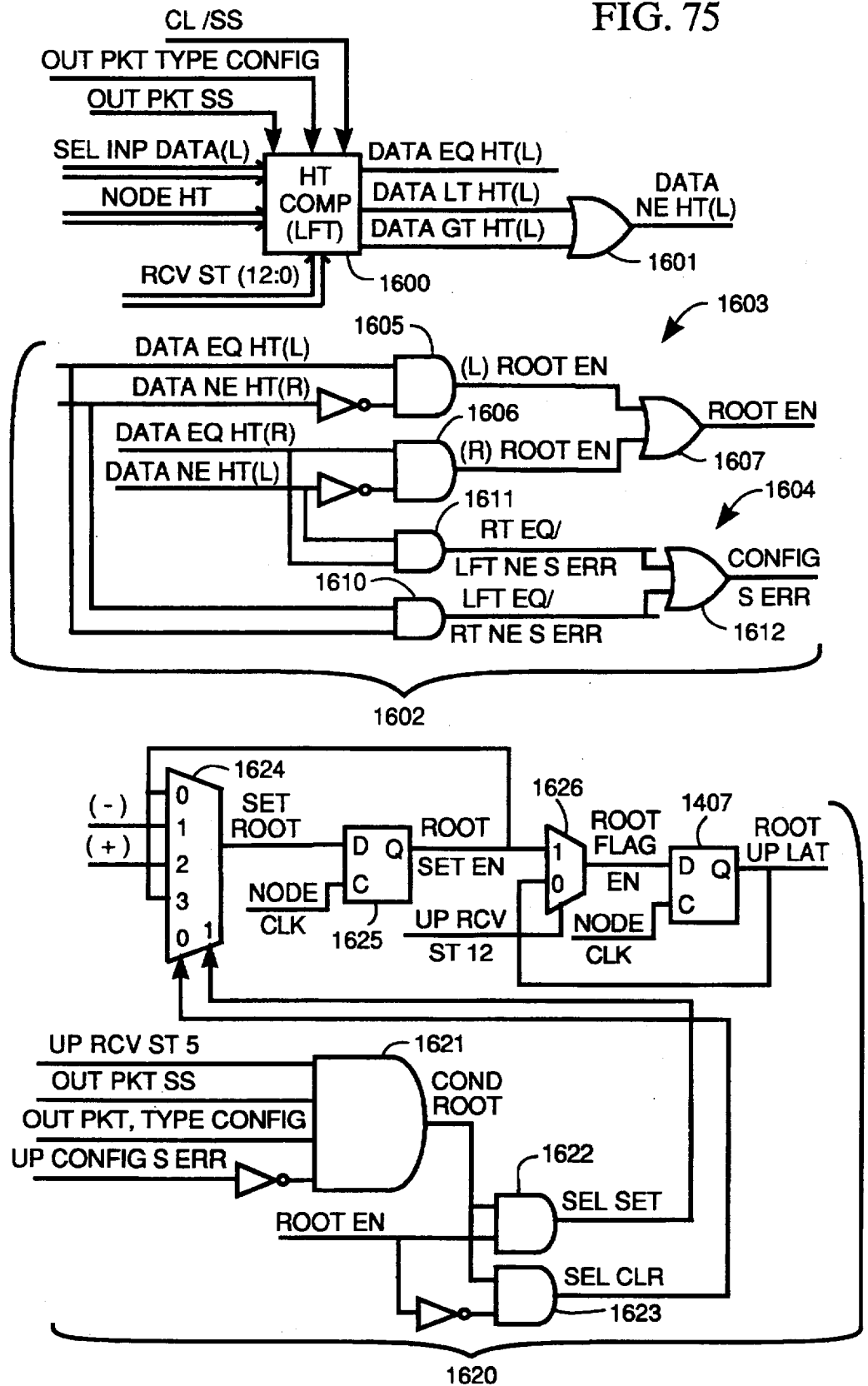

FIG. 75 depicts details of the root flag 1407 (FIG. 63) and circuitry for controlling its condition. With reference to FIG. 75, the control circuitry includes a left height comparison circuit 1600 and a correspoding right height comparison circuit (not shown). Generally, each of the height comparison circuits, if the respective left or right child nodes are providing single-source message packets of the configuration type, compares the height values in data nibbles 70(0) and 70(1) (FIG. 7) to NODE HT node height signals whose binary-encoded value represents the level of the control network node 51 in the control network 14. If the values are the same, the height comparison circuit generates a DATA EQ HT (x) data equals height signal ["x" corresponds to "L" (left) or "R" (right)]. On the other hand, if the values differ, a DATA NE HT (x) data not equal to height signal is asserted. The DATA EQ HT (x) and DATA NE HT (x) signals are used to control the condition of the root flag 1407.

More specifically, if (a) the CL/SS left child single-source signal is asserted contemporaneous with the assertion of the UP RCV ST 0 signal, indicating that the left child node is providing a single-source message, and (b) the up output packet assembler 1422 is asserting the OUT PKT SS output message packet single-source and OUT PKT TYPE CONFIG output packet type configuration signals, in response to the assertion of the UP RCV ST 3 and UP RCV ST 4 signals the left height comparison circuit 1600 compares the SEL INP DATA (L) selected input data signals to the NODE HT signals. As shown in FIG. 7, while the UP RCV ST 3 and UP RCV ST 4 signals are asserted, the SEL INP DATA (L) signals represent the data nibbles 70(0) and 70(1) containing the root height data. If the root height data in the control network message packet 60 corresponds to the binary-encoded value of the NODE HT signals, the left height comparison circuit 1600 asserts the DATA EQ LT (L) signal. Alternatively, the left height comparison circuit 1600 asserts the DATA LT HT (L) signal or DATA GT HT (L) signal if the value of the root height data is less than or greater than the binary-encoded value of the NODE HT signals. If the left height comparison circuit 1600 asserts either the DATA LT HT (L) or the DATA GT HT (L) signals, an OR gate 1601 asserts the DATA NE HT (L) left data not equal to height signal.

The DATA EQ HT (x) and DATA NE HT (x) signals ("x" references "L" and "R") from the left and right height comparison circuits are coupled to a height comparison resolver circuit 1602. The height comparison resolver circuit 1602 includes circuitry for performing two functions. First, a root establishment enable circuit 1603 asserts a ROOT EN root enable signal if at least one of the left or right height comparison circuits asserts the DATA EQ HT (x) signal, and the other heigh comparison circuit is not asserting its DATA NE HT (x') signal. This ensures that the ROOT EN signal is not asserted if both child nodes are providing single-source messages of the configuration packet type, but with different height values. The height comparison resolver circuit also includes a configuration error detector circuit 1604, which asserts a CONFIG S ERR configuration software error signal if at least one of the left or right height comparison circuits asserts the DATA EQ HT (x) signal, and the other heigh comparison circuit is asserting its DATA NE HT (x') signal.

More specifically, the root establishment enable circuit 1603 includes two AND gates 1605 and 1606, and an OR gate 1607. If the left heigh comparison circuit 1600 is asserting the DATA EQ HT (L) signal, and the right height comparison circuit is not asserting its DATA NE HT (R) signal, the AND gate 1605 is energized to assert a (L) ROOT EN left root enable signal. On the other hand, if the right height comparison circuit is asserting the DATA EQ HT (R) signal, and the left height comparison circuit 1600 is not asserting its DATA NE HT (L) signal, the AND gate 1606 is energized to assert a (R) ROOT EN right root enable signal. If either the (L) ROOT EN signal or the (R) ROOT EN signal is asserted, the OR gate 1607 is energzied to assert the ROOT EN root enable signal.

It will be appreciated that the (x) ROOT EN signal will be asserted if (a) the "x" (left or right) height comparison circuit determines that a control network message packet 60 has been received from the "x" child indicating that this control network node 51 should be a root node, and (b) no control network message packet 60 has been received from the other child node indicating that another node should be root node. If both child nodes provide control network message packets 60 indicating that the control network node 51 should be a root node, both the AND gates 1605 and 1606 are energized to assert the respective (x) ROOT EN root enable signals.

Similarly, the configuration error detector circuit 1604 includes two AND gates 1610 and 1611 and an OR gate 1612. If the left heigh comparison circuit 1600 is asserting the DATA EQ HT (L) signal, and the right height comparison circuit is also asserting its DATA NE HT (R) signal, the AND gate 1610 is energized to assert a LFT EQ/RT NE S ERR left equal/right not equal software error signal. On the other hand, if the right height comparison circuit is asserting the DATA EQ HT (R) signal, and the left height comparison circuit 1600 is also asserting its DATA NE HT (L) signal, the AND gate 1606 is energized to assert a RT EQ/LFT NE S ERR right equal/left not equal software error signal. It will be appreciated that either signal will be asserted if (a) the a height comparison circuit determines that a control network message packet 60 has been received from the its child indicating that this control network node 51 should be a root node, and (b) another control network message packet 60 has been received from the other child node indicating that another node should be root node. If either the LFT EQ/RT NE S ERR signal or the RT EQ/LFT NE S ERR signal is asserted, the OR gate 1612 is energized to assert the CONFIG S ERR configuration software error signal, which may be used by the up output message assembler 1422 in establishing the condition of the soft ware error bit 76 in a control network message packet 60.

The ROOT EN and CONFIG S ERR signals are used by a root flag conditioning circuit 1620 to establish the condition of the root flag 1407. If the CONFIG S ERR configuration software signal is negated, and if the up output packet assembler 1422 is asserting the OUT PKT SS and OUT PKT TYPE CONFIG signals, an AND gate 1621 is energized in synchronism with the assertion the UP RCV ST 5 signal to assert a COND ROOT signal to enable the root flag to be conditioned. As noted above, up output packet assembler 1422 asserts the OUT PKT SS and OUT PKT TYPE CONFIG signals, if if it is assembling a message of the single-source message type and configuration packet type, which, in turn, occurs if at least one child node is providing such a control network message packet 60.

The assertion of the COND ROOT condition root signal enables input terminals of AND gates 1622 and 1623. The AND gates 1622 and 1623 are also controlled by the true and complement, respectively, of the ROOT EN signal. If the COND ROOT signal is asserted, and if the ROOT EN signal is also asserted, AND gate 1622 asserts a SEL SET select set signal, which controls a multiplexer 1624. When the SEL SET signal is asserted, multiplexer 1624 couples an asserted signal as a SET ROOT signal to the data input terminal of a Rip-flop 1625. The asserted SET ROOT signal enables the Rip-flop 1625 to be set at the next tick of the NODE CLK signal to assert a ROOT SET EN root set enable signal.

Thereafter the AND gate 1621 is de-energized, to negate the COND ROOT signal. The negated COND ROOT signal, in turn, de-energizes AND gate 1622 which negates the SEL SET select set signal. Since the AND gate 1623 is also de-energized, a SEL CLR select clear signal is also negated, enabling the multiplexer 1622 to couple the ROOT SET EN signal as the SET ROOT signal to the data input terminal of the flip-flop 1625. Thus, while the SEL SET and SEL CLR signals are negated, the flip-flop 1625 maintains its set condition at successive ticks of the NODE CLK signal The now-asserted ROOT SET EN signal is also coupled to an input terminal of a multiplexer 1626. When an UP RCV ST 12 signal is asserted, multiplexer 1625 couples the ROOT SET EN signal to its output terminal as a ROOT FLAG EN root flag enable signal, which, in turn, is coupled to the data input terminal of root flag 1407. Since the ROOT SET EN signal is asserted, the ROOT FLAG EN signal will be asserted as well, enabling the root flag to be set at the next tick of the NODE CLK signal. The setting of the root flag 1407 enables it to assert the ROOT UP LAT root up latch signal, which controlls the packet buffer 1406 (FIG. 64) and is coupled to the parent node as the ROOT UP signal. After the UP RCV ST 12 signal is negated, the multiplexer 1625 couples the ROOT UP LAT signal as the ROOT FLAG EN signal, enabling the root flag 1407 to maintain its condition at successive ticks of the NODE CLK signal.

On the other hand, if, while the AND gate 1621 is asserting the COND ROOT signal, the root establishment enable circuit 1603 is negating the ROOT EN signal, AND gate 1623 is energized to assert the SEL CLR select clear signal. In that case, the AND gate 1622 will be de-energized, negating the SEL SET select set signal. In that condition, the multiplexer 1624 couples a negated signal as the SET ROOT signal, which clears flip-flop 1625 at the next tick of the NODE CLK signal, and negating the ROOT SET EN root set enable signal. As above, when the AND gate 1621 negates the COND ROOT signal, both AND gates 1622 and 1623 will be de-energized, negating the respective SEL SET and SEL CLR signals, so that multiplexer 1624 will maintain the flip-flop 1625 in the same condition at successive ticks of the NODE CLK signal.

The now-negated ROOT SET EN signal is also coupled to an input terminal of multiplexer 1626. When an UP RCV ST 12 signal is asserted, multiplexer 1625 couples the negated ROOT SET EN signal to its output terminal as a ROOT FLAG EN root flag enable signal, which, in turn, is coupled to the data input terminal of root flag 1407. Since the ROOT SET EN signal is negated, the ROOT FLAG EN signal will be negated as well, enabling the root flag to be cleared at the next tick of the NODE CLK signal. The clearing of the root flag 1407 enables it to negate the ROOT UP LAT root up latch signal. After the UP RCV ST 12 signal is negated, the multiplexer 1625 couples the ROOT UP LAT signal as the ROOT FLAG EN signal, enabling the root flag 1407 to maintain its condition at successive ticks of the NODE CLK signal.

As noted above, the multiplexer 1625 couples the ROOT SET EN root set enable signal to the data input terminal of root flag 1407 as the ROOT FLAG EN signal in synchronism with assertion of the UP RCV ST 12 signal. Thus, the root flag 1407 is conditioned contemporaneous with transmission by the up output packet assembler 1422 of the end of the control network message packet 60 it is currently transmitting. Since the ROOT UP LAT signal provided by the root flag 1407 controls transmission of control network message packets 60 to the parent node and also controls storage of packets 60 in the packet buffer 1406, it will be appreciated that conditioning of the root flag in synchronism with assertion of the UP RCV ST 12 signal ensures that partial packets not be transmitted to the parent node or stored in the packet buffer.

4. flick down control portion 1402

Figure 76:
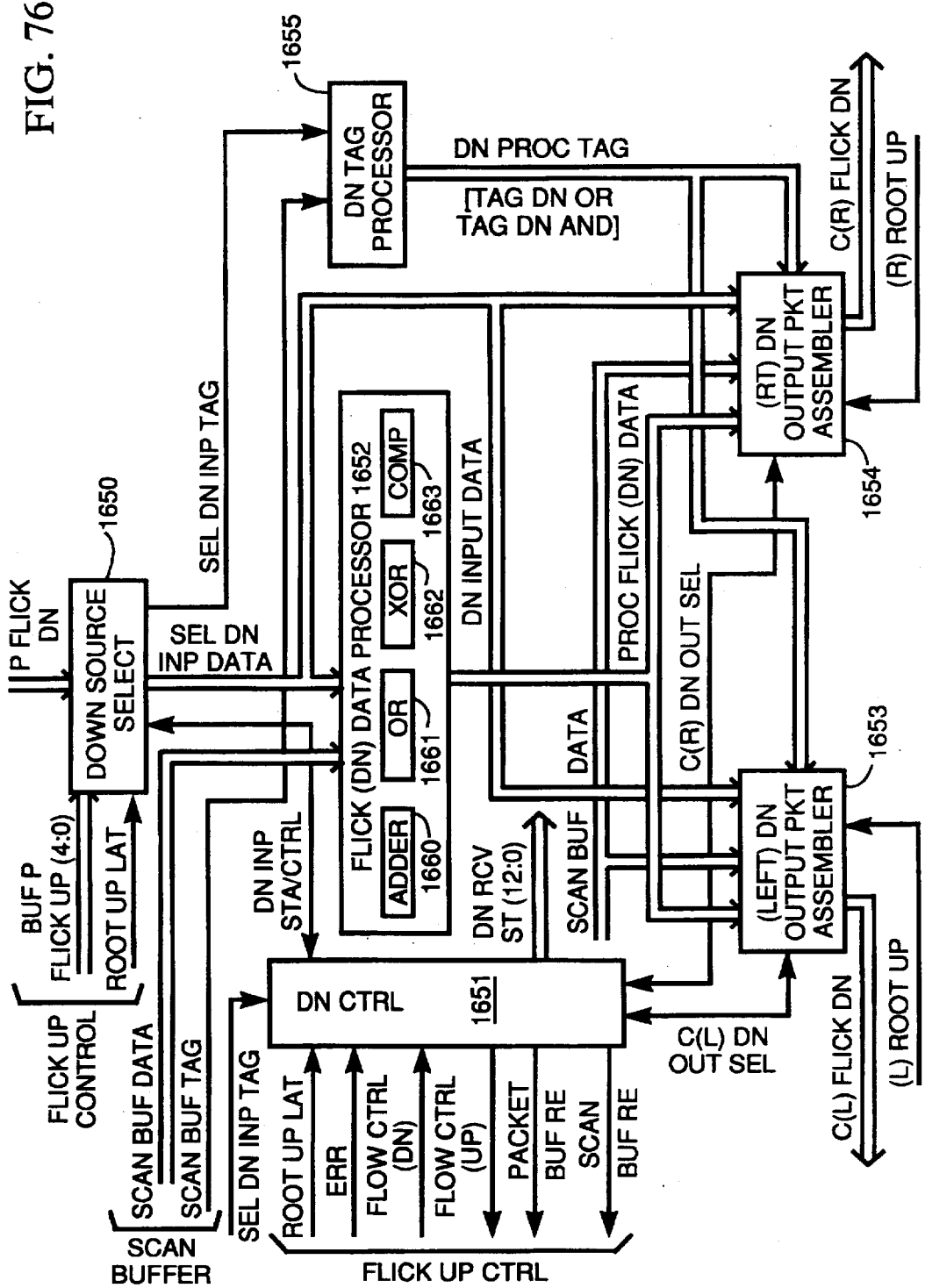

FIG. 76 depicts a detailed block diagram of the flick down control portion 1402. With reference to FIG. 76, the flick down control poriton 1402 includes a down source select circuit 1650 that receives P FLICK DN (4:0) signals from a parent node in the control network 14 and BUF P FLICK UP (4:0) signals from the packet buffer 1406 (FIG. 64), along with the ROOT UP LAT signal. In response to the ROOT UP LAT signal, at successive ticks of the NODE CLK signal the down source select circuit 1650 selectively couples either the P FLICK DN (4:0) signals or the BUF P FLICK UP (4:0) signals as SEL DN INP DATA (3:0) selected down input data signals and a SEL DN INP TAG signal. In addition, the down source select circuit 1650 provides DN INP STA/CTRL down input status/control signals and the SEL DN INP TAG signal to a down control circuit 1651.

In turn, the down control circuit 1651, like up control circuit 1424, generates a number of control and timing signals for controlling the operations of the flick down control portion. In particular, the down control circuit generates DN RCV ST (12:0) down receive state timing signals, which comprise thirteen signals DN RCV ST 0 through DN RCV ST 12, which are successively asserted, in response to successive ticks of the NODE CLK signal, in synchronism with the receipt, by the down source select circuit 1650, of the thirteen flicks of a control network message packet 60.

In addition, if the root flag 1407 is asserting the ROOT UP LAT root up latch signal, the down control circuit provides the PACKET BUF RE packet buffer read enable signal to enable the packet buffer 1406 (FIGS. 63, 64) to generate BUF P FLICK UP buffered flick up signals representing a control network message packet 60. Similarly, if the control network message packet 60 received by the down source select circuit, either from the parent node in the control network 14 or from the packet buffer 1406, is a multiple-source message, the down control circuit 1651 provides a SCAN BUF RE scan buffer read enable signal, which enables the scan buffer (FIGS. 63, 64) to couple message packet data stored therein to the flick down control portion 1402. The data from the scan buffer 1410 is combined with message packet data from the the message packet 60 being received by the down source select circuit 1650 by a flick down data processor 1652.

The down control circuit 1651 also receives the SEL DN INP TAG selected down input tag signal from the down source select circuit 1650 and, in response to the signals representing the condition of the scan flow bits 72(i) (FIG. 5), generates FLOW CTRL (UP) flow control up signals that are coupled to the up control circuit 1424. As described above, the FLOW CTRL (UP) signals are used by the flick up control portion to control the transfer of control network message packets 60 of the multiple-source message type to the parent node. Similarly, the down control circuit 1681 receives a FLOW CONTROL (DN) flow control down signal from the up control circuit, and uses it to control the transfer of control network message packets 60 of the multiple-source message type to the child nodes.

Furthermore, the donw control circuit 1651 receives an ERR error signal from the up control circuit 1424. The down control circuit may use the ERR signal to enable the conditioning of the software error bit 76 in control network message packets 60 transmitted by the flick down control portion 1402.

The flick down control portion 1402 includes left and right down output packet assembler circuits 1653 and 1654 which receive signals from the down source select circuit 1650, from the flick down data processor 1652, from a down tag processor 1655 and, under control of C(x) DN OUT SEL child down output select signals ["x" references "L" (left) or "R" (right)] from the down control circuit 1651, generates control network message packets 60 for transfer to the respective left and right child nodes in the control network 14. In particular, at successive ticks of the NODE CLK signal the down output packet assembler circuits 1653 and 1654 generate C(x) FLICK DN signals representing successive flicks of control network message packets 60 generated thereby.

The types of control network message packets 60 generated by the down output packet assemblers 1653 and 1654 depends in part on the condition of a (x) ROOT UP signal as controlled by the child node connected thereto. In particular, in response to the (x) ROOT UP signal, from a child node, shifting from the negated condition to an asserted condition, the corresponding down output packet assembler circuit, at the end of the control network message packet 60 it is then transmitting begins transmitting C(x) FLICK DN signals representing message packets of the NPAC nil packet message type. The down packet assembler circuit waits until the end of the packet it is transmitting when the condition of the (x) ROOT UP signal changes, so that the flick down control portion 1402 of the child node receives the entire control network message packet 60. Similarly, if the condition of the (x) ROOT UP signal changes from an asserted condition to a negated condition, the down packet assembler circuit continues transmitting NPAC messages to the child node until the beginning of the next packet enabled by the down control circuit 1651. Accordingly, the down output packet assemblers generate and transfer complete message packets to their respective child nodes.

Otherwise the types of control network message packets 60 generated by the respective down output packet assembler circuits 1653 and 1654 at any particular time depends upon the type of control network message packet 60 being received by the down source select circuit 1650. In particular, if the down source select circuit 1650 receives a packet 60 of the single-source message type or idle message type, the down control circuit 1651 enables the down output packet assemblers to use the low-order four bits of each flick, comprising packet information portion (FIG. 7) thereof in generating single-source message packets for transfer to the child nodes. In generating the high-order tag bits for the successive flicks of the message packet being generated, the down output packet assembler circuits use signals from various sources, including the down tag processor 1655 and the down control circuit 1651, to determine the condition of the respective bits.

Similarly, if the down source select circuit 1650 receives a message packet of the multiple-source type, the down control circuit 1651 will enable down output packet assembler circuits to use either the SEL DN INP DATA selected down input data, the SCAN BUF DATA scan buffer data signals or DN PROC DATA down processed data signals from the flick down data processor 1652 in generating the data portion 62 of a control network message packet 60. The PROC FLICK (DN) DATA processed flick down data signals from down data processor 1652 represent the sum, logical OR, logical XOR and maximum of the SEL DN INP DATA signals, as generated by an adder 1660, an OR circuit 1661, an XOR circuit 1662 and a comparator 1663, respectively. If, for example, the multiple-source message enables a scan forward operation, the down control circuit 1651 enables the down output packet assembler circuit 1653 to use the SCAN BUF DATA in the data portion 62 in the packet 60 being transmitted to the left child. In addition, the down control circuit 1651 enables the down output packet assembler circuit 1654 to use the DN PROC DATA down processed data signals from the flick down data processor 1652 in the packet 60 being transmitted to the right child.

On the other hand, if the multiple source message enables a scan backward operation, the down control circuit 1651 enables the down output packet assembler circuit 1653 to use the DN PROC DATA down processed data signals from the flick down data processor 1652 in the packet 60 being transmitted to the left child. In addition, the down control circuit 1651 enables the down output packet assembler circuit 1654 to use the SCAN BUF DATA in the data portion 62 in the packet 60 being transmitted to the right child. Effectively, if a multiple-source message enables a scan backward operation, the down control circuit 1651 enables the down output packet assembler circuits 1653 and 1654 to reverse the message packets transmitted thereby to their respective child nodes, to achieve the reverse scan operation as described above.

Furthermore, if the multiple source message enables a reduce operation, the down control circuit enables the down output packet assembler circuits 1653 and 1654 to use the SEL DN INP DATA signals representing the flicks of the packet data portion 62 in the message packets 60 assembled thereby. As described above, in a reduce operation, the combination of the data from the respective leaves 21 (FIGS. 1, 5 and 6) is performed by the flick up control portions 1401 as the control network message packets 60 are being transmitted up the control network 14 to the root node, and the packets transmitted down carry the results of the reduce operation as determined by the root node.

To enable generation of portions of a multiple source message other than the packet data portion 62, the down control circuit 1651 may enable the down output packet assembler circuits to use SEL DN INP DATA signals received by the down source select circuit 1650 representing those portions of the message. For example, the down control circuit 1651 may enable the down output packet assembler cirucits to use SEL DN INP DATA signals representing the first three flicks, comprising the packet header 61, in the message packets generated thereby for transmission to the child nodes. In addition, each down output packet assembler circuit 1653 and 1654 has a checksum generator that generates a checksum value for use in the flick representing the checksum field 63 of the control network message packet 60 being generated.

Finally, if the FLOW CTRL (UP) signal from the up control circuit 1681 indicates that a child node is unable to receive message packets 60, if a multiple source message is thereafter received from the parent node, the down control circuit 1681 enables the left and right down output packet assembler circuits 1653 and 1654 to generate idle messages for transfer to their respective child nodes. As will be described below in connection with FIG. 77, the down source select circuit 1650 will buffer the multiple-source message received from the parent node, and the down control circuit 1651 will enable the up control circuit 1424 to, in turn, enable the up output packet assembler to set the scan flow bits 72 of control network message packets 60 it is transmitting to the parent node. The parent node is thereafter inhibited from transmitting multiple-source messages to the flick down control portion 1402.

Figure 77:
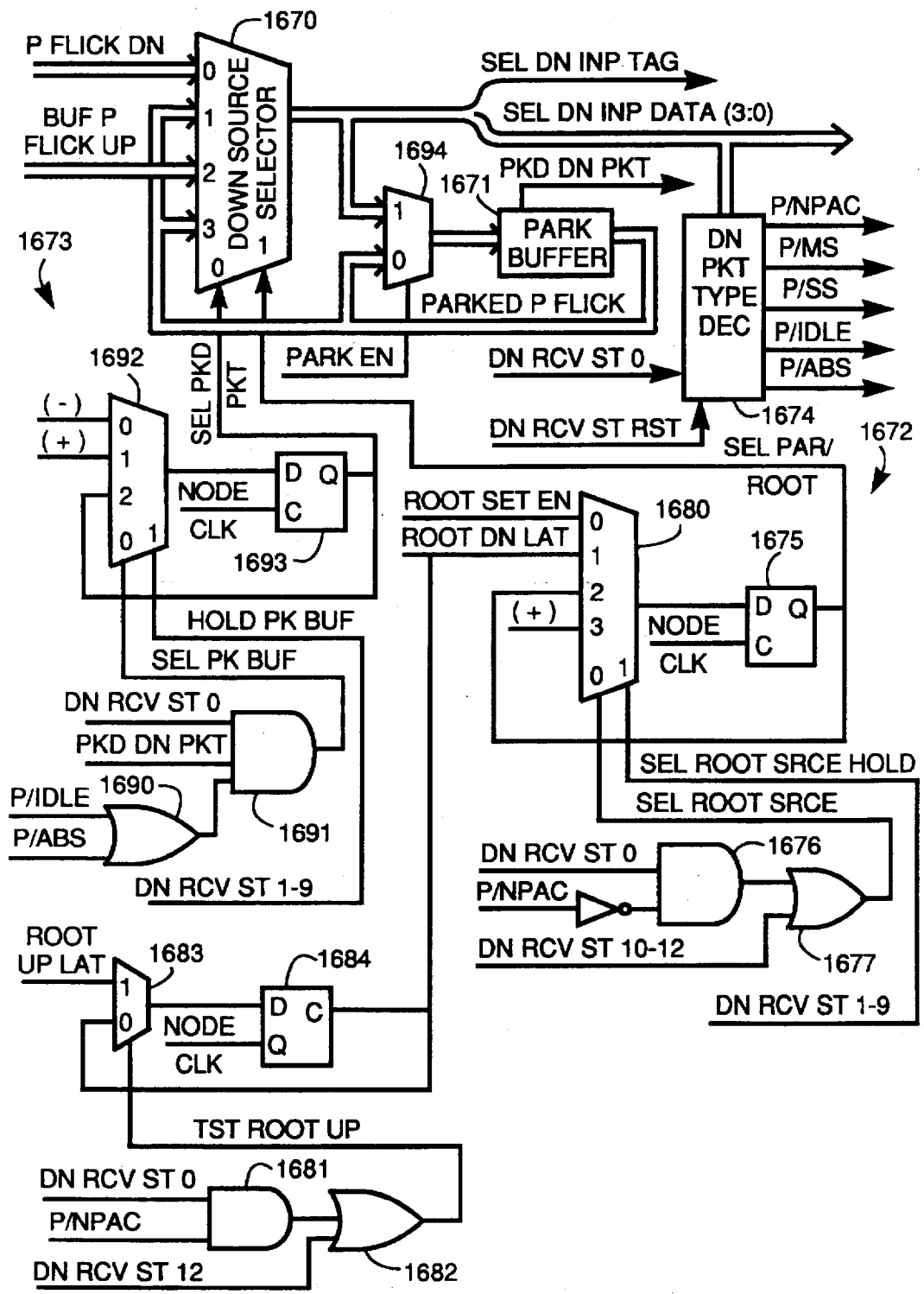

Many of the circuits of the flick down control portion 1402 are similar to corresponding circuits of the flick down control portion 1401 and will not be described. FIG. 77 depicts details of the down source select circuit 1650, showing the selection of either the P FLICK DN (4:0) signals from the parent node or the BUF P FLICK UP (4:0) signals from the flick up control portion 1401 as the SEL DN INP DATA (3:0) and SEL DN INP TAG signals. As noted above, the down source select circuit 1650 makes the selection in resposne to the ROOT UP LAT root up latch signal from the root flag 1407 (FIGS. 63 and 75).

With reference to FIG. 77, the down source select circuit 1650 includes a down source selector circuit 1670 that selectively couples either the P FLICK DN parent flick down signals or the BUF P FLICK UP buffered parent flick up signals, or alternatively PARKED P FLICK parked parent flick signals from a park buffer 1671 as the SEL DN INP DATA (3:0) signals and the SEL DN INP TAG signals. The park buffer 1671 can buffer a control network message packet 60 of the multiple-source message type if a child node is disabling transfer of such messages thereto.

The down source selector circuit 1670 is controlled by two circuits, namely, a parent/packet buffer select enable circuit 1672 and a park buffer select enable circuit 1673. Both circuits 1672 and 1673 operate in connection with message type identification signals from a down packet type decoder 1674, which, in synchronism with the DN RCV ST RST and DN RCV ST 0 down receive state reset and zero timing signals from the down control circuit 1651, generates signals identifying the message type of the message packet 60 being coupled by the down source selector circuit 1670. In particular, the down packet type decoder generates P/NPAC, P/MS, P/SS, P/IDLE and P/ABS signals which, when asserted, indicate that the message packet 60 is of the NPAC nil packet, mulitple-source, single-source, idle or abstain types, respectively.

The parent/packet buffer select enable circuit 1672 generates a high-order SEL PAR/ROOT select parent or root signal for controlling the down source selector 1670. The circuit 1672 operates in resposne to ROOT UP LAT root up latch and ROOT SET EN root set enable signals to condition a flip-flop 1675 to, in turn, control the SEL PAR/ROOT signal. If the parent node is transmitting P FLICK DN signals representing NPAC nil packet messages, the down packet type decode circuit 1674 will assert the P/NPAC signal in synchronism with the DN RCV ST 0 signal. In that condition, an AND gate 1676 is de-energized, which disables one input terminal of an OR gate 1677. Since at this point the DN RCV ST 10–12 signals, comprising the DN RCV ST 10 through DN RCV ST 12 rceive state timing signals, are also negated, the OR gate is de-energized, negating a SEL ROOT SRCE select root source signal. Since the DN RCV ST 1–9 signals, comprising the DN RCV ST 1 through DN RCV ST 9 signals, are also negated, a SEL ROOT SRCE HOLD select root hold signal is also negatd, enabling a multiplexer 1680 to couple the ROOT SET EN root set enable signal from flip-flop 1625 of the root flag conditioning circuit 1620 (FIG. 75) to the data input terminal of flip-flop 1675.

If the ROOT SET EN signal is negated, flip-flop 1675 is clear at the next tick of the NODE CLK signal, thereby negateing the SEL PAR/ROOT signal. In that case, the down source selector 1670 couples the P FLICK DOWN signals from the parent node, or PARKED P FLICK signals from the park buffer 1671, as the SEL DN INP DATA (3:0) selected down input data signals and the SEL DN INP TAG signal. When the DN RCV ST 1–9 signals are asserted, the multiplexer 1680 couples the SEL PAR/ROOT signal from the output terminal of flip-flop 1675 back to its data input terminal, thereby maintaining the flip-flop 1675 in the clear condition, and the SEL PAR/ROOT signal negated, at successive ticks of the NODE CLK signal.

On the other hand, if the ROOT SET EN signal is asserted, flip-flop 1675 is set at the next tick of the NODE CLK signal, thereby asserting the SEL PAR/ROOT select parent/root signal. It will be appreciated that this will be contemporaneous with the setting of root flag 1407 in response to the asserted ROOT SET EN signal. The assertion of the SEL PAR/ROOT signal enables the down source selector 1670 to couple the BUF P FLICK UP signals from the packet buffer 1410, or the PARKED P FLICK signals as the SEL DN INP DATA (3:0) and SEL DN INPTAG signals. Thus, if the parent node is transmitting NPAC nil packet messages to the control network node 51, the parent/packet buffer select enable circuit 1672 enables the down source selector 1670 to couple BUF P FLICK UP signals from the packet buffer 1406, or the PARKED P FLICK signals from the park buffer, immediately upon the node becoming root node.

The assertion of the DN RCV ST 1–9 signals enables the multiplexer 1680 to couple the asserted SEL PAR/ROOT signal to the input terminal of flip-flop 1675, enabling it to maintain its set condition.

Similarly, if the parent node is transmitting NPAC nil packet messages to the control network node 51, when the DN RCV ST 0 signal is asserted an AND gate 1681 is energized, enabling an OR gate 1682 to assert a TST ROOT UP test root up signal. The asserted TST ROOT UP signal enables a multiplexer 1683 to couple the ROOT UP LAT root up latch signal from root flag 1407 to the data inpu terminal of a flip-flop 1684. If the root flag 1407 is clear and the ROOT UP LAT signal is negated, indicating that the control network node 51 is not a root node, the flip-flop 1684 is reset at the next tick of the NODE CLK signal. On the other hand, if the root flag is set and the ROOT UP LAT signal is asserted, the flip-flop 1684 will be set, asserting a ROOT DN LAT root down latched signal.

On the other hand, if the parent node is not transmitting NPAC nil packet messages to the control network node 51 when the DN RCV ST 0 signal is asserted, the OR gate 1682 will assert the TST ROOT UP signal in rseponse to the assertion of the DN RCV ST 12 signal, which is contemporaneous with P FLICK DN signals representing the last flick of the control network message packet 60 currently being received. At that point, the multiplexer 1683 will couple the ROOT LAT UP signal to the data input terminal of flip-flop 1684. If the ROOT LAT UP signal is asserted, the flip-flop 1684 will be set at the next tick of the NODE CLK signal to assert the ROOT DN LAT root down latched signal. Alternatively, if the ROOT UP LAT signal is negated, the flip-flop 1684 will be cleared to negate the ROOT DN LAT signal.

It will be appreciated that, after the DN RCV ST 12 signal is later negated, enabling the OR gate 1683 to negate the TST ROOT UP signal, the multiplexer 1683 couples the ROOT DN LAT to the data input terminal of flip-flop 1684 to maintain the flip-flop 1675 in its condition at successive ticks of the NODE CLK signal. Effectively, if the parent is not transmitting NPAC nil packet messages, the multiplexer 1683 enables the flip-flop 1684 to be conditioned in response to the ROOT UP LAT signal from root flag 1407 when the DN RCV ST 12 signal, which is contemporaneous SEL DN INP DATA and SEL DN INP TAG signals representing the last flick of the control network message packet 60 being received by the down source selector 1670.

Regardless of the condition of the ROOT DN LAT signal, the OR gate 1677 is contemporaneously energized to assert the SEL ROOT SRC signal. Thus, the multiplexer 1683 couples the ROOT DN LAT signal to the data input terminal of flip-flop 1675. If the ROOT UP LAT signal is negated, indicating that the control network node 51 is not a root node, the flip-flop 1675 will be cleared to negate the SEL PAR/ROOT signal. In that condition, the down source selector 1670 couples the P FLICK DOWN (4:0) signals, or the PARKED P FLICK signals from the park buffer 1671, as the SEL DN INP DATA (3:0) and SEL DN INPTAG signals. Alternatively, if the ROOT UP LAT signal is asserted, indicating that the control network node 51 is a root node, the flip-flop 1675 will be set to assert the SEL PAR/ROOT signal. In that condition, the down source selector 1670 couples the BUF P FLICK DOWN (4:0) signals, or the PARKED P FLICK signals from the park buffer 1671, as the SEL DN INP DATA (3:0) and SEL DN INP TAG signals.

The park buffer select enable circuit 1673 generates a SEL PKD PKT select parked packet signal that, when asserted enables the down source selector circuit 1670 to couple the PARKED P FLICK signals from the park buffer 1671 as the SEL DN INP DATA (3:0) and SEL DN INPTAG signals. If, when the DN RCV ST 0 signal is asserted, the down packet type decoder is asserting either the P/IDLE or the P/ABS signals, an OR gate 1690 is energized to enable an AND gate 1691. If the DN RCV ST 0 is concurrently asserted, the message packet message packet 60 being coupled by the down source selector 1670 is of the idle or abstain message type. If, in addition, a PKD DN PKT parked down packet signal is being asserted by the park buffer 1671, indicating that the park buffer 1671 contains a parked message packet, the AND gate 1691 is energized to assert a SEL PK BUF signal.

The asserted SEL PK BUF signal enables a multiplexer 1692 to couple an asserted signal to the data input terminal of a flip-flop 1693. The flip-flop 1693 is set at the next tick of the NODE CLK signal, thereby asserting the SEL PKD PKT select parked packet signal.

When the DN RCV ST 0 signal is negated, the AND gate 1691 is de-energized, to negate the SEL PK BUF signal. At that point, however, the DN RCV ST 1–9 signals, comprising the DN RCV ST 1 through DN RCV ST 9 signals are asserted, which comprise a HOLD PK BUF hold park buffer signal. The asserted HOLD PK BUF signal enables the multiplexer 1692 to couple the asserted SEL PKD PKT select parked packet signal to the data input terminal of flip-flop 1693, to enable the flip-flop to maintain its state during the successive ticks of the NODE CLK signal.

When the DN RCV ST 10 signal is later asserted, both the SEL PK BUF and the HOLD PK BUF signals will be negateed, enabling the multiplexer 1692 to couple a negated signal to the data input terminal of the flip-flop 1693. The flip-flop 1693 is reset at the next tick of the NODE CLK signal, thereby negating the SEL PKD PKT select parked packet signal. At that point, the down source selector 1670 couples the P FLICK DN or BUF FLICK DN signals, as determined by the condition of the SEL PAR/ROOT select parent or root signal, as the SEL DN INP DATA (3:0) and SEL DN INP TAG signals.

The down control circuit 1651 can also enable a control network message packet 60 to be parked in the park buffer 1671, in a manner similar to the parking of a packet 60 in the park buffer 1442 in the left and right child receiver/buffers 1420(x). If, while the FLOW CTRL (DN) signals from the flick up control portion 1401 indicates that a child node is unable to receive additional multiple-source messages, the down source select circuit 1650 receives a message packet 60 of the multiple-source message type, the down control circuit 1651 asserts a PARK EN park enable signal that enables a multiplexer 1694 to couple SEL DN INP DATA (3:0) signals to data input terminals of the park buffer 1671. The park buffer 1671 latches the signals at the successive ticks of the NODE CLK signal to buffer the packet. After the packet 60 is buffered, the down control circuit 1651 negates the PARK EN signal, which couples the output of the park buffer 1671 to its input terminals. After a message packet 60 is buffered in the park buffer 1671, the down control circuit 1651 conditions the FLOW CTRL (UP) signals to, in turn, enable the flick up control portion 1401 to provide scan flow bits 72(i) (FIG. 7) to disable the parent node from transmitting packets 60 of the multiple source type thereto.

E. Diagnostic Network

1. General

Figure 78:
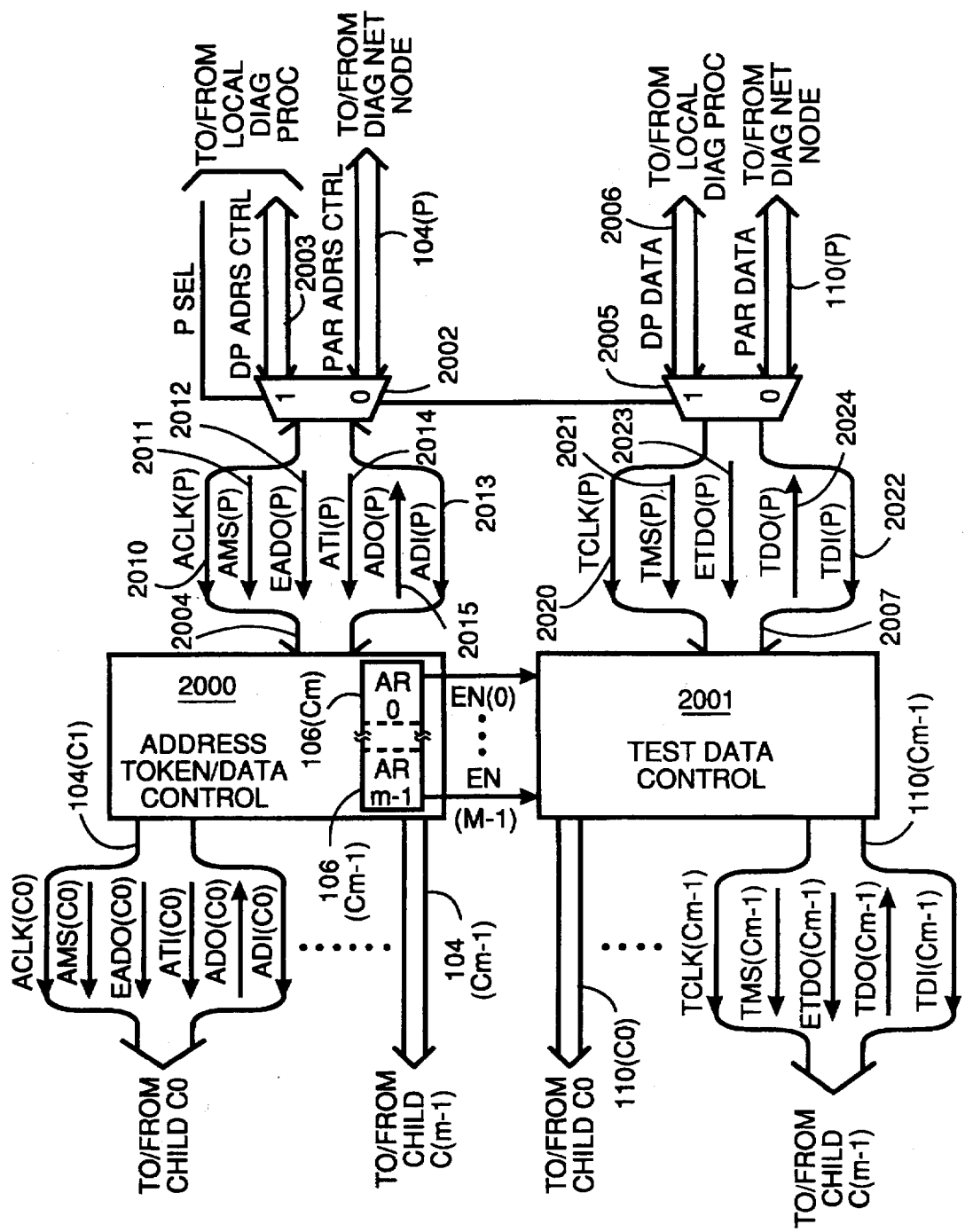
FIG. 78 is a general block diagram of a diagnostic network node used in the diagnostic network described in connection with FIG. 8A, and FIGS. 79 through 81 comprise detailed block and logic diagrams of the diagnostic network node.

FIG. 78 is a general block diagram of a diagnostic network node 100(h,p,r−1) used in the data router described above, and FIGS. 79 through 86 comprise detailed block and logic diagrams of the diagnostic network node 100(h,p,r−1). With reference to FIG. 78, the diagnostic network node, which will be generally identified by reference numeral 100, includes an address token/data control portion 2000 and a test data control portion 2001. The address token/data control portion 2000 generally corresponds to the address control circuit 102 (FIG. 8A) and the test data control portion 2001 generally corresponds to the data control portion 103 (FIG. 8A).

The diagnostic network node 100 receives PAR ADRS CTRL parent address control signals from a parent node, or from the diagnostic processor 101 (FIG. 8A) at one set of data input terminals of a multiplexer/demultiplexer 2002. The multiplexer/demultiplexer 2002 includes another set of data input input terminals, which receive a corresponding set of DP ADRS CTRL diagnostic processor signals over a bus 2003 from a local diagnostic processor (not shown). The local diagnostic processor also generates a P SEL parent select signal, which controls the transfer of signals between buses 2003 or 104(P) and a bus 2004 connected to the address token/data control portion 2000. The local diagnostic processor may negate the P SEL signal to enable the multiplexer/demultiplexer 2002 to couple the address control signals between bus 104(P) and the bus 2004, to thereby enable the signals to be transferred between the parent node 100 or the diagnostic processor 101 and the address token/data control circuit 2000. Alternatively, the local diagnostic processor may assert the P SEL signal to enable the multiplexer/demultiplexer 2002 to couple the address control signals between the bus 2003 and bus 2004 to thereby enable the signals to be transferred between the local diagnostic processor and the address token/data control circuit 2000.

The diagnostic network node 100 also receives PAR DATA parent test data signals over bus 110(P) from a parent node or from the diagnostic processor 101 (FIG. 8A) at one set of data input terminals of a multiplexer/demultiplexer 2005. The multiplexer/demultiplexer 2005 includes another set of data input input terminals, which receive a corresponding set of DP DATA diagnostic processor data signals over a bus 2006 from a local diagnostic processor (not shown). The P SEL parent select signal also controls the transfer of signals between buses 110(P) or 2006 and a bus 2007 connected to the test data control portion 2001. The local diagnostic processor may negate the P SEL signal to enable the multiplexer/demultiplexer 2005 to couple the test data signals between bus 110(P) and the bus 2007, to thereby enable the signals to be transferred between the parent node 100 or the diagnostic processor 101 and the test data control circuit 2001. Alternatively, the local diagnostic processor may assert the P SEL signal to enable the multiplexer/demultiplexer 2005 to couple the test data signals between the bus 2006 and bus 2007 to thereby enable the signals to be transferred between the local diagnostic processor and the test data control circuit 2001.

It will be appreciated that, if the node 100 comprises the root node 100(M,0,0 . . . 0) in the height decoding tree (FIGS. 8A through 8C), the diagnostic processor 101 may be connected to either buses 104(P) and 110(P), respectively, or to buses 2003 and 2006. If the diagnostic processor 101 is connected to buses 104(P) and 110(P), it will maintain the P SEL parent select signal negated, and if it is connected to buses 2003 and 2006 it will maintain the P SEL signal asserted. Alternatively, diagnostic processors may be connected both to buses 10 4(P) and 110(P), on the one hand, and to buses 2003 and 2006, on the other hand, and the P SEL signal may be controlled to enable coupling of signals between there and buses 2004 and 2007.

The address token/data control portion 2000 transmits signals to, and receives signals from, the various child diagnostic network nodes 100 connected thereto over buses 10 4(Ci). In the embodiment depicted in FIGS. 78 through 81, the diagnostic network node 100 may be connected to "m" child nodes, each over a separate bus 104(Ci). Similarly, the test data control portion 2001 transmits signals to, and receives signals from, "m" child diagnostic network nodes 100 connected thereto over buses 110($C_i$), each over a separate bus 110($C_i$).

As also shown in FIG. 78, the address token/data control poriton 2000 includes the flags 106($C_i$). Each flag 106($C_i$) controls an EN(i) enabling signal that controls transfer by the diagnostic network node 100 over the buses 104($C_i$) and 110($C_i$) in tandem. In particular, the flag 106($C_i$), when set, enables the address token/data control circuit 2000 to transmit and receive signals over the bus corresponding 104($C_i$). In addition, the flag 106($C_i$), when set, enables assertion of the corresponding EN(i) enabling signal that, in turn, enables the test data control portion 2001 to transmit and receive signals over the associated bus 110($C_i$).

Before proceeding further, it would be helpful to describe the various signals transmitted over the buses 2002 and 2004. Bus 2002 comprises lines for carrying six signals, five of which, namely, lines 2010 through 2014, are received by the address token/data control portion 2000. The bus 2002 includes a sixth line 2015 for carrying a signal generated by the address token/data control poriton 2000 up the tree defining diagnostic network 16 to the parent node or to the diagnostic processor connected to multiplexer/demultiplexer 2003, depending on the condition of the P SEL signal. Buses 104($C_i$) connected between the address token/data control portion 2000 and child diagnostic network nodes have lines for carrying similar signals therebetween.

In particular, bus 2002 includes a line 2010 that carries an ACLK (P) address clock from parent signal, which the diagnostic network node 100 uses as a clock signal to synchronize operations in the address tocken/data control portion 2000 in connection with other signals comprising bus 2004. In addition, a line 2011 carries an AMS (P) address mode select from parent signal, which controls a control circuit in the address token/data control circuit 2000. The node transmits the ACLK (P) signal and AMS (P) to all of its children.

A line 2013 carries an ATI (P) address token in from parent signal, and a line 2014 carries an ADI (P) address data in from parent signal, both of which cooperate to sequentially condition the flags 106($C_i$) in the diagnostic network node 100. The conditioning of flags 106($C_i$) in the address token/data control 2000 is controlled by a token, which is shifted through a shift register (described below in connection with FIG. 79) in the address token/data control portion 2000. The shift register has a number of stages, each corresponding to one of the flags 106($C_i$) in the diagnostic network node 100. When the token is in a stage in the shift register associated with a particular flag 106($C_K$), if the ADI (P) signal is asserted, the flag is set at the next tick of the ACLK (P) address clock signal. On the other hand, if the ADI (P) signal is negated, the flag 106($C_K$) is cleared.

The condition AMS (P) address mode select signal, along with the ticks of the ACLK (P) signal, controls shifting of the token through the shift register. After the token has shifted through the shift register on the diagnostic network node 100, it shifts out and is transmitted over the buses 104($C_i$) associated with those of the flags 106($C_i$) that are set to the nodes connected thereto. The node also transmits the ADI (P) signal to all of its children. Accordingly, it will be appreciated that the conditioning of the flags 106($C_i$) in each of the child nodes which receive the token will be accomplished in parallel, with the conditions of the flags 106($C_i$) in the respective child nodes being controlled in parallel by the condition of the ADI (P) signal in response to the next tick of the ACLK address clock signal.

In addition, after a flag 106($C_i$) is conditioned, the flag's state may be retrieved. Retrieval is enabled under control of the AMS (P) signal, and the state is represented by the condition of an ADO (P) address data out to parent signal over a line 2015. If address token/data control circuit 2000 of node 100 receives ADO ($C_i$) address data out signals from one or more of its child nodes, associated with set flags 106($C_i$), the address token/data control circuit 2000 may combine them under control of an EADO (P) expected address data out from parent signal on a line 2012 in bus 2004. If the ADO ($C_i$) signals are expected to be asserted, the EADO (P) signal enables the address token/data control circuit 2000 to logically AND them together. In that case, if the ADO ($C_i$) signals from child nodes associated with the set flags 106($C_i$) are all asserted, the ADO (P) address data out to parent signal will be asserted, but if one of the ADO ($C_i$) signals is negated the ADO (P) signal will be negated. On the other hand, if the ADO ($C_i$) signals from the child nodes are expected to be negated, the EADO (P) signal enables the address token/data control circuit 2000 to logically OR them together. In that case, if the ADO ($C_i$) signals from child nodes associated with the set flags 106($C_i$) are all negated, the ADO (P) address data out to parent signal will be negated, but if one of the ADO ($C_i$) signals is asserted the ADO (P) signal will also be asserted.

Bus 2007 comprises lines for carrying five signals, four of which, namely, lines 2020 through 2023, are received by the test data control portion 2001. The bus 2007 includes a fifth line 2024 for carrying a signal generated by the test data control portion 2007 up the tree defining diagnostic network 16 to the parent node or to the diagnostic processor connected to multiplexer/demultiplexer 2005, depending on the condition of the P SEL signal. Buses 104($C_i$) connected between the address token/data control portion 2000 and child diagnostic network nodes have lines for carrying similar signals therebetween.

As noted above, the interface between leaf nodes in the diagnostic network 16 and each pod in one embodiment corresponds to the JTAG ("Joint Test Action Group") interface, as described in IEEE Std. 1149.1 (hereinafter "JTAG specification"). The JTAG interface comprises four signals including a TCK test clock signal, a TMS test mode signal and a TDI test data in signsl, all of which are provided to the pod by the leaf node 100, and a TDO test data out signal provided by the pod to the leaf node 100. The use of the signals is defined in the aforementioned JTAG documentation. Generally, the TCK signal operates as a clock signal, the TMS test mode select signal operates as a test control signal, and the TDI signal defines test data. The TDO signal defines test results.

With this background, the test data control portion 2001 in each node 100 receives a TCLK (P) test clock from parent signal, a TMS (P) test mode select from parent signal, and a TDI (P) test data in from parent signal on lines 2020, 2021 and 2022, respectively of bus 2007. The test data control portion 2001 couples these signals onto respective lines in those of buses 110($C_i$) associated with the asserted EN (i) enable signals. As noted above, those of EN(i) enable signals that are asserted corresponds to those of flags 106($C_i$) that are set. The signals are thus passed from respective parent node to respective child nodes down the paths defined by the set flags 106($C_i$) to the selected ones of the pods.

In addition, bus 2007 includes a line 2023 for carrying an ETDO (P) expected test data out from parent signal. The test data control portion 2001 couples this signal to child nodes along with the TDI (P) and other signals on lines 2020 through 2022. The bus 2007 also includes a line 2024 for carrying a TDO (P) test data out to parent signal, whose utility will be made clear in the following.

The leaf nodes 100 in the diagnostic network 16 provide the TCLK ($C_i$), TMS ($C_i$) and TDI ($C_i$) signals to the respective pods as the TCK, TMS and TDI signals, as called for by the aforementioned JTAG specification. In response, the pods provide a TDO test data out signal, which is also called for by the aforementioned JTAG specification. The TDO signal is received by the test data control portion 2001 as a TDO ($C_i$) signal in the pod's bus 110($C_i$). The test data control portion 2001 of a leaf node 100 receives the TDO ($C_i$) signals from all of the pods associated with asserted EN(i) enable signals, and combines them as called for by the ETDO (P) expected test data out from parent signal.

The test data control portion 2001 uses the ETDO (P) signal in connection with the TDO ($C_i$) signals that are associated with asserted EN(i) signals in the same way the address token/data control portion 2000 uses the EADO (P) expected address data out signal in connection with the ADO ($C_i$) signals associated with set flags 106($C_i$). If the test data control circuit 2001 receives ADO ($C_i$) address data out signals from one or more of the pods or child nodes connected thereto that are associated with asserted EN(i) signals, the test data control circuit 2001 may combine them under control of the ETDO (P) signal. If the TDO ($C_i$) signals are expected to be asserted, the ETDO (P) signal enables the test data control circuit 2001 to logically AND them together. In that case, if the TDO ($C_i$) signals from child nodes associated with the asserted EN(i) signals are all asserted, the TDO (P) test data out to parent signal will be asserted, but if one of the TDO ($C_i$) signals is negated the TDO (P) signal will be negated. On the other hand, if the TDO ($C_i$) signals from the child nodes are expected to be negated, the ETDO (P) signal enables the test data control circuit 2001 to logically OR them together. In that case, if the TDO ($C_i$) signals from child nodes associated with the asserted EN(i) signals are all negated, the TDO (P) test data out to parent signal will be negated, but if one of the TDO ($C_i$) signals is asserted the TDO (P) signal will also be asserted.

2. Address Token/Data Control Portion 2000

Figure 79:
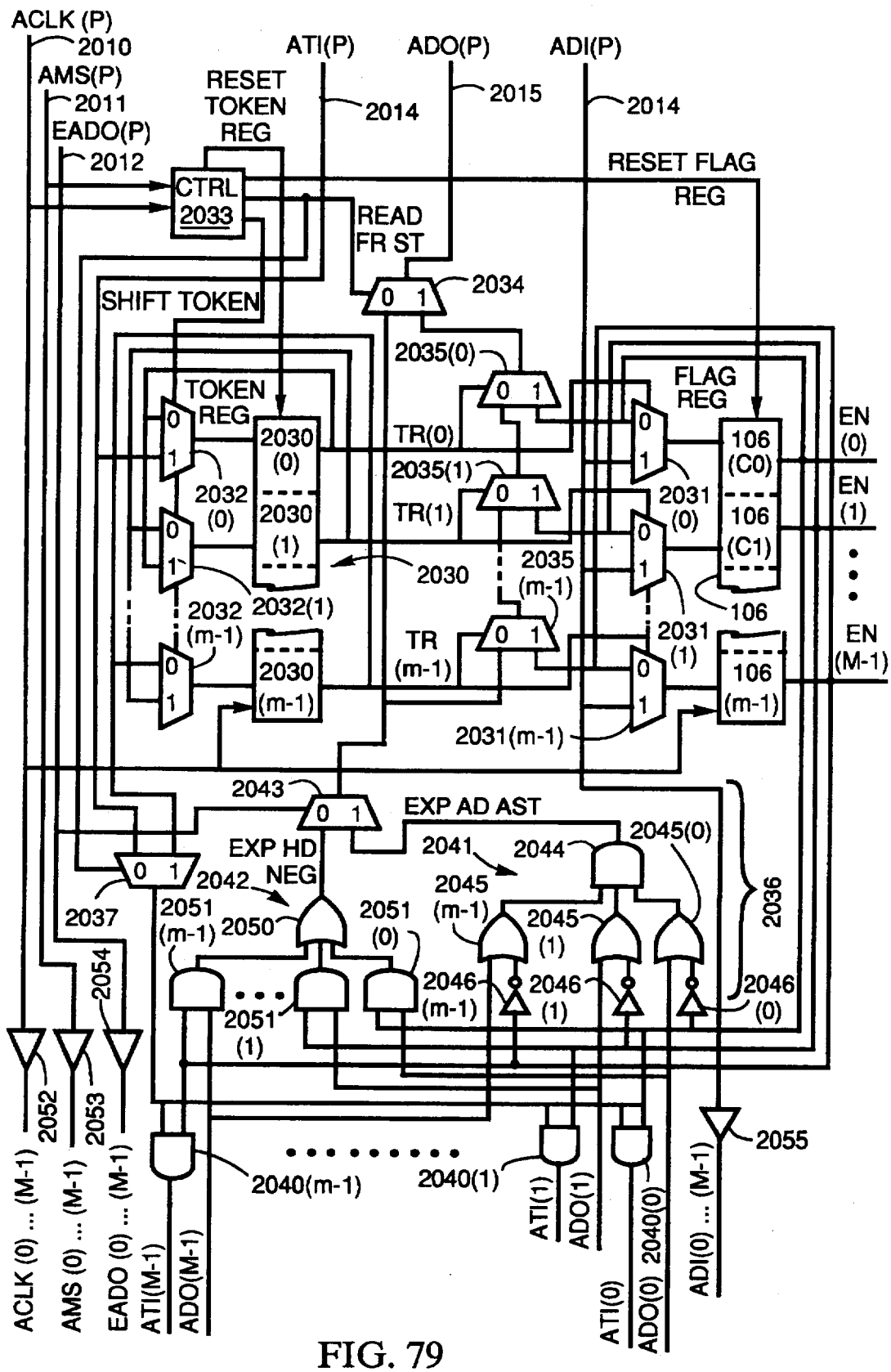

The address token/data control portion 2000 will be described in connection with FIGS. 79 and 80. With reference to FIG. 79, the address token/data control portion 2000 includes a flag register 106 and a token register 2030. The flag register 106 comprises a set of flip-flops each corresponding to one of flags 106($C_i$). The address token/data control portion 2000 depicted in FIG. 13B-1 includes "m" flags 106($C_i$), identified by reference numerals 106($C_0$) through 106($C_{m-1}$). Each flag 106($C_i$) generates a corresponding EN(i) enable signal.

The token register 2030 includes a like number of stages 2030(1) through 2030(m−1) [generally identified by reference numeral 2030(i)] connected to a like number of multiplexers 2032(i) that together form a shift register. Each token register stage 2030(i), in turn, controls a multiplexer 2031(i) that controls the source of signals provided to the input terminal of the corresponding flag 106($C_i$) in flag register 106. In particular, the multiplexers 2031(i) have one data input terminal that receives the ADI (P) address data in signal from line 2014, and a second data input terminal that receives the EN(i) enable signal output by the respective flag 106($C_i$). If the corresponding token register stage 2030(i) is asserting a TR (i) token register signal, the multiplexer 2031(i) couples the ADI (P) signal to the data input terminal of the flag 106($C_i$). The flag 106($C_i$) latches the ADI (P) signal at the next tick of the ACLK (P) address clock from parent signal. On the other hand, if the corresponding stage of the token register stage 2030(i) is not asserting the TR (i) token register signal, the multiplexer 2031(i) couples the EN (i) enable signal output by the flag 106($C_i$) to the data input terminal of the flag, which latches it at the next tick of the ACLK (P) signal. Accordingly, the condition of the TR (i) signal from the respective token register stage 2030(i) determines whether state of the corresponding flag 106($C_i$) remains the same or whether it is controlled by the ADI (P) signal at the next tick of the ACLK (P) signal.

The multiplexers 2032(i) are controlled by a SHIFT TOKEN signal from a control circuit 2033. The SHIFT TOKEN signal enables a token, represented by a set token register stage 2030(i), resulting in an asserted TR (i) signal, to be shifted from the first token register stage 2030(0) to the last stage 2030(m−1), in response to the successive ticks of the ACLK signal. The receipt of the token by the first token register stage 2030(0) is reprsented by the assertion of the ATI (P) address token in from parent signal when the control circuit 2033 asserts the SHIFT TOKEN signal. The ATI (P) signal is coupled to one data input terminal of the multiplexer 2032(0) connected to the first stage 2030(0) of token register 2030. The second data input terminal of the multiplexer 2032(0) is connected to receive the TR(0) token register signal output by the stage 2030(0).

If the control circuit 2033 is asserting the SHIFT TOKEN signal, the multiplexer 2032(0) couples the ATI (P) signal to the intput terminal of the token register stage 2030(0), which latches the signal at the next tick of the ACLK (0) signal. If the ATI (P) signal is negated, the stage 2030(0) is cleared, which, in turn, enables the stage to negate the TR (0) signal. On the other hand, if the ATI (P) signal is asserted, which indicates that the parent diagnostic network node or the diagnostic processor is transmitting the token to this node 100, the stage 2030(0) is set, which, in turn, enables the stage to assert the TR (0) signal.

The series of multiplexers 2032(i) are controlled in unison by the SHIFT TOKEN signal. Thus, if a token register stage 2030(i) is set, indicating that that stage 2030(i) has the token, if the control circuit 2033 is asserting the SHIFT TOKEN signal the multiplexer 2030(i+1) is enabled to couple the TR (i) signal to the input of its respective token register stage 2030(i+1), where it is latched at the next tick of the ACLK (P) signal. If the token register stage 2030(i) is set, asserting its TR (i) signal, the stage 2030(i+1) will be set to assert its TR (i+1) signal. Similarly, if the token register stage 2030(i) is clear, negating its TR (i) signal, the stage 2030(i+1) will be clear. Thus, while the control circuit 2033 asserts the SHIFT TOKEN signal, the token register stages 2030(i) and multiplexers 2032(i) effectively shift the token at successive ticks of the ACLK (P) signal.

On the other hand, if the control circuit 2033 is negating the SHIFT TOKEN signal, each multiplexer 2032(i) is enabled to couple the signal at its other data input terminal, namely, the TR(i) signal output by its respective token register stage 2030(i), to the stage's input terminal. The stage 2030(i) latches the signal at the next tick of the ACLK (P) signal. Thus, the negated SHIFT TOKEN signal enables the token register stages 2030(i) to maintain their respective states.

The TR (m−1) output signal from the last token register stage 2030(m−1) in the token register 2030 is coupled to one data input terminal of a multiplexer 2037. The multiplexer 2037 controls the coupling of the TR (m−1) signal through those of gated driven 2040(m−1) through 2040(0) [generally identified by reference numeral 2040(i)] to those of the child diagnostic network nodes whose EN (i) signals are asserted. Each gated driver 2040(i) provides the ATI ($C_i$) address token in to child signal, which the respective child node receives as the ATI (P) address token in from parent signal on its line 2014. Thus, after the token has passed through the series of token register stages 2030(i) in diagnostic network node 100, it can be passed to the child nodes whose EN (i) signals are asserted.

The control circuit 2033 also controls several other operations in the address token/data control circuit 2000. In particular, the control circuit generates a READ FR ST read flag register state signal which controls a multiplexer 2034. The output terminal of multiplexer 2034 is connected to line 2015 and provides the ADO (P) address data out to parent signal. One data input terminal of multiplexer 2034 is provided by a series of multiplexers generally identified by reference numeral 2035(i). Specifically, each multiplexer 2035(i) receives at one data input terminal the EN (i) signal from an associated flag 106($C_i$) in flag register 106, and at another data input terminal the signal from the next multiplexer 2035(i+1). The second data input terminal of the last multiplexer 2035(m−1) is provided by an address data combining circuit 2036, which, as described below, receives ADO ($C_i$) signals from child nodes for which corresponding EN (i) signals are asserted, and combines them according to logical operations as selected by the EADO (P) expected address data out signal from line 2012.

If a TR (i) signal from token register 2030 is asserted, the corresponding multiplexer 2035(0 is enabled to couple the EN (i) signal representing the condition of the associated flag 106($C_i$) to a data input terminal of the next multiplexer 2035(i−1) in the series. If the TR (0) signal is asserted, the multiplexer 2035(0) couples the EN (0) signal to a data input terminal of the multiplexer 2034. On the other hand, if the TR (i) signal is negated, the corresponding multiplexer 2035(i) is enabled to couple the signal from the next multiplexer 2035(i+1) to the second data input terminal of the next multiplexer 2035(i−1) in the series.

Thus, if the token register 2030 is asserting a TR (i) signal, the series of multiplexers 2035(i) couples the EN (i) enable signal to a data input terminal of the multiplexer 2034. If, however, none of the TR (i) signals is asserted on diagnostic register node 100, the series of multiplexers 2035(i) couples the signal from address data combining circuit 2036 to the same data input terminal of multiplexer 2034. In either case, if the READ FR ST read flag register state signal is asserted, the multiplexer 2034 couples that signal onto line 2015 as the ADO (P) signal. The second data input terminal of multiplexer 2034 is connected directly to the output terminal of the address data combining circuit 2036. Accordingly, if the READ FR ST signal is negated, the multiplexer 2034 will couple the output signal from the address data combining circuit 2036 onto line 2015 as the ADO (P) signal.

The address data combining circuit 2036 receives ADO ($C_i$) signals from the respective child diagnostic network nodes for which the EN (i) enable signals are asserted, combines them according to a logical function identified by the EADO (P) expected address data out signal from line 2012, and provides the result to one data input terminal of multiplexer 2035(m−1). The address data combining circuit includes two general sections, including an AND section 2041 and an OR section 2042, along with a multiplexer 2043 which is controlled by the EADO (P) signal. If the EADO (P) signal is negated, the multiplexer 2043 couples an EXP AD NEG expect negated output signal from the OR section 2042 to the multiplexer 2035(m−1), which will be transmitted through the multiplexers 2035(0 and 2034 as the ADO (P) signal. If the OR section 2042 is negating the EXP AD NEG signal, all of the ADD ($C_i$) signals, from the nodes for which the EN (i) signals are asserted, are negated. Accordingly, the conditions of the ADO ($C_i$) signals will correspond to the negated condition of the EADO (P) signal.

However, if one of the ADO ($C_i$) signals, from the nodes for which the EN (i) signals are asserted, is asserted, the OR section 2042 will assert the EXP AD NEG expect negated signal. The asserted signal will be coupled to the multiplexer 2035(m−1) and through the multiplexers 2035(i) and 2034 as the ADO (P) signal. In that case, the condition of at least one of the ADO ($C_i$) signals will differ from the negated condition of the EADO (P), indicating an error.

On the other hand, if the EADO (P) signal is asserted, the multiplexer 2043 couples an EXP AD AST expect asserted output signal from the AND section 2041 to the multiplexer 2035(m−1), which will be transmitted through the multiplexers 2035(i) and 2034 as the ADO (P) signal. If the AND section 2042 is asserting the EXP AD AST signal, an of the ADO ($C_i$) signals, from the nodes for which the EN (i) signals are asserted, are asserted. Accordingly, the conditions of those ADO ($C_i$) signals will correspond to the asserted condition of the EADO (P) signal.

However, if one of the ADO ($C_i$) signals, from the nodes for which the EN (i) signals are asserted, is negated, the AND section 2041 will negate the EXP AD AST expect asserted signal. The negated signal will be coupled to the multiplexer 2035(m−1) and through the multiplexers 2035 (i) and 2034 as the ADO (P) signal. In that case, the condition of at least one of the ADO ($C_i$) signals will differ from the asserted condition of the EADO (P), indicating an error.

The AND section 2041 of address data combine circuit 2036 includes an AND gate 2043 which receives input signals from a series of OR gates, generally identified by reference numeral 2045(i). Each OR gate 2045(i) receives at one input terminal an ADO ($C_i$) address data out signal from a child diagnostic network node. At its other input terminal, the OR gate 2045(i) receives the complement of the EN (i) signal, as generated by an inverter, generally identified by reference numeral 2046(i). Accordingly, if an EN (i) signal is not asserted, the inverter 2046(i) energizes the OR gate 2045(i) to enable the corresponding input terminal of AND gate 2044.

On the other hand, if the EN (i) signal is asserted, the inverter 2046(i) disables that input terminal of the respective OR gate 2045(i). Thus, the condition of the OR gate 2045(i) is controlled by the condition of the ADO ($C_i$) signal. If the ADO ($C_i$) signal is asserted, the associated OR gate 2045(i) will be energized to energize the respective input terminal of the AND gate 2044. However, if an ADO ($C_i$) signal is negated, the associated OR gate 2045(i) will be de-energized to, in turn, disable the AND gate 2044. Thus, if all of the ADO ($C_i$) signals from the child diagnostic network nodes, for which EN (i) signals are asserted, are asserted, the EXP AD AST expect asserted signal will be asserted. However, if one of the ADO ($C_i$) signals from the child diagnostic network nodes, for which EN (i) signals are asserted, is negated, the AND gate 2044 will be disabled and the EXP AD AST expect asserted signal will be negated.

The OR section 2042 of address data combine circuit 2036 includes an OR gate 2050 which receives input signals from a series of AND gates, generally identified by reference numeral 2051(i). Each AND gate 2051(i) receives at one input terminal an ADO ($C_i$) address data out signal from a child diagnostic network node. At its other input terminal, the AND gate 2051(i) receives the EN (i) signal from the flags 106($C_i$) of flag register 106. Accordingly, if an EN (i) signal is asserted, the corresponding input terminal of AND gate 2051(i) is enabled. On the other hand, if the EN (i) signal is negated, the AND gate 2051(i) is disabled.

Thus, the condition of the AND gates 2051(i) enabled by the asserted EN (i) signals is controlled by the condition of the ADO ($C_i$) signal. If the ADO ($C_i$) signal is negated, the associated AND gate 2051(i) will be de-energized to disable the respective input terminal of the OR gate 2050. If all ADO ($C_i$) signals, for which EN (i) signals are asserted, are negated, the OR gate 2050 will be de-energized to negate the EXP AD NEG expect negated signal. However, if an ADO ($C_i$) signal, for which an EN (i) signal is asserted, is negated, the associated AND gate 2051(i) will be energized to, in turn, energize the OR gate 2050 and assert the EXP AD NEG signal. Thus, if all of the ADO ($C_i$) signals from the child diagostic network nodes, for which EN (i) signals are asserted, are negated, the EXP AID NEG expect negated signal will be negated. However, if one of the ADO ($C_i$) signals from the child diagostic network nodes, for which EN (i) signals are asserted, is asserted, the OR gate 2050 will be energized and the EXP AD NEG expect NEGATED signal will be asserted.

As noted above, multiplexer 2037 controls the coupling of the TR (m–1) signal from token register stage 2030(m–1) to an input terminal of each of gated drivers 2040(i), and those of the EN (i) signals that are asserted enables their respective gated drivers 2040(i) to, in turn, couple the TR (m–1) signal to their respective the child diagnostic network nodes. The TR (m–1) signal is coupled to one data input terminal of the multiplexer 2037. The multiplexer's other data input terminal is connected to line 2014 to receive the ATI (P) signal. The multiplexer 2037 is controlled by the READ FR ST read flag register state signal from the control circuit 2033. If the READ FR ST signal is asserted, the multiplexer 2037 couples the TR (m–1) signal to the input terminals of gated drivers 2040(i) and if the READ FR ST signal is negated the multiplexer 2037 couples the ATI (P) signal thereto.

The diagnostic network node 100 also includes several drivers 2052 through 2055 for transmitting several to all of its child nodes. In particular, drivers 2052 through 2055 transmit, respectively, the ACLK (P) signal from line 2010, the AMS (P) signal from line 2011, the EADO (P) from line 2012 and the ADI (P) from line 2014, to all of its child nodes as the ACLK ($C_i$), AMS ($C_i$), EADO ($C_i$) and ADI ($C_i$) signals. The diagnostic network node 100 effectively broadcasts the signals, without being gated or controlled by the EN (i) enable signal, to all of its child nodes.

The control circuit 2033 also provides several additional signals for controlling the operations of the circuitry depicted on FIG. 79. A RESET TOKEN REG signal enables all of the token register stages 2030(i) of the token register 2030 to be cleared, or reset, to a predetermined state. When the stages 2030(i) are reset, all of the TR (i) token register signals are negated. In addition, a RESET FLAG REG signal enables all of the flags 106($C_i$) to be conditioned to a known state. In one particular embodiment, the flag 106($C_0$) is conditioned to a set state, and the other flags 106($C_1$) through 106($C_{m-1}$) are cleared.

In that case, the diagnostic processor can determine the configuration of the diagnostic network nodes 100(h,p,r–1) in the diagnostic network by, after enabling the control circuits 2033 to assert the RESET FLAG REG signal, to iteratively retrieve the states of the respective flags 106($C_i$) in the various nodes. In that operation, the diagnostic processor 101 can control sequencing of a token down the diagnostic network, and if the ADO (P) signal is asserted the diagnostic processor can determine from that that the location of the token in a token register 2030 identifies the first flag 106($C_0$) in a node. As the token is sequenced through the token register 2030, the ADO (P) signal will be negated. The token will then be transmitted to the child node connected to the bus 104(C1) and when it is received in the first token stage 2030(0) in the token register 2030 therein, the ADI (P) will again be asserted. Thus, the diagnostic processor can determine the number of stages in the flag register 106 by determining the number of steps required in the sequence between assertions of the ADO (P) signal.

As noted above, the control circuit 2033 generates the SHIFT TOKEN, READ FR ST, RESET TOKEN REG and RESET FLAG REG signals to control the other circuit elements depicted on FIG. 79. In one embodiment, the control circuit 2033 is a state machine controlled by the AMS (P) address mode select from parent signal and the ACLK (P) address clock signal. For each state, the condition of the AMS (P) signal determines a target state for the control circuit 2033, and the ticks of the ACLK (P) signal determine the timing of the state transition. It will be appreciated that, since the AMS (P) and ACLK (P) signals are transmitted to, and received by, all diagnostic network nodes 100(h,p,r–1) in parallel, the control circuits 2033 in all of the nodes will be controlled in parallel and will be in the same state at the same time. The various states and state transitions, and the conditions of the signals generated by a control circuit 2033 in each state, are depicted in FIG. 80.

Figure 80:
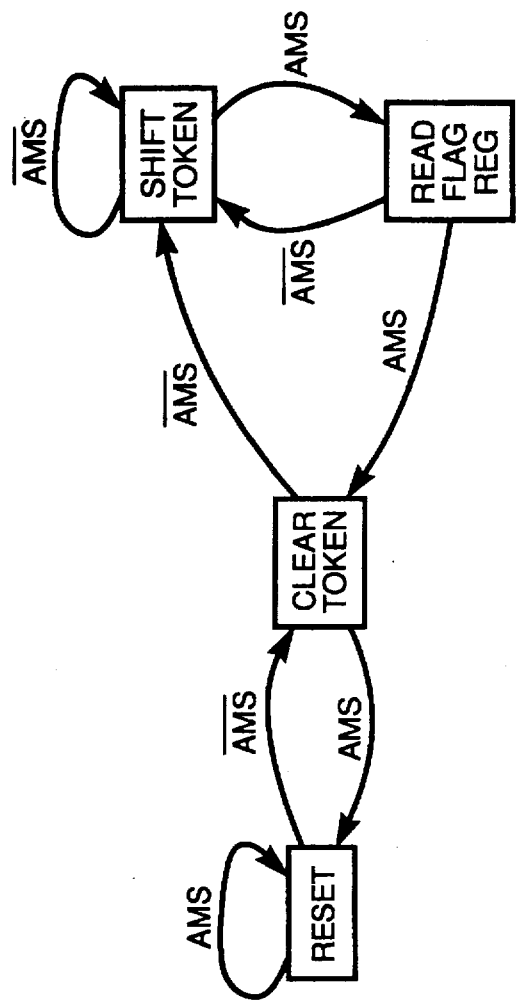

With reference to FIG. 80, the control circuit is initially in a reset state, as represented by the box of the same label. In that state, as shown in the Signal Condition/State Table on FIG. 13B-2, the control circuit 2033 asserts the RESET TOKEN REG and RESET FLAG REG signals to reset the token register 2030 and flag register 106 as described above. While the diagnostic processor 101 maintains the AMS (P) signal asserted, the control circuit 2033 remains in the reset state.

If the diagnostic processor 101 negates the AMS (P) signal while the control circuit 2033 is in the reset state, the control circuit sequences to a "clear token" state, as represented by the box of the same label. As noted above, the state transition occurs at the next tick of the ACLK (P) signal after negation of the AMS (P) signal. In the clear token state, the control circuit 2033 asserts the RESET TOKEN REG signal, to reset the stages 2030(i) of the token register 2030, and maintains the other signals negated. If the diagnostic processor re-asserts the AMS (P) signal, at the next tick of the ACLK (P) signal the control circuit 2033 returns to the reset state. Otherwise, if the diagnostic processor maintains the AMS (P) signal negated at the next tick of the ACLK (P) signal, the control circuit 2033 sequences to a shift token state. The control circuit's shift token state is represented by a box on FIG. 80 of the same name. If the diagnostic processor 101 thereafter maintains the AMS (P) signal negated at successive ticks of the ACLK (P) signal, the control circuit 2033 remains in the shift token state.

In the shift token state, the control circuit 2033 asserts the SHIFT TOKEN signal and the READ FR ST read flag register state signal. As noted above, while the SHIFT TOKEN signal is asserted, each multiplexer 2032(i+1) couples the TR (i) signal from the preceding token register stage 2030(i) to be latched in its stage 2030(i+1) at successive ticks of the ACLK (P) signal. Thus, if a token register stage 2030(i) is in a condition indicating that it has a token, or if stage 2030(0) receives the token from the parent node or the diagnostic processor 101, while the SHIFT TOKEN signal is asserted at successive ticks of the ACLK (P) signal the token shifts through the succeeding stages 2030(i) and out the gated drivers 2040(i) associated with asserted EN (0) enable signals. In addition, the READ FR ST signal enables the multiplexer 2034 to couple the signal from the multiplexer series 2035(i) as the ADO (P) address data out to parent signal to the parent diagnostic network node.

On the other hand, if, while the control circuit 2033 is in the shift token state, the diagnostic processor 101 asserts the AMS (P) signal, the control circuit 2033 sequences to a read flag register state at the next tick of the ACLK (P) address clock from parent signal. In the read flag register state the control circuit asserts only the READ FR ST read flag register state signal, which, as noted above, enables the multiplexer 2034 to couple the signal from the multiplexer series 2035(i) as the ADO (P) address data out to parent signal to the parent diagnostic network node. If the diagnostic processor 101 maintains the AMS (P) signal in an asserted condition, the control circuit 2033 returns to the clear token state at the next tick of the ACLK (P) signal. On the other hand, if the diagnostic processor 101 negates the AMS (P) signal while the control circuit 2033 is in the read flag register state, the control circuit 2033 returns to the shift token state.

3. Test Data Control Portion 2001

Figure 81:
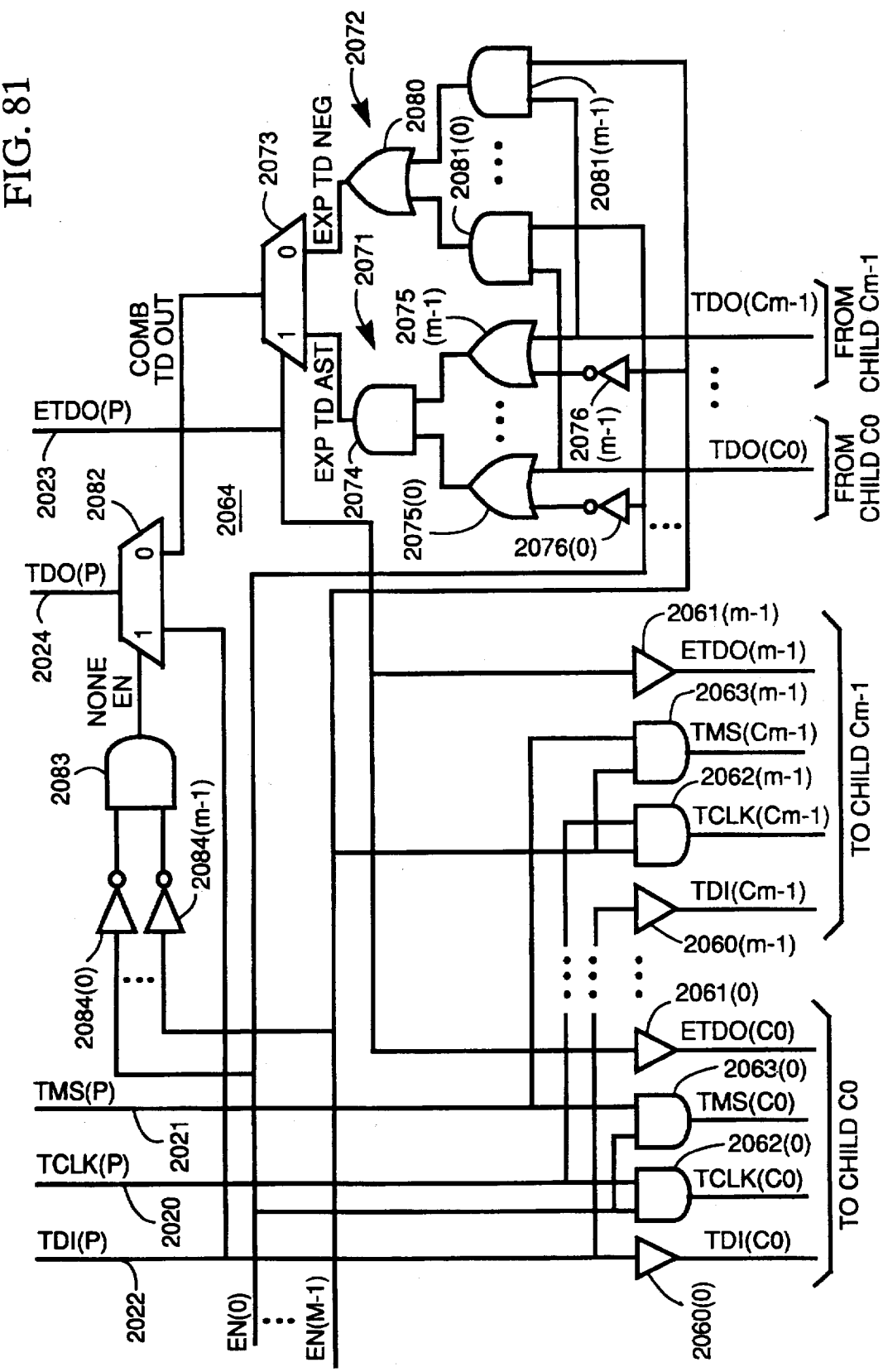

The test data control portion 2001 will be described in connection with FIG. 81. With reference to FIG. 81, the test data control portion includes three general sections. One section transmits several signals received from the parent diagnostic network node, or the diagnostic processor 101, directly to the various child diagnostic nodes connected thereto. In particular, the test data control portion 2001 receives the TDI (P) test data in from parent signal on line 2022 and transmits it to all of the child diagnostic network nodes in parallel through drivers 2060(0) through 2060(m−1) [generally identified by reference numeral 2060(i)] to all of the child nodes connected to the respective buses 110(C$_i$). In addition, the test data control portion 2001 receives the ETDO (P) expected test data out signal on line 2023 and couples transmits it to all of the child diagnostic network nodes in parallel throuh drivers 2061(0) through 2061(m−1) [generally identified by reference numeral 2061(i)] to all of the child nodes connected to the respective buses 110(C$_i$).

A second section gates several other signals received from the parent diagnostic network node, or the diagnostic processor 101, to those child nodes whose EN (i) enable signals are asserted. In particular, the test data control portion 2001 receives the TCLK (P) test clock from parent signal on line 2020 and transmits it through those of gated drivers 2062(0) through 2062(m−1) [generally identified by reference numeral 2062(i)] associated with the asserted EN (i) signals. Similarly, the test data control portion 2001 receives the TMS (P) test mode select from parent signal on line 2020 and transmits it through those of gated drivers 2063(0) through 2063(m−1) [generally identified by reference numeral 2063(i)] associated with the asserted EN (i) signals.

Finally, the test data control portion includes a test data combining circuit 2064 which receives TDO (C$_i$) signals from child nodes for which corresponding EN (i) signals are asserted, and combines them according to logical operations as selected by the ETDO (P) expected test data out signal from line 2023. The structure and operation of the test data combining circuit 2064 is generally similar to the address data combining circuit 2036 described above.

The test data combining circuit 2064 receives TDO (C$_i$) signals from the respective child diagnostic network nodes for which the EN (i) enable signals are asserted, combines them according to a logical function identified by the ETDO (P) expected test data out signal from line 2023, and provides the result to one data input terminal of multiplexer 2035(m−1). The test data combining circuit includes two general sections, including an AND section 2071 and an OR section 2072, along with a multiplexer 2073 which is controlled by the ETDO (P) signal. If the ETDO (P) signal is negated, the multiplexer 2073 couples an EXP TD NEG expect negated output signal from the OR section 2072 as a COMB TD OUT combined test data out signal to one input terminal of a multiplexer 2082. If the OR section 2072 is negating the EXP TD NEG signal, all of the TDO (C$_i$) signals, from the nodes for which the EN (i) signals are asserted, are negated. Accordingly, the conditions of the TDO (C$_i$) signals will correspond to the negated condition of the ETDO (P) signal.

However, if one of the TDO (C$_i$) signals, from the nodes for which the EN (i) signals are asserted, is asserted, the OR section 2072 will assert the EXP TD NEG expect negated signal. The asserted signal will be coupled to the multiplexer 2035(m−1) and through the multiplexers 2035(i) and 2034 as the TDO (P) signal. In that case, the condition of at least one of the TDO (C$_i$) signals will differ from the negated condition of the ETDO (P), indicating an error.

On the other hand, if the ETDO (P) signal is asserted, the multiplexer 2073 couples an EXP TD AST expect asserted output signal from the AND section 2071 to the multiplexer 2035(m−1), which will be transmitted through the multiplexers 2035(i) and 2034 as the TDO (P) signal. If the AND section 2072 is asserting the EXP TD AST signal, all of the TDO (C$_i$) signals, from the nodes for which the EN (i) signals are asserted, are asserted. Accordingly, the conditions of those TDO (C$_i$) signals will correspond to the asserted condition of the ETDO (P) signal.

However, if one of the TDO (C$_i$) signals, from the nodes for which the EN (i) signals are asserted, is negated, the AND section 2071 will negate the EXP TD AST expect asserted signal. The negated signal will be coupled to the multiplexer 2035(m−1) and through the multiplexers 2035(i) and 2034 as the TDO (P) signal. In that case, the condition of at least one of the TDO (C$_i$) signals will differ from the asserted condition of the ETDO (P), indicating an error.

The AND section 2071 of test data combine circuit 2064 includes an AND gate 2073 which receives input signals from a series of OR gates, generally identified by reference numeral 2075(i). Each OR gate 2075(i) receives at one input terminal an TDO (C$_i$) test data out signal from a child diagnostic network node. At its other input terminal, the OR gate 2075(i) receives the complement of the EN (i) signal, as generated by an inverter, generally identified by reference numeral 2076(i). Accordingly, if an EN (i) signal is not asserted, the inverter 2076(i) energizes the OR gate 2075(i) to enable the corresponding input terminal of AND gate 2074.

On the other hand, if the EN (i) signal is asserted, the inverter 2076(i) disables that input terminal of the respective OR gate 2075(i). Thus, the condition of the OR gate 2075(i) is controlled by the condition of the TDO (C$_i$) signal. If the TDO (C$_i$) signal is asserted, the associated OR gate 2075(i) will be energized to energize the respective input terminal of the AND gate 2074. However, if an TDO (C$_i$) signal is negated, the associated OR gate 2075(i) will be de-energized to, in turn, disable the AND gate 2074. Thus, if all of the TDO (C$_i$) signals from the child diangostic network nodes, for which EN (i) signals are asserted, are asserted, the EXP TD AST expect asserted signal will be asserted. However, if one of the TDO (C$_i$) signals from the child diangostic network nodes, for which EN (i) signals are asserted, is negated, the AND gate 2074 will be disabled and the EXP TD AST expect asserted signal will be negated.

The OR section 2072 of test data combine circuit 2064 includes an OR gate 2080 which receives input signals from a series of AND gates, generally identified by reference numeral 2081(i). Each AND gate 2081(i) receives at one input terminal an TDO (C$_i$) test data out signal from a child diagnostic network node. At its other input terminal, the AND gate 2081(i) receives the EN (i) signal from the flags 106(C$_i$) of flag register 106. Accordingly, if an EN (i) signal is asserted, the corresponding input terminal of AND gate 2081(i) is enabled. On the other hand, if the EN (i) signal is negated, the AND gate 2081(i) is disabled.

Thus, the condition of the AND gates 2081(i) enabled by the asserted EN (i) signals is controlled by the condition of the TDO ($C_i$) signal. If the TDO ($C_i$) signal is negated, the associated AND gate 2081(i) will be de-energized to disable the respective input terminal of the OR gate 2080. If all TDO ($C_i$) signals, for which EN (i) signals are asserted, are negated, the OR gate 2080 will be de-energized to negate the EXP TD NEG expect negated signal. However, if an TDO ($C_i$) signal, for which an EN (i) signal is asserted, is negated, the associated AND gate 2081(i) will be energized to, in turn, energize the OR gate 2080 and assert the EXP TD NEG signal. Thus, if all of the TDO ($C_i$) signals from the child diagostic network nodes, for which EN (i) signals are asserted, are negated, the EXP TD NEG expect negated signal will be negated. However, if one of the TDO ($C_i$) signals from the child diagnostic network nodes, for which EN (i) signals are asserted, is asserted, the OR gate 2080 will be energized and the EXP TD NEG expect negated signal will be asserted.

The multiplexer 2082 determines the source of signals coupled onto line 2024 as the TDO (P) test data out to parent signal. An AND gate 2083, controlled by the complements of the EN (i) signals as generated by inverters 2084(0) through 2084(m-1) [generally identified by reference numeral 2084(i)], asserts a NONE EN none enabled signal if the flags 106($C_i$) are not asserting any of the EN (i) enable signals. If the NONE EN signal is negated, indicating that at least one EN (i) enable signal is asserted, the multiplexer 2082 couples the COMB TD OUT signal onto line 2024 as the TDO (P) test data out signal. On the other hand, if the NONE EN signal is asserted, the multiplexer 2082 couples the TDI (P) signal received on line 2022 onto line 2024 as the TDO (P) signal.

As noted above, the test data combine portion 2064, particularly the AND section 2071 and the OR section 2072, along with multiplexer 2073, is similar to the address data combine portion 2036 of the address token/data control portion 2000. In addition, it will be recognized that the address data combine portion 2036 and the test daa combine portion 2064 will be used at different points in time. That is, the address data combine portion 2036 will be used while the flags 106($C_i$) are being conditioned, and the test data combine portion will be used thereafter. Accordingly, in one specific embodiment, the same circuitry is used for both elements.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A digital computer comprising:

a plurality of message generating nodes interconnected by a routing network;

A. said routing network for transferring messages among said message generating elements;

B. each message generating node including:
  i. a message processing element for generating messages, each message including a tag field containing a tag value for transmission over said routing network, and for receiving messages from said routing network; and
  ii. a message counter whose contents are selectively incremented and decrement in response to the tag value of the tag field of transmitted and received; and
  C. a combine network for performing a combine operation in connection with the lag values of the message counters of said message generating nodes to determine a combined tag value reflecting the number of messages which have been transmitted by said message generating nodes over the routing network which have not been received by said message generating nodes.

2. A digital computer as defined in claim 1 in which the routing network comprises a plurality of router nodes interconnected in a tree pattern in a series of levels from a leaf level to a root level, the message generating nodes being connected to transmit messages to and receive messages from router nodes at the leaf level.

3. A digital computer as defined in claim 1 in which said message counter includes:

A. a counter for generating a digital value in response to a current value, a count increment enable signal which enables said counter to increment, and a count decrement enable signal which enables said counter to decrement;

B. an increment enable signal generator for selectively generating said count increment enable signal in response to (i) the tag value of the tag field of a message generated by the message processing element for transmission over the routing network, and (ii) a count mask; and C. a decrement enable signal generator for selectively generating said count decrement enable signal in response to (i) the tag value of the tag field of a message received by the message processing element from said routing network, and (ii) said count mask.

4. A digital computer as defined in claim 3 in which said count mask comprises a plurality of count mask bits each having selected conditions, said increment enable signal generator comprising:

A. increment selection means for receiving a plurality of count mask signals each representative of the condition of a count mask bit, said increment selection means being responsive to the tag value of the tag field of a message generated by the message processing element for transmission over the routing network to selectively couple one of the count mask signals as an increment enable signal; and B. increment gate means for generating said count increment enable signal in response to said increment enable signal and a signal indicating transmission of a message generated by the message processing element over the routing network.

5. A digital computer as defined in claim 4 in which message generating elements of at least some of said message generating nodes include a plurality of ports for concurrently generating a plurality of messages for transmission over said routing network, said message counter including:

A. a plurality of increment enable signal generators each associated with one of said ports for generating a port increment enable signal; and B. a count increment enable consolidation circuit for generating said count increment enable signal in response to the port increment enable signals of all of said increment enable signal generators.

6. A digital computer as defined by claim 4 in which said count mask comprises a plurality of count mask bits each having selected conditions, said decrement enable signal generator comprising:

A. decrement selection means for receiving a plurality of count mask signals each representative of the condition of a count mask bit, said decrement selection means being responsive to the tag value of the tag field of a message received by the message processing element over the routing network to selectively couple one of the count mask signals as a decrement enable signal; and B. decrement gate means for generating said count increment enable signal in response to said decrement enable signal and a signal indicating receipt of a message by the message processing element over the routing network.

7. A digital computer as defined in claim 6 in which message generating elements of at least some of said message generating nodes include a plurality of ports for concurrently receiving a plurality of messages from said routing network, said message counter including:

A. a plurality of decrement enable signal generators each associated with one of said ports for generating a port decrement enable signal, the decrement gate means of the decrement enable signal generator associated with least one of said ports generating the port decrement enable signal in response to a selectively buffered message reception signal;

B. a selective buffer circuit for generating said selectively buffered message reception signal in response to port message reception signals from said ports, each port message reception signal indicating reception by an associated port of a message from said network; and C. a count decrement enable consolidation circuit for generating said count decrement enable signal in response to the port decrement enable signals of all of said decrement enable signal generators.

8. A digital computer as defined in claim 7 in which said selective buffer circuit includes:

A. immediate coincidence means for generating an unbuffered message reception signal in response to a port message reception signal from the port assoicated with the selective buffer circuit indicating receipt of a message thereby, in the absence the port message reception signals from the other ports indicating concurrent receipt of messages thereby;

B. buffer means for generating a delayed buffered message reception signal in response to a port message reception signal from the port assoicated with the selective buffer circuit indicating receipt of a message thereby, in the presence of the port message reception signals from the other ports indicating concurrent receipt of messages thereby; and C. means for generating said selectively buffered message reception signal in response to said unbuffered message reception signal and said delayed buffered message reception signal.

9. A digital computer as defined in claim 1 in which said message processing element further includes means for generating an initial count value, said message counter including:

A. a register for storing a current count value;

B. count modification means for receiving said current count value from said register and selectively generating an updated count value representing an incremented count value in response to transmission of a message by said message generating element or a decremented count value in response to reception of a message by said message generating element; and C. count selection means for selectively coupling said initial count value or said updated count value to said register for storage as the current count value.

10. A digital computer as defined in claim 9 in which said register stores said updated count value in response to a load enable signal generated by a load enable control circuit in response to transmission of a message by said message generating element or reception of a message by said message generating element, or in response to receipt of an initial count load enable signal received from said message generating element concurrently with an initial count value.

11. A digital computer as defined in claim 10 in which said load enable control circuit disables generation of said load enable signal in response to contemporaneous transmission of a message by said message generating element and reception of a message by said message generating element.

12. A digital computer as defined in claim 1 in which said message counter includes:

A. a counter for generating a digital value in response to a current value, a count increment enable signal which enables said counter to increment, and a count decrement enable signal which enables said counter to decrement;

B. an increment enable signal generator for selectively generating said count increment enable signal in response to transmission of a message generated by the message processing element over the routing network; and C. a decrement enable signal generator for selectively generating said count decrement enable signal in response to reception of a message received by the message processing element from said routing network.

13. A digital computer as defined in claim 12 in which message generating elements of at least some of said message generating nodes include a plurality of ports for concurrently generating a plurality of messages for transmission over said routing network, said message counter including:

A. a plurality of increment enable signal generators each associated with one of said ports for generating a port increment enable signal; and B. a count increment enable consolidation circuit for generating said count increment enable signal in response to the port increment enable signals of all of said increment enable signal generators.

14. A digital computer as defined in claim 12 in which message generating elements of at least some of said message generating nodes include a plurality of ports for concurrently receiving a plurality of messages from said routing network, said message counter including:

A. a plurality of decrement enable signal generators each associated with one of said ports for generating a port decrement enable signal, the decrement gate means of the decrement enable signal generator associated with at least one of said ports generating the port decrement enable signal in response to a selectively buffered message reception signal;

B. a selective buffer circuit for generating said selectively buffered message reception signal in response to port message reception signals from said ports, each port message reception signal indicating reception by an associated port of a message from said network;

C. a count decrement enable consolidation circuit for generating said count decrement enable signal in response to the port decrement enable signals of all of said decrement enable signal generators.

15. A digital computer as defined in claim 14 in which said selective buffer circuit includes:

A. immediate coincidence means for generating an unbuffered message reception signal in response to a port message reception signal from the port assoicated with the selective buffer circuit indicating receipt of a message thereby, in the absence the port message reception signals from the other ports indicating concurrent receipt of messages thereby;

B. buffer means for generating a delayed buffered message reception signal in response to a port message reception signal from the port assoicated with the selective buffer circuit indicating receipt of a message thereby, in the presence of the port message reception signals from the other ports indicating concurrent receipt of messages thereby; and C. means for generating said selectively buffered message reception signal in response to said unbuffered message reception signal and said delayed buffered message reception signal.

16. A digital computer as defined in claim 1 further comprising means for controlling operations by said message generating nodes in response to the combined count value generated by said combine network.

* * * * *